US012685312B2

(12) United States Patent
Clough et al.

(10) Patent No.: US 12,685,312 B2
(45) Date of Patent: Jul. 21, 2026

(54) SULFONAMIDE APYRASE INHIBITORS

(71) Applicant: Texas Crop Science, Inc., Austin, TX (US)

(72) Inventors: John Clough, Marlow (GB); Tanya Sabharwal, Austin, TX (US); Simon Hiebert, Austin, TX (US); Jeffrey D. Fowler, Wilkesboro, NC (US); Matthew Duncton, San Bruno, CA (US)

(73) Assignee: Texas Crop Science, Inc., Austin, TX (US)

( * ) Notice: Subject to any disclaimer, the term of this patent is extended or adjusted under 35 U.S.C. 154(b) by 220 days.

(21) Appl. No.: 18/241,108

(22) Filed: Aug. 31, 2023

(65) Prior Publication Data

US 2024/0099300 A1 Mar. 28, 2024

Related U.S. Application Data

(60) Provisional application No. 63/402,919, filed on Aug. 31, 2022.

(51) Int. Cl.

| | |
|---|---|
| *A01N 41/06* | (2006.01) |
| *A01N 43/08* | (2006.01) |
| *A01N 43/10* | (2006.01) |
| *A01N 43/16* | (2006.01) |
| *A01N 43/30* | (2006.01) |
| *A01N 43/32* | (2006.01) |
| *A01N 43/38* | (2006.01) |
| *A01N 43/42* | (2006.01) |
| *A01N 43/50* | (2006.01) |
| *A01N 43/54* | (2006.01) |
| *A01N 43/56* | (2006.01) |
| *A01N 43/58* | (2006.01) |
| *A01N 43/60* | (2006.01) |
| *A01N 43/713* | (2006.01) |
| *A01N 43/76* | (2006.01) |
| *A01N 43/78* | (2006.01) |
| *A01N 43/80* | (2006.01) |
| *A01N 43/82* | (2006.01) |
| *A01N 43/84* | (2006.01) |
| *A01N 47/02* | (2006.01) |
| *A01N 47/20* | (2006.01) |
| *A01N 53/00* | (2006.01) |
| *A01P 3/00* | (2006.01) |

(52) U.S. Cl.

CPC ............ *A01N 41/06* (2013.01); *A01N 43/08* (2013.01); *A01N 43/10* (2013.01); *A01N 43/16* (2013.01); *A01N 43/30* (2013.01); *A01N 43/32* (2013.01); *A01N 43/38* (2013.01); *A01N 43/42* (2013.01); *A01N 43/50* (2013.01); *A01N 43/54* (2013.01); *A01N 43/56* (2013.01); *A01N 43/58* (2013.01); *A01N 43/60* (2013.01); *A01N 43/713* (2013.01); *A01N 43/76* (2013.01); *A01N 43/78* (2013.01); *A01N 43/80* (2013.01); *A01N 43/82* (2013.01); *A01N 43/84* (2013.01); *A01N 47/02* (2013.01); *A01N 47/20* (2013.01); *A01N 53/00* (2013.01); *A01P 3/00* (2021.08)

(58) Field of Classification Search

CPC ........ A01N 41/06; A01N 43/08; A01N 43/10; A01N 43/16; A01N 43/30; A01N 43/32; A01N 43/38; A01N 43/42; A01N 43/50; A01N 43/54; A01N 43/56; A01N 43/58; A01N 43/60; A01N 43/713; A01N 43/76; A01N 43/78; A01N 43/80; A01N 43/82; A01N 43/84; A01N 47/02; A01N 47/20; A01N 53/00; A01P 3/00

See application file for complete search history.

(56) References Cited

U.S. PATENT DOCUMENTS

| | | | |
|---|---|---|---|
| 2002/0103082 | A1 | 8/2002 | Windsor et al. |
| 2006/0265779 | A1 | 11/2006 | Thomas et al. |
| 2006/0276339 | A1 | 12/2006 | Windsor et al. |
| 2008/0058211 | A1 | 3/2008 | Roux |
| 2022/0039381 | A1 | 2/2022 | Roux et al. |

FOREIGN PATENT DOCUMENTS

WO WO-2016123191 A1 8/2016

OTHER PUBLICATIONS

PubChem [Internet]. Bethesda (MD): National Library of Medicine (US), National Center for Biotechnology Information; 2004—. PubChem Compound Summary for CID 64593370, N-[2-(methylsulfamoyl)phenyl]acetamide; [cited Apr. 1, 2024.]. Available from: https://pubchem.ncbi.nlm.nih.gov/compound/N-_2-methylsulfamoyl_phenyl_acetamide.

(Continued)

*Primary Examiner* — Trevor Love

(74) *Attorney, Agent, or Firm* — Travis Young; Bozicevic, Field & Francis LLP

(57) ABSTRACT

Disclosed herein are apyrase inhibitors of Formula (I):

(I)

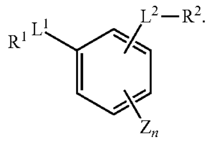

Also disclosed herein are methods for using the disclosed inhibitors, including in methods for protecting crops from pests. In one aspect the apyrase inhibitors are useful for enhancing the activity of pesticides for the protection of crops from pathogens and to support crop yield.

41 Claims, No Drawings

(56) References Cited

OTHER PUBLICATIONS

Tripathy et al., Apyrase inhibitors enhance the ability of diverse fungicides to inhibit the growth of different plant-pathogenic fungi, Molecular Plant Pathology 18(7):1-20,27-35, Jul. 9, 2016.
Tripathy et al., Apyrase inhibitors enhance the ability of diverse fungicides to inhibit the growth of different plant-pathogenic fungi, Molecular Plant Pathology, 18(7):1012-1023, 2017.
International Search Report and Written Opinion for PCT Application No. PCT/US23/31754 mailed on Feb. 22, 2024, 53 pages.

SULFONAMIDE APYRASE INHIBITORS

CROSS-REFERENCE TO RELATED APPLICATIONS

This application claims the benefit of the earlier filing date of U.S. Provisional Application No. 63/402,919, filed Aug. 31, 2022, the disclosure of which is incorporated herein by reference.

FIELD

The present disclosure relates to inhibitors of apyrase and methods for their use, in particular in the treatment of crops susceptible to pathogens.

BACKGROUND

Crops are plagued worldwide by a variety of pathogens. Pathogens, such as insects, mites, nematodes, weeds and fungi have developed an array of mechanisms for surviving pesticides, such as by sequestering, exporting or detoxifying them. The present inventors have discovered molecules and methods for potentiating the efficacy of pesticides by blocking certain mechanisms of resistance.

SUMMARY

Disclosed herein are molecules and methods for their use in supporting crop viability and yield, by, for example, protecting crops from pests. In one embodiment, disclosed herein is a method for inhibiting apyrase enzymes, comprising contacting the apyrase with a compound of the formula:

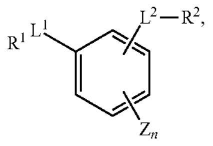

wherein $L^1$, $L^2$, $R^1$, $R^2$, Z and n are as described herein.

In further embodiments, an apyrase inhibitor as described herein is used in combination with one or more pesticide to treat a crop at risk of disease.

The foregoing and other objects, features, and advantages of the invention will become more apparent from the following detailed description.

DETAILED DESCRIPTION

I. Terms

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference in their entirety, unless otherwise specified.

Unless otherwise indicated, all numbers expressing quantities of components, molecular weights, percentages, temperatures, times, and so forth, as used in the specification or claims, are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is expressly recited.

Unless explained otherwise, all technical and scientific terms used herein have the same meaning as commonly understood by one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

"Administering" refers to any suitable mode of administration, to control a fungal pathogen, including, treatment of an extant crop, seeds, soil or combination thereof.

"Control" with reference to a fungal pathogen, means block, inhibit and/or eradicate a fungal pathogen and/or prevent the fungal pathogen from damaging a crop. In one embodiment, control refers to the reduction of one or more fungi to undetectable levels, or to the reduction or suppression of a fungus to acceptable levels as determined by one of ordinary skill in the art (for example, a crop grower). Determinations of acceptable levels of fungus reduction are based on a number of factors, including to the crop, pathogen, severity of the pathogen, use restrictions, economic thresholds and other factors known to those of ordinary skill in the art.

As used herein, the terms "enhancer" and "potentiator", refer to a compound or compounds disclosed herein that enhance the effects of a pesticide. Without limitation to theory the present enhancer compounds disclosed herein may function by blocking one or more pathways by which a pathogen, such as a fungal pathogen, evades toxicity, such as by detoxifying, sequestering or transporting a pesticide. In certain embodiment, the present compounds inhibit enzymatic apyrase activity which leads to the enhancement, accentuation or potentiation of a pesticide, such as an acaricide, antimicrobial, fungicide, herbicide, insecticide, molluscicide and/or nematocide. For example, when the enhancer or potentiator is used in conjunction with a fungicide, the combination of the potentiator and the fungicide enhances the fungicidal effect of the fungicide and/or renders a fungus that has become resistant to the fungicide susceptible to the fungicide as a result of the activity of the potentiator. Most often, these enhancers or potentiators do not themselves inhibit the growth of a fungus itself, nor do they have a detrimental effect on a living organism that is (or could be) infected with a fungus.

As used herein, the term "inoculation" refers to a method used to administer or apply an effective amount of a disclosed compound or formulation thereof to a target area of a field and/or plant. The inoculation method can be, but is not limited to, aerosol spray, pressure spray, direct watering, and dipping. Target areas of a plant could include, but are not limited to, the leaves, roots, stems, buds, flowers, fruit, seed of the plant, and bulbs of the plant including bulb, corm, rhizoma, stem tuber, root tuber and rhizophore. Inoculation can include a method wherein a plant is treated in one area (for example, the root zone or foliage) and another area of the plant becomes protected (for example, foliage is inoculated when a disclosed compound is applied in the root zone or new growth when applied to foliage).

As used herein, the terms "wettable granule", "water dispersible granule", and "dispersible granule" refer to a solid granular formulation prepared by a granulation process, optionally containing fine particles of polymer-associated active ingredient, or aggregates of the same, a wetting agent and/or a dispersant, and optionally an inert filler. Wettable granules can be stored as a formulation, and can be provided to the market and/or end user without further processing. In some embodiments, they can be placed in a water-soluble bag for ease of use by the end user. In practical application, wettable granules are prepared for application by the end user. The wettable granules are mixed with water in the end user's spray tank to the proper dilution for the particular application. Dilution can vary by crop, target pathogen, time of year, geography, local regulations, and intensity of infection or pathogen load among other factors. Once properly diluted, the solution can be applied by spraying.

As used herein, the terms "wettable powder", "water dispersible powder", and "dispersible powder", refer to a solid powdered formulation that contains active ingredient, optionally associated with a polymer, or aggregates of the same, and optionally one or more of a dispersant, a wetting agent, and an inert filler. Wettable powders can be stored as a formulation, and can be provided to the market and/or end user without further processing. In some embodiments, they can be placed in a water-soluble bag for ease of use by the end user. In practical application, a wettable powder is prepared for application by the end user. The wettable powder is mixed with water in the end user's spray tank to the proper dilution for the particular application. Dilution can vary by crop, fungal pathogen, time of year, geography, local regulations, and intensity of fungal load, among other factors. Once properly diluted, the solution can be applied by spraying.

As used herein, the term "high solids liquid suspension" refers to a liquid formulation that contains fine particles of active ingredient, or fine polymer particles associated with active ingredient, or aggregates of the same, a wetting agent and/or a dispersant, an anti-freezing agent, optionally an anti-settling agent or thickener, optionally a preservative, and water or oil as a carrier. High solids liquid suspensions can be stored as a formulation, and can be provided to the market and/or end user without further processing. In practical application, high solids liquid suspensions are prepared for application by the end user. The high solids liquid suspensions are mixed with water or oil in the end user's spray tank to the proper dilution for the particular application. Dilution can vary by crop, fungal pathogen, time of year, geography, local regulations, and intensity of infection among other factors. Once properly diluted, the solution can be applied by spraying.

As used herein, the term "phytologically acceptable" refers to compositions, diluents, excipients, and/or carriers that are generally applicable for use with any part of a plant during any part of its life cycle, including but not limited to seeds, seedlings, plant cells, plants, or flowers. The compositions can be prepared according to procedures, methods and formulas that are known to those of skill in the agricultural arts. Following the teachings of the present disclosure the artist skilled in the agricultural and/or chemical arts can readily prepare a desired composition. Most commonly, the compounds disclosed herein can be formulated to be stored, and/or applied, as aqueous or non-aqueous suspensions or emulsions prepared neat or from concentrated formulations of the compositions. Alternatively the compounds disclosed herein can be formulated for use in aerosol-generating equipment for application to agricultural produce stored in sealed chambers—an application method known as fogging. Water-soluble, water-suspendable or emulsifiable formulations comprising the presently disclosed compounds can also be converted into or formulated as solids (for example, wettable powders), which can then be diluted into a final formulation. In certain formulations, the compositions of the present disclosure can also be provided in growth media, such as in vitro media for growth of plant or other types of cells, in laboratory plant growth media, in soil, or for spraying on seeds, seedlings, roots, stems, stalks, leaves, flowers or the entire plant.

Compounds herein can include all stereoisomers, including E and Z isomers, enantiomers, diastereomers, mixtures, racemates, atropisomers, and tautomers thereof.

Non-limiting examples of optional substituents include hydroxyl groups, sulfhydryl groups, halogens, amino groups, nitro groups, nitroso groups, cyano groups, azido groups, sulfoxide groups, sulfone groups, sulfonamide groups, carboxyl groups, carboxaldehyde groups, imine groups, alkyl groups, halo-alkyl groups, alkenyl groups, haloalkenyl groups, alkynyl groups, halo-alkynyl groups, alkoxy groups, aryl groups, aryloxy groups, aralkyl groups, arylalkoxy groups, heterocyclylalkyl groups, heteroaryl groups, cycloalkyl groups, acyl groups, acyloxy groups, carbamate groups, amide groups, ureido groups, epoxy groups, and ester groups.

"Alkyl" refers to an optionally substituted straight-chain, or optionally substituted branched-chain saturated hydrocarbon. Non-limiting examples of alkyl groups include straight, branched, and cyclic alkyl and alkylene groups. An alkyl group can be, for example, a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted. In some cases alkyl refers to a group having from one to about ten carbon atoms, or from one to six carbon atoms, wherein an $sp^3$-hybridized carbon of the alkyl residue is attached to the rest of the molecule by a single bond. Whenever it appears herein, a numerical range such as "$C_{1-6}$ alkyl" means that the alkyl group consists of 1 carbon atom, 2 carbon atoms, 3 carbon atoms, 4 carbon atoms, 5 carbon atoms or 6 carbon atoms, although the present definition also covers the occurrence of the term "alkyl" where no numerical range is designated. In some embodiments, the alkyl is a $C_{1-10}$ alkyl, a $C_{1-9}$ alkyl, a $C_{1-8}$ alkyl, a $C_{1-7}$ alkyl, a $C_{1-6}$ alkyl, a $C_{1-5}$ alkyl, a $C_{1-4}$ alkyl, a $C_{1-3}$ alkyl, a $C_{1-2}$ alkyl, or a $C_1$ alkyl.

Examples of alkyl groups include, but are not limited to, methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, n-butyl, isobutyl, sec-butyl, t-butyl, n-pentyl, isopentyl, neopentyl, tert-amyl, and hexyl, and longer alkyl groups, such as heptyl, octyl, and the like.

Non-limiting examples of straight alkyl groups include methyl, ethyl, propyl, butyl, pentyl, hexyl, heptyl, octyl, nonyl, and decyl.

Branched alkyl groups include any straight alkyl group substituted with any number of alkyl groups. Non-limiting examples of branched alkyl groups include isopropyl, isobutyl, sec-butyl, and t-butyl.

Unless stated otherwise specifically in the specification, an alkyl group is optionally substituted, for example, with oxo, halogen, amino, nitrile, nitro, hydroxyl, haloalkyl, alkoxy, aryl, cycloalkyl, heterocyclylalkyl, heteroaryl, and the like. In some embodiments, the alkyl is optionally substituted with oxo, halogen, —CN, —$CF_3$, —OH, —OMe, —$NH_2$, or —$NO_2$. In some embodiments, the alkyl is optionally substituted with oxo, halogen, —CN, —$CF_3$, —OH, or —OMe. In some embodiments, the alkyl is optionally substituted with halogen. Non-limiting examples of substituted alkyl groups includes hydroxymethyl, chloromethyl, trifluoromethyl, aminomethyl, 1-chloroethyl, 2-hydroxyethyl, 1,2-difluoroethyl, and 3-carboxypropyl.

"Alkenyl" refers to an optionally substituted straight-chain, or optionally substituted branched-chain hydrocarbon having one or more carbon-carbon double-bonds. The olefin or olefins of an alkenyl group can be, for example, E, Z, cis, trans, terminal, or exo-methylene. An alkenyl group can be, for example, a $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted. Non-limiting examples of alkenyl and alkenylene groups include ethenyl, prop-1-en-1-yl, isopropenyl, but-1-en-4-yl; 2-chloroethenyl, 4-hydroxybuten-1-yl, 7-hydroxy-7-methyloct-4-en-2-yl, and 7-hydroxy-7-methyloct-3,5-dien-2-yl.

Whenever it appears herein, a numerical range such as "$C_2$-$C_6$ alkenyl" means that the alkenyl group may consist of 2 carbon atoms, 3 carbon atoms, 4 carbon atoms, 5 carbon atoms, or 6 carbon atoms, although the present definition also covers the occurrence of the term "alkenyl" where no numerical range is designated. In some embodiments, the alkenyl is a $C_2$-$C_{10}$ alkenyl, a $C_2$-$C_9$ alkenyl, a $C_2$-$C_8$ alkenyl, a $C_2$-$C_7$ alkenyl, a $C_2$-$C_6$ alkenyl, a $C_2$-$C_5$ alkenyl, a $C_2$-$C_4$ alkenyl, a $C_2$-$C_3$ alkenyl, or a $C_2$ alkenyl. Unless stated otherwise specifically in the specification, an alkenyl group is optionally substituted, for example, with oxo, halogen, amino, nitrile, nitro, hydroxyl, haloalkyl, alkoxy, aryl, cycloalkyl, heterocyclylalkyl, heteroaryl, and the like. In some embodiments, an alkenyl is optionally substituted with oxo, halogen, —CN, —$CF_3$, —OH, —OMe, —$NH_2$, or —$NO_2$. In some embodiments, an alkenyl is optionally substituted with oxo, halogen, —CN, —$CF_3$, —OH, or —OMe. In some embodiments, the alkenyl is optionally substituted with halogen.

"Alkynyl" refers to an optionally substituted straight-chain or optionally substituted branched-chain hydrocarbon. The triple bond of an alkynyl group can be internal or terminal. An alkynyl or alkynylene group can be, for example, a $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted. Non-limiting examples of alkynyl groups include ethynyl, prop-2-yn-1-yl, prop-1-yn-1-yl, and 2-methyl-hex-4-yn-1-yl; 5-hydroxy-5-methylhex-3-yn-1-yl, 6-hydroxy-6-methylhept-3-yn-2-yl, and 5-hydroxy-5-ethylhept-3-yn-1-yl.

Whenever it appears herein, a numerical range such as "$C_2$-$C_6$ alkynyl" means that the alkynyl group may consist of 2 carbon atoms, 3 carbon atoms, 4 carbon atoms, 5 carbon atoms, or 6 carbon atoms, although the present definition also covers the occurrence of the term "alkynyl" where no numerical range is designated. In some embodiments, the alkynyl is a $C_2$-$C_{10}$ alkynyl, a $C_2$-$C_9$ alkynyl, a $C_2$-$C_8$ alkynyl, a $C_2$-$C_7$ alkynyl, a $C_2$-$C_6$ alkynyl, a $C_2$-$C_5$ alkynyl, a $C_2$-$C_4$ alkynyl, a $C_2$-$C_3$ alkynyl, or a $C_2$ alkynyl. Unless stated otherwise specifically in the specification, an alkynyl group is optionally substituted, for example, with oxo, halogen, amino, nitrile, nitro, hydroxyl, haloalkyl, alkoxy, aryl, cycloalkyl, heterocyclylalkyl, heteroaryl, and the like. In some embodiments, an alkynyl is optionally substituted with oxo, halogen, —CN, —$CF_3$, —OH, —OMe, —$NH_2$, or —$NO_2$. In some embodiments, an alkynyl is optionally substituted with oxo, halogen, —CN, —$CF_3$, —OH, or —OMe. In some embodiments, the alkynyl is optionally substituted with halogen.

A haloalkyl group can be any alkyl group substituted with any number of halogen atoms, for example, fluorine, chlorine, bromine, and iodine atoms. A halo-alkenyl group can be any alkenyl group substituted with any number of halogen atoms. A haloalkynyl group can be any alkynyl group substituted with any number of halogen atoms.

An alkoxy group can be, for example, an oxygen atom substituted with any alkyl, alkenyl, or alkynyl group. An ether or an ether group comprises an alkoxy group. Non-limiting examples of alkoxy groups include methoxy, ethoxy, propoxy, isopropoxy, and isobutoxy.

The term "acyl" refers to the groups HC(O)—, alkyl-C(O)—, cycloalkyl-C(O)—, cycloalkenyl-C(O)—, aryl-C(O)—, heteroaryl-C(O)— and heterocyclyl-C(O)— where alkyl, cycloalkyl, cycloalkenyl, aryl, heteroaryl, and heterocyclyl are as described herein. By way of example acyl groups include acetyl and benzoyl groups.

"Alkoxy" refers to a radical of the formula —$OR^a$ where $R^a$ is an alkyl radical as defined. Unless stated otherwise specifically in the specification, an alkoxy group may be optionally substituted, for example, with oxo, halogen, amino, nitrile, nitro, hydroxyl, haloalkyl, alkoxy, aryl, cycloalkyl, heterocyclylalkyl, heteroaryl, and the like. In some embodiments, an alkoxy is optionally substituted with oxo, halogen, —CN, —$CF_3$, —OH, —OMe, —$NH_2$, or —$NO_2$. In some embodiments, an alkoxy is optionally substituted with oxo, halogen, —CN, —$CF_3$, —OH, or —OMe. In some embodiments, the alkoxy is optionally substituted with halogen.

"Aminoalkyl" refers to an alkyl radical, as defined above, that is substituted by one or more amines. In some embodiments, the alkyl is substituted with one amine. In some embodiments, the alkyl is substituted with one, two, or three amines. Hydroxyalkyl include, for example, aminomethyl, aminoethyl, aminopropyl, aminobutyl, or aminopentyl. In some embodiments, the hydroxyalkyl is aminomethyl.

"Aryl" refers to a radical derived from a hydrocarbon ring system comprising hydrogen, 6 to 30 carbon atoms, and at least one aromatic ring. The aryl radical may be a monocyclic, bicyclic, tricyclic, or tetracyclic ring system, which may include fused (when fused with a cycloalkyl or heterocyclylalkyl ring, the aryl is bonded through an aromatic ring atom) or bridged ring systems. In some embodiments, the aryl is a 6- to 10-membered aryl. In some embodiments, the aryl is a 6-membered aryl. Aryl radicals include, but are not limited to, aryl radicals derived from the hydrocarbon ring systems of anthrylene, naphthylene, phenanthrylene, anthracene, azulene, benzene, chrysene, fluoranthene, fluorene, as-indacene, s-indacene, indane, indene, naphthalene, phenalene, phenanthrene, pleiadene, pyrene, and triphenylene. In some embodiments, the aryl is phenyl. Unless stated otherwise specifically in the specification, an aryl may be optionally substituted, for example, with halogen, amino, nitrile, nitro, hydroxyl, alkyl, alkenyl, alkynyl, haloalkyl, alkoxy, aryl, cycloalkyl, heterocyclylalkyl, heteroaryl, and the like. In some embodiments, an aryl is optionally substituted with halogen, methyl, ethyl, —CN, —$CF_3$, —OH, —OMe, —$NH_2$, or —$NO_2$. In some embodiments, an aryl is optionally substituted with halogen, methyl, ethyl, —CN, —$CF_3$, —OH, or —OMe. In some embodiments, the aryl is optionally substituted with halogen.

"Cycloalkyl" refers to a stable, partially or fully saturated, monocyclic or polycyclic carbocyclic ring, which may include fused (when fused with an aryl or a heteroaryl ring, the cycloalkyl is bonded through a non-aromatic ring atom), bridged, or spiro ring systems. Representative cycloalkyls include, but are not limited to, cycloalkyls having from three to fifteen carbon atoms ($C_3$-$C_{15}$ cycloalkyl), from three to ten carbon atoms ($C_3$-$C_{10}$ cycloalkyl), from three to eight carbon atoms ($C_3$-$C_8$ cycloalkyl), from three to six carbon atoms ($C_3$-$C_6$ cycloalkyl), from three to five carbon atoms ($C_3$-$C_5$ cycloalkyl), or three to four carbon atoms ($C_3$-$C_4$ cycloalkyl). In some embodiments, the cycloalkyl is a 3- to 6-membered cycloalkyl. In some embodiments, the cycloalkyl is a 5- to 6-membered cycloalkyl. Non-limiting examples of cycloalkyl groups include cyclopropyl, cyclobutyl, cyclopentyl, cyclohexyl, cycloheptyl, and cyclooctyl groups. Cycloalkyl groups also include fused-, bridged-, and spiro-bicycles and higher fused-, bridged-, and spiro-systems. A cycloalkyl group can be substituted with any number of straight, branched, or cyclic alkyl groups. Non-limiting examples of cyclic alkyl groups include cyclopropyl, 2-methyl-cycloprop-1-yl, cycloprop-2-en-1-yl, cyclobutyl, 2,3-dihydroxycyclobut-1-yl, cyclobut-2-en-1-yl, cyclopentyl, cyclopent-2-en-1-yl, cyclopenta-2,4-dien-1-yl, cyclohexyl, cyclohex-2-en-1-yl, cycloheptyl, cyclooctanyl, 2,5-dimethylcyclopent-1-yl, 3,5-dichlorocyclohex-1-yl, 4-hydroxycyclohex-1-yl, 3,3,5-trimethylcyclohex-1-yl, octahydropentalenyl, octahydro-1H-indenyl, 3a,4,5,6,7,7a-hexahydro-3H-inden-4-yl, decahydroazulenyl, bicyclo-[2.1.1]hexanyl, bicyclo[2.2.1]heptanyl, bicyclo[3.1.1]heptanyl, 1,3-dimethyl[2.2.1]heptan-2-yl, bicyclo[2.2.2]octanyl, and bicyclo[3.3.3]undecanyl. Monocyclic cycloalkyls include, for example, cyclopropyl, cyclobutyl, cyclopentyl, cyclohexyl, cycloheptyl, and cyclooctyl.

Polycyclic cycloalkyls or carbocycles include, for example, adamantyl, norbornyl, decalinyl, bicyclo[3.3.0] octane, bicyclo[4.3.0]nonane, cis-decalin, trans-decalin, bicyclo[2.1.1]hexane, bicyclo[2.2.1]heptane, bicyclo[2.2.2] octane, bicyclo[3.2.2]nonane, and bicyclo[3.3.2]decane, and 7,7-dimethyl-bicyclo[2.2.1]heptanyl.

Partially saturated cycloalkyls include, for example, cyclopentenyl, cyclohexenyl, cycloheptenyl, and cyclooctenyl. Unless stated otherwise specifically in the specification, a cycloalkyl is optionally substituted, for example, with oxo, halogen, amino, nitrile, nitro, hydroxyl, alkyl, alkenyl, alkynyl, haloalkyl, alkoxy, aryl, cycloalkyl, heterocyclylalkyl, heteroaryl, and the like. In some embodiments, a cycloalkyl is optionally substituted with oxo, halogen, methyl, ethyl, —CN, —$CF_3$, —OH, —OMe, —$NH_2$, or —$NO_2$. In some embodiments, a cycloalkyl is optionally substituted with oxo, halogen, methyl, ethyl, —CN, —$CF_3$, —OH, or —OMe. In some embodiments, the cycloalkyl is optionally substituted with halogen.

"Deuteroalkyl" refers to an alkyl radical, as defined above, that is substituted by one or more deuteriums. In some embodiments, the alkyl is substituted with one deuterium. In some embodiments, the alkyl is substituted with one, two, or three deuteriums. In some embodiments, the alkyl is substituted with one, two, three, four, five, or six deuteriums. Deuteroalkyl include, for example, $CD_3$, $CH_2D$, $CHD_2$, $CH_2CD_3$, $CD_2CD_3$, $CHDCD_3$, $CH_2CH_2D$, or $CH_2CHD_2$. In some embodiments, the deuteroalkyl is $CD_3$.

"Haloalkyl" refers to an alkyl radical, as defined above, that is substituted by one or more halogens. In some embodiments, the alkyl is substituted with one, two, or three halogens. In some embodiments, the alkyl is substituted with one, two, three, four, five, or six halogens. Haloalkyl include, for example, trifluoromethyl, difluoromethyl, fluoromethyl, trichloromethyl, 2,2,2-trifluoroethyl, 1,2-difluoroethyl, 3-bromo-2-fluoropropyl, 1,2-dibromoethyl, and the like. In some embodiments, the haloalkyl is trifluoromethyl.

"Halo" or "halogen" refers to bromo, chloro, fluoro, or iodo. In some embodiments, halogen is fluoro or chloro. In some embodiments, halogen is fluoro.

"Heteroalkyl" refers to an alkyl group in which one or more skeletal atoms of the alkyl are selected from an atom other than carbon, e.g., oxygen, nitrogen (e.g., —NH—, —N(alkyl)-), sulfur, or combinations thereof. A heteroalkyl is attached to the rest of the molecule at a carbon atom of the heteroalkyl. In one aspect, a heteroalkyl is a $C_{1-6}$ heteroalkyl wherein the heteroalkyl is comprised of 1 to 6 carbon atoms and one or more atoms other than carbon, e.g., oxygen, nitrogen (e.g. —NH—, —N(alkyl)-), sulfur, or combinations thereof wherein the heteroalkyl is attached to the rest of the molecule at a carbon atom of the heteroalkyl. Examples of such heteroalkyl are, for example, —$CH_2OCH_3$, —$CH_2CH_2OCH_3$, —$CH_2CH_2OCH_2CH_2OCH_3$, or —$CH(CH_3)OCH_3$. Unless stated otherwise specifically in the specification, a heteroalkyl is optionally substituted for example, with oxo, halogen, amino, nitrile, nitro, hydroxyl, alkyl, alkenyl, alkynyl, haloalkyl, alkoxy, aryl, cycloalkyl, heterocyclylalkyl, heteroaryl, and the like. In some embodiments, a heteroalkyl is optionally substituted with oxo, halogen, methyl, ethyl, —CN, —$CF_3$, —OH, —OMe, —$NH_2$, or —$NO_2$. In some embodiments, a heteroalkyl is optionally substituted with oxo, halogen, methyl, ethyl, —CN, —$CF_3$, —OH, or —OMe. In some embodiments, the heteroalkyl is optionally substituted with halogen.

"Hydroxyalkyl" refers to an alkyl radical, as defined above, that is substituted by one or more hydroxyls. In some embodiments, the alkyl is substituted with one hydroxyl. In some embodiments, the alkyl is substituted with one, two, or three hydroxyls. Hydroxyalkyl include, for example, hydroxymethyl, hydroxyethyl, hydroxypropyl, hydroxybutyl, or hydroxypentyl. In some embodiments, the hydroxyalkyl is hydroxymethyl.

A heterocycle can be any ring containing a ring atom that is not carbon, for example, N, O, S, P, Si, B, or any other heteroatom. A heterocycle can be substituted with any number of substituents, for example, alkyl groups and halogen atoms. A heterocycle can be aromatic (heteroaryl) or non-aromatic. Non-limiting examples of heterocycles include pyrrole, pyrrolidine, pyridine, pyrimidine, pyrazine, pyridazine, piperidine, succinimide, maleimide, morpholine, imidazole, thiophene, furan, tetrahydrofuran, pyran, and tetrahydropyran.

"Heterocyclyl" refers to a stable 3- to 24-membered heterocycle. Non-limiting examples of heterocycles include: heterocyclic units having a single ring containing one or more heteroatoms, non-limiting examples of which include, diazirinyl, aziridinyl, azetidinyl, pyrazolidinyl, imidazolidinyl, oxazolidinyl, isoxazolinyl, thiazolidinyl, isothiazolinyl, oxathiazolidinonyl, oxazolidinonyl, hydantoinyl, tetrahydrofuranyl, pyrrolidinyl, morpholinyl, piperazinyl, piperidinyl, dihydropyranyl, tetrahydropyranyl, piperidin-2-onyl, 2,3,4,5-tetrahydro-1H-azepinyl, 2,3-dihydro-1H-indole, and 1,2,3,4-tetrahydroquinoline; and ii) heterocyclic units having 2 or more rings one of which is a heterocyclic ring, non-limiting examples of which include hexahydro-1H-pyrrolizinyl, 3a,4,5,6,7,7a-hexahydro-1H-benzo[d]imidazolyl, 3a,4,5,6,7,7a-hexahydro-1H-indolyl, 1,2,3,4-tetrahydroquinolinyl, and decahydro-1H-cycloocta[b]pyrrolyl.

"Heterocyclylalkyl" refers to a stable 3- to 24-membered partially or fully saturated ring radical comprising 2 to 23 carbon atoms and from one to 8 heteroatoms selected from the group consisting of nitrogen, oxygen, phosphorous, and sulfur. Unless stated otherwise specifically in the specification, the heterocyclylalkyl radical may be a monocyclic, bicyclic, tricyclic, or tetracyclic ring system, which may include fused (when fused with an aryl or a heteroaryl ring, the heterocyclylalkyl is bonded through a non-aromatic ring atom) or bridged ring systems; and the nitrogen, carbon, or sulfur atoms in the heterocyclylalkyl radical may be optionally oxidized; the nitrogen atom may be optionally quaternized.

Representative heterocyclylalkyls include, but are not limited to, heterocyclylalkyls having from two to fifteen carbon atoms ($C_2$-$C_{15}$ heterocyclylalkyl), from two to ten carbon atoms ($C_2$-$C_{10}$ heterocyclylalkyl), from two to eight carbon atoms ($C_2$-$C_8$ heterocyclylalkyl), from two to six carbon atoms ($C_2$-$C_6$ heterocyclylalkyl), from two to five carbon atoms ($C_2$-$C_5$ heterocyclylalkyl), or two to four carbon atoms ($C_2$-$C_4$ heterocyclylalkyl). In some embodiments, the heterocyclylalkyl is a 3- to 6-membered heterocyclylalkyl. In some embodiments, the cycloalkyl is a 5- to 6-membered heterocyclylalkyl. Examples of such heterocyclylalkyl radicals include, but are not limited to, aziridinyl, azetidinyl, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, 1,1-dioxo-thiomorpholinyl, 1,3-dihydroisobenzofuran-1-yl, 3-oxo-1,3-dihydroisobenzofuran-1-yl, methyl-2-oxo-1,3-dioxol-4-yl, and 2-oxo-1,3-dioxol-4-yl. The term heterocyclylalkyl also includes all ring forms of the carbohydrates, including but not limited to, the monosaccharides, the disaccharides, and the oligosaccharides. It is understood that when referring to the number of carbon atoms in a heterocyclylalkyl, the number of carbon atoms in the heterocyclylalkyl is not the same as the total number of atoms (including the heteroatoms) that make up the heterocyclylalkyl (i.e. skeletal atoms of the heterocyclylalkyl ring). Unless stated otherwise specifically in the specification, a heterocyclylalkyl is optionally substituted, for example, with oxo, halogen, amino, nitrile, nitro, hydroxyl, alkyl, alkenyl, alkynyl, haloalkyl, alkoxy, aryl, cycloalkyl, heterocyclylalkyl, heteroaryl, and the like. In some embodiments, a heterocyclylalkyl is optionally substituted with oxo, halogen, methyl, ethyl, —CN, —$CF_3$, —OH, —OMe, —$NH_2$, or —$NO_2$. In some embodiments, a heterocyclylalkyl is optionally substituted with oxo, halogen, methyl, ethyl, —CN, —$CF_3$, —OH, or —OMe. In some embodiments, the heterocyclylalkyl is optionally substituted with halogen.

"Heteroaryl" refers to a 5- to 14-membered ring system radical comprising hydrogen atoms, one to thirteen carbon atoms, one to six heteroatoms selected from the group consisting of nitrogen, oxygen, phosphorous, and sulfur, and at least one aromatic ring. The heteroaryl radical may be a monocyclic, bicyclic, tricyclic, or tetracyclic ring system, which may include fused (when fused with a cycloalkyl or heterocyclylalkyl ring, the heteroaryl is bonded through an aromatic ring atom) or bridged ring systems; and the nitrogen, carbon, or sulfur atoms in the heteroaryl radical may be optionally oxidized; the nitrogen atom may be optionally quaternized. In some embodiments, the heteroaryl is a 5- to 10-membered heteroaryl. In some embodiments, the heteroaryl is a 5- to 6-membered heteroaryl. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e., thienyl). Unless stated otherwise specifically in the specification, a heteroaryl is optionally substituted, for example, with halogen, amino, nitrile, nitro, hydroxyl, alkyl, alkenyl, alkynyl, haloalkyl, alkoxy, aryl, cycloalkyl, heterocyclylalkyl, heteroaryl, and the like. In some embodiments, a heteroaryl is optionally substituted with halogen, methyl, ethyl, —CN, —$CF_3$, —OH, —OMe, —$NH_2$, or —$NO_2$. In some embodiments, a heteroaryl is optionally substituted with halogen, methyl, ethyl, —CN, —$CF_3$, —OH, or —OMe. In some embodiments, the heteroaryl is optionally substituted with halogen.

II. Compounds

In one embodiment enhancers of pesticidal activity disclosed herein include those having the Formulas set forth below. In one embodiment, the present disclosure provides a method for inhibiting apyrase, comprising contacting the apyrase with a compound of Formula (I)

(I)

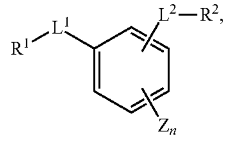

wherein $L^1$ is selected from —C(O)N($R^a$)— and —N($R^a$)C(O)—;

$L^2$ is selected from —$S(O)_2N(R^a)$— and —N($R^a$)S(O)$_2$—;

wherein $R^1$ is selected from $C_{1-6}$ alkyl optionally substituted with one or more $R^a$ and $R^b$, aryl optionally substituted with one or more $R^3$, aralkyl optionally substituted with one or more $R^3$, heterocyclyl optionally substituted with one or more $R^d$ and heteroaryl optionally substituted with one or more $R^3$;

$R^2$ is selected from $C_{1-6}$ alkyl aryl and heteroaryl, each optionally substituted with one or more $R^a$ and $R^b$;

$R^3$ is independently selected from $R^a$, $R^b$, —$OR^a$ substituted with one or more of the same or different $R^a$ or $R^b$, or —$(CH_2)_m$—$R^b$, —$(CHR^a)_m$—$R^b$, —O—$(CH_2)_m$—$R^b$, —S—$(CH_2)_m$—$R^b$, —O—$CHR^aR^b$, —O—$CR^a(R^b)_2$, —O—$(CHR^a)_m$—$R^b$, —O—$(CH_2)_m$—CH$[(CH_2)_mR^b]R^b$, —S—$(CHR^a)_m$—$R^b$, —C(O)NH—$(CH_2)_m$—$R^b$, —C(O)NH—$(CHR^a)_m$—$R^b$, —O—$(CH_2)_m$—C(O)NH—$(CH_2)_m$—$R^b$;

each $R^a$ is independently selected from the group consisting of hydrogen, $C_{1-6}$ alkyl, $C_{1-6}$ haloalkyl, $C_{3-8}$ cycloalkyl, $C_{6-10}$ aryl, $C_{5-10}$ heteroaryl, $C_{6-16}$ arylalkyl, 2-6 membered heteroalkyl and 3-8 membered heterocyclylalkyl, or $R^a$ together with the nitrogen and the $R^1$ or $R^2$ attached thereto forms a heterocyclyl optionally substituted with one or more $R^d$, or forms a heteroaryl optionally substituted with one or more $R^3$ Z is selected from halogen, $C_{1-6}$ alkyl, —$OR^a$, and $C_{1-6}$ haloalkyl;

$R^b$ is independently selected from the group consisting of =O, —$OR^d$, halogen, $C_{1-3}$ haloalkyloxy, —$OCF_3$, =S, —$SR^d$, =$NR^d$, =$NOR^d$, —$NR^cR^c$, —SF5, halogen, —$CF_3$, —CN, —$NO_2$, —$S(O)R^d$, —$S(O)_2R^d$, —$S(O)_2OR^d$, —$S(O)NR^cR^c$, —$S(O)_2NR^cR^c$, —OS(O)$R^d$, —$OS(O)_2R^d$, —$OS(O)_2OR^d$, —$OS(O)_2NR^cR^c$, —$C(O)R^d$, —$C(O)OR^d$, —$C(O)NR^cR^c$, —$C(NH)NR^cR^c$, —$C(NR^a)NR^cR^c$, —$C(NOH)R^a$, —$C(NOH)NR^cR^c$, —$OC(O)R^d$, —$OC(O)OR^d$, —OC(O)$NR^cR^c$, —$OC(NH)NR^cR^c$, —$OC(NR^a)NR^cR^c$, —$[NHC(O)]_nR^d$, —$[NR^aC(O)]_nR^d$, —[NHC(O)$]_nOR^d$, —$[NR^aC(O)]_nOR^d$, —$[NHC(O)]_nNR^cR^c$, —$[NR^aC(O)]_nNR^cR^c$, —$[NHC(NH)]_nNR^cR^c$ and —$[NR^aC(NR^a)]_nNR^cR^c$;

each $R^c$ is independently $R^a$, or, alternatively, two $R^c$ are taken together with the nitrogen atom to which they are bonded to form a 5 to 10-membered heterocyclylalkyl or heteroaryl which may optionally include one or more of the same or different additional heteroatoms and which may optionally be substituted with one or more of the same or different $R^c$ groups;

each $R^d$ is independently hydrogen or $C_{1-6}$ alkyl;

each $R^c$ is independently halogen, $C_{1-6}$ alkyl or —C(O)$R^d$;

each m is independently an integer from 1 to 3; and each n is independently an integer from 0 to 3; provided that the compound does not have the formula

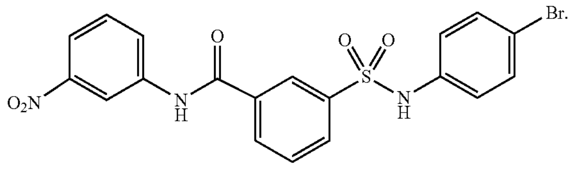 [SMILES: O=C(Nc1cccc([N+](=O)[O-])c1)c1cccc(S(=O)(=O)Nc2ccc(Br)cc2)c1]

In one embodiment, enhancer compounds of Formula (I)

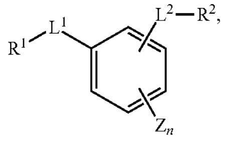

(I)

are those wherein:

$L^1$ is selected from —$C(O)N(R^a)$— and —$N(R^a)C(O)$—;

$L^2$ is selected from —$S(O)_2N(R^a)$— and —$N(R^a)S(O)_2$—;

$R^1$ is selected from $C_{1-6}$ alkyl optionally substituted with one or more $R^a$ and $R^b$, aryl optionally substituted with one or more $R^3$, aralkyl optionally substituted with one or more $R^3$, heterocyclyl optionally substituted with one or more $R^d$ and heteroaryl optionally substituted with one or more $R^3$.

$R^2$ is selected from $C_{1-6}$ alkyl, aryl and heteroaryl, each optionally substituted with one or more R and $R^b$;

Z is selected from halogen, $C_{1-6}$ alkyl, —$OR^a$, and $C_{1-6}$ haloalkyl;

$R^3$ is independently selected from $R^a$, $R^b$, —$OR^a$ substituted with one or more of the same or different $R^a$ or $R^b$, or —$(CH_2)_m$—$R^b$, —$(CHR^a)_m$—$R^b$, —O—$(CH_2)_m$—$R^b$, —S—$(CH_2)_m$—$R^b$, —O—$CHR^aR^b$, —O—$CR^a(R^b)_2$, —O—$(CHR^a)_m$—$R^b$, —O—$(CH_2)_m$—CH$[(CH_2)_mR^b]R^b$, —S—$(CHR^a)_m$—$R^b$, —C(O)NH—$(CH_2)_m$—$R^b$, —C(O)NH—$(CHR^a)_m$—$R^b$, —O—$(CH_2)_m$—C(O)NH—$(CH_2)_m$—$R^b$;

each $R^a$ is independently selected from the group consisting of hydrogen, $C_{1-6}$ alkyl, $C_1$_6 haloalkyl, $C_{3-8}$ cycloalkyl, $C_{6-10}$ aryl, $C_{5-10}$ heteroaryl, $C_{6-16}$ arylalkyl, 2-6 membered heteroalkyl and 3-8 membered heterocyclylalkyl;

$R^b$ is independently selected from the group consisting of =O, —$OR^d$, halogen, $C_{1-3}$ haloalkyloxy, —$OCF_3$, =S, —$SR^d$, =$NR^d$, =$NOR^d$, —$NR^cR^c$, —SF5, halogen, —$CF_3$, —CN, —$NO_2$, —$S(O)R^d$, —$S(O)_2R^d$, —$S(O)_2OR^d$, —$S(O)NR^cR^c$, —$S(O)_2NR^cR^c$, —OS(O)$R^d$, —$OS(O)_2R^d$, —$OS(O)_2OR^d$, —$OS(O)_2NR^cR^c$, —$C(O)R^d$, —$C(O)OR^d$, —$C(O)NR^cR^c$, —C(NH)$NR^cR^c$, —$C(NR^a)NR^cR^c$, —$C(NOH)R^a$, —C(NOH)$NR^cR^c$, —$OC(O)R^d$, —$OC(O)OR^d$, —$OC(O)NR^cR^c$, —$OC(NH)NR^cR^c$, —$OC(NR^a)NR^cR^c$, —$[NHC(O)]_nR^d$, —$[NR^aC(O)]_nR^d$, —$[NHC(O)]_nOR^d$, —$[NR^aC(O)]_nOR^d$, —$[NHC(O)]_nNR^cR^c$, —$[NR^aC(O)]_nNR^cR^c$, —[NHC(NH)$]_nNR^cR^c$ and —$[NR^aC(NR^a)]_nNR^cR^c$;

each $R^c$ is independently $R^a$, or, alternatively, two $R^c$ are taken together with the nitrogen atom to which they are bonded to form a 5 to 10-membered heterocyclylalkyl or heteroaryl which may optionally include one or more of the same or different additional heteroatoms and which may optionally be substituted with one or more of the same or different $R^c$ groups;

each $R^d$ is independently hydrogen or $C_{1-6}$ alkyl;

each $R^c$ is independently halogen, $C_{1-6}$ alkyl or —C(O)$R^d$;

each m is independently an integer from 1 to 3; and each n is independently an integer from 0 to 3; provided that the compound does not have the formula

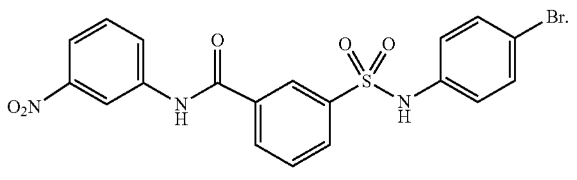 [SMILES: O=C(Nc1cccc([N+](=O)[O-])c1)c1cccc(S(=O)(=O)Nc2ccc(Br)cc2)c1]

In one embodiment of compounds having Formula (I), disclosed enhancers have Formula (Ia)

(Ia)

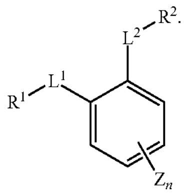

In one embodiment of compounds having Formula (I), disclosed enhancers have Formula (Ib)

(Ib)

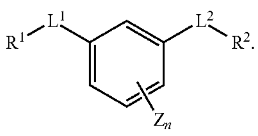

In one embodiment of compounds having Formula (I), disclosed enhancers have Formula (Ic)

(Ic)

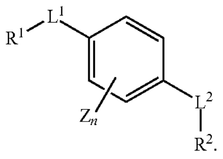

In certain embodiments of compounds according to Formulas (I), (Ia), (Ib) and (Ic) at least one of $R^1$ and $R^2$ is aryl, such as wherein $R^1$ is aryl, $R^2$ is aryl, or both $R^1$ and $R^2$ are aryl. In embodiments of compounds according to Formulas (I), (Ia), (Ib) and (Ic), $R^1$ is aryl, wherein $R^2$ is selected from $C_{1-6}$ alkyl, aryl and heteroaryl. In embodiments of compounds according to Formulas (I), (Ia), (Ib) and (Ic), $R^2$ is aryl, wherein $R^1$ is selected from $C_{1-6}$ alkyl optionally substituted with one or more $R^a$ and $R^b$, aryl optionally substituted with one or more $R^3$, aralkyl optionally substituted with one or more $R^3$, heterocyclyl optionally substituted with one or more $R^d$ and heteroaryl optionally substituted with one or more $R^3$. In certain embodiments of compounds according to Formulas (I), (Ia), (Ib) and (Ic), wherein $R^1$, $R^2$, or both are aryl, the aryl is substituted or unsubstituted. In certain embodiments of compounds according to Formulas (I), (Ia), (Ib) and (Ic), wherein $R^1$, $R^2$, or both are aryl, at least one aryl is substituted or unsubstituted phenyl.

In one embodiment of compounds according to Formulas (I), (Ia), (Ib) and (Ic) at least one of $R^1$ and $R^2$ is aryl or heteroaryl. In one embodiment of compounds according to Formulas (I), (Ia), (Ib) and (Ic) at one of $R^1$ and $R^2$ is aryl and the other of $R^1$ and $R^2$ is heteroaryl. In one embodiment wherein $Ar^1$ and $Ar^2$ are independently selected from aryl and heteroaryl each is optionally substituted with one or more $R^3$.

In one embodiment of compounds according to Formulas (I), (Ia), (Ib) and (Ic) at least one of $R^1$ and $R^2$ is heteroaryl, such as wherein $R^1$ is heteroaryl, $R^2$ is heteroaryl, or both $R^1$ and $R^2$ are heteroaryl. In certain embodiments of compounds according to Formulas (I), (Ia), (Ib) and (Ic), wherein $R^1$, $R^2$, or both are heteroaryl, the heteroaryl is substituted or unsubstituted with one or more $R^3$.

In one embodiment of compounds according to Formulas (I), (Ia), (Ib) and (Ic) at least one of $R^1$ and $R^2$ is substituted with one or more $R^3$. In one such embodiment, of compounds according to Formulas (I), (Ia), (Ib) and (Ic) at least one of $R^1$ and $R^2$ is substituted with one or more $R^3$.

In one embodiment of compounds disclosed herein, including compounds according to Formulas (I), (Ia), (Ib) and (Ic), at least one of $R^1$ and $R^2$ is substituted with one or more $R^3$ and each $R^3$ is independently selected from $R^a$, $R^b$, $—OR^a$ substituted with one or more of the same or different $R^a$ or $R^b$, or $—(CH_2)_m—R^b$, $—(CHR^a)_m—R^b$, $—O—(CH_2)_m—R^b$, $—S—(CH_2)_m—R^b$, $—O—CHR^aR^b$, $—O—CR^a(R^b)_2$, $—O—(CHR^a)_m—R^b$, $—O—(CH_2)_m—CH[(CH_2)_mR^b]R^b$, $—S—(CHR^a)_m—R^b$, $—C(O)NH—(CH_2)_m—R^b$, $—C(O)NH—(CHR^a)_m—R^b$, and $—O—(CH_2)_m—C(O)NH—(CH_2)_m—R^b$. In one embodiment of compounds disclosed herein, including compounds according to Formulas (I), (Ia), (Ib) and (Ic), at least one of $R^1$ and $R^2$ is substituted with one or more $R^3$ wherein at least one $R^3$ is halogen.

In one embodiment of compounds according to Formulas (I), (Ia), (Ib) and (Ic) an $R^a$ together with the nitrogen and the $R^1$ or $R^2$ attached thereto forms a heterocyclyl optionally substituted with one or more $R^d$, or forms a heteroaryl optionally substituted with one or more $R^3$.

In one such embodiment, $L^1$ and $R^1$ together form a group

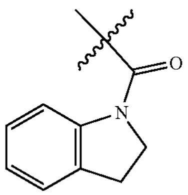

or

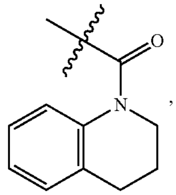

, each optionally substituted with one or more $R^3$.

In one embodiment, $L^2$ and $R^2$ together form a group

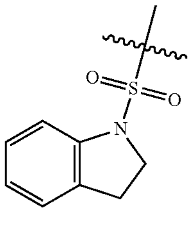

or

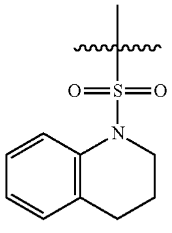

, each optionally substituted with one or more $R^3$. In another embodiment, $L^2$ and $R^2$ together form a group

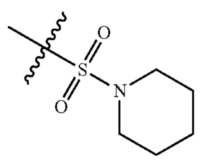 [SMILES: *S(=O)(=O)N1CCCCC1]

optionally substituted with one or more $R^d$.

In one embodiment of compounds disclosed herein according to Formulas (I) and (Ib), the compound has Formula (II)

(II)

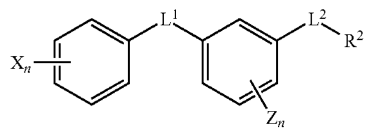

wherein X is selected from $C_{1-6}$ alkyl, —$OR^a$ substituted with one or more of the same or different $R^a$ or $R^b$, —$CF_2H$, —$CF_3$, —CN, —$NO_2$, and halogen, or two X substituents together with the atoms to which they are attached form a 5 to 8-membered aryl, cycloalkyl, heterocyclylalkyl or heteroaryl which may optionally include one or more of the same or different additional heteroatoms and which may optionally be substituted with one or more of the same or different $R^b$ groups.

In one embodiment of Formulas (I), (Ib) and (II), the compound has Formula (IIa)

(IIa)

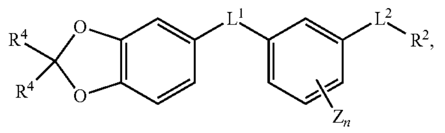

wherein $R^4$ is, for each occurrence, independently hydrogen, halogen, $C_{1-6}$ alkyl, or $C_{1-6}$ haloalkyl.

In one embodiment of Formulas (I), (Ib), (II) and (IIa), the compound has Formula (IIb)

(IIb)

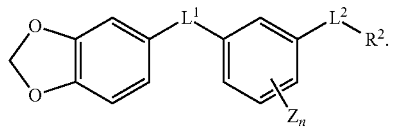

In one embodiment of Formulas (I), (Ib), (II) and (IIa), the compound has Formula (IIc)

(IIc)

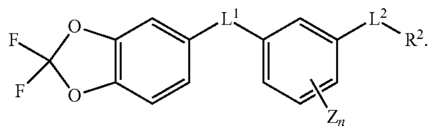

In one embodiment of compounds disclosed herein according to Formulas (I) (Ib) and (II), the compound has Formula (III)

(III)

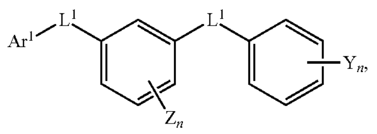

wherein Y is selected from $C_{1-6}$ alkyl, —$OR^a$, —$CF_2H$, —$CF_3$, —CN, —$NO_2$, and halogen, or two Y substituents together with the atoms to which they are attached form a 5 to 8-membered aryl, cycloalkyl, heterocyclylalkyl or heteroaryl which may optionally include one or more of the same or different additional heteroatoms and which may optionally be substituted with one or more of the same or different $R^b$ groups.

In one embodiment of Formulas (I), (Ib), (II) and (III), the compound has Formula (IIIa)

(IIIa)

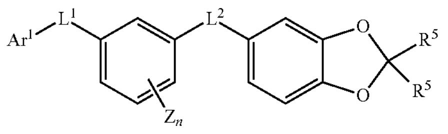

wherein $R^5$ is, for each occurrence, independently hydrogen, halogen, $C_{1-6}$ alkyl, or $C_{1-6}$ haloalkyl.

In one embodiment of Formulas (I), (Ib), (II), (III) and (IIIa), the compound has Formula (IIIb)

(IIIb)

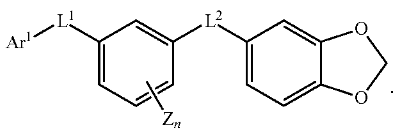

In one embodiment of Formulas (I), (Ib), (II), (III) and (IIIa), the compound has Formula (IIIc)

(IIIc)

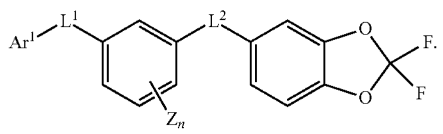

In one embodiment of Formulas (I), (Ia), (Ib), (Ic), (II), (IIa), (IIb), (IIc), (III), (IIIa), (IIIb) and (IIIc), $R^1$ is heteroaryl.

In one embodiment of Formulas (I), (Ia), (Ib), (Ic), (II), (IIa), (IIb), (IIc), (III), (IIIa), (IIIb) and (IIIc), $R^2$ is heteroaryl.

In one embodiment of Formulas (I), (Ib), (II), (IIa), (IIb), (IIc), (III), (IIIa), (IIIb) and (IIIc), the compound has Formula (IV)

(IV)

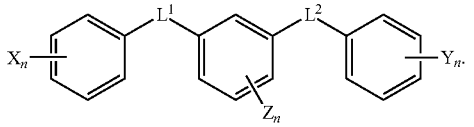

In one embodiment of Formulas (I), (Ib), (II), (IIa), (IIb), (IIc), (III), (IIIa), (IIIb), (IIIc) and (IV), the compound has Formula (IVa)

(IVa)

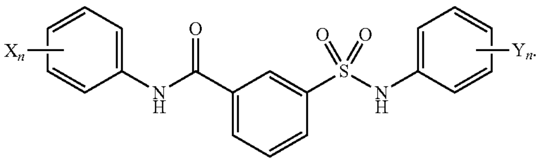

In one embodiment of Formulas (I), (Ib), (II), (IIa), (IIb), (IIc), (III), (IIIa), (IIIb), (IIIc) and (IV), the compound has Formula (IVb)

(IVb)

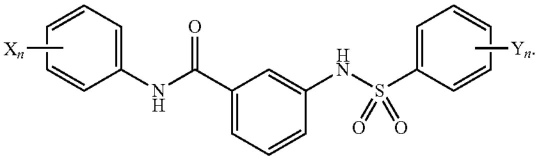

Specific examples of apyrase inhibitors according to the present disclosure, including compounds of Formulas (I), (Ia), (Ib), (Ic), (II), (IIa), (IIb), (IIc), (III), (IIIa), (IIIb), (IIIc), (IV), (IVa) and/or (IVb), for use to enhance the activity of an agricultural or horticultural pesticide as described herein, are illustrated below in Table 1:

TABLE 1

| ID | Structure | Name |
|---|---|---|
| I-1 | 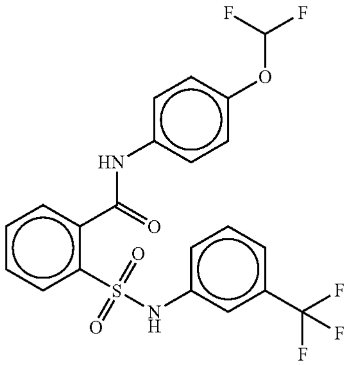 | N-(4-(difluoromethoxy)phenyl)-2-(N-(3-(trifluoromethyl)phenyl)sulfamoyl)benzamide |
| I-2 | 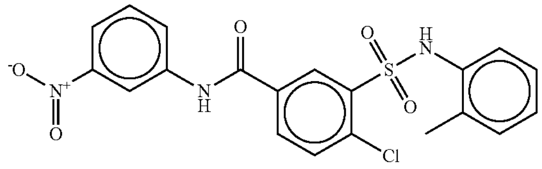 | 4-chloro-N-(3-nitrophenyl)-3-(N-(o-tolyl)sulfamoyl)benzamide |
| I-3 | 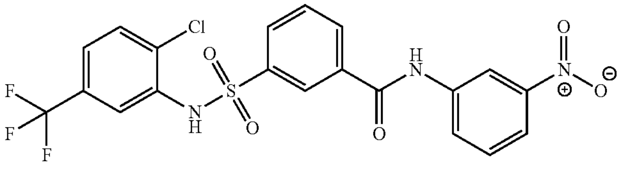 [SMILES: O=C(Nc1cccc([N+](=O)[O-])c1)c1cccc(S(=O)(=O)Nc2cc(C(F)(F)F)ccc2Cl)c1] | 3-(N-(2-chloro-5-(trifluoromethyl)phenyl)sulfamoyl)-N-(3-nitrophenyl)benzamide |
| I-4 | 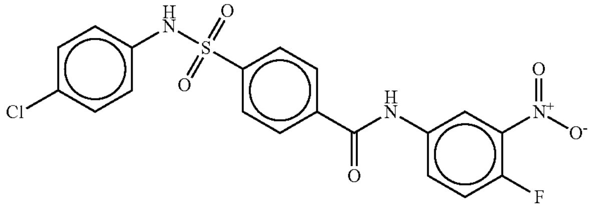 | 4-(N-(4-chlorophenyl)sulfamoyl)-N-(4-fluoro-3-nitrophenyl)benzamide |

TABLE 1-continued

| ID | Structure | Name |
|---|---|---|
| I-5 | 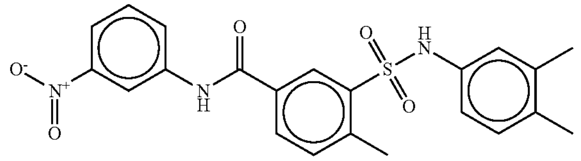 | 3-(N-(3,4-dimethylphenyl)sulfamoyl)-4-methyl-N-(3-nitrophenyl)benzamide |
| I-6 | 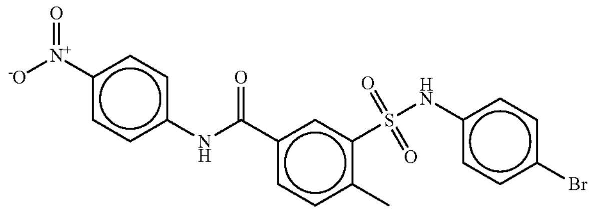 | 3-(N-(4-bromophenyl)sulfamoyl)-4-methyl-N-(4-nitrophenyl)benzamide |
| I-7 | 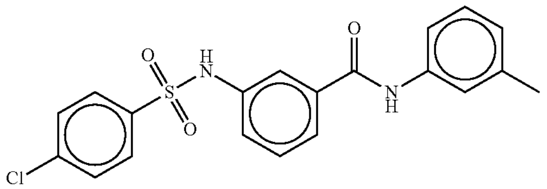 | 3-((4-chlorophenyl)sulfonamido)-N-(m-tolyl)benzamide |
| I-8 | 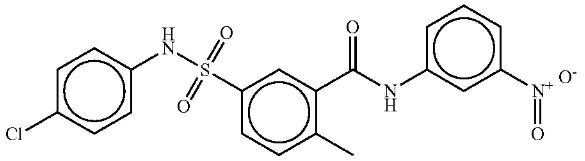 | 2-chloro-5-(N-(4-chlorophenyl)sulfamoyl)-N-(3-nitrophenyl)benzamide |
| I-9 | 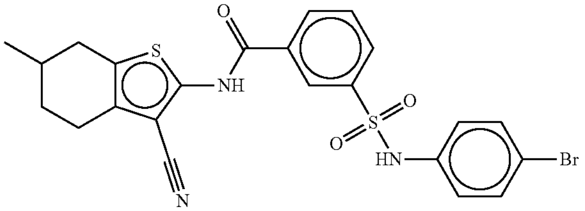 | 3-(N-(4-bromophenyl)sulfamoyl)-N-(3-cyano-6-methyl-4,5,6,7-tetrahydrobenzo[b]thiophen-2-yl)benzamide |
| I-10 | 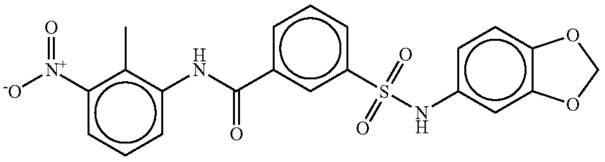 | 3-(N-(benzo[d][1,3]dioxol-5-yl)sulfamoyl)-N-(2-methyl-3-nitrophenyl)benzamide |
| I-11 | 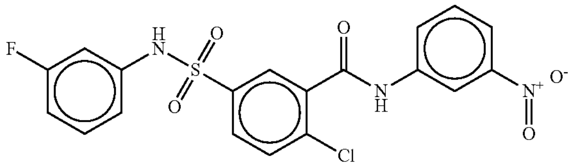 | 2-chloro-5-(N-(3-fluorophenyl)sulfamoyl)-N-(3-nitrophenyl)benzamide |
| I-12 | 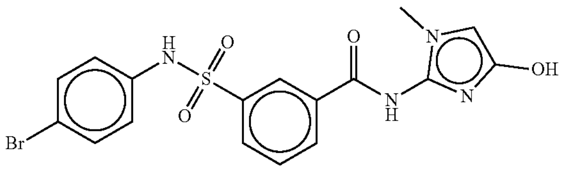 | 3-(N-(4-bromophenyl)sulfamoyl)-N-(4-hydroxy-1-methyl-1H-imidazol-2-yl)benzamide |

TABLE 1-continued

| ID | Structure | Name |
|---|---|---|
| I-13 | 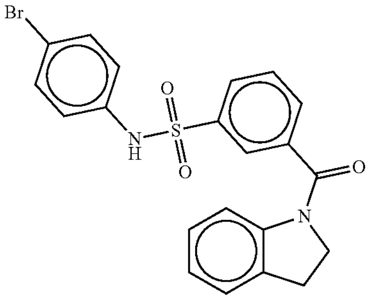 | N-(4-bromophenyl)-3-(indoline-1-carbonyl)benzenesulfonamide |
| I-14 | 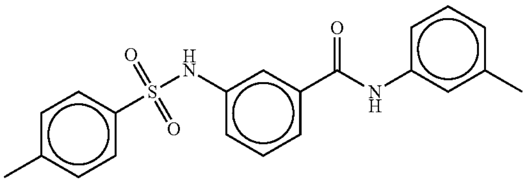 | 3-((4-methylphenyl)sulfonamido)-N-(m-tolyl)benzamide |
| I-15 | 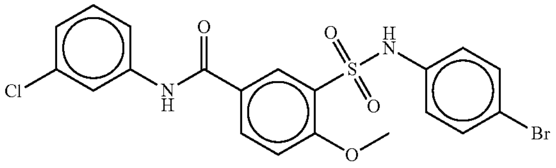 | 3-(N-(4-bromophenyl)sulfamoyl)-N-(3-chlorophenyl)-4-methoxybenzamide |
| I-16 | 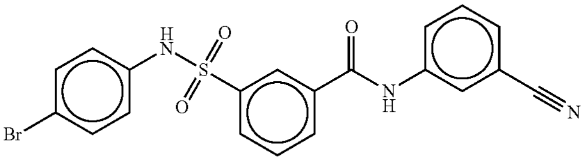 | 3-(N-(4-bromophenyl)sulfamoyl)-N-(3-cyanophenyl)benzamide |
| I-17 | 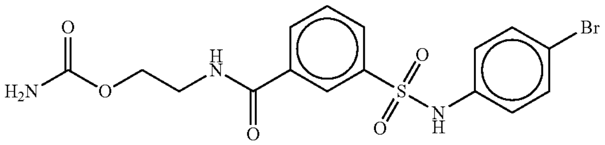 | 2-(3-(N-(4-bromophenyl)sulfamoyl)benzamido)ethyl carbamate |
| I-18 | 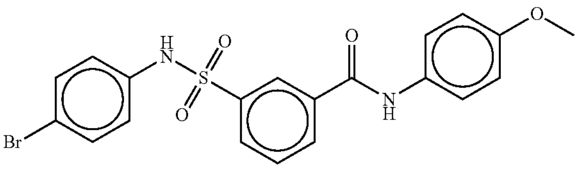 | 3-(N-(4-bromophenyl)sulfamoyl)-N-(4-methoxyphenyl)benzamide |
| I-19 | 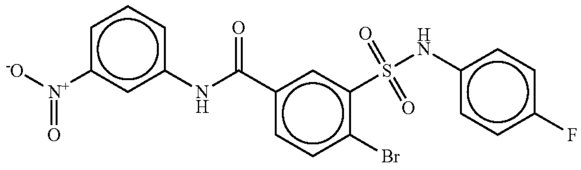 | 4-bromo-3-(N-(4-fluorophenyl)sulfamoyl)-N-(3-nitrophenyl)benzamide |
| I-20 | 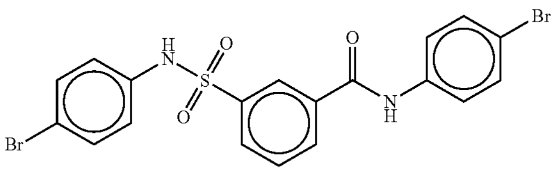 | N-(4-bromophenyl)-3-(N-(4-bromophenyl)sulfamoyl)benzamide |

TABLE 1-continued

| ID | Structure | Name |
| --- | --- | --- |
| I-21 | 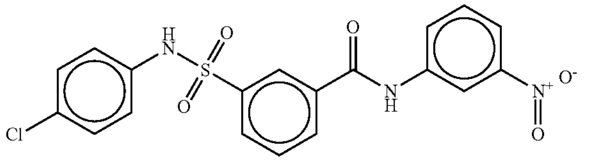 | 3-(N-(4-chlorophenyl)sulfamoyl)-N-(3-nitrophenyl)benzamide |
| I-22 | 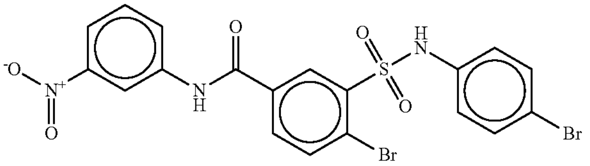 | 4-bromo-3-(N-(4-bromophenyl)sulfamoyl)-N-(3-nitrophenyl)benzamide |
| I-23 | 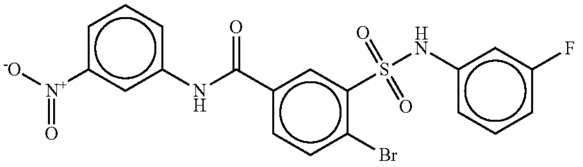 | 4-bromo-3-(N-(3-fluorophenyl)sulfamoyl)-N-(3-nitrophenyl)benzamide |
| I-24 | 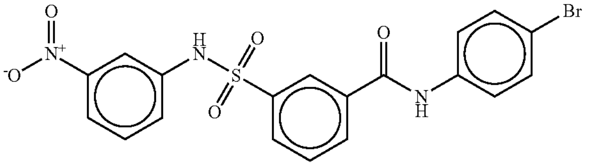 | N-(4-bromophenyl)-3-(N-(3-nitrophenyl)sulfamoyl)benzamide |
| I-25 | 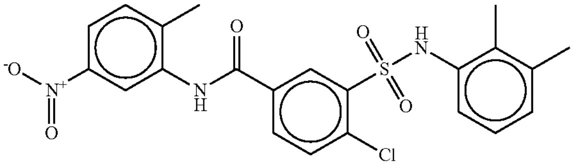 | 4-chloro-3-(N-(2,3-dimethylphenyl)sulfamoyl)-N-(2-methyl-5-nitrophenyl)benzamide |
| I-26 | 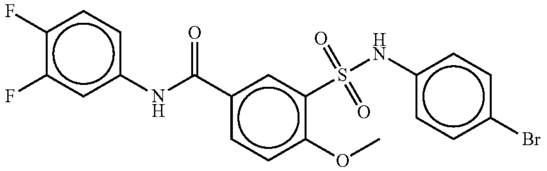 | 3-(N-(4-bromophenyl)sulfamoyl)-N-(3,4-difluorophenyl)-4-methoxybenzamide |
| I-27 | 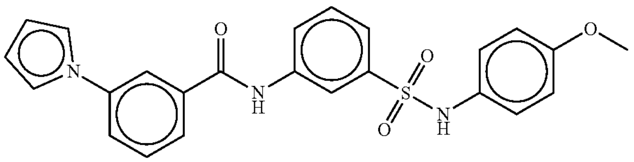 | N-(3-(N-(4-methoxyphenyl)sulfamoyl)phenyl)-3-(1H-pyrrol-1-yl)benzamide |
| I-28 | 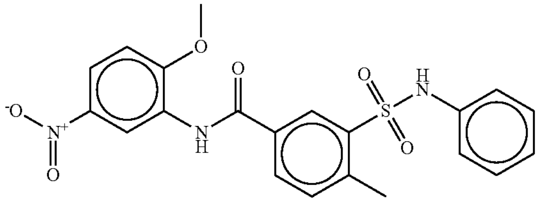 | N-(2-methoxy-5-nitrophenyl)-4-methyl-3-(N-phenylsulfamoyl)benzamide |

TABLE 1-continued

| ID | Structure | Name |
| --- | --- | --- |
| I-29 | 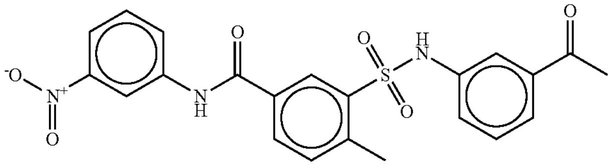 | 3-(N-(3-acetylphenyl)sulfamoyl)-4-methyl-N-(3-nitrophenyl)benzamide |
| I-30 | 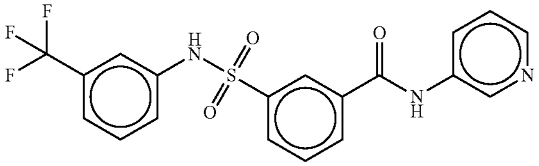 | N-(pyridin-3-yl)-3-(N-(3-(trifluoromethyl)phenyl)sulfamoyl)benzamide |
| I-31 | 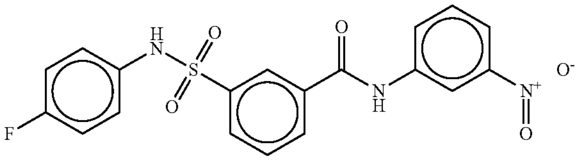 | 3-(N-(4-fluorophenyl)sulfamoyl)-N-(3-nitrophenyl)benzamide |
| I-32 | 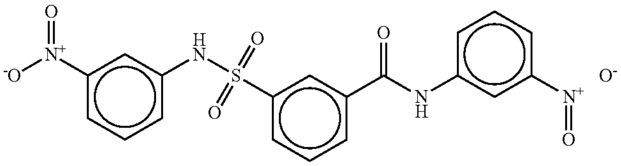 | N-(3-nitrophenyl)-3-(N-(3-nitrophenyl)sulfamoyl)benzamide |
| I-33 | 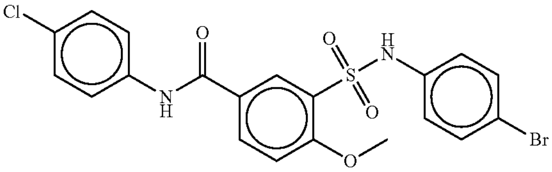 | 3-(N-(4-bromophenyl)sulfamoyl)-N-(4-chlorophenyl)-4-methoxybenzamide |
| I-34 | 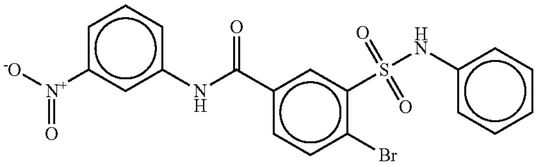 | 4-bromo-N-(3-nitrophenyl)-3-(N-phenylsulfamoyl)benzamide |
| I-35 | 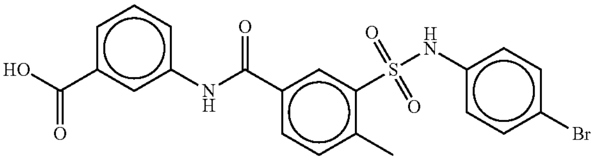 | 3-(3-(N-(4-bromophenyl)sulfamoyl)-4-methylbenzamido)benzoic acid |
| I-36 | 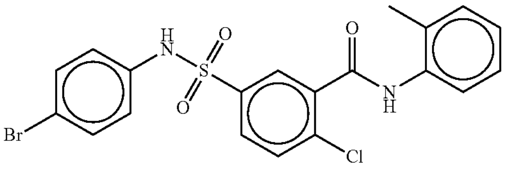 | 5-(N-(4-bromophenyl)sulfamoyl)-2-chloro-N-(o-tolyl)benzamide |

TABLE 1-continued

| ID | Structure | Name |
| --- | --- | --- |
| I-38 | 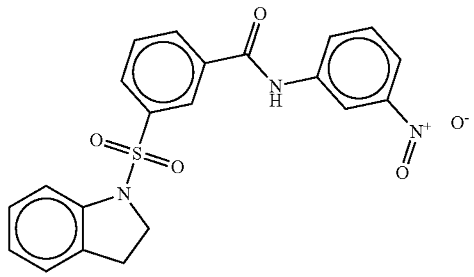 | 3-(indolin-1-ylsulfonyl)-N-(3-nitrophenyl)benzamide |
| I-39 | 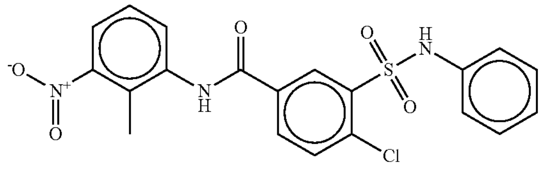 | 4-chloro-N-(2-methyl-3-nitrophenyl)-3-(N-phenylsulfamoyl)benzamide |
| I-40 | 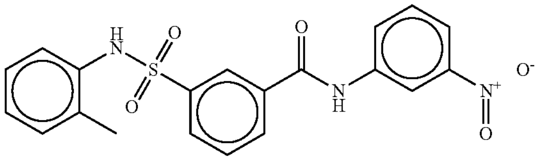 | N-(3-nitrophenyl)-3-(N-(o-tolyl)sulfamoyl)benzamide |
| I-41 | 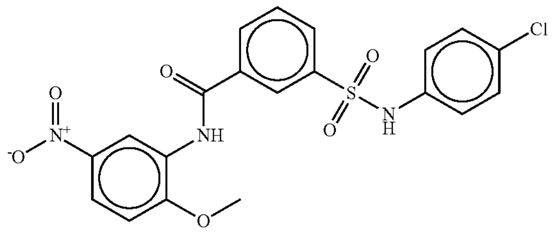 | 3-(N-(4-chlorophenyl)sulfamoyl)-N-(2-methoxy-5-nitrophenyl)benzamide |
| I-42 | 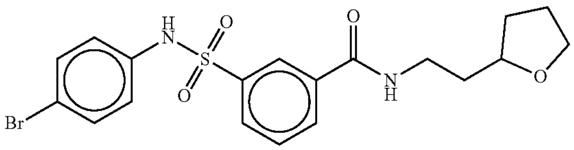 | 3-(N-(4-bromophenyl)sulfamoyl)-N-(2-(tetrahydrofuran-2-yl)ethyl)benzamide |
| I-43 | 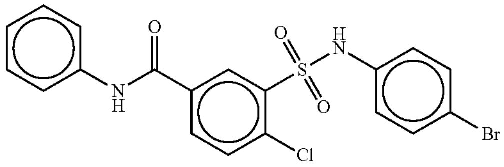 | 3-(N-(4-bromophenyl)sulfamoyl)-4-chloro-N-phenylbenzamide |
| I-44 | 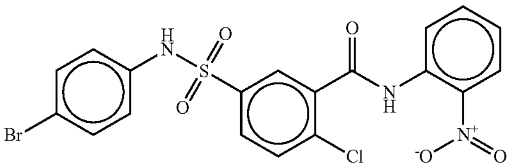 | 5-(N-(4-bromophenyl)sulfamoyl)-2-chloro-N-(2-nitrophenyl)benzamide |
| I-45 | 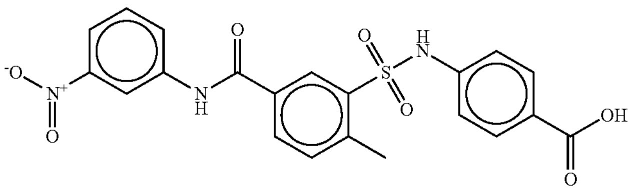 | 4-((2-methyl-5-((3-nitrophenyl)carbamoyl)phenyl)sulfonamido)benzoic acid |

TABLE 1-continued

| ID | Structure | Name |
|---|---|---|
| I-46 | 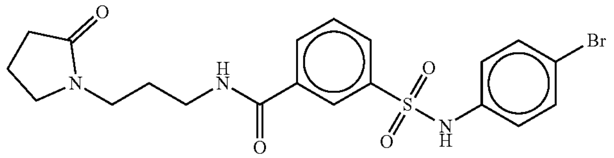 | 3-(N-(4-bromophenyl)sulfamoyl)-N-(3-(2-oxopyrrolidin-1-yl)propyl)benzamide |
| I-47 | 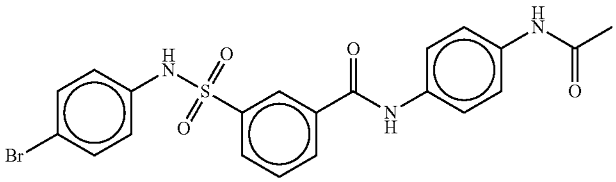 | N-(4-acetamidophenyl)-3-(N-(4-bromophenyl)sulfamoyl)benzamide |
| I-48 | 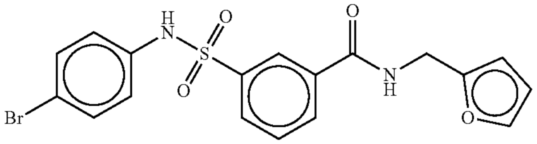 | 3-(N-(4-bromophenyl)sulfamoyl)-N-(furan-2-ylmethyl)benzamide |
| I-49 | 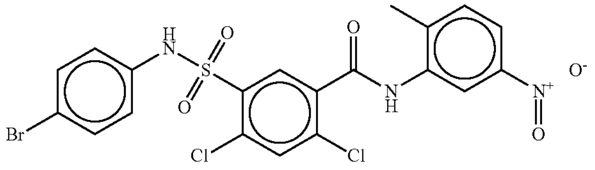 | 5-(N-(4-bromophenyl)sulfamoyl)-2,4-dichloro-N-(2-methyl-5-nitrophenyl)benzamide |
| I-50 | 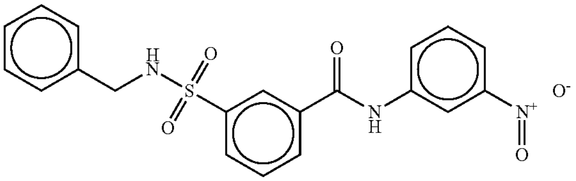 | 3-(N-benzylsulfamoyl)-N-(3-nitrophenyl)benzamide |
| I-51 | 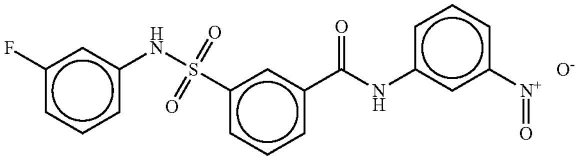 | 3-(N-(3-fluorophenyl)sulfamoyl)-N-(3-nitrophenyl)benzamide |
| I-52 | 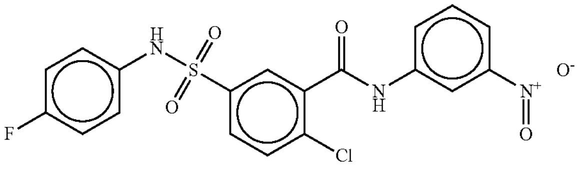 | 2-chloro-5-(N-(4-fluorophenyl)sulfamoyl)-N-(3-nitrophenyl)benzamide |
| I-53 | 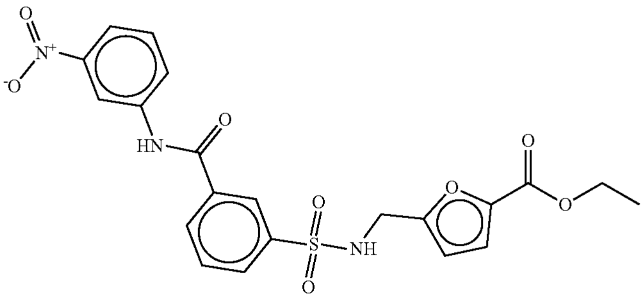 | ethyl 5-(((3-((3-nitrophenyl)carbamoyl)phenyl)sulfonamido)methyl)furan-2-carboxylate |

TABLE 1-continued
| ID | Structure | Name |
|---|---|---|
| I-54 | 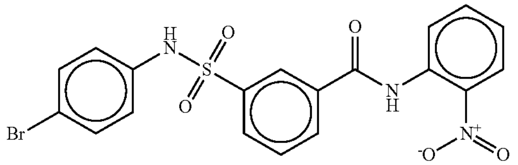 | 3-(N-(4-bromophenyl)sulfamoyl)-N-(2-nitrophenyl)benzamide |
| I-55 | 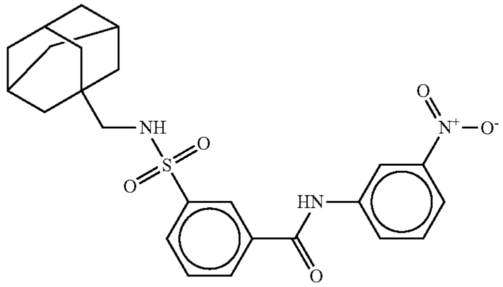 | 3-(N-(adamantan-1-ylmethyl)sulfamoyl)-N-(3-nitrophenyl)benzamide |
| I-56 | 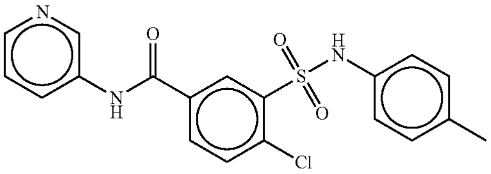 | 4-chloro-N-(pyridin-3-yl)-3-(N-(p-tolyl)sulfamoyl)benzamide |
| I-57 | 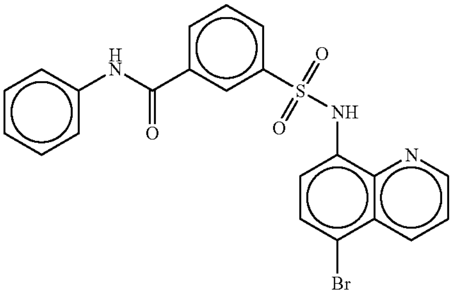 | 3-(N-(5-bromoquinolin-8-yl)sulfamoyl)-N-phenylbenzamide |
| I-58 | 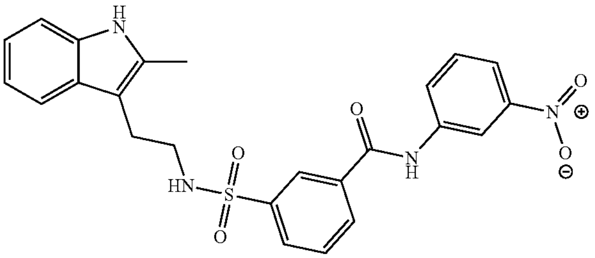 | 3-(N-(2-(2-methyl-1H-indol-3-yl)ethyl)sulfamoyl)-N-(3-nitrophenyl)benzamide |
| I-59 | 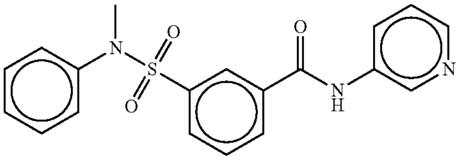 | 3-(N-methyl-N-phenylsulfamoyl)-N-(pyridin-3-yl)benzamide |

TABLE 1-continued

| ID | Structure | Name |
|---|---|---|
| I-60 | 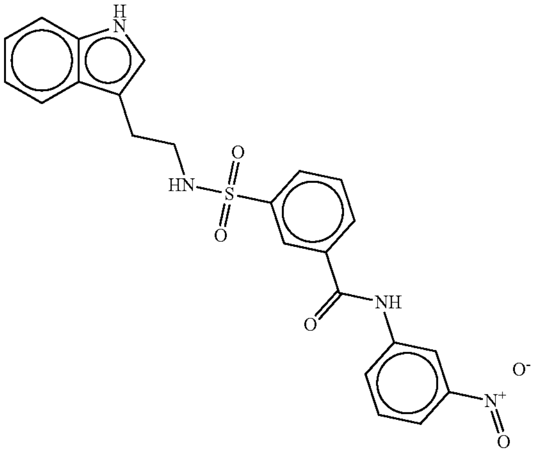 | 3-(N-(2-(1H-indol-3-yl)ethyl)sulfamoyl)-N-(3-nitrophenyl)benzamide |
| I-61 | 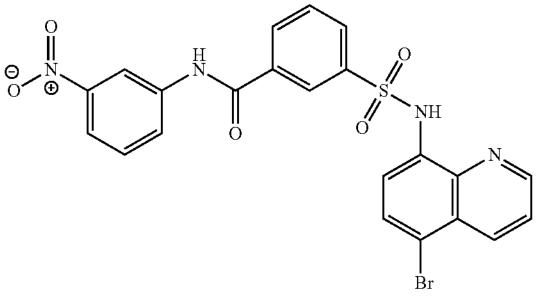 [SMILES: O=C(Nc1cccc([N+](=O)[O-])c1)c1cccc(S(=O)(=O)Nc2ccc(Br)c3cccnc23)c1] | 3-(N-(5-bromoquinolin-8-yl)sulfamoyl)-N-(3-nitrophenyl)benzamide |
| I-62 | 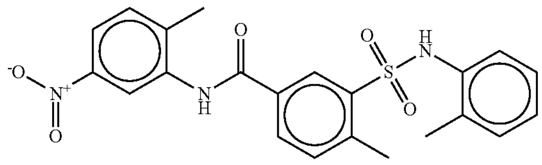 | 4-methyl-N-(2-methyl-5-nitrophenyl)-3-(N-(o-tolyl)sulfamoyl)benzamide |
| I-63 | 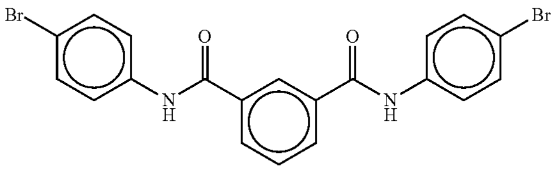 | N1,N3-bis(4-bromophenyl)isophthalamide |
| I-64 | 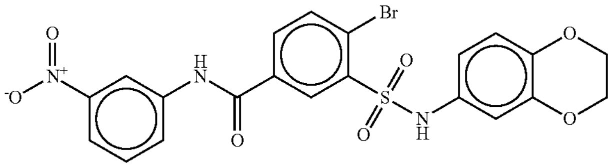 | 4-bromo-3-(N-(2,3-dihydrobenzo[b][1,4]dioxin-6-yl)sulfamoyl)-N-(3-nitrophenyl)benzamide |
| I-65 | 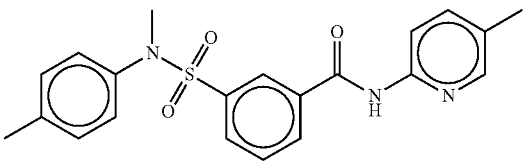 | 3-(N-methyl-N-(p-tolyl)sulfamoyl)-N-(5-methylpyridin-2-yl)benzamide |

TABLE 1-continued

| ID | Structure | Name |
|---|---|---|
| I-66 | 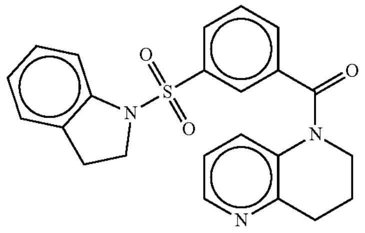 | (3,4-dihydro-1,5-naphthyridin-1(2H)-yl)(3-(indolin-1-ylsulfonyl)phenyl)methanone |
| I-67 | 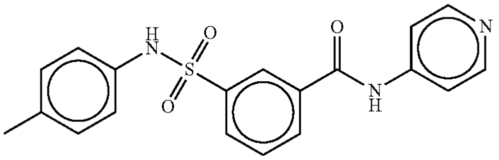 | N-(pyridin-4-yl)-3-(N-(p-tolyl)sulfamoyl)benzamide |
| I-68 | 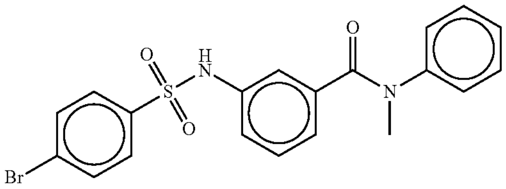 | 3-((4-bromophenyl)sulfonamido)-N-methyl-N-phenylbenzamide |
| I-69 | 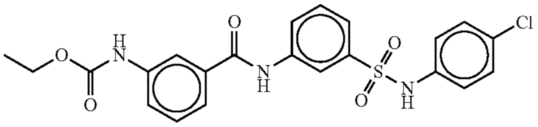 | ethyl (3-((3-(N-(4-chlorophenyl)sulfamoyl)phenyl)carbamoyl) phenyl)carbamate |
| I-70 | 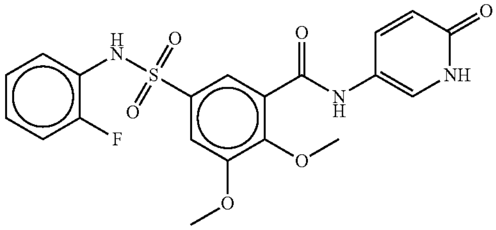 | 5-(N-(2-fluorophenyl)sulfamoyl)-2,3-dimethoxy-N-(6-oxo-1,6-dihydropyridin-3-yl)benzamide |
| I-71 | 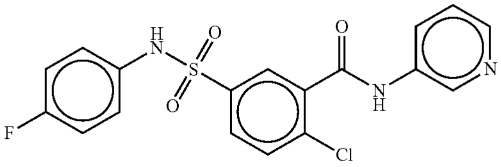 | 2-chloro-5-(N-(4-fluorophenyl)sulfamoyl)-N-(pyridin-3-yl)benzamide |
| I-72 | 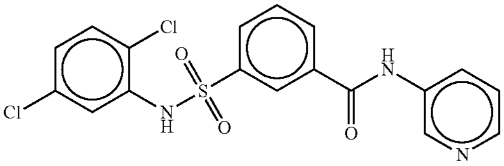 | 3-(N-(2,5-dichlorophenyl)sulfamoyl)-N-(pyridin-3-yl)benzamide |
| I-73 | 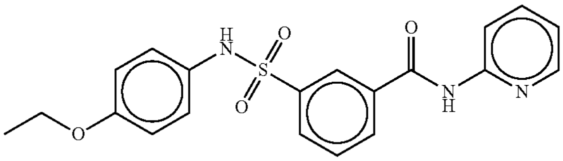 | 3-(N-(4-ethoxyphenyl)sulfamoyl)-N-(pyridin-2-yl)benzamide |

TABLE 1-continued

| ID | Structure | Name |
| --- | --- | --- |
| I-74 | 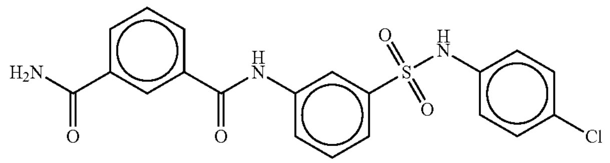 | N-(3-(N-(4-chlorophenyl)sulfamoyl)phenyl) isophthalamide |
| I-75 | 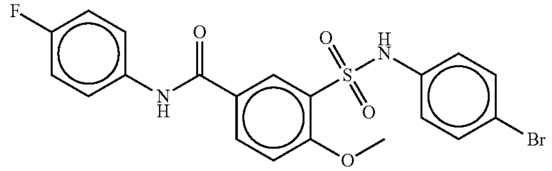 | 3-(N-(4-bromophenyl)sulfamoyl)-N-(4-fluorophenyl)-4-methoxybenzamide |
| I-76 | 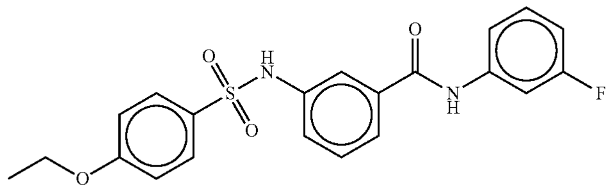 | 3-((4-ethoxyphenyl)sulfonamido)-N-(3-fluorophenyl)benzamide |
| I-77 | 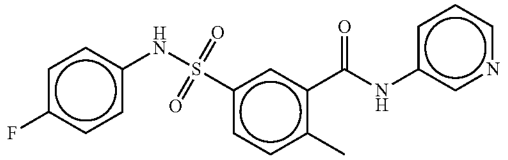 | 5-(N-(4-fluorophenyl)sulfamoyl)-2-methyl-N-(pyridin-3-yl)benzamide |
| I-78 | 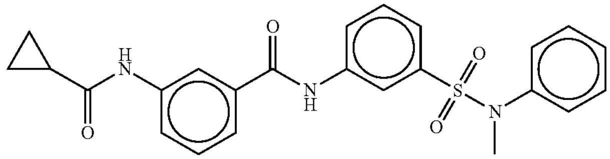 | 3-(cyclopropanecarboxamido)-N-(3-(N-methyl-N-phenylsulfamoyl)phenyl)benzamide |
| I-79 | 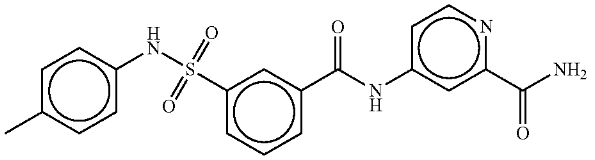 | 4-(3-(N-(p-tolyl)sulfamoyl)benzamido)picolinamide |
| I-80 | 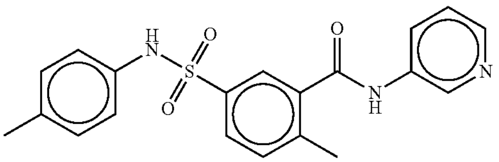 | 2-methyl-N-(pyridin-3-yl)-5-(N-(p-tolyl)sulfamoyl)benzamide |
| I-81 | 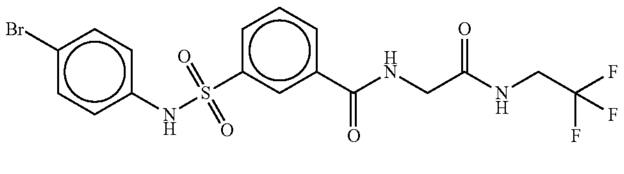 | 3-(N-(4-bromophenyl)sulfamoyl)-N-(2-oxo-2-((2,2,2-trifluoroethyl)amino)ethyl)benzamide |

TABLE 1-continued

| ID | Structure | Name |
| --- | --- | --- |
| I-82 | 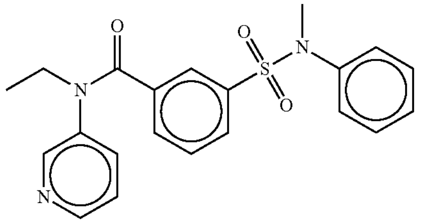 | N-ethyl-3-(N-methyl-N-phenylsulfamoyl)-N-(pyridin-3-yl)benzamide |
| I-83 | 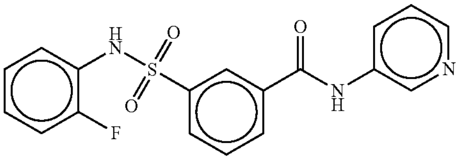 | 3-(N-(2-fluorophenyl)sulfamoyl)-N-(pyridin-3-yl)benzamide |
| I-84 | 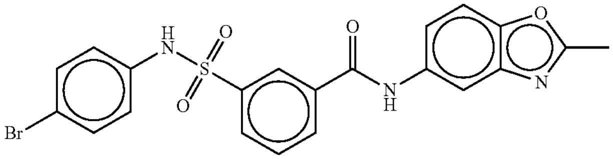 | 3-(N-(4-bromophenyl)sulfamoyl)-N-(2-methylbenzo[d]oxazol-5-yl)benzamide |
| I-85 | 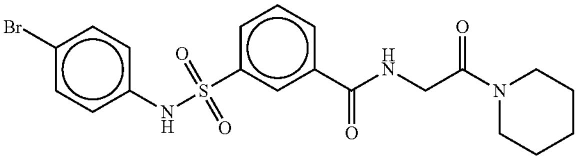 | 3-(N-(4-bromophenyl)sulfamoyl)-N-(2-oxo-2-(piperidin-1-yl)ethyl)benzamide |
| I-86 | 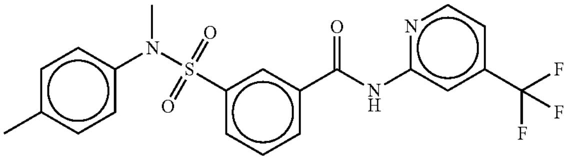 | 3-(N-methyl-N-(p-tolyl)sulfamoyl)-N-(4-(trifluoromethyl)pyridin-2-yl)benzamide |
| I-87 | 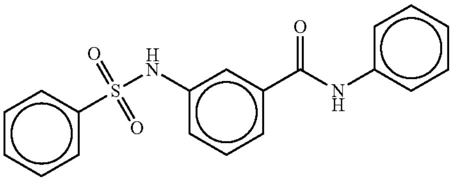 | N-phenyl-3-(phenylsulfonamido)benzamide |
| I-88 | 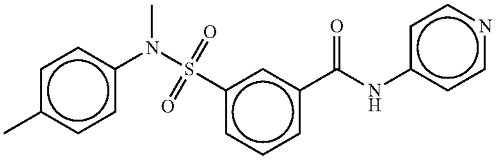 | 3-(N-methyl-N-(p-tolyl)sulfamoyl)-N-(pyridin-4-yl)benzamide |
| I-89 | 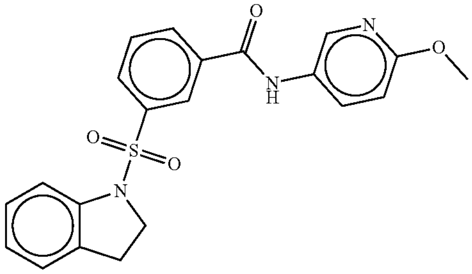 | 3-(indolin-1-ylsulfonyl)-N-(6-methoxypyridin-3-yl)benzamide |

TABLE 1-continued

| ID | Structure | Name |
|---|---|---|
| I-90 | 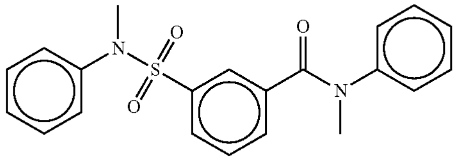 | N-methyl-3-(N-methyl-N-phenylsulfamoyl)-N-phenylbenzamide |
| I-91 | 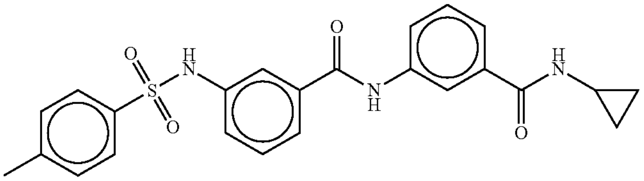 | N-cyclopropyl-3-(3-((4-methylphenyl)sulfonamido)benzamido) benzamide |
| I-92 | 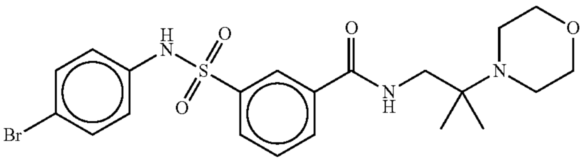 | 3-(N-(4-bromophenyl)sulfamoyl)-N-(2-methyl-2-morpholinopropyl)benzamide |
| I-93 | 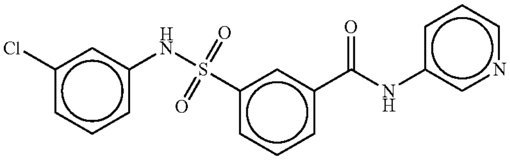 | 3-(N-(3-chlorophenyl)sulfamoyl)-N-(pyridin-3-yl)benzamide |
| I-94 | 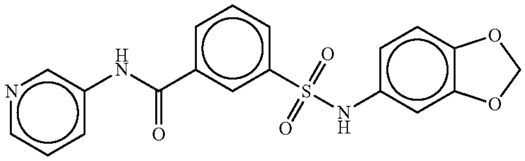 | 3-(N-(benzo[d][1,3]dioxol-5-yl)sulfamoyl)-N-(pyridin-3-yl)benzamide |
| I-95 | 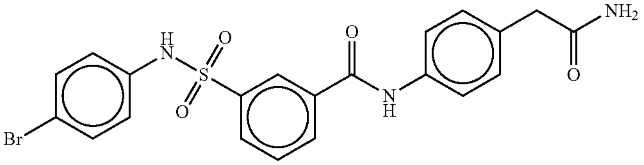 | N-(4-(2-amino-2-oxoethyl)phenyl)-3-(N-(4-bromophenyl)sulfamoyl)benzamide |
| I-96 | 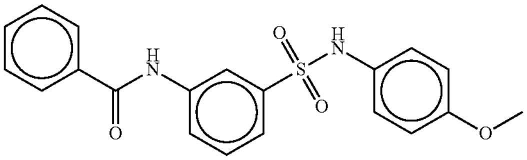 | N-(3-(N-(4-methoxyphenyl)sulfamoyl)phenyl)benzamide |
| I-97 | 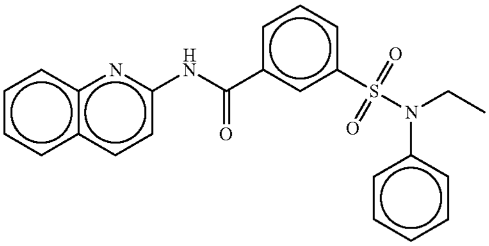 | 3-(N-ethyl-N-phenylsulfamoyl)-N-(quinolin-2-yl)benzamide |

TABLE 1-continued

| ID | Structure | Name |
| --- | --- | --- |
| I-98 | 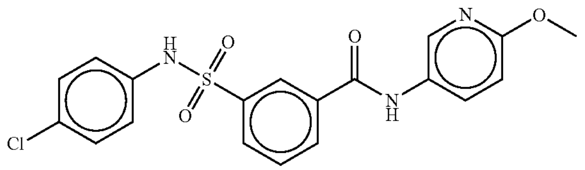 | 3-(N-(4-chlorophenyl)sulfamoyl)-N-(6-methoxypyridin-3-yl)benzamide |
| I-99 | 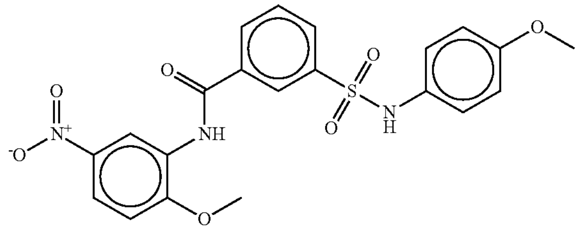 | N-(2-methoxy-5-nitrophenyl)-3-(N-(4-methoxyphenyl)sulfamoyl)benzamide |
| I-100 | 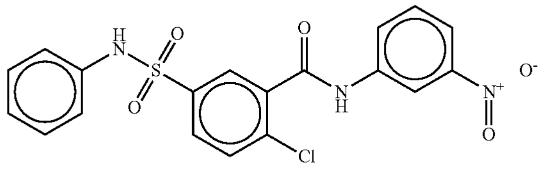 | 2-chloro-N-(3-nitrophenyl)-5-(N-phenylsulfamoyl)benzamide |
| I-101 | 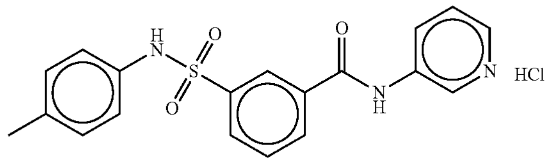 | N-(pyridin-3-yl)-3-(N-(p-tolyl)sulfamoyl)benzamide hydrochloride |
| I-102 | 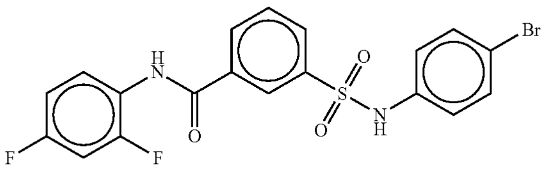 | 3-(N-(4-bromophenyl)sulfamoyl)-N-(2,4-difluorophenyl)benzamide |
| I-103 | 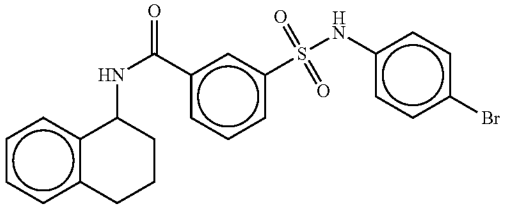 | 3-(N-(4-bromophenyl)sulfamoyl)-N-(1,2,3,4-tetrahydronaphthalen-1-yl)benzamide |
| I-104 | 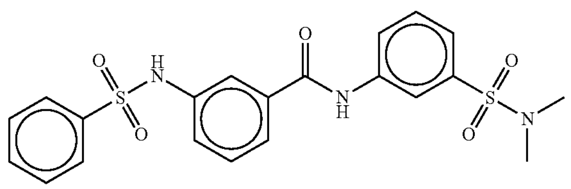 | N-(3-(N,N-dimethylsulfamoyl)phenyl)-3-(phenylsulfonamido)benzamide |
| I-105 | 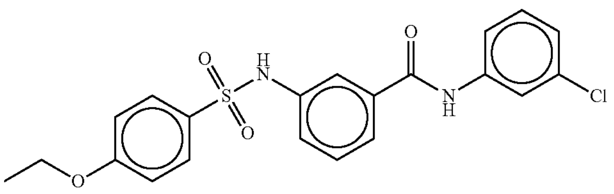 | N-(3-chlorophenyl)-3-((4-ethoxyphenyl)sulfonamido)benzamide |

TABLE 1-continued

| ID | Structure | Name |
|---|---|---|
| I-106 | 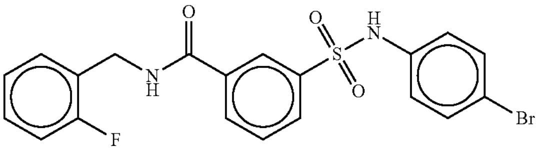 | 3-(N-(4-bromophenyl)sulfamoyl)-N-(2-fluorobenzyl)benzamide |
| I-107 | 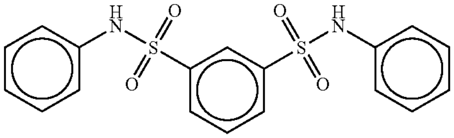 | $N^1$,$N^3$-diphenylbenzene-1,3-disulfonamide |
| I-108 | 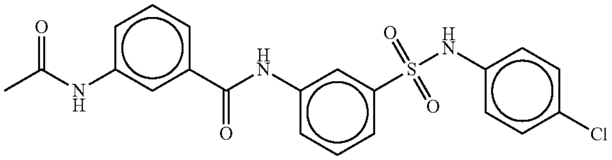 | 3-acetamido-N-(3-(N-(4-chlorophenyl)sulfamoyl)phenyl)benzamide |
| I-109 | 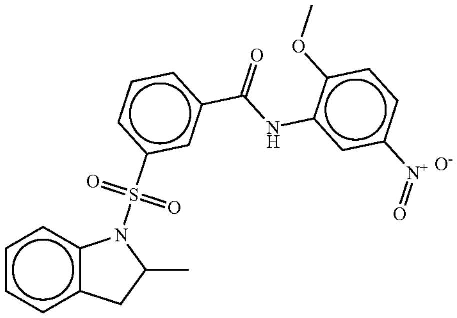 | N-(2-methoxy-5-nitrophenyl)-3-((2-methylindolin-1-yl)sulfonyl)benzamide |
| I-110 | 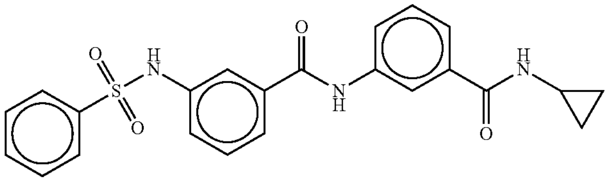 | N-cyclopropyl-3-(3-(phenylsulfonamido)benzamido)benzamide |
| I-111 | 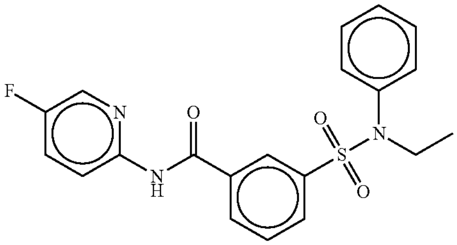 | 3-(N-ethyl-N-phenylsulfamoyl)-N-(5-fluoropyridin-2-yl)benzamide |
| I-112 | 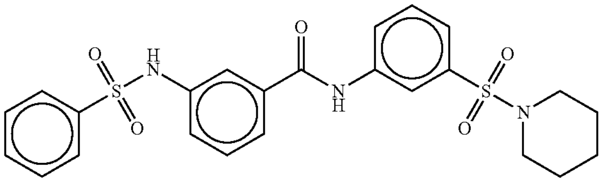 | 3-(phenylsulfonamido)-N-(3-(piperidin-1-ylsulfonyl)phenyl)benzamide |
| I-113 | 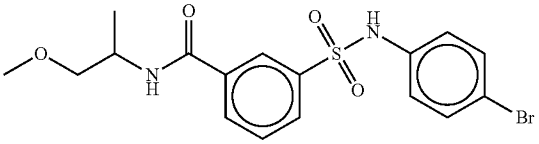 | 3-(N-(4-bromophenyl)sulfamoyl)-N-(1-methoxypropan-2-yl)benzamide |

TABLE 1-continued

| ID | Structure | Name |
|---|---|---|
| I-114 | 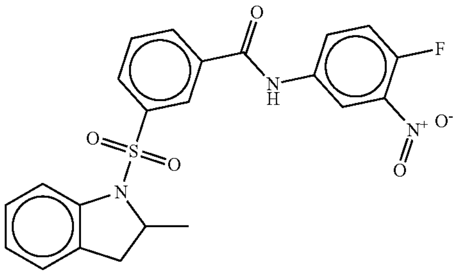 | N-(4-fluoro-3-nitrophenyl)-3-((2-methylindolin-1-yl)sulfonyl)benzamide |
| I-115 | 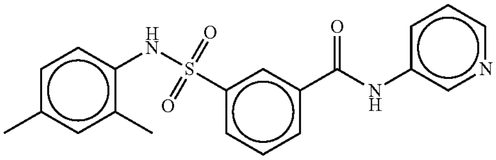 | 3-(N-(2,4-dimethylphenyl)sulfamoyl)-N-(pyridin-3-yl)benzamide |
| I-116 | 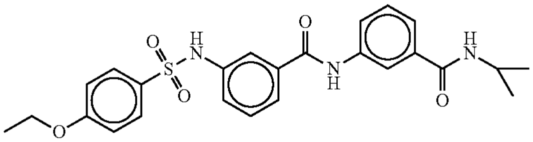 | N-cyclopropyl-3-(3-((4-ethoxyphenyl)sulfonamido)benzamido)benzamide |
| I-117 | 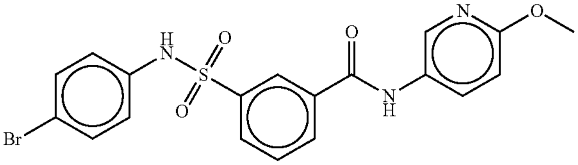 | 3-(N-(4-bromophenyl)sulfamoyl)-N-(6-methoxypyridin-3-yl)benzamide |
| I-118 | 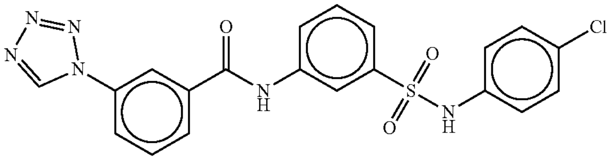 | N-(3-(N-(4-chlorophenyl)sulfamoyl)phenyl)-3-(1H-tetrazol-1-yl)benzamide |
| I-119 | 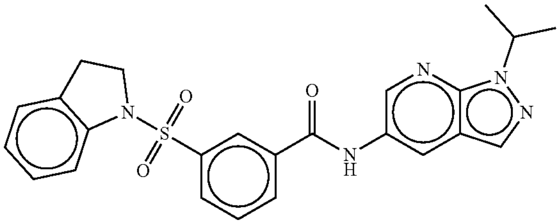 | 3-(indolin-1-ylsulfonyl)-N-(1-isopropyl-1H-pyrazolo[3,4-b]pyridin-5-yl)benzamide |
| I-120 | 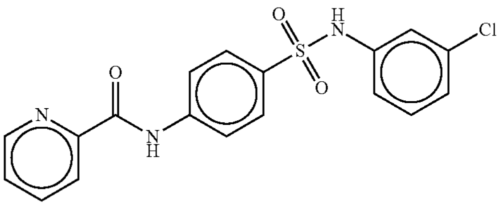 | N-(4-(N-(3-chlorophenyl)sulfamoyl)phenyl)picolinamide |
| I-121 | 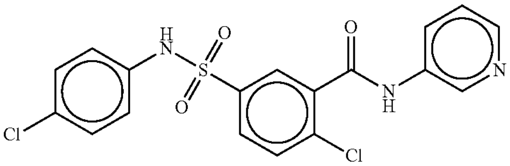 | 2-chloro-5-(N-(4-chlorophenyl)sulfamoyl)-N-(pyridin-3-yl)benzamide |

TABLE 1-continued

| ID | Structure | Name |
|---|---|---|
| I-122 | 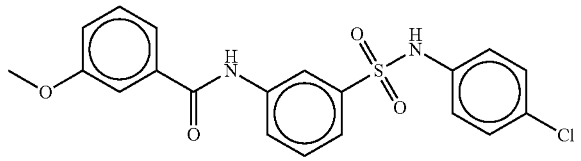 | N-(3-(N-(4-chlorophenyl)sulfamoyl)phenyl)-3-methoxybenzamide |
| I-123 | 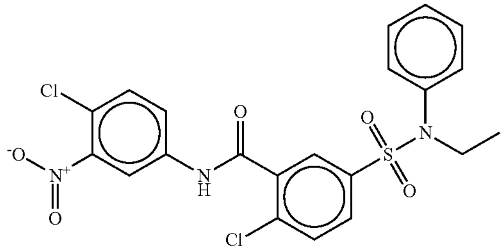 | 2-chloro-N-(4-chloro-3-nitrophenyl)-5-(N-ethyl-N-phenylsulfamoyl)benzamide |
| I-124 | 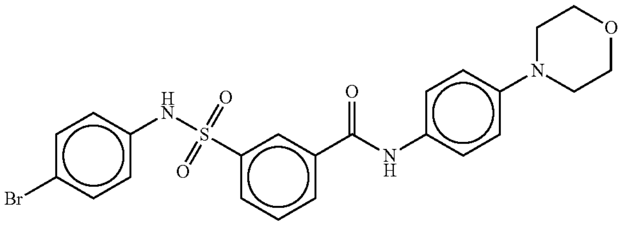 | 3-(N-(4-bromophenyl)sulfamoyl)-N-(4-morpholinophenyl)benzamide |
| I-125 | 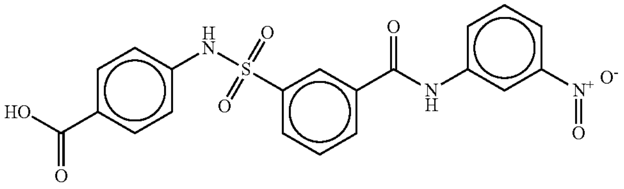 | 4-((3-((3-nitrophenyl)carbamoyl)phenyl)sulfonamido)benzoic acid |
| I-126 | 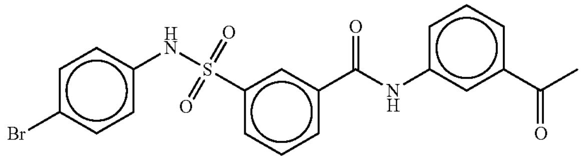 | N-(3-acetylphenyl)-3-(N-(4-bromophenyl)sulfamoyl)benzamide |
| I-127 | 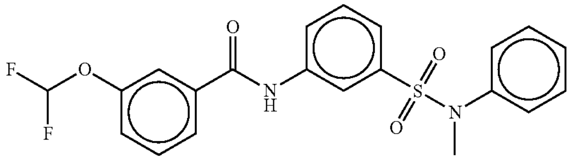 | 3-(difluoromethoxy)-N-(3-(N-methyl-N-phenylsulfamoyl)phenyl)benzamide |
| I-128 | 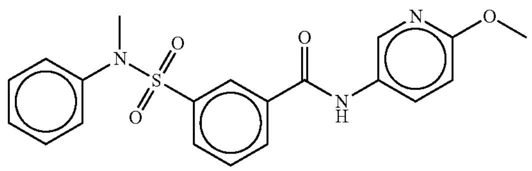 | N-(6-methoxypyridin-3-yl)-3-(N-methyl-N-phenylsulfamoyl)benzamide |
| I-129 | 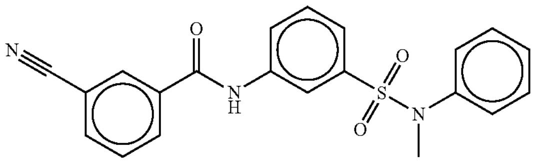 | 3-cyano-N-(3-(N-methyl-N-phenylsulfamoyl)phenyl)benzamide |

TABLE 1-continued

| ID | Structure | Name |
| --- | --- | --- |
| I-130 | 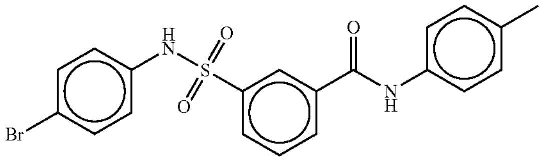 | 3-(N-(4-bromophenyl)sulfamoyl)-N-(p-tolyl)benzamide |
| I-131 | 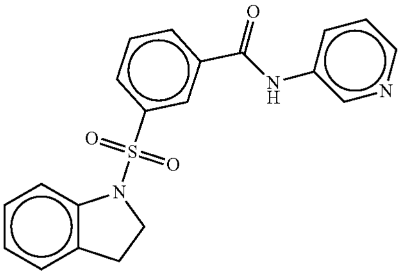 | 3-(indolin-1-ylsulfonyl)-N-(pyridin-3-yl)benzamide |
| I-132 | 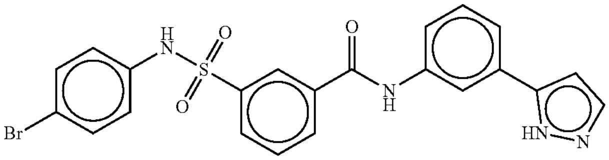 | N-(3-(1H-pyrazol-5-yl)phenyl)-3-(N-(4-bromophenyl)sulfamoyl)benzamide |
| I-133 | 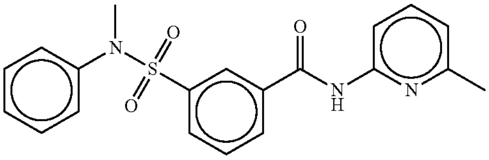 | 3-(N-methyl-N-phenylsulfamoyl)-N-(6-methylpyridin-2-yl)benzamide |
| I-134 | 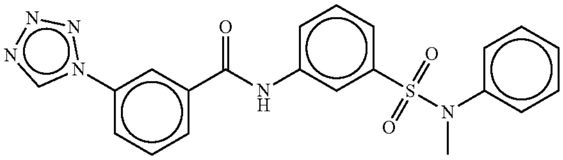 | N-(3-(N-methyl-N-phenylsulfamoyl)phenyl)-3-(1H-tetrazol-1-yl)benzamide |
| I-135 | 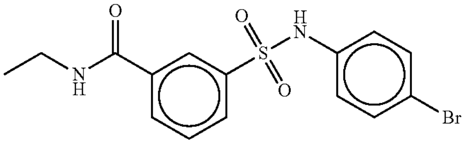 | 3-(N-(4-bromophenyl)sulfamoyl)-N-ethylbenzamide |
| I-136 | 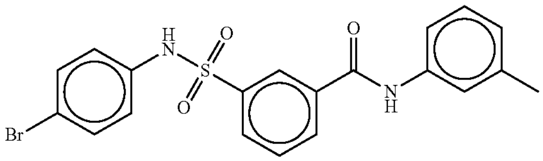 | 3-(N-(4-bromophenyl)sulfamoyl)-N-(m-tolyl)benzamide |
| I-137 | 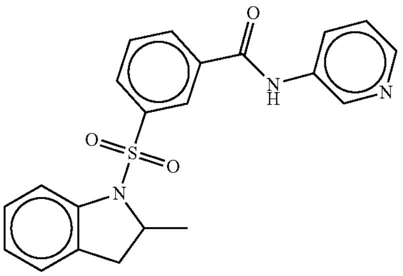 | 3-((2-methylindolin-1-yl)sulfonyl)-N-(pyridin-3-yl)benzamide |

TABLE 1-continued

| ID | Structure | Name |
| --- | --- | --- |
| I-138 | 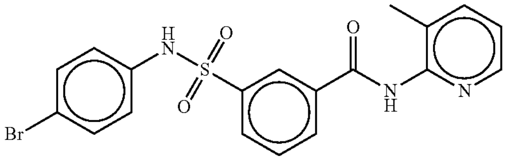 | 3-(N-(4-bromophenyl)sulfamoyl)-N-(3-methylpyridin-2-yl)benzamide |
| I-139 | 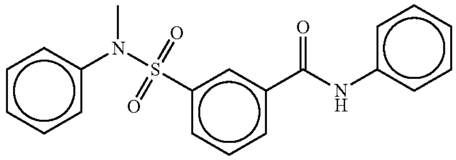 | 3-(N-methyl-N-phenylsulfamoyl)-N-phenylbenzamide |
| I-140 | 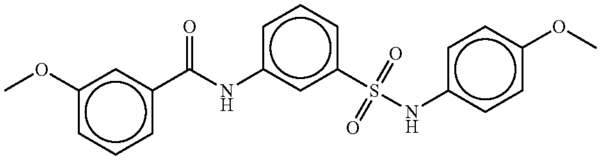 | 3-methoxy-N-(3-(N-(4-methoxyphenyl)sulfamoyl)phenyl)benzamide |
| I-141 | 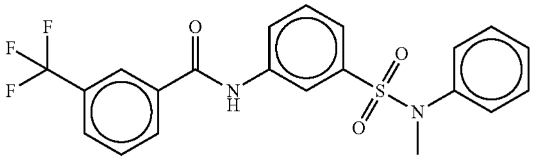 | N-(3-(N-methyl-N-phenylsulfamoyl)phenyl)-3-(trifluoromethyl)benzamide |
| I-142 | 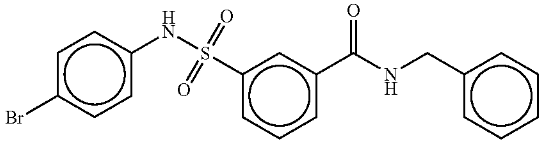 | N-benzyl-3-(N-(4-bromophenyl)sulfamoyl)benzamide |
| I-143 | 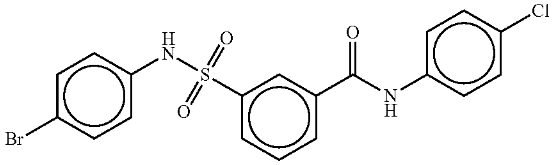 | 3-(N-(4-bromophenyl)sulfamoyl)-N-(4-chlorophenyl)benzamide |
| I-144 | 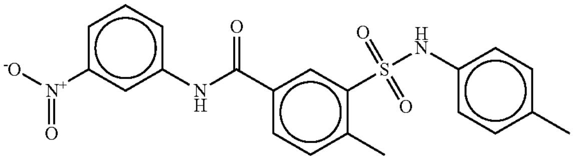 | 4-methyl-N-(3-nitrophenyl)-3-(N-(p-tolyl)sulfamoyl)benzamide |
| I-145 | 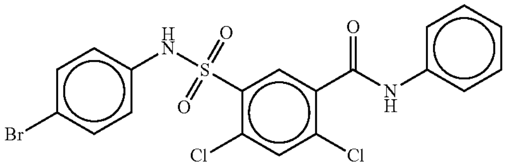 | 5-(N-(4-bromophenyl)sulfamoyl)-2,4-dichloro-N-phenylbenzamide |
| I-146 | 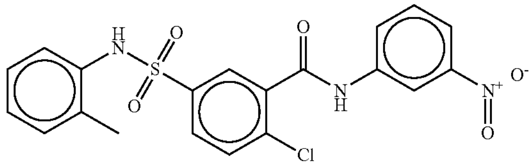 | 2-chloro-N-(3-nitrophenyl)-5-(N-(o-tolyl)sulfamoyl)benzamide |

TABLE 1-continued

| ID | Structure | Name |
| --- | --- | --- |
| I-147 | 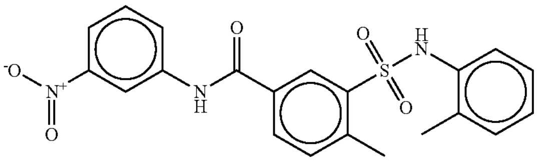 | 4-methyl-N-(3-nitrophenyl)-3-(N-(o-tolyl)sulfamoyl)benzamide |
| I-148 | 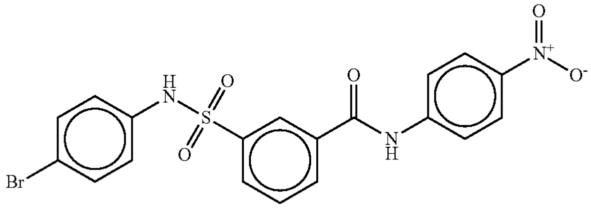 | 3-(N-(4-bromophenyl)sulfamoyl)-N-(4-nitrophenyl)benzamide |
| I-149 | 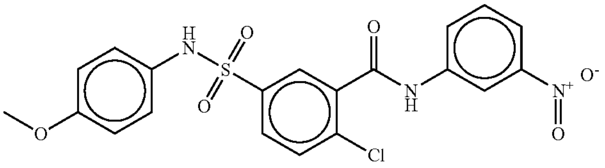 | 2-chloro-5-(N-(4-methoxyphenyl)sulfamoyl)-N-(3-nitrophenyl)benzamide |
| I-150 | 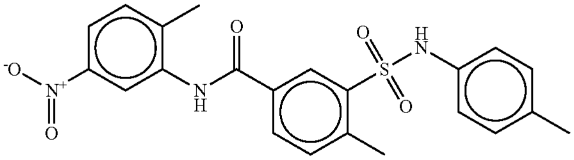 | 4-methyl-N-(2-methyl-5-nitrophenyl)-3-(N-(p-tolyl)sulfamoyl)benzamide |
| I-151 | 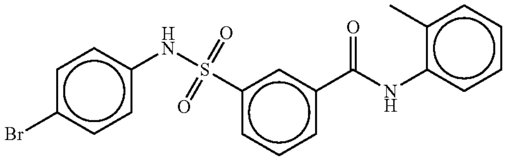 | 3-(N-(4-bromophenyl)sulfamoyl)-N-(o-tolyl)benzamide |
| I-152 | 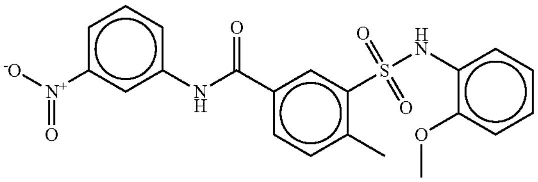 | 3-(N-(2-methoxyphenyl)sulfamoyl)-4-methyl-N-(3-nitrophenyl)benzamide |
| I-153 | 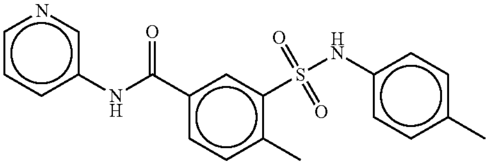 | 4-methyl-N-(pyridin-3-yl)-3-(N-(p-tolyl)sulfamoyl)benzamide |
| I-154 | 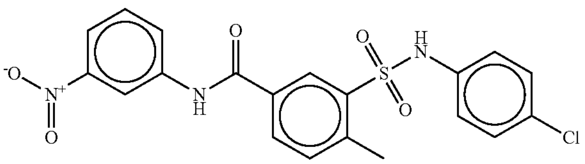 | 3-(N-(4-chlorophenyl)sulfamoyl)-4-methyl-N-(3-nitrophenyl)benzamide |

TABLE 1-continued

| ID | Structure | Name |
|---|---|---|
| I-155 | 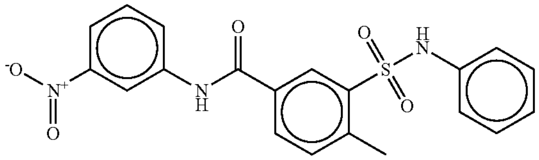 | 4-methyl-N-(3-nitrophenyl)-3-(N-phenylsulfamoyl)benzamide |
| I-156 | 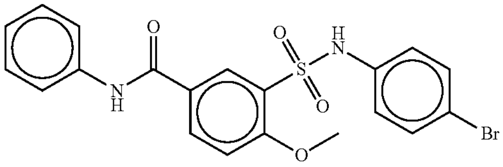 | 3-(N-(4-bromophenyl)sulfamoyl)-4-methoxy-N-phenylbenzamide |
| I-157 | 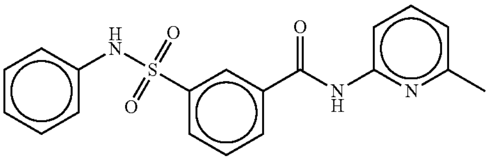 | N-(6-methylpyridin-2-yl)-3-(N-phenylsulfamoyl)benzamide |
| I-158 | 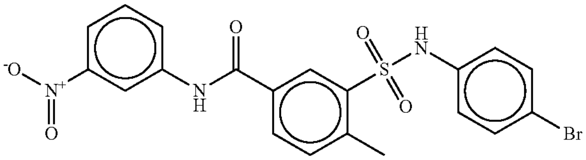 | 3-(N-(4-bromophenyl)sulfamoyl)-4-methyl-N-(3-nitrophenyl)benzamide |
| I-159 | 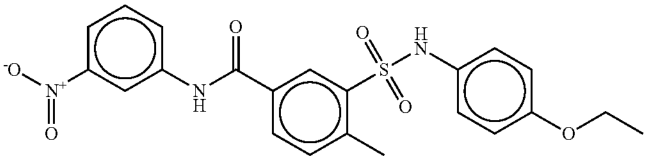 | 3-(N-(4-ethoxyphenyl)sulfamoyl)-4-methyl-N-(3-nitrophenyl)benzamide |
| I-160 | 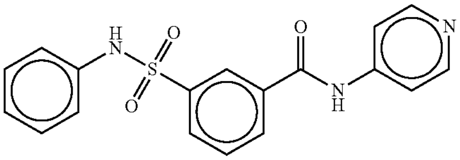 | 3-(N-phenylsulfamoyl)-N-(pyridin-4-yl)benzamide |
| I-161 | 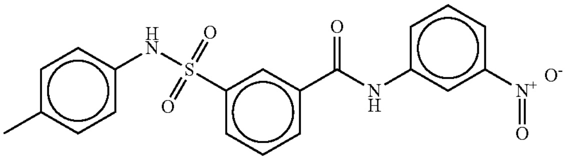 | N-(3-nitrophenyl)-3-(N-(p-tolyl)sulfamoyl)benzamide |
| I-162 | 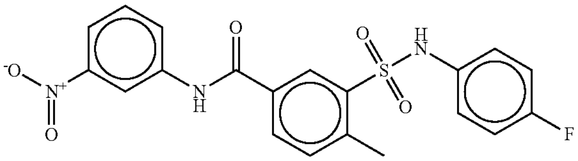 | 3-(N-(3-fluorophenyl)sulfamoyl)-4-methyl-N-(3-nitrophenyl)benzamide |
| I-163 | 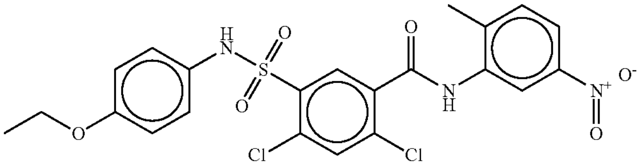 | 2,4-dichloro-5-(N-(4-ethoxyphenyl)sulfamoyl)-N-(2-methyl-5-nitrophenyl)benzamide |

TABLE 1-continued

| ID | Structure | Name |
| --- | --- | --- |
| I-164 | 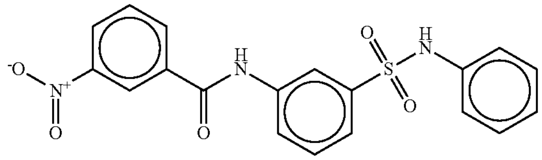 | 3-nitro-N-(3-(N-phenylsulfamoyl)phenyl)benzamide |
| I-165 | 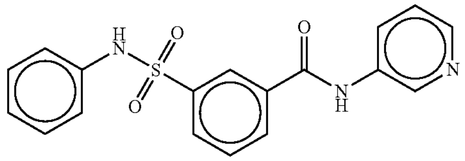 | 3-(N-phenylsulfamoyl)-N-(pyridin-3-yl)benzamide |
| I-166 | 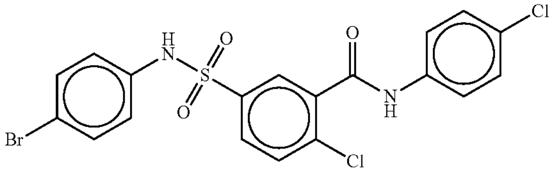 | 5-(N-(4-bromophenyl)sulfamoyl)-2-chloro-N-(4-chlorophenyl)benzamide |
| I-167 | 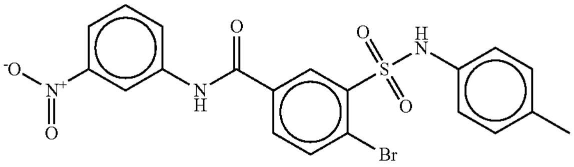 | 4-bromo-N-(3-nitrophenyl)-3-(N-(p-tolyl)sulfamoyl)benzamide |
| I-168 | 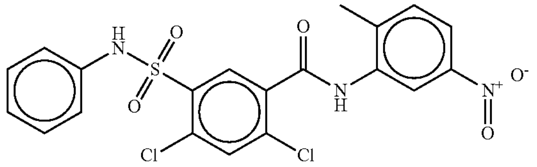 | 2,4-dichloro-N-(2-methyl-5-nitrophenyl)-5-(N-phenylsulfamoyl)benzamide |
| I-169 | 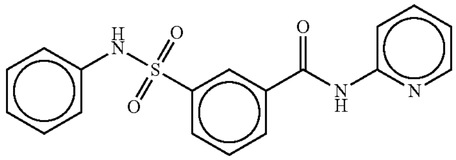 | 3-(N-phenylsulfamoyl)-N-(pyridin-2-yl)benzamide |
| I-170 | 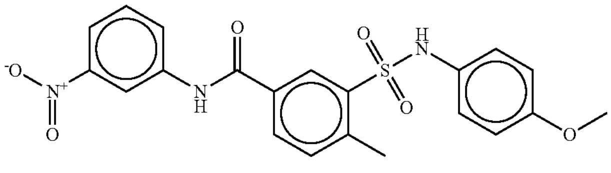 | 3-(N-(4-methoxyphenyl)sulfamoyl)-4-methyl-N-(3-nitrophenyl)benzamide |
| I-171 | 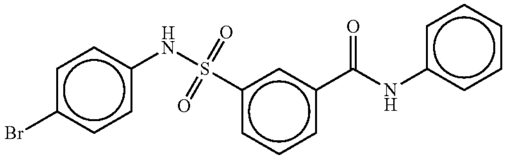 | 3-(N-(4-bromophenyl)sulfamoyl)-N-phenylbenzamide |
| I-172 | 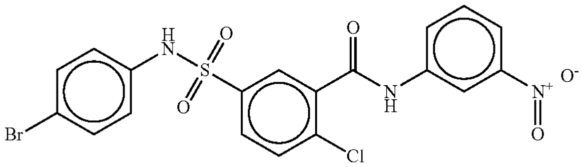 | 5-(N-(4-bromophenyl)sulfamoyl)-2-chloro-N-(3-nitrophenyl)benzamide |

TABLE 1-continued

| ID | Structure | Name |
|---|---|---|
| I-173 | 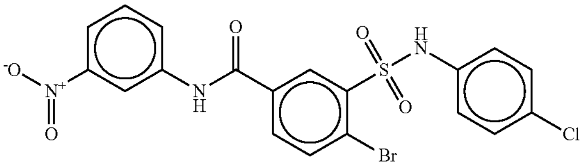 | 4-bromo-3-(N-(4-chlorophenyl)sulfamoyl)-N-(3-nitrophenyl)benzamide |
| I-175 | 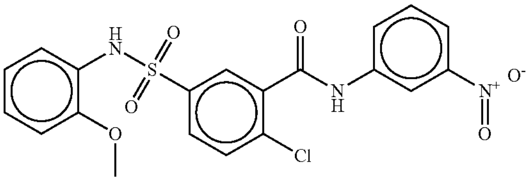 | 2-chloro-5-(N-(2-methoxyphenyl)sulfamoyl)-N-(3-nitrophenyl)benzamide |
| I-176 | 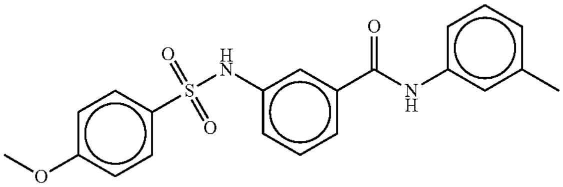 | 3-((4-methoxyphenyl)sulfonamido)-N-(m-tolyl)benzamide |
| I-177 | 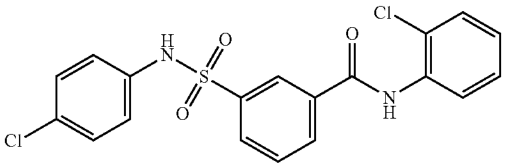 [SMILES: O=C(Nc1ccccc1Cl)c1cccc(S(=O)(=O)Nc2ccc(Cl)cc2)c1] | N-(2-chlorophenyl)-3-(N-(4-chlorophenyl)sulfamoyl)benzamide |
| I-178 | 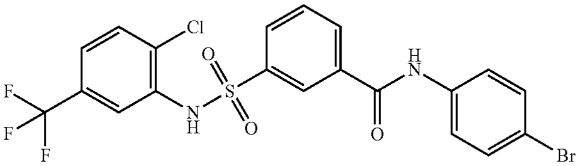 [SMILES: O=C(Nc1ccc(Br)cc1)c1cccc(S(=O)(=O)Nc2cc(C(F)(F)F)ccc2Cl)c1] | N-(4-bromophenyl)-3-(N-(2-chloro-5-(trifluoromethyl)phenyl)sulfamoyl)benzamide |
| I-179 | 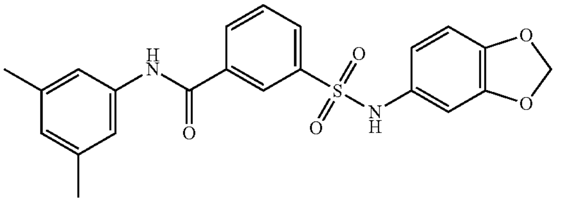 [SMILES: Cc1cc(C)cc(NC(=O)c2cccc(S(=O)(=O)Nc3ccc4c(c3)OCO4)c2)c1] | 3-(N-(benzo[d][1,3]dioxol-5-yl)sulfamoyl)-N-(3,5-dimethylphenyl)benzamide |
| I-180 | 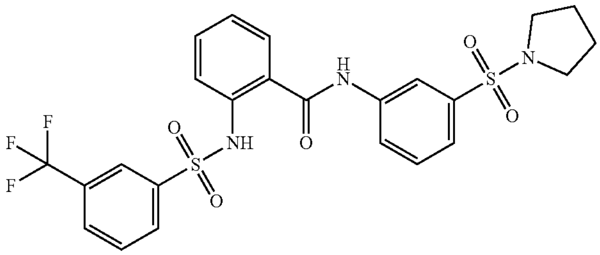 [SMILES: O=C(Nc1cccc(S(=O)(=O)N2CCCC2)c1)c1ccccc1NS(=O)(=O)c1cccc(C(F)(F)F)c1] | N-(3-(pyrrolidin-1-ylsulfonyl)phenyl)-2-((3-(trifluoromethyl)phenyl)sulfonamido) benzamide |
| I-181 | 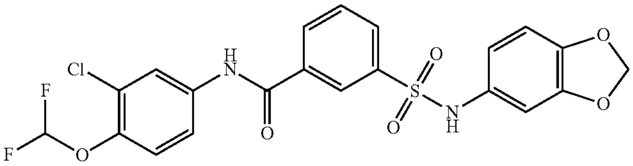 [SMILES: O=C(Nc1ccc(OC(F)F)c(Cl)c1)c1cccc(S(=O)(=O)Nc2ccc3c(c2)OCO3)c1] | 3-(N-(benzo[d][1,3]dioxol-5-yl)sulfamoyl)-N-(3-chloro-4-(difluoromethoxy)phenyl)benzamide |

TABLE 1-continued

| ID | Structure | Name |
|---|---|---|
| I-182 | 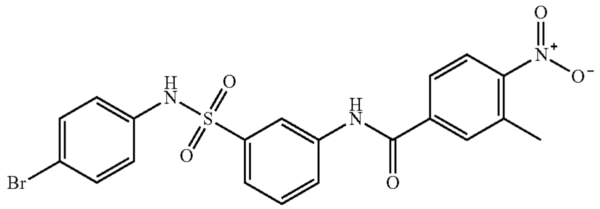 [SMILES: Cc1cc(C(=O)Nc2cccc(S(=O)(=O)Nc3ccc(Br)cc3)c2)ccc1[N+](=O)[O-]] | N-(3-(N-(4-bromophenyl)sulfamoyl)phenyl)-3-methyl-4-nitrobenzamide |
| I-183 | 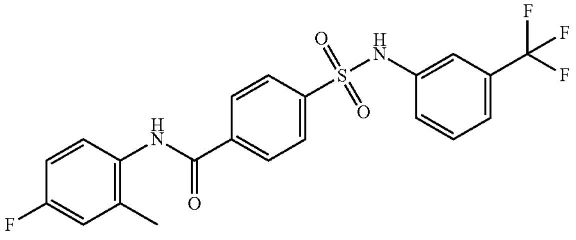 [SMILES: Cc1cc(F)ccc1NC(=O)c1ccc(S(=O)(=O)Nc2cccc(C(F)(F)F)c2)cc1] | N-(4-fluoro-2-methylphenyl)-4-(N-(3-(trifluoromethyl)phenyl)sulfamoyl)benzamide |
| I-184 | 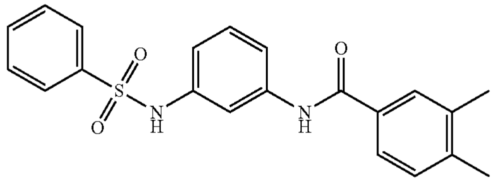 [SMILES: Cc1ccc(C(=O)Nc2cccc(NS(=O)(=O)c3ccccc3)c2)cc1C] | 3,4-dimethyl-N-(3-(phenylsulfonamido)phenyl)benzamide |
| I-185 | 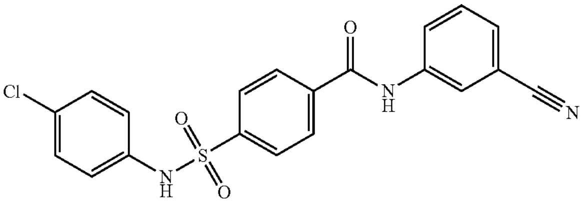 [SMILES: N#Cc1cccc(NC(=O)c2ccc(S(=O)(=O)Nc3ccc(Cl)cc3)cc2)c1] | 4-(N-(4-chlorophenyl)sulfamoyl)-N-(3-cyanophenyl)benzamide |
| I-186 | 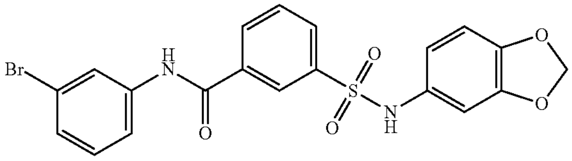 | 3-(N-(benzo[d][1,3]dioxol-5-yl)sulfamoyl)-N-(3-bromophenyl)benzamide |
| I-187 | 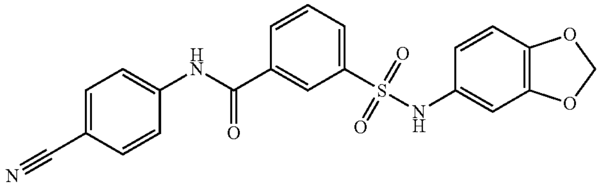 [SMILES: N#Cc1ccc(NC(=O)c2cccc(S(=O)(=O)Nc3ccc4c(c3)OCO4)c2)cc1] | 3-(N-(benzo[d][1,3]dioxol-5-yl)sulfamoyl)-N-(4-cyanophenyl)benzamide |
| I-188 | 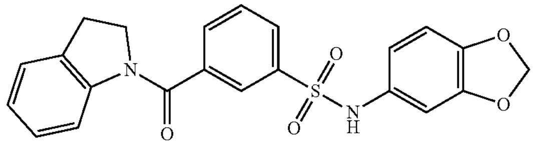 [SMILES: O=C(c1cccc(S(=O)(=O)Nc2ccc3c(c2)OCO3)c1)N1CCc2ccccc21] | N-(benzo[d][1,3]dioxol-5-yl)-3-(indoline-1-carbonyl)benzenesulfonamide |

TABLE 1-continued

| ID | Structure | Name |
|---|---|---|
| I-189 | 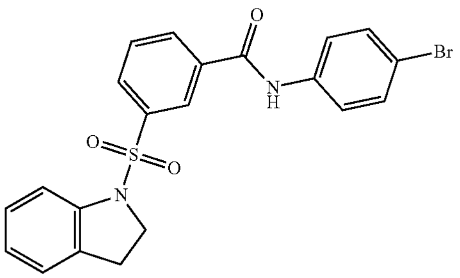 [SMILES: O=C(Nc1ccc(Br)cc1)c1cccc(S(=O)(=O)N2CCc3ccccc32)c1] | N-(4-bromophenyl)-3-(indolin-1-ylsulfonyl)benzamide |
| I-190 | 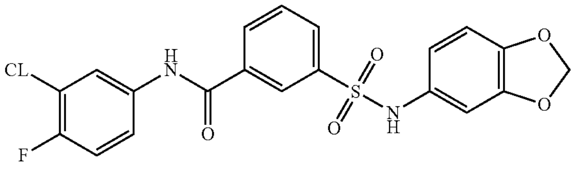 | 3-(N-(benzo[d][1,3]dioxol-5-yl)sulfamoyl)-N-(3-chloro-4-fluorophenyl)benzamide |
| I-191 | 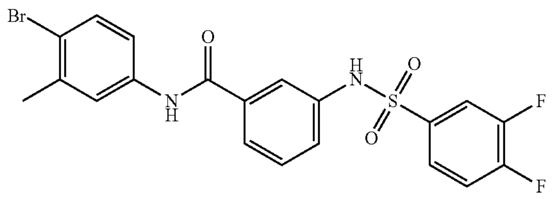 [SMILES: Cc1cc(NC(=O)c2cccc(NS(=O)(=O)c3ccc(F)c(F)c3)c2)ccc1Br] | N-(4-bromo-3-methylphenyl)-3-((3,4-difluorophenyl)sulfonamido)benzamide |
| I-192 | 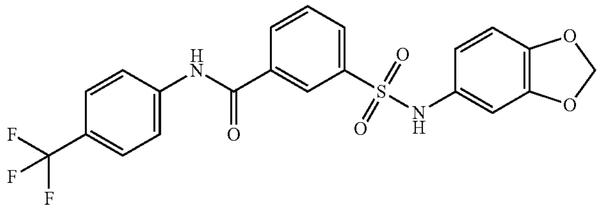 [SMILES: O=C(Nc1ccc(C(F)(F)F)cc1)c1cccc(S(=O)(=O)Nc2ccc3c(c2)OCO3)c1] | 3-(N-(benzo[d][1,3]dioxol-5-yl)sulfamoyl)-N-(4-(trifluoromethyl)phenyl)benzamide |
| I-193 | 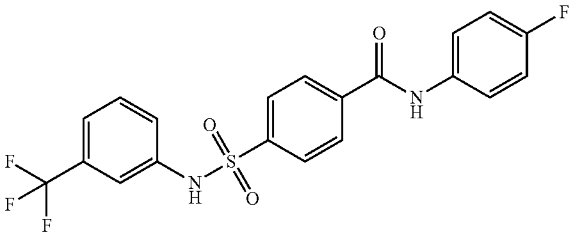 [SMILES: O=C(Nc1ccc(F)cc1)c1ccc(S(=O)(=O)Nc2cccc(C(F)(F)F)c2)cc1] | N-(4-fluorophenyl)-4-(N-(3-(trifluoromethyl)phenyl)sulfamoyl)benzamide |
| I-194 | 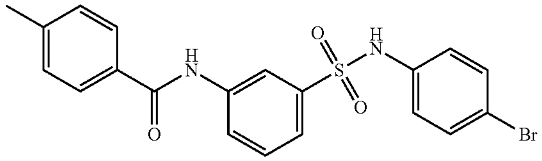 [SMILES: Cc1ccc(C(=O)Nc2cccc(S(=O)(=O)Nc3ccc(Br)cc3)c2)cc1] | N-(3-(N-(4-bromophenyl)sulfamoyl)phenyl)-4-methylbenzamide |
| I-195 | 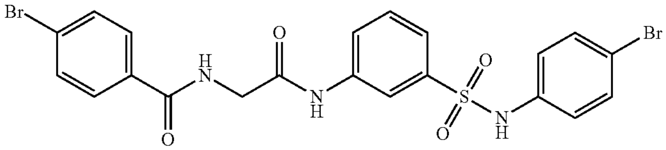 [SMILES: O=C(CNC(=O)c1ccc(Br)cc1)Nc1cccc(S(=O)(=O)Nc2ccc(Br)cc2)c1] | 4-bromo-N-(2-((3-(N-(4-bromophenyl)sulfamoyl)phenyl)amino)-2-oxoethyl)benzamide |

TABLE 1-continued

| ID | Structure | Name |
| --- | --- | --- |
| I-196 | 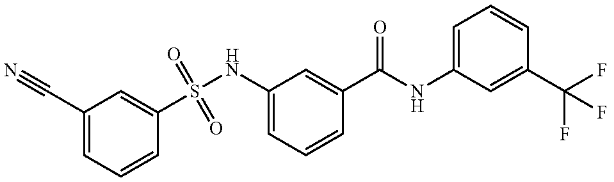 [SMILES: N#Cc1cccc(S(=O)(=O)Nc2cccc(C(=O)Nc3cccc(C(F)(F)F)c3)c2)c1] | 3-((3-cyanophenyl)sulfonamido)-N-(3-(trifluoromethyl)phenyl)benzamide |
| I-197 | 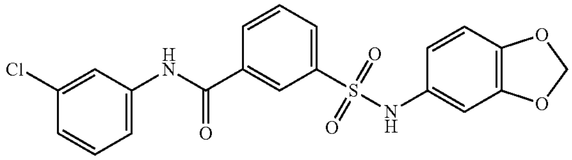 [SMILES: O=C(Nc1cccc(Cl)c1)c1cccc(S(=O)(=O)Nc2ccc3c(c2)OCO3)c1] | 3-(N-(benzo[d][1,3]dioxol-5-yl)sulfamoyl)-N-(3-chlorophenyl)benzamide |
| I-198 | 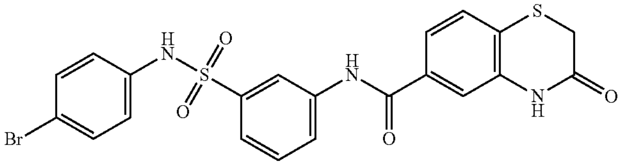 [SMILES: O=C1CSc2ccc(C(=O)Nc3cccc(S(=O)(=O)Nc4ccc(Br)cc4)c3)cc2N1] | N-(3-(N-(4-bromophenyl)sulfamoyl)phenyl)-3-oxo-3,4-dihydro-2H-benzo[b][1,4]thiazine-6-carboxamide |
| I-199 | 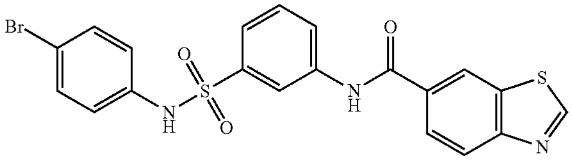 [SMILES: O=C(Nc1cccc(S(=O)(=O)Nc2ccc(Br)cc2)c1)c1ccc2ncsc2c1] | N-(3-(N-(4-bromophenyl)sulfamoyl)phenyl)benzo[d]thiazole-6-carboxamide |
| I-200 | 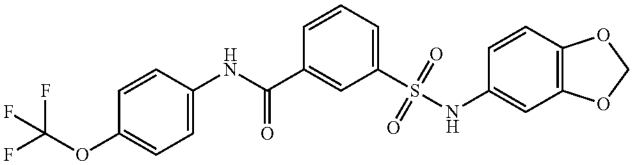 [SMILES: O=C(Nc1ccc(OC(F)(F)F)cc1)c1cccc(S(=O)(=O)Nc2ccc3c(c2)OCO3)c1] | 3-(N-(benzo[d][1,3]dioxol-5-yl)sulfamoyl)-N-(4-(trifluoromethoxy)phenyl)benzamide |
| I-201 | 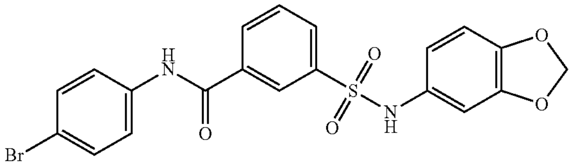 [SMILES: O=C(Nc1ccc(Br)cc1)c1cccc(S(=O)(=O)Nc2ccc3c(c2)OCO3)c1] | 3-(N-(benzo[d][1,3]dioxol-5-yl)sulfamoyl)-N-(4-bromophenyl)benzamide |
| I-202 | 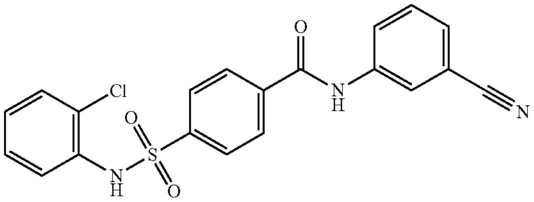 [SMILES: N#Cc1cccc(NC(=O)c2ccc(S(=O)(=O)Nc3ccccc3Cl)cc2)c1] | 4-(N-(2-chlorophenyl)sulfamoyl)-N-(3-cyanophenyl)benzamide |
| I-203 | 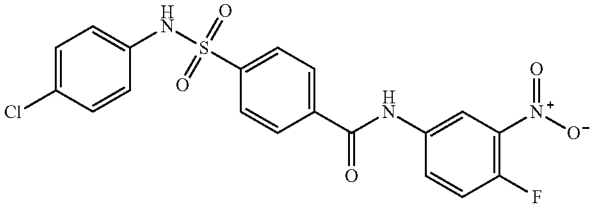 [SMILES: O=C(Nc1ccc(F)c([N+](=O)[O-])c1)c1ccc(S(=O)(=O)Nc2ccc(Cl)cc2)cc1] | 4-(N-(4-chlorophenyl)sulfamoyl)-N-(4-fluoro-3-nitrophenyl)benzamide |

TABLE 1-continued

| ID | Structure | Name |
| --- | --- | --- |
| I-204 | 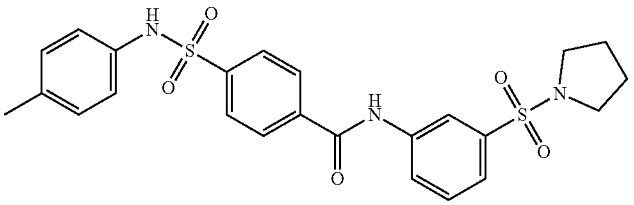 [SMILES: Cc1ccc(NS(=O)(=O)c2ccc(C(=O)Nc3cccc(S(=O)(=O)N4CCCC4)c3)cc2)cc1] | N-(3-(pyrrolidin-1-ylsulfonyl)phenyl)-4-(N-(p-tolyl)sulfamoyl)benzamide |
| I-205 | 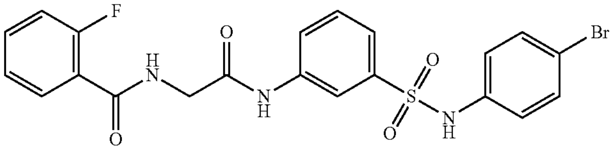 [SMILES: O=C(CNC(=O)c1ccccc1F)Nc1cccc(S(=O)(=O)Nc2ccc(Br)cc2)c1] | N-(2-((3-(N-(4-bromophenyl)sulfamoyl)phenyl)amino)-2-oxoethyl)-2-fluorobenzamide |
| I-206 | 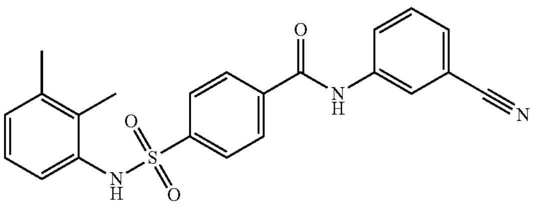 [SMILES: Cc1cccc(NS(=O)(=O)c2ccc(C(=O)Nc3cccc(C#N)c3)cc2)c1C] | N-(3-cyanophenyl)-4-(N-(2,3-dimethylphenyl)sulfamoyl)benzamide |
| I-207 | 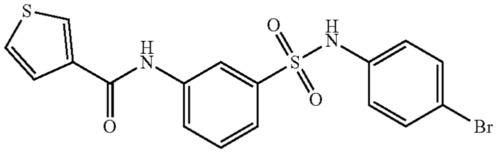 [SMILES: O=C(Nc1cccc(S(=O)(=O)Nc2ccc(Br)cc2)c1)c1ccsc1] | N-(3-(N-(4-bromophenyl)sulfamoyl)phenyl)thiophene-3-carboxamide |
| I-208 | 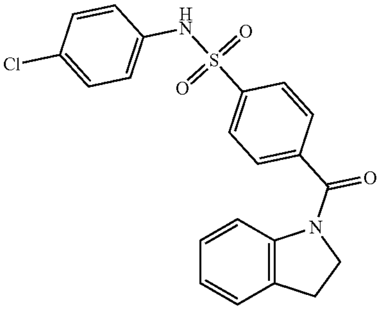 [SMILES: O=C(c1ccc(S(=O)(=O)Nc2ccc(Cl)cc2)cc1)N1CCc2ccccc21] | N-(4-chlorophenyl)-4-(indoline-1-carbonyl)benzenesulfonamide |
| I-209 | 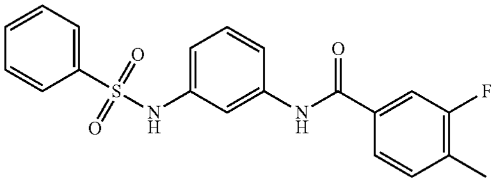 [SMILES: Cc1ccc(C(=O)Nc2cccc(NS(=O)(=O)c3ccccc3)c2)cc1F] | 3-fluoro-4-methyl-N-(3-(phenylsulfonamido)phenyl)benzamide |
| I-210 | 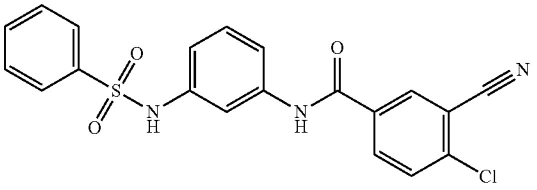 [SMILES: N#Cc1cc(C(=O)Nc2cccc(NS(=O)(=O)c3ccccc3)c2)ccc1Cl] | 4-chloro-3-cyano-N-(3-(phenylsulfonamido)phenyl)benzamide |

TABLE 1-continued

| ID | Structure | Name |
|---|---|---|
| I-211 | 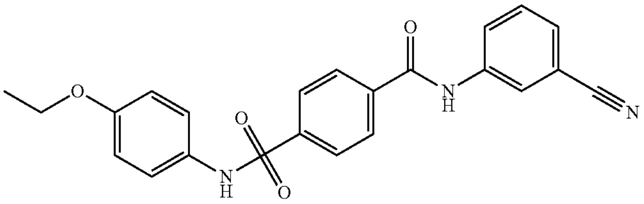 | N-(3-cyanophenyl)-4-(N-(4-ethoxyphenyl)sulfamoyl)benzamide |
| I-212 | 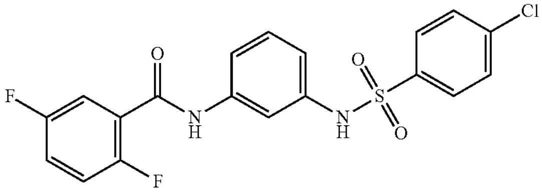 [SMILES: O=C(Nc1cccc(NS(=O)(=O)c2ccc(Cl)cc2)c1)c1cc(F)ccc1F] | N-(3-((4-chlorophenyl)sulfonamido)phenyl)-2,5-difluorobenzamide |
| I-213 | 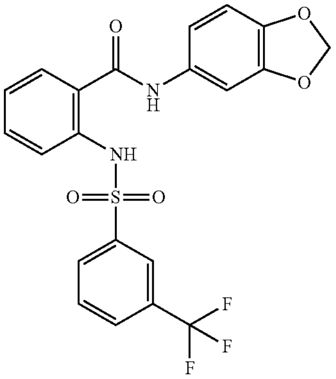 [SMILES: O=C(Nc1ccc2c(c1)OCO2)c1ccccc1NS(=O)(=O)c1cccc(C(F)(F)F)c1] | N-(benzo[d][1,3]dioxol-5-yl)-2-((3-(trifluoromethyl)phenyl)sulfonamido)benzamide |
| I-214 | 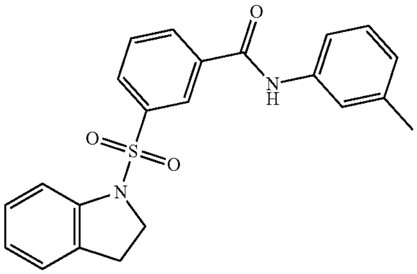 [SMILES: Cc1cccc(NC(=O)c2cccc(S(=O)(=O)N3CCc4ccccc43)c2)c1] | 3-(indolin-1-ylsulfonyl)-N-(m-tolyl)benzamide |
| I-215 | 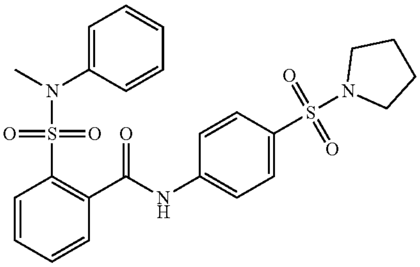 [SMILES: CN(c1ccccc1)S(=O)(=O)c1ccccc1C(=O)Nc1ccc(S(=O)(=O)N2CCCC2)cc1] | 2-(N-methyl-N-phenylsulfamoyl)-N-(4-(pyrrolidin-1-ylsulfonyl)phenyl)benzamide |
| I-216 | 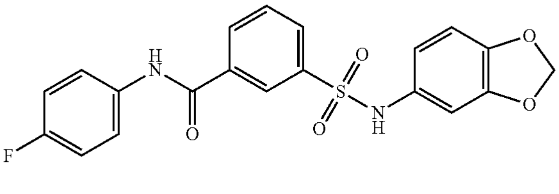 [SMILES: O=C(Nc1ccc(F)cc1)c1cccc(S(=O)(=O)Nc2ccc3c(c2)OCO3)c1] | 3-(N-(benzo[d][1,3]dioxol-5-yl)sulfamoyl)-N-(4-fluorophenyl)benzamide |

TABLE 1-continued

| ID | Structure | Name |
|---|---|---|
| I-217 | 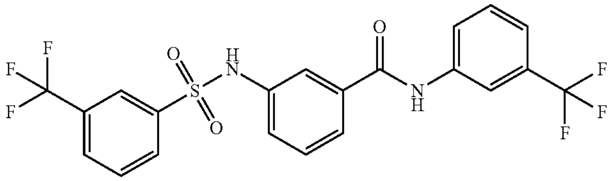 [SMILES: O=C(Nc1cccc(C(F)(F)F)c1)c1cccc(NS(=O)(=O)c2cccc(C(F)(F)F)c2)c1] | N-(3-(trifluoromethyl)phenyl)-3-((3-(trifluoromethyl)phenyl)sulfonamido) benzamide |
| I-218 | 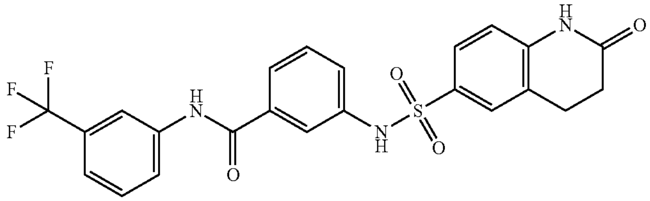 [SMILES: O=C1CCc2cc(S(=O)(=O)Nc3cccc(C(=O)Nc4cccc(C(F)(F)F)c4)c3)ccc2N1] | 3-((2-oxo-1,2,3,4-tetrahydroquinoline)-6-sulfonamido)-N-(3-(trifluoromethyl)phenyl)benzamide |
| I-219 | 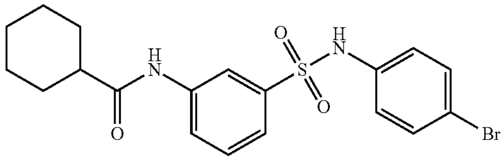 [SMILES: O=C(Nc1cccc(S(=O)(=O)Nc2ccc(Br)cc2)c1)C1CCCCC1] | N-(3-(N-(4-bromophenyl)sulfamoyl)phenyl) cyclohexanecarboxamide |
| I-220 | 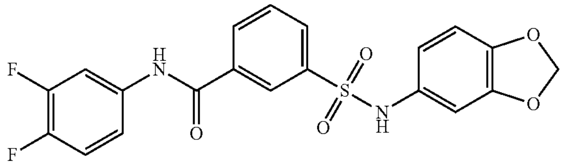 [SMILES: O=C(Nc1ccc(F)c(F)c1)c1cccc(S(=O)(=O)Nc2ccc3c(c2)OCO3)c1] | 3-(N-(benzo[d][1,3]dioxol-5-yl)sulfamoyl)-N-(3,4-difluorophenyl)benzamide |
| I-221 | 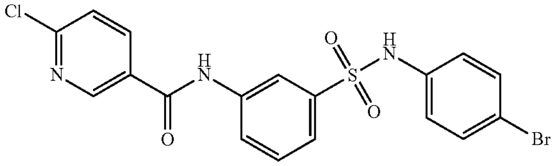 [SMILES: O=C(Nc1cccc(S(=O)(=O)Nc2ccc(Br)cc2)c1)c1ccc(Cl)nc1] | N-(3-(N-(4-bromophenyl)sulfamoyl)phenyl)-6-chloronicotinamide |
| I-222 | 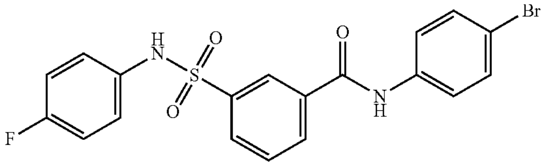 [SMILES: O=C(Nc1ccc(Br)cc1)c1cccc(S(=O)(=O)Nc2ccc(F)cc2)c1] | N-(4-bromophenyl)-3-(N-(4-fluorophenyl)sulfamoyl)benzamide |
| I-223 | 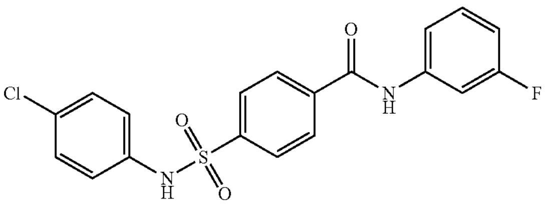 [SMILES: O=C(Nc1cccc(F)c1)c1ccc(S(=O)(=O)Nc2ccc(Cl)cc2)cc1] | 4-(N-(4-chlorophenyl)sulfamoyl)-N-(3-fluorophenyl)benzamide |

TABLE 1-continued

| ID | Structure | Name |
| --- | --- | --- |
| I-224 | 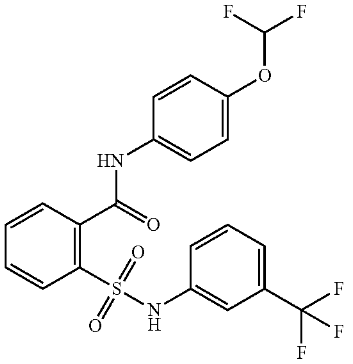 [SMILES: O=C(Nc1ccc(OC(F)F)cc1)c1ccccc1S(=O)(=O)Nc1cccc(C(F)(F)F)c1] | N-(4-(difluoromethoxy)phenyl)-2-(N-(3-(trifluoromethyl)phenyl)sulfamoyl)benzamide |
| I-225 | 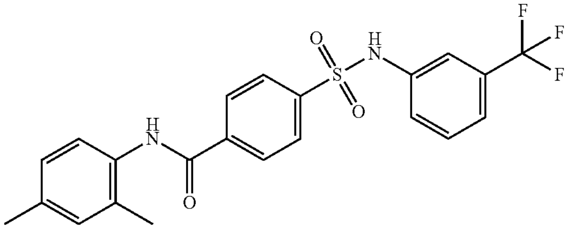 [SMILES: Cc1ccc(NC(=O)c2ccc(S(=O)(=O)Nc3cccc(C(F)(F)F)c3)cc2)c(C)c1] | N-(2,4-dimethylphenyl)-4-(N-(3-(trifluoromethyl)phenyl)sulfamoyl)benzamide |
| I-226 | 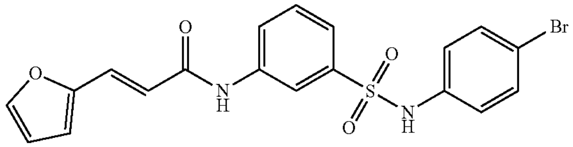 [SMILES: O=C(/C=C/c1ccco1)Nc1cccc(S(=O)(=O)Nc2ccc(Br)cc2)c1] | (E)-N-(3-(N-(4-bromophenyl)sulfamoyl)phenyl)-3-(furan-2-yl)acrylamide |
| I-227 | 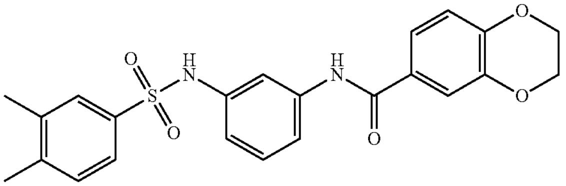 [SMILES: Cc1ccc(S(=O)(=O)Nc2cccc(NC(=O)c3ccc4c(c3)OCCO4)c2)cc1C] | N-(3-((3,4-dimethylphenyl)sulfonamido)phenyl)-2,3-dihydrobenzo[b][1,4]dioxine-6-carboxamide |
| I-228 | 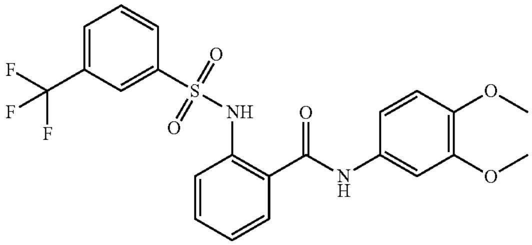 [SMILES: COc1ccc(NC(=O)c2ccccc2NS(=O)(=O)c2cccc(C(F)(F)F)c2)cc1OC] | N-(3,4-dimethoxyphenyl)-2-((3-(trifluoromethyl)phenyl)sulfonamido)benzamide |
| I-229 | 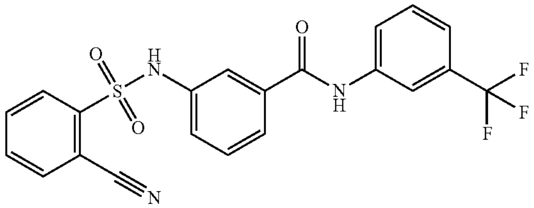 [SMILES: N#Cc1ccccc1S(=O)(=O)Nc1cccc(C(=O)Nc2cccc(C(F)(F)F)c2)c1] | 3-((2-cyanophenyl)sulfonamido)-N-(3-(trifluoromethyl)phenyl)benzamide |
| I-230 | 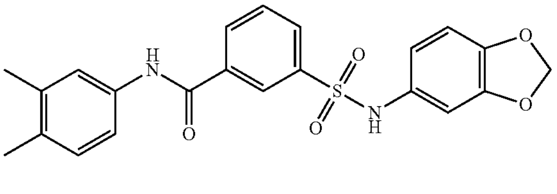 [SMILES: Cc1ccc(NC(=O)c2cccc(S(=O)(=O)Nc3ccc4c(c3)OCO4)c2)cc1C] | 3-(N-(benzo[d][1,3]dioxol-5-yl)sulfamoyl)-N-(3,4-dimethylphenyl)benzamide |

TABLE 1-continued
| ID | Structure | Name |
|---|---|---|
| I-231 | 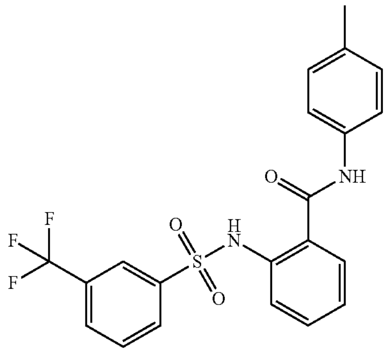 [SMILES: Cc1ccc(NC(=O)c2ccccc2NS(=O)(=O)c2cccc(C(F)(F)F)c2)cc1] | N-(p-tolyl)-2-((3-(trifluoromethyl)phenyl)sulfonamido)benzamide |
| I-232 | 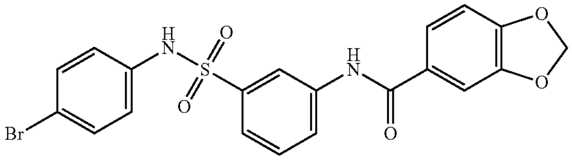 [SMILES: O=C(Nc1cccc(S(=O)(=O)Nc2ccc(Br)cc2)c1)c1ccc2c(c1)OCO2] | N-(3-(N-(4-bromophenyl)sulfamoyl)phenyl)benzo[d][1,3] dioxole-5-carboxamide |
| I-233 | 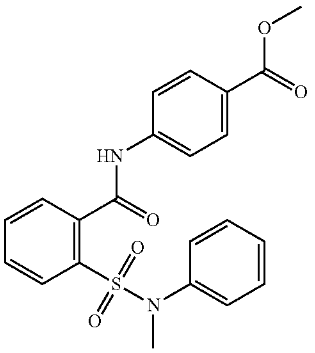 [SMILES: COC(=O)c1ccc(NC(=O)c2ccccc2S(=O)(=O)N(C)c2ccccc2)cc1] | methyl 4-(2-(N-methyl-N-phenylsulfamoyl)benzamido)benzoate |
| I-234 | 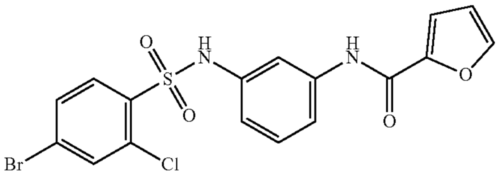 [SMILES: O=C(Nc1cccc(NS(=O)(=O)c2ccc(Br)cc2Cl)c1)c1ccco1] | N-(3-((4-bromo-2-chlorophenyl)sulfonamido)phenyl)furan-2-carboxamide |
| I-235 | 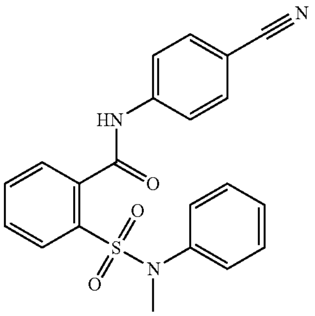 [SMILES: CN(c1ccccc1)S(=O)(=O)c1ccccc1C(=O)Nc1ccc(C#N)cc1] | N-(4-cyanophenyl)-2-(N-methyl-N-phenylsulfamoyl)benzamide |

TABLE 1-continued

| ID | Structure | Name |
|---|---|---|
| I-236 | 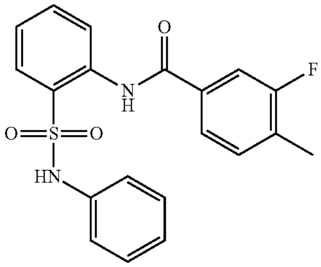 [SMILES: Cc1ccc(C(=O)Nc2ccccc2S(=O)(=O)Nc2ccccc2)cc1F] | 3-fluoro-4-methyl-N-(2-(N-phenylsulfamoyl)phenyl)benzamide |
| I-237 | 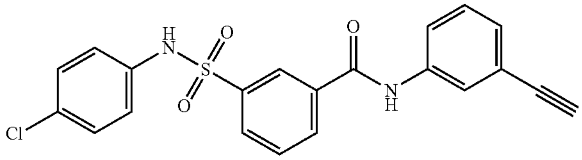 [SMILES: C#Cc1cccc(NC(=O)c2cccc(S(=O)(=O)Nc3ccc(Cl)cc3)c2)c1] | 3-(N-(4-chlorophenyl)sulfamoyl)-N-(3-ethynylphenyl)benzamide |
| I-238 | 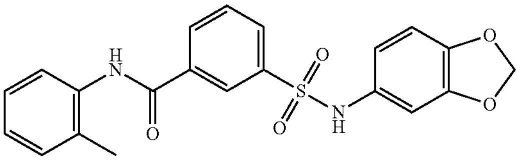 [SMILES: Cc1ccccc1NC(=O)c1cccc(S(=O)(=O)Nc2ccc3c(c2)OCO3)c1] | 3-(N-(benzo[d][1,3]dioxol-5-yl)sulfamoyl)-N-(o-tolyl)benzamide |
| I-239 | 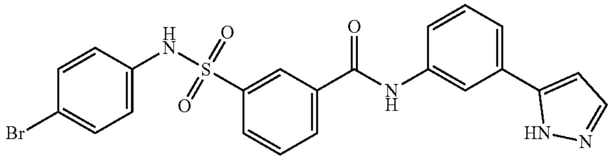 [SMILES: O=C(Nc1cccc(-c2ccn[nH]2)c1)c1cccc(S(=O)(=O)Nc2ccc(Br)cc2)c1] | N-(3-(1H-pyrazol-5-yl)phenyl)-3-(N-(4-bromophenyl)sulfamoyl)benzamide |
| I-240 | 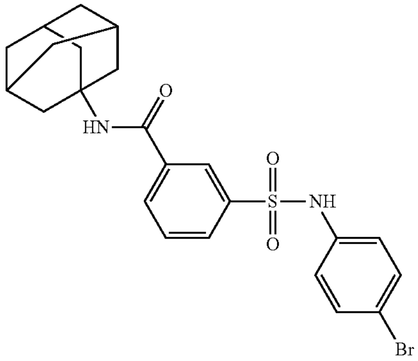 [SMILES: O=C(NC12CC3CC(CC(C3)C1)C2)c1cccc(S(=O)(=O)Nc2ccc(Br)cc2)c1] | N-(adamantan-1-yl)-3-(N-(4-bromophenyl)sulfamoyl)benzamide |
| I-241 | 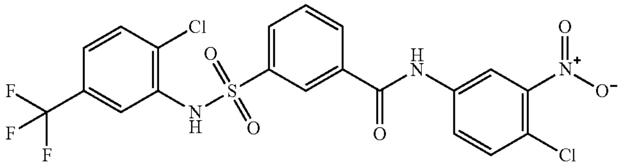 [SMILES: O=C(Nc1ccc(Cl)c([N+](=O)[O-])c1)c1cccc(S(=O)(=O)Nc2cc(C(F)(F)F)ccc2Cl)c1] | N-(4-chloro-3-nitrophenyl)-3-(N-(2-chloro-5-(trifluoromethyl)phenyl)sulfamoyl)benzamide |

TABLE 1-continued

| ID | Structure | Name |
| --- | --- | --- |
| I-242 | 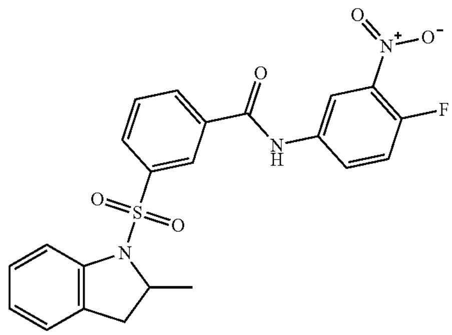 [SMILES: CC1Cc2ccccc2N1S(=O)(=O)c1cccc(C(=O)Nc2ccc(F)c([N+](=O)[O-])c2)c1] | N-(4-fluoro-3-nitrophenyl)-3-((2-methylindolin-1-yl)sulfonyl)benzamide |
| I-243 | 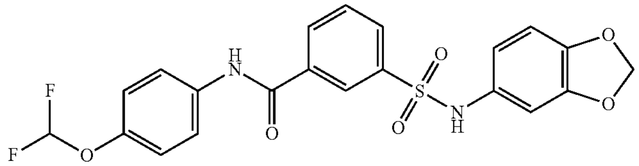 [SMILES: O=C(Nc1ccc(OC(F)F)cc1)c1cccc(S(=O)(=O)Nc2ccc3c(c2)OCO3)c1] | 3-(N-(benzo[d][1,3]dioxol-5-yl)sulfamoyl)-N-(4-(difluoromethoxy)phenyl)benzamide |
| I-244 | 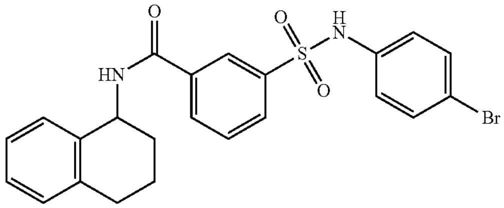 [SMILES: O=C(NC1CCCc2ccccc21)c1cccc(S(=O)(=O)Nc2ccc(Br)cc2)c1] | 3-(N-(4-bromophenyl)sulfamoyl)-N-(1,2,3,4-tetrahydronaphthalen-1-yl)benzamide |
| I-245 | 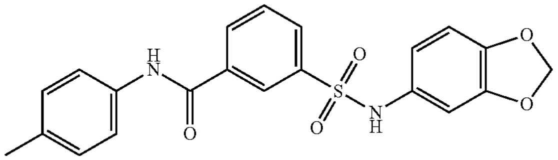 [SMILES: Cc1ccc(NC(=O)c2cccc(S(=O)(=O)Nc3ccc4c(c3)OCO4)c2)cc1] | 3-(N-(benzo[d][1,3]dioxol-5-yl)sulfamoyl)-N-(p-tolyl)benzamide |
| I-246 | 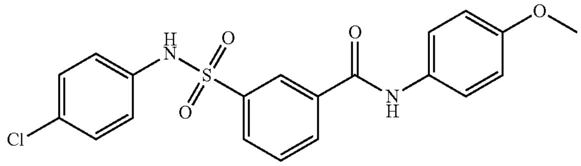 [SMILES: COc1ccc(NC(=O)c2cccc(S(=O)(=O)Nc3ccc(Cl)cc3)c2)cc1] | 3-(N-(4-chlorophenyl)sulfamoyl)-N-(4-methoxyphenyl)benzamide |
| I-247 | 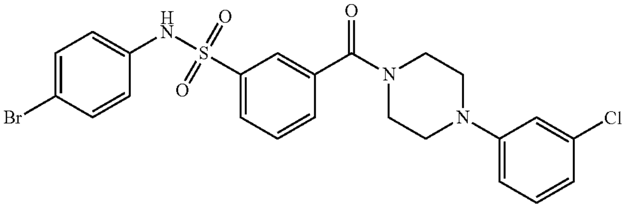 [SMILES: O=C(c1cccc(S(=O)(=O)Nc2ccc(Br)cc2)c1)N1CCN(c2cccc(Cl)c2)CC1] | N-(4-bromophenyl)-3-(4-(3-chlorophenyl)piperazine-1-carbonyl)benzenesulfonamide |
| I-248 | 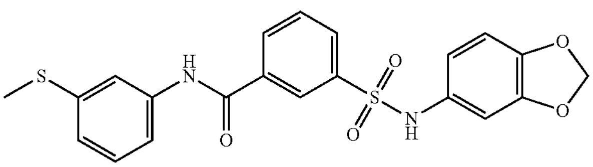 | 3-(N-(benzo[d][1,3]dioxol-5-yl)sulfamoyl)-N-(3-(methylthio)phenyl)benzamide |

TABLE 1-continued

| ID | Structure | Name |
|---|---|---|
| I-249 | 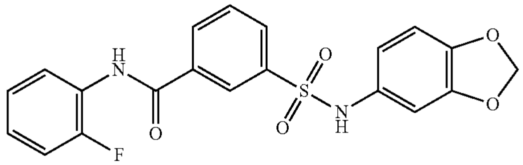 [SMILES: O=C(Nc1ccccc1F)c1cccc(S(=O)(=O)Nc2ccc3c(c2)OCO3)c1] | 3-(N-(benzo[d][1,3]dioxol-5-yl)sulfamoyl)-N-(2-fluorophenyl)benzamide |
| I-250 | 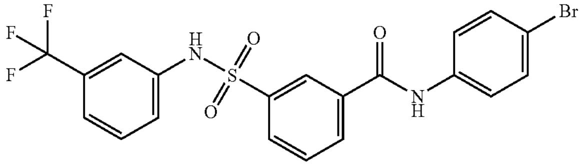 [SMILES: O=C(Nc1ccc(Br)cc1)c1cccc(S(=O)(=O)Nc2cccc(C(F)(F)F)c2)c1] | N-(4-bromophenyl)-3-(N-(3-(trifluoromethyl)phenyl)sulfamoyl)benzamide |
| I-251 | 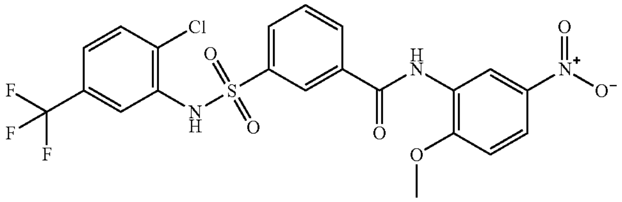 [SMILES: COc1ccc([N+](=O)[O-])cc1NC(=O)c1cccc(S(=O)(=O)Nc2cc(C(F)(F)F)ccc2Cl)c1] | 3-(N-(2-chloro-5-(trifluoromethyl)phenyl)sulfamoyl)-N-(2-methoxy-5-nitrophenyl)benzamide |
| I-252 | 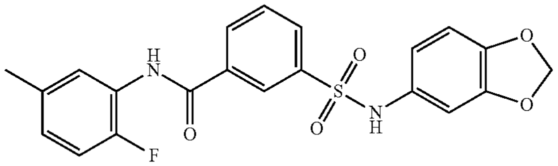 [SMILES: Cc1ccc(F)c(NC(=O)c2cccc(S(=O)(=O)Nc3ccc4c(c3)OCO4)c2)c1] | 3-(N-(benzo[d][1,3]dioxol-5-yl)sulfamoyl)-N-(2-fluoro-5-methylphenyl)benzamide |
| I-253 | 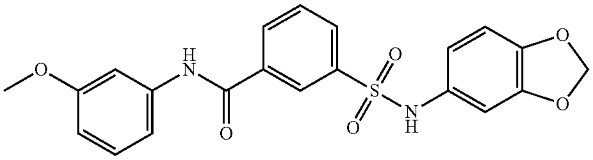 [SMILES: COc1cccc(NC(=O)c2cccc(S(=O)(=O)Nc3ccc4c(c3)OCO4)c2)c1] | 3-(N-(benzo[d][1,3]dioxol-5-yl)sulfamoyl)-N-(3-methoxyphenyl)benzamide |
| I-254 | 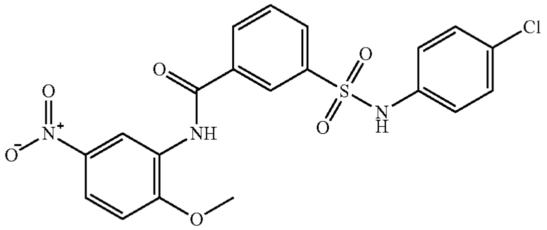 [SMILES: COc1ccc([N+](=O)[O-])cc1NC(=O)c1cccc(S(=O)(=O)Nc2ccc(Cl)cc2)c1] | 3-(N-(4-chlorophenyl)sulfamoyl)-N-(2-methoxy-5-nitrophenyl)benzamide |
| I-255 | 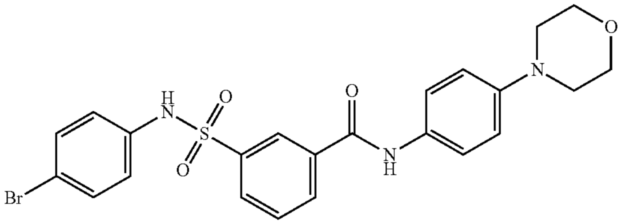 [SMILES: O=C(Nc1ccc(N2CCOCC2)cc1)c1cccc(S(=O)(=O)Nc2ccc(Br)cc2)c1] | 3-(N-(4-bromophenyl)sulfamoyl)-N-(4-morpholinophenyl)benzamide |
| I-256 | 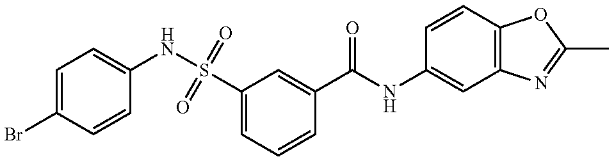 [SMILES: Cc1nc2cc(NC(=O)c3cccc(S(=O)(=O)Nc4ccc(Br)cc4)c3)ccc2o1] | 3-(N-(4-bromophenyl)sulfamoyl)-N-(2-methylbenzo[d]oxazol-5-yl)benzamide |

TABLE 1-continued

| ID | Structure | Name |
| --- | --- | --- |
| I-257 | 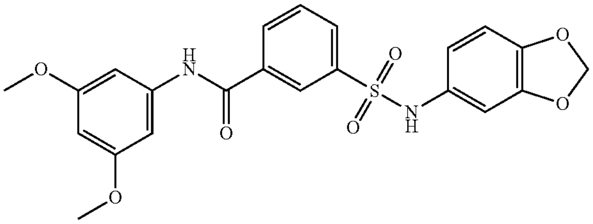 [SMILES: COc1cc(NC(=O)c2cccc(S(=O)(=O)Nc3ccc4c(c3)OCO4)c2)cc(OC)c1] | 3-(N-(benzo[d][1,3]dioxol-5-yl)sulfamoyl)-N-(3,5-dimethoxyphenyl)benzamide |
| I-258 | 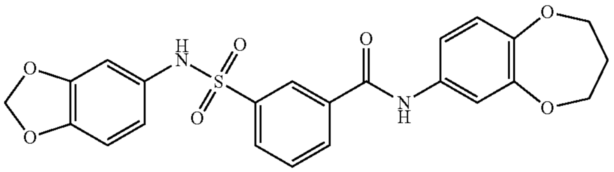 [SMILES: O=C(Nc1ccc2c(c1)OCCCO2)c1cccc(S(=O)(=O)Nc2ccc3c(c2)OCO3)c1] | 3-(N-(benzo[d][1,3]dioxol-5-yl)sulfamoyl)-N-(3,4-dihydro-2H-benzo[b][1,4]dioxepin-7-yl)benzamide |
| I-259 | 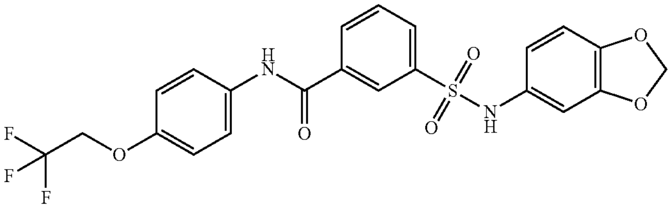 [SMILES: O=C(Nc1ccc(OCC(F)(F)F)cc1)c1cccc(S(=O)(=O)Nc2ccc3c(c2)OCO3)c1] | 3-(N-(benzo[d][1,3]dioxol-5-yl)sulfamoyl)-N-(4-(2,2,2-trifluoroethoxy)phenyl)benzamide |
| I-260 | 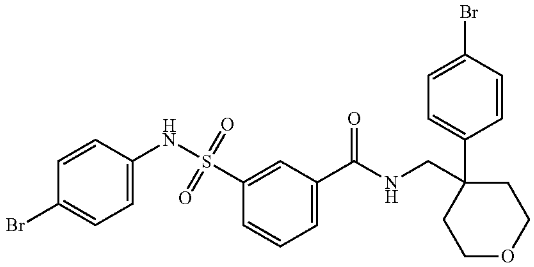 [SMILES: O=C(NCC1(c2ccc(Br)cc2)CCOCC1)c1cccc(S(=O)(=O)Nc2ccc(Br)cc2)c1] | 3-(N-(4-bromophenyl)sulfamoyl)-N-((4-(4-bromophenyl)tetrahydro-2H-pyran-4-yl)methyl)benzamide |
| I-261 | 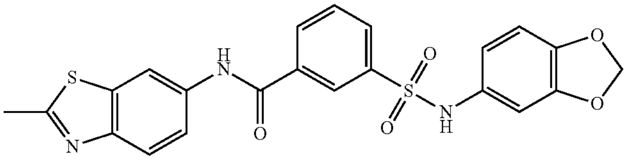 [SMILES: Cc1nc2ccc(NC(=O)c3cccc(S(=O)(=O)Nc4ccc5c(c4)OCO5)c3)cc2s1] | 3-(N-(benzo[d][1,3]dioxol-5-yl)sulfamoyl)-N-(2-methylbenzo[d]thiazol-6-yl)benzamide |
| I-262 | 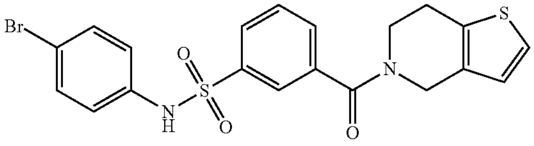 [SMILES: O=C(c1cccc(S(=O)(=O)Nc2ccc(Br)cc2)c1)N1CCc2sccc2C1] | N-(4-bromophenyl)-3-(4,5,6,7-tetrahydrothieno[3,2-c]pyridine-5-carbonyl)benzenesulfonamide |
| I-263 | 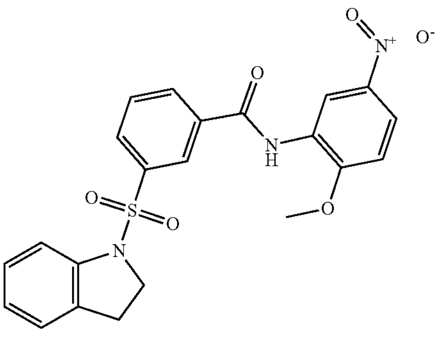 | 3-(indolin-1-ylsulfonyl)-N-(2-methoxy-5-nitrophenyl)benzamide |

TABLE 1-continued

| ID | Structure | Name |
|---|---|---|
| I-264 | 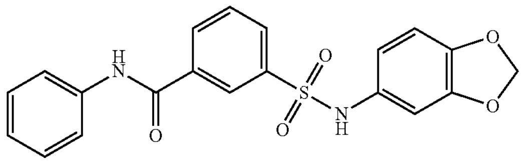 [SMILES: O=C(Nc1ccccc1)c1cccc(S(=O)(=O)Nc2ccc3c(c2)OCO3)c1] | 3-(N-(benzo[d][1,3]dioxol-5-yl)sulfamoyl)-N-phenylbenzamide |
| I-265 | 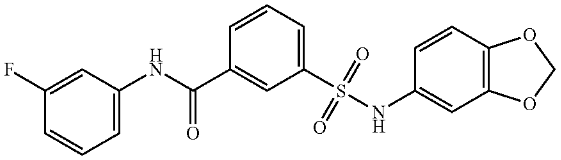 [SMILES: O=C(Nc1cccc(F)c1)c1cccc(S(=O)(=O)Nc2ccc3c(c2)OCO3)c1] | 3-(N-(benzo[d][1,3]dioxol-5-yl)sulfamoyl)-N-(3-fluorophenyl)benzamide |
| I-266 | 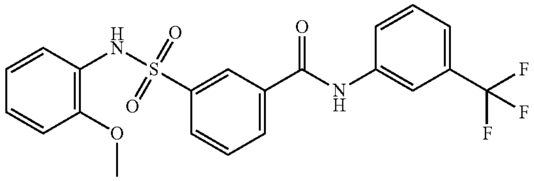 [SMILES: COc1ccccc1NS(=O)(=O)c1cccc(C(=O)Nc2cccc(C(F)(F)F)c2)c1] | 3-(N-(2-methoxyphenyl)sulfamoyl)-N-(3-(trifluoromethyl)phenyl)benzamide |
| I-267 | 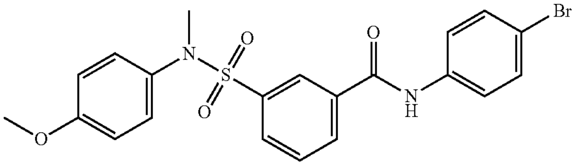 | N-(4-bromophenyl)-3-(N-(4-methoxyphenyl)-N-methylsulfamoyl)benzamide |
| I-268 | 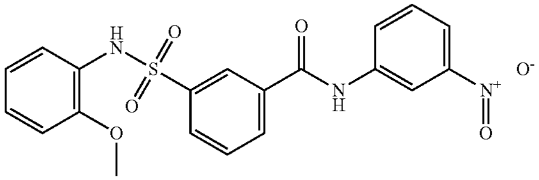 | 3-(N-(2-methoxyphenyl)sulfamoyl)-N-(3-nitrophenyl)benzamide |
| I-269 | 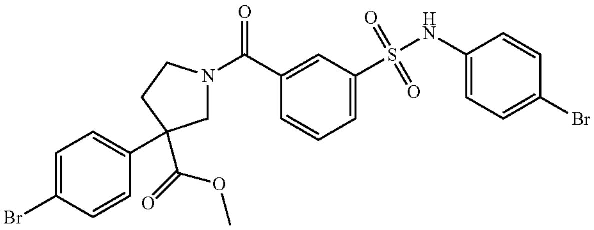 [SMILES: COC(=O)C1(c2ccc(Br)cc2)CCN(C(=O)c2cccc(S(=O)(=O)Nc3ccc(Br)cc3)c2)C1] | methyl 3-(4-bromophenyl)-1-(3-(N-(4-bromophenyl)sulfamoyl)benzoyl)pyrrolidine-3-carboxylate |
| I-270 | 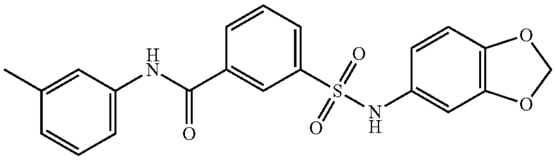 [SMILES: Cc1cccc(NC(=O)c2cccc(S(=O)(=O)Nc3ccc4c(c3)OCO4)c2)c1] | 3-(N-(benzo[d][1,3]dioxol-5-yl)sulfamoyl)-N-(m-tolyl)benzamide |

TABLE 1-continued

| ID | Structure | Name |
| --- | --- | --- |
| I-271 | 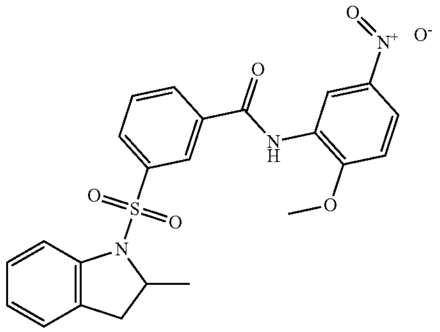 | N-(2-methoxy-5-nitrophenyl)-3-((2-methylindolin-1-yl)sulfonyl)benzamide |
| I-272 | 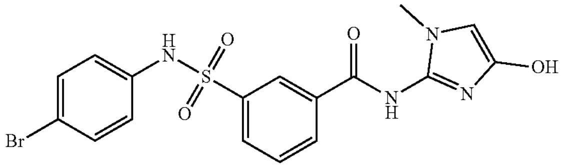 [SMILES: Cn1cc(O)nc1NC(=O)c1cccc(S(=O)(=O)Nc2ccc(Br)cc2)c1] | 3-(N-(4-bromophenyl)sulfamoyl)-N-(4-hydroxy-1-methyl-1H-imidazol-2-yl)benzamide |
| I-273 | 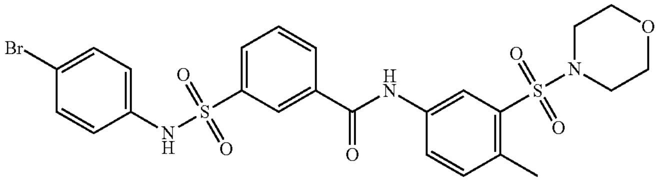 [SMILES: Cc1ccc(NC(=O)c2cccc(S(=O)(=O)Nc3ccc(Br)cc3)c2)cc1S(=O)(=O)N1CCOCC1] | 3-(N-(4-bromophenyl)sulfamoyl)-N-(4-methyl-3-(morpholinosulfonyl)phenyl)benzamide |
| I-274 | 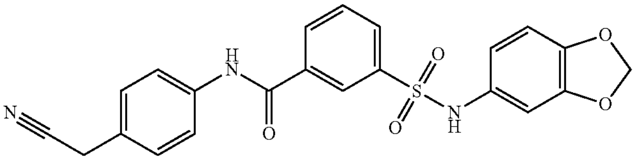 [SMILES: N#CCc1ccc(NC(=O)c2cccc(S(=O)(=O)Nc3ccc4c(c3)OCO4)c2)cc1] | 3-(N-(benzo[d][1,3]dioxol-5-yl)sulfamoyl)-N-(4-(cyanomethyl)phenyl)benzamide |
| I-275 | 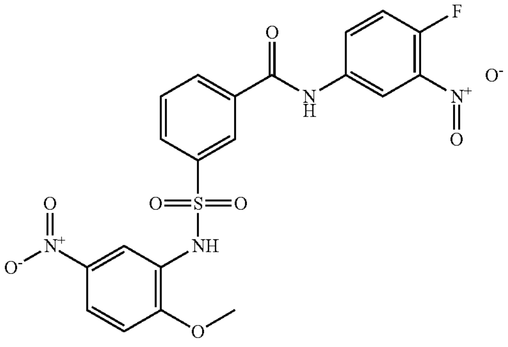 | N-(4-fluoro-3-nitrophenyl)-3-(N-(2-methoxy-5-nitrophenyl)sulfamoyl)benzamide |
| I-276 | 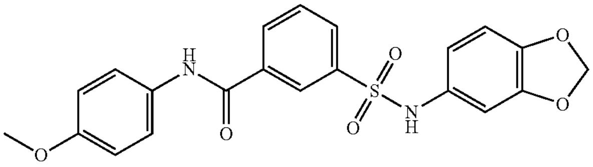 [SMILES: COc1ccc(NC(=O)c2cccc(S(=O)(=O)Nc3ccc4c(c3)OCO4)c2)cc1] | 3-(N-(benzo[d][1,3]dioxol-5-yl)sulfamoyl)-N-(4-methoxyphenyl)benzamide |
| I-277 | 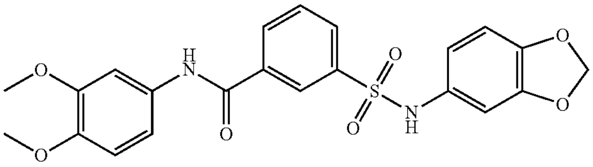 [SMILES: COc1ccc(NC(=O)c2cccc(S(=O)(=O)Nc3ccc4c(c3)OCO4)c2)cc1OC] | 3-(N-(benzo[d][1,3]dioxol-5-yl)sulfamoyl)-N-(3,4-dimethoxyphenyl)benzamide |

TABLE 1-continued

| ID | Structure | Name |
|---|---|---|
| I-278 | 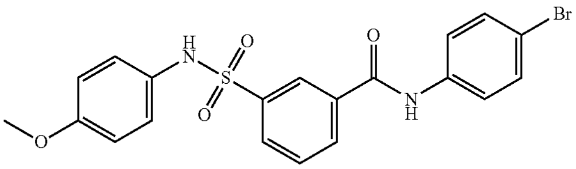 [SMILES: COc1ccc(NS(=O)(=O)c2cccc(C(=O)Nc3ccc(Br)cc3)c2)cc1] | N-(4-bromophenyl)-3-(N-(4-methoxyphenyl)sulfamoyl)benzamide |
| I-279 | 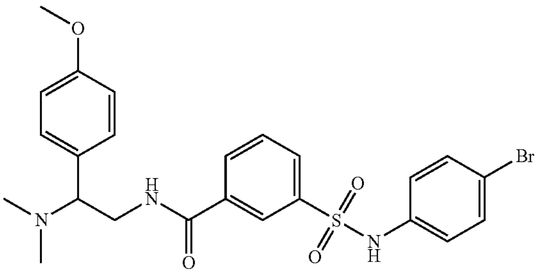 [SMILES: COc1ccc(C(CNC(=O)c2cccc(S(=O)(=O)Nc3ccc(Br)cc3)c2)N(C)C)cc1] | 3-(N-(4-bromophenyl)sulfamoyl)-N-(2-(dimethylamino)-2-(4-methoxyphenyl)ethyl)benzamide |
| I-280 | 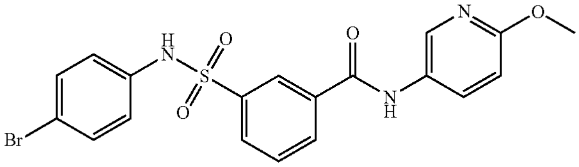 | 3-(N-(4-bromophenyl)sulfamoyl)-N-(6-methoxypyridin-3-yl)benzamide |
| I-281 | 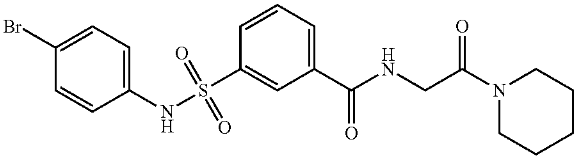 [SMILES: O=C(NCC(=O)N1CCCCC1)c1cccc(S(=O)(=O)Nc2ccc(Br)cc2)c1] | 3-(N-(4-bromophenyl)sulfamoyl)-N-(2-oxo-2-(piperidin-1-yl)ethyl)benzamide |
| I-282 | 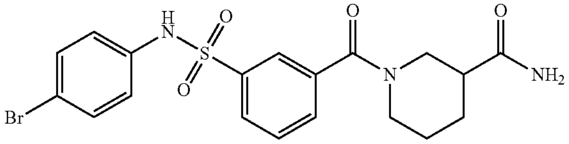 [SMILES: NC(=O)C1CCCN(C(=O)c2cccc(S(=O)(=O)Nc3ccc(Br)cc3)c2)C1] | 1-(3-(N-(4-bromophenyl)sulfamoyl)benzoyl)piperidine-3-carboxamide |
| I-283 | 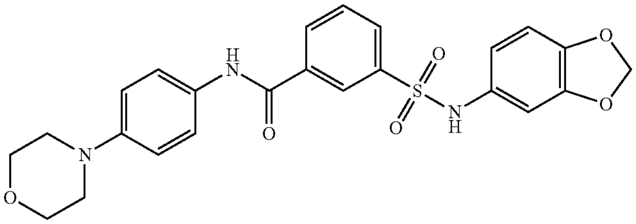 [SMILES: O=C(Nc1ccc(N2CCOCC2)cc1)c1cccc(S(=O)(=O)Nc2ccc3c(c2)OCO3)c1] | 3-(N-(benzo[d][1,3]dioxol-5-yl)sulfamoyl)-N-(4-morpholinophenyl)benzamide |
| I-284 | 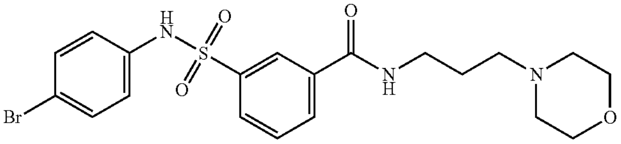 [SMILES: O=C(NCCCN1CCOCC1)c1cccc(S(=O)(=O)Nc2ccc(Br)cc2)c1] | 3-(N-(4-bromophenyl)sulfamoyl)-N-(3-morpholinopropyl)benzamide |
| I-285 | 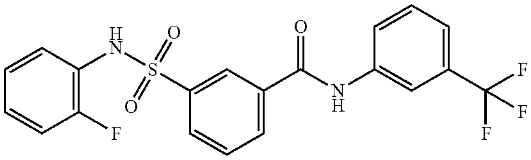 [SMILES: O=C(Nc1cccc(C(F)(F)F)c1)c1cccc(S(=O)(=O)Nc2ccccc2F)c1] | 3-(N-(2-fluorophenyl)sulfamoyl)-N-(3-(trifluoromethyl)phenyl)benzamide |

TABLE 1-continued

| ID | Structure | Name |
| --- | --- | --- |
| I-286 | 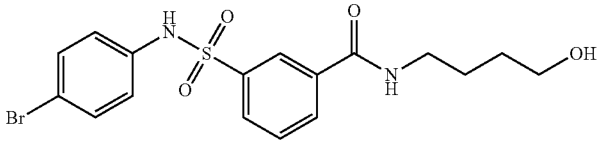 [SMILES: O=C(NCCCCO)c1cccc(S(=O)(=O)Nc2ccc(Br)cc2)c1] | 3-(N-(4-bromophenyl)sulfamoyl)-N-(4-hydroxybutyl)benzamide |
| I-287 | 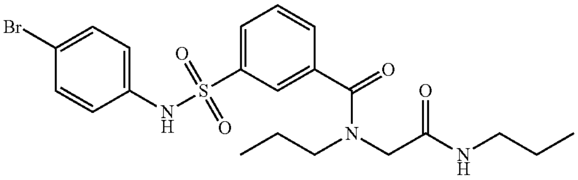 [SMILES: CCCNC(=O)CN(CCC)C(=O)c1cccc(S(=O)(=O)Nc2ccc(Br)cc2)c1] | 3-(N-(4-bromophenyl)sulfamoyl)-N-(2-oxo-2-(propylamino)ethyl)-N-propylbenzamide |
| I-288 | 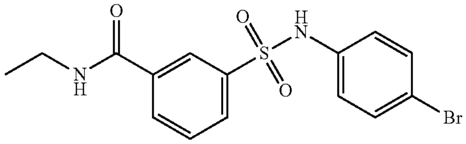 [SMILES: CCNC(=O)c1cccc(S(=O)(=O)Nc2ccc(Br)cc2)c1] | 3-(N-(4-bromophenyl)sulfamoyl)-N-ethylbenzamide |
| I-289 | 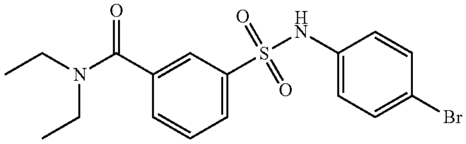 [SMILES: CCN(CC)C(=O)c1cccc(S(=O)(=O)Nc2ccc(Br)cc2)c1] | 3-(N-(4-bromophenyl)sulfamoyl)-N,N-diethylbenzamide |
| I-290 | 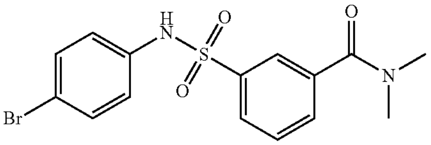 [SMILES: CN(C)C(=O)c1cccc(S(=O)(=O)Nc2ccc(Br)cc2)c1] | 3-(N-(4-bromophenyl)sulfamoyl)-N,N-dimethylbenzamide |
| I-291 | 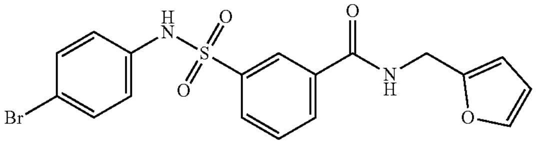 [SMILES: O=C(NCc1ccco1)c1cccc(S(=O)(=O)Nc2ccc(Br)cc2)c1] | 3-(N-(4-bromophenyl)sulfamoyl)-N-(furan-2-ylmethyl)benzamide |
| I-292 | 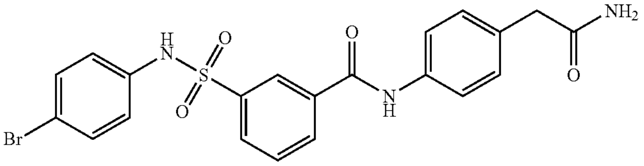 [SMILES: NC(=O)Cc1ccc(NC(=O)c2cccc(S(=O)(=O)Nc3ccc(Br)cc3)c2)cc1] | N-(4-(2-amino-2-oxoethyl)phenyl)-3-(N-(4-bromophenyl)sulfamoyl)benzamide |
| I-293 | 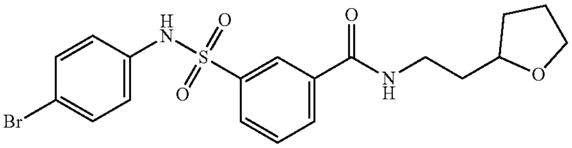 [SMILES: O=C(NCCC1CCCO1)c1cccc(S(=O)(=O)Nc2ccc(Br)cc2)c1] | 3-(N-(4-bromophenyl)sulfamoyl)-N-(2-(tetrahydrofuran-2-yl)ethyl)benzamide |
| I-294 | 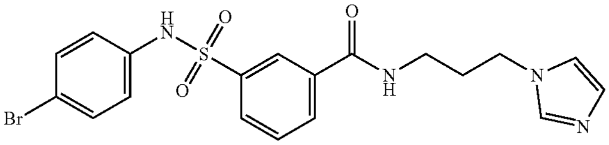 [SMILES: O=C(NCCCn1ccnc1)c1cccc(S(=O)(=O)Nc2ccc(Br)cc2)c1] | N-(3-(1H-imidazol-1-yl)propyl)-3-(N-(4-bromophenyl)sulfamoyl)benzamide |

TABLE 1-continued

| ID | Structure | Name |
| --- | --- | --- |
| I-295 | 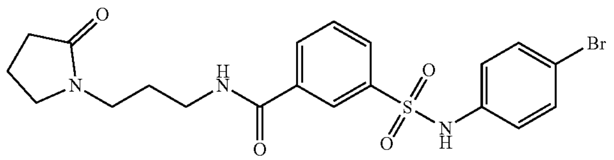 [SMILES: O=C(NCCCN1CCCC1=O)c1cccc(S(=O)(=O)Nc2ccc(Br)cc2)c1] | 3-(N-(4-bromophenyl)sulfamoyl)-N-(3-(2-oxopyrrolidin-1-yl)propyl)benzamide |
| I-296 | 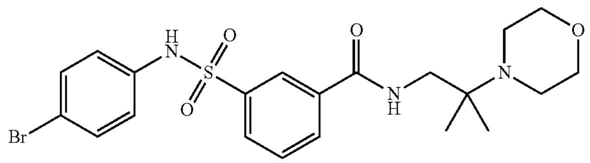 [SMILES: CC(C)(CNC(=O)c1cccc(S(=O)(=O)Nc2ccc(Br)cc2)c1)N1CCOCC1] | 3-(N-(4-bromophenyl)sulfamoyl)-N-(2-methyl-2-morpholinopropyl)benzamide |
| I-297 | 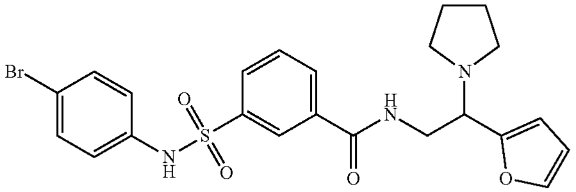 [SMILES: O=C(NCC(c1ccco1)N1CCCC1)c1cccc(S(=O)(=O)Nc2ccc(Br)cc2)c1] | 3-(N-(4-bromophenyl)sulfamoyl)-N-(2-(furan-2-yl)-2-(pyrrolidin-1-yl)ethyl)benzamide |
| I-298 | 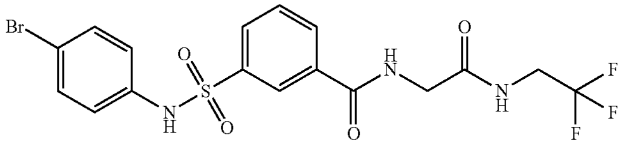 [SMILES: O=C(CNC(=O)c1cccc(S(=O)(=O)Nc2ccc(Br)cc2)c1)NCC(F)(F)F] | 3-(N-(4-bromophenyl)sulfamoyl)-N-(2-oxo-2-((2,2,2-trifluoroethyl)amino)ethyl)benzamide |
| I-299 | 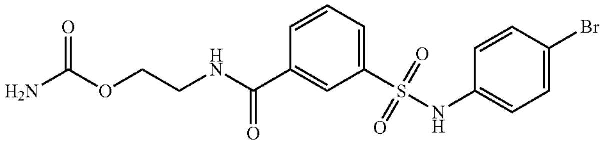 [SMILES: NC(=O)OCCNC(=O)c1cccc(S(=O)(=O)Nc2ccc(Br)cc2)c1] | 2-(3-(N-(4-bromophenyl)sulfamoyl)benzamido)ethyl carbamate |
| I-300 | 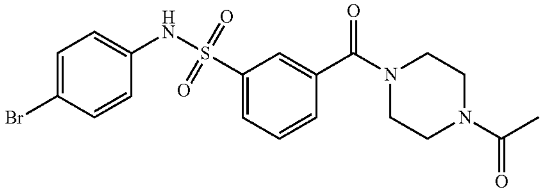 [SMILES: CC(=O)N1CCN(C(=O)c2cccc(S(=O)(=O)Nc3ccc(Br)cc3)c2)CC1] | 3-(4-acetylpiperazine-1-carbonyl)-N-(4-bromophenyl)benzenesulfonamide |
| I-301 | 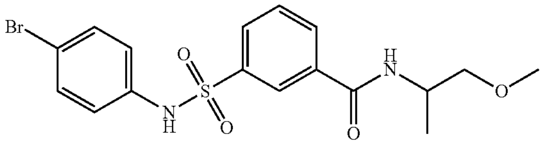 [SMILES: COCC(C)NC(=O)c1cccc(S(=O)(=O)Nc2ccc(Br)cc2)c1] | 3-(N-(4-bromophenyl)sulfamoyl)-N-(1-methoxypropan-2-yl)benzamide |
| I-302 | 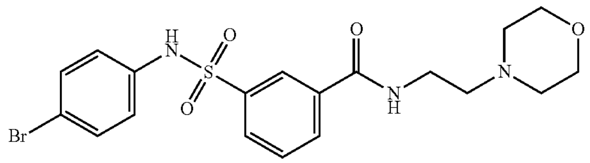 [SMILES: O=C(NCCN1CCOCC1)c1cccc(S(=O)(=O)Nc2ccc(Br)cc2)c1] | 3-(N-(4-bromophenyl)sulfamoyl)-N-(2-morpholinoethyl)benzamide |
| I-303 | 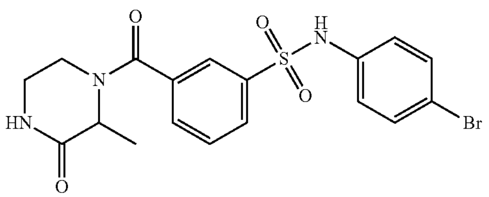 [SMILES: CC1C(=O)NCCN1C(=O)c1cccc(S(=O)(=O)Nc2ccc(Br)cc2)c1] | N-(4-bromophenyl)-3-(2-methyl-3-oxopiperazine-1-carbonyl)benzenesulfonamide |

TABLE 1-continued

| ID | Structure | Name |
|---|---|---|
| I-304 | 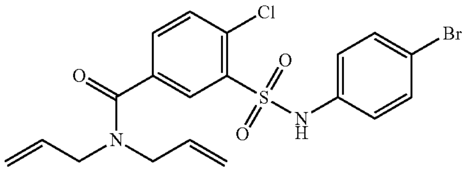 [SMILES: C=CCN(CC=C)C(=O)c1ccc(Cl)c(S(=O)(=O)Nc2ccc(Br)cc2)c1] | N,N-diallyl-3-(N-(4-bromophenyl)sulfamoyl)-4-chlorobenzamide |
| I-305 | 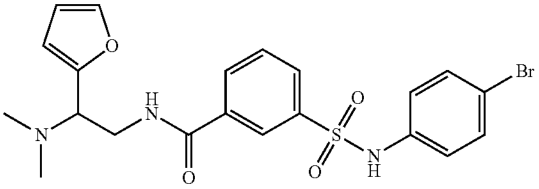 [SMILES: CN(C)C(CNC(=O)c1cccc(S(=O)(=O)Nc2ccc(Br)cc2)c1)c1ccco1] | 3-(N-(4-bromophenyl)sulfamoyl)-N-(2-(dimethylamino)-2-(furan-2-yl)ethyl)benzamide |
| I-306 | 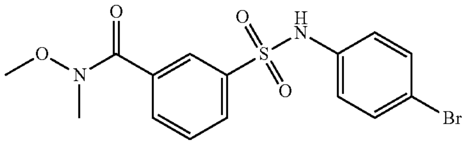 [SMILES: CON(C)C(=O)c1cccc(S(=O)(=O)Nc2ccc(Br)cc2)c1] | 3-(N-(4-bromophenyl)sulfamoyl)-N-methoxy-N-methylbenzamide |
| I-307 | 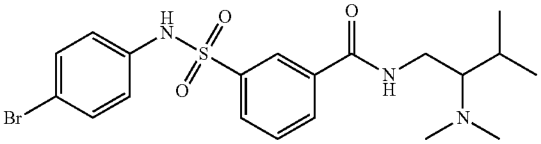 [SMILES: CC(C)C(CNC(=O)c1cccc(S(=O)(=O)Nc2ccc(Br)cc2)c1)N(C)C] | 3-(N-(4-bromophenyl)sulfamoyl)-N-(2-(dimethylamino)-3-methylbutyl)benzamide |
| I-308 | 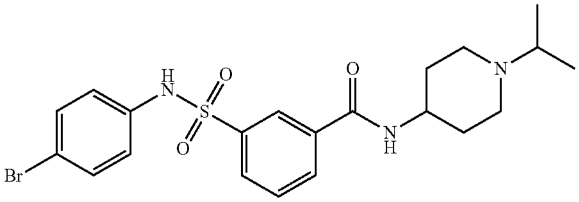 [SMILES: CC(C)N1CCC(NC(=O)c2cccc(S(=O)(=O)Nc3ccc(Br)cc3)c2)CC1] | 3-(N-(4-bromophenyl)sulfamoyl)-N-(1-isopropylpiperidin-4-yl)benzamide |
| I-309 | 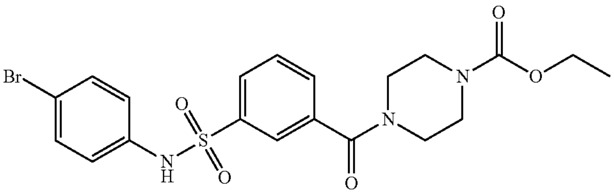 [SMILES: CCOC(=O)N1CCN(C(=O)c2cccc(S(=O)(=O)Nc3ccc(Br)cc3)c2)CC1] | ethyl 4-(3-(N-(4-bromophenyl)sulfamoyl)benzoyl)piperazine-1-carboxylate |
| I-310 | 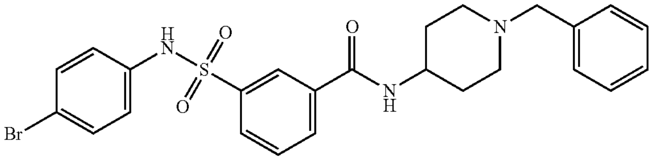 [SMILES: O=C(NC1CCN(Cc2ccccc2)CC1)c1cccc(S(=O)(=O)Nc2ccc(Br)cc2)c1] | N-(1-benzylpiperidin-4-yl)-3-(N-(4-bromophenyl)sulfamoyl)benzamide |
| I-311 | 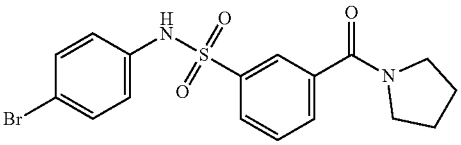 [SMILES: O=C(c1cccc(S(=O)(=O)Nc2ccc(Br)cc2)c1)N1CCCC1] | N-(4-bromophenyl)-3-(pyrrolidine-1-carbonyl)benzenesulfonamide |

TABLE 1-continued

| ID | Structure | Name |
| --- | --- | --- |
| I-312 | 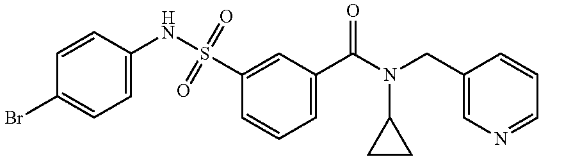 [SMILES: O=C(c1cccc(S(=O)(=O)Nc2ccc(Br)cc2)c1)N(Cc1cccnc1)C1CC1] | 3-(N-(4-bromophenyl)sulfamoyl)-N-cyclopropyl-N-(pyridin-3-ylmethyl)benzamide |
| I-313 | 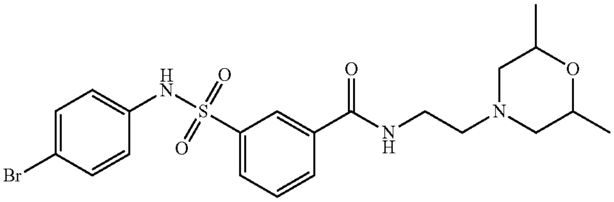 [SMILES: CC1CN(CCNC(=O)c2cccc(S(=O)(=O)Nc3ccc(Br)cc3)c2)CC(C)O1] | 3-(N-(4-bromophenyl)sulfamoyl)-N-(2-(2,6-dimethylmorpholino)ethyl)benzamide |
| I-314 | 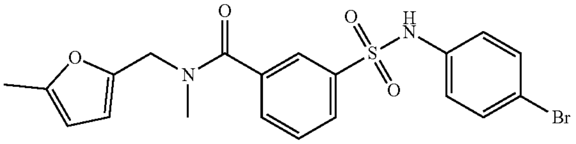 [SMILES: Cc1ccc(CN(C)C(=O)c2cccc(S(=O)(=O)Nc3ccc(Br)cc3)c2)o1] | 3-(N-(4-bromophenyl)sulfamoyl)-N-methyl-N-((5-methylfuran-2-yl)methyl)benzamide |
| I-315 | 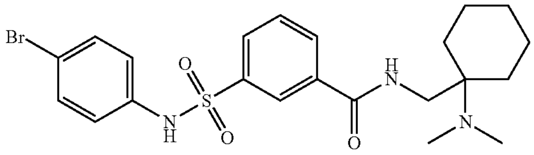 [SMILES: CN(C)C1(CNC(=O)c2cccc(S(=O)(=O)Nc3ccc(Br)cc3)c2)CCCCC1] | 3-(N-(4-bromophenyl)sulfamoyl)-N-((1-(dimethylamino)cyclohexyl)methyl)benzamide |
| I-316 | 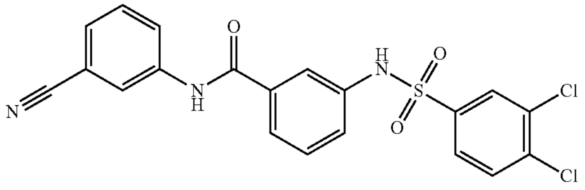 [SMILES: N#Cc1cccc(NC(=O)c2cccc(NS(=O)(=O)c3ccc(Cl)c(Cl)c3)c2)c1] | N-(3-cyanophenyl)-3-((3,4-dichlorophenyl)sulfonamido)benzamide |
| I-317 | 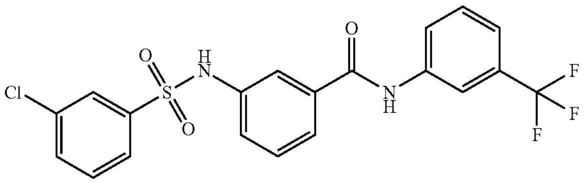 [SMILES: O=C(Nc1cccc(C(F)(F)F)c1)c1cccc(NS(=O)(=O)c2cccc(Cl)c2)c1] | 3-((3-chlorophenyl)sulfonamido)-N-(3-(trifluoromethyl)phenyl)benzamide |
| I-318 | 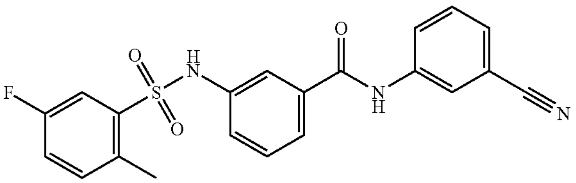 [SMILES: Cc1ccc(F)cc1S(=O)(=O)Nc1cccc(C(=O)Nc2cccc(C#N)c2)c1] | N-(3-cyanophenyl)-3-((5-fluoro-2-methylphenyl)sulfonamido)benzamide |
| I-319 | 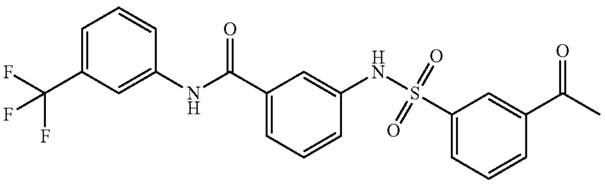 [SMILES: CC(=O)c1cccc(S(=O)(=O)Nc2cccc(C(=O)Nc3cccc(C(F)(F)F)c3)c2)c1] | 3-((3-acetylphenyl)sulfonamido)-N-(3-(trifluoromethyl)phenyl)benzamide |

TABLE 1-continued

| ID | Structure | Name |
| --- | --- | --- |
| I-320 | 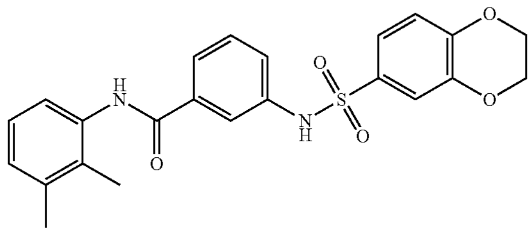 [SMILES: Cc1cccc(NC(=O)c2cccc(NS(=O)(=O)c3ccc4c(c3)OCCO4)c2)c1C] | 3-((2,3-dihydrobenzo[b][1,4]dioxine)-6-sulfonamido)-N-(2,3-dimethylphenyl)benzamide |
| I-321 | 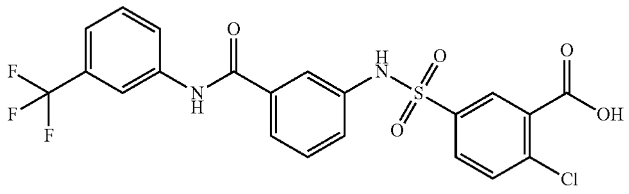 [SMILES: O=C(Nc1cccc(C(F)(F)F)c1)c1cccc(NS(=O)(=O)c2ccc(Cl)c(C(=O)O)c2)c1] | 2-chloro-5-(N-(3-((3-(trifluoromethyl)phenyl)carbamoyl)phenyl) sulfamoyl)benzoic acid |
| I-322 | 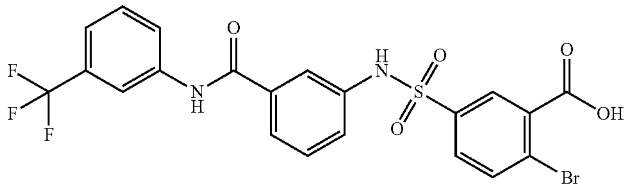 [SMILES: O=C(Nc1cccc(C(F)(F)F)c1)c1cccc(NS(=O)(=O)c2ccc(Br)c(C(=O)O)c2)c1] | 2-bromo-5-(N-(3-((3-(trifluoromethyl)phenyl)carbamoyl)phenyl) sulfamoyl)benzoic acid |
| I-323 | 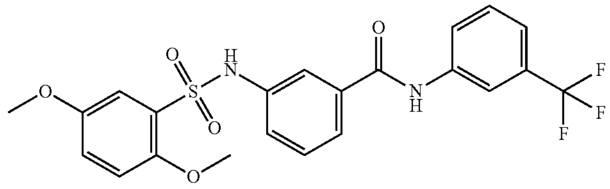 [SMILES: COc1ccc(OC)c(S(=O)(=O)Nc2cccc(C(=O)Nc3cccc(C(F)(F)F)c3)c2)c1] | 3-((2,5-dimethoxyphenyl)sulfonamido)-N-(3-(trifluoromethyl)phenyl)benzamide |
| I-324 | 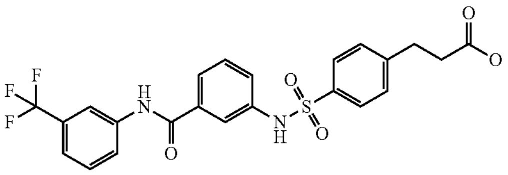 | 3-(4-(N-(3-((3-(trifluoromethyl)phenyl)carbamoyl)phenyl) sulfamoyl)phenyl)propanoic acid |
| I-325 | 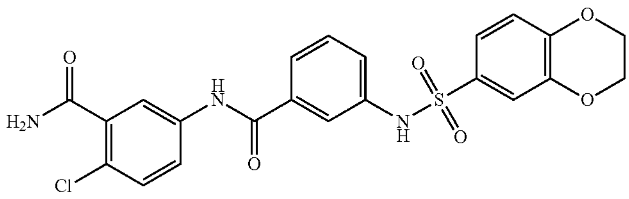 [SMILES: NC(=O)c1cc(NC(=O)c2cccc(NS(=O)(=O)c3ccc4c(c3)OCCO4)c2)ccc1Cl] | N-(3-carbamoyl-4-chlorophenyl)-3-((2,3-dihydrobenzo[b][1,4]dioxine)-6-sulfonamido)benzamide |
| I-326 | 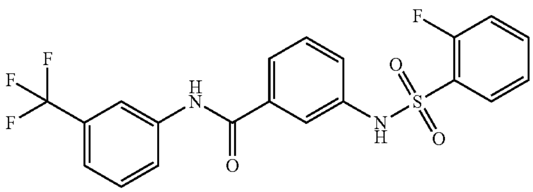 [SMILES: O=C(Nc1cccc(C(F)(F)F)c1)c1cccc(NS(=O)(=O)c2ccccc2F)c1] | 3-((2-fluorophenyl)sulfonamido)-N-(3-(trifluoromethyl)phenyl)benzamide |

TABLE 1-continued

| ID | Structure | Name |
|---|---|---|
| I-327 | 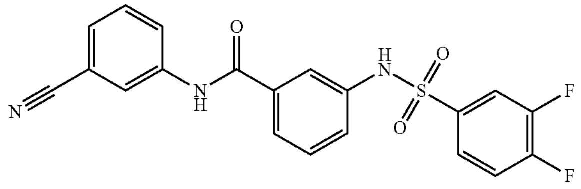 [SMILES: N#Cc1cccc(NC(=O)c2cccc(NS(=O)(=O)c3ccc(F)c(F)c3)c2)c1] | N-(3-cyanophenyl)-3-((3,4-difluorophenyl)sulfonamido)benzamide |
| I-328 | 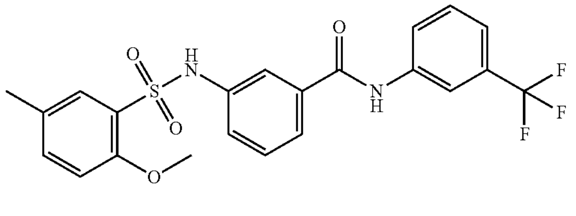 [SMILES: COc1ccc(C)cc1S(=O)(=O)Nc1cccc(C(=O)Nc2cccc(C(F)(F)F)c2)c1] | 3-((2-methoxy-5-methylphenyl)sulfonamido)-N-(3-(trifluoromethyl)phenyl)benzamide |
| I-329 | 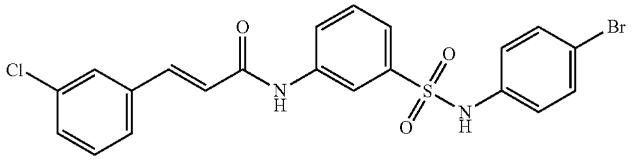 [SMILES: O=C(/C=C/c1cccc(Cl)c1)Nc1cccc(S(=O)(=O)Nc2ccc(Br)cc2)c1] | (E)-N-(3-(N-(4-bromophenyl)sulfamoyl)phenyl)-3-(3-chlorophenyl)acrylamide |
| I-330 | 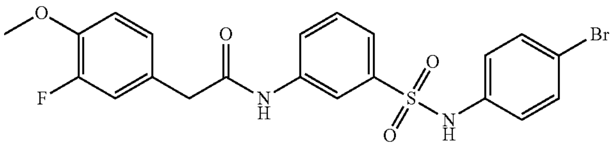 [SMILES: COc1ccc(CC(=O)Nc2cccc(S(=O)(=O)Nc3ccc(Br)cc3)c2)cc1F] | N-(3-(N-(4-bromophenyl)sulfamoyl)phenyl)-2-(3-fluoro-4-methoxyphenyl)acetamide |
| I-331 | 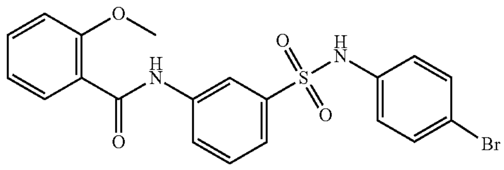 [SMILES: COc1ccccc1C(=O)Nc1cccc(S(=O)(=O)Nc2ccc(Br)cc2)c1] | N-(3-(N-(4-bromophenyl)sulfamoyl)phenyl)-2-methoxybenzamide |
| I-332 | 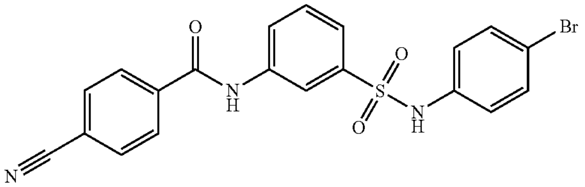 [SMILES: N#Cc1ccc(C(=O)Nc2cccc(S(=O)(=O)Nc3ccc(Br)cc3)c2)cc1] | N-(3-(N-(4-bromophenyl)sulfamoyl)phenyl)-4-cyanobenzamide |
| I-333 | 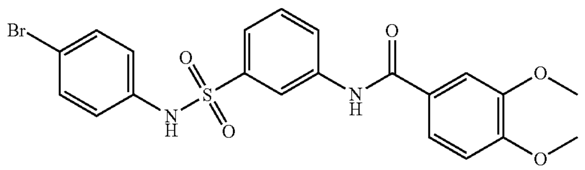 [SMILES: COc1ccc(C(=O)Nc2cccc(S(=O)(=O)Nc3ccc(Br)cc3)c2)cc1OC] | N-(3-(N-(4-bromophenyl)sulfamoyl)phenyl)-3,4-dimethoxybenzamide |
| I-334 | 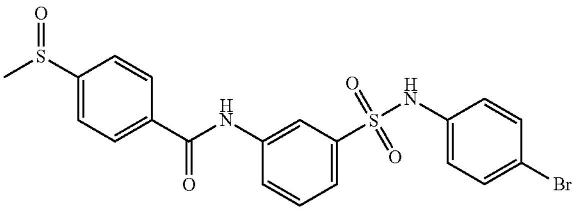 [SMILES: CS(=O)c1ccc(C(=O)Nc2cccc(S(=O)(=O)Nc3ccc(Br)cc3)c2)cc1] | N-(3-(N-(4-bromophenyl)sulfamoyl)phenyl)-4-(methylsulfinyl)benzamide |

TABLE 1-continued

| ID | Structure | Name |
|---|---|---|
| I-335 | 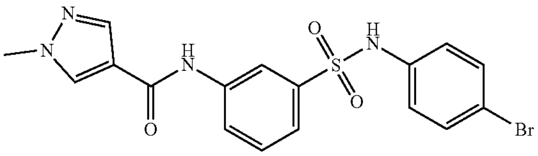 [SMILES: Cn1cc(C(=O)Nc2cccc(S(=O)(=O)Nc3ccc(Br)cc3)c2)cn1] | N-(3-(N-(4-bromophenyl)sulfamoyl)phenyl)-1-methyl-1H-pyrazole-4-carboxamide |
| I-336 | 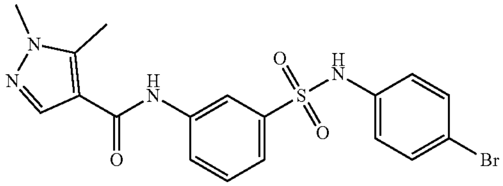 [SMILES: Cc1c(C(=O)Nc2cccc(S(=O)(=O)Nc3ccc(Br)cc3)c2)cnn1C] | N-(3-(N-(4-bromophenyl)sulfamoyl)phenyl)-1,5-dimethyl-1H-pyrazole-4-carboxamide |
| I-337 | 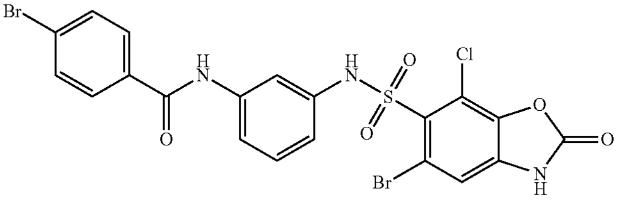 [SMILES: O=C(Nc1cccc(NS(=O)(=O)c2c(Br)cc3[nH]c(=O)oc3c2Cl)c1)c1ccc(Br)cc1] | 4-bromo-N-(3-((5-bromo-7-chloro-2-oxo-2,3-dihydrobenzo[d]oxazole)-6-sulfonamido)phenyl)benzamide |
| I-338 | 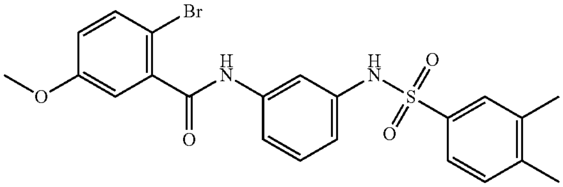 | 2-bromo-N-(3-((3,4-dimethylphenyl)sulfonamido)phenyl)-5-methoxybenzamide |
| I-339 | 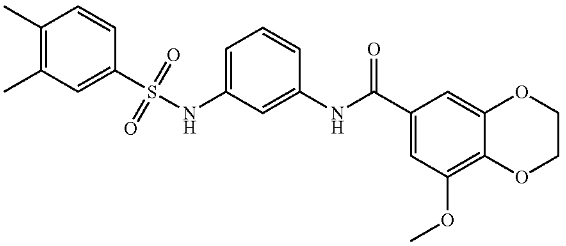 [SMILES: COc1cc(C(=O)Nc2cccc(NS(=O)(=O)c3ccc(C)c(C)c3)c2)cc2c1OCCO2] | N-(3-((3,4-dimethylphenyl)sulfonamido)phenyl)-8-methoxy-2,3-dihydrobenzo[b][1,4]dioxine-6-carboxamide |
| I-340 | 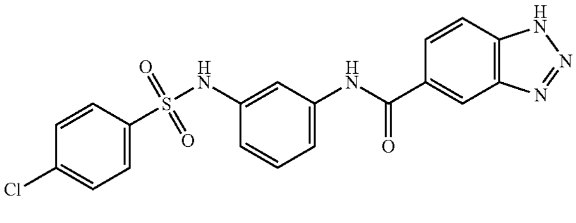 [SMILES: O=C(Nc1cccc(NS(=O)(=O)c2ccc(Cl)cc2)c1)c1ccc2[nH]nnc2c1] | N-(3-((4-chlorophenyl)sulfonamido)phenyl)-1H-benzo[d][1,2,3]triazole-5-carboxamide |
| I-341 | 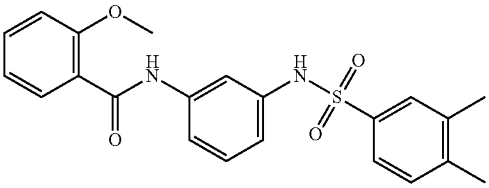 [SMILES: COc1ccccc1C(=O)Nc1cccc(NS(=O)(=O)c2ccc(C)c(C)c2)c1] | N-(3-((3,4-dimethylphenyl)sulfonamido)phenyl)-2-methoxybenzamide |

TABLE 1-continued

| ID | Structure | Name |
|---|---|---|
| I-342 | 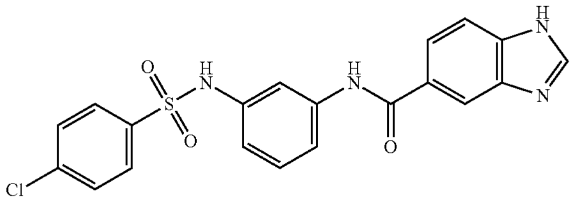 [SMILES: O=C(Nc1cccc(NS(=O)(=O)c2ccc(Cl)cc2)c1)c1ccc2[nH]cnc2c1] | N-(3-((4-chlorophenyl)sulfonamido)phenyl)-1H-benzo[d]imidazole-5-carboxamide |
| I-343 | 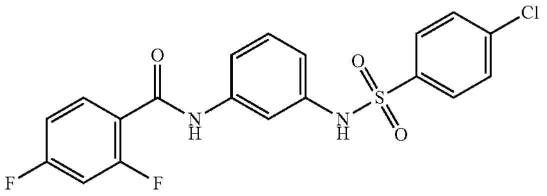 [SMILES: O=C(Nc1cccc(NS(=O)(=O)c2ccc(Cl)cc2)c1)c1ccc(F)cc1F] | N-(3-((4-chlorophenyl)sulfonamido)phenyl)-2,4-difluorobenzamide |
| I-344 | 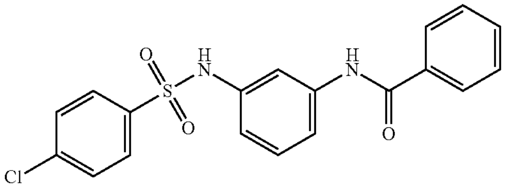 [SMILES: O=C(Nc1cccc(NS(=O)(=O)c2ccc(Cl)cc2)c1)c1ccccc1] | N-(3-((4-chlorophenyl)sulfonamido)phenyl)benzamide |
| I-345 | 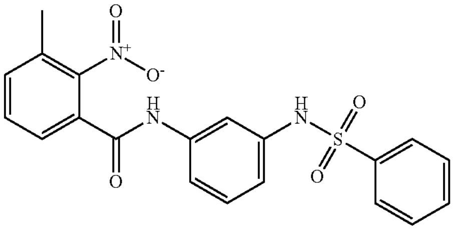 [SMILES: Cc1cccc(C(=O)Nc2cccc(NS(=O)(=O)c3ccccc3)c2)c1[N+](=O)[O-]] | 3-methyl-2-nitro-N-(3-(phenylsulfonamido)phenyl)benzamide |
| I-346 | 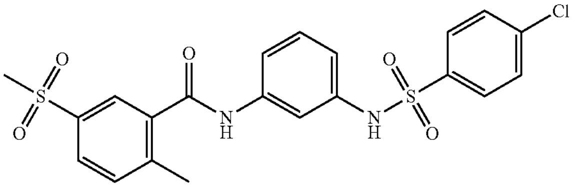 [SMILES: Cc1ccc(S(C)(=O)=O)cc1C(=O)Nc1cccc(NS(=O)(=O)c2ccc(Cl)cc2)c1] | N-(3-((4-chlorophenyl)sulfonamido)phenyl)-2-methyl-5-(methylsulfonyl)benzamide |
| I-347 | 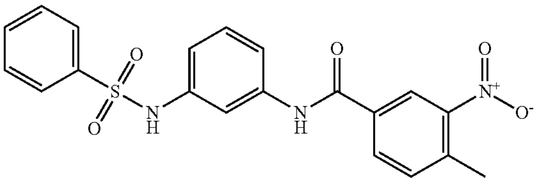 [SMILES: Cc1ccc(C(=O)Nc2cccc(NS(=O)(=O)c3ccccc3)c2)cc1[N+](=O)[O-]] | 4-methyl-3-nitro-N-(3-(phenylsulfonamido)phenyl)benzamide |
| I-348 | 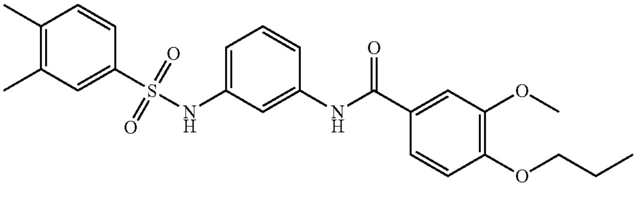 [SMILES: CCCOc1ccc(C(=O)Nc2cccc(NS(=O)(=O)c3ccc(C)c(C)c3)c2)cc1OC] | N-(3-((3,4-dimethylphenyl)sulfonamido)phenyl)-3-methoxy-4-propoxybenzamide |

TABLE 1-continued
| ID | Structure | Name |
| --- | --- | --- |
| I-349 | 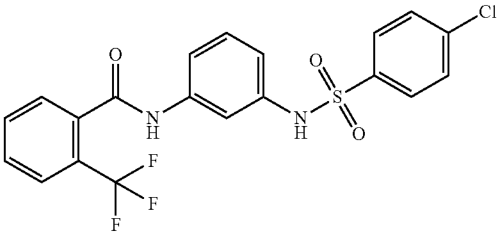 [SMILES: O=C(Nc1cccc(NS(=O)(=O)c2ccc(Cl)cc2)c1)c1ccccc1C(F)(F)F] | N-(3-((4-chlorophenyl)sulfonamido)phenyl)-2-(trifluoromethyl)benzamide |
| I-350 | 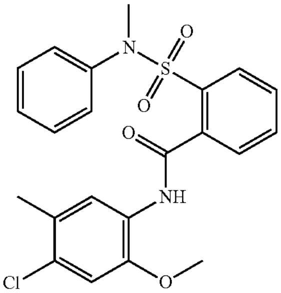 [SMILES: COc1cc(Cl)c(C)cc1NC(=O)c1ccccc1S(=O)(=O)N(C)c1ccccc1] | N-(4-chloro-2-methoxy-5-methylphenyl)-2-(N-methyl-N-phenylsulfamoyl)benzamide |
| I-351 | 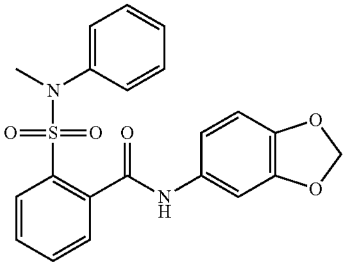 [SMILES: CN(c1ccccc1)S(=O)(=O)c1ccccc1C(=O)Nc1ccc2c(c1)OCO2] | N-(benzo[d][1,3]dioxol-5-yl)-2-(N-methyl-N-phenylsulfamoyl)benzamide |
| I-352 | 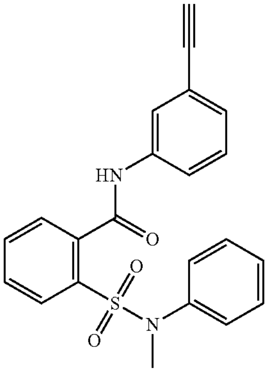 [SMILES: C#Cc1cccc(NC(=O)c2ccccc2S(=O)(=O)N(C)c2ccccc2)c1] | N-(3-ethynylphenyl)-2-(N-methyl-N-phenylsulfamoyl)benzamide |
| I-353 | 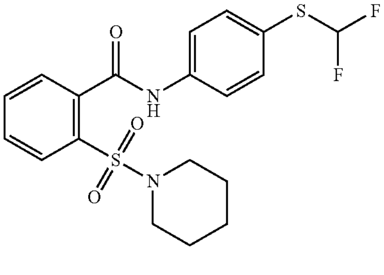 [SMILES: O=C(Nc1ccc(SC(F)F)cc1)c1ccccc1S(=O)(=O)N1CCCCC1] | N-(4-((difluoromethyl)thio)phenyl)-2-(piperidin-1-ylsulfonyl)benzamide |

TABLE 1-continued
| ID | Structure | Name |
|---|---|---|
| I-354 | 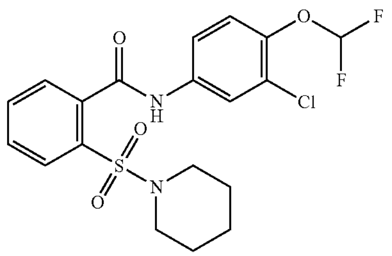 [SMILES: O=C(Nc1ccc(OC(F)F)c(Cl)c1)c1ccccc1S(=O)(=O)N1CCCCC1] | N-(3-chloro-4-(difluoromethoxy)phenyl)-2-(piperidin-1-ylsulfonyl)benzamide |
| I-355 | 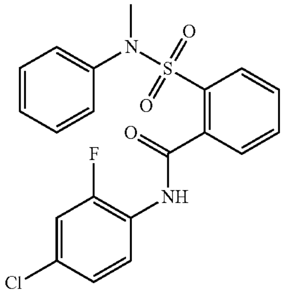 | N-(4-chloro-2-fluorophenyl)-2-(N-methyl-N-phenylsulfamoyl)benzamide |
| I-356 | 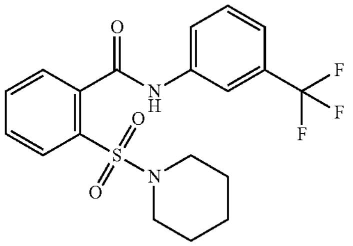 [SMILES: O=C(Nc1cccc(C(F)(F)F)c1)c1ccccc1S(=O)(=O)N1CCCCC1] | 2-(piperidin-1-ylsulfonyl)-N-(3-(trifluoromethyl)phenyl)benzamide |
| I-357 | 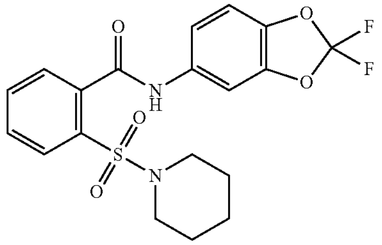 [SMILES: O=C(Nc1ccc2c(c1)OC(F)(F)O2)c1ccccc1S(=O)(=O)N1CCCCC1] | N-(2,2-difluorobenzo[d][1,3]dioxol-5-yl)-2-(piperidin-1-ylsulfonyl)benzamide |
| I-358 | 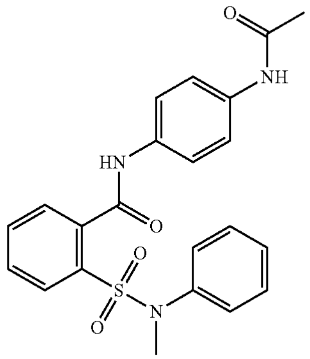 [SMILES: CC(=O)Nc1ccc(NC(=O)c2ccccc2S(=O)(=O)N(C)c2ccccc2)cc1] | N-(4-acetamidophenyl)-2-(N-methyl-N-phenylsulfamoyl)benzamide |

TABLE 1-continued
| ID | Structure | Name |
|---|---|---|
| I-359 | 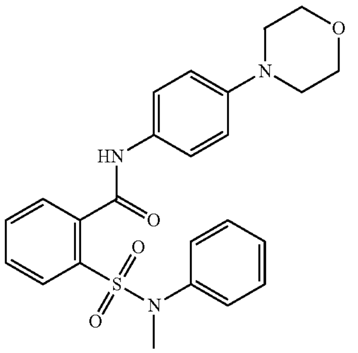 [SMILES: CN(c1ccccc1)S(=O)(=O)c1ccccc1C(=O)Nc1ccc(N2CCOCC2)cc1] | 2-(N-methyl-N-phenylsulfamoyl)-N-(4-morpholinophenyl)benzamide |
| I-360 | 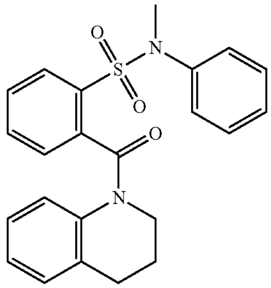 [SMILES: CN(c1ccccc1)S(=O)(=O)c1ccccc1C(=O)N1CCCc2ccccc21] | N-methyl-N-phenyl-2-(1,2,3,4-tetrahydroquinoline-1-carbonyl)benzenesulfonamide |
| I-361 | 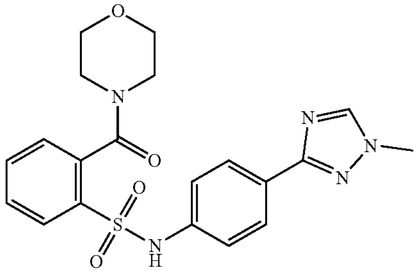 [SMILES: Cn1cnc(-c2ccc(NS(=O)(=O)c3ccccc3C(=O)N3CCOCC3)cc2)n1] | N-(4-(1-methyl-1H-1,2,4-triazol-3-yl)phenyl)-2-(morpholine-4-carbonyl)benzenesulfonamide |
| I-362 | 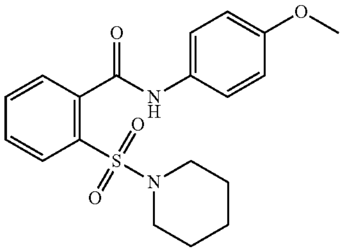 [SMILES: COc1ccc(NC(=O)c2ccccc2S(=O)(=O)N2CCCCC2)cc1] | N-(4-methoxyphenyl)-2-(piperidin-1-ylsulfonyl)benzamide |
| I-363 | 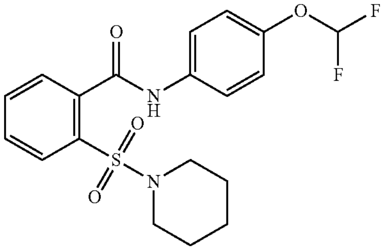 | N-(4-(difluoromethoxy)phenyl)-2-(piperidin-1-ylsulfonyl)benzamide |

TABLE 1-continued
| ID | Structure | Name |
|---|---|---|
| I-364 | 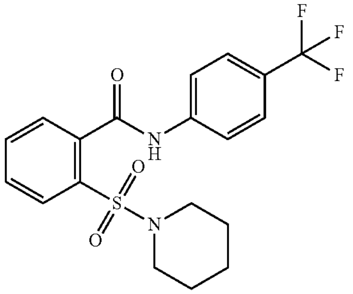 [SMILES: O=C(Nc1ccc(C(F)(F)F)cc1)c1ccccc1S(=O)(=O)N1CCCCC1] | 2-(piperidin-1-ylsulfonyl)-N-(4-(trifluoromethyl)phenyl)benzamide |
| I-365 | 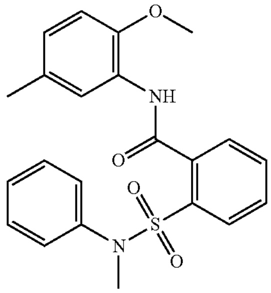 [SMILES: COc1ccc(C)cc1NC(=O)c1ccccc1S(=O)(=O)N(C)c1ccccc1] | N-(2-methoxy-5-methylphenyl)-2-(N-methyl-N-phenylsulfamoyl)benzamide |
| I-366 | 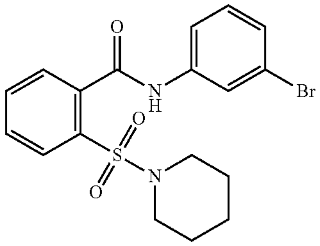 [SMILES: O=C(Nc1cccc(Br)c1)c1ccccc1S(=O)(=O)N1CCCCC1] | N-(3-bromophenyl)-2-(piperidin-1-ylsulfonyl)benzamide |
| I-367 | 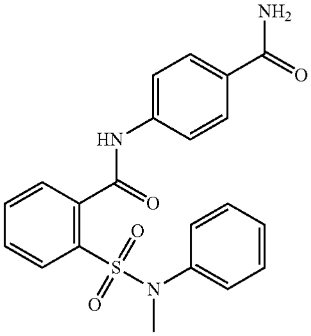 [SMILES: CN(c1ccccc1)S(=O)(=O)c1ccccc1C(=O)Nc1ccc(C(N)=O)cc1] | N-(4-carbamoylphenyl)-2-(N-methyl-N-phenylsulfamoyl)benzamide |
| I-368 | 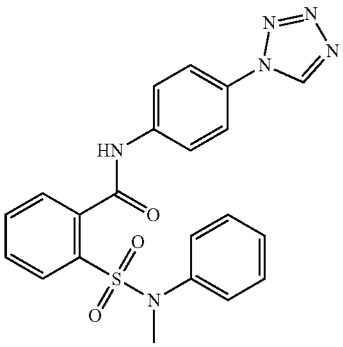 [SMILES: CN(c1ccccc1)S(=O)(=O)c1ccccc1C(=O)Nc1ccc(-n2cnnn2)cc1] | N-(4-(1H-tetrazol-1-yl)phenyl)-2-(N-methyl-N-phenylsulfamoyl)benzamide |

TABLE 1-continued
| ID | Structure | Name |
| --- | --- | --- |
| I-369 | 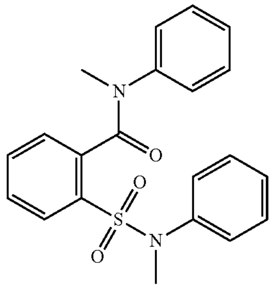 [SMILES: CN(C(=O)c1ccccc1S(=O)(=O)N(C)c1ccccc1)c1ccccc1] | N-methyl-2-(N-methyl-N-phenylsulfamoyl)-N-phenylbenzamide |
| I-370 | 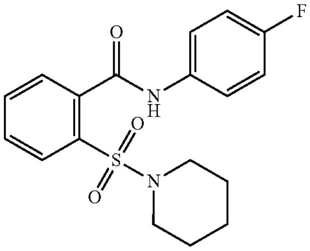 [SMILES: O=C(Nc1ccc(F)cc1)c1ccccc1S(=O)(=O)N1CCCCC1] | N-(4-fluorophenyl)-2-(piperidin-1-ylsulfonyl)benzamide |
| I-371 | 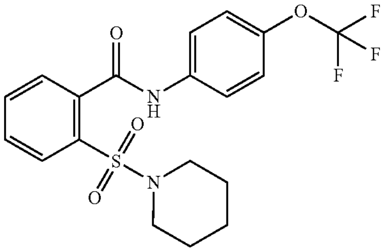 [SMILES: O=C(Nc1ccc(OC(F)(F)F)cc1)c1ccccc1S(=O)(=O)N1CCCCC1] | 2-(piperidin-1-ylsulfonyl)-N-(4-(trifluoromethoxy)phenyl)benzamide |
| I-372 | 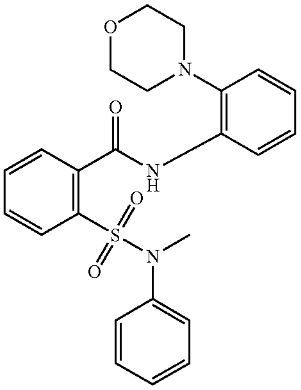 [SMILES: CN(c1ccccc1)S(=O)(=O)c1ccccc1C(=O)Nc1ccccc1N1CCOCC1] | 2-(N-methyl-N-phenylsulfamoyl)-N-(2-morpholinophenyl)benzamide |

TABLE 1-continued
| ID | Structure | Name |
|---|---|---|
| I-373 | 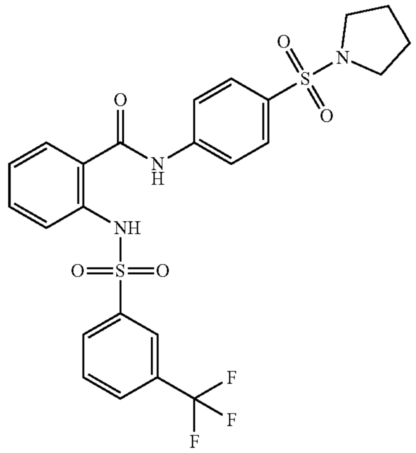 [SMILES: O=C(Nc1ccc(S(=O)(=O)N2CCCC2)cc1)c1ccccc1NS(=O)(=O)c1cccc(C(F)(F)F)c1] | N-(4-(pyrrolidin-1-ylsulfonyl)phenyl)-2-((3-(trifluoromethyl)phenyl)sulfonamido)benzamide |
| I-374 | 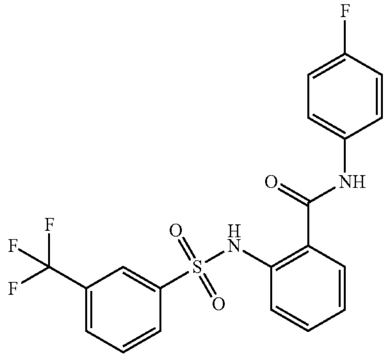 [SMILES: O=C(Nc1ccc(F)cc1)c1ccccc1NS(=O)(=O)c1cccc(C(F)(F)F)c1] | N-(4-fluorophenyl)-2-((3-(trifluoromethyl)phenyl)sulfonamido)benzamide |
| I-375 | 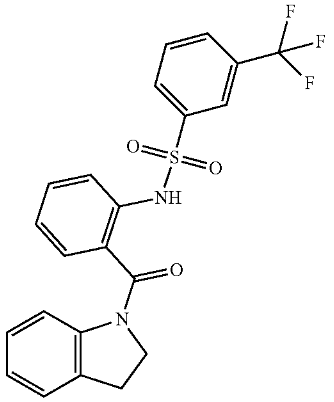 [SMILES: O=C(c1ccccc1NS(=O)(=O)c1cccc(C(F)(F)F)c1)N1CCc2ccccc21] | N-(2-(indoline-1-carbonyl)phenyl)-3-(trifluoromethyl)benzenesulfonamide |
| I-376 | 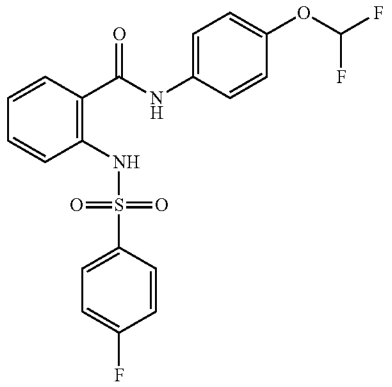 [SMILES: O=C(Nc1ccc(OC(F)F)cc1)c1ccccc1NS(=O)(=O)c1ccc(F)cc1] | N-(4-(difluoromethoxy)phenyl)-2-((4-fluorophenyl)sulfonamido)benzamide |

TABLE 1-continued
| ID | Structure | Name |
| --- | --- | --- |
| I-377 | 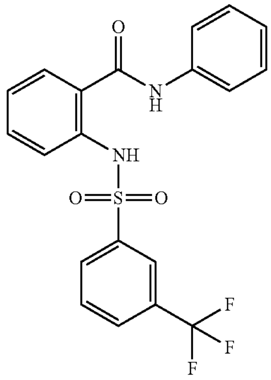 [SMILES: O=C(Nc1ccccc1)c1ccccc1NS(=O)(=O)c1cccc(C(F)(F)F)c1] | N-phenyl-2-((3-(trifluoromethyl)phenyl)sulfonamido) benzamide |
| I-378 | 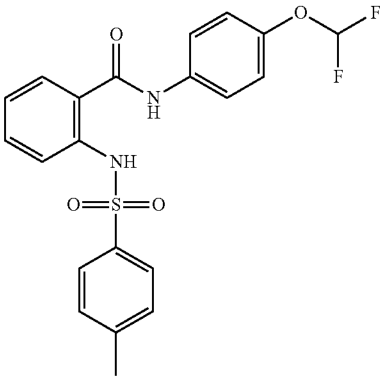 [SMILES: Cc1ccc(S(=O)(=O)Nc2ccccc2C(=O)Nc2ccc(OC(F)F)cc2)cc1] | N-(4-(difluoromethoxy)phenyl)-2-((4-methylphenyl)sulfonamido)benzamide |
| I-379 | 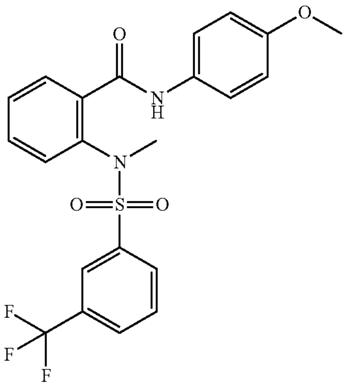 [SMILES: COc1ccc(NC(=O)c2ccccc2N(C)S(=O)(=O)c2cccc(C(F)(F)F)c2)cc1] | N-(4-methoxyphenyl)-2-((N-methyl-3-(trifluoromethyl)phenyl)sulfonamido) benzamide |
| I-380 | 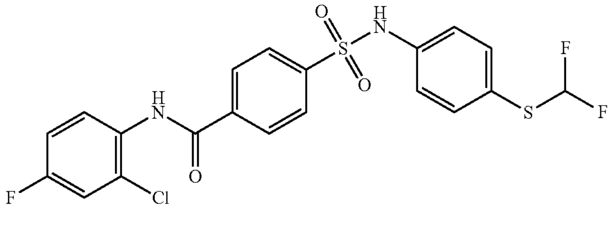 [SMILES: O=C(Nc1ccc(F)cc1Cl)c1ccc(S(=O)(=O)Nc2ccc(SC(F)F)cc2)cc1] | N-(2-chloro-4-fluorophenyl)-4-(N-(4-((difluoromethyl)thio)phenyl)sulfamoyl) benzamide |

TABLE 1-continued
| ID | Structure | Name |
|---|---|---|
| I-381 | 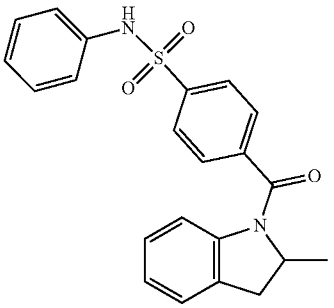 [SMILES: CC1Cc2ccccc2N1C(=O)c1ccc(S(=O)(=O)Nc2ccccc2)cc1] | 4-(2-methylindoline-1-carbonyl)-N-phenylbenzenesulfonamide |
| I-382 | 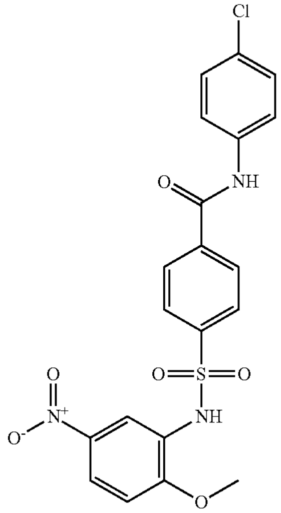 [SMILES: COc1ccc([N+](=O)[O-])cc1NS(=O)(=O)c1ccc(C(=O)Nc2ccc(Cl)cc2)cc1] | N-(4-chlorophenyl)-4-(N-(2-methoxy-5-nitrophenyl)sulfamoyl)benzamide |
| I-383 | 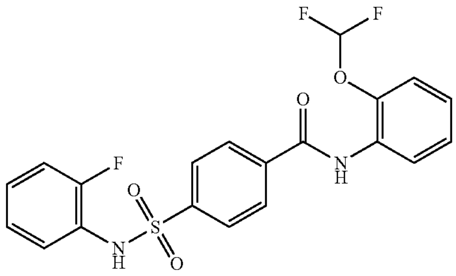 [SMILES: O=C(Nc1ccccc1OC(F)F)c1ccc(S(=O)(=O)Nc2ccccc2F)cc1] | N-(2-(difluoromethoxy)phenyl)-4-(N-(2-fluorophenyl)sulfamoyl)benzamide |
| I-384 | 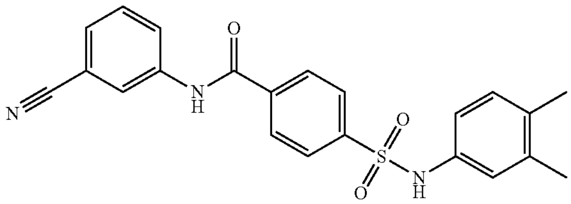 [SMILES: Cc1ccc(NS(=O)(=O)c2ccc(C(=O)Nc3cccc(C#N)c3)cc2)cc1C] | N-(3-cyanophenyl)-4-(N-(3,4-dimethylphenyl)sulfamoyl)benzamide |

TABLE 1-continued

| ID | Structure | Name |
|---|---|---|
| I-385 | 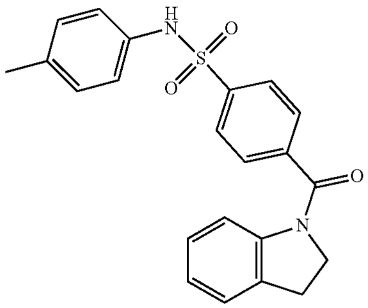 [SMILES: Cc1ccc(NS(=O)(=O)c2ccc(C(=O)N3CCc4ccccc43)cc2)cc1] | 4-(indoline-1-carbonyl)-N-(p-tolyl)benzenesulfonamide |
| I-386 | 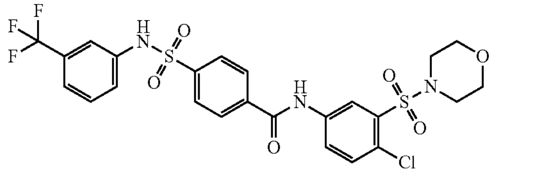 [SMILES: O=C(Nc1ccc(Cl)c(S(=O)(=O)N2CCOCC2)c1)c1ccc(S(=O)(=O)Nc2cccc(C(F)(F)F)c2)cc1] | N-(4-chloro-3-(morpholinosulfonyl)phenyl)-4-(N-(3-(trifluoromethyl)phenyl)sulfamoyl)benzamide |
| I-387 | 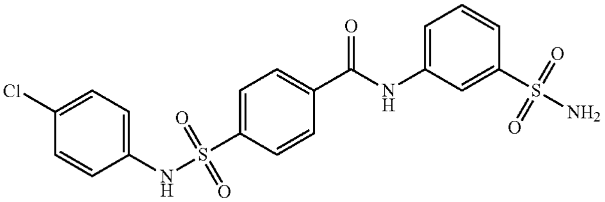 [SMILES: NS(=O)(=O)c1cccc(NC(=O)c2ccc(S(=O)(=O)Nc3ccc(Cl)cc3)cc2)c1] | 4-(N-(4-chlorophenyl)sulfamoyl)-N-(3-sulfamoylphenyl)benzamide |
| I-388 | 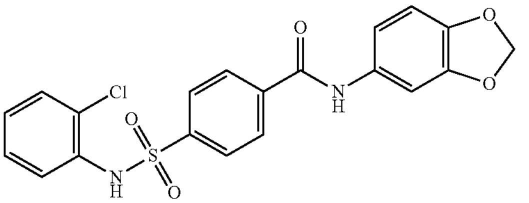 | N-(benzo[d][1,3]dioxol-5-yl)-4-(N-(2-chlorophenyl)sulfamoyl)benzamide |
| I-389 | 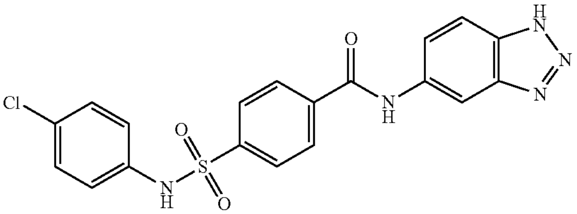 [SMILES: O=C(Nc1ccc2[nH]nnc2c1)c1ccc(S(=O)(=O)Nc2ccc(Cl)cc2)cc1] | N-(1H-benzo[d][1,2,3]triazol-5-yl)-4-(N-(4-chlorophenyl)sulfamoyl)benzamide |
| I-390 | 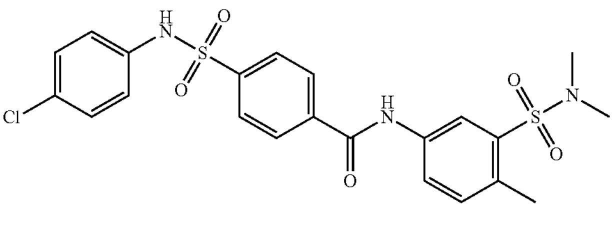 [SMILES: Cc1ccc(NC(=O)c2ccc(S(=O)(=O)Nc3ccc(Cl)cc3)cc2)cc1S(=O)(=O)N(C)C] | 4-(N-(4-chlorophenyl)sulfamoyl)-N-(3-(N,N-dimethylsulfamoyl)-4-methylphenyl)benzamide |

TABLE 1-continued
| ID | Structure | Name |
|---|---|---|
| I-391 | 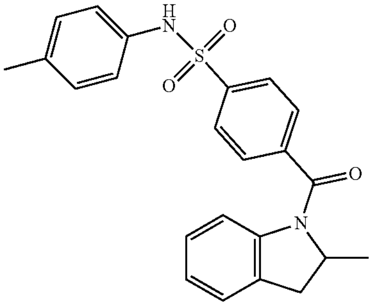 | 4-(2-methylindoline-1-carbonyl)-N-(p-tolyl)benzenesulfonamide |
| I-392 | 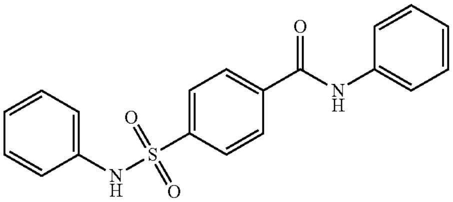 [SMILES: O=C(Nc1ccccc1)c1ccc(S(=O)(=O)Nc2ccccc2)cc1] | N-phenyl-4-(N-phenylsulfamoyl)benzamide |
| I-393 | 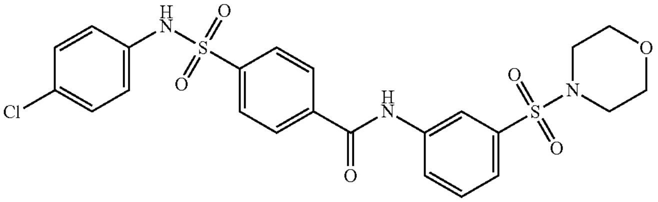 [SMILES: O=C(Nc1cccc(S(=O)(=O)N2CCOCC2)c1)c1ccc(S(=O)(=O)Nc2ccc(Cl)cc2)cc1] | 4-(N-(4-chlorophenyl)sulfamoyl)-N-(3-(morpholinosulfonyl)phenyl)benzamide |
| I-394 | 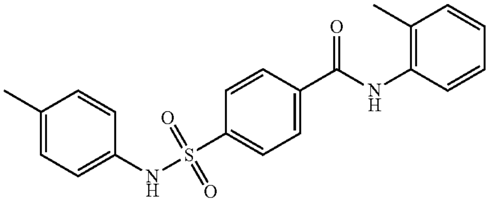 [SMILES: Cc1ccc(NS(=O)(=O)c2ccc(C(=O)Nc3ccccc3C)cc2)cc1] | N-(o-tolyl)-4-(N-(p-tolyl)sulfamoyl)benzamide |
| I-395 | 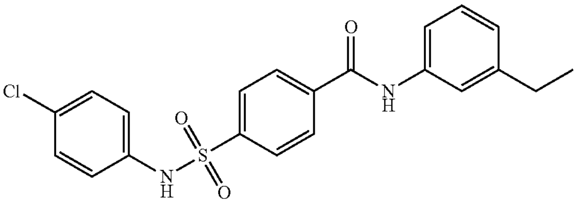 [SMILES: CCc1cccc(NC(=O)c2ccc(S(=O)(=O)Nc3ccc(Cl)cc3)cc2)c1] | 4-(N-(4-chlorophenyl)sulfamoyl)-N-(3-ethylphenyl)benzamide |
| I-396 | 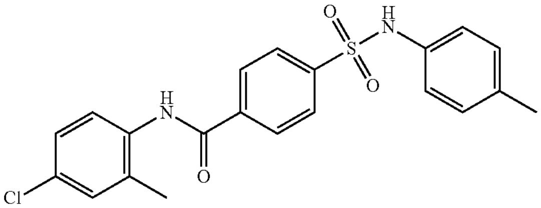 [SMILES: Cc1ccc(NS(=O)(=O)c2ccc(C(=O)Nc3ccc(Cl)cc3C)cc2)cc1] | N-(4-chloro-2-methylphenyl)-4-(N-(p-tolyl)sulfamoyl)benzamide |

TABLE 1-continued

| ID | Structure | Name |
|---|---|---|
| I-397 | 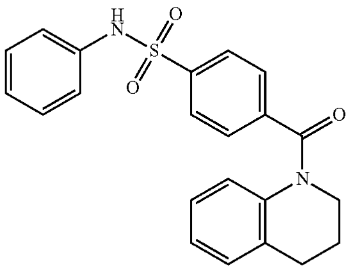 [SMILES: O=C(c1ccc(S(=O)(=O)Nc2ccccc2)cc1)N1CCCc2ccccc21] | N-phenyl-4-(1,2,3,4-tetrahydroquinoline-1-carbonyl)benzenesulfonamide |
| I-398 | 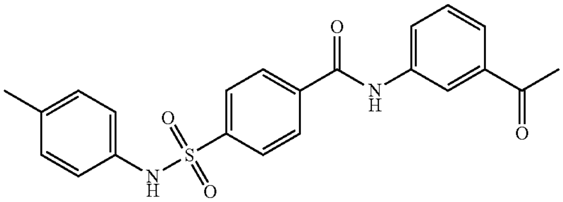 [SMILES: CC(=O)c1cccc(NC(=O)c2ccc(S(=O)(=O)Nc3ccc(C)cc3)cc2)c1] | N-(3-acetylphenyl)-4-(N-(p-tolyl)sulfamoyl)benzamide |
| I-399 | 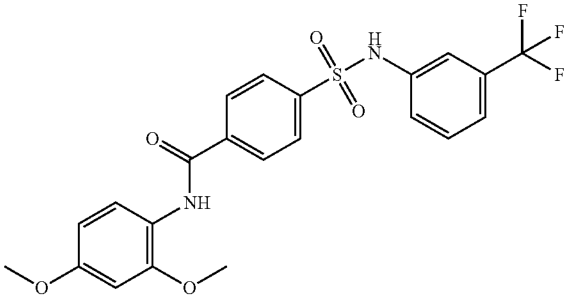 [SMILES: COc1ccc(NC(=O)c2ccc(S(=O)(=O)Nc3cccc(C(F)(F)F)c3)cc2)c(OC)c1] | N-(2,4-dimethoxyphenyl)-4-(N-(3-(trifluoromethyl)phenyl)sulfamoyl)benzamide |
| I-400 | 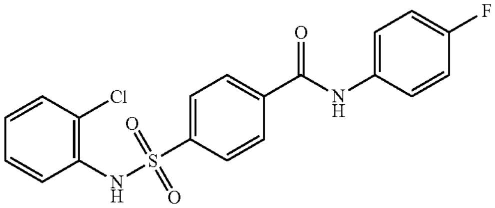 [SMILES: O=C(Nc1ccc(F)cc1)c1ccc(S(=O)(=O)Nc2ccccc2Cl)cc1] | 4-(N-(2-chlorophenyl)sulfamoyl)-N-(4-fluorophenyl)benzamide |
| I-401 | 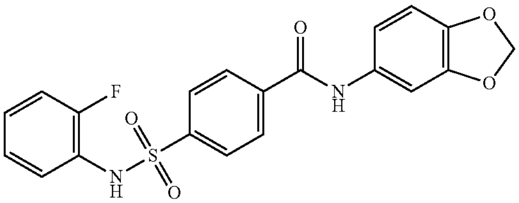 | N-(benzo[d][1,3]dioxol-5-yl)-4-(N-(2-fluorophenyl)sulfamoyl)benzamide |
| I-402 | 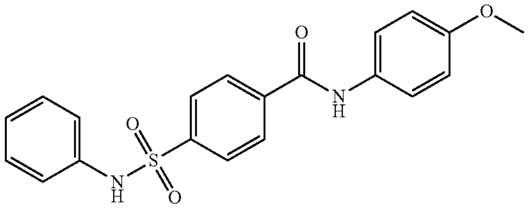 [SMILES: COc1ccc(NC(=O)c2ccc(S(=O)(=O)Nc3ccccc3)cc2)cc1] | N-(4-methoxyphenyl)-4-(N-phenylsulfamoyl)benzamide |

TABLE 1-continued

| ID | Structure | Name |
|---|---|---|
| I-403 | 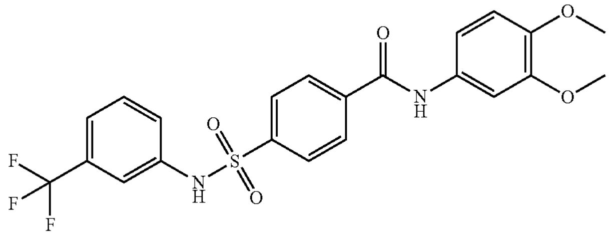 [SMILES: COc1ccc(NC(=O)c2ccc(S(=O)(=O)Nc3cccc(C(F)(F)F)c3)cc2)cc1OC] | N-(3,4-dimethoxyphenyl)-4-(N-(3-(trifluoromethyl)phenyl)sulfamoyl)benzamide |
| I-404 | 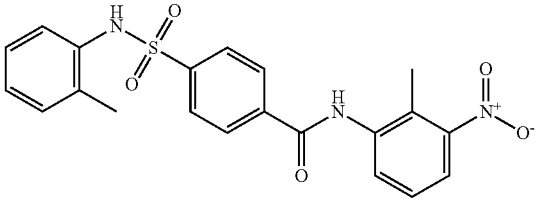 [SMILES: Cc1ccccc1NS(=O)(=O)c1ccc(C(=O)Nc2cccc([N+](=O)[O-])c2C)cc1] | N-(2-methyl-3-nitrophenyl)-4-(N-(o-tolyl)sulfamoyl)benzamide |
| I-405 | 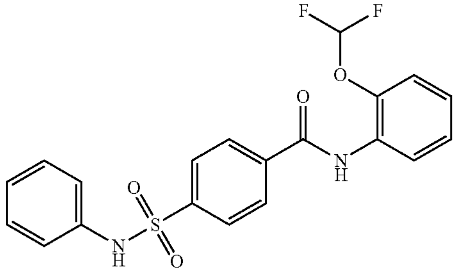 [SMILES: O=C(Nc1ccccc1OC(F)F)c1ccc(S(=O)(=O)Nc2ccccc2)cc1] | N-(2-(difluoromethoxy)phenyl)-4-(N-phenylsulfamoyl)benzamide |
| I-406 | 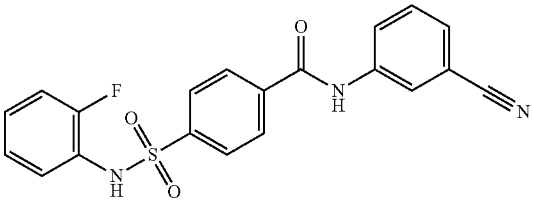 [SMILES: N#Cc1cccc(NC(=O)c2ccc(S(=O)(=O)Nc3ccccc3F)cc2)c1] | N-(3-cyanophenyl)-4-(N-(2-fluorophenyl)sulfamoyl)benzamide |
| I-407 | 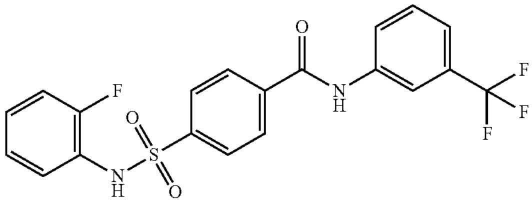 [SMILES: O=C(Nc1cccc(C(F)(F)F)c1)c1ccc(S(=O)(=O)Nc2ccccc2F)cc1] | 4-(N-(2-fluorophenyl)sulfamoyl)-N-(3-(trifluoromethyl)phenyl)benzamide |
| I-408 | 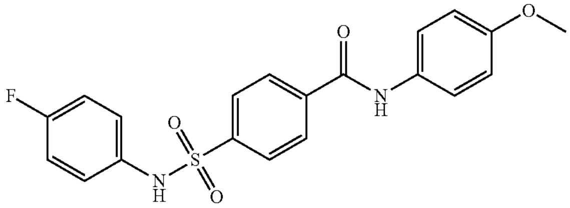 [SMILES: COc1ccc(NC(=O)c2ccc(S(=O)(=O)Nc3ccc(F)cc3)cc2)cc1] | 4-(N-(4-fluorophenyl)sulfamoyl)-N-(4-methoxyphenyl)benzamide |
| I-409 | 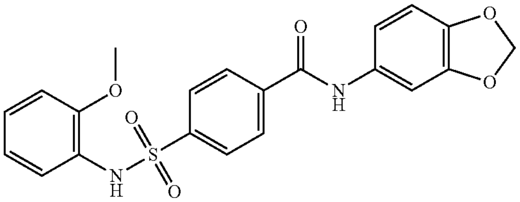 [SMILES: COc1ccccc1NS(=O)(=O)c1ccc(C(=O)Nc2ccc3c(c2)OCO3)cc1] | N-(benzo[d][1,3]dioxol-5-yl)-4-(N-(2-methoxyphenyl)sulfamoyl)benzamide |

TABLE 1-continued

| ID | Structure | Name |
| --- | --- | --- |
| I-410 | 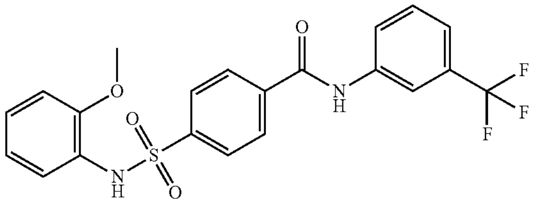 [SMILES: COc1ccccc1NS(=O)(=O)c1ccc(C(=O)Nc2cccc(C(F)(F)F)c2)cc1] | 4-(N-(2-methoxyphenyl)sulfamoyl)-N-(3-(trifluoromethyl)phenyl)benzamide |
| I-411 | 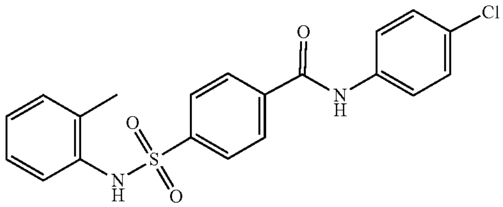 [SMILES: Cc1ccccc1NS(=O)(=O)c1ccc(C(=O)Nc2ccc(Cl)cc2)cc1] | N-(4-chlorophenyl)-4-(N-(o-tolyl)sulfamoyl)benzamide |
| I-412 | 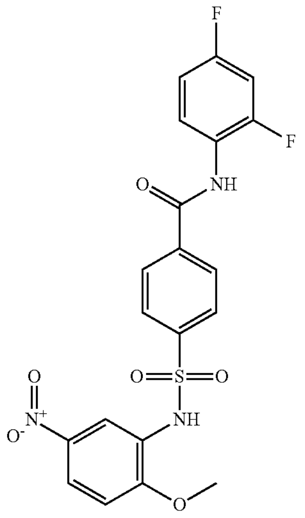 | N-(2,4-difluorophenyl)-4-(N-(2-methoxy-5-nitrophenyl)sulfamoyl)benzamide |
| I-413 | 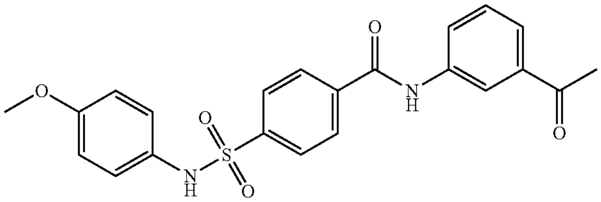 [SMILES: COc1ccc(NS(=O)(=O)c2ccc(C(=O)Nc3cccc(C(C)=O)c3)cc2)cc1] | N-(3-acetylphenyl)-4-(N-(4-methoxyphenyl)sulfamoyl)benzamide |
| I-414 | 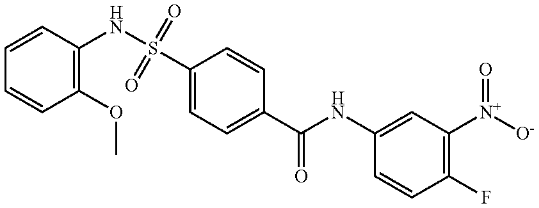 [SMILES: COc1ccccc1NS(=O)(=O)c1ccc(C(=O)Nc2ccc(F)c([N+](=O)[O-])c2)cc1] | N-(4-fluoro-3-nitrophenyl)-4-(N-(2-methoxyphenyl)sulfamoyl)benzamide |
| I-415 | 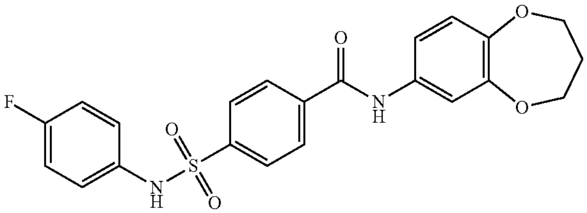 [SMILES: O=C(Nc1ccc2c(c1)OCCCO2)c1ccc(S(=O)(=O)Nc2ccc(F)cc2)cc1] | N-(3,4-dihydro-2H-benzo[b][1,4]dioxepin-7-yl)-4-(N-(4-fluorophenyl)sulfamoyl)benzamide |

TABLE 1-continued

| ID | Structure | Name |
|---|---|---|
| I-416 | 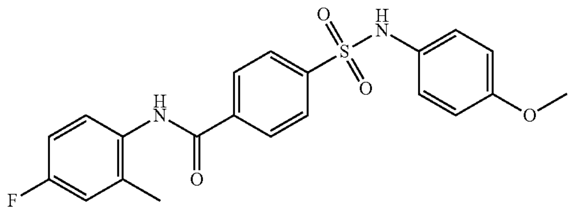 [SMILES: COc1ccc(NS(=O)(=O)c2ccc(C(=O)Nc3ccc(F)cc3C)cc2)cc1] | N-(4-fluoro-2-methylphenyl)-4-(N-(4-methoxyphenyl)sulfamoyl)benzamide |
| I-417 | 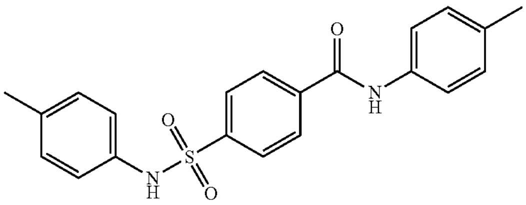 | N-(p-tolyl)-4-(N-(p-tolyl)sulfamoyl)benzamide |
| I-418 | 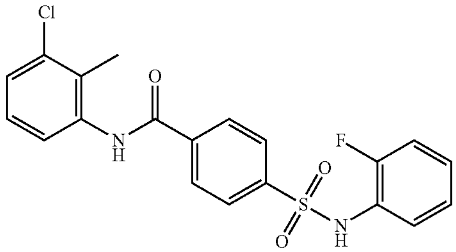 [SMILES: Cc1c(Cl)cccc1NC(=O)c1ccc(S(=O)(=O)Nc2ccccc2F)cc1] | N-(3-chloro-2-methylphenyl)-4-(N-(2-fluorophenyl)sulfamoyl)benzamide |
| I-419 | 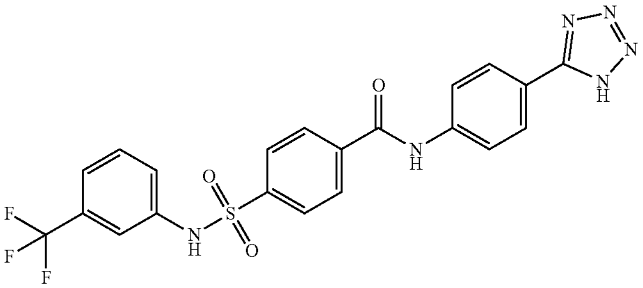 [SMILES: O=C(Nc1ccc(-c2nnn[nH]2)cc1)c1ccc(S(=O)(=O)Nc2cccc(C(F)(F)F)c2)cc1] | N-(4-(1H-tetrazol-5-yl)phenyl)-4-(N-(3-(trifluoromethyl)phenyl)sulfamoyl)benzamide |
| I-420 | 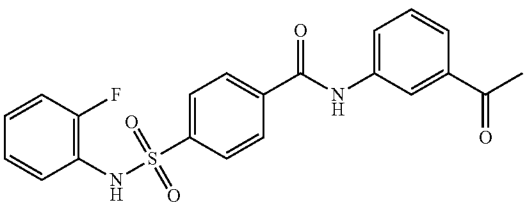 [SMILES: CC(=O)c1cccc(NC(=O)c2ccc(S(=O)(=O)Nc3ccccc3F)cc2)c1] | N-(3-acetylphenyl)-4-(N-(2-fluorophenyl)sulfamoyl)benzamide |
| I-421 | 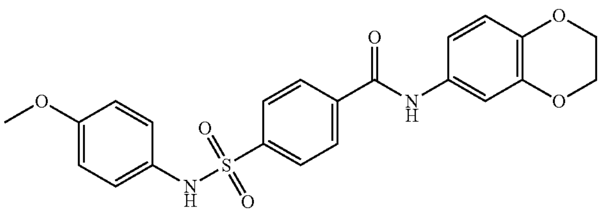 [SMILES: COc1ccc(NS(=O)(=O)c2ccc(C(=O)Nc3ccc4c(c3)OCCO4)cc2)cc1] | N-(2,3-dihydrobenzo[b][1,4]dioxin-6-yl)-4-(N-(4-methoxyphenyl)sulfamoyl)benzamide |

TABLE 1-continued
| ID | Structure | Name |
| --- | --- | --- |
| I-422 | 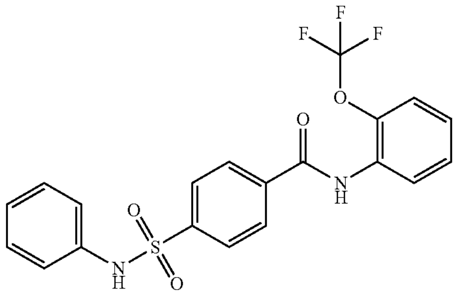 [SMILES: O=C(Nc1ccccc1OC(F)(F)F)c1ccc(S(=O)(=O)Nc2ccccc2)cc1] | 4-(N-phenylsulfamoyl)-N-(2-(trifluoromethoxy)phenyl)benzamide |
| I-423 | 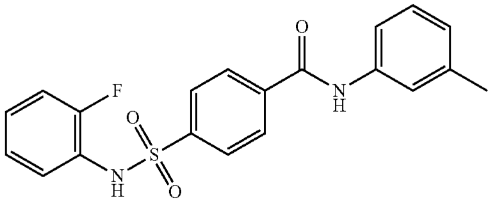 [SMILES: Cc1cccc(NC(=O)c2ccc(S(=O)(=O)Nc3ccccc3F)cc2)c1] | 4-(N-(2-fluorophenyl)sulfamoyl)-N-(m-tolyl)benzamide |
| I-424 | 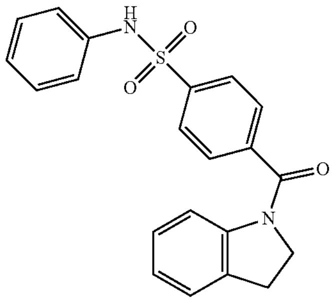 [SMILES: O=C(c1ccc(S(=O)(=O)Nc2ccccc2)cc1)N1CCc2ccccc21] | 4-(indoline-1-carbonyl)-N-phenylbenzenesulfonamide |
| I-425 | 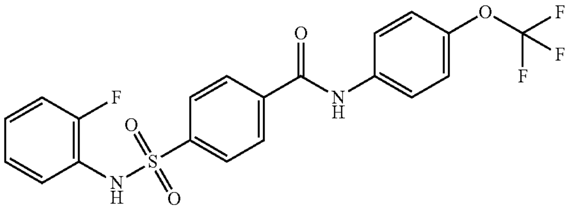 [SMILES: O=C(Nc1ccc(OC(F)(F)F)cc1)c1ccc(S(=O)(=O)Nc2ccccc2F)cc1] | 4-(N-(2-fluorophenyl)sulfamoyl)-N-(4-(trifluoromethoxy)phenyl)benzamide |
| I-426 | 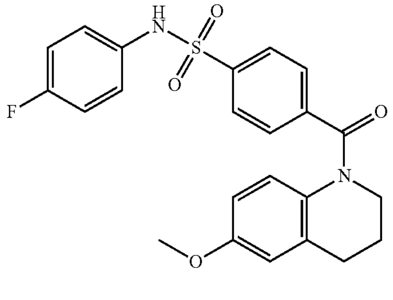 [SMILES: COc1ccc2c(c1)CCCN2C(=O)c1ccc(S(=O)(=O)Nc2ccc(F)cc2)cc1] | N-(4-fluorophenyl)-4-(6-methoxy-1,2,3,4-tetrahydroquinoline-1-carbonyl)benzenesulfonamide |

TABLE 1-continued
| ID | Structure | Name |
|---|---|---|
| I-427 | 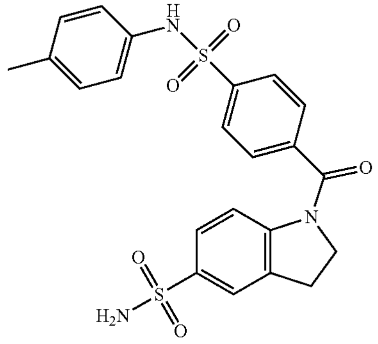 [SMILES: Cc1ccc(NS(=O)(=O)c2ccc(C(=O)N3CCc4cc(S(N)(=O)=O)ccc43)cc2)cc1] | 1-(4-(N-(p-tolyl)sulfamoyl)benzoyl)indoline-5-sulfonamide |
| I-428 | 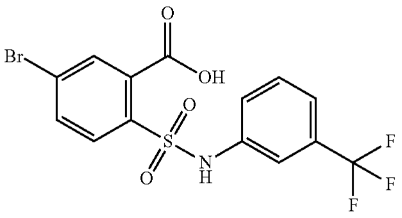 [SMILES: O=C(O)c1cc(Br)ccc1S(=O)(=O)Nc1cccc(C(F)(F)F)c1] | 5-bromo-2-(N-(3-(trifluoromethyl)phenyl)sulfamoyl)benzoic acid |
| I-429 | 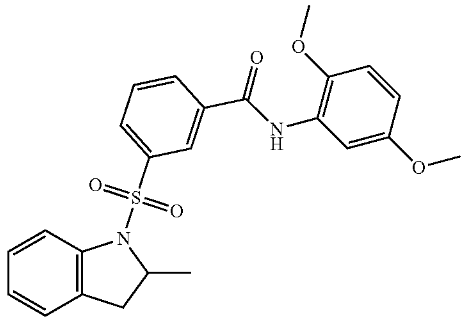 [SMILES: COc1ccc(OC)c(NC(=O)c2cccc(S(=O)(=O)N3c4ccccc4CC3C)c2)c1] | N-(2,5-dimethoxyphenyl)-3-((2-methylindolin-1-yl)sulfonyl)benzamide |
| I-430 | 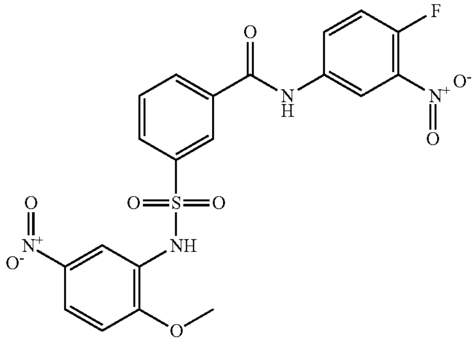 | N-(4-fluoro-3-nitrophenyl)-3-(N-(2-methoxy-5-nitrophenyl)sulfamoyl)benzamide |
| I-431 | 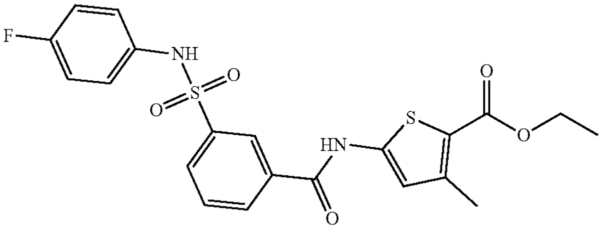 [SMILES: CCOC(=O)c1sc(NC(=O)c2cccc(S(=O)(=O)Nc3ccc(F)cc3)c2)cc1C] | ethyl 5-(3-(N-(4-fluorophenyl)sulfamoyl)benzamido)-3-methylthiophene-2-carboxylate |

TABLE 1-continued

| ID | Structure | Name |
| --- | --- | --- |
| I-432 | 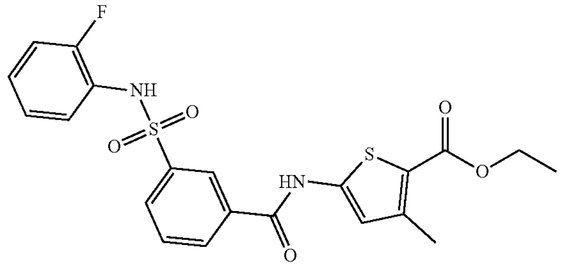 [SMILES: CCOC(=O)c1sc(NC(=O)c2cccc(S(=O)(=O)Nc3ccccc3F)c2)cc1C] | ethyl 5-(3-(N-(2-fluorophenyl)sulfamoyl)benzamido)-3-methylthiophene-2-carboxylate |
| I-433 | 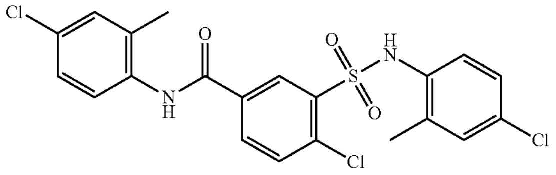 [SMILES: Cc1cc(Cl)ccc1NC(=O)c1ccc(Cl)c(S(=O)(=O)Nc2ccc(Cl)cc2C)c1] | 4-chloro-N-(4-chloro-2-methylphenyl)-3-(N-(4-chloro-2-methylphenyl)sulfamoyl)benzamide |
| I-434 | 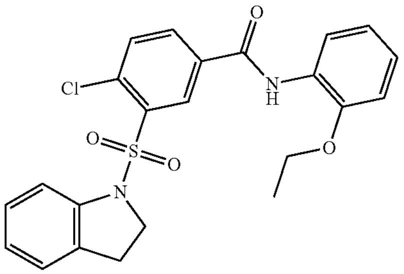 [SMILES: CCOc1ccccc1NC(=O)c1ccc(Cl)c(S(=O)(=O)N2CCc3ccccc32)c1] | 4-chloro-N-(2-ethoxyphenyl)-3-(indolin-1-ylsulfonyl)benzamide |
| I-435 | 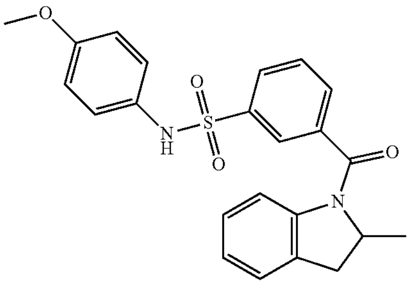 | N-(4-methoxyphenyl)-3-(2-methylindoline-1-carbonyl)benzenesulfonamide |
| I-436 | 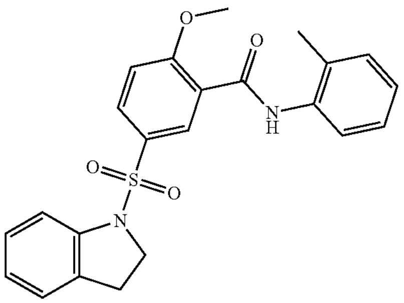 [SMILES: COc1ccc(S(=O)(=O)N2CCc3ccccc32)cc1C(=O)Nc1ccccc1C] | 5-(indolin-1-ylsulfonyl)-2-methoxy-N-(o-tolyl)benzamide |
| I-437 | 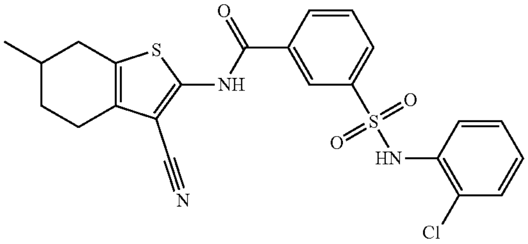 [SMILES: CC1CCc2c(sc(NC(=O)c3cccc(S(=O)(=O)Nc4ccccc4Cl)c3)c2C#N)C1] | 3-(N-(2-chlorophenyl)sulfamoyl)-N-(3-cyano-6-methyl-4,5,6,7-tetrahydrobenzo[b]thiophen-2-yl)benzamide |

TABLE 1-continued

| ID | Structure | Name |
|---|---|---|
| I-438 | 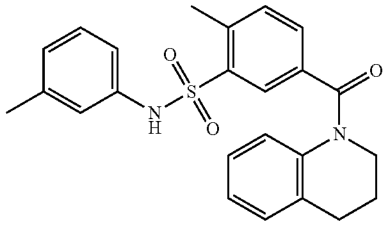 [SMILES: Cc1cccc(NS(=O)(=O)c2cc(C(=O)N3CCCc4ccccc43)ccc2C)c1] | 2-methyl-5-(1,2,3,4-tetrahydroquinoline-1-carbonyl)-N-(m-tolyl)benzenesulfonamide |
| I-439 | 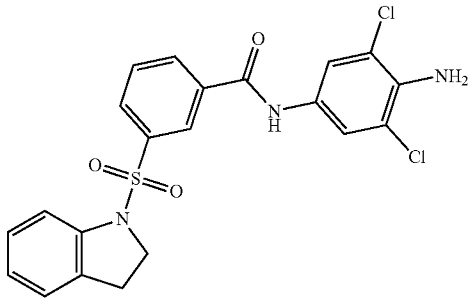 [SMILES: Nc1c(Cl)cc(NC(=O)c2cccc(S(=O)(=O)N3CCc4ccccc43)c2)cc1Cl] | N-(4-amino-3,5-dichlorophenyl)-3-(indolin-1-ylsulfonyl)benzamide |
| I-440 | 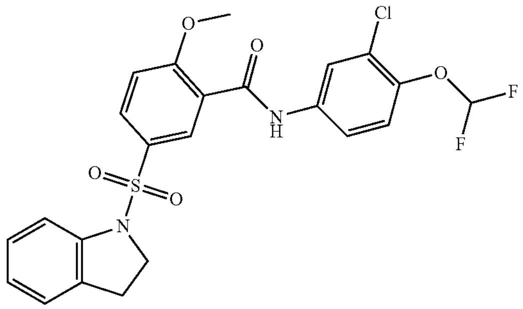 [SMILES: COc1ccc(S(=O)(=O)N2CCc3ccccc32)cc1C(=O)Nc1ccc(OC(F)F)c(Cl)c1] | N-(3-chloro-4-(difluoromethoxy)phenyl)-5-(indolin-1-ylsulfonyl)-2-methoxybenzamide |
| I-441 | 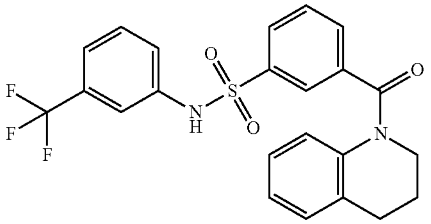 [SMILES: O=C(c1cccc(S(=O)(=O)Nc2cccc(C(F)(F)F)c2)c1)N1CCCc2ccccc21] | 3-(1,2,3,4-tetrahydroquinoline-1-carbonyl)-N-(3-(trifluoromethyl)phenyl)benzenesulfonamide |
| I-442 | 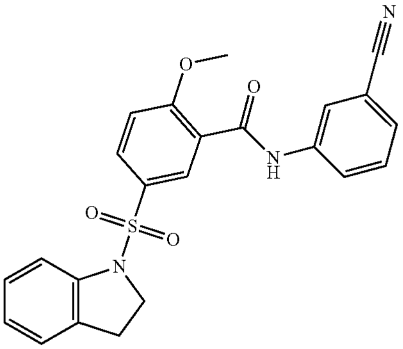 [SMILES: COc1ccc(S(=O)(=O)N2CCc3ccccc32)cc1C(=O)Nc1cccc(C#N)c1] | N-(3-cyanophenyl)-5-(indolin-1-ylsulfonyl)-2-methoxybenzamide |

TABLE 1-continued
| ID | Structure | Name |
| --- | --- | --- |
| I-443 | 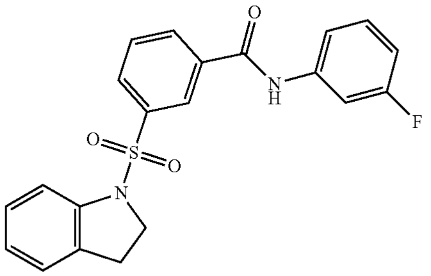 [SMILES: O=C(Nc1cccc(F)c1)c1cccc(S(=O)(=O)N2CCc3ccccc32)c1] | N-(3-fluorophenyl)-3-(indolin-1-ylsulfonyl)benzamide |
| I-444 | 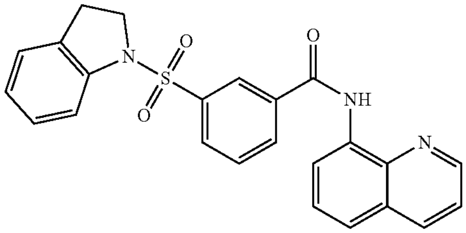 [SMILES: O=C(Nc1cccc2cccnc12)c1cccc(S(=O)(=O)N2CCc3ccccc32)c1] | 3-(indolin-1-ylsulfonyl)-N-(quinolin-8-yl)benzamide |
| I-445 | 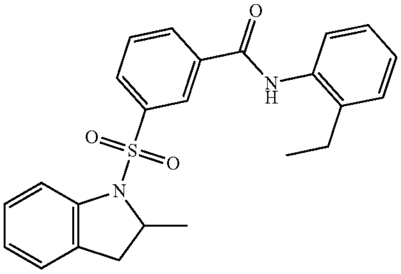 [SMILES: CCc1ccccc1NC(=O)c1cccc(S(=O)(=O)N2c3ccccc3CC2C)c1] | N-(2-ethylphenyl)-3-((2-methylindolin-1-yl)sulfonyl)benzamide |
| I-446 | 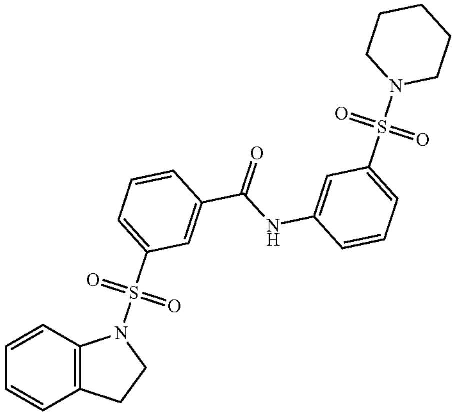 [SMILES: O=C(Nc1cccc(S(=O)(=O)N2CCCCC2)c1)c1cccc(S(=O)(=O)N2CCc3ccccc32)c1] | 3-(indolin-1-ylsulfonyl)-N-(3-(piperidin-1-ylsulfonyl)phenyl)benzamide |
| I-447 | 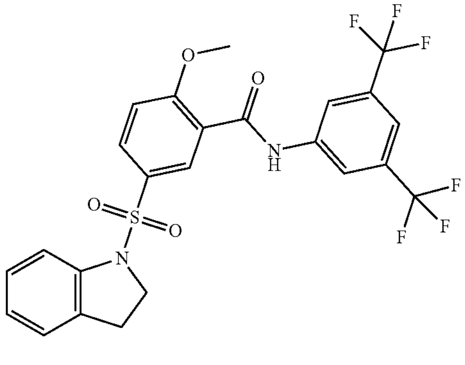 [SMILES: COc1ccc(S(=O)(=O)N2CCc3ccccc32)cc1C(=O)Nc1cc(C(F)(F)F)cc(C(F)(F)F)c1] | N-(3,5-bis(trifluoromethyl)phenyl)-5-(indolin-1-ylsulfonyl)-2-methoxybenzamide |

TABLE 1-continued

| ID | Structure | Name |
|---|---|---|
| I-448 | 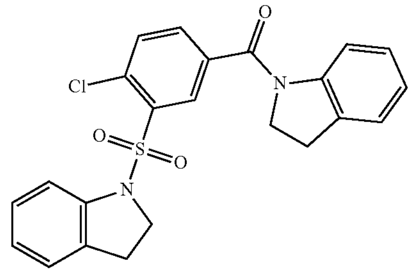 [SMILES: O=C(c1ccc(Cl)c(S(=O)(=O)N2CCc3ccccc32)c1)N1CCc2ccccc21] | (4-chloro-3-(indolin-1-ylsulfonyl)phenyl)(indolin-1-yl)methanone |
| I-449 | 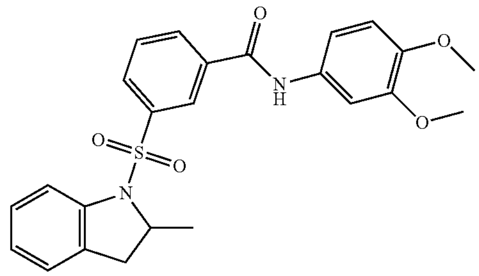 [SMILES: COc1ccc(NC(=O)c2cccc(S(=O)(=O)N3c4ccccc4CC3C)c2)cc1OC] | N-(3,4-dimethoxyphenyl)-3-((2-methylindolin-1-yl)sulfonyl)benzamide |
| I-450 | 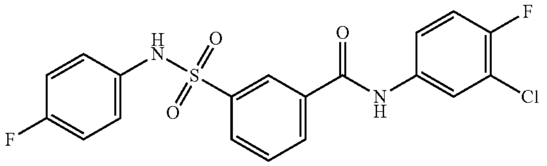 [SMILES: O=C(Nc1ccc(F)c(Cl)c1)c1cccc(S(=O)(=O)Nc2ccc(F)cc2)c1] | N-(3-chloro-4-fluorophenyl)-3-(N-(4-fluorophenyl)sulfamoyl)benzamide |
| I-451 | 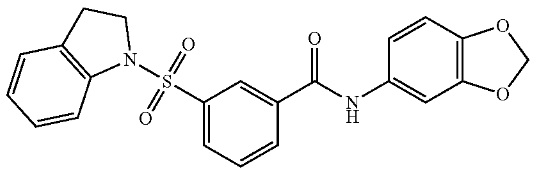 [SMILES: O=C(Nc1ccc2c(c1)OCO2)c1cccc(S(=O)(=O)N2CCc3ccccc32)c1] | N-(benzo[d][1,3]dioxol-5-yl)-3-(indolin-1-ylsulfonyl)benzamide |
| I-452 | 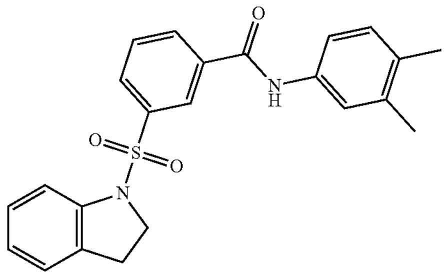 [SMILES: Cc1ccc(NC(=O)c2cccc(S(=O)(=O)N3CCc4ccccc43)c2)cc1C] | N-(3,4-dimethylphenyl)-3-(indolin-1-ylsulfonyl)benzamide |
| I-453 | 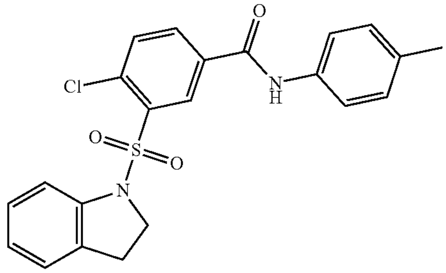 [SMILES: Cc1ccc(NC(=O)c2ccc(Cl)c(S(=O)(=O)N3CCc4ccccc43)c2)cc1] | 4-chloro-3-(indolin-1-ylsulfonyl)-N-(p-tolyl)benzamide |

TABLE 1-continued
| ID | Structure | Name |
| --- | --- | --- |
| I-454 | 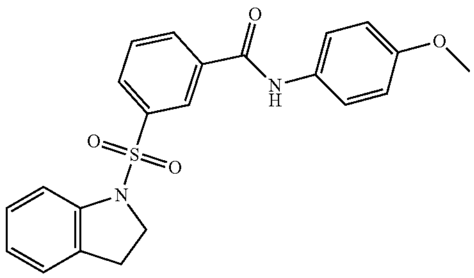 [SMILES: COc1ccc(NC(=O)c2cccc(S(=O)(=O)N3CCc4ccccc43)c2)cc1] | 3-(indolin-1-ylsulfonyl)-N-(4-methoxyphenyl)benzamide |
| I-455 | 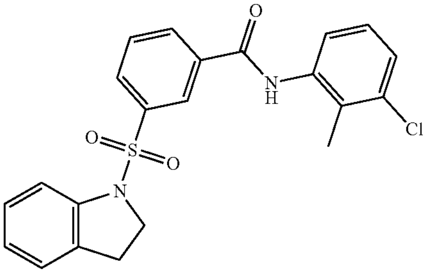 [SMILES: Cc1c(Cl)cccc1NC(=O)c1cccc(S(=O)(=O)N2CCc3ccccc32)c1] | N-(3-chloro-2-methylphenyl)-3-(indolin-1-ylsulfonyl)benzamide |
| I-456 | 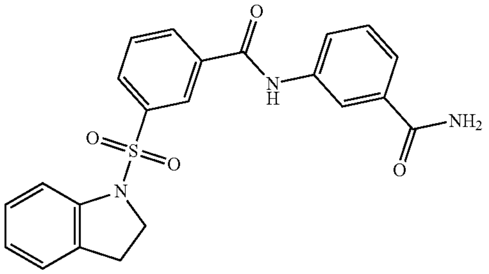 [SMILES: NC(=O)c1cccc(NC(=O)c2cccc(S(=O)(=O)N3CCc4ccccc43)c2)c1] | N-(3-carbamoylphenyl)-3-(indolin-1-ylsulfonyl)benzamide |
| I-457 | 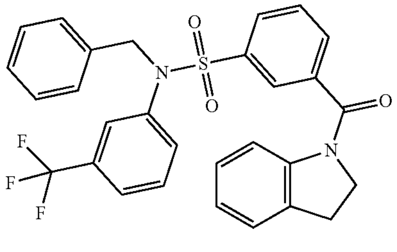 [SMILES: O=C(c1cccc(S(=O)(=O)N(Cc2ccccc2)c2cccc(C(F)(F)F)c2)c1)N1CCc2ccccc21] | N-benzyl-3-(indoline-1-carbonyl)-N-(3-(trifluoromethyl)phenyl)benzenesulfonamide |
| I-458 | 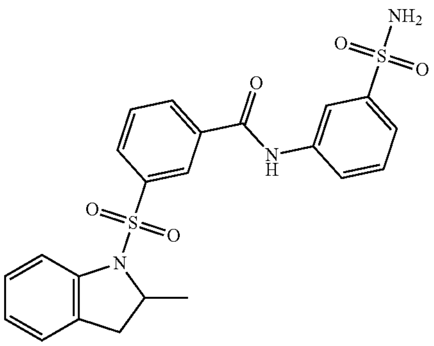 [SMILES: CC1Cc2ccccc2N1S(=O)(=O)c1cccc(C(=O)Nc2cccc(S(N)(=O)=O)c2)c1] | 3-((2-methylindolin-1-yl)sulfonyl)-N-(3-sulfamoylphenyl)benzamide |

TABLE 1-continued

| ID | Structure | Name |
| --- | --- | --- |
| I-459 | 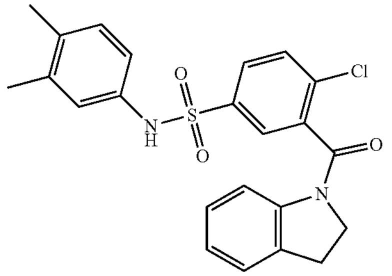 [SMILES: Cc1ccc(NS(=O)(=O)c2ccc(Cl)c(C(=O)N3CCc4ccccc43)c2)cc1C] | 4-chloro-N-(3,4-dimethylphenyl)-3-(indoline-1-carbonyl)benzenesulfonamide |
| I-460 | 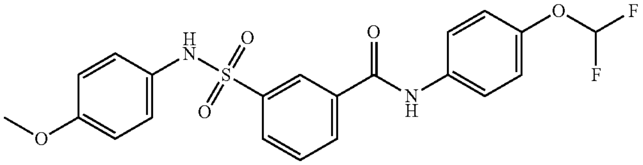 [SMILES: COc1ccc(NS(=O)(=O)c2cccc(C(=O)Nc3ccc(OC(F)F)cc3)c2)cc1] | N-(4-(difluoromethoxy)phenyl)-3-(N-(4-methoxyphenyl)sulfamoyl)benzamide |
| I-461 | 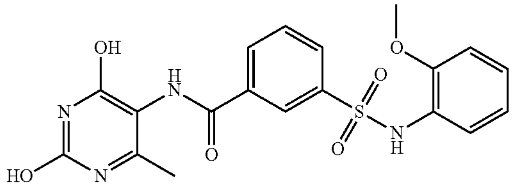 [SMILES: COc1ccccc1NS(=O)(=O)c1cccc(C(=O)Nc2c(C)nc(O)nc2O)c1] | N-(2,4-dihydroxy-6-methylpyrimidin-5-yl)-3-(N-(2-methoxyphenyl)sulfamoyl)benzamide |
| I-462 | 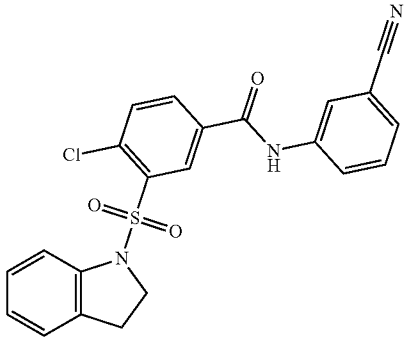 [SMILES: N#Cc1cccc(NC(=O)c2ccc(Cl)c(S(=O)(=O)N3CCc4ccccc43)c2)c1] | 4-chloro-N-(3-cyanophenyl)-3-(indolin-1-ylsulfonyl)benzamide |
| I-463 | 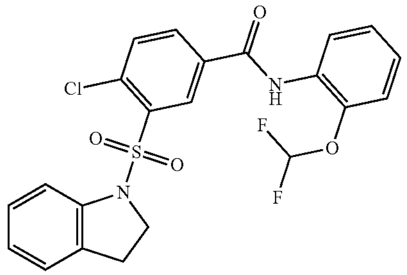 [SMILES: O=C(Nc1ccccc1OC(F)F)c1ccc(Cl)c(S(=O)(=O)N2CCc3ccccc32)c1] | 4-chloro-N-(2-(difluoromethoxy)phenyl)-3-(indolin-1-ylsulfonyl)benzamide |
| I-464 | 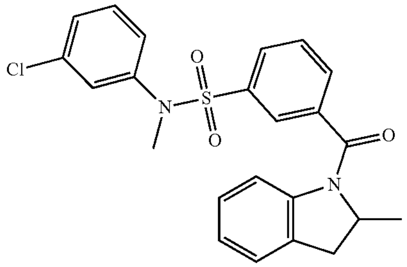 [SMILES: CC1Cc2ccccc2N1C(=O)c1cccc(S(=O)(=O)N(C)c2cccc(Cl)c2)c1] | N-(3-chlorophenyl)-N-methyl-3-(2-methylindoline-1-carbonyl)benzenesulfonamide |

TABLE 1-continued
| ID | Structure | Name |
|---|---|---|
| I-465 | 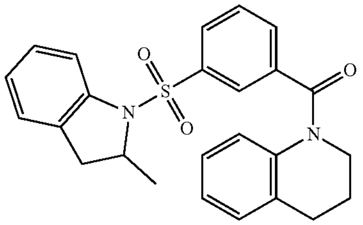 [SMILES: CC1Cc2ccccc2N1S(=O)(=O)c1cccc(C(=O)N2CCCc3ccccc32)c1] | (3,4-dihydroquinolin-1(2H)-yl)(3-((2-methylindolin-1-yl)sulfonyl)phenyl)methanone |
| I-466 | 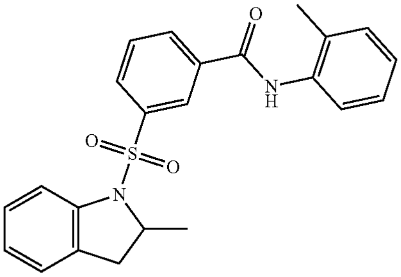 [SMILES: Cc1ccccc1NC(=O)c1cccc(S(=O)(=O)N2c3ccccc3CC2C)c1] | 3-((2-methylindolin-1-yl)sulfonyl)-N-(o-tolyl)benzamide |
| I-467 | 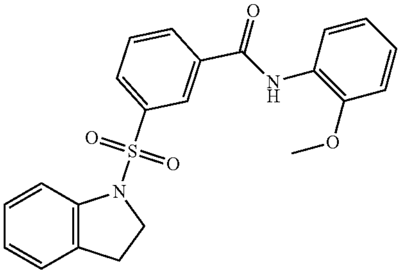 [SMILES: COc1ccccc1NC(=O)c1cccc(S(=O)(=O)N2CCc3ccccc32)c1] | 3-(indolin-1-ylsulfonyl)-N-(2-methoxyphenyl)benzamide |
| I-468 | 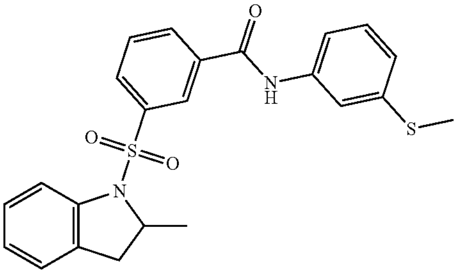 [SMILES: CSc1cccc(NC(=O)c2cccc(S(=O)(=O)N3c4ccccc4CC3C)c2)c1] | 3-((2-methylindolin-1-yl)sulfonyl)-N-(3-(methylthio)phenyl)benzamide |
| I-469 | 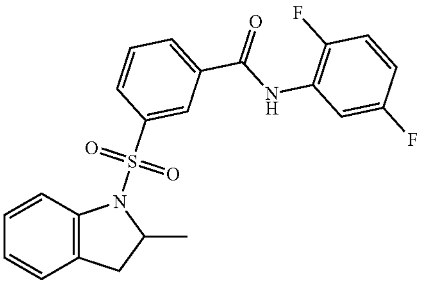 [SMILES: CC1Cc2ccccc2N1S(=O)(=O)c1cccc(C(=O)Nc2cc(F)ccc2F)c1] | N-(2,5-difluorophenyl)-3-((2-methylindolin-1-yl)sulfonyl)benzamide |

TABLE 1-continued
| ID | Structure | Name |
| --- | --- | --- |
| I-470 | 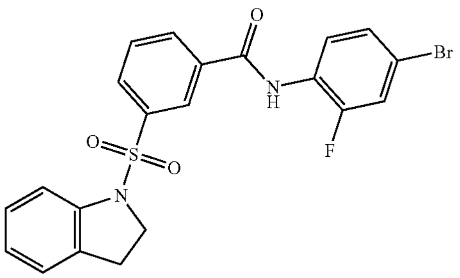 [SMILES: O=C(Nc1ccc(Br)cc1F)c1cccc(S(=O)(=O)N2CCc3ccccc32)c1] | N-(4-bromo-2-fluorophenyl)-3-(indolin-1-ylsulfonyl)benzamide |
| I-471 | 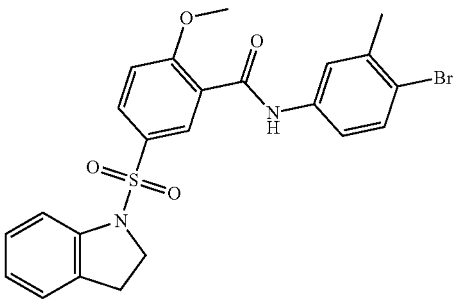 [SMILES: COc1ccc(S(=O)(=O)N2CCc3ccccc32)cc1C(=O)Nc1ccc(Br)c(C)c1] | N-(4-bromo-3-methylphenyl)-5-(indolin-1-ylsulfonyl)-2-methoxybenzamide |
| I-472 | 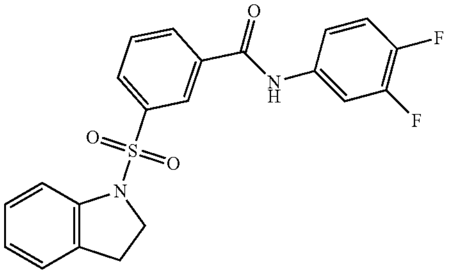 [SMILES: O=C(Nc1ccc(F)c(F)c1)c1cccc(S(=O)(=O)N2CCc3ccccc32)c1] | N-(3,4-difluorophenyl)-3-(indolin-1-ylsulfonyl)benzamide |
| I-473 | 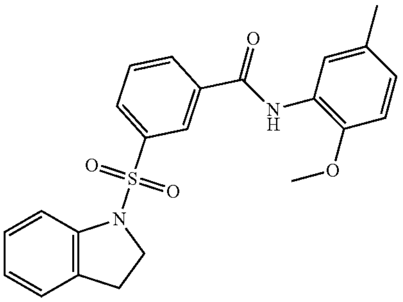 [SMILES: COc1ccc(C)cc1NC(=O)c1cccc(S(=O)(=O)N2CCc3ccccc32)c1] | 3-(indolin-1-ylsulfonyl)-N-(2-methoxy-5-methylphenyl)benzamide |
| I-474 | 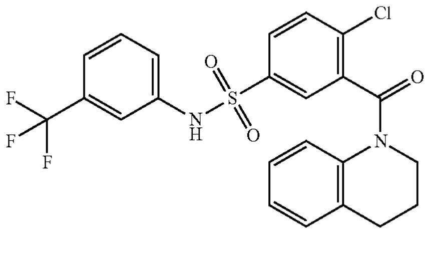 [SMILES: O=C(c1cc(S(=O)(=O)Nc2cccc(C(F)(F)F)c2)ccc1Cl)N1CCCc2ccccc21] | 4-chloro-3-(1,2,3,4-tetrahydroquinoline-1-carbonyl)-N-(3-(trifluoromethyl)phenyl)benzenesulfonamide |

TABLE 1-continued

| ID | Structure | Name |
|---|---|---|
| I-475 | 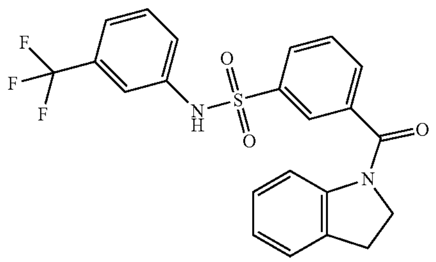 [SMILES: O=C(c1cccc(S(=O)(=O)Nc2cccc(C(F)(F)F)c2)c1)N1CCc2ccccc21] | 3-(indoline-1-carbonyl)-N-(3-(trifluoromethyl)phenyl)benzenesulfonamide |
| I-476 | 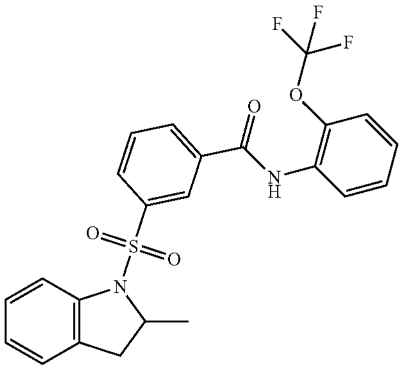 [SMILES: CC1Cc2ccccc2N1S(=O)(=O)c1cccc(C(=O)Nc2ccccc2OC(F)(F)F)c1] | 3-((2-methylindolin-1-yl)sulfonyl)-N-(2-(trifluoromethoxy)phenyl)benzamide |
| I-477 | 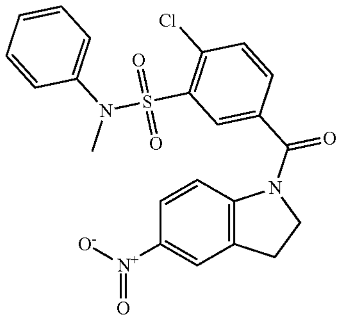 [SMILES: CN(c1ccccc1)S(=O)(=O)c1cc(C(=O)N2CCc3cc([N+](=O)[O-])ccc32)ccc1Cl] | 2-chloro-N-methyl-5-(5-nitroindoline-1-carbonyl)-N-phenylbenzenesulfonamide |
| I-478 | 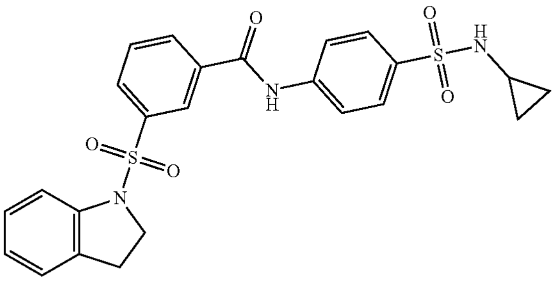 [SMILES: O=C(Nc1ccc(S(=O)(=O)NC2CC2)cc1)c1cccc(S(=O)(=O)N2CCc3ccccc32)c1] | N-(4-(N-cyclopropylsulfamoyl)phenyl)-3-(indolin-1-ylsulfonyl)benzamide |
| I-479 | 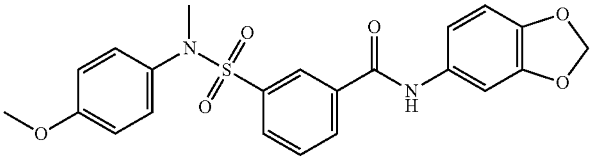 [SMILES: COc1ccc(N(C)S(=O)(=O)c2cccc(C(=O)Nc3ccc4c(c3)OCO4)c2)cc1] | N-(benzo[d][1,3]dioxol-5-yl)-3-(N-(4-methoxyphenyl)-N-methylsulfamoyl)benzamide |

TABLE 1-continued
| ID | Structure | Name |
| --- | --- | --- |
| I-480 | 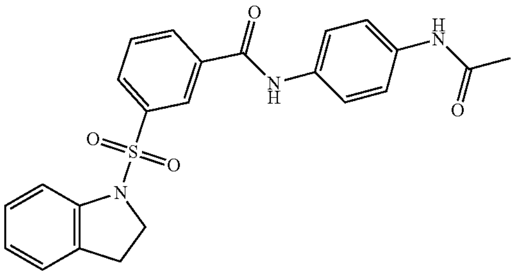 [SMILES: CC(=O)Nc1ccc(NC(=O)c2cccc(S(=O)(=O)N3CCc4ccccc43)c2)cc1] | N-(4-acetamidophenyl)-3-(indolin-1-ylsulfonyl)benzamide |
| I-481 | 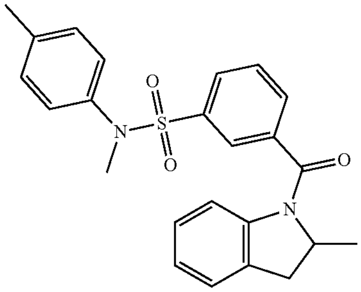 | N-methyl-3-(2-methylindoline-1-carbonyl)-N-(p-tolyl)benzenesulfonamide |
| I-482 | 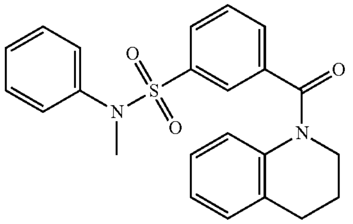 [SMILES: CN(c1ccccc1)S(=O)(=O)c1cccc(C(=O)N2CCCc3ccccc32)c1] | N-methyl-N-phenyl-3-(1,2,3,4-tetrahydroquinoline-1-carbonyl)benzenesulfonamide |
| I-483 | 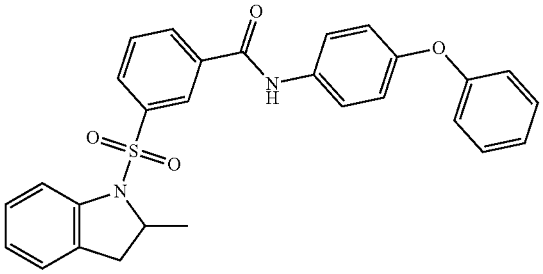 [SMILES: CC1Cc2ccccc2N1S(=O)(=O)c1cccc(C(=O)Nc2ccc(Oc3ccccc3)cc2)c1] | 3-((2-methylindolin-1-yl)sulfonyl)-N-(4-phenoxyphenyl)benzamide |
| I-484 | 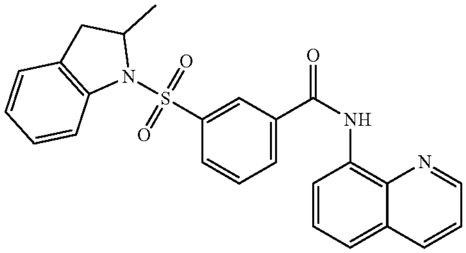 [SMILES: CC1Cc2ccccc2N1S(=O)(=O)c1cccc(C(=O)Nc2cccc3cccnc23)c1] | 3-((2-methylindolin-1-yl)sulfonyl)-N-(quinolin-8-yl)benzamide |

TABLE 1-continued
| ID | Structure | Name |
| --- | --- | --- |
| I-485 | 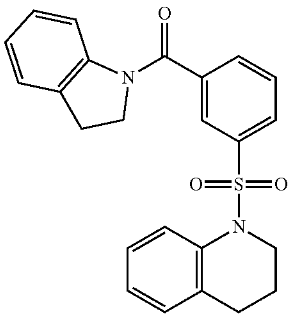 [SMILES: O=C(c1cccc(S(=O)(=O)N2CCCc3ccccc32)c1)N1CCc2ccccc21] | (3-((3,4-dihydroquinolin-1(2H)-yl)sulfonyl)phenyl)(indolin-1-yl)methanone |
| I-486 | 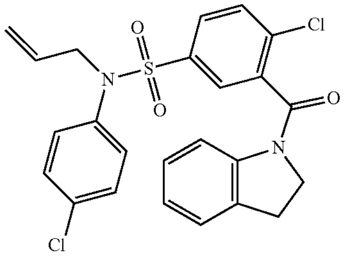 [SMILES: C=CCN(c1ccc(Cl)cc1)S(=O)(=O)c1ccc(Cl)c(C(=O)N2CCc3ccccc32)c1] | N-allyl-4-chloro-N-(4-chlorophenyl)-3-(indoline-1-carbonyl)benzenesulfonamide |
| I-487 | 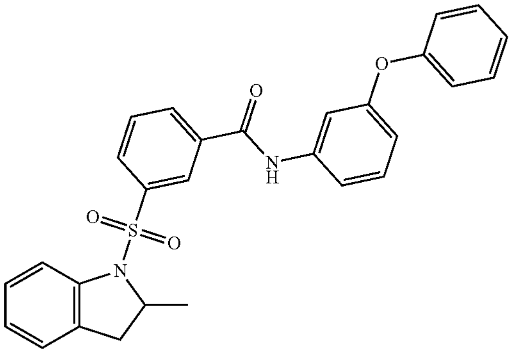 [SMILES: CC1Cc2ccccc2N1S(=O)(=O)c1cccc(C(=O)Nc2cccc(Oc3ccccc3)c2)c1] | 3-((2-methylindolin-1-yl)sulfonyl)-N-(3-phenoxyphenyl)benzamide |
| I-488 | 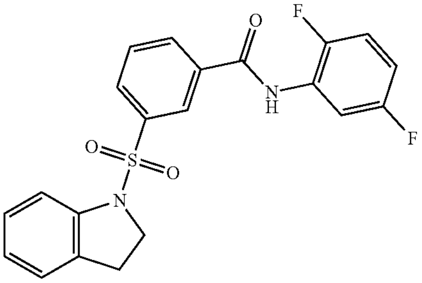 [SMILES: O=C(Nc1cc(F)ccc1F)c1cccc(S(=O)(=O)N2CCc3ccccc32)c1] | N-(2,5-difluorophenyl)-3-(indolin-1-ylsulfonyl)benzamide |
| I-489 | 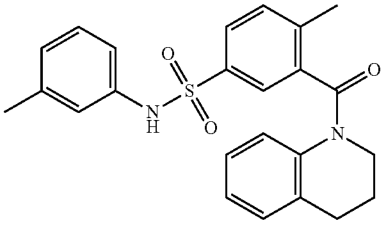 [SMILES: Cc1cccc(NS(=O)(=O)c2ccc(C)c(C(=O)N3CCCc4ccccc43)c2)c1] | 4-methyl-3-(1,2,3,4-tetrahydroquinoline-1-carbonyl)-N-(m-tolyl)benzenesulfonamide |

TABLE 1-continued

| ID | Structure | Name |
|---|---|---|
| I-490 | 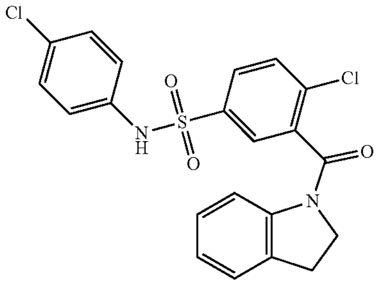 [SMILES: O=C(c1cc(S(=O)(=O)Nc2ccc(Cl)cc2)ccc1Cl)N1CCc2ccccc21] | 4-chloro-N-(4-chlorophenyl)-3-(indoline-1-carbonyl)benzenesulfonamide |
| I-491 | 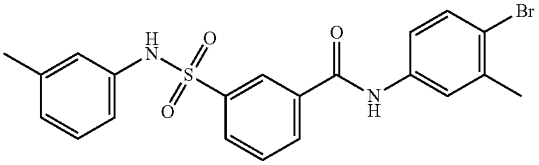 [SMILES: Cc1cccc(NS(=O)(=O)c2cccc(C(=O)Nc3ccc(Br)c(C)c3)c2)c1] | N-(4-bromo-3-methylphenyl)-3-(N-(m-tolyl)sulfamoyl)benzamide |
| I-492 | 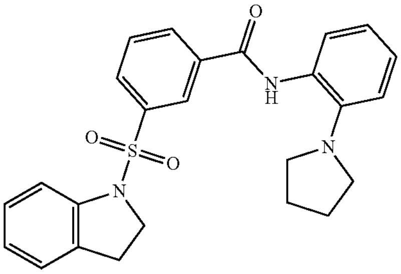 [SMILES: O=C(Nc1ccccc1N1CCCC1)c1cccc(S(=O)(=O)N2CCc3ccccc32)c1] | 3-(indolin-1-ylsulfonyl)-N-(2-(pyrrolidin-1-yl)phenyl)benzamide |
| I-493 | 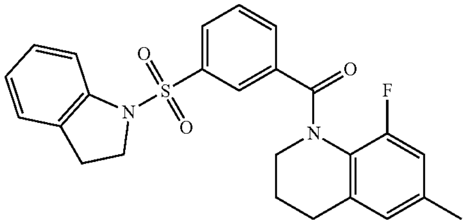 [SMILES: Cc1cc(F)c2c(c1)CCCN2C(=O)c1cccc(S(=O)(=O)N2CCc3ccccc32)c1] | (8-fluoro-6-methyl-3,4-dihydroquinolin-1(2H)-yl)(3-(indolin-1-ylsulfonyl)phenyl)methanone |
| I-494 | 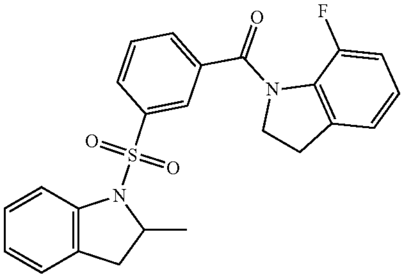 [SMILES: CC1Cc2ccccc2N1S(=O)(=O)c1cccc(C(=O)N2CCc3cccc(F)c32)c1] | (7-fluoroindolin-1-yl)(3-((2-methylindolin-1-yl)sulfonyl)phenyl)methanone |
| I-495 | 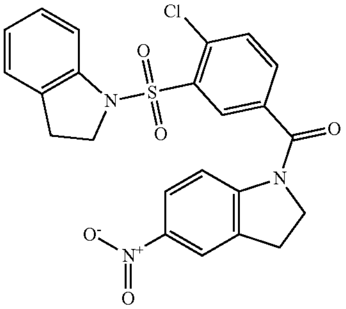 [SMILES: O=C(c1ccc(Cl)c(S(=O)(=O)N2CCc3ccccc32)c1)N1CCc2cc([N+](=O)[O-])ccc21] | (4-chloro-3-(indolin-1-ylsulfonyl)phenyl)(5-nitroindolin-1-yl)methanone |

TABLE 1-continued

| ID | Structure | Name |
| --- | --- | --- |
| I-496 | 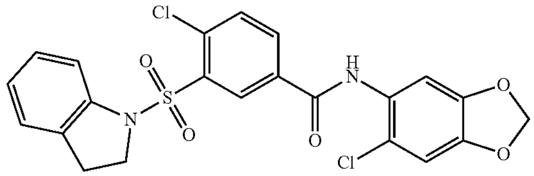 [SMILES: O=C(Nc1cc2c(cc1Cl)OCO2)c1ccc(Cl)c(S(=O)(=O)N2CCc3ccccc32)c1] | 4-chloro-N-(6-chlorobenzo[d][1,3]dioxol-5-yl)-3-(indolin-1-ylsulfonyl)benzamide |
| I-497 | 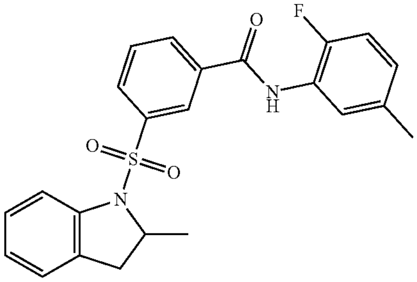 [SMILES: Cc1ccc(F)c(NC(=O)c2cccc(S(=O)(=O)N3c4ccccc4CC3C)c2)c1] | N-(2-fluoro-5-methylphenyl)-3-((2-methylindolin-1-yl)sulfonyl)benzamide |
| I-498 | 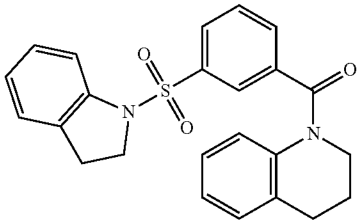 [SMILES: O=C(c1cccc(S(=O)(=O)N2CCc3ccccc32)c1)N1CCCc2ccccc21] | (3,4-dihydroquinolin-1(2H)-yl)(3-(indolin-1-ylsulfonyl)phenyl)methanone |
| I-499 | 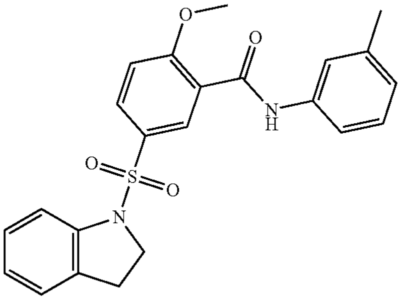 [SMILES: COc1ccc(S(=O)(=O)N2CCc3ccccc32)cc1C(=O)Nc1cccc(C)c1] | 5-(indolin-1-ylsulfonyl)-2-methoxy-N-(m-tolyl)benzamide |
| I-500 | 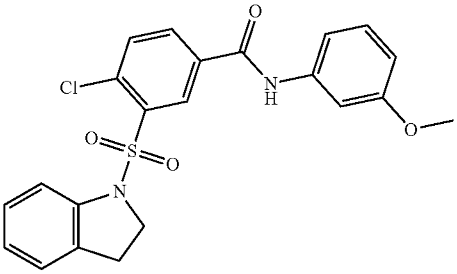 [SMILES: COc1cccc(NC(=O)c2ccc(Cl)c(S(=O)(=O)N3CCc4ccccc43)c2)c1] | 4-chloro-3-(indolin-1-ylsulfonyl)-N-(3-methoxyphenyl)benzamide |
| I-501 | 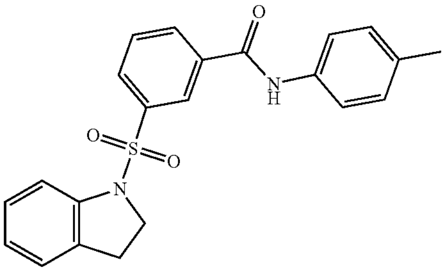 [SMILES: Cc1ccc(NC(=O)c2cccc(S(=O)(=O)N3CCc4ccccc43)c2)cc1] | 3-(indolin-1-ylsulfonyl)-N-(p-tolyl)benzamide |

TABLE 1-continued

| ID | Structure | Name |
|---|---|---|
| I-502 | 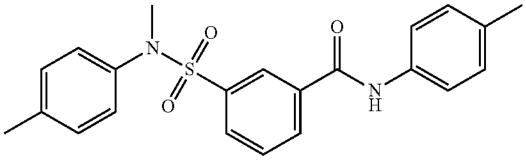 | 3-(N-methyl-N-(p-tolyl)sulfamoyl)-N-(p-tolyl)benzamide |
| I-503 | 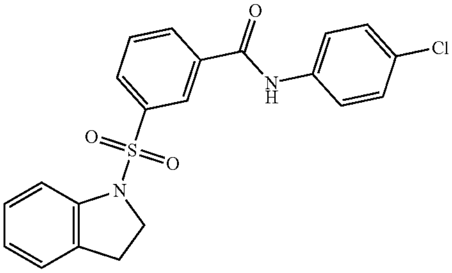 [SMILES: O=C(Nc1ccc(Cl)cc1)c1cccc(S(=O)(=O)N2CCc3ccccc32)c1] | N-(4-chlorophenyl)-3-(indolin-1-ylsulfonyl)benzamide |
| I-504 | 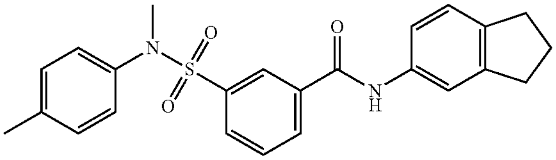 [SMILES: Cc1ccc(N(C)S(=O)(=O)c2cccc(C(=O)Nc3ccc4c(c3)CCC4)c2)cc1] | N-(2,3-dihydro-1H-inden-5-yl)-3-(N-methyl-N-(p-tolyl)sulfamoyl)benzamide |
| I-505 | 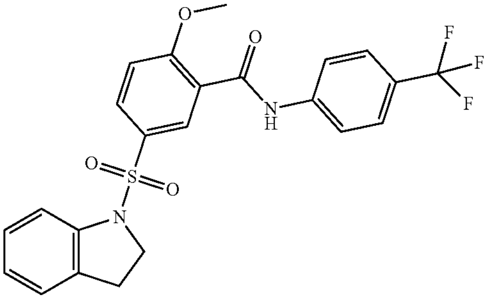 [SMILES: COc1ccc(S(=O)(=O)N2CCc3ccccc32)cc1C(=O)Nc1ccc(C(F)(F)F)cc1] | 5-(indolin-1-ylsulfonyl)-2-methoxy-N-(4-(trifluoromethyl)phenyl)benzamide |
| I-506 | 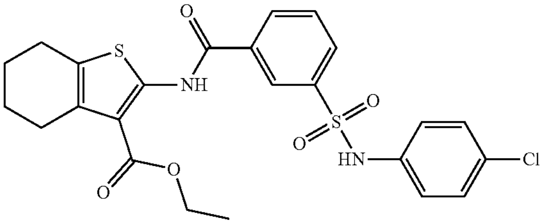 [SMILES: CCOC(=O)c1c(NC(=O)c2cccc(S(=O)(=O)Nc3ccc(Cl)cc3)c2)sc2c1CCCC2] | ethyl 2-(3-(N-(4-chlorophenyl)sulfamoyl)benzamido)-4,5,6,7-tetrahydrobenzo[b]thiophene-3-carboxylate |
| I-507 | 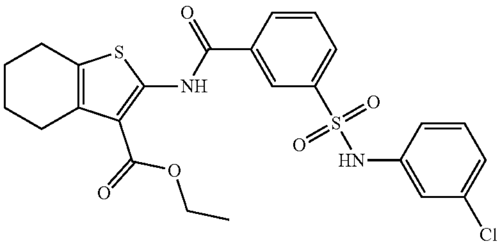 [SMILES: CCOC(=O)c1c(NC(=O)c2cccc(S(=O)(=O)Nc3cccc(Cl)c3)c2)sc2c1CCCC2] | ethyl 2-(3-(N-(3-chlorophenyl)sulfamoyl)benzamido)-4,5,6,7-tetrahydrobenzo[b]thiophene-3-carboxylate |
| I-508 | 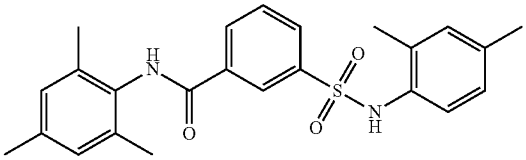 | 3-(N-(2,4-dimethylphenyl)sulfamoyl)-N-mesitylbenzamide |

TABLE 1-continued

| ID | Structure | Name |
|---|---|---|
| I-509 | 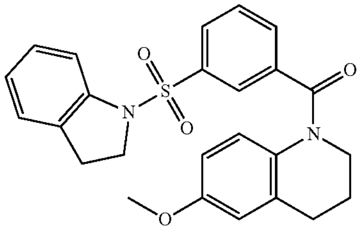 [SMILES: COc1ccc2c(c1)CCCN2C(=O)c1cccc(S(=O)(=O)N2CCc3ccccc32)c1] | (3-(indolin-1-ylsulfonyl)phenyl)(6-methoxy-3,4-dihydroquinolin-1(2H)-yl)methanone |
| I-510 | 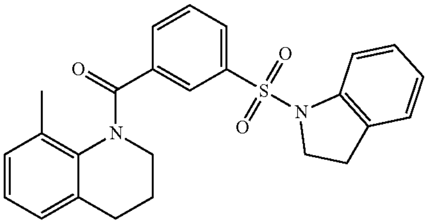 [SMILES: Cc1cccc2c1N(C(=O)c1cccc(S(=O)(=O)N3CCc4ccccc43)c1)CCC2] | (3-(indolin-1-ylsulfonyl)phenyl)(8-methyl-3,4-dihydroquinolin-1(2H)-yl)methanone |
| I-511 | 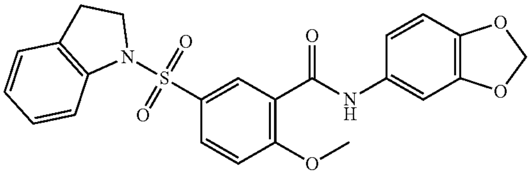 [SMILES: COc1ccc(S(=O)(=O)N2CCc3ccccc32)cc1C(=O)Nc1ccc2c(c1)OCO2] | N-(benzo[d][1,3]dioxol-5-yl)-5-(indolin-1-ylsulfonyl)-2-methoxybenzamide |
| I-512 | 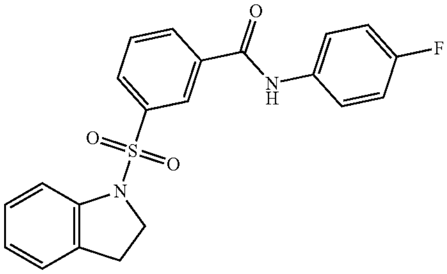 [SMILES: O=C(Nc1ccc(F)cc1)c1cccc(S(=O)(=O)N2CCc3ccccc32)c1] | N-(4-fluorophenyl)-3-(indolin-1-ylsulfonyl)benzamide |
| I-513 | 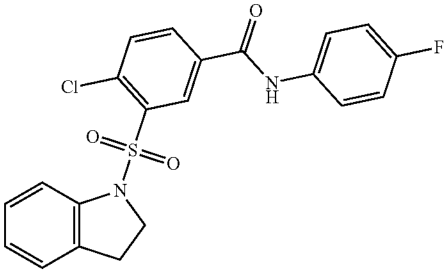 [SMILES: O=C(Nc1ccc(F)cc1)c1ccc(Cl)c(S(=O)(=O)N2CCc3ccccc32)c1] | 4-chloro-N-(4-fluorophenyl)-3-(indolin-1-ylsulfonyl)benzamide |
| I-514 | 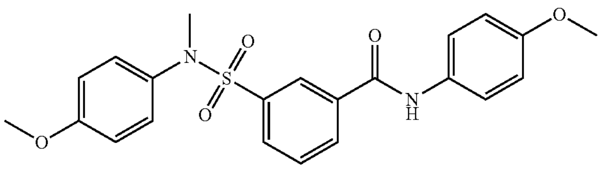 | N-(4-methoxyphenyl)-3-(N-(4-methoxyphenyl)-N-methylsulfamoyl)benzamide |

TABLE 1-continued

| ID | Structure | Name |
|---|---|---|
| I-515 | 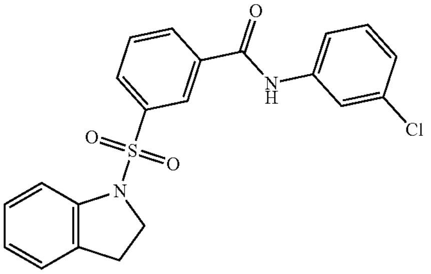 [SMILES: O=C(Nc1cccc(Cl)c1)c1cccc(S(=O)(=O)N2CCc3ccccc32)c1] | N-(3-chlorophenyl)-3-(indolin-1-ylsulfonyl)benzamide |
| I-516 | 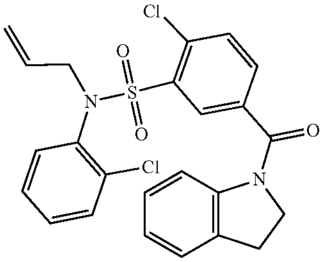 [SMILES: C=CCN(c1ccccc1Cl)S(=O)(=O)c1cc(C(=O)N2CCc3ccccc32)ccc1Cl] | N-allyl-2-chloro-N-(2-chlorophenyl)-5-(indoline-1-carbonyl)benzenesulfonamide |
| I-517 | 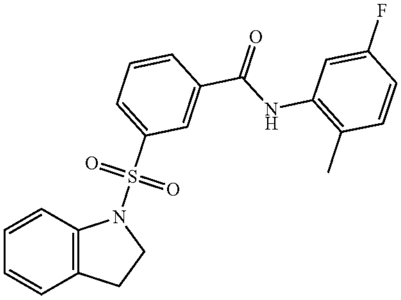 [SMILES: Cc1ccc(F)cc1NC(=O)c1cccc(S(=O)(=O)N2CCc3ccccc32)c1] | N-(5-fluoro-2-methylphenyl)-3-(indolin-1-ylsulfonyl)benzamide |
| I-518 | 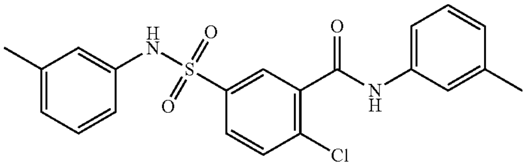 | 2-chloro-N-(m-tolyl)-5-(N-(m-tolyl)sulfamoyl)benzamide |
| I-519 | 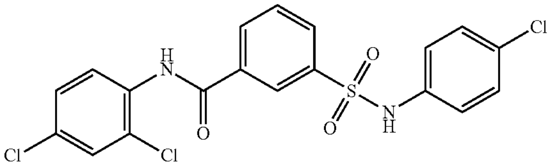 [SMILES: O=C(Nc1ccc(Cl)cc1Cl)c1cccc(S(=O)(=O)Nc2ccc(Cl)cc2)c1] | 3-(N-(4-chlorophenyl)sulfamoyl)-N-(2,4-dichlorophenyl)benzamide |
| I-520 | 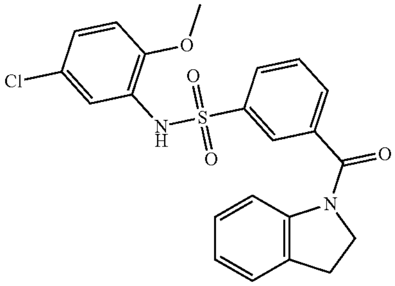 [SMILES: COc1ccc(Cl)cc1NS(=O)(=O)c1cccc(C(=O)N2CCc3ccccc32)c1] | N-(5-chloro-2-methoxyphenyl)-3-(indoline-1-carbonyl)benzenesulfonamide |

TABLE 1-continued

| ID | Structure | Name |
|---|---|---|
| I-521 | 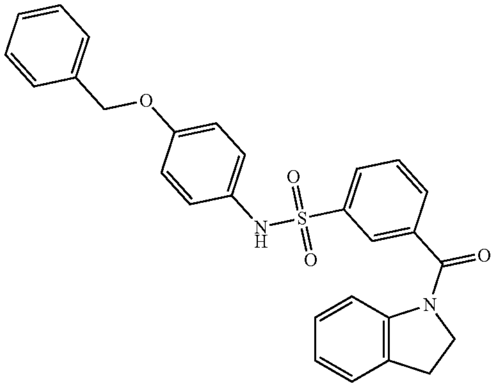 [SMILES: O=C(c1cccc(S(=O)(=O)Nc2ccc(OCc3ccccc3)cc2)c1)N1CCc2ccccc21] | N-(4-(benzyloxy)phenyl)-3-(indoline-1-carbonyl)benzenesulfonamide |
| I-522 | 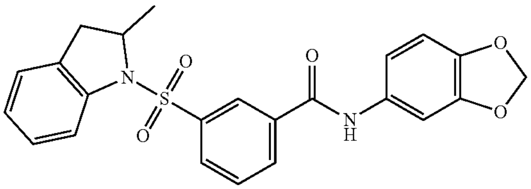 [SMILES: CC1Cc2ccccc2N1S(=O)(=O)c1cccc(C(=O)Nc2ccc3c(c2)OCO3)c1] | N-(benzo[d][1,3]dioxol-5-yl)-3-((2-methylindolin-1-yl)sulfonyl)benzamide |
| I-523 | 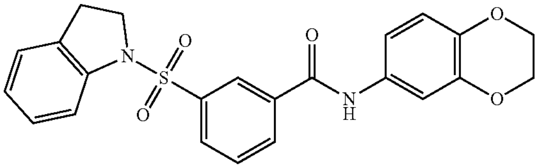 [SMILES: O=C(Nc1ccc2c(c1)OCCO2)c1cccc(S(=O)(=O)N2CCc3ccccc32)c1] | N-(2,3-dihydrobenzo[b][1,4]dioxin-6-yl)-3-(indolin-1-ylsulfonyl)benzamide |
| I-524 | 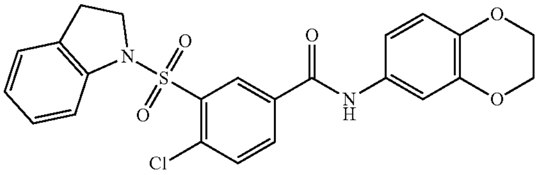 [SMILES: O=C(Nc1ccc2c(c1)OCCO2)c1ccc(Cl)c(S(=O)(=O)N2CCc3ccccc32)c1] | 4-chloro-N-(2,3-dihydrobenzo[b][1,4]dioxin-6-yl)-3-(indolin-1-ylsulfonyl)benzamide |
| I-525 | 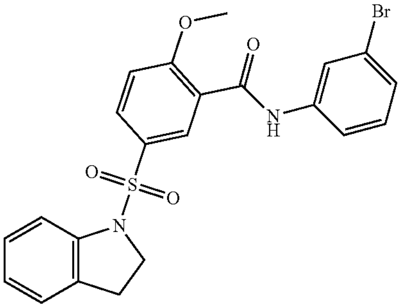 [SMILES: COc1ccc(S(=O)(=O)N2CCc3ccccc32)cc1C(=O)Nc1cccc(Br)c1] | N-(3-bromophenyl)-5-(indolin-1-ylsulfonyl)-2-methoxybenzamide |
| I-526 | 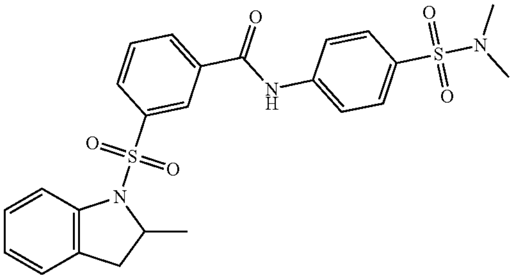 [SMILES: CC1Cc2ccccc2N1S(=O)(=O)c1cccc(C(=O)Nc2ccc(S(=O)(=O)N(C)C)cc2)c1] | N-(4-(N,N-dimethylsulfamoyl)phenyl)-3-((2-methylindolin-1-yl)sulfonyl)benzamide |

TABLE 1-continued

| ID | Structure | Name |
|---|---|---|
| I-527 | 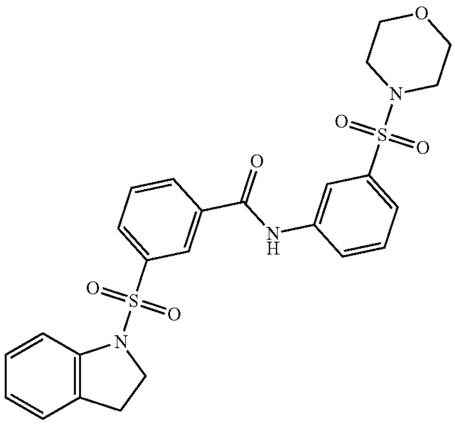 [SMILES: O=C(Nc1cccc(S(=O)(=O)N2CCOCC2)c1)c1cccc(S(=O)(=O)N2CCc3ccccc32)c1] | 3-(indolin-1-ylsulfonyl)-N-(3-(morpholinosulfonyl)phenyl)benzamide |
| I-528 | 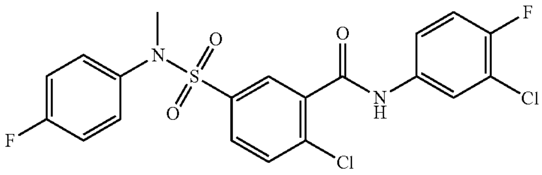 [SMILES: CN(c1ccc(F)cc1)S(=O)(=O)c1ccc(Cl)c(C(=O)Nc2ccc(F)c(Cl)c2)c1] | 2-chloro-N-(3-chloro-4-fluorophenyl)-5-(N-(4-fluorophenyl)-N-methylsulfamoyl)benzamide |
| I-529 | 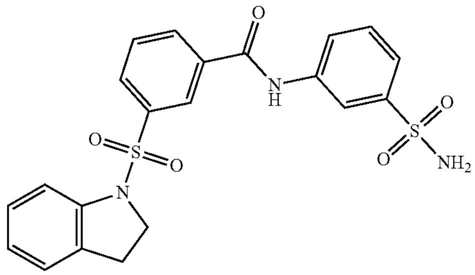 [SMILES: NS(=O)(=O)c1cccc(NC(=O)c2cccc(S(=O)(=O)N3CCc4ccccc43)c2)c1] | 3-(indolin-1-ylsulfonyl)-N-(3-sulfamoylphenyl)benzamide |
| I-530 | 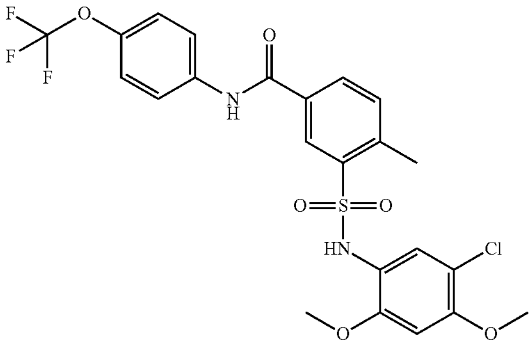 [SMILES: COc1cc(OC)c(NS(=O)(=O)c2cc(C(=O)Nc3ccc(OC(F)(F)F)cc3)ccc2C)cc1Cl] | 3-(N-(5-chloro-2,4-dimethoxyphenyl)sulfamoyl)-4-methyl-N-(4-(trifluoromethoxy)phenyl)benzamide |
| I-531 | 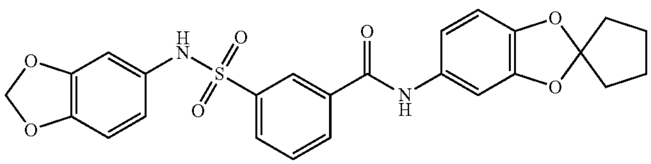 [SMILES: O=C(Nc1ccc2c(c1)OC1(CCCC1)O2)c1cccc(S(=O)(=O)Nc2ccc3c(c2)OCO3)c1] | 3-(N-(benzo[d][1,3]dioxol-5-yl)sulfamoyl)-N-(spiro[benzo[d][1,3]dioxole-2,1'-cyclopentan]-5-yl)benzamide |
| I-532 | 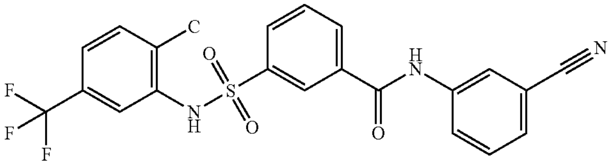 | 3-(N-(2-chloro-5-(trifluoromethyl)phenyl)sulfamoyl)-N-(3-cyanophenyl)benzamide |

TABLE 1-continued
| ID | Structure | Name |
|---|---|---|
| I-533 | 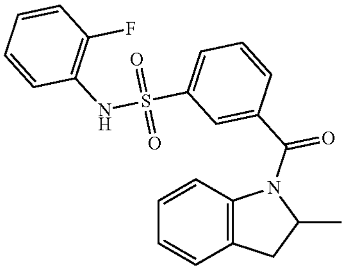 [SMILES: CC1Cc2ccccc2N1C(=O)c1cccc(S(=O)(=O)Nc2ccccc2F)c1] | N-(2-fluorophenyl)-3-(2-methylindoline-1-carbonyl)benzenesulfonamide |
| I-534 | 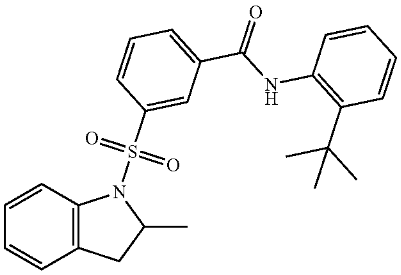 [SMILES: CC1Cc2ccccc2N1S(=O)(=O)c1cccc(C(=O)Nc2ccccc2C(C)(C)C)c1] | N-(2-(tert-butyl)phenyl)-3-((2-methylindolin-1-yl)sulfonyl)benzamide |
| I-535 | 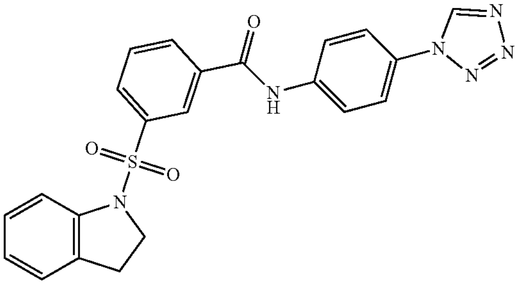 [SMILES: O=C(Nc1ccc(-n2cnnn2)cc1)c1cccc(S(=O)(=O)N2CCc3ccccc32)c1] | N-(4-(1H-tetrazol-1-yl)phenyl)-3-(indolin-1-ylsulfonyl)benzamide |
| I-536 | 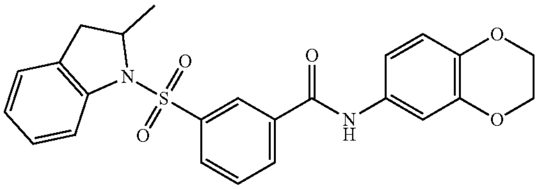 [SMILES: CC1Cc2ccccc2N1S(=O)(=O)c1cccc(C(=O)Nc2ccc3c(c2)OCCO3)c1] | N-(2,3-dihydrobenzo[b][1,4]dioxin-6-yl)-3-((2-methylindolin-1-yl)sulfonyl)benzamide |
| I-537 | 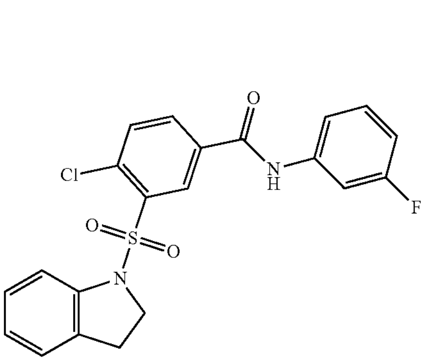 [SMILES: O=C(Nc1cccc(F)c1)c1ccc(Cl)c(S(=O)(=O)N2CCc3ccccc32)c1] | 4-chloro-N-(3-fluorophenyl)-3-(indolin-1-ylsulfonyl)benzamide |

TABLE 1-continued
| ID | Structure | Name |
| --- | --- | --- |
| I-538 | 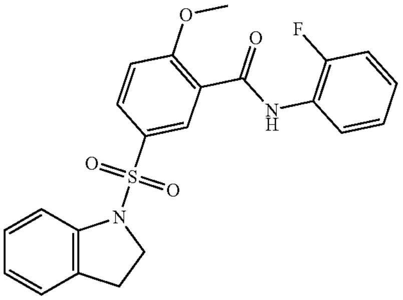 | N-(2-fluorophenyl)-5-(indolin-1-ylsulfonyl)-2-methoxybenzamide |
| I-539 | 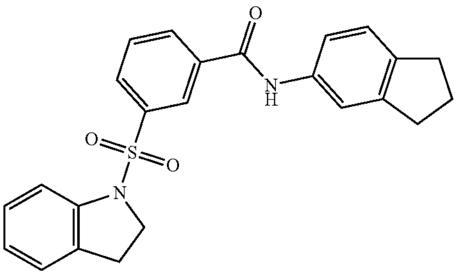 [SMILES: O=C(Nc1ccc2c(c1)CCC2)c1cccc(S(=O)(=O)N2CCc3ccccc32)c1] | N-(2,3-dihydro-1H-inden-5-yl)-3-(indolin-1-ylsulfonyl)benzamide |
| I-540 | 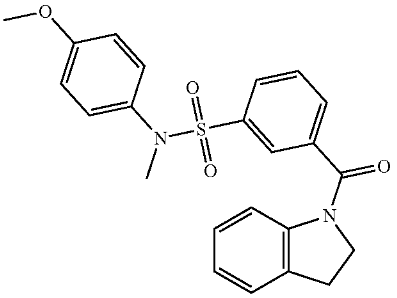 [SMILES: COc1ccc(N(C)S(=O)(=O)c2cccc(C(=O)N3CCc4ccccc43)c2)cc1] | 3-(indoline-1-carbonyl)-N-(4-methoxyphenyl)-N-methylbenzenesulfonamide |
| I-541 | 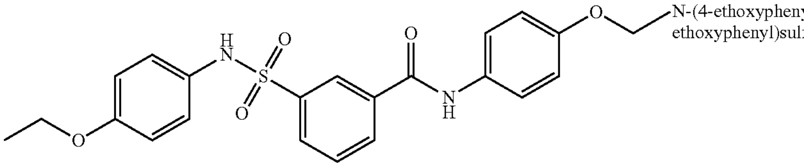 | N-(4-ethoxyphenyl)-3-(N-(4-ethoxyphenyl)sulfamoyl)benzamide |
| I-542 | 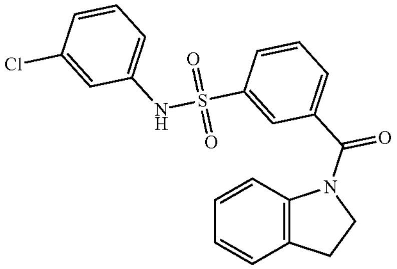 [SMILES: O=C(c1cccc(S(=O)(=O)Nc2cccc(Cl)c2)c1)N1CCc2ccccc21] | N-(3-chlorophenyl)-3-(indoline-1-carbonyl)benzenesulfonamide |

TABLE 1-continued

| ID | Structure | Name |
|---|---|---|
| I-543 | 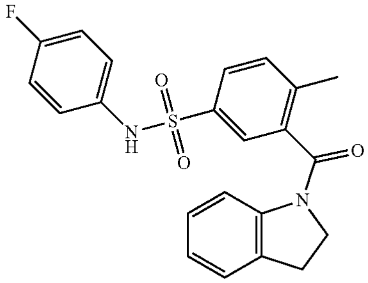 [SMILES: Cc1ccc(S(=O)(=O)Nc2ccc(F)cc2)cc1C(=O)N1CCc2ccccc21] | N-(4-fluorophenyl)-3-(indoline-1-carbonyl)-4-methylbenzenesulfonamide |
| I-544 | 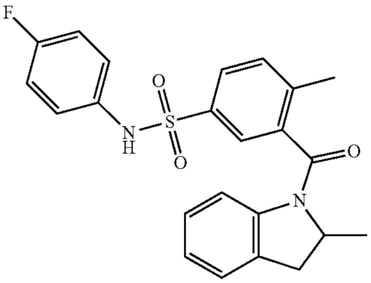 [SMILES: Cc1ccc(S(=O)(=O)Nc2ccc(F)cc2)cc1C(=O)N1c2ccccc2CC1C] | N-(4-fluorophenyl)-4-methyl-3-(2-methylindoline-1-carbonyl)benzenesulfonamide |
| I-545 | 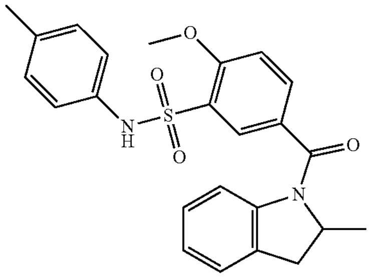 | 2-methoxy-5-(2-methylindoline-1-carbonyl)-N-(p-tolyl)benzenesulfonamide |
| I-546 | 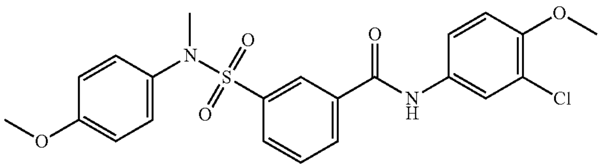 | N-(3-chloro-4-methoxyphenyl)-3-(N-(4-methoxyphenyl)-N-methylsulfamoyl)benzamide |
| I-547 | 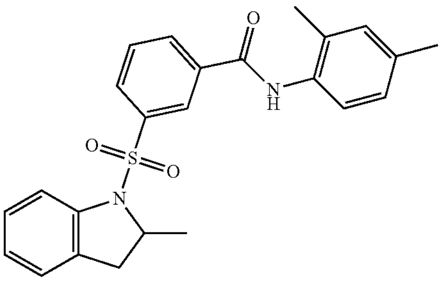 [SMILES: Cc1ccc(NC(=O)c2cccc(S(=O)(=O)N3c4ccccc4CC3C)c2)c(C)c1] | N-(2,4-dimethylphenyl)-3-((2-methylindolin-1-yl)sulfonyl)benzamide |

TABLE 1-continued

| ID | Structure | Name |
| --- | --- | --- |
| I-548 | 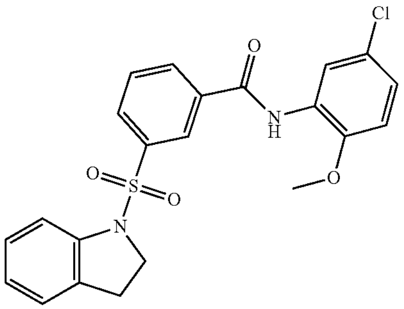 [SMILES: COc1ccc(Cl)cc1NC(=O)c1cccc(S(=O)(=O)N2CCc3ccccc32)c1] | N-(5-chloro-2-methoxyphenyl)-3-(indolin-1-ylsulfonyl)benzamide |
| I-549 | 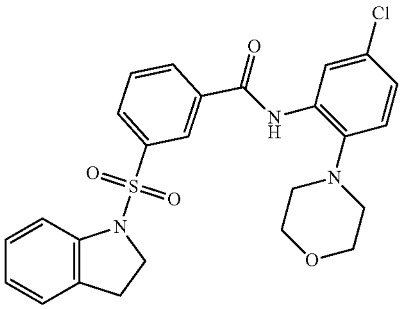 [SMILES: O=C(Nc1cc(Cl)ccc1N1CCOCC1)c1cccc(S(=O)(=O)N2CCc3ccccc32)c1] | N-(5-chloro-2-morpholinophenyl)-3-(indolin-1-ylsulfonyl)benzamide |
| I-550 | 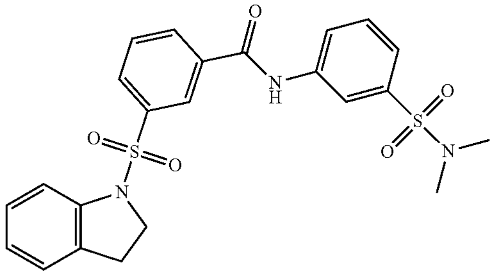 [SMILES: CN(C)S(=O)(=O)c1cccc(NC(=O)c2cccc(S(=O)(=O)N3CCc4ccccc43)c2)c1] | N-(3-(N,N-dimethylsulfamoyl)phenyl)-3-(indolin-1-ylsulfonyl)benzamide |
| I-551 | 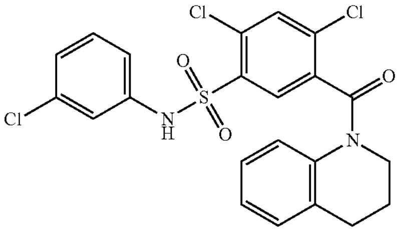 [SMILES: O=C(c1cc(S(=O)(=O)Nc2cccc(Cl)c2)c(Cl)cc1Cl)N1CCCc2ccccc21] | 2,4-dichloro-N-(3-chlorophenyl)-5-(1,2,3,4-tetrahydroquinoline-1-carbonyl)benzenesulfonamide |
| I-552 | 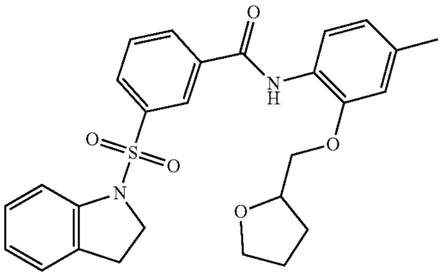 [SMILES: Cc1ccc(NC(=O)c2cccc(S(=O)(=O)N3CCc4ccccc43)c2)c(OCC2CCCO2)c1] | 3-(indolin-1-ylsulfonyl)-N-(4-methyl-2-((tetrahydrofuran-2-yl)methoxy)phenyl)benzamide |

TABLE 1-continued
| ID | Structure | Name |
| --- | --- | --- |
| I-553 | 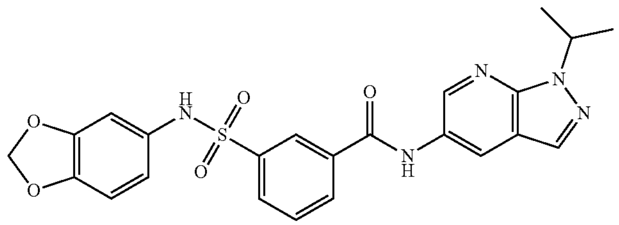 [SMILES: CC(C)n1ncc2cc(NC(=O)c3cccc(S(=O)(=O)Nc4ccc5c(c4)OCO5)c3)cnc21] | 3-(N-(benzo[d][1,3]dioxol-5-yl)sulfamoyl)-N-(1-isopropyl-1H-pyrazolo[3,4-b]pyridin-5-yl)benzamide |
| I-554 | 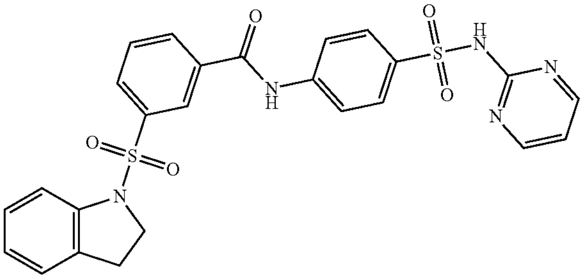 [SMILES: O=C(Nc1ccc(S(=O)(=O)Nc2ncccn2)cc1)c1cccc(S(=O)(=O)N2CCc3ccccc32)c1] | 3-(indolin-1-ylsulfonyl)-N-(4-(N-(pyrimidin-2-yl)sulfamoyl)phenyl)benzamide |
| I-555 | 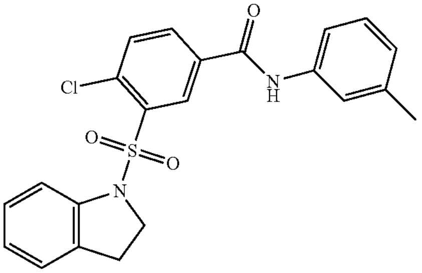 [SMILES: Cc1cccc(NC(=O)c2ccc(Cl)c(S(=O)(=O)N3CCc4ccccc43)c2)c1] | 4-chloro-3-(indolin-1-ylsulfonyl)-N-(m-tolyl)benzamide |
| I-556 | 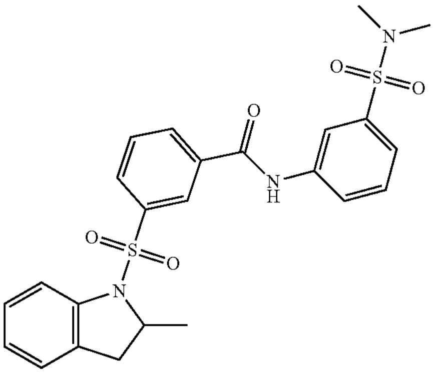 [SMILES: CC1Cc2ccccc2N1S(=O)(=O)c1cccc(C(=O)Nc2cccc(S(=O)(=O)N(C)C)c2)c1] | N-(3-(N,N-dimethylsulfamoyl)phenyl)-3-((2-methylindolin-1-yl)sulfonyl)benzamide |
| I-557 | 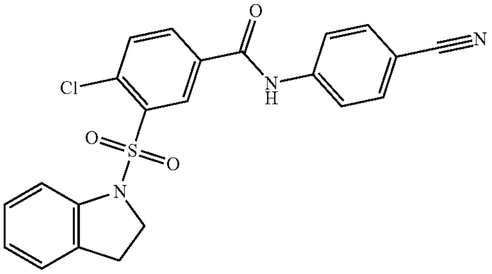 [SMILES: N#Cc1ccc(NC(=O)c2ccc(Cl)c(S(=O)(=O)N3CCc4ccccc43)c2)cc1] | 4-chloro-N-(4-cyanophenyl)-3-(indolin-1-ylsulfonyl)benzamide |

TABLE 1-continued

| ID | Structure | Name |
|---|---|---|
| I-558 | 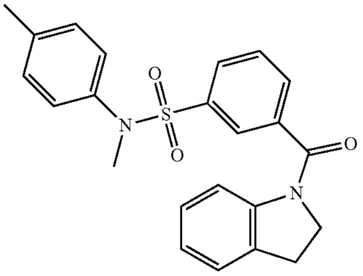 [SMILES: Cc1ccc(N(C)S(=O)(=O)c2cccc(C(=O)N3CCc4ccccc43)c2)cc1] | 3-(indoline-1-carbonyl)-N-methyl-N-(p-tolyl)benzenesulfonamide |
| I-559 | 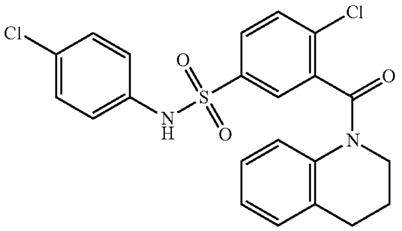 [SMILES: O=C(c1cc(S(=O)(=O)Nc2ccc(Cl)cc2)ccc1Cl)N1CCCc2ccccc21] | 4-chloro-N-(4-chlorophenyl)-3-(1,2,3,4-tetrahydroquinoline-1-carbonyl)benzenesulfonamide |
| I-560 | 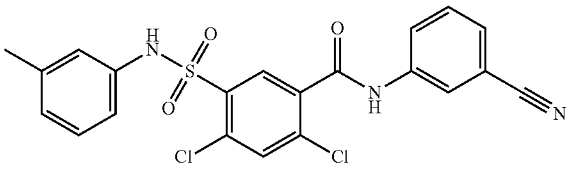 [SMILES: Cc1cccc(NS(=O)(=O)c2cc(C(=O)Nc3cccc(C#N)c3)c(Cl)cc2Cl)c1] | 2,4-dichloro-N-(3-cyanophenyl)-5-(N-(m-tolyl)sulfamoyl)benzamide |
| I-561 | 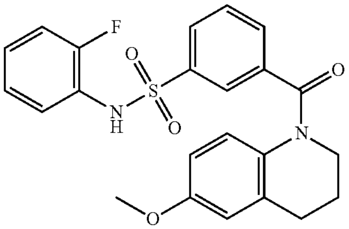 [SMILES: COc1ccc2c(c1)CCCN2C(=O)c1cccc(S(=O)(=O)Nc2ccccc2F)c1] | N-(2-fluorophenyl)-3-(6-methoxy-1,2,3,4-tetrahydroquinoline-1-carbonyl)benzenesulfonamide |
| I-562 | 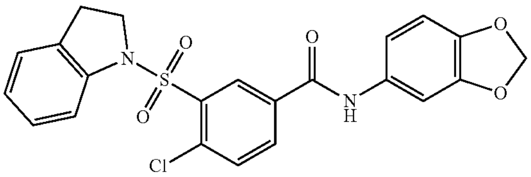 [SMILES: O=C(Nc1ccc2c(c1)OCO2)c1ccc(Cl)c(S(=O)(=O)N2CCc3ccccc32)c1] | N-(benzo[d][1,3]dioxol-5-yl)-4-chloro-3-(indolin-1-ylsulfonyl)benzamide |
| I-563 | 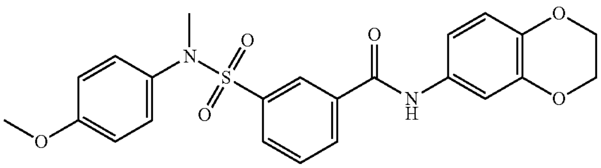 [SMILES: COc1ccc(N(C)S(=O)(=O)c2cccc(C(=O)Nc3ccc4c(c3)OCCO4)c2)cc1] | N-(2,3-dihydrobenzo[b][1,4]dioxin-6-yl)-3-(N-(4-methoxyphenyl)-N-methylsulfamoyl)benzamide |
| I-564 | 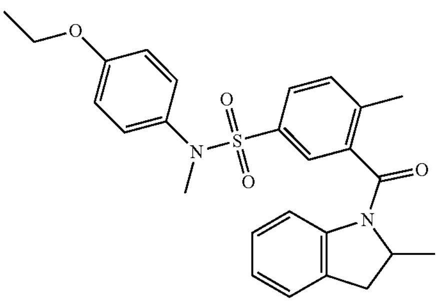 [SMILES: CCOc1ccc(N(C)S(=O)(=O)c2ccc(C)c(C(=O)N3c4ccccc4CC3C)c2)cc1] | N-(4-ethoxyphenyl)-N,4-dimethyl-3-(2-methylindoline-1-carbonyl)benzenesulfonamide |

TABLE 1-continued

| ID | Structure | Name |
| --- | --- | --- |
| I-565 | 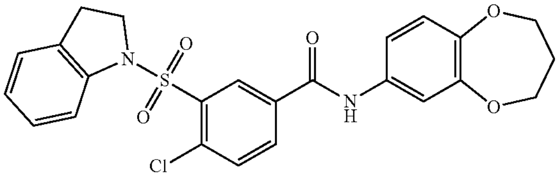 [SMILES: O=C(Nc1ccc2c(c1)OCCCO2)c1ccc(Cl)c(S(=O)(=O)N2CCc3ccccc32)c1] | 4-chloro-N-(3,4-dihydro-2H-benzo[b][1,4]dioxepin-7-yl)-3-(indolin-1-ylsulfonyl)benzamide |
| I-566 | 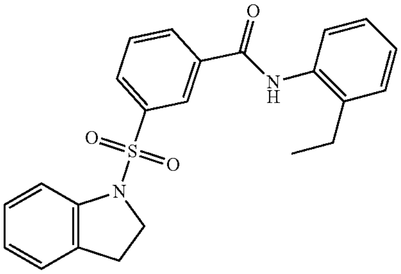 | N-(2-ethylphenyl)-3-(indolin-1-ylsulfonyl)benzamide |
| I-567 | 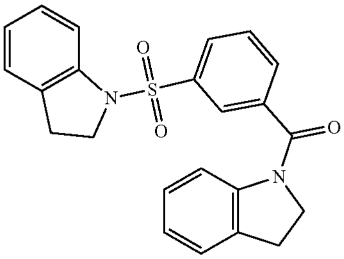 [SMILES: O=C(c1cccc(S(=O)(=O)N2CCc3ccccc32)c1)N1CCc2ccccc21] | indolin-1-yl(3-(indolin-1-ylsulfonyl)phenyl)methanone |
| I-568 | 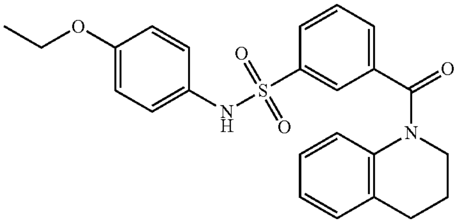 [SMILES: CCOc1ccc(NS(=O)(=O)c2cccc(C(=O)N3CCCc4ccccc43)c2)cc1] | N-(4-ethoxyphenyl)-3-(1,2,3,4-tetrahydroquinoline-1-carbonyl)benzenesulfonamide |
| I-569 | 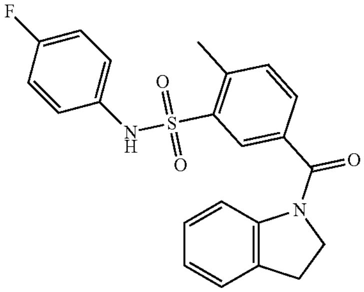 [SMILES: Cc1ccc(C(=O)N2CCc3ccccc32)cc1S(=O)(=O)Nc1ccc(F)cc1] | N-(4-fluorophenyl)-5-(indoline-1-carbonyl)-2-methylbenzenesulfonamide |
| I-570 | 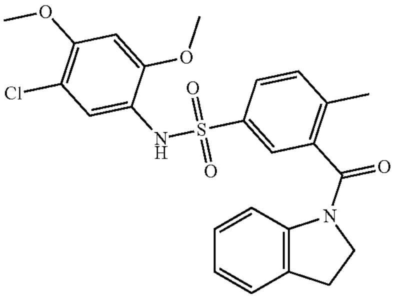 [SMILES: COc1cc(OC)c(NS(=O)(=O)c2ccc(C)c(C(=O)N3CCc4ccccc43)c2)cc1Cl] | N-(5-chloro-2,4-dimethoxyphenyl)-3-(indoline-1-carbonyl)-4-methylbenzenesulfonamide |

TABLE 1-continued

| ID | Structure | Name |
|---|---|---|
| I-571 | 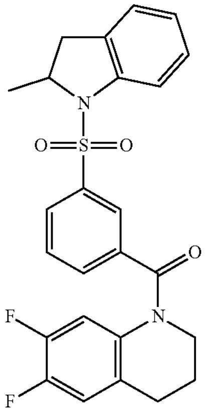 [SMILES: CC1Cc2ccccc2N1S(=O)(=O)c1cccc(C(=O)N2CCCc3cc(F)c(F)cc32)c1] | (6,7-difluoro-3,4-dihydroquinolin-1(2H)-yl)(3-((2-methylindolin-1-yl)sulfonyl)phenyl)methanone |
| I-572 | 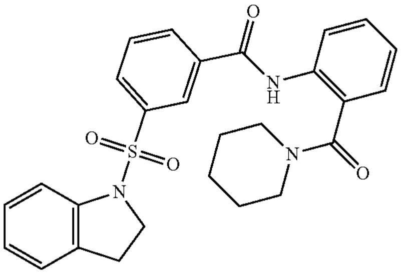 [SMILES: O=C(Nc1ccccc1C(=O)N1CCCCC1)c1cccc(S(=O)(=O)N2CCc3ccccc32)c1] | 3-(indolin-1-ylsulfonyl)-N-(2-(piperidine-1-carbonyl)phenyl)benzamide |
| I-573 | 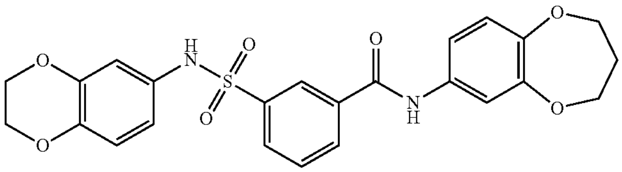 [SMILES: O=C(Nc1ccc2c(c1)OCCCO2)c1cccc(S(=O)(=O)Nc2ccc3c(c2)OCCO3)c1] | N-(3,4-dihydro-2H-benzo[b][1,4]dioxepin-7-yl)-3-(N-(2,3-dihydrobenzo[b][1,4]dioxin-6-yl)sulfamoyl)benzamide |
| I-574 | 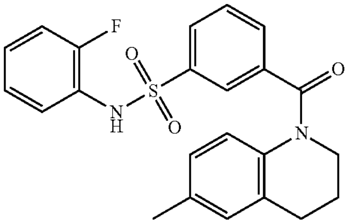 [SMILES: Cc1ccc2c(c1)CCCN2C(=O)c1cccc(S(=O)(=O)Nc2ccccc2F)c1] | N-(2-fluorophenyl)-3-(6-methyl-1,2,3,4-tetrahydroquinoline-1-carbonyl)benzenesulfonamide |
| I-575 | 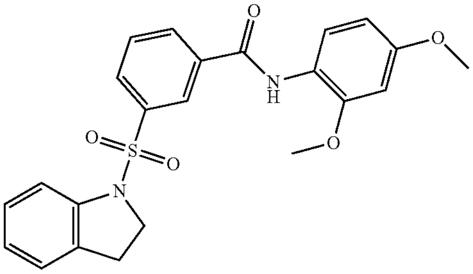 [SMILES: COc1ccc(NC(=O)c2cccc(S(=O)(=O)N3CCc4ccccc43)c2)c(OC)c1] | N-(2,4-dimethoxyphenyl)-3-(indolin-1-ylsulfonyl)benzamide |

TABLE 1-continued

| ID | Structure | Name |
|---|---|---|
| I-576 | 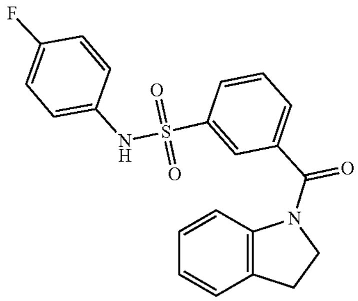 [SMILES: O=C(c1cccc(S(=O)(=O)Nc2ccc(F)cc2)c1)N1CCc2ccccc21] | N-(4-fluorophenyl)-3-(indoline-1-carbonyl)benzenesulfonamide |
| I-577 | 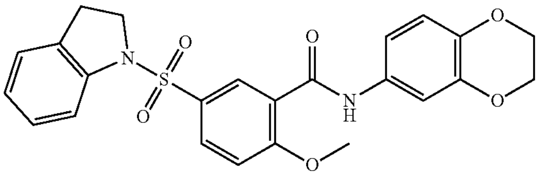 [SMILES: COc1ccc(S(=O)(=O)N2CCc3ccccc32)cc1C(=O)Nc1ccc2c(c1)OCCO2] | N-(2,3-dihydrobenzo[b][1,4]dioxin-6-yl)-5-(indolin-1-ylsulfonyl)-2-methoxybenzamide |
| I-578 | 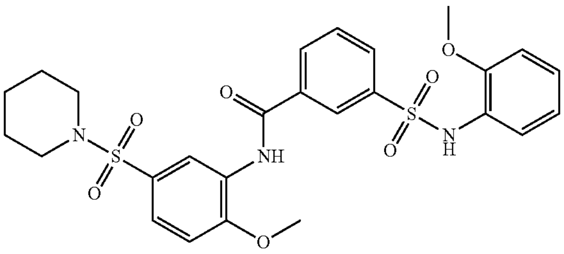 [SMILES: COc1ccc(S(=O)(=O)N2CCCCC2)cc1NC(=O)c1cccc(S(=O)(=O)Nc2ccccc2OC)c1] | N-(2-methoxy-5-(piperidin-1-ylsulfonyl)phenyl)-3-(N-(2-methoxyphenyl)sulfamoyl)benzamide |
| I-579 | 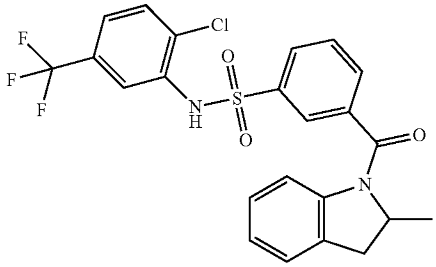 [SMILES: CC1Cc2ccccc2N1C(=O)c1cccc(S(=O)(=O)Nc2cc(C(F)(F)F)ccc2Cl)c1] | N-(2-chloro-5-(trifluoromethyl)phenyl)-3-(2-methylindoline-1-carbonyl)benzenesulfonamide |
| I-580 | 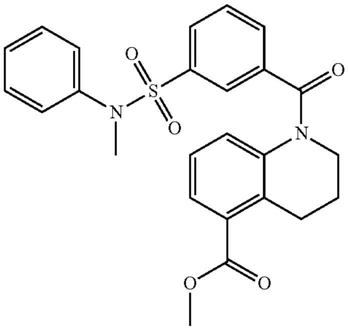 [SMILES: COC(=O)c1cccc2c1CCCN2C(=O)c1cccc(S(=O)(=O)N(C)c2ccccc2)c1] | methyl 1-(3-(N-methyl-N-phenylsulfamoyl)benzoyl)-1,2,3,4-tetrahydroquinoline-5-carboxylate |

TABLE 1-continued

| ID | Structure | Name |
|---|---|---|
| I-581 | 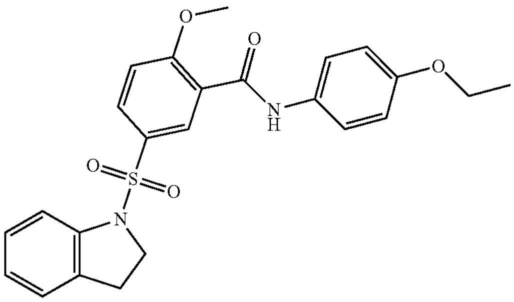 [SMILES: CCOc1ccc(NC(=O)c2cc(S(=O)(=O)N3CCc4ccccc43)ccc2OC)cc1] | N-(4-ethoxyphenyl)-5-(indolin-1-ylsulfonyl)-2-methoxybenzamide |
| I-582 | 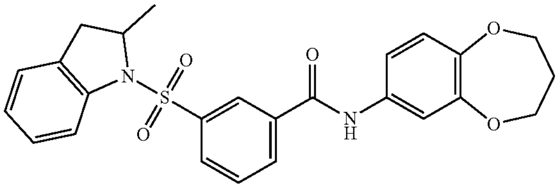 [SMILES: CC1Cc2ccccc2N1S(=O)(=O)c1cccc(C(=O)Nc2ccc3c(c2)OCCCO3)c1] | N-(3,4-dihydro-2H-benzo[b][1,4]dioxepin-7-yl)-3-((2-methylindolin-1-yl)sulfonyl)benzamide |
| I-583 | 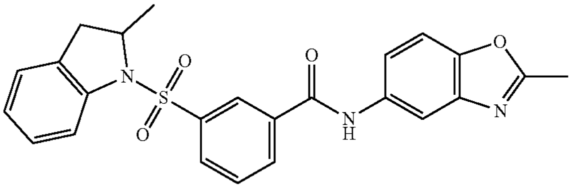 [SMILES: Cc1nc2cc(NC(=O)c3cccc(S(=O)(=O)N4c5ccccc5CC4C)c3)ccc2o1] | N-(2-methylbenzo[d]oxazol-5-yl)-3-((2-methylindolin-1-yl)sulfonyl)benzamide |
| I-584 | 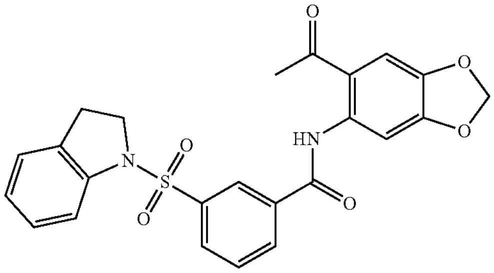 [SMILES: CC(=O)c1cc2c(cc1NC(=O)c1cccc(S(=O)(=O)N3CCc4ccccc43)c1)OCO2] | N-(6-acetylbenzo[d][1,3]dioxol-5-yl)-3-(indolin-1-ylsulfonyl)benzamide |
| I-585 | 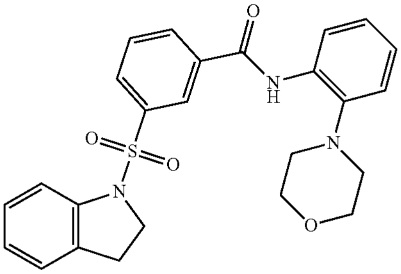 [SMILES: O=C(Nc1ccccc1N1CCOCC1)c1cccc(S(=O)(=O)N2CCc3ccccc32)c1] | 3-(indolin-1-ylsulfonyl)-N-(2-morpholinophenyl)benzamide |
| I-586 | 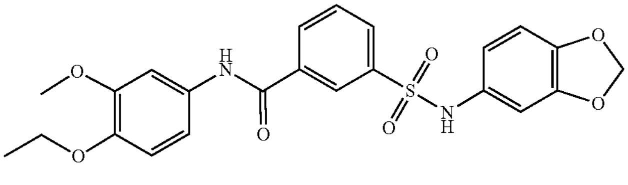 [SMILES: CCOc1ccc(NC(=O)c2cccc(S(=O)(=O)Nc3ccc4c(c3)OCO4)c2)cc1OC] | 3-(N-(benzo[d][1,3]dioxol-5-yl)sulfamoyl)-N-(4-ethoxy-3-methoxyphenyl)benzamide |

TABLE 1-continued

| ID | Structure | Name |
|---|---|---|
| I-587 | 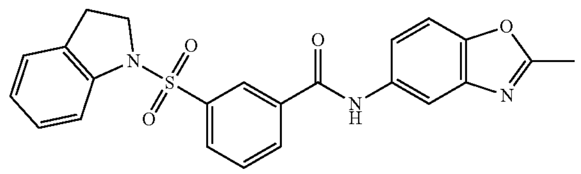 [SMILES: Cc1nc2cc(NC(=O)c3cccc(S(=O)(=O)N4CCc5ccccc54)c3)ccc2o1] | 3-(indolin-1-ylsulfonyl)-N-(2-methylbenzo[d]oxazol-5-yl)benzamide |
| I-588 | 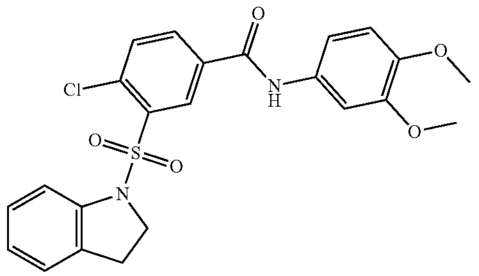 [SMILES: COc1ccc(NC(=O)c2ccc(Cl)c(S(=O)(=O)N3CCc4ccccc43)c2)cc1OC] | 4-chloro-N-(3,4-dimethoxyphenyl)-3-(indolin-1-ylsulfonyl)benzamide |
| I-589 | 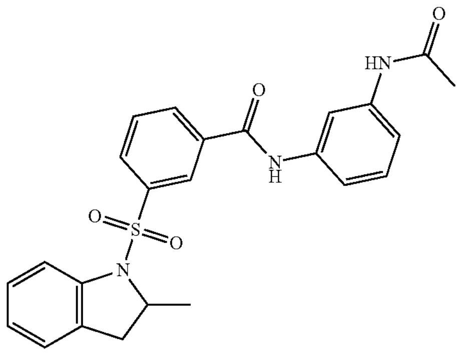 [SMILES: CC(=O)Nc1cccc(NC(=O)c2cccc(S(=O)(=O)N3c4ccccc4CC3C)c2)c1] | N-(3-acetamidophenyl)-3-((2-methylindolin-1-yl)sulfonyl)benzamide |
| I-590 | 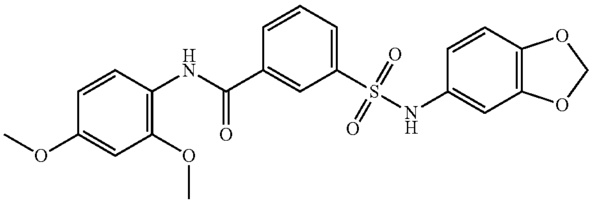 [SMILES: COc1ccc(NC(=O)c2cccc(S(=O)(=O)Nc3ccc4c(c3)OCO4)c2)c(OC)c1] | 3-(N-(benzo[d][1,3]dioxol-5-yl)sulfamoyl)-N-(2,4-dimethoxyphenyl)benzamide |
| I-591 | 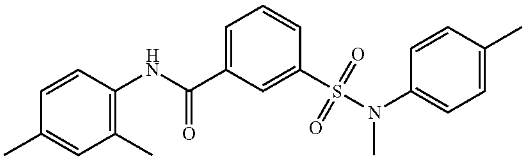 | N-(2,4-dimethylphenyl)-3-(N-methyl-N-(p-tolyl)sulfamoyl)benzamide |
| I-592 | 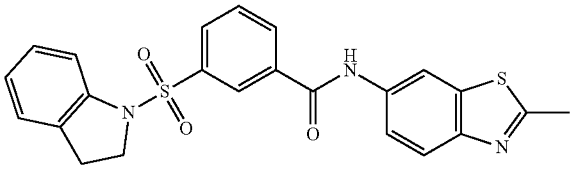 [SMILES: Cc1nc2ccc(NC(=O)c3cccc(S(=O)(=O)N4CCc5ccccc54)c3)cc2s1] | 3-(indolin-1-ylsulfonyl)-N-(2-methylbenzo[d]thiazol-6-yl)benzamide |

TABLE 1-continued

| ID | Structure | Name |
|---|---|---|
| I-593 | 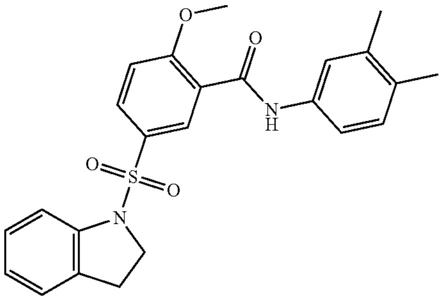 [SMILES: COc1ccc(S(=O)(=O)N2CCc3ccccc32)cc1C(=O)Nc1ccc(C)c(C)c1] | N-(3,4-dimethylphenyl)-5-(indolin-1-ylsulfonyl)-2-methoxybenzamide |
| I-594 | 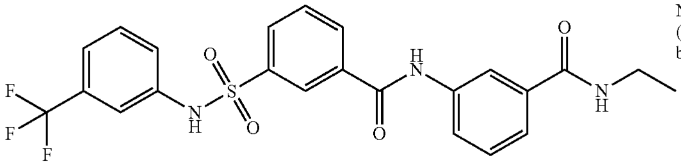 | N-ethyl-3-(3-(N-(3-(trifluoromethyl)phenyl)sulfamoyl)benzamido)benzamide |
| I-595 | 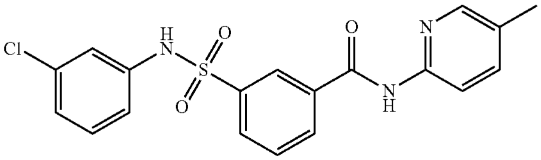 [SMILES: Cc1ccc(NC(=O)c2cccc(S(=O)(=O)Nc3cccc(Cl)c3)c2)nc1] | 3-(N-(3-chlorophenyl)sulfamoyl)-N-(5-methylpyridin-2-yl)benzamide |
| I-596 | 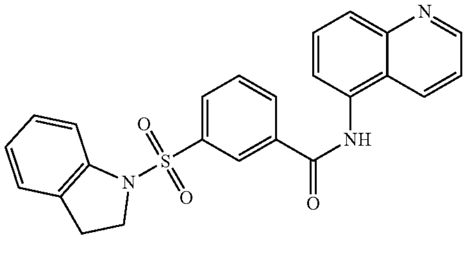 [SMILES: O=C(Nc1cccc2ncccc12)c1cccc(S(=O)(=O)N2CCc3ccccc32)c1] | 3-(indolin-1-ylsulfonyl)-N-(quinolin-5-yl)benzamide |
| I-597 | 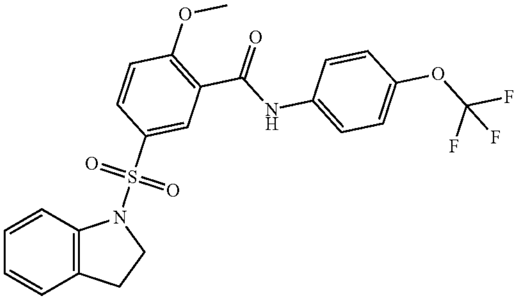 [SMILES: COc1ccc(S(=O)(=O)N2CCc3ccccc32)cc1C(=O)Nc1ccc(OC(F)(F)F)cc1] | 5-(indolin-1-ylsulfonyl)-2-methoxy-N-(4-(trifluoromethoxy)phenyl)benzamide |
| I-598 | 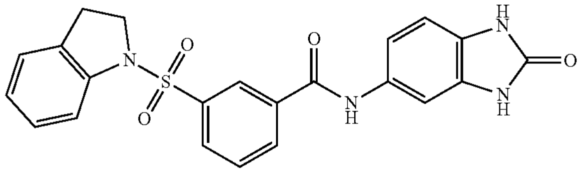 [SMILES: O=C(Nc1ccc2[nH]c(=O)[nH]c2c1)c1cccc(S(=O)(=O)N2CCc3ccccc32)c1] | 3-(indolin-1-ylsulfonyl)-N-(2-oxo-2,3-dihydro-1H-benzo[d]imidazol-5-yl)benzamide |

TABLE 1-continued
| ID | Structure | Name |
|---|---|---|
| I-599 | 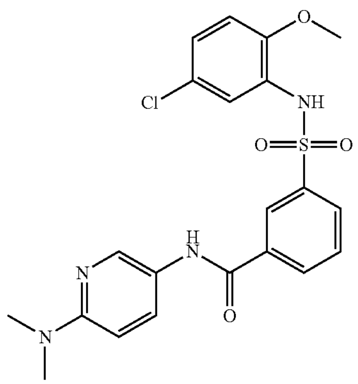 [SMILES: COc1ccc(Cl)cc1NS(=O)(=O)c1cccc(C(=O)Nc2ccc(N(C)C)nc2)c1] | 3-(N-(5-chloro-2-methoxyphenyl)sulfamoyl)-N-(6-(dimethylamino)pyridin-3-yl)benzamide |
| I-600 | 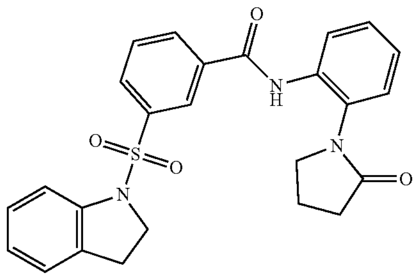 [SMILES: O=C(Nc1ccccc1N1CCCC1=O)c1cccc(S(=O)(=O)N2CCc3ccccc32)c1] | 3-(indolin-1-ylsulfonyl)-N-(2-(2-oxopyrrolidin-1-yl)phenyl)benzamide |
| I-601 | 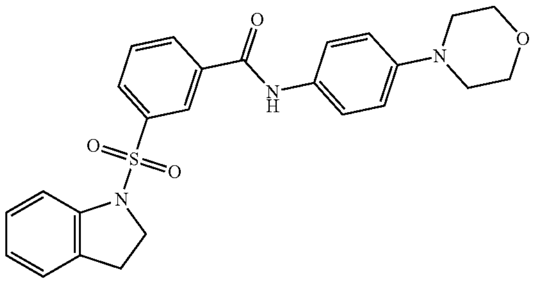 [SMILES: O=C(Nc1ccc(N2CCOCC2)cc1)c1cccc(S(=O)(=O)N2CCc3ccccc32)c1] | 3-(indolin-1-ylsulfonyl)-N-(4-morpholinophenyl)benzamide |
| I-602 | 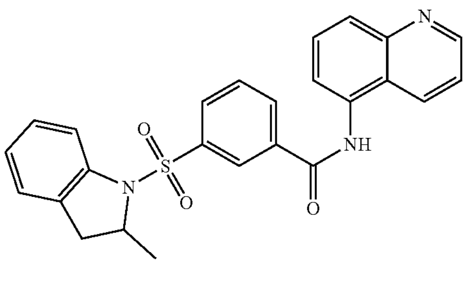 [SMILES: CC1Cc2ccccc2N1S(=O)(=O)c1cccc(C(=O)Nc2cccc3ncccc23)c1] | 3-((2-methylindolin-1-yl)sulfonyl)-N-(quinolin-5-yl)benzamide |

TABLE 1-continued
| ID | Structure | Name |
|---|---|---|
| I-603 | 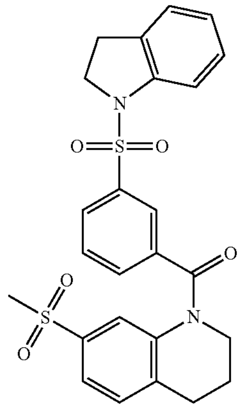 [SMILES: CS(=O)(=O)c1ccc2c(c1)N(C(=O)c1cccc(S(=O)(=O)N3CCc4ccccc43)c1)CCC2] | (3-(indolin-1-ylsulfonyl)phenyl)(7-(methylsulfonyl)-3,4-dihydroquinolin-1(2H)-yl)methanone |
| I-604 | 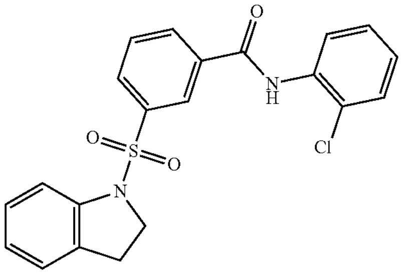 [SMILES: O=C(Nc1ccccc1Cl)c1cccc(S(=O)(=O)N2CCc3ccccc32)c1] | N-(2-chlorophenyl)-3-(indolin-1-ylsulfonyl)benzamide |
| I-605 | 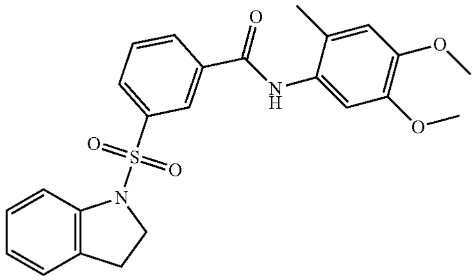 [SMILES: COc1cc(C)c(NC(=O)c2cccc(S(=O)(=O)N3CCc4ccccc43)c2)cc1OC] | N-(4,5-dimethoxy-2-methylphenyl)-3-(indolin-1-ylsulfonyl)benzamide |
| I-606 | 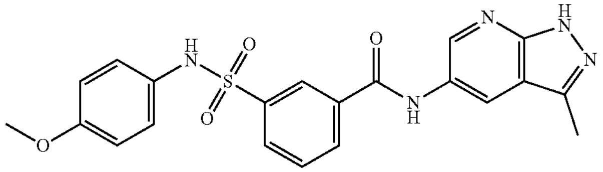 [SMILES: COc1ccc(NS(=O)(=O)c2cccc(C(=O)Nc3cnc4[nH]nc(C)c4c3)c2)cc1] | 3-(N-(4-methoxyphenyl)sulfamoyl)-N-(3-methyl-1H-pyrazolo[3,4-b]pyridin-5-yl)benzamide |
| I-607 | 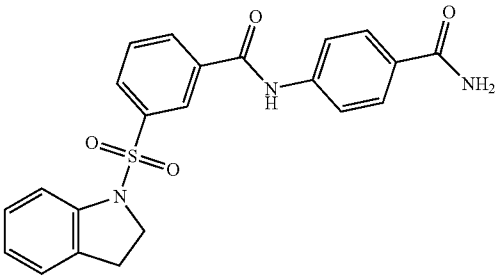 [SMILES: NC(=O)c1ccc(NC(=O)c2cccc(S(=O)(=O)N3CCc4ccccc43)c2)cc1] | N-(4-carbamoylphenyl)-3-(indolin-1-ylsulfonyl)benzamide |

TABLE 1-continued

| ID | Structure | Name |
|---|---|---|
| I-608 | 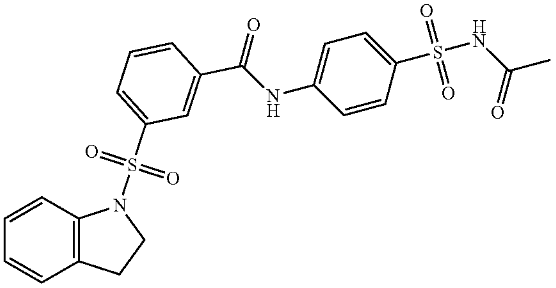 [SMILES: CC(=O)NS(=O)(=O)c1ccc(NC(=O)c2cccc(S(=O)(=O)N3CCc4ccccc43)c2)cc1] | N-(4-(N-acetylsulfamoyl)phenyl)-3-(indolin-1-ylsulfonyl)benzamide |
| I-609 | 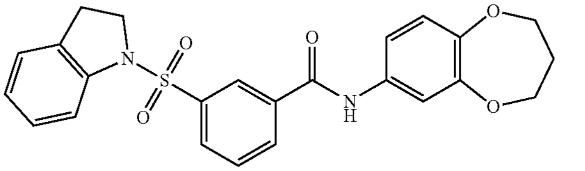 [SMILES: O=C(Nc1ccc2c(c1)OCCCO2)c1cccc(S(=O)(=O)N2CCc3ccccc32)c1] | N-(3,4-dihydro-2H-benzo[b][1,4]dioxepin-7-yl)-3-(indolin-1-ylsulfonyl)benzamide |
| I-610 | 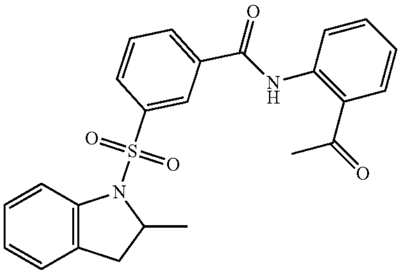 [SMILES: CC(=O)c1ccccc1NC(=O)c1cccc(S(=O)(=O)N2c3ccccc3CC2C)c1] | N-(2-acetylphenyl)-3-((2-methylindolin-1-yl)sulfonyl)benzamide |
| I-611 | 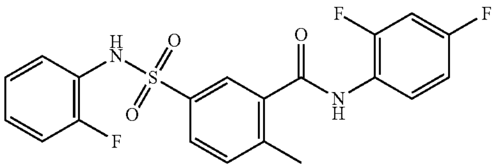 [SMILES: Cc1ccc(S(=O)(=O)Nc2ccccc2F)cc1C(=O)Nc1ccc(F)cc1F] | N-(2,4-difluorophenyl)-5-(N-(2-fluorophenyl)sulfamoyl)-2-methylbenzamide |
| I-612 | 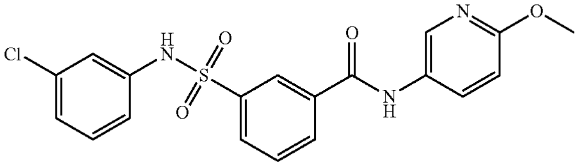 [SMILES: COc1ccc(NC(=O)c2cccc(S(=O)(=O)Nc3cccc(Cl)c3)c2)cn1] | 3-(N-(3-chlorophenyl)sulfamoyl)-N-(6-methoxypyridin-3-yl)benzamide |
| I-613 | 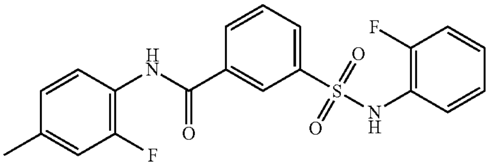 [SMILES: Cc1ccc(NC(=O)c2cccc(S(=O)(=O)Nc3ccccc3F)c2)c(F)c1] | N-(2-fluoro-4-methylphenyl)-3-(N-(2-fluorophenyl)sulfamoyl)benzamide |
| I-614 | 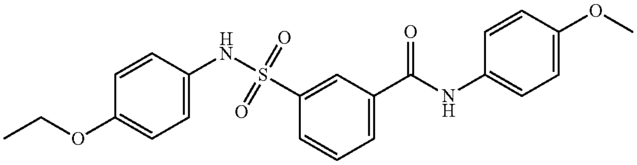 [SMILES: CCOc1ccc(NS(=O)(=O)c2cccc(C(=O)Nc3ccc(OC)cc3)c2)cc1] | 3-(N-(4-ethoxyphenyl)sulfamoyl)-N-(4-methoxyphenyl)benzamide |

TABLE 1-continued

| ID | Structure | Name |
|---|---|---|
| I-615 | 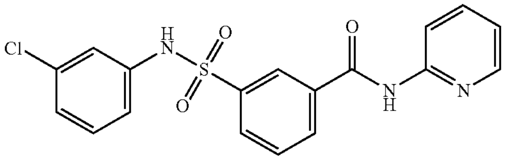 [SMILES: O=C(Nc1ccccn1)c1cccc(S(=O)(=O)Nc2cccc(Cl)c2)c1] | 3-(N-(3-chlorophenyl)sulfamoyl)-N-(pyridin-2-yl)benzamide |
| I-616 | 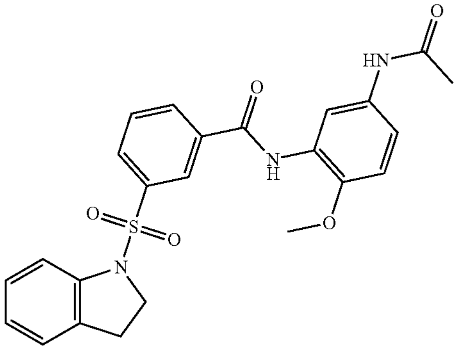 [SMILES: COc1ccc(NC(C)=O)cc1NC(=O)c1cccc(S(=O)(=O)N2CCc3ccccc32)c1] | N-(5-acetamido-2-methoxyphenyl)-3-(indolin-1-ylsulfonyl)benzamide |
| I-617 | 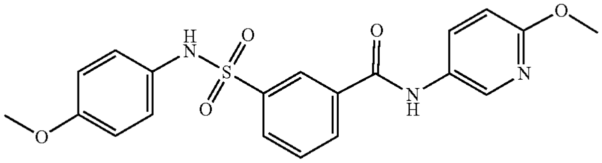 | 3-(N-(4-methoxyphenyl)sulfamoyl)-N-(6-methoxypyridin-3-yl)benzamide |
| I-618 | 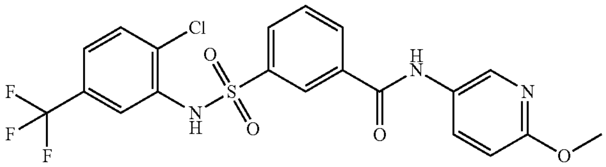 [SMILES: COc1ccc(NC(=O)c2cccc(S(=O)(=O)Nc3cc(C(F)(F)F)ccc3Cl)c2)cn1] | 3-(N-(2-chloro-5-(trifluoromethyl)phenyl)sulfamoyl)-N-(6-methoxypyridin-3-yl)benzamide |
| I-619 | 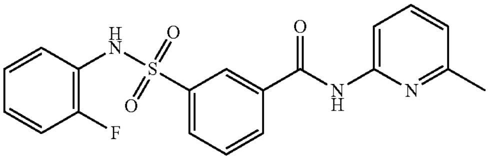 [SMILES: Cc1cccc(NC(=O)c2cccc(S(=O)(=O)Nc3ccccc3F)c2)n1] | 3-(N-(2-fluorophenyl)sulfamoyl)-N-(6-methylpyridin-2-yl)benzamide |
| I-620 | 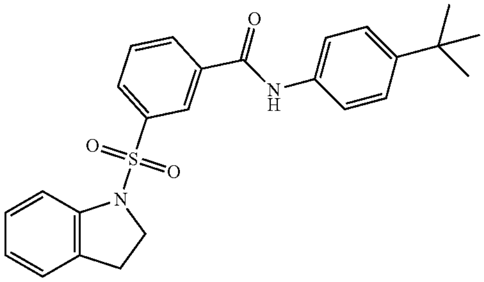 [SMILES: CC(C)(C)c1ccc(NC(=O)c2cccc(S(=O)(=O)N3CCc4ccccc43)c2)cc1] | N-(4-(tert-butyl)phenyl)-3-(indolin-1-ylsulfonyl)benzamide |
| I-621 | 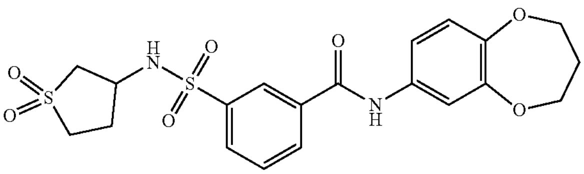 [SMILES: O=C(Nc1ccc2c(c1)OCCCO2)c1cccc(S(=O)(=O)NC2CCS(=O)(=O)C2)c1] | N-(3,4-dihydro-2H-benzo[b][1,4]dioxepin-7-yl)-3-(N-(1,1-dioxidotetrahydrothiophen-3-yl)sulfamoyl)benzamide |

TABLE 1-continued

| ID | Structure | Name |
|---|---|---|
| I-622 | 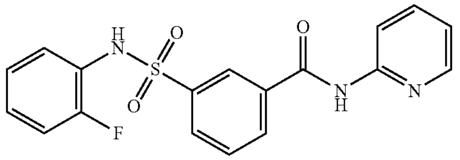 [SMILES: O=C(Nc1ccccn1)c1cccc(S(=O)(=O)Nc2ccccc2F)c1] | 3-(N-(2-fluorophenyl)sulfamoyl)-N-(pyridin-2-yl)benzamide |
| I-623 | 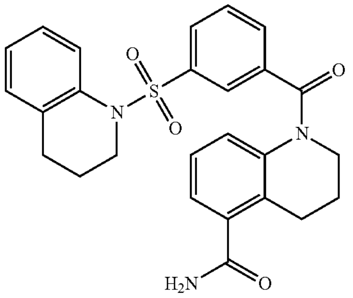 [SMILES: NC(=O)c1cccc2c1CCCN2C(=O)c1cccc(S(=O)(=O)N2CCCc3ccccc32)c1] | 1-(3-((3,4-dihydroquinolin-1(2H)-yl)sulfonyl)benzoyl)-1,2,3,4-tetrahydroquinoline-5-carboxamide |
| I-624 | 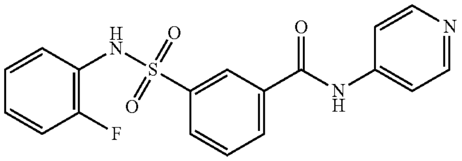 [SMILES: O=C(Nc1ccncc1)c1cccc(S(=O)(=O)Nc2ccccc2F)c1] | 3-(N-(2-fluorophenyl)sulfamoyl)-N-(pyridin-4-yl)benzamide |
| I-625 | 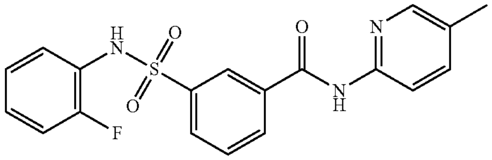 [SMILES: Cc1ccc(NC(=O)c2cccc(S(=O)(=O)Nc3ccccc3F)c2)nc1] | 3-(N-(2-fluorophenyl)sulfamoyl)-N-(5-methylpyridin-2-yl)benzamide |
| I-626 | 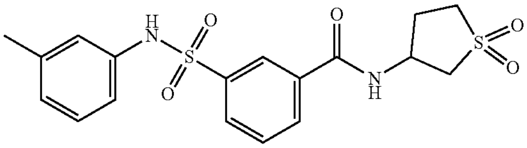 [SMILES: Cc1cccc(NS(=O)(=O)c2cccc(C(=O)NC3CCS(=O)(=O)C3)c2)c1] | N-(1,1-dioxidotetrahydrothiophen-3-yl)-3-(N-(m-tolyl)sulfamoyl)benzamide |
| I-627 | 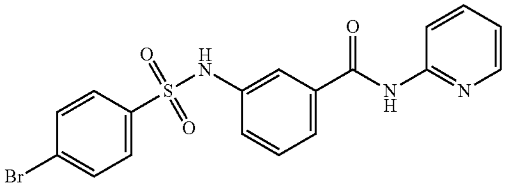 [SMILES: O=C(Nc1ccccn1)c1cccc(NS(=O)(=O)c2ccc(Br)cc2)c1] | 3-((4-bromophenyl)sulfonamido)-N-(pyridin-2-yl)benzamide |
| I-628 | 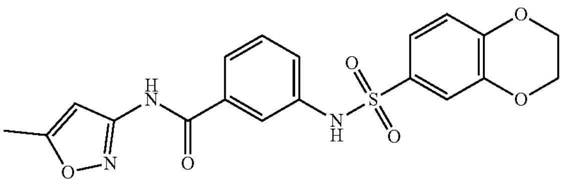 [SMILES: Cc1cc(NC(=O)c2cccc(NS(=O)(=O)c3ccc4c(c3)OCCO4)c2)no1] | 3-((2,3-dihydrobenzo[b][1,4]dioxine)-6-sulfonamido)-N-(5-methylisoxazol-3-yl)benzamide |
| I-629 | 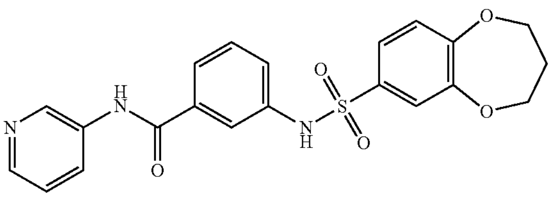 [SMILES: O=C(Nc1cccnc1)c1cccc(NS(=O)(=O)c2ccc3c(c2)OCCCO3)c1] | 3-((3,4-dihydro-2H-benzo[b][1,4]dioxepine)-7-sulfonamido)-N-(pyridin-3-yl)benzamide |

TABLE 1-continued

| ID | Structure | Name |
|---|---|---|
| I-630 | 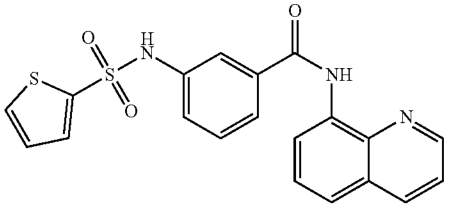 [SMILES: O=C(Nc1cccc2cccnc12)c1cccc(NS(=O)(=O)c2cccs2)c1] | N-(quinolin-8-yl)-3-(thiophene-2-sulfonamido)benzamide |
| I-631 | 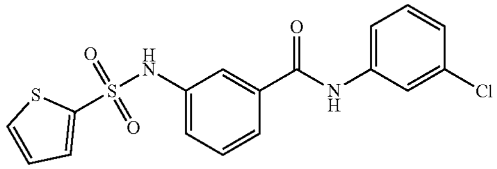 [SMILES: O=C(Nc1cccc(Cl)c1)c1cccc(NS(=O)(=O)c2cccs2)c1] | N-(3-chlorophenyl)-3-(thiophene-2-sulfonamido)benzamide |
| I-632 | 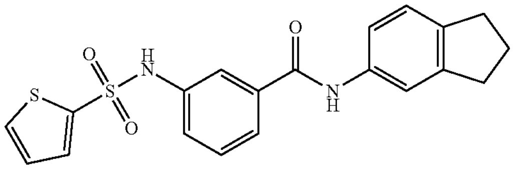 [SMILES: O=C(Nc1ccc2c(c1)CCC2)c1cccc(NS(=O)(=O)c2cccs2)c1] | N-(2,3-dihydro-1H-inden-5-yl)-3-(thiophene-2-sulfonamido)benzamide |
| I-633 | 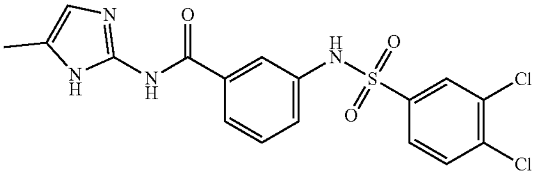 [SMILES: Cc1cnc(NC(=O)c2cccc(NS(=O)(=O)c3ccc(Cl)c(Cl)c3)c2)[nH]1] | 3-((3,4-dichlorophenyl)sulfonamido)-N-(5-methyl-1H-imidazol-2-yl)benzamide |
| I-634 | 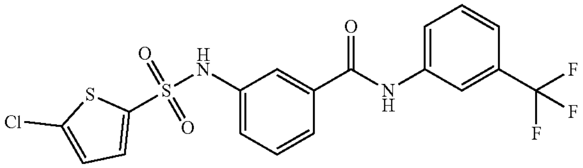 [SMILES: O=C(Nc1cccc(C(F)(F)F)c1)c1cccc(NS(=O)(=O)c2ccc(Cl)s2)c1] | 3-((5-chlorothiophene)-2-sulfonamido)-N-(3-(trifluoromethyl)phenyl)benzamide |
| I-635 | 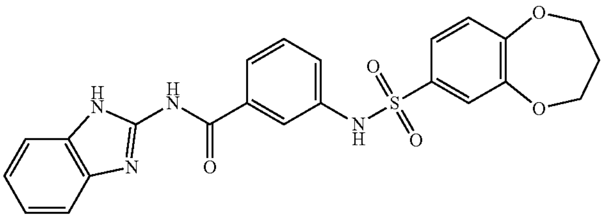 [SMILES: O=C(Nc1nc2ccccc2[nH]1)c1cccc(NS(=O)(=O)c2ccc3c(c2)OCCCO3)c1] | N-(1H-benzo[d]imidazol-2-yl)-3-((3,4-dihydro-2H-benzo[b][1,4]dioxepine)-7-sulfonamido)benzamide |
| I-636 | 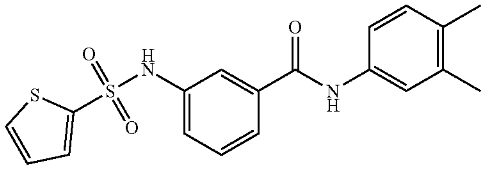 [SMILES: Cc1ccc(NC(=O)c2cccc(NS(=O)(=O)c3cccs3)c2)cc1C] | N-(3,4-dimethylphenyl)-3-(thiophene-2-sulfonamido)benzamide |
| I-637 | 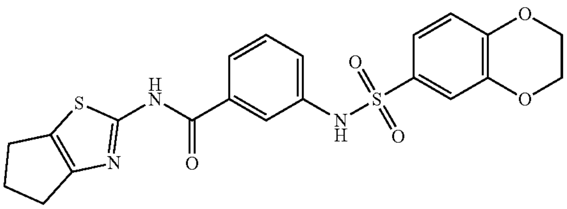 [SMILES: O=C(Nc1nc2c(s1)CCC2)c1cccc(NS(=O)(=O)c2ccc3c(c2)OCCO3)c1] | N-(5,6-dihydro-4H-cyclopenta[d]thiazol-2-yl)-3-((2,3-dihydrobenzo[b][1,4]dioxine)-6-sulfonamido)benzamide |

TABLE 1-continued

| ID | Structure | Name |
|---|---|---|
| I-638 | 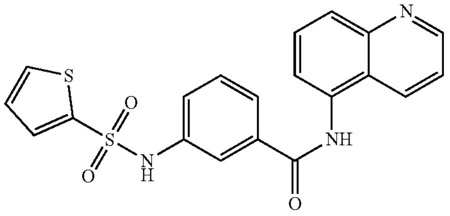 [SMILES: O=C(Nc1cccc2ncccc12)c1cccc(NS(=O)(=O)c2cccs2)c1] | N-(quinolin-5-yl)-3-(thiophene-2-sulfonamido)benzamide |
| I-639 | 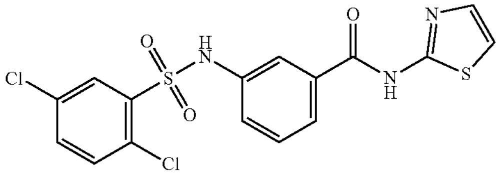 [SMILES: O=C(Nc1nccs1)c1cccc(NS(=O)(=O)c2cc(Cl)ccc2Cl)c1] | 3-((2,5-dichlorophenyl)sulfonamido)-N-(thiazol-2-yl)benzamide |
| I-640 | 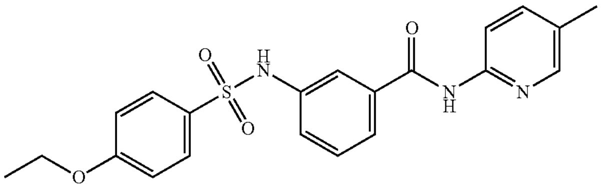 [SMILES: CCOc1ccc(S(=O)(=O)Nc2cccc(C(=O)Nc3ccc(C)cn3)c2)cc1] | 3-((4-ethoxyphenyl)sulfonamido)-N-(5-methylpyridin-2-yl)benzamide |
| I-641 | 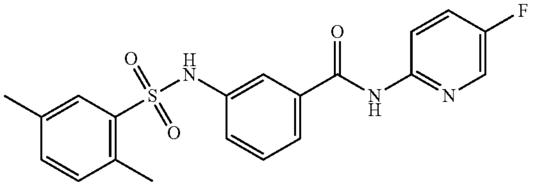 [SMILES: Cc1ccc(C)c(S(=O)(=O)Nc2cccc(C(=O)Nc3ccc(F)cn3)c2)c1] | 3-((2,5-dimethylphenyl)sulfonamido)-N-(5-fluoropyridin-2-yl)benzamide |
| I-642 | 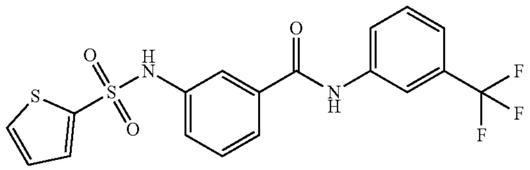 [SMILES: O=C(Nc1cccc(C(F)(F)F)c1)c1cccc(NS(=O)(=O)c2cccs2)c1] | 3-(thiophene-2-sulfonamido)-N-(3-(trifluoromethyl)phenyl)benzamide |
| I-643 | 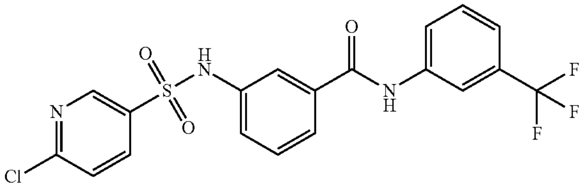 [SMILES: O=C(Nc1cccc(C(F)(F)F)c1)c1cccc(NS(=O)(=O)c2ccc(Cl)nc2)c1] | 3-((6-chloropyridine)-3-sulfonamido)-N-(3-(trifluoromethyl)phenyl)benzamide |
| I-644 | 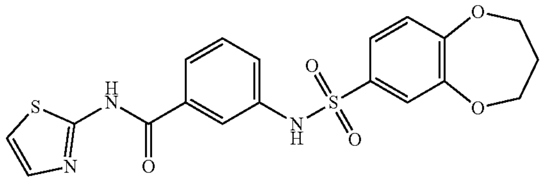 [SMILES: O=C(Nc1nccs1)c1cccc(NS(=O)(=O)c2ccc3c(c2)OCCCO3)c1] | 3-((3,4-dihydro-2H-benzo[b][1,4]dioxepine)-7-sulfonamido)-N-(thiazol-2-yl)benzamide |
| I-645 | 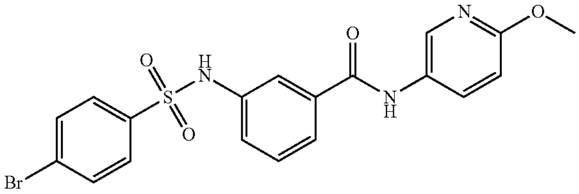 [SMILES: COc1ccc(NC(=O)c2cccc(NS(=O)(=O)c3ccc(Br)cc3)c2)cn1] | 3-((4-bromophenyl)sulfonamido)-N-(6-methoxypyridin-3-yl)benzamide |

TABLE 1-continued

| ID | Structure | Name |
|---|---|---|
| I-646 | 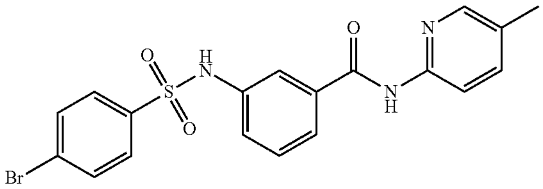 [SMILES: Cc1ccc(NC(=O)c2cccc(NS(=O)(=O)c3ccc(Br)cc3)c2)nc1] | 3-((4-bromophenyl)sulfonamido)-N-(5-methylpyridin-2-yl)benzamide |
| I-647 | 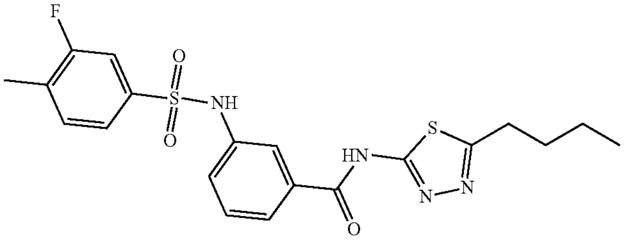 [SMILES: CCCCc1nnc(NC(=O)c2cccc(NS(=O)(=O)c3ccc(C)c(F)c3)c2)s1] | N-(5-butyl-1,3,4-thiadiazol-2-yl)-3-((3-fluoro-4-methylphenyl)sulfonamido)benzamide |
| I-648 | 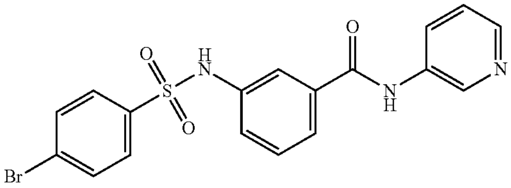 [SMILES: O=C(Nc1cccnc1)c1cccc(NS(=O)(=O)c2ccc(Br)cc2)c1] | 3-((4-bromophenyl)sulfonamido)-N-(pyridin-3-yl)benzamide |
| I-649 | 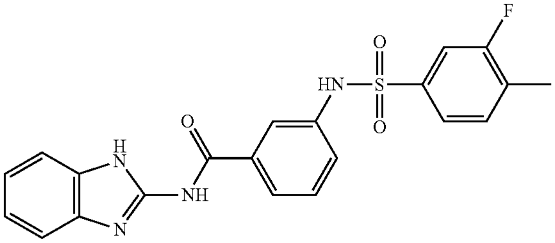 [SMILES: Cc1ccc(S(=O)(=O)Nc2cccc(C(=O)Nc3nc4ccccc4[nH]3)c2)cc1F] | N-(1H-benzo[d]imidazol-2-yl)-3-((3-fluoro-4-methylphenyl)sulfonamido)benzamide |
| I-650 | 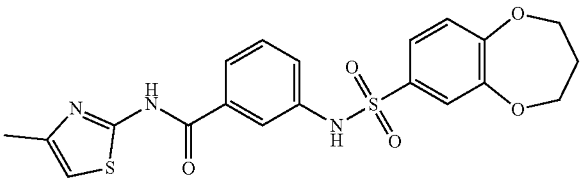 [SMILES: Cc1csc(NC(=O)c2cccc(NS(=O)(=O)c3ccc4c(c3)OCCCO4)c2)n1] | 3-((3,4-dihydro-2H-benzo[b][1,4]dioxepine)-7-sulfonamido)-N-(4-methylthiazol-2-yl)benzamide |
| I-651 | 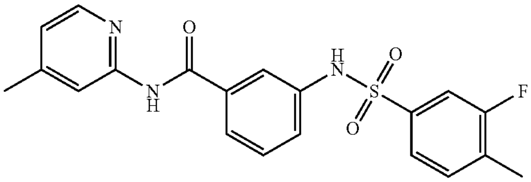 | 3-((3-fluoro-4-methylphenyl)sulfonamido)-N-(4-methylpyridin-2-yl)benzamide |
| I-652 | 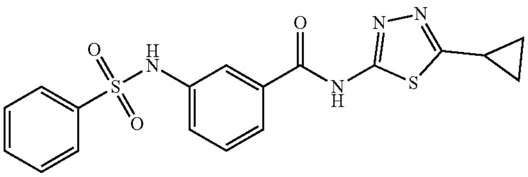 [SMILES: O=C(Nc1nnc(C2CC2)s1)c1cccc(NS(=O)(=O)c2ccccc2)c1] | N-(5-cyclopropyl-1,3,4-thiadiazol-2-yl)-3-(phenylsulfonamido)benzamide |

TABLE 1-continued

| ID | Structure | Name |
|---|---|---|
| I-653 | 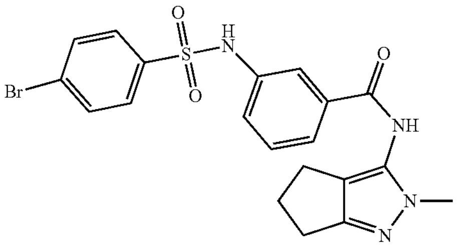 [SMILES: Cn1nc2c(c1NC(=O)c1cccc(NS(=O)(=O)c3ccc(Br)cc3)c1)CCC2] | 3-((4-bromophenyl)sulfonamido)-N-(2-methyl-2,4,5,6-tetrahydrocyclopenta[c]pyrazol-3-yl)benzamide |
| I-654 | 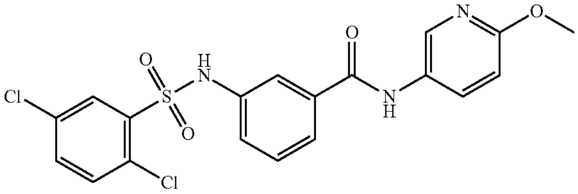 [SMILES: COc1ccc(NC(=O)c2cccc(NS(=O)(=O)c3cc(Cl)ccc3Cl)c2)cn1] | 3-((2,5-dichlorophenyl)sulfonamido)-N-(6-methoxypyridin-3-yl)benzamide |
| I-655 | 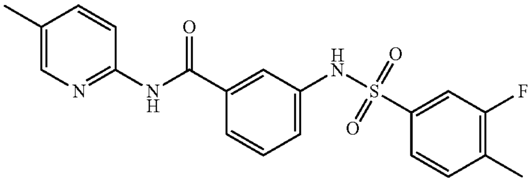 | 3-((3-fluoro-4-methylphenyl)sulfonamido)-N-(5-methylpyridin-2-yl)benzamide |
| I-656 | 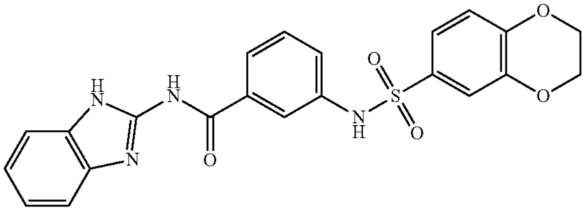 [SMILES: O=C(Nc1nc2ccccc2[nH]1)c1cccc(NS(=O)(=O)c2ccc3c(c2)OCCO3)c1] | N-(1H-benzo[d]imidazol-2-yl)-3-((2,3-dihydrobenzo[b][1,4]dioxine)-6-sulfonamido)benzamide |
| I-657 | 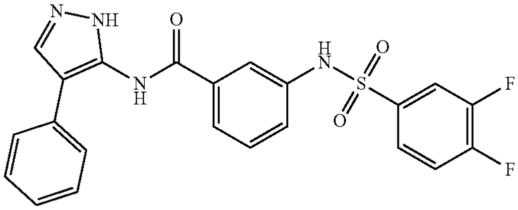 [SMILES: O=C(Nc1[nH]ncc1-c1ccccc1)c1cccc(NS(=O)(=O)c2ccc(F)c(F)c2)c1] | 3-((3,4-difluorophenyl)sulfonamido)-N-(4-phenyl-1H-pyrazol-5-yl)benzamide |
| I-658 | 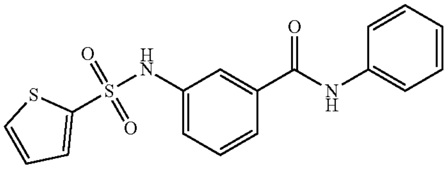 [SMILES: O=C(Nc1ccccc1)c1cccc(NS(=O)(=O)c2cccs2)c1] | N-phenyl-3-(thiophene-2-sulfonamido)benzamide |
| I-659 | 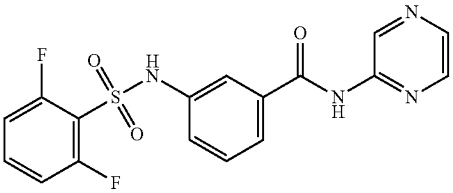 [SMILES: O=C(Nc1cnccn1)c1cccc(NS(=O)(=O)c2c(F)cccc2F)c1] | 3-((2,6-difluorophenyl)sulfonamido)-N-(pyrazin-2-yl)benzamide |

TABLE 1-continued

| ID | Structure | Name |
|---|---|---|
| I-660 | 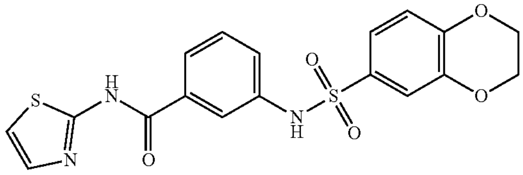 [SMILES: O=C(Nc1nccs1)c1cccc(NS(=O)(=O)c2ccc3c(c2)OCCO3)c1] | 3-((2,3-dihydrobenzo[b][1,4]dioxine)-6-sulfonamido)-N-(thiazol-2-yl)benzamide |
| I-661 | 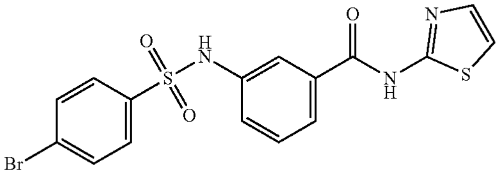 [SMILES: O=C(Nc1nccs1)c1cccc(NS(=O)(=O)c2ccc(Br)cc2)c1] | 3-((4-bromophenyl)sulfonamido)-N-(thiazol-2-yl)benzamide |
| I-662 | 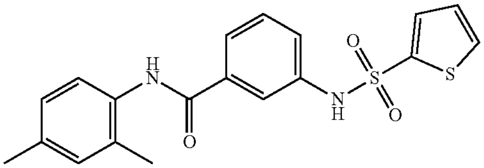 [SMILES: Cc1ccc(NC(=O)c2cccc(NS(=O)(=O)c3cccs3)c2)c(C)c1] | N-(2,4-dimethylphenyl)-3-(thiophene-2-sulfonamido)benzamide |
| I-663 | 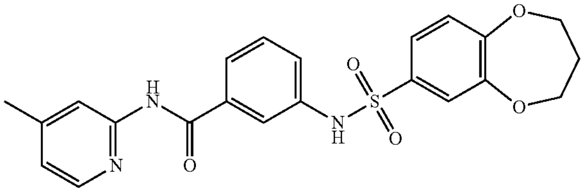 [SMILES: Cc1ccnc(NC(=O)c2cccc(NS(=O)(=O)c3ccc4c(c3)OCCCO4)c2)c1] | 3-((3,4-dihydro-2H-benzo[b][1,4]dioxepine)-7-sulfonamido)-N-(4-methylpyridin-2-yl)benzamide |
| I-664 | 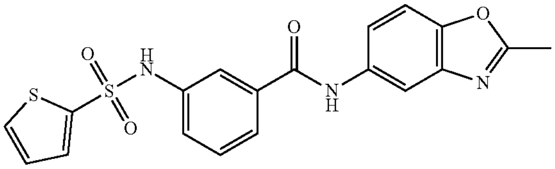 [SMILES: Cc1nc2cc(NC(=O)c3cccc(NS(=O)(=O)c4cccs4)c3)ccc2o1] | N-(2-methylbenzo[d]oxazol-5-yl)-3-(thiophene-2-sulfonamido)benzamide |
| I-665 | 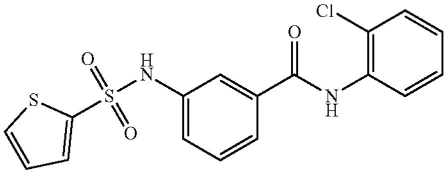 [SMILES: O=C(Nc1ccccc1Cl)c1cccc(NS(=O)(=O)c2cccs2)c1] | N-(2-chlorophenyl)-3-(thiophene-2-sulfonamido)benzamide |
| I-666 | 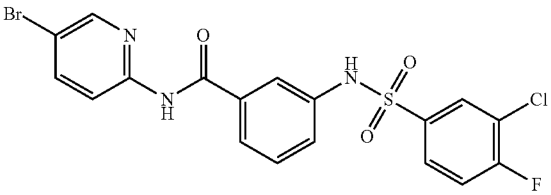 [SMILES: O=C(Nc1ccc(Br)cn1)c1cccc(NS(=O)(=O)c2ccc(F)c(Cl)c2)c1] | N-(5-bromopyridin-2-yl)-3-((3-chloro-4-fluorophenyl)sulfonamido)benzamide |
| I-667 | 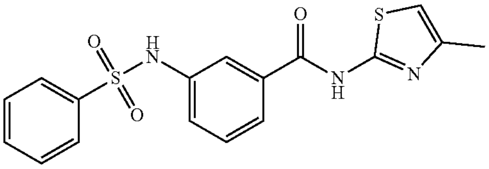 [SMILES: Cc1csc(NC(=O)c2cccc(NS(=O)(=O)c3ccccc3)c2)n1] | N-(4-methylthiazol-2-yl)-3-(phenylsulfonamido)benzamide |

TABLE 1-continued

| ID | Structure | Name |
|---|---|---|
| I-668 | 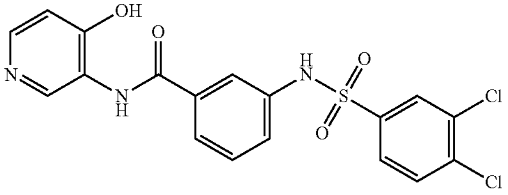 [SMILES: O=C(Nc1cnccc1O)c1cccc(NS(=O)(=O)c2ccc(Cl)c(Cl)c2)c1] | 3-((3,4-dichlorophenyl)sulfonamido)-N-(4-hydroxypyridin-3-yl)benzamide |
| I-669 | 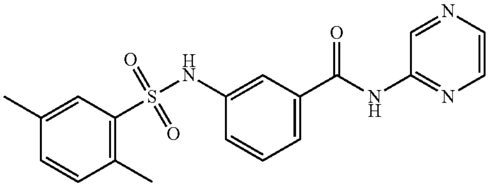 [SMILES: Cc1ccc(C)c(S(=O)(=O)Nc2cccc(C(=O)Nc3cnccn3)c2)c1] | 3-((2,5-dimethylphenyl)sulfonamido)-N-(pyrazin-2-yl)benzamide |
| I-670 | 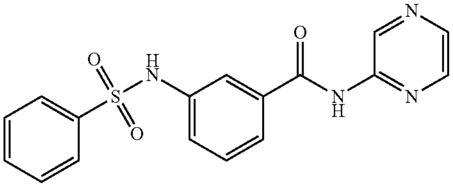 [SMILES: O=C(Nc1cnccn1)c1cccc(NS(=O)(=O)c2ccccc2)c1] | 3-(phenylsulfonamido)-N-(pyrazin-2-yl)benzamide |
| I-671 | 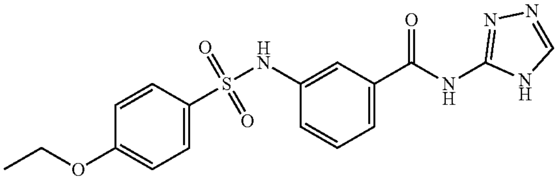 [SMILES: CCOc1ccc(S(=O)(=O)Nc2cccc(C(=O)Nc3nnc[nH]3)c2)cc1] | 3-((4-ethoxyphenyl)sulfonamido)-N-(4H-1,2,4-triazol-3-yl)benzamide |
| I-672 | 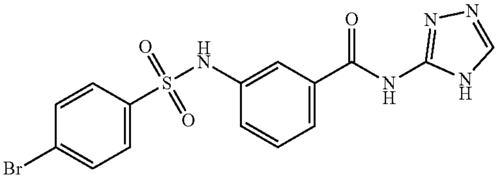 [SMILES: O=C(Nc1nnc[nH]1)c1cccc(NS(=O)(=O)c2ccc(Br)cc2)c1] | 3-((4-bromophenyl)sulfonamido)-N-(4H-1,2,4-triazol-3-yl)benzamide |
| I-673 | 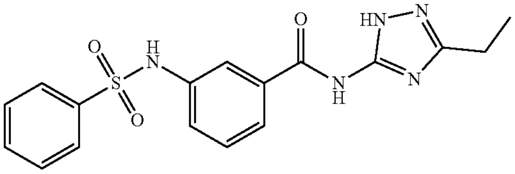 [SMILES: CCc1n[nH]c(NC(=O)c2cccc(NS(=O)(=O)c3ccccc3)c2)n1] | N-(3-ethyl-1H-1,2,4-triazol-5-yl)-3-(phenylsulfonamido)benzamide |
| I-674 | 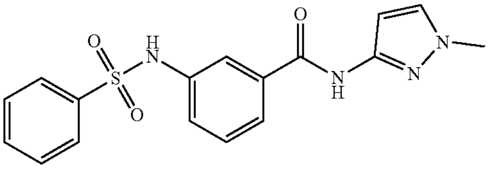 [SMILES: Cn1ccc(NC(=O)c2cccc(NS(=O)(=O)c3ccccc3)c2)n1] | N-(1-methyl-1H-pyrazol-3-yl)-3-(phenylsulfonamido)benzamide |
| I-675 | 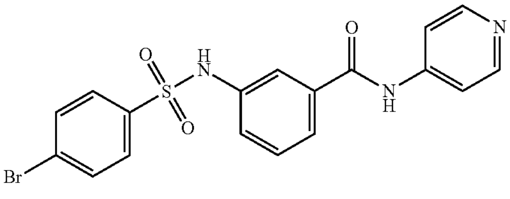 [SMILES: O=C(Nc1ccncc1)c1cccc(NS(=O)(=O)c2ccc(Br)cc2)c1] | 3-((4-bromophenyl)sulfonamido)-N-(pyridin-4-yl)benzamide |

TABLE 1-continued

| ID | Structure | Name |
| --- | --- | --- |
| I-676 | 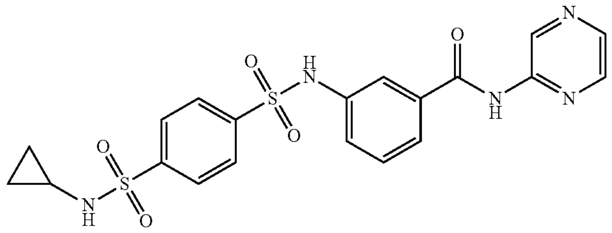 [SMILES: O=C(Nc1cnccn1)c1cccc(NS(=O)(=O)c2ccc(S(=O)(=O)NC3CC3)cc2)c1] | 3-((4-(N-cyclopropylsulfamoyl)phenyl)sulfonamido)-N-(pyrazin-2-yl)benzamide |
| I-677 | 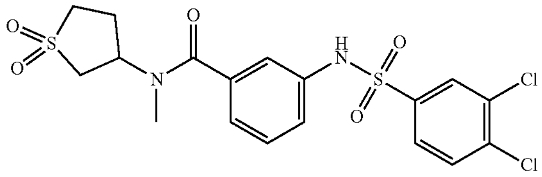 [SMILES: CN(C(=O)c1cccc(NS(=O)(=O)c2ccc(Cl)c(Cl)c2)c1)C1CCS(=O)(=O)C1] | 3-((3,4-dichlorophenyl)sulfonamido)-N-(1,1-dioxidotetrahydrothiophen-3-yl)-N-methylbenzamide |
| I-678 | 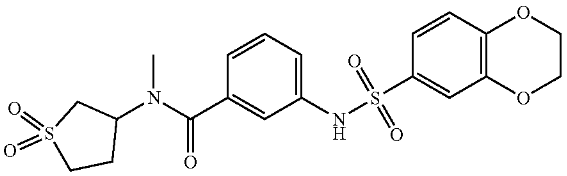 [SMILES: CN(C(=O)c1cccc(NS(=O)(=O)c2ccc3c(c2)OCCO3)c1)C1CCS(=O)(=O)C1] | 3-((2,3-dihydrobenzo[b][1,4]dioxine)-6-sulfonamido)-N-(1,1-dioxidotetrahydrothiophen-3-yl)-N-methylbenzamide |
| I-679 | 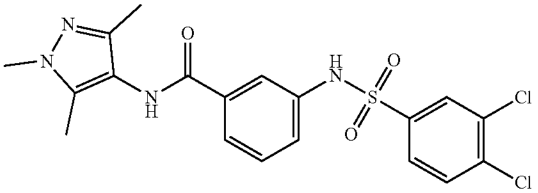 [SMILES: Cc1nn(C)c(C)c1NC(=O)c1cccc(NS(=O)(=O)c2ccc(Cl)c(Cl)c2)c1] | 3-((3,4-dichlorophenyl)sulfonamido)-N-(1,3,5-trimethyl-1H-pyrazol-4-yl)benzamide |
| I-680 | 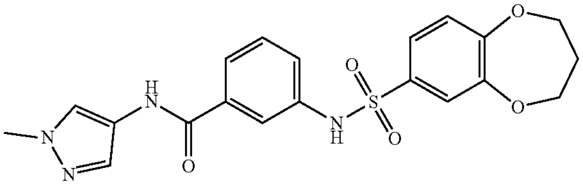 | 3-((3,4-dihydro-2H-benzo[b][1,4]dioxepine)-7-sulfonamido)-N-(1-methyl-1H-pyrazol-4-yl)benzamide |
| I-681 | 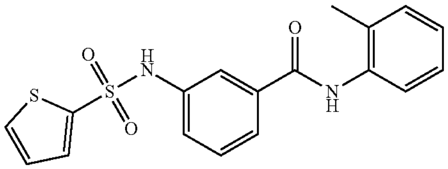 [SMILES: Cc1ccccc1NC(=O)c1cccc(NS(=O)(=O)c2cccs2)c1] | 3-(thiophene-2-sulfonamido)-N-(o-tolyl)benzamide |
| I-682 | 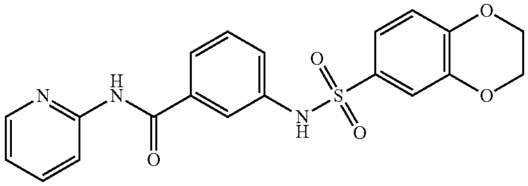 [SMILES: O=C(Nc1ccccn1)c1cccc(NS(=O)(=O)c2ccc3c(c2)OCCO3)c1] | 3-((2,3-dihydrobenzo[b][1,4]dioxine)-6-sulfonamido)-N-(pyridin-2-yl)benzamide |
| I-683 | 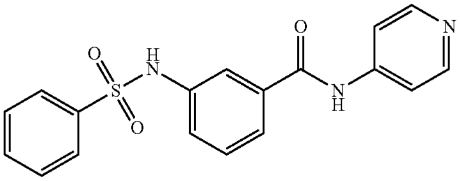 [SMILES: O=C(Nc1ccncc1)c1cccc(NS(=O)(=O)c2ccccc2)c1] | 3-(phenylsulfonamido)-N-(pyridin-4-yl)benzamide |

TABLE 1-continued

| ID | Structure | Name |
|---|---|---|
| I-684 | 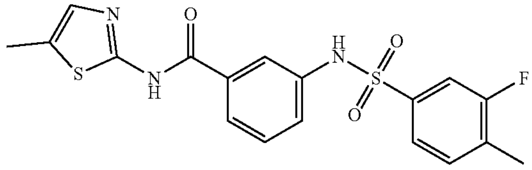 | 3-((3-fluoro-4-methylphenyl)sulfonamido)-N-(5-methylthiazol-2-yl)benzamide |
| I-685 | 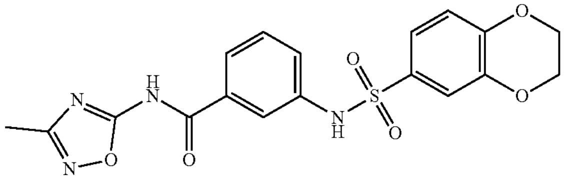 [SMILES: Cc1noc(NC(=O)c2cccc(NS(=O)(=O)c3ccc4c(c3)OCCO4)c2)n1] | 3-((2,3-dihydrobenzo[b][1,4]dioxine)-6-sulfonamido)-N-(3-methyl-1,2,4-oxadiazol-5-yl)benzamide |
| I-686 | 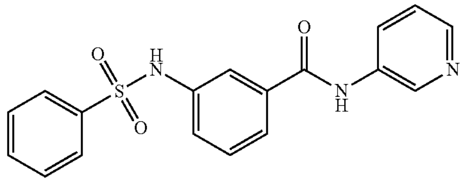 [SMILES: O=C(Nc1cccnc1)c1cccc(NS(=O)(=O)c2ccccc2)c1] | 3-(phenylsulfonamido)-N-(pyridin-3-yl)benzamide |
| I-687 | 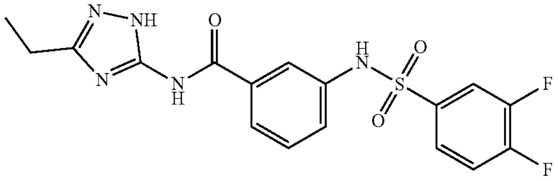 [SMILES: CCc1n[nH]c(NC(=O)c2cccc(NS(=O)(=O)c3ccc(F)c(F)c3)c2)n1] | 3-((3,4-difluorophenyl)sulfonamido)-N-(3-ethyl-1H-1,2,4-triazol-5-yl)benzamide |
| I-688 | 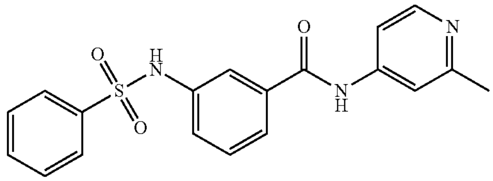 [SMILES: Cc1cc(NC(=O)c2cccc(NS(=O)(=O)c3ccccc3)c2)ccn1] | N-(2-methylpyridin-4-yl)-3-(phenylsulfonamido)benzamide |
| I-689 | 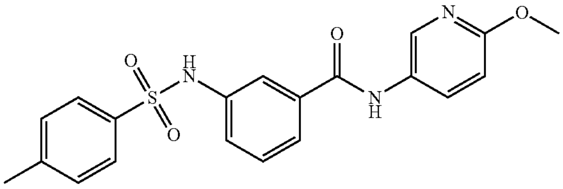 | N-(6-methoxypyridin-3-yl)-3-((4-methylphenyl)sulfonamido)benzamide |
| I-690 | 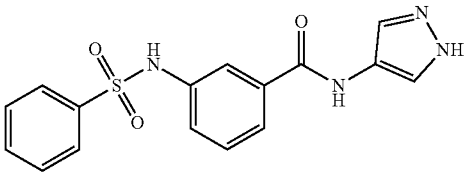 | 3-(phenylsulfonamido)-N-(1H-pyrazol-4-yl)benzamide |
| I-691 | 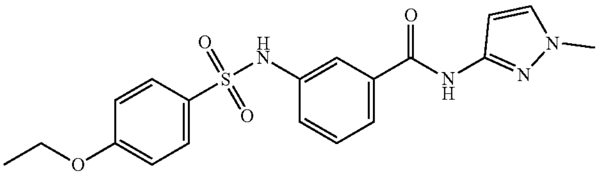 [SMILES: CCOc1ccc(S(=O)(=O)Nc2cccc(C(=O)Nc3ccn(C)n3)c2)cc1] | 3-((4-ethoxyphenyl)sulfonamido)-N-(1-methyl-1H-pyrazol-3-yl)benzamide |

TABLE 1-continued

| ID | Structure | Name |
|---|---|---|
| I-692 | 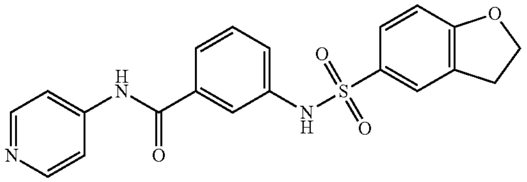 [SMILES: O=C(Nc1ccncc1)c1cccc(NS(=O)(=O)c2ccc3c(c2)CCO3)c1] | 3-((2,3-dihydrobenzofuran)-5-sulfonamido)-N-(pyridin-4-yl)benzamide |
| I-693 | 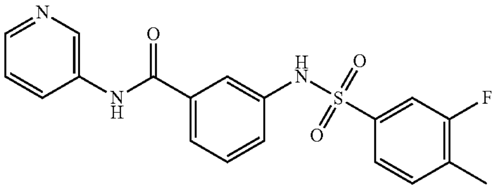 [SMILES: Cc1ccc(S(=O)(=O)Nc2cccc(C(=O)Nc3cccnc3)c2)cc1F] | 3-((3-fluoro-4-methylphenyl)sulfonamido)-N-(pyridin-3-yl)benzamide |
| I-694 | 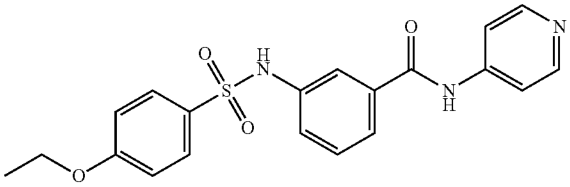 [SMILES: CCOc1ccc(S(=O)(=O)Nc2cccc(C(=O)Nc3ccncc3)c2)cc1] | 3-((4-ethoxyphenyl)sulfonamido)-N-(pyridin-4-yl)benzamide |
| I-695 | 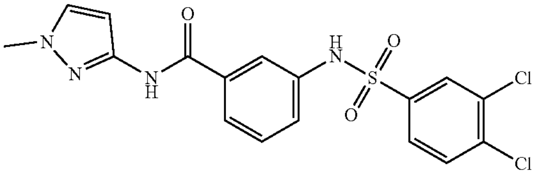 [SMILES: Cn1ccc(NC(=O)c2cccc(NS(=O)(=O)c3ccc(Cl)c(Cl)c3)c2)n1] | 3-((3,4-dichlorophenyl)sulfonamido)-N-(1-methyl-1H-pyrazol-3-yl)benzamide |
| I-696 | 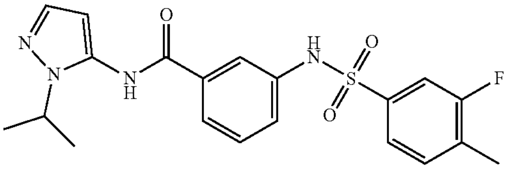 [SMILES: Cc1ccc(S(=O)(=O)Nc2cccc(C(=O)Nc3ccnn3C(C)C)c2)cc1F] | 3-((3-fluoro-4-methylphenyl)sulfonamido)-N-(1-isopropyl-1H-pyrazol-5-yl)benzamide |
| I-697 | 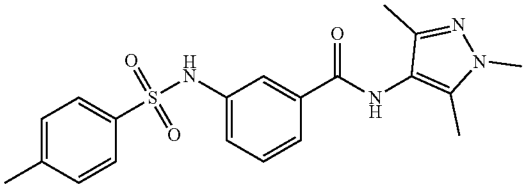 | 3-((4-methylphenyl)sulfonamido)-N-(1,3,5-trimethyl-1H-pyrazol-4-yl)benzamide |
| I-698 | 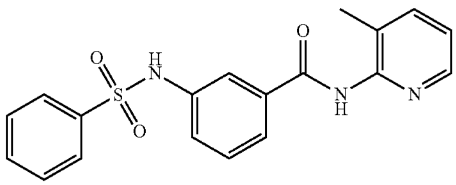 [SMILES: Cc1cccnc1NC(=O)c1cccc(NS(=O)(=O)c2ccccc2)c1] | N-(3-methylpyridin-2-yl)-3-(phenylsulfonamido)benzamide |
| I-699 | 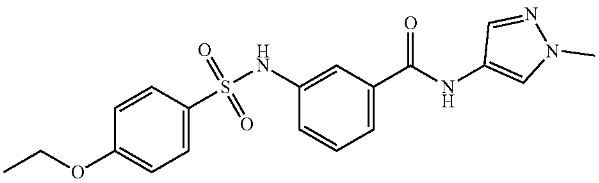 [SMILES: CCOc1ccc(S(=O)(=O)Nc2cccc(C(=O)Nc3cnn(C)c3)c2)cc1] | 3-((4-ethoxyphenyl)sulfonamido)-N-(1-methyl-1H-pyrazol-4-yl)benzamide |

TABLE 1-continued

| ID | Structure | Name |
| --- | --- | --- |
| I-700 | 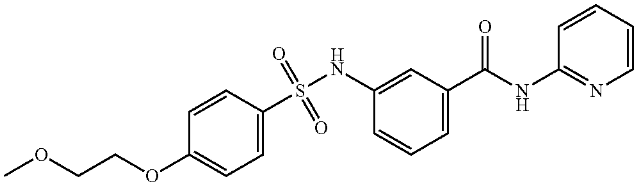 [SMILES: COCCOc1ccc(S(=O)(=O)Nc2cccc(C(=O)Nc3ccccn3)c2)cc1] | 3-((4-(2-methoxyethoxy)phenyl)sulfonamido)-N-(pyridin-2-yl)benzamide |
| I-701 | 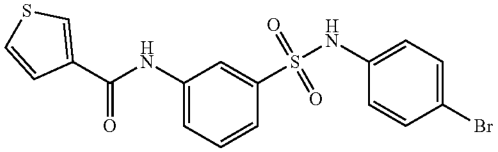 [SMILES: O=C(Nc1cccc(S(=O)(=O)Nc2ccc(Br)cc2)c1)c1ccsc1] | N-(3-(N-(4-bromophenyl)sulfamoyl)phenyl)thiophene-3-carboxamide |
| I-702 | 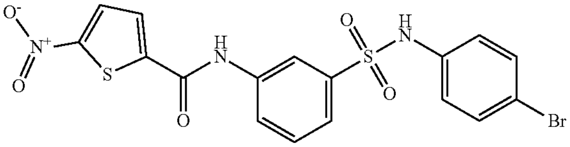 [SMILES: O=C(Nc1cccc(S(=O)(=O)Nc2ccc(Br)cc2)c1)c1ccc([N+](=O)[O-])s1] | N-(3-(N-(4-bromophenyl)sulfamoyl)phenyl)-5-nitrothiophene-2-carboxamide |
| I-703 | 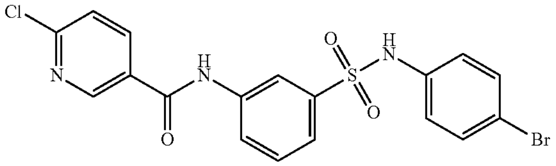 [SMILES: O=C(Nc1cccc(S(=O)(=O)Nc2ccc(Br)cc2)c1)c1ccc(Cl)nc1] | N-(3-(N-(4-bromophenyl)sulfamoyl)phenyl)-6-chloronicotinamide |
| I-704 | 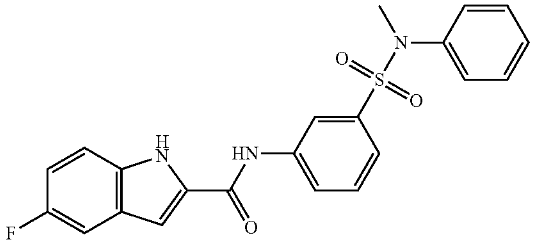 [SMILES: CN(c1ccccc1)S(=O)(=O)c1cccc(NC(=O)c2cc3cc(F)ccc3[nH]2)c1] | 5-fluoro-N-(3-(N-methyl-N-phenylsulfamoyl)phenyl)-1H-indole-2-carboxamide |
| I-705 | 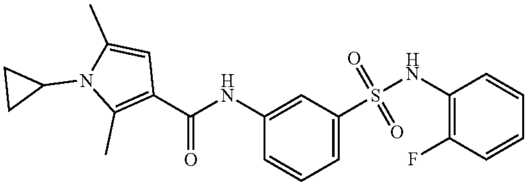 [SMILES: Cc1cc(C(=O)Nc2cccc(S(=O)(=O)Nc3ccccc3F)c2)c(C)n1C1CC1] | 1-cyclopropyl-N-(3-(N-(2-fluorophenyl)sulfamoyl)phenyl)-2,5-dimethyl-1H-pyrrole-3-carboxamide |
| I-706 | 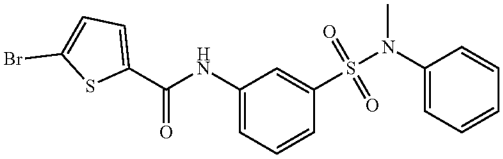 | 5-bromo-N-(3-(N-methyl-N-phenylsulfamoyl)phenyl)thiophene-2-carboxamide |

TABLE 1-continued

| ID | Structure | Name |
| --- | --- | --- |
| I-707 | 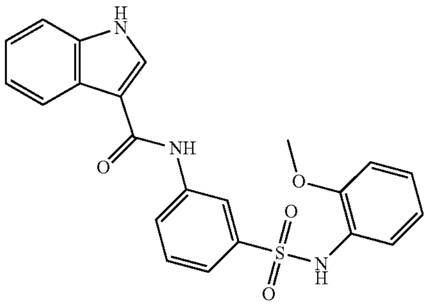 [SMILES: COc1ccccc1NS(=O)(=O)c1cccc(NC(=O)c2c[nH]c3ccccc23)c1] | N-(3-(N-(2-methoxyphenyl)sulfamoyl)phenyl)-1H-indole-3-carboxamide |
| I-708 | 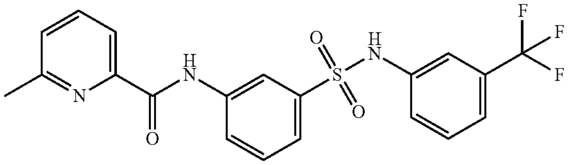 [SMILES: Cc1cccc(C(=O)Nc2cccc(S(=O)(=O)Nc3cccc(C(F)(F)F)c3)c2)n1] | 6-methyl-N-(3-(N-(3-(trifluoromethyl)phenyl)sulfamoyl)phenyl) picolinamide |
| I-709 | 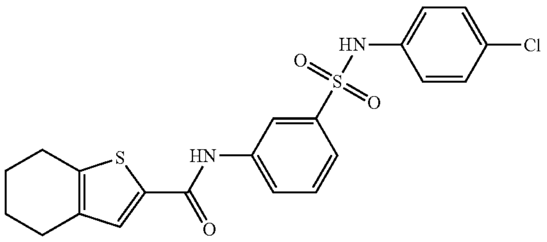 [SMILES: O=C(Nc1cccc(S(=O)(=O)Nc2ccc(Cl)cc2)c1)c1cc2c(s1)CCCC2] | N-(3-(N-(4-chlorophenyl)sulfamoyl)phenyl)-4,5,6,7-tetrahydrobenzo[b]thiophene-2-carboxamide |
| I-710 | 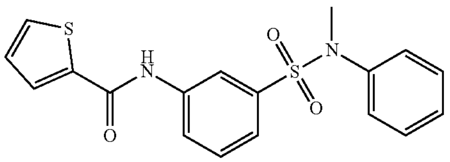 [SMILES: CN(c1ccccc1)S(=O)(=O)c1cccc(NC(=O)c2cccs2)c1] | N-(3-(N-methyl-N-phenylsulfamoyl)phenyl)thiophene-2-carboxamide |
| I-711 | 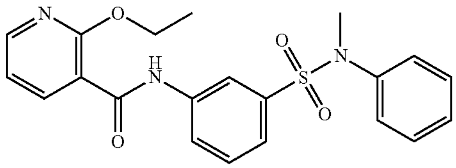 [SMILES: CCOc1ncccc1C(=O)Nc1cccc(S(=O)(=O)N(C)c2ccccc2)c1] | 2-ethoxy-N-(3-(N-methyl-N-phenylsulfamoyl)phenyl)nicotinamide |
| I-712 | 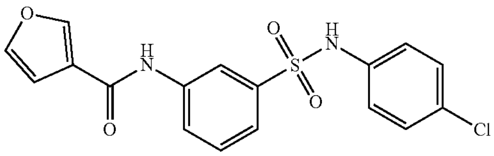 [SMILES: O=C(Nc1cccc(S(=O)(=O)Nc2ccc(Cl)cc2)c1)c1ccoc1] | N-(3-(N-(4-chlorophenyl)sulfamoyl)phenyl)furan-3-carboxamide |
| I-713 | 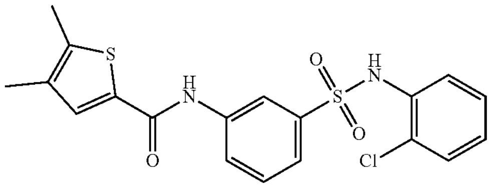 [SMILES: Cc1cc(C(=O)Nc2cccc(S(=O)(=O)Nc3ccccc3Cl)c2)sc1C] | N-(3-(N-(2-chlorophenyl)sulfamoyl)phenyl)-4,5-dimethylthiophene-2-carboxamide |

TABLE 1-continued

| ID | Structure | Name |
| --- | --- | --- |
| I-714 | 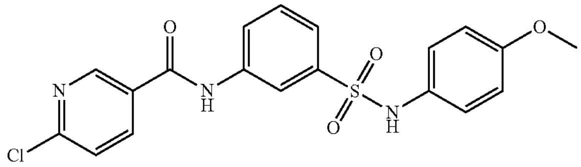 [SMILES: COc1ccc(NS(=O)(=O)c2cccc(NC(=O)c3ccc(Cl)nc3)c2)cc1] | 6-chloro-N-(3-(N-(4-methoxyphenyl)sulfamoyl)phenyl) nicotinamide |
| I-715 | 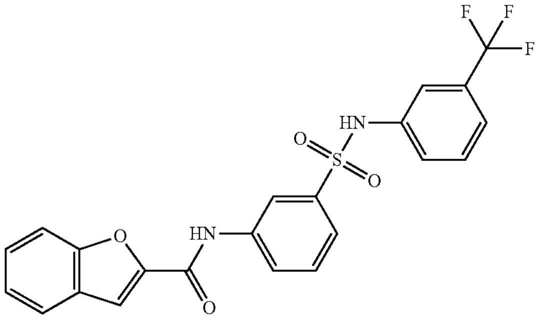 [SMILES: O=C(Nc1cccc(S(=O)(=O)Nc2cccc(C(F)(F)F)c2)c1)c1cc2ccccc2o1] | N-(3-(N-(3-(trifluoromethyl)phenyl)sulfamoyl)phenyl) benzofuran-2-carboxamide |
| I-716 | 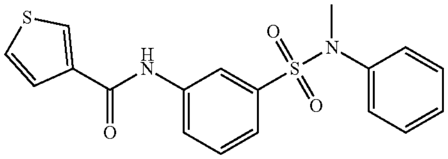 [SMILES: CN(c1ccccc1)S(=O)(=O)c1cccc(NC(=O)c2ccsc2)c1] | N-(3-(N-methyl-N-phenylsulfamoyl)phenyl)thiophene-3-carboxamide |
| I-717 | 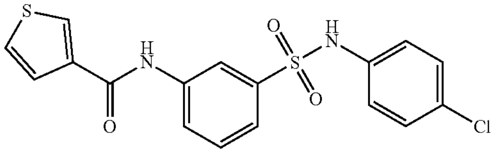 [SMILES: O=C(Nc1cccc(S(=O)(=O)Nc2ccc(Cl)cc2)c1)c1ccsc1] | N-(3-(N-(4-chlorophenyl)sulfamoyl)phenyl)thiophene-3-carboxamide |
| I-718 | 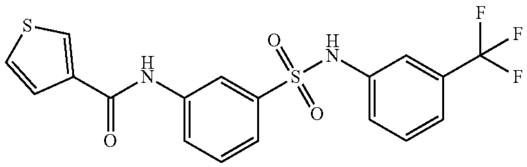 | N-(3-(N-(3-(trifluoromethyl)phenyl)sulfamoyl)phenyl) thiophene-3-carboxamide |
| I-720 | 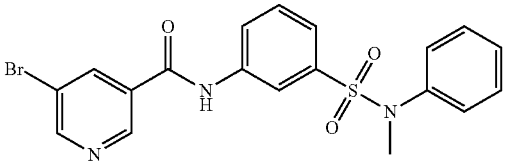 [SMILES: CN(c1ccccc1)S(=O)(=O)c1cccc(NC(=O)c2cncc(Br)c2)c1] | 5-bromo-N-(3-(N-methyl-N-phenylsulfamoyl)phenyl)nicotinamide |
| I-721 | 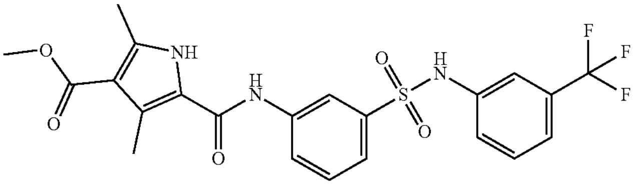 [SMILES: COC(=O)c1c(C)[nH]c(C(=O)Nc2cccc(S(=O)(=O)Nc3cccc(C(F)(F)F)c3)c2)c1C] | methyl 2,4-dimethyl-5-((3-(N-(3-(trifluoromethyl)phenyl)sulfamoyl)phenyl) carbamoyl)-1H-pyrrole-3-carboxylate |
| I-722 | 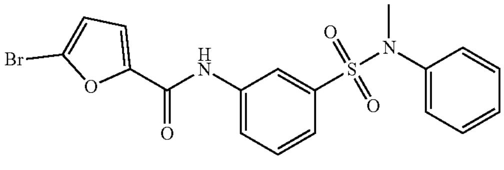 [SMILES: CN(c1ccccc1)S(=O)(=O)c1cccc(NC(=O)c2ccc(Br)o2)c1] | 5-bromo-N-(3-(N-methyl-N-phenylsulfamoyl)phenyl)furan-2-carboxamide |

TABLE 1-continued

| ID | Structure | Name |
|---|---|---|
| I-723 | 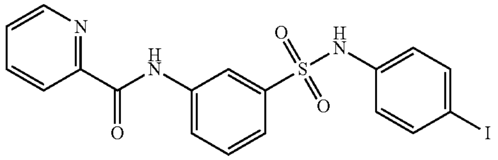 [SMILES: O=C(Nc1cccc(S(=O)(=O)Nc2ccc(I)cc2)c1)c1ccccn1] | N-(3-(N-(4-iodophenyl)sulfamoyl)phenyl)picolinamide |
| I-724 | 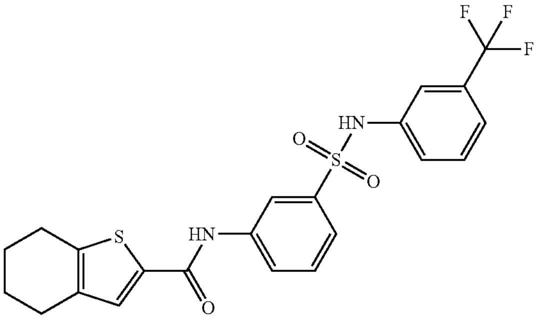 [SMILES: O=C(Nc1cccc(S(=O)(=O)Nc2cccc(C(F)(F)F)c2)c1)c1cc2c(s1)CCCC2] | N-(3-(N-(3-(trifluoromethyl)phenyl)sulfamoyl)phenyl)-4,5,6,7-tetrahydrobenzo[b]thiophene-2-carboxamide |
| I-725 | 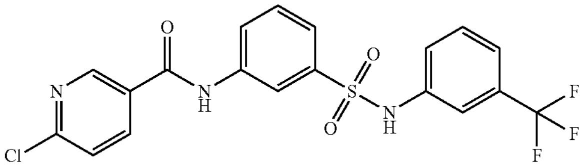 [SMILES: O=C(Nc1cccc(S(=O)(=O)Nc2cccc(C(F)(F)F)c2)c1)c1ccc(Cl)nc1] | 6-chloro-N-(3-(N-(3-(trifluoromethyl)phenyl)sulfamoyl)phenyl) nicotinamide |
| I-726 | 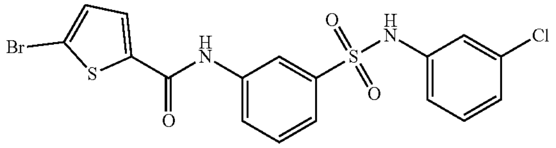 [SMILES: O=C(Nc1cccc(S(=O)(=O)Nc2cccc(Cl)c2)c1)c1ccc(Br)s1] | 5-bromo-N-(3-(N-(3-chlorophenyl)sulfamoyl)phenyl)thiophene-2-carboxamide |
| I-727 | 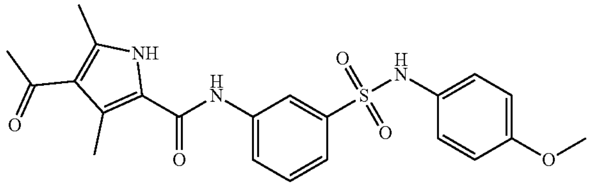 [SMILES: COc1ccc(NS(=O)(=O)c2cccc(NC(=O)c3[nH]c(C)c(C(C)=O)c3C)c2)cc1] | 4-acetyl-N-(3-(N-(4-methoxyphenyl)sulfamoyl)phenyl)-3,5-dimethyl-1H-pyrrole-2-carboxamide |
| I-728 | 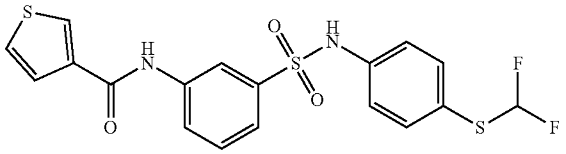 [SMILES: O=C(Nc1cccc(S(=O)(=O)Nc2ccc(SC(F)F)cc2)c1)c1ccsc1] | N-(3-(N-(4-((difluoromethyl)thio)phenyl)sulfamoyl)phenyl) thiophene-3-carboxamide |
| I-729 | 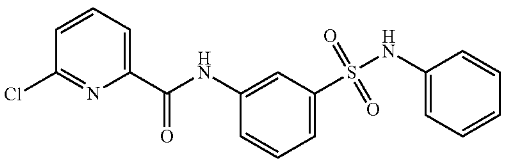 [SMILES: O=C(Nc1cccc(S(=O)(=O)Nc2ccccc2)c1)c1cccc(Cl)n1] | 6-chloro-N-(3-(N-phenylsulfamoyl)phenyl)picolinamide |
| I-730 | 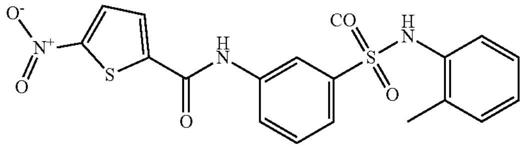 | N-(3-(N-(2-chlorophenyl)sulfamoyl)phenyl)-5-nitrothiophene-2-carboxamide |

TABLE 1-continued

| ID | Structure | Name |
|---|---|---|
| I-731 | 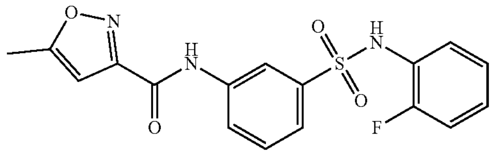 [SMILES: Cc1cc(C(=O)Nc2cccc(S(=O)(=O)Nc3ccccc3F)c2)no1] | N-(3-(N-(2-fluorophenyl)sulfamoyl)phenyl)-5-methylisoxazole-3-carboxamide |
| I-732 | 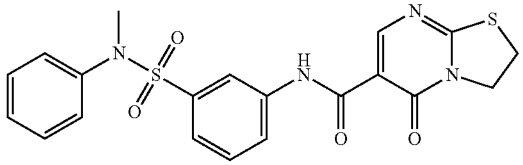 [SMILES: CN(c1ccccc1)S(=O)(=O)c1cccc(NC(=O)c2cnc3n(c2=O)CCS3)c1] | N-(3-(N-methyl-N-phenylsulfamoyl)phenyl)-5-oxo-2,3-dihydro-5H-thiazolo[3,2-a]pyrimidine-6-carboxamide |
| I-733 | 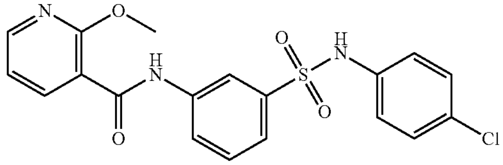 [SMILES: COc1ncccc1C(=O)Nc1cccc(S(=O)(=O)Nc2ccc(Cl)cc2)c1] | N-(3-(N-(4-chlorophenyl)sulfamoyl)phenyl)-2-methoxynicotinamide |
| I-734 | 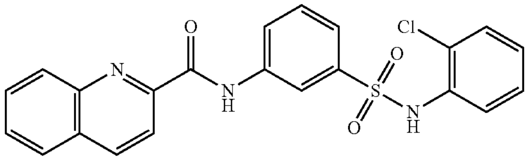 [SMILES: O=C(Nc1cccc(S(=O)(=O)Nc2ccccc2Cl)c1)c1ccc2ccccc2n1] | N-(3-(N-(2-chlorophenyl)sulfamoyl)phenyl)quinoline-2-carboxamide |
| I-735 | 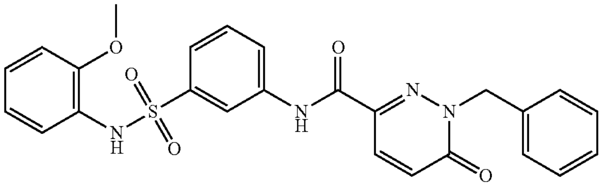 [SMILES: COc1ccccc1NS(=O)(=O)c1cccc(NC(=O)c2ccc(=O)n(Cc3ccccc3)n2)c1] | 1-benzyl-N-(3-(N-(2-methoxyphenyl)sulfamoyl)phenyl)-6-oxo-1,6-dihydropyridazine-3-carboxamide |
| I-736 | 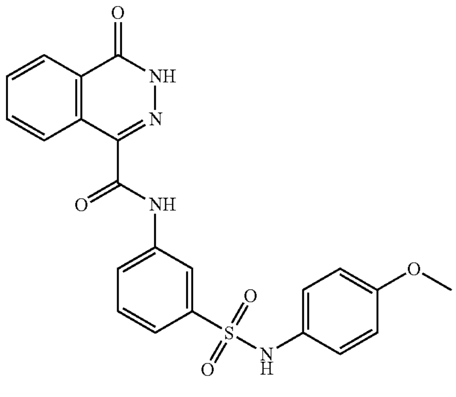 [SMILES: COc1ccc(NS(=O)(=O)c2cccc(NC(=O)c3n[nH]c(=O)c4ccccc34)c2)cc1] | N-(3-(N-(4-methoxyphenyl)sulfamoyl)phenyl)-4-oxo-3,4-dihydrophthalazine-1-carboxamide |
| I-737 | 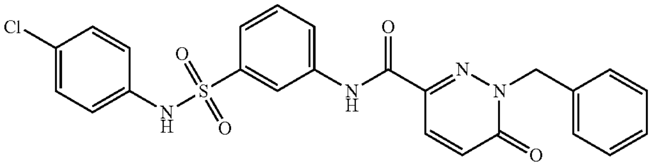 [SMILES: O=C(Nc1cccc(S(=O)(=O)Nc2ccc(Cl)cc2)c1)c1ccc(=O)n(Cc2ccccc2)n1] | 1-benzyl-N-(3-(N-(4-chlorophenyl)sulfamoyl)phenyl)-6-oxo-1,6-dihydropyridazine-3-carboxamide |

TABLE 1-continued

| ID | Structure | Name |
| --- | --- | --- |
| I-738 | 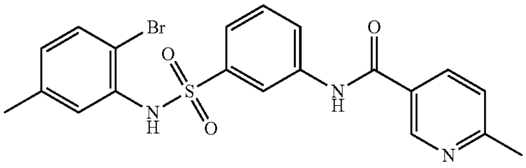 | N-(3-(N-(2-bromo-5-methylphenyl)sulfamoyl)phenyl)-6-methylnicotinamide |
| I-739 | 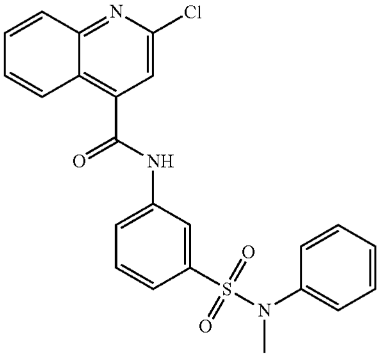 [SMILES: CN(c1ccccc1)S(=O)(=O)c1cccc(NC(=O)c2cc(Cl)nc3ccccc23)c1] | 2-chloro-N-(3-(N-methyl-N-phenylsulfamoyl)phenyl)quinoline-4-carboxamide |
| I-740 | 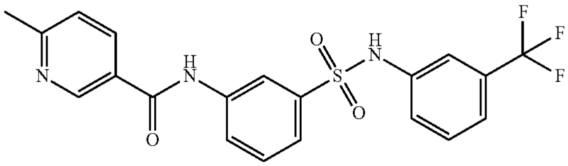 [SMILES: Cc1ccc(C(=O)Nc2cccc(S(=O)(=O)Nc3cccc(C(F)(F)F)c3)c2)cn1] | 6-methyl-N-(3-(N-(3-(trifluoromethyl)phenyl)sulfamoyl)phenyl)nicotinamide |
| I-741 | 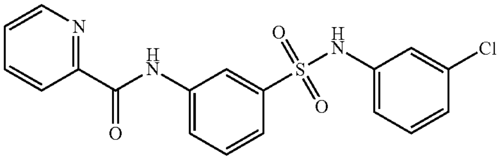 [SMILES: O=C(Nc1cccc(S(=O)(=O)Nc2cccc(Cl)c2)c1)c1ccccn1] | N-(3-(N-(3-chlorophenyl)sulfamoyl)phenyl)picolinamide |
| I-742 | 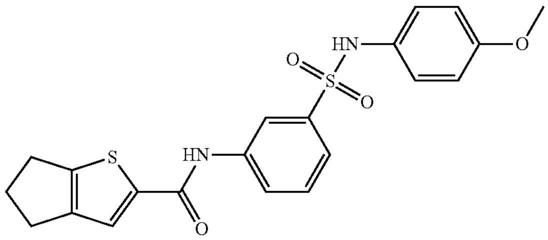 [SMILES: COc1ccc(NS(=O)(=O)c2cccc(NC(=O)c3cc4c(s3)CCC4)c2)cc1] | N-(3-(N-(4-methoxyphenyl)sulfamoyl)phenyl)-5,6-dihydro-4H-cyclopenta[b]thiophene-2-carboxamide |
| I-743 | 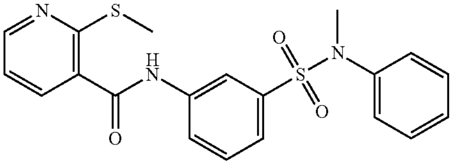 [SMILES: CSc1ncccc1C(=O)Nc1cccc(S(=O)(=O)N(C)c2ccccc2)c1] | N-(3-(N-methyl-N-phenylsulfamoyl)phenyl)-2-(methylthio)nicotinamide |
| I-744 | 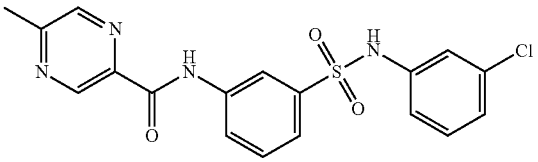 [SMILES: Cc1cnc(C(=O)Nc2cccc(S(=O)(=O)Nc3cccc(Cl)c3)c2)cn1] | N-(3-(N-(3-chlorophenyl)sulfamoyl)phenyl)-5-methylpyrazine-2-carboxamide |

TABLE 1-continued

| ID | Structure | Name |
|---|---|---|
| I-745 | 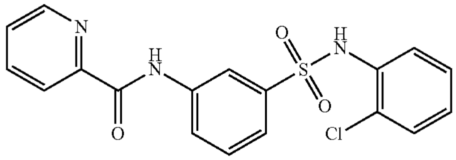 [SMILES: O=C(Nc1cccc(S(=O)(=O)Nc2ccccc2Cl)c1)c1ccccn1] | N-(3-(N-(2-chlorophenyl)sulfamoyl)phenyl)picolinamide |
| I-746 | 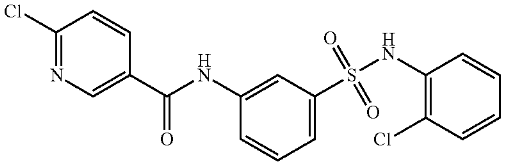 [SMILES: O=C(Nc1cccc(S(=O)(=O)Nc2ccccc2Cl)c1)c1ccc(Cl)nc1] | 6-chloro-N-(3-(N-(2-chlorophenyl)sulfamoyl)phenyl)nicotinamide |
| I-747 | 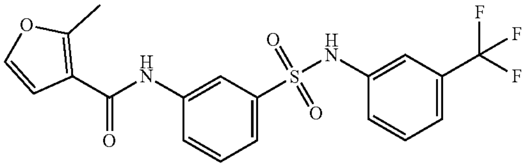 [SMILES: Cc1occc1C(=O)Nc1cccc(S(=O)(=O)Nc2cccc(C(F)(F)F)c2)c1] | 2-methyl-N-(3-(N-(3-(trifluoromethyl)phenyl)sulfamoyl)phenyl) furan-3-carboxamide |
| I-748 | 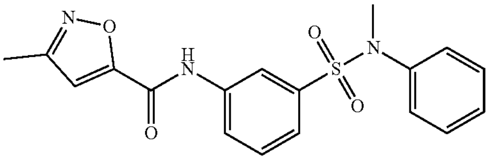 [SMILES: Cc1cc(C(=O)Nc2cccc(S(=O)(=O)N(C)c3ccccc3)c2)on1] | 3-methyl-N-(3-(N-methyl-N-phenylsulfamoyl)phenyl)isoxazole-5-carboxamide |
| I-749 | 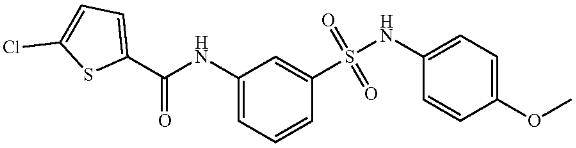 [SMILES: COc1ccc(NS(=O)(=O)c2cccc(NC(=O)c3ccc(Cl)s3)c2)cc1] | 5-chloro-N-(3-(N-(4-methoxyphenyl)sulfamoyl)phenyl)thiophene-2-carboxamide |
| I-750 | 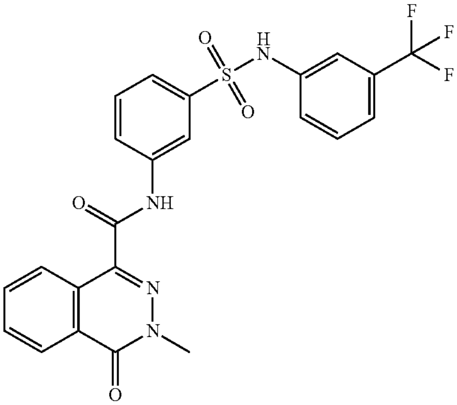 [SMILES: Cn1nc(C(=O)Nc2cccc(S(=O)(=O)Nc3cccc(C(F)(F)F)c3)c2)c2ccccc2c1=O] | 3-methyl-4-oxo-N-(3-(N-(3-(trifluoromethyl)phenyl)sulfamoyl)phenyl)-3,4-dihydrophthalazine-1-carboxamide |
| I-751 | 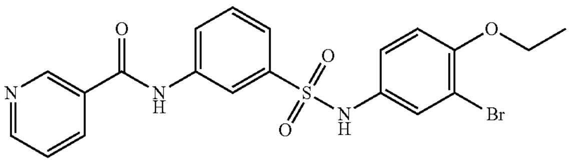 [SMILES: CCOc1ccc(NS(=O)(=O)c2cccc(NC(=O)c3cccnc3)c2)cc1Br] | N-(3-(N-(3-bromo-4-ethoxyphenyl)sulfamoyl)phenyl)nicotinamide |
| I-752 | 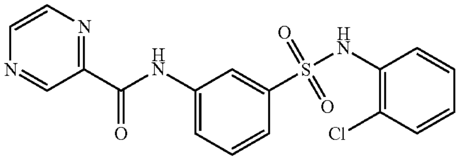 [SMILES: O=C(Nc1cccc(S(=O)(=O)Nc2ccccc2Cl)c1)c1cnccn1] | N-(3-(N-(2-chlorophenyl)sulfamoyl)phenyl)pyrazine-2-carboxamide |

TABLE 1-continued

| ID | Structure | Name |
|---|---|---|
| I-753 | 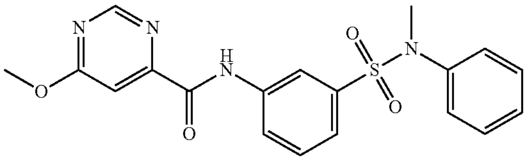 [SMILES: COc1cc(C(=O)Nc2cccc(S(=O)(=O)N(C)c3ccccc3)c2)ncn1] | 6-methoxy-N-(3-(N-methyl-N-phenylsulfamoyl)phenyl)pyrimidine-4-carboxamide |
| I-754 | 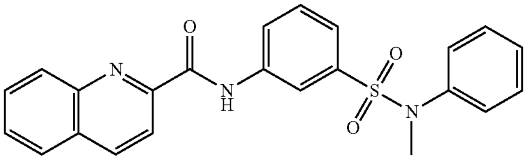 [SMILES: CN(c1ccccc1)S(=O)(=O)c1cccc(NC(=O)c2ccc3ccccc3n2)c1] | N-(3-(N-methyl-N-phenylsulfamoyl)phenyl)quinoline-2-carboxamide |
| I-755 | 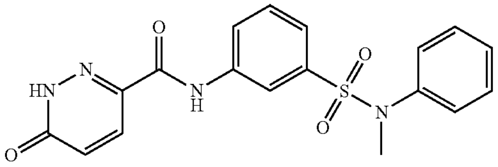 [SMILES: CN(c1ccccc1)S(=O)(=O)c1cccc(NC(=O)c2ccc(=O)[nH]n2)c1] | N-(3-(N-methyl-N-phenylsulfamoyl)phenyl)-6-oxo-1,6-dihydropyridazine-3-carboxamide |
| I-756 | 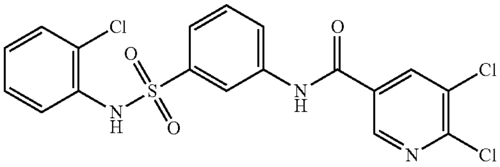 [SMILES: O=C(Nc1cccc(S(=O)(=O)Nc2ccccc2Cl)c1)c1cnc(Cl)c(Cl)c1] | 5,6-dichloro-N-(3-(N-(2-chlorophenyl)sulfamoyl)phenyl)nicotinamide |
| I-757 | 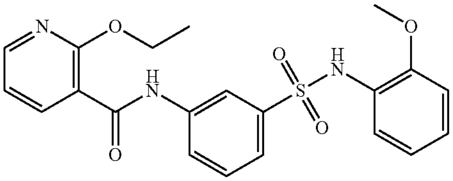 [SMILES: CCOc1ncccc1C(=O)Nc1cccc(S(=O)(=O)Nc2ccccc2OC)c1] | 2-ethoxy-N-(3-(N-(2-methoxyphenyl)sulfamoyl)phenyl) nicotinamide |
| I-758 | 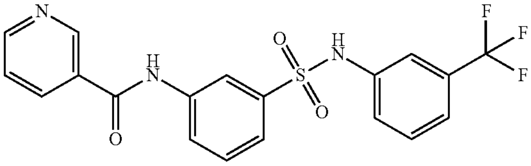 [SMILES: O=C(Nc1cccc(S(=O)(=O)Nc2cccc(C(F)(F)F)c2)c1)c1cccnc1] | N-(3-(N-(3-(trifluoromethyl)phenyl)sulfamoyl)phenyl) nicotinamide |
| I-759 | 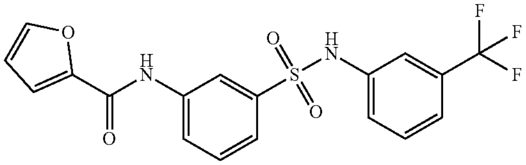 [SMILES: O=C(Nc1cccc(S(=O)(=O)Nc2cccc(C(F)(F)F)c2)c1)c1ccco1] | N-(3-(N-(3-(trifluoromethyl)phenyl)sulfamoyl)phenyl) furan-2-carboxamide |
| I-760 | 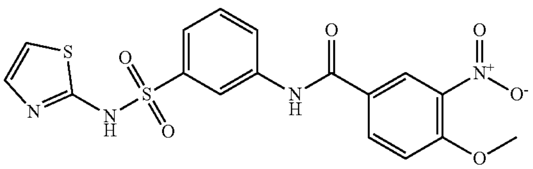 [SMILES: COc1ccc(C(=O)Nc2cccc(S(=O)(=O)Nc3nccs3)c2)cc1[N+](=O)[O-]] | 4-methoxy-3-nitro-N-(3-(N-(thiazol-2-yl)sulfamoyl)phenyl)benzamide |

TABLE 1-continued

| ID | Structure | Name |
| --- | --- | --- |
| I-761 | 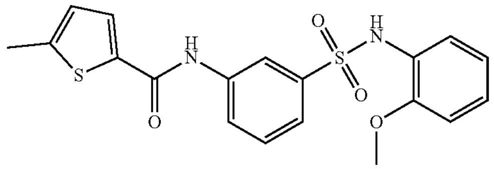 [SMILES: COc1ccccc1NS(=O)(=O)c1cccc(NC(=O)c2ccc(C)s2)c1] | N-(3-(N-(2-methoxyphenyl)sulfamoyl)phenyl)-5-methylthiophene-2-carboxamide |
| I-762 | 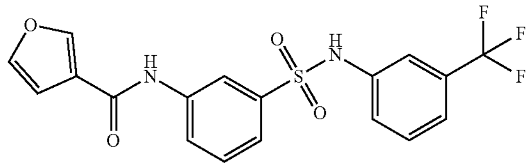 [SMILES: O=C(Nc1cccc(S(=O)(=O)Nc2cccc(C(F)(F)F)c2)c1)c1ccoc1] | N-(3-(N-(3-(trifluoromethyl)phenyl)sulfamoyl)phenyl) furan-3-carboxamide |
| I-763 | 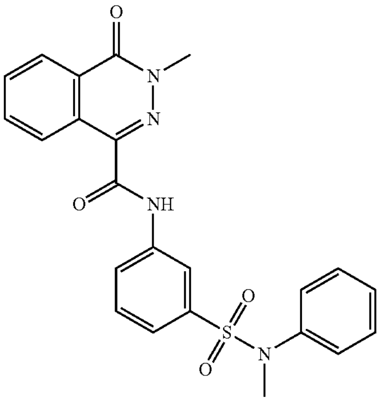 [SMILES: CN(c1ccccc1)S(=O)(=O)c1cccc(NC(=O)c2nn(C)c(=O)c3ccccc23)c1] | 3-methyl-N-(3-(N-methyl-N-phenylsulfamoyl)phenyl)-4-oxo-3,4-dihydrophthalazine-1-carboxamide |
| I-764 | 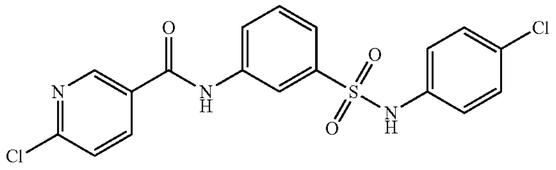 [SMILES: O=C(Nc1cccc(S(=O)(=O)Nc2ccc(Cl)cc2)c1)c1ccc(Cl)nc1] | 6-chloro-N-(3-(N-(4-chlorophenyl)sulfamoyl)phenyl)nicotinamide |
| I-765 | 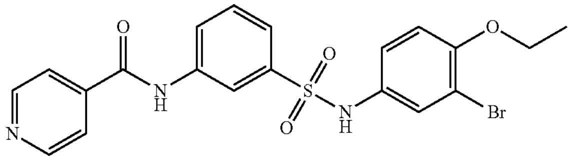 [SMILES: CCOc1ccc(NS(=O)(=O)c2cccc(NC(=O)c3ccncc3)c2)cc1Br] | N-(3-(N-(3-bromo-4-ethoxyphenyl)sulfamoyl)phenyl) isonicotinamide |
| I-766 | 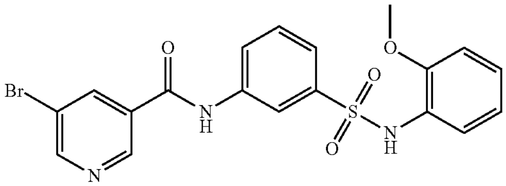 [SMILES: COc1ccccc1NS(=O)(=O)c1cccc(NC(=O)c2cncc(Br)c2)c1] | 5-bromo-N-(3-(N-(2-methoxyphenyl)sulfamoyl)phenyl) nicotinamide |
| I-767 | 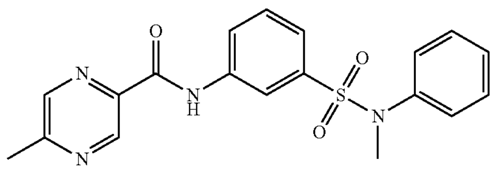 [SMILES: Cc1cnc(C(=O)Nc2cccc(S(=O)(=O)N(C)c3ccccc3)c2)cn1] | 5-methyl-N-(3-(N-methyl-N-phenylsulfamoyl)phenyl)pyrazine-2-carboxamide |

TABLE 1-continued

| ID | Structure | Name |
|---|---|---|
| I-768 | 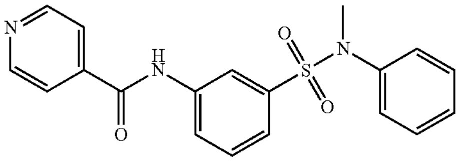 [SMILES: CN(c1ccccc1)S(=O)(=O)c1cccc(NC(=O)c2ccncc2)c1] | N-(3-(N-methyl-N-phenylsulfamoyl)phenyl)isonicotinamide |
| I-769 | 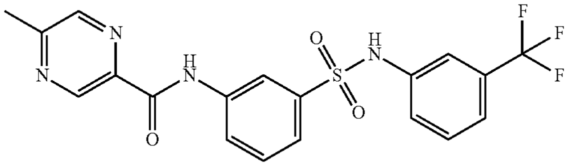 [SMILES: Cc1cnc(C(=O)Nc2cccc(S(=O)(=O)Nc3cccc(C(F)(F)F)c3)c2)cn1] | 5-methyl-N-(3-(N-(3-(trifluoromethyl)phenyl)sulfamoyl)phenyl) pyrazine-2-carboxamide |
| I-770 | 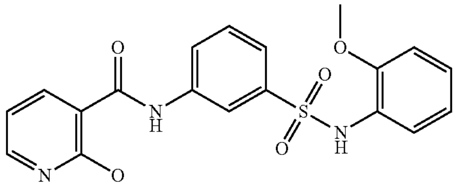 [SMILES: COc1ccccc1NS(=O)(=O)c1cccc(NC(=O)c2cccnc2O)c1] | 2-methoxy-N-(3-(N-(2-methoxyphenyl)sulfamoyl)phenyl) nicotinamide |
| I-771 | 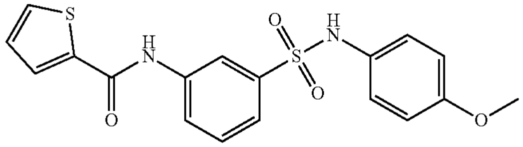 [SMILES: COc1ccc(NS(=O)(=O)c2cccc(NC(=O)c3cccs3)c2)cc1] | N-(3-(N-(4-methoxyphenyl)sulfamoyl)phenyl)thiophene-2-carboxamide |
| I-772 | 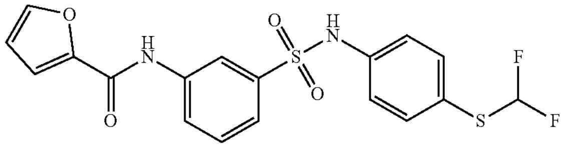 [SMILES: O=C(Nc1cccc(S(=O)(=O)Nc2ccc(SC(F)F)cc2)c1)c1ccco1] | N-(3-(N-(4-((difluoromethyl)thio)phenyl)sulfamoyl)phenyl) furan-2-carboxamide |
| I-773 | 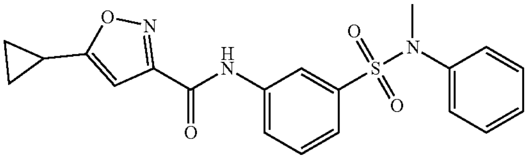 [SMILES: CN(c1ccccc1)S(=O)(=O)c1cccc(NC(=O)c2cc(C3CC3)on2)c1] | 5-cyclopropyl-N-(3-(N-methyl-N-phenylsulfamoyl)phenyl)isoxazole-3-carboxamide |
| I-774 | 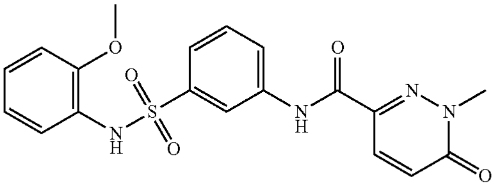 [SMILES: COc1ccccc1NS(=O)(=O)c1cccc(NC(=O)c2ccc(=O)n(C)n2)c1] | N-(3-(N-(2-methoxyphenyl)sulfamoyl)phenyl)-1-methyl-6-oxo-1,6-dihydropyridazine-3-carboxamide |
| I-775 | 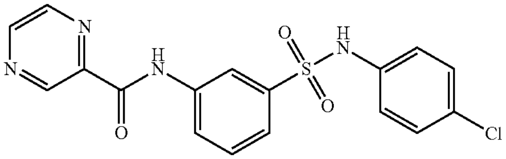 [SMILES: O=C(Nc1cccc(S(=O)(=O)Nc2ccc(Cl)cc2)c1)c1cnccn1] | N-(3-(N-(4-chlorophenyl)sulfamoyl)phenyl)pyrazine-2-carboxamide |
| I-776 | 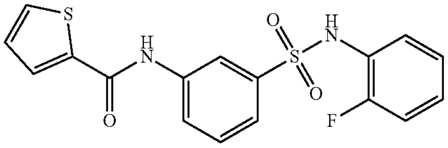 [SMILES: O=C(Nc1cccc(S(=O)(=O)Nc2ccccc2F)c1)c1cccs1] | N-(3-(N-(2-fluorophenyl)sulfamoyl)phenyl)thiophene-2-carboxamide |

TABLE 1-continued

| ID | Structure | Name |
|---|---|---|
| I-777 | 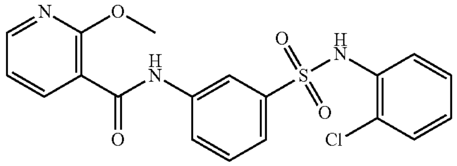 [SMILES: COc1ncccc1C(=O)Nc1cccc(S(=O)(=O)Nc2ccccc2Cl)c1] | N-(3-(N-(2-chlorophenyl)sulfamoyl)phenyl)-2-methoxynicotinamide |
| I-778 | 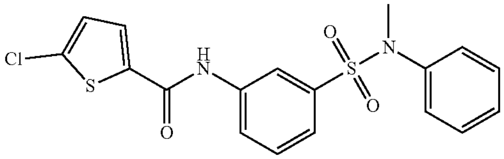 [SMILES: CN(c1ccccc1)S(=O)(=O)c1cccc(NC(=O)c2ccc(Cl)s2)c1] | 5-chloro-N-(3-(N-methyl-N-phenylsulfamoyl)phenyl)thiophene-2-carboxamide |
| I-779 | 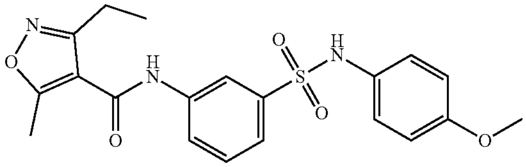 [SMILES: CCc1noc(C)c1C(=O)Nc1cccc(S(=O)(=O)Nc2ccc(OC)cc2)c1] | 3-ethyl-N-(3-(N-(4-methoxyphenyl)sulfamoyl)phenyl)-5-methylisoxazole-4-carboxamide |
| I-780 | 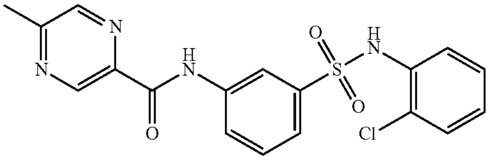 [SMILES: Cc1cnc(C(=O)Nc2cccc(S(=O)(=O)Nc3ccccc3Cl)c2)cn1] | N-(3-(N-(2-chlorophenyl)sulfamoyl)phenyl)-5-methylpyrazine-2-carboxamide |
| I-781 | 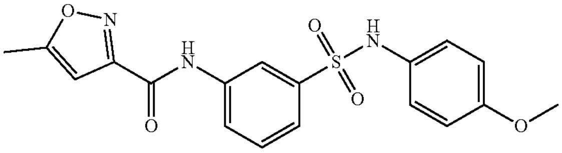 | N-(3-(N-(4-methoxyphenyl)sulfamoyl)phenyl)-5-methylisoxazole-3-carboxamide |
| I-782 | 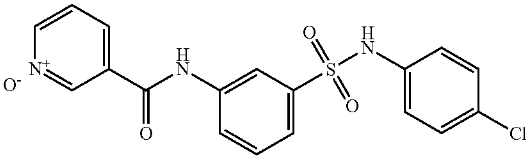 | 3-((3-(N-(4-chlorophenyl)sulfamoyl)phenyl)carbamoyl) pyridine 1-oxide |
| I-783 | 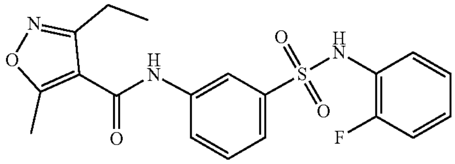 [SMILES: CCc1noc(C)c1C(=O)Nc1cccc(S(=O)(=O)Nc2ccccc2F)c1] | 3-ethyl-N-(3-(N-(2-fluorophenyl)sulfamoyl)phenyl)-5-methylisoxazole-4-carboxamide |
| I-784 | 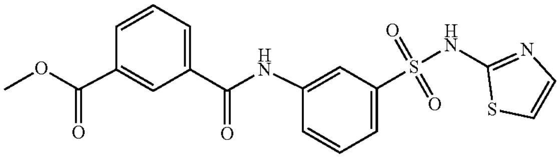 [SMILES: COC(=O)c1cccc(C(=O)Nc2cccc(S(=O)(=O)Nc3nccs3)c2)c1] | methyl 3-((3-(N-(thiazol-2-yl)sulfamoyl)phenyl)carbamoyl)benzoate |
| I-785 | 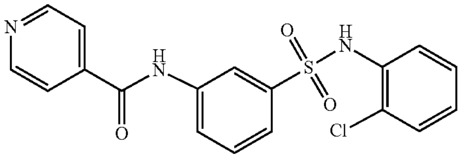 [SMILES: O=C(Nc1cccc(S(=O)(=O)Nc2ccccc2Cl)c1)c1ccncc1] | N-(3-(N-(2-chlorophenyl)sulfamoyl)phenyl) isonicotinamide |

TABLE 1-continued

| ID | Structure | Name |
|---|---|---|
| I-786 | 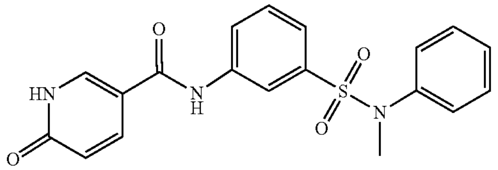 [SMILES: CN(c1ccccc1)S(=O)(=O)c1cccc(NC(=O)c2ccc(=O)[nH]c2)c1] | N-(3-(N-methyl-N-phenylsulfamoyl)phenyl)-6-oxo-1,6-dihydropyridine-3-carboxamide |
| I-787 | 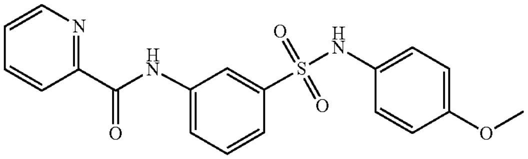 [SMILES: COc1ccc(NS(=O)(=O)c2cccc(NC(=O)c3ccccn3)c2)cc1] | N-(3-(N-(4-methoxyphenyl)sulfamoyl)phenyl) picolinamide |
| I-788 | 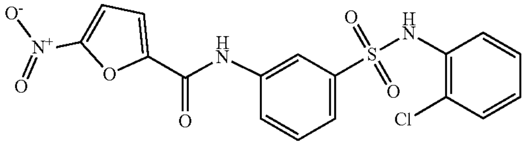 [SMILES: O=C(Nc1cccc(S(=O)(=O)Nc2ccccc2Cl)c1)c1ccc([N+](=O)[O-])o1] | N-(3-(N-(2-chlorophenyl)sulfamoyl)phenyl)-5-nitrofuran-2-carboxamide |
| I-789 | 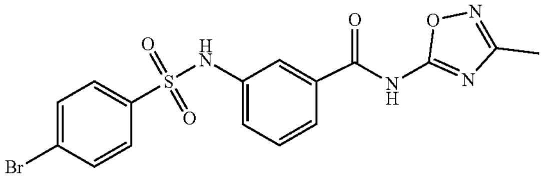 [SMILES: Cc1noc(NC(=O)c2cccc(NS(=O)(=O)c3ccc(Br)cc3)c2)n1] | 3-((4-bromophenyl)sulfonamido)-N-(3-methyl-1,2,4-oxadiazol-5-yl)benzamide |
| I-790 | 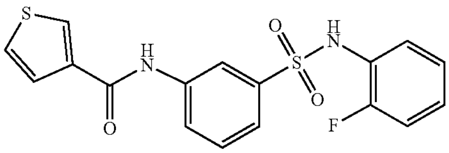 [SMILES: O=C(Nc1cccc(S(=O)(=O)Nc2ccccc2F)c1)c1ccsc1] | N-(3-(N-(2-fluorophenyl)sulfamoyl)phenyl)thiophene-3-carboxamide |
| I-791 | 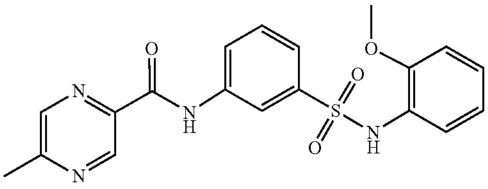 [SMILES: COc1ccccc1NS(=O)(=O)c1cccc(NC(=O)c2cnc(C)cn2)c1] | N-(3-(N-(2-methoxyphenyl)sulfamoyl)phenyl)-5-methylpyrazine-2-carboxamide |
| I-792 | 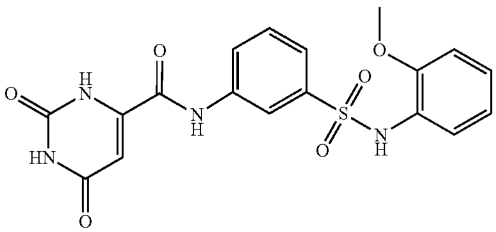 [SMILES: COc1ccccc1NS(=O)(=O)c1cccc(NC(=O)c2cc(=O)[nH]c(=O)[nH]2)c1] | N-(3-(N-(2-methoxyphenyl)sulfamoyl)phenyl)-2,6-dioxo-1,2,3,6-tetrahydropyrimidine-4-carboxamide |
| I-793 | 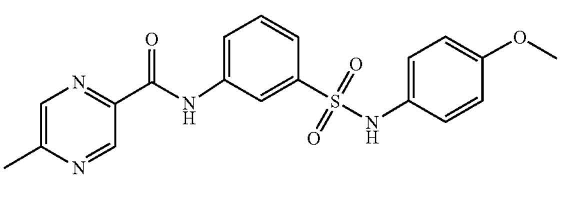 | N-(3-(N-(4-methoxyphenyl)sulfamoyl)phenyl)-5-methylpyrazine-2-carboxamide |

TABLE 1-continued

| ID | Structure | Name |
|---|---|---|
| I-794 | 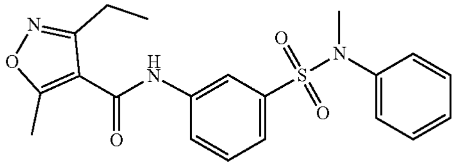 [SMILES: CCc1noc(C)c1C(=O)Nc1cccc(S(=O)(=O)N(C)c2ccccc2)c1] | 3-ethyl-5-methyl-N-(3-(N-methyl-N-phenylsulfamoyl)phenyl)isoxazole-4-carboxamide |
| I-795 | 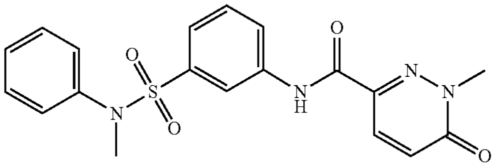 [SMILES: CN(c1ccccc1)S(=O)(=O)c1cccc(NC(=O)c2ccc(=O)n(C)n2)c1] | 1-methyl-N-(3-(N-methyl-N-phenylsulfamoyl)phenyl)-6-oxo-1,6-dihydropyridazine-3-carboxamide |
| I-796 | 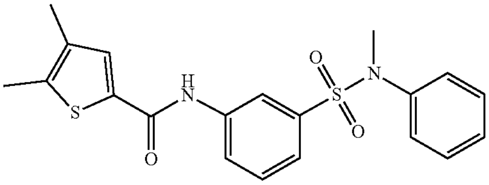 [SMILES: Cc1cc(C(=O)Nc2cccc(S(=O)(=O)N(C)c3ccccc3)c2)sc1C] | 4,5-dimethyl-N-(3-(N-methyl-N-phenylsulfamoyl)phenyl)thiophene-2-carboxamide |
| I-797 | 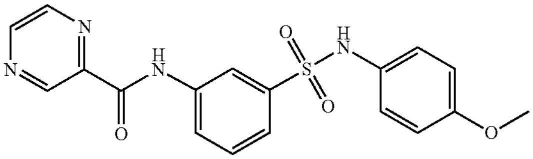 [SMILES: COc1ccc(NS(=O)(=O)c2cccc(NC(=O)c3cnccn3)c2)cc1] | N-(3-(N-(4-methoxyphenyl)sulfamoyl)phenyl)pyrazine-2-carboxamide |
| I-798 | 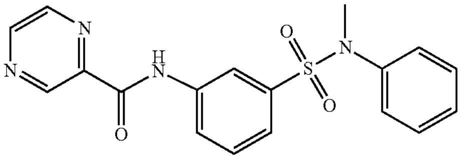 [SMILES: CN(c1ccccc1)S(=O)(=O)c1cccc(NC(=O)c2cnccn2)c1] | N-(3-(N-methyl-N-phenylsulfamoyl)phenyl)pyrazine-2-carboxamide |
| I-799 | 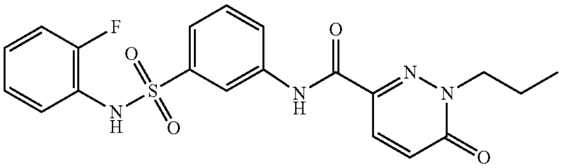 [SMILES: CCCn1nc(C(=O)Nc2cccc(S(=O)(=O)Nc3ccccc3F)c2)ccc1=O] | N-(3-(N-(2-fluorophenyl)sulfamoyl)phenyl)-6-oxo-1-propyl-1,6-dihydropyridazine-3-carboxamide |
| I-800 | 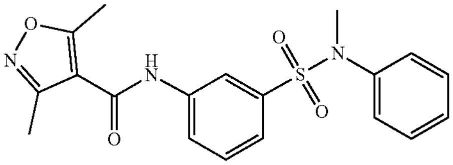 [SMILES: Cc1noc(C)c1C(=O)Nc1cccc(S(=O)(=O)N(C)c2ccccc2)c1] | 3,5-dimethyl-N-(3-(N-methyl-N-phenylsulfamoyl)phenyl)isoxazole-4-carboxamide |
| I-801 | 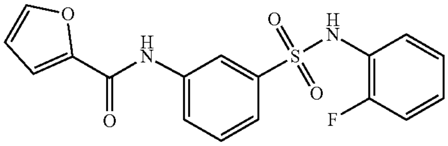 [SMILES: O=C(Nc1cccc(S(=O)(=O)Nc2ccccc2F)c1)c1ccco1] | N-(3-(N-(2-fluorophenyl)sulfamoyl)phenyl)furan-2-carboxamide |
| I-802 | 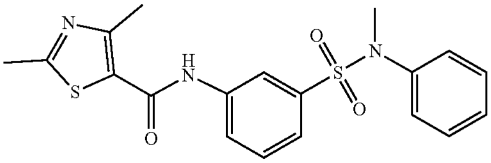 [SMILES: Cc1nc(C)c(C(=O)Nc2cccc(S(=O)(=O)N(C)c3ccccc3)c2)s1] | 2,4-dimethyl-N-(3-(N-methyl-N-phenylsulfamoyl)phenyl)thiazole-5-carboxamide |

TABLE 1-continued

| ID | Structure | Name |
|---|---|---|
| I-803 | 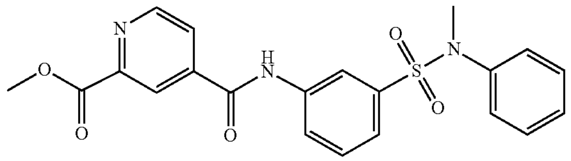 [SMILES: COC(=O)c1cc(C(=O)Nc2cccc(S(=O)(=O)N(C)c3ccccc3)c2)ccn1] | methyl 4-((3-(N-methyl-N-phenylsulfamoyl)phenyl)carbamoyl)picolinate |
| I-804 | 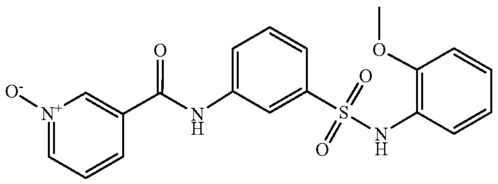 [SMILES: COc1ccccc1NS(=O)(=O)c1cccc(NC(=O)c2ccc[n+]([O-])c2)c1] | 3-((3-(N-(2-methoxyphenyl)sulfamoyl)phenyl)carbamoyl) pyridine 1-oxide |
| I-805 | 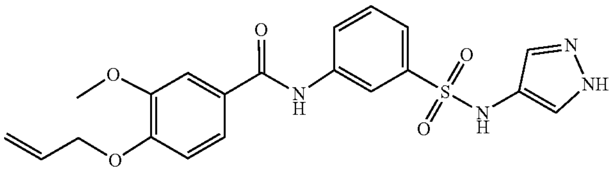 [SMILES: C=CCOc1ccc(C(=O)Nc2cccc(S(=O)(=O)Nc3cn[nH]c3)c2)cc1OC] | N-(3-(N-(1H-pyrazol-4-yl)sulfamoyl)phenyl)-4-(allyloxy)-3-methoxybenzamide |
| I-806 | 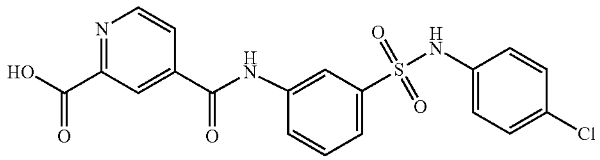 [SMILES: O=C(Nc1cccc(S(=O)(=O)Nc2ccc(Cl)cc2)c1)c1ccnc(C(=O)O)c1] | 4-((3-(N-(4-chlorophenyl)sulfamoyl)phenyl)carbamoyl) picolinic acid |
| I-807 | 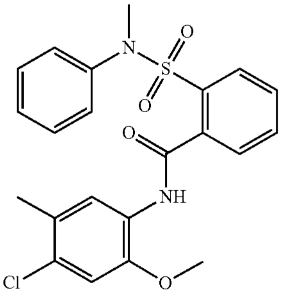 [SMILES: COc1cc(Cl)c(C)cc1NC(=O)c1ccccc1S(=O)(=O)N(C)c1ccccc1] | N-(4-chloro-2-methoxy-5-methylphenyl)-2-(N-methyl-N-phenylsulfamoyl)benzamide |
| I-808 | 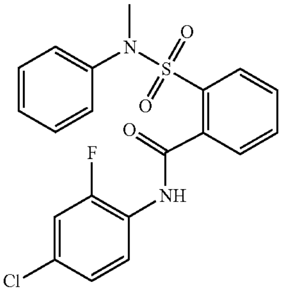 [SMILES: CN(c1ccccc1)S(=O)(=O)c1ccccc1C(=O)Nc1ccc(Cl)cc1F] | N-(4-chloro-2-fluorophenyl)-2-(N-methyl-N-phenylsulfamoyl)benzamide |
| I-809 | 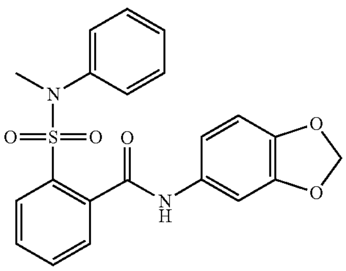 [SMILES: CN(c1ccccc1)S(=O)(=O)c1ccccc1C(=O)Nc1ccc2c(c1)OCO2] | N-(benzo[d][1,3]dioxol-5-yl)-2-(N-methyl-N-phenylsulfamoyl)benzamide |

TABLE 1-continued
| ID | Structure | Name |
| --- | --- | --- |
| I-810 | 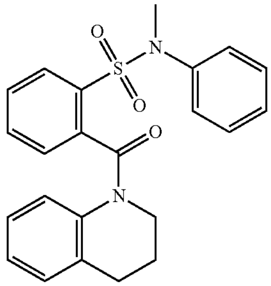 [SMILES: CN(c1ccccc1)S(=O)(=O)c1ccccc1C(=O)N1CCCc2ccccc21] | N-methyl-N-phenyl-2-(1,2,3,4-tetrahydroquinoline-1-carbonyl)benzenesulfonamide |
| I-811 | 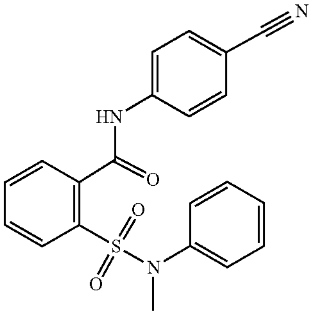 [SMILES: CN(c1ccccc1)S(=O)(=O)c1ccccc1C(=O)Nc1ccc(C#N)cc1] | N-(4-cyanophenyl)-2-(N-methyl-N-phenylsulfamoyl)benzamide |
| I-812 | 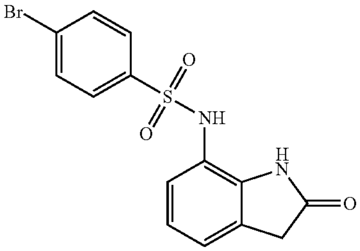 | 4-bromo-N-(2-oxoindolin-7-yl)benzenesulfonamide |
| I-813 | 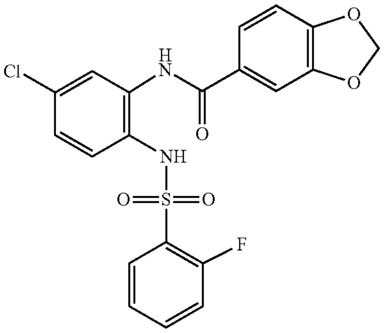 [SMILES: O=C(Nc1cc(Cl)ccc1NS(=O)(=O)c1ccccc1F)c1ccc2c(c1)OCO2] | N-(5-chloro-2-((2-fluorophenyl)sulfonamido)phenyl)benzo[d][1,3]dioxole-5-carboxamide |
| I-814 | 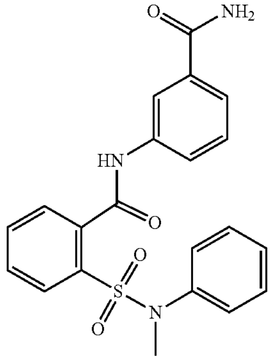 [SMILES: CN(c1ccccc1)S(=O)(=O)c1ccccc1C(=O)Nc1cccc(C(N)=O)c1] | N-(3-carbamoylphenyl)-2-(N-methyl-N-phenylsulfamoyl)benzamide |

TABLE 1-continued
| ID | Structure | Name |
|---|---|---|
| I-815 | 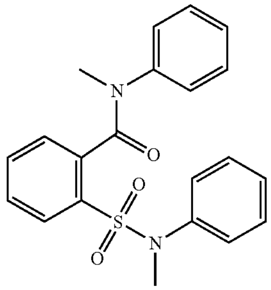 [SMILES: CN(C(=O)c1ccccc1S(=O)(=O)N(C)c1ccccc1)c1ccccc1] | N-methyl-2-(N-methyl-N-phenylsulfamoyl)-N-phenylbenzamide |
| I-816 | 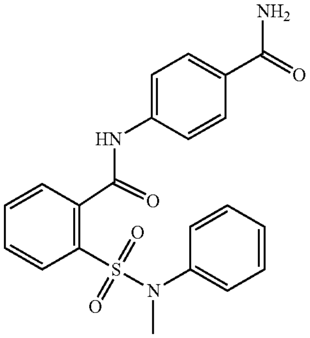 [SMILES: CN(c1ccccc1)S(=O)(=O)c1ccccc1C(=O)Nc1ccc(C(N)=O)cc1] | N-(4-carbamoylphenyl)-2-(N-methyl-N-phenylsulfamoyl)benzamide |
| I-817 | 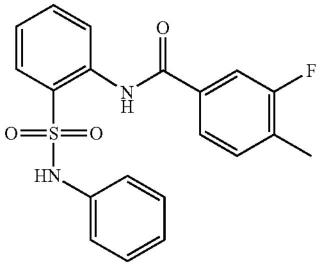 [SMILES: Cc1ccc(C(=O)Nc2ccccc2S(=O)(=O)Nc2ccccc2)cc1F] | 3-fluoro-4-methyl-N-(2-(N-phenylsulfamoyl)phenyl)benzamide |
| I-818 | 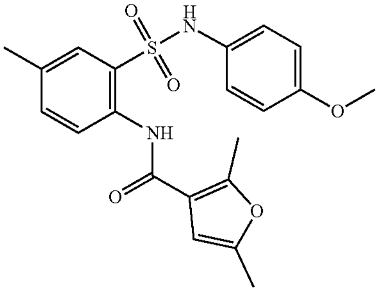 | N-(2-(N-(4-methoxyphenyl)sulfamoyl)-4-methylphenyl)-2,5-dimethylfuran-3-carboxamide |

TABLE 1-continued
| ID | Structure | Name |
|---|---|---|
| I-819 | 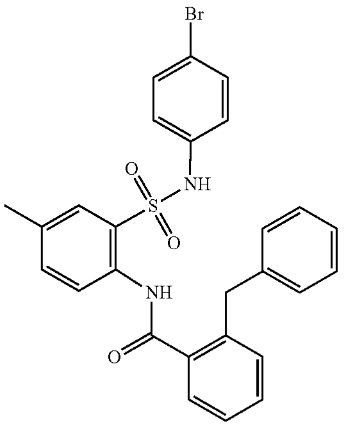 [SMILES: Cc1ccc(NC(=O)c2ccccc2Cc2ccccc2)c(S(=O)(=O)Nc2ccc(Br)cc2)c1] | N-(2-(N-(4-bromophenyl)sulfamoyl)-4-methylphenyl)-2-phenoxybenzamide |
| I-820 | 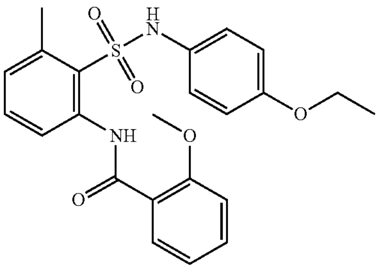 [SMILES: CCOc1ccc(NS(=O)(=O)c2c(C)cccc2NC(=O)c2ccccc2OC)cc1] | N-(2-(N-(4-ethoxyphenyl)sulfamoyl)-3-methylphenyl)-2-methoxybenzamide |
| I-821 | 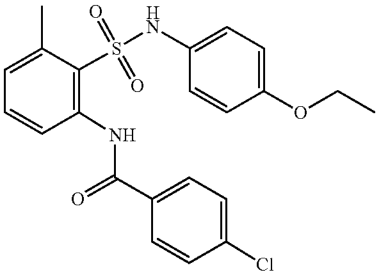 [SMILES: CCOc1ccc(NS(=O)(=O)c2c(C)cccc2NC(=O)c2ccc(Cl)cc2)cc1] | 4-chloro-N-(2-(N-(4-ethoxyphenyl)sulfamoyl)-3-methylphenyl)benzamide |
| I-822 | 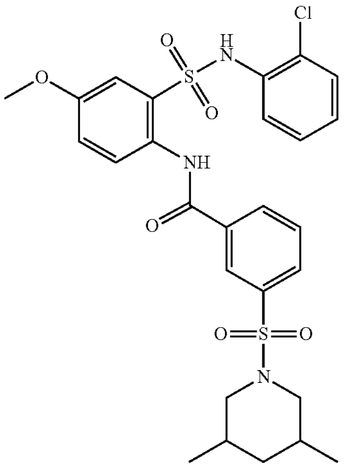 | N-(2-(N-(2-chlorophenyl)sulfamoyl)-4-methoxyphenyl)-3-((3,5-dimethylpiperidin-1-yl)sulfonyl)benzamide |

TABLE 1-continued

| ID | Structure | Name |
|---|---|---|
| I-823 | 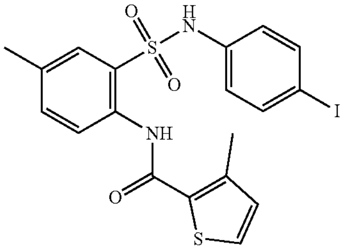 [SMILES: Cc1ccc(NC(=O)c2sccc2C)c(S(=O)(=O)Nc2ccc(I)cc2)c1] | N-(2-(N-(4-iodophenyl)sulfamoyl)-4-methylphenyl)-3-methylthiophene-2-carboxamide |
| I-824 | 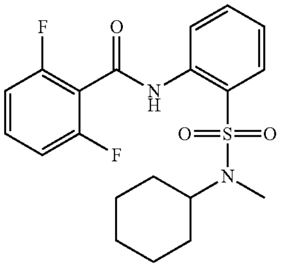 [SMILES: CN(C1CCCCC1)S(=O)(=O)c1ccccc1NC(=O)c1c(F)cccc1F] | N-(2-(N-cyclohexyl-N-methylsulfamoyl)phenyl)-2,6-difluorobenzamide |
| I-825 | 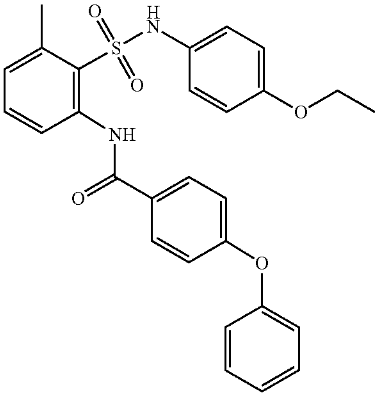 [SMILES: CCOc1ccc(NS(=O)(=O)c2c(C)cccc2NC(=O)c2ccc(Oc3ccccc3)cc2)cc1] | N-(2-(N-(4-ethoxyphenyl)sulfamoyl)-3-methylphenyl)-4-phenoxybenzamide |
| I-826 | 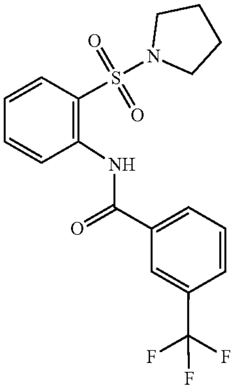 [SMILES: O=C(Nc1ccccc1S(=O)(=O)N1CCCC1)c1cccc(C(F)(F)F)c1] | N-(2-(pyrrolidin-1-ylsulfonyl)phenyl)-3-(trifluoromethyl)benzamide |
| I-827 | 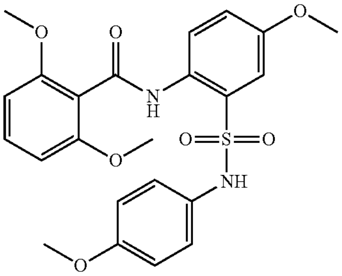 [SMILES: COc1ccc(NS(=O)(=O)c2cc(OC)ccc2NC(=O)c2c(OC)cccc2OC)cc1] | 2,6-dimethoxy-N-(4-methoxy-2-(N-(4-methoxyphenyl)sulfamoyl)phenyl)benzamide |

TABLE 1-continued
| ID | Structure | Name |
|---|---|---|
| I-828 | 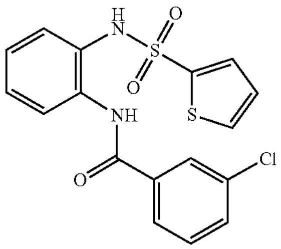 [SMILES: O=C(Nc1ccccc1NS(=O)(=O)c1cccs1)c1cccc(Cl)c1] | 3-chloro-N-(2-(thiophene-2-sulfonamido)phenyl)benzamide |
| I-829 | 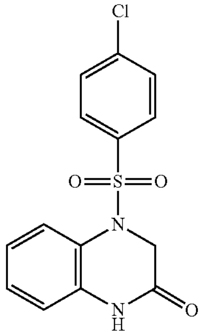 [SMILES: O=C1CN(S(=O)(=O)c2ccc(Cl)cc2)c2ccccc2N1] | 4-((4-chlorophenyl)sulfonyl)-3,4-dihydroquinoxalin-2(1H)-one |
| I-830 | 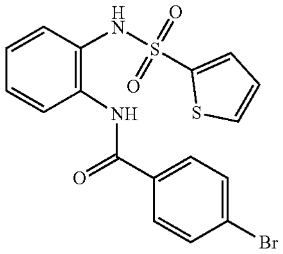 [SMILES: O=C(Nc1ccccc1NS(=O)(=O)c1cccs1)c1ccc(Br)cc1] | 4-bromo-N-(2-(thiophene-2-sulfonamido)phenyl)benzamide |
| I-831 | 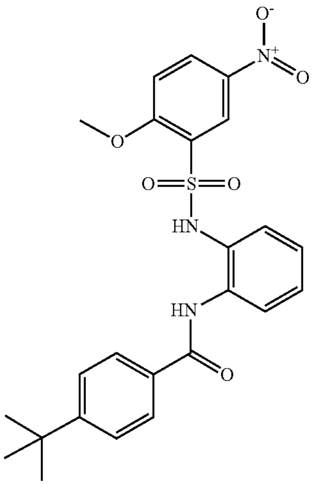 [SMILES: COc1ccc([N+](=O)[O-])cc1S(=O)(=O)Nc1ccccc1NC(=O)c1ccc(C(C)(C)C)cc1] | 4-(tert-butyl)-N-(2-((2-methoxy-5-nitrophenyl)sulfonamido)phenyl)benzamide |

TABLE 1-continued

| ID | Structure | Name |
|---|---|---|
| I-832 | 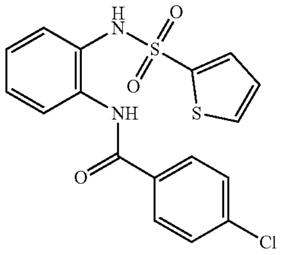 [SMILES: O=C(Nc1ccccc1NS(=O)(=O)c1cccs1)c1ccc(Cl)cc1] | 4-chloro-N-(2-(thiophene-2-sulfonamido)phenyl)benzamide |
| I-833 | 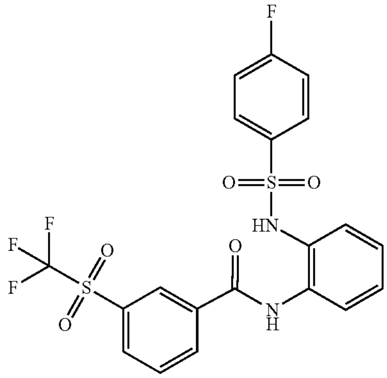 [SMILES: O=C(Nc1ccccc1NS(=O)(=O)c1ccc(F)cc1)c1cccc(S(=O)(=O)C(F)(F)F)c1] | N-(2-((4-fluorophenyl)sulfonamido)phenyl)-3-((trifluoromethyl)sulfonyl)benzamide |
| I-834 | 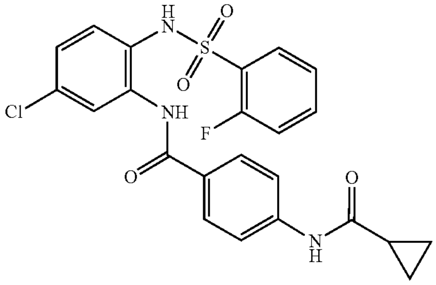 [SMILES: O=C(Nc1cc(Cl)ccc1NS(=O)(=O)c1ccccc1F)c1ccc(NC(=O)C2CC2)cc1] | N-(5-chloro-2-((2-fluorophenyl)sulfonamido)phenyl)-4-(cyclopropanecarboxamido)benzamide |
| I-835 | 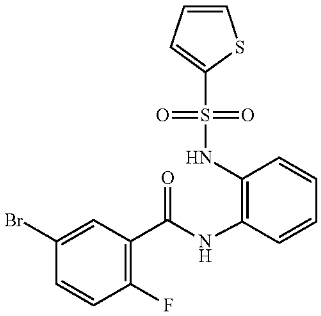 [SMILES: O=C(Nc1ccccc1NS(=O)(=O)c1cccs1)c1cc(Br)ccc1F] | 5-bromo-2-fluoro-N-(2-(thiophene-2-sulfonamido)phenyl)benzamide |
| I-836 | 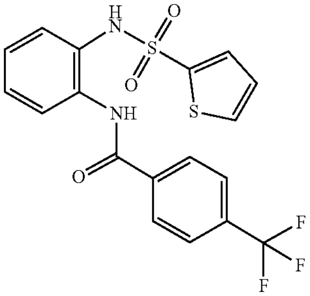 [SMILES: O=C(Nc1ccccc1NS(=O)(=O)c1cccs1)c1ccc(C(F)(F)F)cc1] | N-(2-(thiophene-2-sulfonamido)phenyl)-4-(trifluoromethyl)benzamide |

TABLE 1-continued
| ID | Structure | Name |
| --- | --- | --- |
| I-837 | 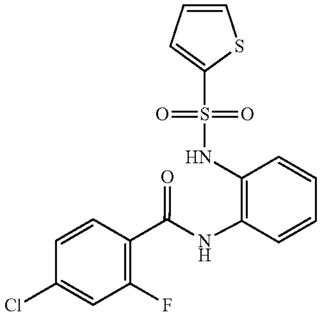 [SMILES: O=C(Nc1ccccc1NS(=O)(=O)c1cccs1)c1ccc(Cl)cc1F] | 4-chloro-2-fluoro-N-(2-(thiophene-2-sulfonamido)phenyl)benzamide |
| I-838 | 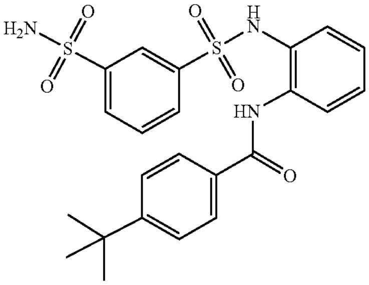 [SMILES: CC(C)(C)c1ccc(C(=O)Nc2ccccc2NS(=O)(=O)c2cccc(S(N)(=O)=O)c2)cc1] | 4-(tert-butyl)-N-(2-((3-sulfamoylphenyl)sulfonamido)phenyl) benzamide |
| I-839 | 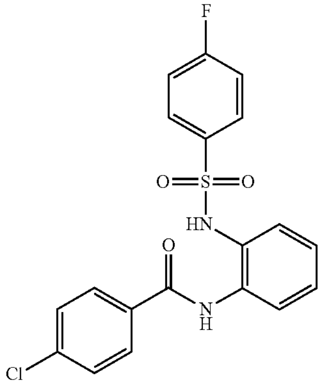 [SMILES: O=C(Nc1ccccc1NS(=O)(=O)c1ccc(F)cc1)c1ccc(Cl)cc1] | 4-chloro-N-(2-((4-fluorophenyl)sulfonamido)phenyl)benzamide |
| I-840 | 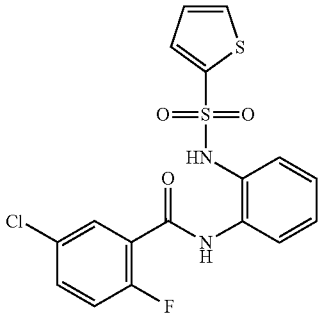 [SMILES: O=C(Nc1ccccc1NS(=O)(=O)c1cccs1)c1cc(Cl)ccc1F] | 5-chloro-2-fluoro-N-(2-(thiophene-2-sulfonamido)phenyl)benzamide |
| I-841 | 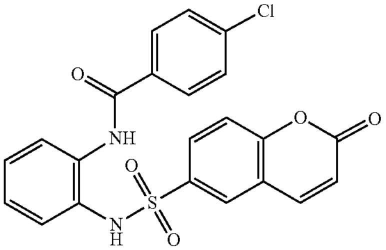 [SMILES: O=C(Nc1ccccc1NS(=O)(=O)c1ccc2oc(=O)ccc2c1)c1ccc(Cl)cc1] | 4-chloro-N-(2-((2-oxo-2H-chromene)-6-sulfonamido)phenyl)benzamide |

TABLE 1-continued
| ID | Structure | Name |
|---|---|---|
| I-842 | 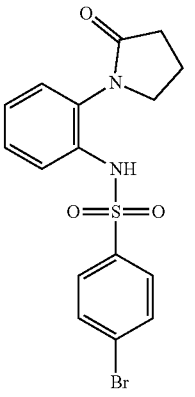 [SMILES: O=C1CCCN1c1ccccc1NS(=O)(=O)c1ccc(Br)cc1] | 4-bromo-N-(2-(2-oxopyrrolidin-1-yl)phenyl)benzenesulfonamide |
| I-843 | 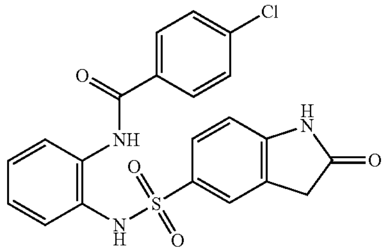 [SMILES: O=C1Cc2cc(S(=O)(=O)Nc3ccccc3NC(=O)c3ccc(Cl)cc3)ccc2N1] | 4-chloro-N-(2-((2-oxoindoline)-5-sulfonamido)phenyl)benzamide |
| I-844 | 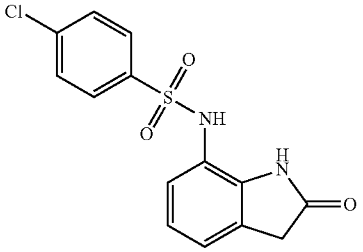 [SMILES: O=C1Cc2cccc(NS(=O)(=O)c3ccc(Cl)cc3)c2N1] | 4-chloro-N-(2-oxoindolin-7-yl)benzenesulfonamide |
| I-845 | 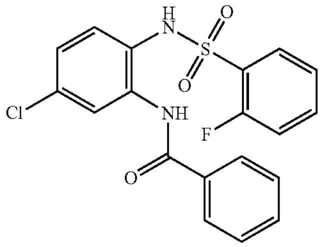 [SMILES: O=C(Nc1cc(Cl)ccc1NS(=O)(=O)c1ccccc1F)c1ccccc1] | N-(5-chloro-2-((2-fluorophenyl)sulfonamido)phenyl)benzamide |
| I-846 | 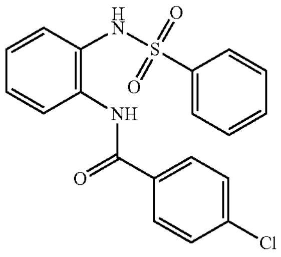 [SMILES: O=C(Nc1ccccc1NS(=O)(=O)c1ccccc1)c1ccc(Cl)cc1] | 4-chloro-N-(2-(phenylsulfonamido)phenyl)benzamide |

TABLE 1-continued
| ID | Structure | Name |
|---|---|---|
| I-847 | 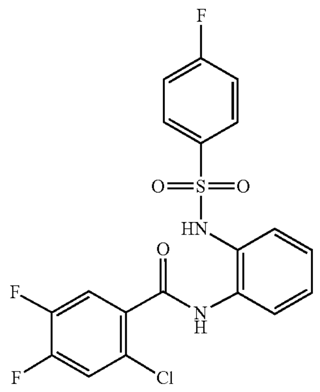 [SMILES: O=C(Nc1ccccc1NS(=O)(=O)c1ccc(F)cc1)c1cc(F)c(F)cc1Cl] | 2-chloro-4,5-difluoro-N-(2-((4-fluorophenyl)sulfonamido)phenyl)benzamide |
| I-848 | 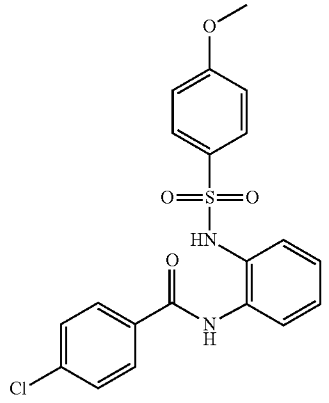 [SMILES: COc1ccc(S(=O)(=O)Nc2ccccc2NC(=O)c2ccc(Cl)cc2)cc1] | 4-chloro-N-(2-((4-methoxyphenyl)sulfonamido)phenyl) benzamide |
| I-849 | 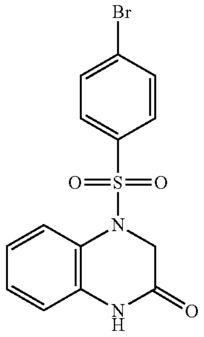 [SMILES: O=C1CN(S(=O)(=O)c2ccc(Br)cc2)c2ccccc2N1] | 4-((4-bromophenyl)sulfonyl)-3,4-dihydroquinoxalin-2(1H)-one |
| I-850 | 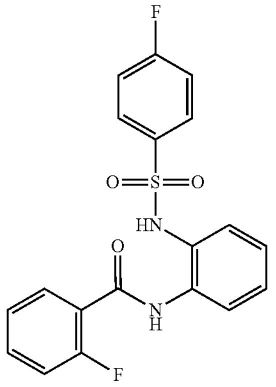 [SMILES: O=C(Nc1ccccc1NS(=O)(=O)c1ccc(F)cc1)c1ccccc1F] | 2-fluoro-N-(2-((4-fluorophenyl)sulfonamido)phenyl)benzamide |

TABLE 1-continued

| ID | Structure | Name |
|---|---|---|
| I-851 | 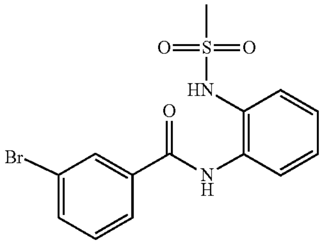 [SMILES: CS(=O)(=O)Nc1ccccc1NC(=O)c1cccc(Br)c1] | 3-bromo-N-(2-(methylsulfonamido)phenyl)benzamide |
| I-852 | 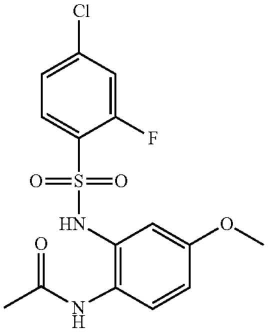 [SMILES: COc1ccc(NC(C)=O)c(NS(=O)(=O)c2ccc(Cl)cc2F)c1] | N-(2-((4-chloro-2-fluorophenyl)sulfonamido)-4-methoxyphenyl)acetamide |
| I-853 | 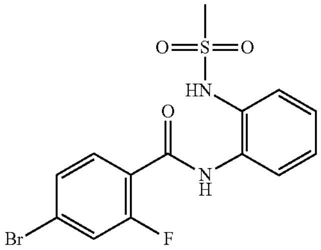 [SMILES: CS(=O)(=O)Nc1ccccc1NC(=O)c1ccc(Br)cc1F] | 4-bromo-2-fluoro-N-(2-(methylsulfonamido)phenyl)benzamide |
| I-854 | 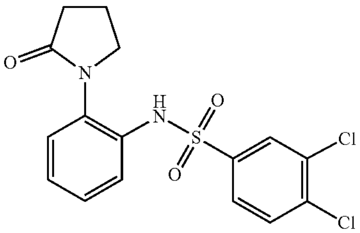 [SMILES: O=C1CCCN1c1ccccc1NS(=O)(=O)c1ccc(Cl)c(Cl)c1] | 3,4-dichloro-N-(2-(2-oxopyrrolidin-1-yl)phenyl)benzenesulfonamide |
| I-855 | 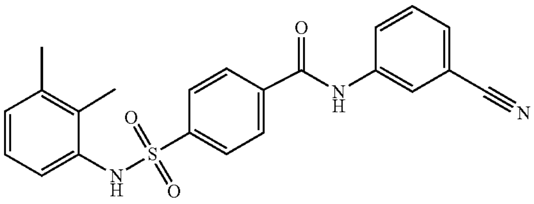 [SMILES: Cc1cccc(NS(=O)(=O)c2ccc(C(=O)Nc3cccc(C#N)c3)cc2)c1C] | N-(3-cyanophenyl)-4-(N-(2,3-dimethylphenyl)sulfamoyl)benzamide |
| I-856 | 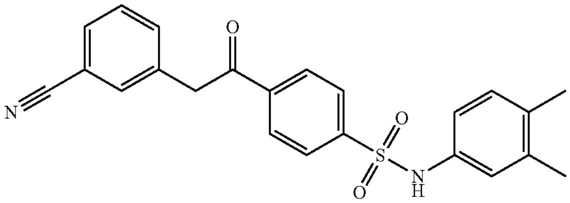 [SMILES: Cc1ccc(NS(=O)(=O)c2ccc(C(=O)Cc3cccc(C#N)c3)cc2)cc1C] | N-(3-cyanophenyl)-4-(N-(3,4-dimethylphenyl)sulfamoyl)benzamide |

TABLE 1-continued
| ID | Structure | Name |
|---|---|---|
| I-857 | 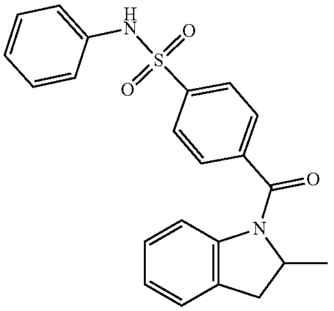 [SMILES: CC1Cc2ccccc2N1C(=O)c1ccc(S(=O)(=O)Nc2ccccc2)cc1] | 4-(2-methylindoline-1-carbonyl)-N-phenylbenzenesulfonamide |
| I-858 | 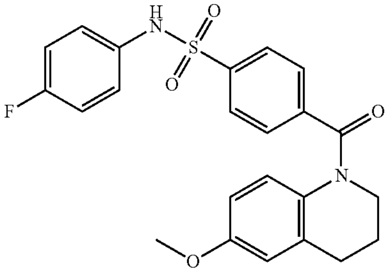 [SMILES: COc1ccc2c(c1)CCCN2C(=O)c1ccc(S(=O)(=O)Nc2ccc(F)cc2)cc1] | N-(4-fluorophenyl)-4-(6-methoxy-1,2,3,4-tetrahydroquinoline-1-carbonyl)benzenesulfonamide |
| I-859 | 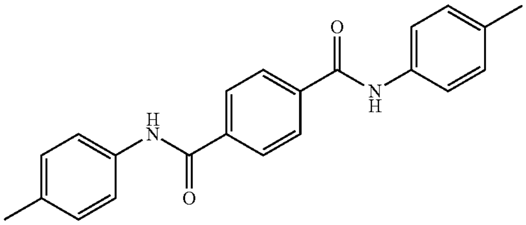 | N1,N4-di-p-tolylterephthalamide |
| I-860 | 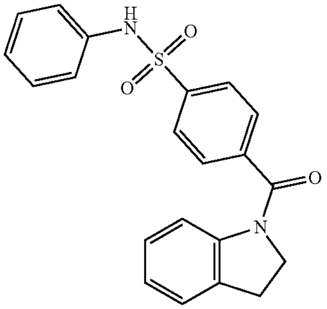 [SMILES: O=C(c1ccc(S(=O)(=O)Nc2ccccc2)cc1)N1CCc2ccccc21] | 4-(indoline-1-carbonyl)-N-phenylbenzenesulfonamide |
| I-861 | 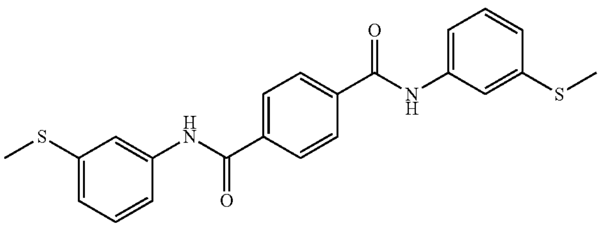 | N1,N4-bis(3-(methylthio)phenyl)terephthalamide |
| I-862 | 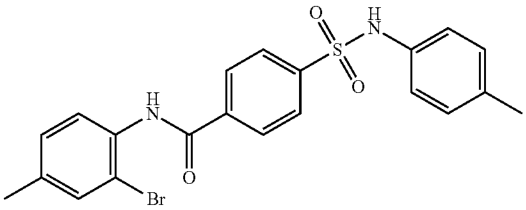 | N-(2-bromo-4-methylphenyl)-4-(N-(p-tolyl)sulfamoyl)benzamide |

TABLE 1-continued
| ID | Structure | Name |
|---|---|---|
| I-863 | 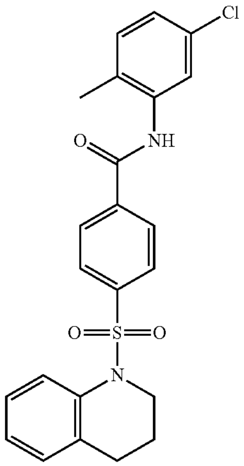 [SMILES: Cc1ccc(Cl)cc1NC(=O)c1ccc(S(=O)(=O)N2CCCc3ccccc32)cc1] | N-(5-chloro-2-methylphenyl)-4-((3,4-dihydroquinolin-1(2H)-yl)sulfonyl)benzamide |
| I-864 | 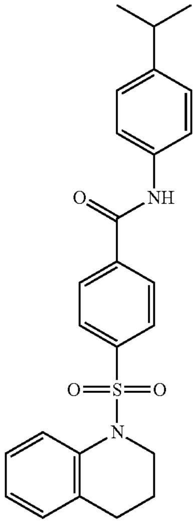 [SMILES: CC(C)c1ccc(NC(=O)c2ccc(S(=O)(=O)N3CCCc4ccccc43)cc2)cc1] | 4-((3,4-dihydroquinolin-1(2H)-yl)sulfonyl)-N-(4-isopropylphenyl)benzamide |
| I-865 | 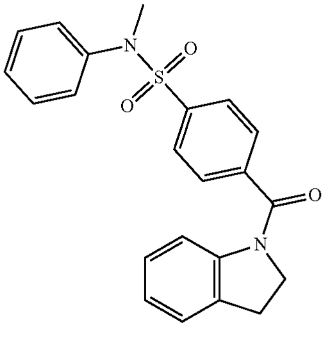 [SMILES: CN(c1ccccc1)S(=O)(=O)c1ccc(C(=O)N2CCc3ccccc32)cc1] | 4-(indoline-1-carbonyl)-N-methyl-N-phenylbenzenesulfonamide |

TABLE 1-continued
| ID | Structure | Name |
| --- | --- | --- |
| I-866 | 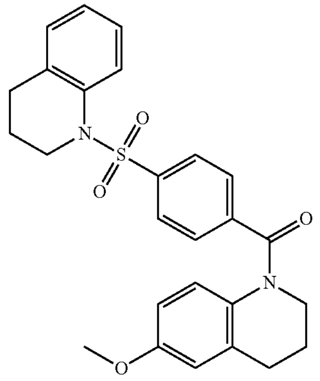 [SMILES: COc1ccc2c(c1)CCCN2C(=O)c1ccc(S(=O)(=O)N2CCCc3ccccc32)cc1] | (4-((3,4-dihydroquinolin-1(2H)-yl)sulfonyl)phenyl)(6-methoxy-3,4-dihydroquinolin-1(2H)-yl)methanone |
| I-867 | 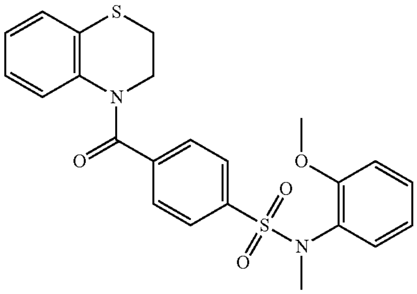 [SMILES: COc1ccccc1N(C)S(=O)(=O)c1ccc(C(=O)N2CCSc3ccccc32)cc1] | 4-(3,4-dihydro-2H-benzo[b][1,4]thiazine-4-carbonyl)-N-(2-methoxyphenyl)-N-methylbenzenesulfonamide |
| I-868 | 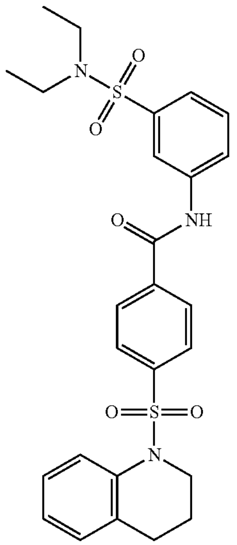 [SMILES: CCN(CC)S(=O)(=O)c1cccc(NC(=O)c2ccc(S(=O)(=O)N3CCCc4ccccc43)cc2)c1] | N-(3-(N,N-diethylsulfamoyl)phenyl)-4-((3,4-dihydroquinolin-1(2H)-yl)sulfonyl)benzamide |
| I-869 | 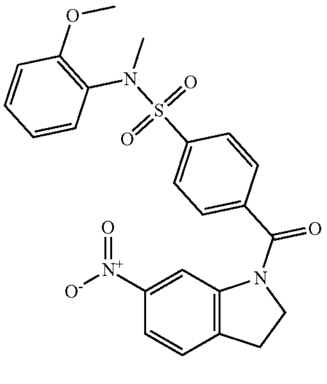 [SMILES: COc1ccccc1N(C)S(=O)(=O)c1ccc(C(=O)N2CCc3ccc([N+](=O)[O-])cc32)cc1] | N-(2-methoxyphenyl)-N-methyl-4-(6-nitroindoline-1-carbonyl)benzenesulfonamide |

TABLE 1-continued

| ID | Structure | Name |
| --- | --- | --- |
| I-870 | 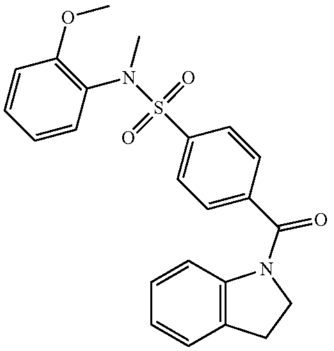 [SMILES: COc1ccccc1N(C)S(=O)(=O)c1ccc(C(=O)N2CCc3ccccc32)cc1] | 4-(indoline-1-carbonyl)-N-(2-methoxyphenyl)-N-methylbenzenesulfonamide |
| I-871 | 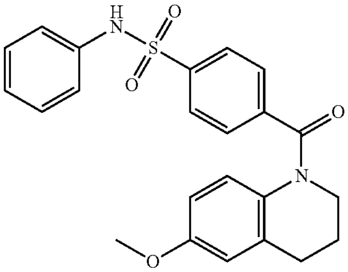 [SMILES: COc1ccc2c(c1)CCCN2C(=O)c1ccc(S(=O)(=O)Nc2ccccc2)cc1] | 4-(6-methoxy-1,2,3,4-tetrahydroquinoline-1-carbonyl)-N-phenylbenzenesulfonamide |
| I-872 | 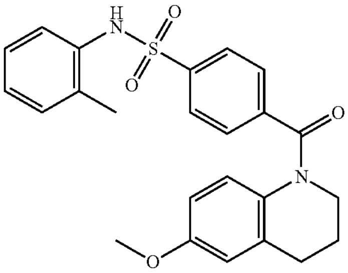 [SMILES: COc1ccc2c(c1)CCCN2C(=O)c1ccc(S(=O)(=O)Nc2ccccc2C)cc1] | 4-(6-methoxy-1,2,3,4-tetrahydroquinoline-1-carbonyl)-N-(o-tolyl)benzenesulfonamide |
| I-873 | 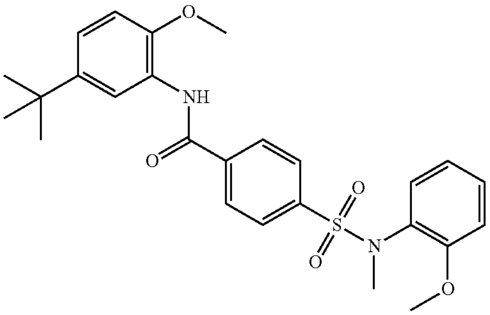 [SMILES: COc1ccc(C(C)(C)C)cc1NC(=O)c1ccc(S(=O)(=O)N(C)c2ccccc2OC)cc1] | N-(5-(tert-butyl)-2-methoxyphenyl)-4-(N-(2-methoxyphenyl)-N-methylsulfamoyl)benzamide |
| I-874 | 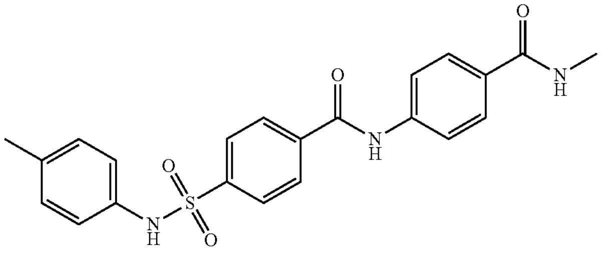 | N-methyl-4-(4-(N-(p-tolyl)sulfamoyl)benzamido)benzamide |

TABLE 1-continued
| ID | Structure | Name |
| --- | --- | --- |
| I-875 | 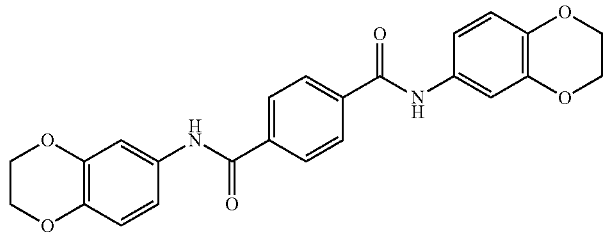 [SMILES: O=C(Nc1ccc2c(c1)OCCO2)c1ccc(C(=O)Nc2ccc3c(c2)OCCO3)cc1] | N1,N4-bis(2,3-dihydrobenzo[b][1,4]dioxin-6-yl)terephthalamide |
| I-876 | 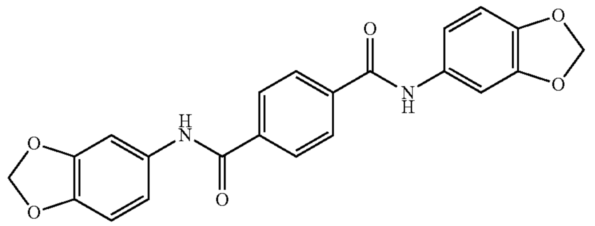 [SMILES: O=C(Nc1ccc2c(c1)OCO2)c1ccc(C(=O)Nc2ccc3c(c2)OCO3)cc1] | N1,N4-bis(benzo[d][1,3]dioxol-5-yl)terephthalamide |
| I-877 | 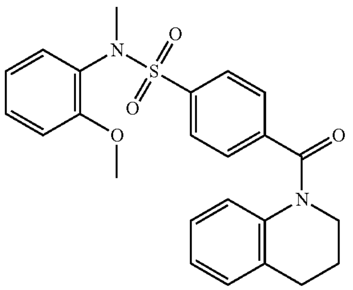 [SMILES: COc1ccccc1N(C)S(=O)(=O)c1ccc(C(=O)N2CCCc3ccccc32)cc1] | N-(2-methoxyphenyl)-N-methyl-4-(1,2,3,4-tetrahydroquinoline-1-carbonyl)benzenesulfonamide |
| I-878 | 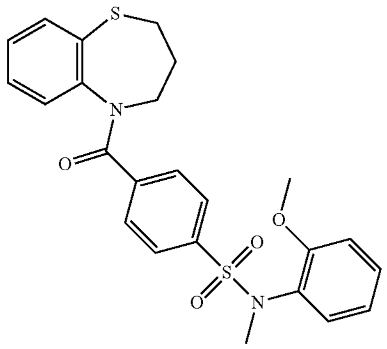 [SMILES: COc1ccccc1N(C)S(=O)(=O)c1ccc(C(=O)N2CCCSc3ccccc32)cc1] | N-(2-methoxyphenyl)-N-methyl-4-(2,3,4,5-tetrahydrobenzo[b][1,4]thiazepine-5-carbonyl)benzenesulfonamide |
| I-879 | 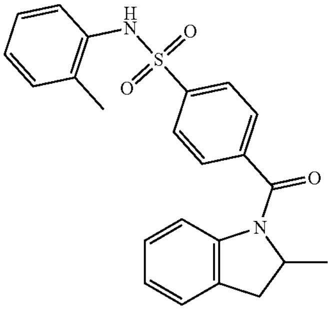 [SMILES: Cc1ccccc1NS(=O)(=O)c1ccc(C(=O)N2c3ccccc3CC2C)cc1] | 4-(2-methylindoline-1-carbonyl)-N-(o-tolyl)benzenesulfonamide |

TABLE 1-continued
| ID | Structure | Name |
| --- | --- | --- |
| I-880 | 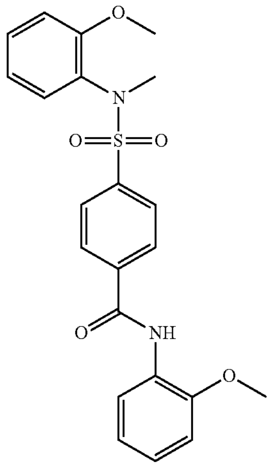 [SMILES: COc1ccccc1NC(=O)c1ccc(S(=O)(=O)N(C)c2ccccc2OC)cc1] | N-(2-methoxyphenyl)-4-(N-(2-methoxyphenyl)-N-methylsulfamoyl)benzamide |
| I-881 | 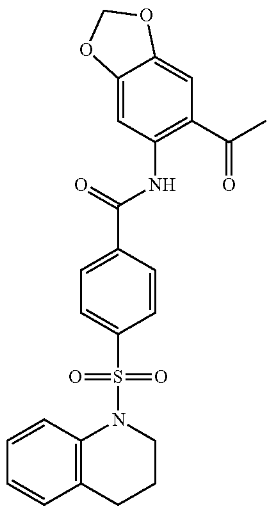 [SMILES: CC(=O)c1cc2c(cc1NC(=O)c1ccc(S(=O)(=O)N3CCCc4ccccc43)cc1)OCO2] | N-(6-acetylbenzo[d][1,3]dioxol-5-yl)-4-((3,4-dihydroquinolin-1(2H)-yl)sulfonyl)benzamide |
| I-882 | 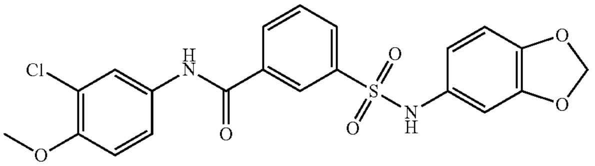 [SMILES: COc1ccc(NC(=O)c2cccc(S(=O)(=O)Nc3ccc4c(c3)OCO4)c2)cc1Cl] | 3-(N-(benzo[d][1,3]dioxol-5-yl)sulfamoyl)-N-(3-chloro-4-methoxyphenyl)benzamide |
| I-883 | 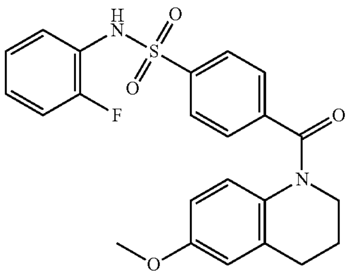 [SMILES: COc1ccc2c(c1)CCCN2C(=O)c1ccc(S(=O)(=O)Nc2ccccc2F)cc1] | N-(2-fluorophenyl)-4-(6-methoxy-1,2,3,4-tetrahydroquinoline-1-carbonyl)benzenesulfonamide |

TABLE 1-continued
| ID | Structure | Name |
|---|---|---|
| I-884 | 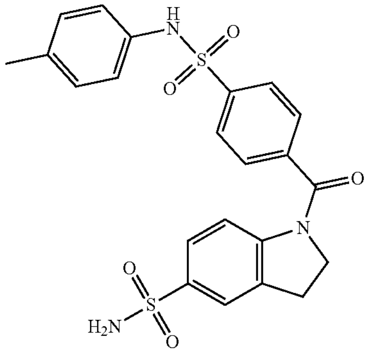 [SMILES: Cc1ccc(NS(=O)(=O)c2ccc(C(=O)N3CCc4cc(S(N)(=O)=O)ccc43)cc2)cc1] | 1-(4-(N-(p-tolyl)sulfamoyl)benzoyl)indoline-5-sulfonamide |
| I-885 | 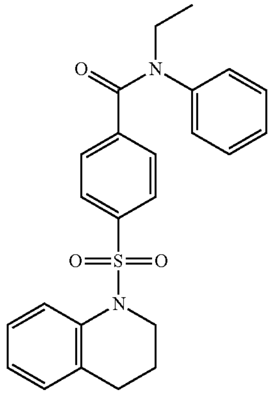 [SMILES: CCN(C(=O)c1ccc(S(=O)(=O)N2CCCc3ccccc32)cc1)c1ccccc1] | 4-((3,4-dihydroquinolin-1(2H)-yl)sulfonyl)-N-ethyl-N-phenylbenzamide |
| I-886 | 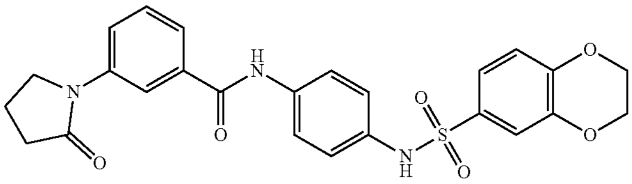 [SMILES: O=C(Nc1ccc(NS(=O)(=O)c2ccc3c(c2)OCCO3)cc1)c1cccc(N2CCCC2=O)c1] | N-(4-((2,3-dihydrobenzo[b][1,4]dioxine)-6-sulfonamido)phenyl)-3-(2-oxopyrrolidin-1-yl)benzamide |
| I-887 | 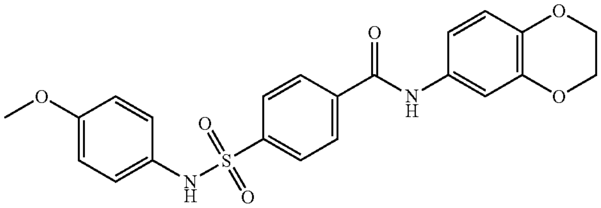 [SMILES: COc1ccc(NS(=O)(=O)c2ccc(C(=O)Nc3ccc4c(c3)OCCO4)cc2)cc1] | N-(2,3-dihydrobenzo[b][1,4]dioxin-6-yl)-4-(N-(4-methoxyphenyl)sulfamoyl)benzamide |
| I-888 | 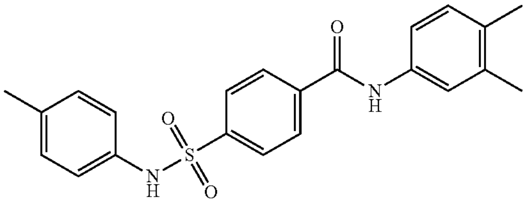 | N-(3,4-dimethylphenyl)-4-(N-(p-tolyl)sulfamoyl)benzamide |

TABLE 1-continued
| ID | Structure | Name |
|---|---|---|
| I-889 | 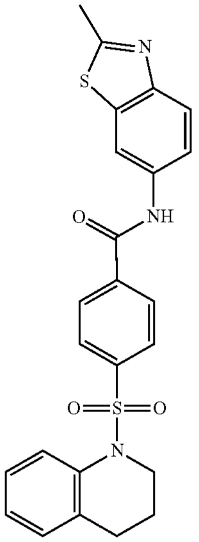 [SMILES: Cc1nc2ccc(NC(=O)c3ccc(S(=O)(=O)N4CCCc5ccccc54)cc3)cc2s1] | 4-((3,4-dihydroquinolin-1(2H)-yl)sulfonyl)-N-(2-methylbenzo[d]thiazol-6-yl)benzamide |
| I-890 | 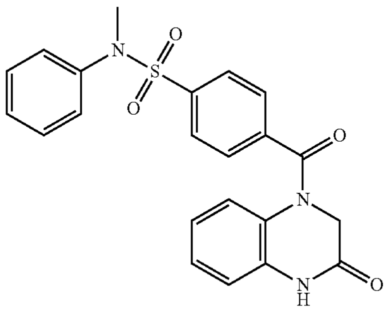 [SMILES: CN(c1ccccc1)S(=O)(=O)c1ccc(C(=O)N2CC(=O)Nc3ccccc32)cc1] | N-methyl-4-(3-oxo-1,2,3,4-tetrahydroquinoxaline-1-carbonyl)-N-phenylbenzenesulfonamide |
| I-891 | 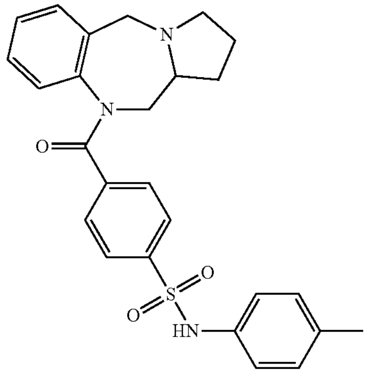 [SMILES: Cc1ccc(NS(=O)(=O)c2ccc(C(=O)N3CC4CCCN4Cc4ccccc43)cc2)cc1] | 4-(2,3,5,10,11,11a-hexahydro-1H-benzo[e]pyrrolo[1,2-a][1,4]diazepine-10-carbonyl)-N-(p-tolyl)benzenesulfonamide |
| I-892 | 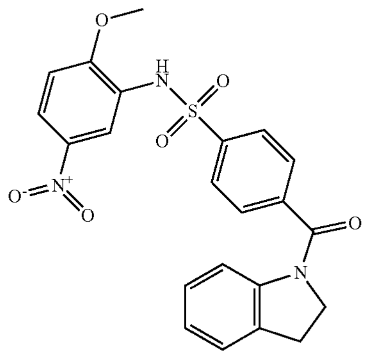 | 4-(indoline-1-carbonyl)-N-(2-methoxy-5-nitrophenyl)benzenesulfonamide |

TABLE 1-continued
| ID | Structure | Name |
| --- | --- | --- |
| I-893 | 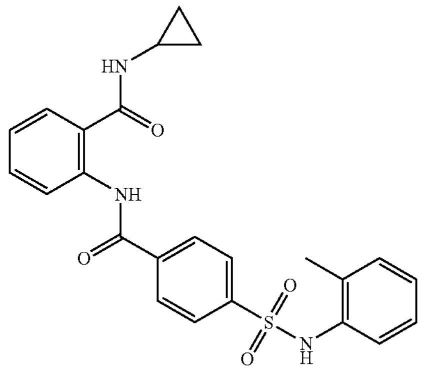 [SMILES: Cc1ccccc1NS(=O)(=O)c1ccc(C(=O)Nc2ccccc2C(=O)NC2CC2)cc1] | N-cyclopropyl-2-(4-(N-(o-tolyl)sulfamoyl)benzamido)benzamide |
| I-894 | 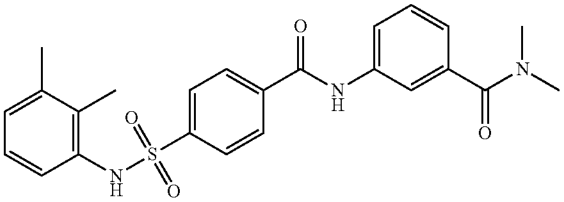 [SMILES: Cc1cccc(NS(=O)(=O)c2ccc(C(=O)Nc3cccc(C(=O)N(C)C)c3)cc2)c1C] | 3-(4-(N-(2,3-dimethylphenyl)sulfamoyl)benzamido)-N,N-dimethylbenzamide |
| I-895 | 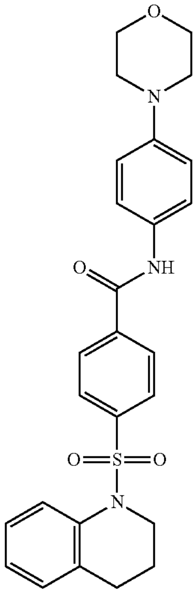 [SMILES: O=C(Nc1ccc(N2CCOCC2)cc1)c1ccc(S(=O)(=O)N2CCCc3ccccc32)cc1] | 4-((3,4-dihydroquinolin-1(2H)-yl)sulfonyl)-N-(4-morpholinophenyl)benzamide |

TABLE 1-continued

| ID | Structure | Name |
|---|---|---|
| I-896 | 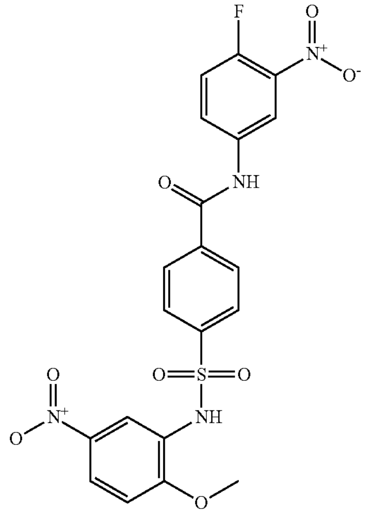 | N-(4-fluoro-3-nitrophenyl)-4-(N-(2-methoxy-5-nitrophenyl)sulfamoyl)benzamide |
| I-897 | 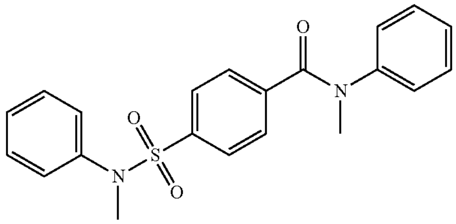 [SMILES: CN(C(=O)c1ccc(S(=O)(=O)N(C)c2ccccc2)cc1)c1ccccc1] | N-methyl-4-(N-methyl-N-phenylsulfamoyl)-N-phenylbenzamide |
| I-898 | 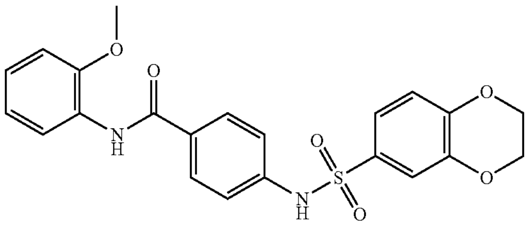 [SMILES: COc1ccccc1NC(=O)c1ccc(NS(=O)(=O)c2ccc3c(c2)OCCO3)cc1] | 4-((2,3-dihydrobenzo[b][1,4]dioxine)-6-sulfonamido)-N-(2-methoxyphenyl)benzamide |
| I-899 | 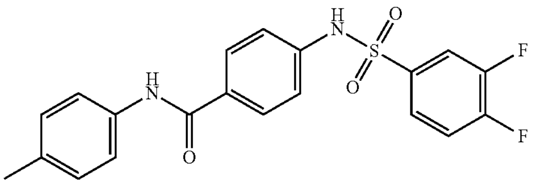 [SMILES: Cc1ccc(NC(=O)c2ccc(NS(=O)(=O)c3ccc(F)c(F)c3)cc2)cc1] | 4-((3,4-difluorophenyl)sulfonamido)-N-(p-tolyl)benzamide |
| I-900 | 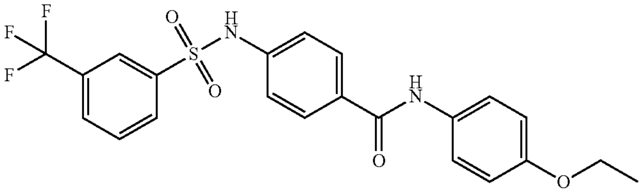 [SMILES: CCOc1ccc(NC(=O)c2ccc(NS(=O)(=O)c3cccc(C(F)(F)F)c3)cc2)cc1] | N-(4-ethoxyphenyl)-4-((3-(trifluoromethyl)phenyl)sulfonamido)benzamide |
| I-901 | 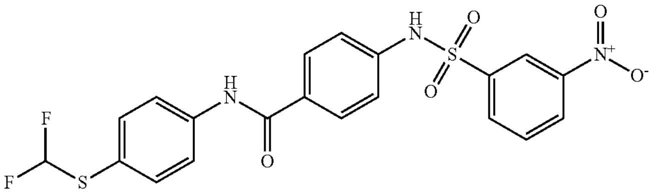 [SMILES: O=C(Nc1ccc(SC(F)F)cc1)c1ccc(NS(=O)(=O)c2cccc([N+](=O)[O-])c2)cc1] | N-(4-((difluoromethyl)thio)phenyl)-4-((3-nitrophenyl)sulfonamido)benzamide |

TABLE 1-continued

| ID | Structure | Name |
|---|---|---|
| I-902 | 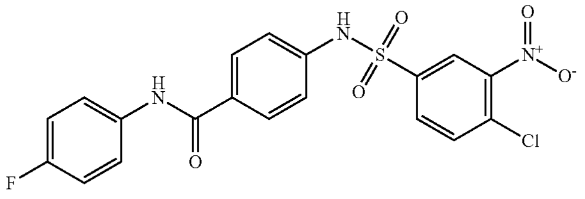 [SMILES: O=C(Nc1ccc(F)cc1)c1ccc(NS(=O)(=O)c2ccc(Cl)c([N+](=O)[O-])c2)cc1] | 4-((4-chloro-3-nitrophenyl)sulfonamido)-N-(4-fluorophenyl)benzamide |
| I-903 | 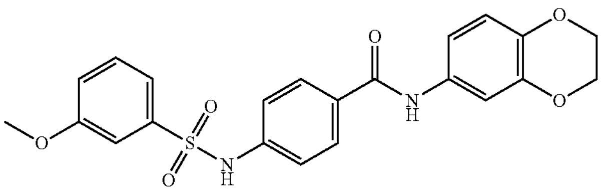 [SMILES: COc1cccc(S(=O)(=O)Nc2ccc(C(=O)Nc3ccc4c(c3)OCCO4)cc2)c1] | N-(2,3-dihydrobenzo[b][1,4]dioxin-6-yl)-4-((3-methoxyphenyl)sulfonamido)benzamide |
| I-904 | 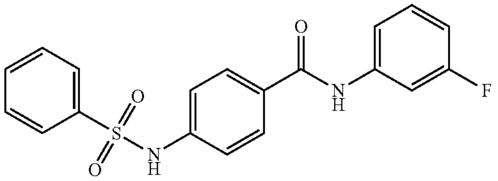 [SMILES: O=C(Nc1cccc(F)c1)c1ccc(NS(=O)(=O)c2ccccc2)cc1] | N-(3-fluorophenyl)-4-(phenylsulfonamido)benzamide |
| I-905 | 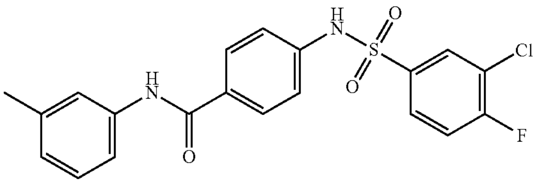 [SMILES: Cc1cccc(NC(=O)c2ccc(NS(=O)(=O)c3ccc(F)c(Cl)c3)cc2)c1] | 4-((3-chloro-4-fluorophenyl)sulfonamido)-N-(m-tolyl)benzamide |
| I-906 | 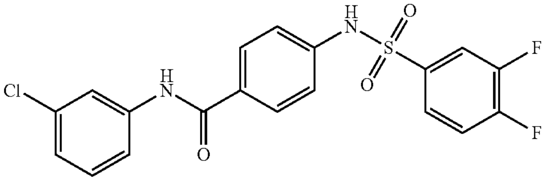 [SMILES: O=C(Nc1cccc(Cl)c1)c1ccc(NS(=O)(=O)c2ccc(F)c(F)c2)cc1] | N-(3-chlorophenyl)-4-((3,4-difluorophenyl)sulfonamido)benzamide |
| I-907 | 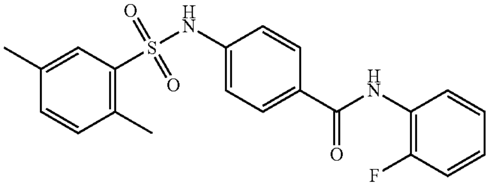 [SMILES: Cc1ccc(C)c(S(=O)(=O)Nc2ccc(C(=O)Nc3ccccc3F)cc2)c1] | 4-((2,5-dimethylphenyl)sulfonamido)-N-(2-fluorophenyl)benzamide |
| I-908 | 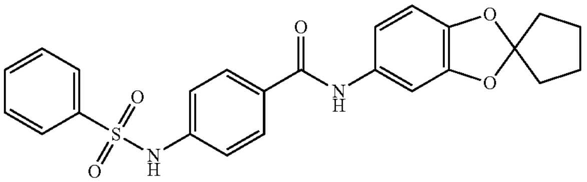 [SMILES: O=C(Nc1ccc2c(c1)OC1(CCCC1)O2)c1ccc(NS(=O)(=O)c2ccccc2)cc1] | 4-(phenylsulfonamido)-N-(spiro[benzo[d][1,3]dioxole-2,1'-cyclopentan]-5-yl)benzamide |

TABLE 1-continued

| ID | Structure | Name |
|---|---|---|
| I-909 | 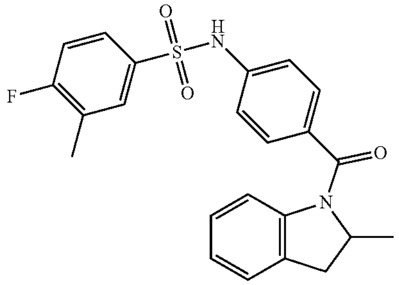 [SMILES: Cc1cc(S(=O)(=O)Nc2ccc(C(=O)N3c4ccccc4CC3C)cc2)ccc1F] | 4-fluoro-3-methyl-N-(4-(2-methylindoline-1-carbonyl)phenyl)benzenesulfonamide |
| I-910 | 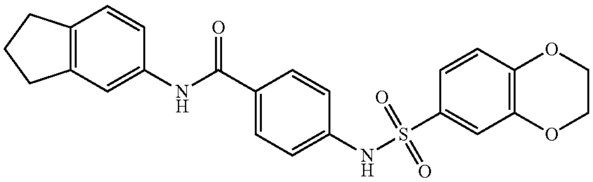 [SMILES: O=C(Nc1ccc2c(c1)CCC2)c1ccc(NS(=O)(=O)c2ccc3c(c2)OCCO3)cc1] | N-(2,3-dihydro-1H-inden-5-yl)-4-((2,3-dihydrobenzo[b][1,4]dioxine)-6-sulfonamido)benzamide |
| I-911 | 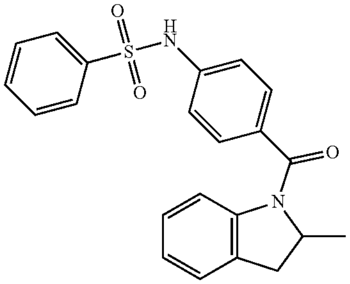 [SMILES: CC1Cc2ccccc2N1C(=O)c1ccc(NS(=O)(=O)c2ccccc2)cc1] | N-(4-(2-methylindoline-1-carbonyl)phenyl)benzenesulfonamide |
| I-912 | 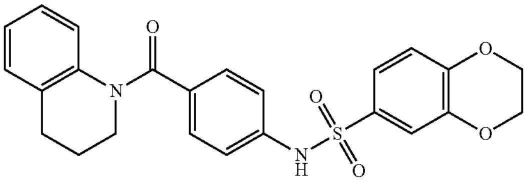 [SMILES: O=C(c1ccc(NS(=O)(=O)c2ccc3c(c2)OCCO3)cc1)N1CCCc2ccccc21] | N-(4-(1,2,3,4-tetrahydroquinoline-1-carbonyl)phenyl)-2,3-dihydrobenzo[b][1,4]dioxine-6-sulfonamide |
| I-913 | 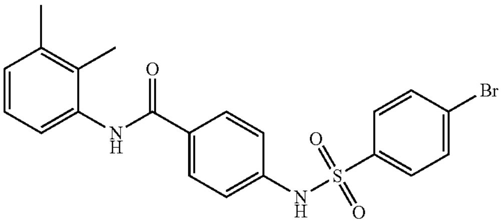 [SMILES: Cc1cccc(NC(=O)c2ccc(NS(=O)(=O)c3ccc(Br)cc3)cc2)c1C] | 4-((4-bromophenyl)sulfonamido)-N-(2,3-dimethylphenyl)benzamide |
| I-914 | 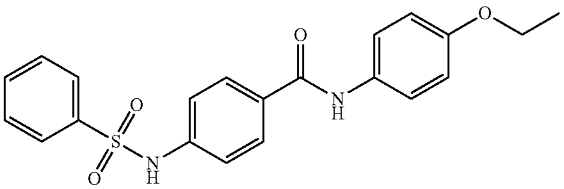 [SMILES: CCOc1ccc(NC(=O)c2ccc(NS(=O)(=O)c3ccccc3)cc2)cc1] | N-(4-ethoxyphenyl)-4-(phenylsulfonamido)benzamide |

TABLE 1-continued

| ID | Structure | Name |
| --- | --- | --- |
| I-915 | 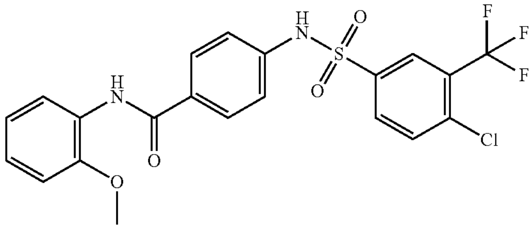 [SMILES: COc1ccccc1NC(=O)c1ccc(NS(=O)(=O)c2ccc(Cl)c(C(F)(F)F)c2)cc1] | 4-((4-chloro-3-(trifluoromethyl)phenyl)sulfonamido)-N-(2-methoxyphenyl)benzamide |
| I-916 | 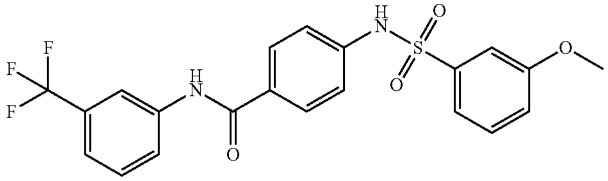 [SMILES: COc1cccc(S(=O)(=O)Nc2ccc(C(=O)Nc3cccc(C(F)(F)F)c3)cc2)c1] | 4-((3-methoxyphenyl)sulfonamido)-N-(3-(trifluoromethyl)phenyl)benzamide |
| I-917 | 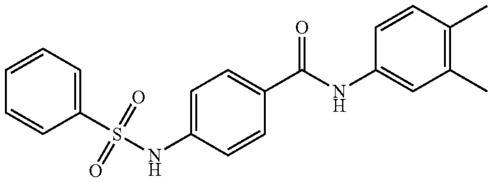 [SMILES: Cc1ccc(NC(=O)c2ccc(NS(=O)(=O)c3ccccc3)cc2)cc1C] | N-(3,4-dimethylphenyl)-4-(phenylsulfonamido)benzamide |
| I-918 | 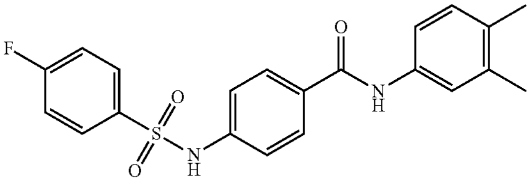 [SMILES: Cc1ccc(NC(=O)c2ccc(NS(=O)(=O)c3ccc(F)cc3)cc2)cc1C] | N-(3,4-dimethylphenyl)-4-((4-fluorophenyl)sulfonamido)benzamide |
| I-919 | 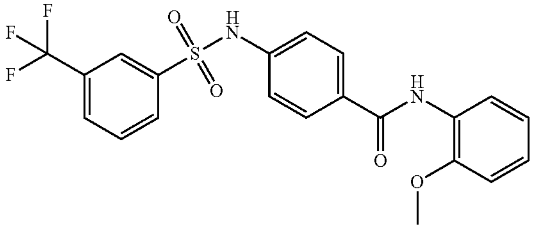 [SMILES: COc1ccccc1NC(=O)c1ccc(NS(=O)(=O)c2cccc(C(F)(F)F)c2)cc1] | N-(2-methoxyphenyl)-4-((3-(trifluoromethyl)phenyl)sulfonamido) benzamide |
| I-920 | 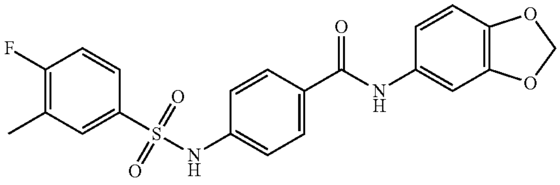 [SMILES: Cc1cc(S(=O)(=O)Nc2ccc(C(=O)Nc3ccc4c(c3)OCO4)cc2)ccc1F] | N-(benzo[d][1,3]dioxol-5-yl)-4-((4-fluoro-3-methylphenyl)sulfonamido)benzamide |
| I-921 | 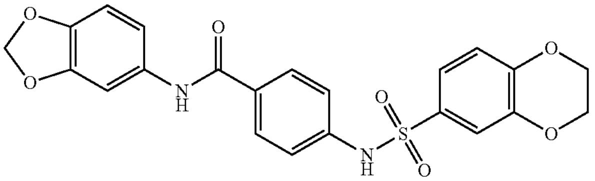 [SMILES: O=C(Nc1ccc2c(c1)OCO2)c1ccc(NS(=O)(=O)c2ccc3c(c2)OCCO3)cc1] | N-(benzo[d][1,3]dioxol-5-yl)-4-((2,3-dihydrobenzo[b][1,4]dioxine)-6-sulfonamido)benzamide |

TABLE 1-continued

| ID | Structure | Name |
| --- | --- | --- |
| I-922 | 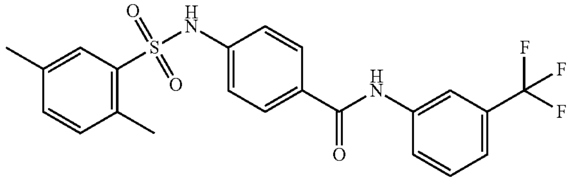 [SMILES: Cc1ccc(C)c(S(=O)(=O)Nc2ccc(C(=O)Nc3cccc(C(F)(F)F)c3)cc2)c1] | 4-((2,5-dimethylphenyl)sulfonamido)-N-(3-(trifluoromethyl)phenyl)benzamide |
| I-923 | 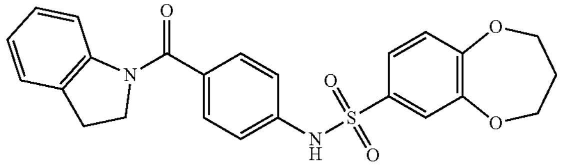 [SMILES: O=C(c1ccc(NS(=O)(=O)c2ccc3c(c2)OCCCO3)cc1)N1CCc2ccccc21] | N-(4-(indoline-1-carbonyl)phenyl)-3,4-dihydro-2H-benzo[b][1,4]dioxepine-7-sulfonamide |
| I-924 | 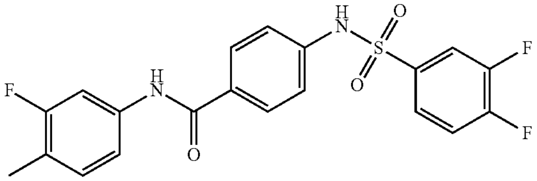 [SMILES: Cc1ccc(NC(=O)c2ccc(NS(=O)(=O)c3ccc(F)c(F)c3)cc2)cc1F] | 4-((3,4-difluorophenyl)sulfonamido)-N-(3-fluoro-4-methylphenyl)benzamide |
| I-925 | 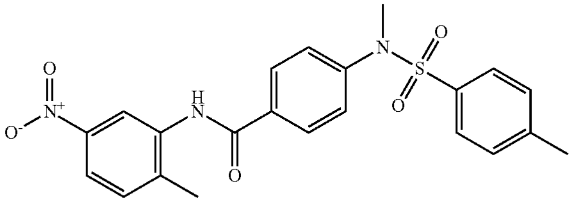 [SMILES: Cc1ccc(S(=O)(=O)N(C)c2ccc(C(=O)Nc3cc([N+](=O)[O-])ccc3C)cc2)cc1] | 4-((N,4-dimethylphenyl)sulfonamido)-N-(2-methyl-5-nitrophenyl)benzamide |
| I-926 | 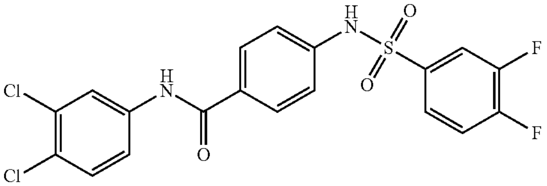 [SMILES: O=C(Nc1ccc(Cl)c(Cl)c1)c1ccc(NS(=O)(=O)c2ccc(F)c(F)c2)cc1] | N-(3,4-dichlorophenyl)-4-((3,4-difluorophenyl)sulfonamido)benzamide |
| I-927 | 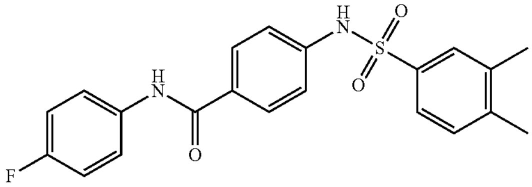 [SMILES: Cc1ccc(S(=O)(=O)Nc2ccc(C(=O)Nc3ccc(F)cc3)cc2)cc1C] | 4-((3,4-dimethylphenyl)sulfonamido)-N-(4-fluorophenyl)benzamide |
| I-928 | 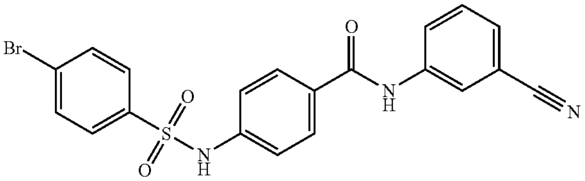 [SMILES: N#Cc1cccc(NC(=O)c2ccc(NS(=O)(=O)c3ccc(Br)cc3)cc2)c1] | 4-((4-bromophenyl)sulfonamido)-N-(3-cyanophenyl)benzamide |
| I-929 | 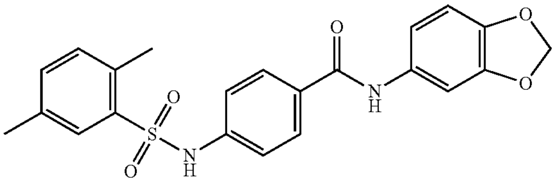 [SMILES: Cc1ccc(C)c(S(=O)(=O)Nc2ccc(C(=O)Nc3ccc4c(c3)OCO4)cc2)c1] | N-(benzo[d][1,3]dioxol-5-yl)-4-((2,5-dimethylphenyl)sulfonamido)benzamide |

TABLE 1-continued

| ID | Structure | Name |
|---|---|---|
| I-930 | 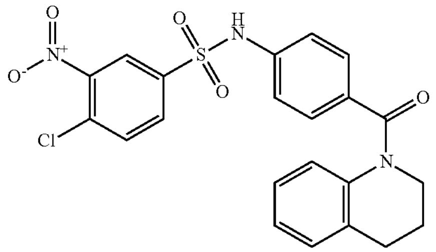 [SMILES: O=C(c1ccc(NS(=O)(=O)c2ccc(Cl)c([N+](=O)[O-])c2)cc1)N1CCCc2ccccc21] | 4-chloro-3-nitro-N-(4-(1,2,3,4-tetrahydroquinoline-1-carbonyl)phenyl)benzenesulfonamide |
| I-931 | 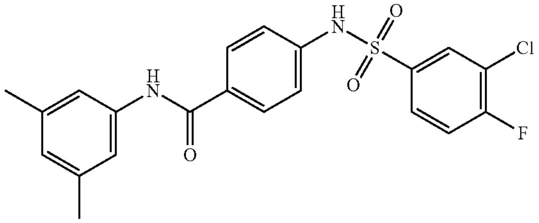 [SMILES: Cc1cc(C)cc(NC(=O)c2ccc(NS(=O)(=O)c3ccc(F)c(Cl)c3)cc2)c1] | 4-((3-chloro-4-fluorophenyl)sulfonamido)-N-(3,5-dimethylphenyl)benzamide |
| I-932 | 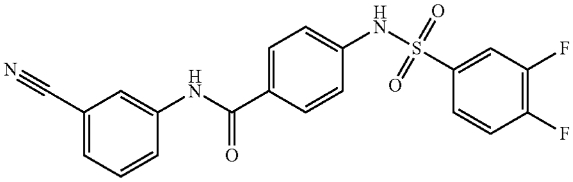 [SMILES: N#Cc1cccc(NC(=O)c2ccc(NS(=O)(=O)c3ccc(F)c(F)c3)cc2)c1] | N-(3-cyanophenyl)-4-((3,4-difluorophenyl)sulfonamido)benzamide |
| I-933 | 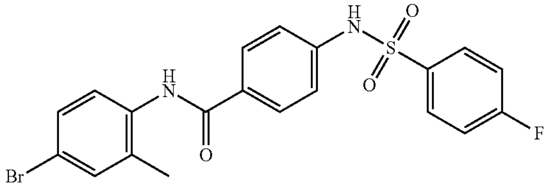 [SMILES: Cc1cc(Br)ccc1NC(=O)c1ccc(NS(=O)(=O)c2ccc(F)cc2)cc1] | N-(4-bromo-2-methylphenyl)-4-((4-fluorophenyl)sulfonamido)benzamide |
| I-934 | 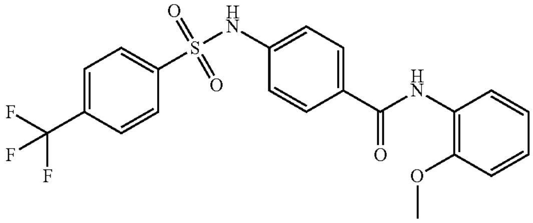 [SMILES: COc1ccccc1NC(=O)c1ccc(NS(=O)(=O)c2ccc(C(F)(F)F)cc2)cc1] | N-(2-methoxyphenyl)-4-((4-(trifluoromethyl)phenyl)sulfonamido) benzamide |
| I-935 | 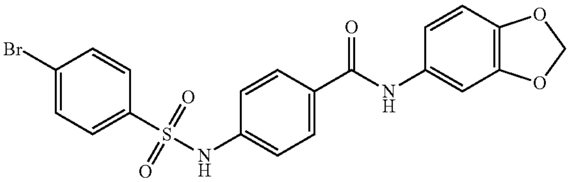 [SMILES: O=C(Nc1ccc2c(c1)OCO2)c1ccc(NS(=O)(=O)c2ccc(Br)cc2)cc1] | N-(benzo[d][1,3]dioxol-5-yl)-4-((4-bromophenyl)sulfonamido)benzamide |
| I-936 | 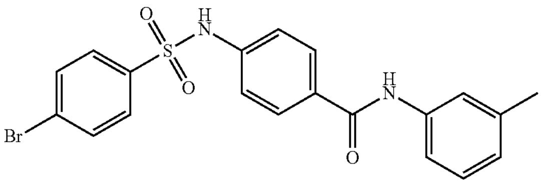 [SMILES: Cc1cccc(NC(=O)c2ccc(NS(=O)(=O)c3ccc(Br)cc3)cc2)c1] | 4-((4-bromophenyl)sulfonamido)-N-(m-tolyl)benzamide |

TABLE 1-continued

| ID | Structure | Name |
|---|---|---|
| I-937 | 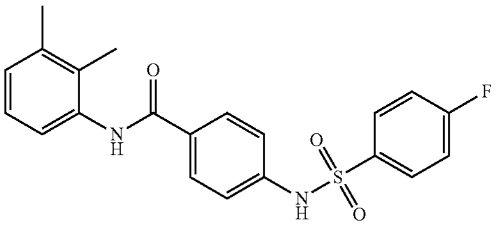 [SMILES: Cc1cccc(NC(=O)c2ccc(NS(=O)(=O)c3ccc(F)cc3)cc2)c1C] | N-(2,3-dimethylphenyl)-4-((4-fluorophenyl)sulfonamido)benzamide |
| I-938 | 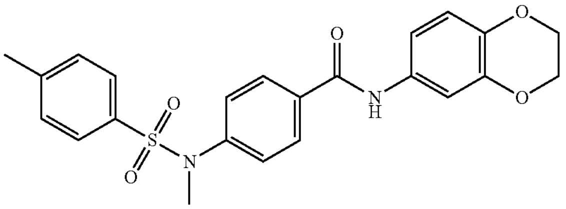 [SMILES: Cc1ccc(S(=O)(=O)N(C)c2ccc(C(=O)Nc3ccc4c(c3)OCCO4)cc2)cc1] | N-(2,3-dihydrobenzo[b][1,4]dioxin-6-yl)-4-((N,4-dimethylphenyl)sulfonamido)benzamide |
| I-939 | 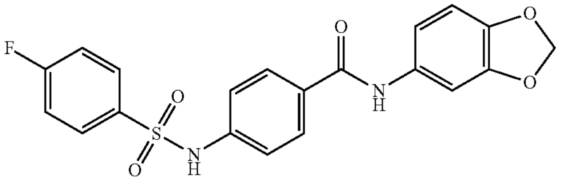 [SMILES: O=C(Nc1ccc2c(c1)OCO2)c1ccc(NS(=O)(=O)c2ccc(F)cc2)cc1] | N-(benzo[d][1,3]dioxol-5-yl)-4-((4-fluorophenyl)sulfonamido)benzamide |
| I-940 | 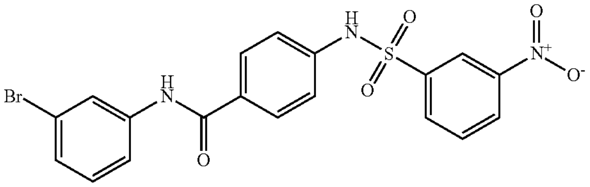 [SMILES: O=C(Nc1cccc(Br)c1)c1ccc(NS(=O)(=O)c2cccc([N+](=O)[O-])c2)cc1] | N-(3-bromophenyl)-4-((3-nitrophenyl)sulfonamido)benzamide |
| I-941 | 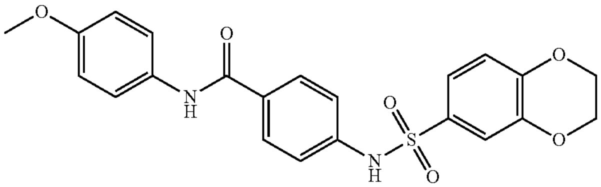 [SMILES: COc1ccc(NC(=O)c2ccc(NS(=O)(=O)c3ccc4c(c3)OCCO4)cc2)cc1] | 4-((2,3-dihydrobenzo[b][1,4]dioxine)-6-sulfonamido)-N-(4-methoxyphenyl)benzamide |
| I-942 | 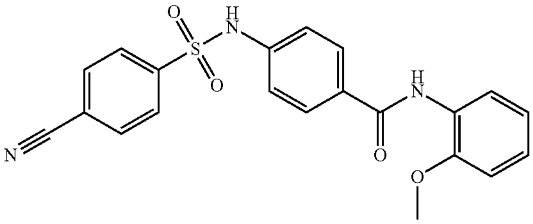 [SMILES: COc1ccccc1NC(=O)c1ccc(NS(=O)(=O)c2ccc(C#N)cc2)cc1] | 4-((4-cyanophenyl)sulfonamido)-N-(2-methoxyphenyl)benzamide |
| I-943 | 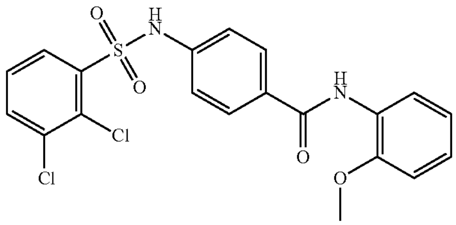 [SMILES: COc1ccccc1NC(=O)c1ccc(NS(=O)(=O)c2cccc(Cl)c2Cl)cc1] | 4-((2,3-dichlorophenyl)sulfonamido)-N-(2-methoxyphenyl)benzamide |

TABLE 1-continued

| ID | Structure | Name |
| --- | --- | --- |
| I-944 | 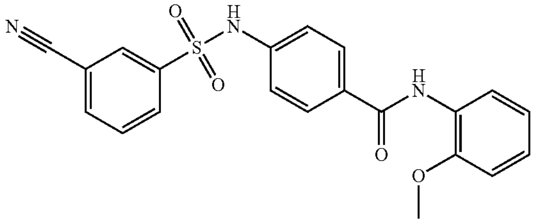 [SMILES: COc1ccccc1NC(=O)c1ccc(NS(=O)(=O)c2cccc(C#N)c2)cc1] | 4-((3-cyanophenyl)sulfonamido)-N-(2-methoxyphenyl)benzamide |
| I-945 | 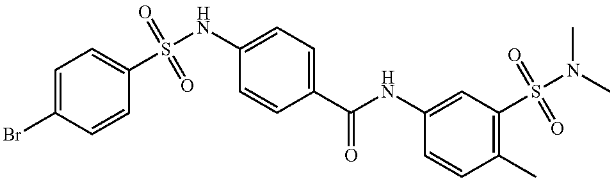 [SMILES: Cc1ccc(NC(=O)c2ccc(NS(=O)(=O)c3ccc(Br)cc3)cc2)cc1S(=O)(=O)N(C)C] | 4-((4-bromophenyl)sulfonamido)-N-(3-(N,N-dimethylsulfamoyl)-4-methylphenyl)benzamide |
| I-946 | 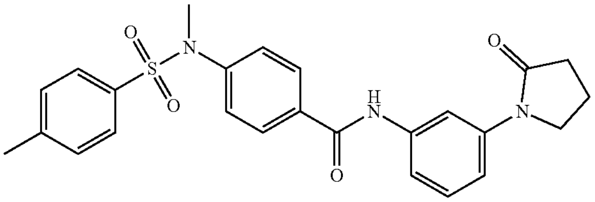 [SMILES: Cc1ccc(S(=O)(=O)N(C)c2ccc(C(=O)Nc3cccc(N4CCCC4=O)c3)cc2)cc1] | 4-((N,4-dimethylphenyl)sulfonamido)-N-(3-(2-oxopyrrolidin-1-yl)phenyl)benzamide |
| I-947 | 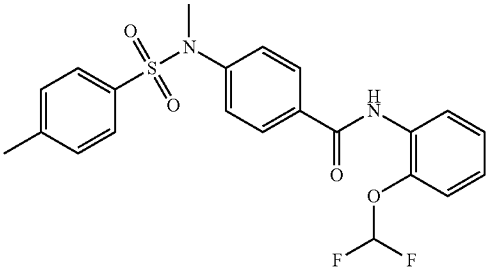 [SMILES: Cc1ccc(S(=O)(=O)N(C)c2ccc(C(=O)Nc3ccccc3OC(F)F)cc2)cc1] | N-(2-(difluoromethoxy)phenyl)-4-((N,4-dimethylphenyl)sulfonamido)benzamide |
| I-948 | 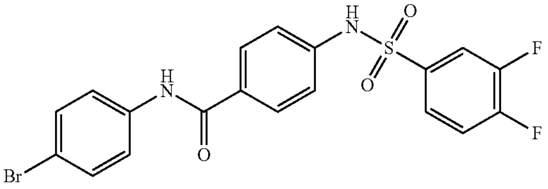 [SMILES: O=C(Nc1ccc(Br)cc1)c1ccc(NS(=O)(=O)c2ccc(F)c(F)c2)cc1] | N-(4-bromophenyl)-4-((3,4-difluorophenyl)sulfonamido)benzamide |
| I-949 | 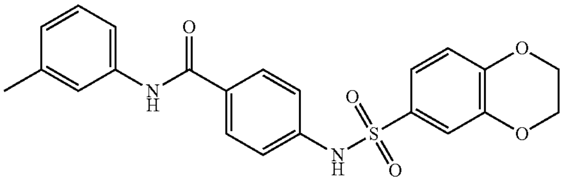 [SMILES: Cc1cccc(NC(=O)c2ccc(NS(=O)(=O)c3ccc4c(c3)OCCO4)cc2)c1] | 4-((2,3-dihydrobenzo[b][1,4]dioxine)-6-sulfonamido)-N-(m-tolyl)benzamide |
| I-950 | 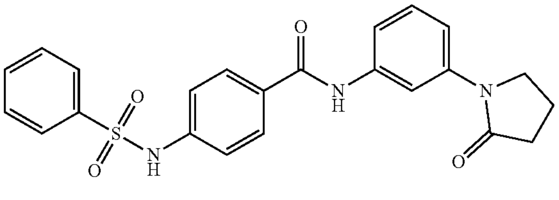 [SMILES: O=C(Nc1cccc(N2CCCC2=O)c1)c1ccc(NS(=O)(=O)c2ccccc2)cc1] | N-(3-(2-oxopyrrolidin-1-yl)phenyl)-4-(phenylsulfonamido)benzamide |

TABLE 1-continued

| ID | Structure | Name |
|---|---|---|
| I-951 | 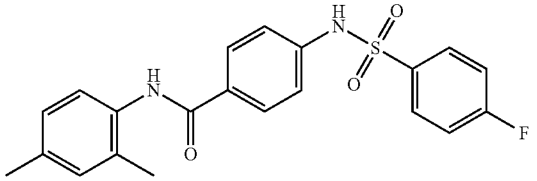 [SMILES: Cc1ccc(NC(=O)c2ccc(NS(=O)(=O)c3ccc(F)cc3)cc2)c(C)c1] | N-(2,4-dimethylphenyl)-4-((4-fluorophenyl)sulfonamido)benzamide |
| I-952 | 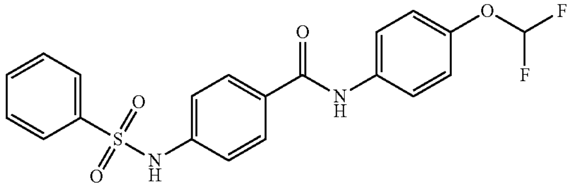 [SMILES: O=C(Nc1ccc(OC(F)F)cc1)c1ccc(NS(=O)(=O)c2ccccc2)cc1] | N-(4-(difluoromethoxy)phenyl)-4-(phenylsulfonamido)benzamide |
| I-953 | 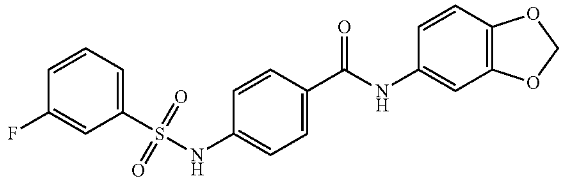 [SMILES: O=C(Nc1ccc2c(c1)OCO2)c1ccc(NS(=O)(=O)c2cccc(F)c2)cc1] | N-(benzo[d][1,3]dioxol-5-yl)-4-((3-fluorophenyl)sulfonamido)benzamide |
| I-954 | 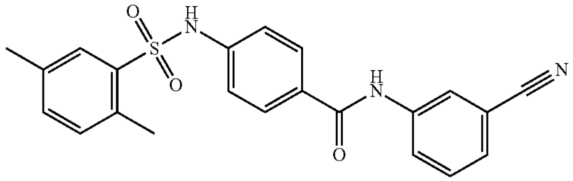 [SMILES: Cc1ccc(C)c(S(=O)(=O)Nc2ccc(C(=O)Nc3cccc(C#N)c3)cc2)c1] | N-(3-cyanophenyl)-4-((2,5-dimethylphenyl)sulfonamido)benzamide |
| I-955 | 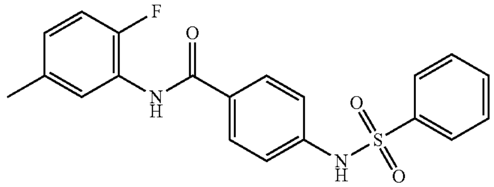 [SMILES: Cc1ccc(F)c(NC(=O)c2ccc(NS(=O)(=O)c3ccccc3)cc2)c1] | N-(2-fluoro-5-methylphenyl)-4-(phenylsulfonamido)benzamide |
| I-956 | 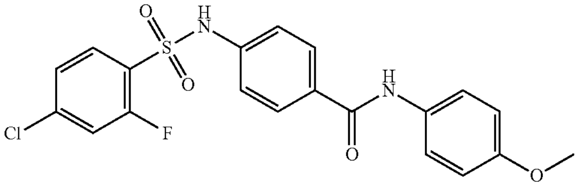 [SMILES: COc1ccc(NC(=O)c2ccc(NS(=O)(=O)c3ccc(Cl)cc3F)cc2)cc1] | 4-((4-chloro-2-fluorophenyl)sulfonamido)-N-(4-methoxyphenyl)benzamide |
| I-957 | 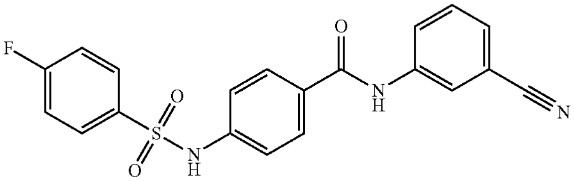 [SMILES: N#Cc1cccc(NC(=O)c2ccc(NS(=O)(=O)c3ccc(F)cc3)cc2)c1] | N-(3-cyanophenyl)-4-((4-fluorophenyl)sulfonamido)benzamide |
| I-958 | 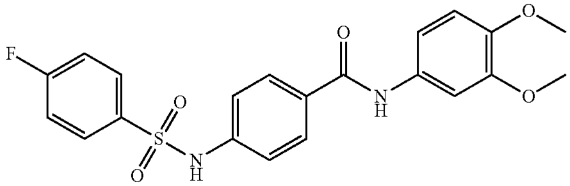 [SMILES: COc1ccc(NC(=O)c2ccc(NS(=O)(=O)c3ccc(F)cc3)cc2)cc1OC] | N-(3,4-dimethoxyphenyl)-4-((4-fluorophenyl)sulfonamido)benzamide |

TABLE 1-continued

| ID | Structure | Name |
| --- | --- | --- |
| I-959 | 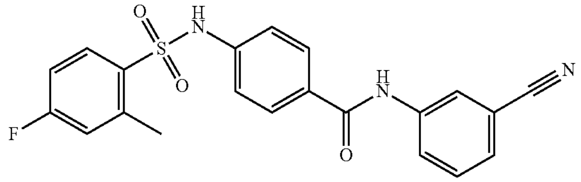 [SMILES: Cc1cc(F)ccc1S(=O)(=O)Nc1ccc(C(=O)Nc2cccc(C#N)c2)cc1] | N-(3-cyanophenyl)-4-((4-fluoro-2-methylphenyl)sulfonamido)benzamide |
| I-960 | 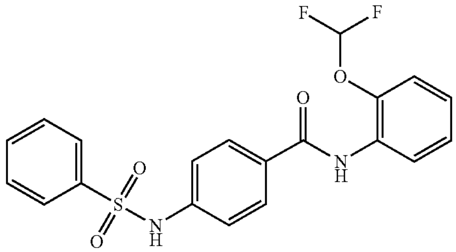 [SMILES: O=C(Nc1ccccc1OC(F)F)c1ccc(NS(=O)(=O)c2ccccc2)cc1] | N-(2-(difluoromethoxy)phenyl)-4-(phenylsulfonamido)benzamide |
| I-961 | 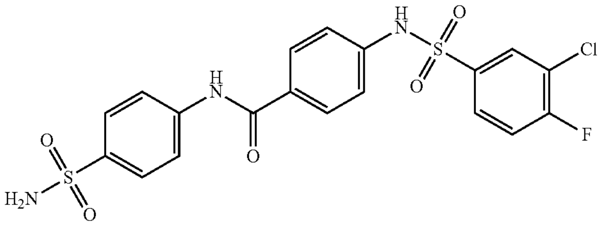 [SMILES: NS(=O)(=O)c1ccc(NC(=O)c2ccc(NS(=O)(=O)c3ccc(F)c(Cl)c3)cc2)cc1] | 4-((3-chloro-4-fluorophenyl)sulfonamido)-N-(4-sulfamoylphenyl)benzamide |
| I-962 | 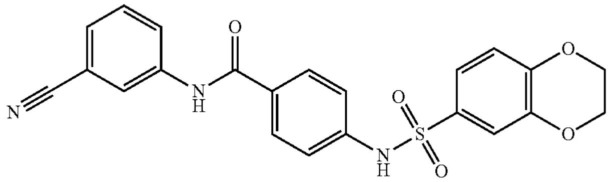 [SMILES: N#Cc1cccc(NC(=O)c2ccc(NS(=O)(=O)c3ccc4c(c3)OCCO4)cc2)c1] | N-(3-cyanophenyl)-4-((2,3-dihydrobenzo[b][1,4]dioxine)-6-sulfonamido)benzamide |
| I-963 | 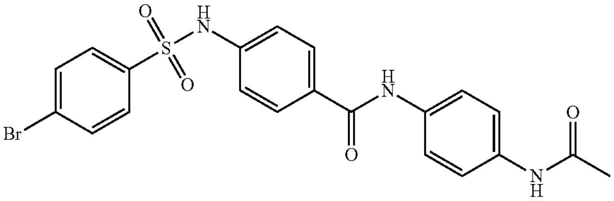 [SMILES: CC(=O)Nc1ccc(NC(=O)c2ccc(NS(=O)(=O)c3ccc(Br)cc3)cc2)cc1] | N-(4-acetamidophenyl)-4-((4-bromophenyl)sulfonamido)benzamide |
| I-964 | 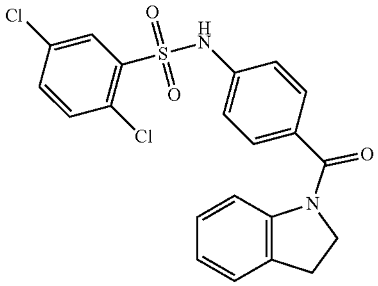 [SMILES: O=C(c1ccc(NS(=O)(=O)c2cc(Cl)ccc2Cl)cc1)N1CCc2ccccc21] | 2,5-dichloro-N-(4-(indoline-1-carbonyl)phenyl)benzenesulfonamide |

TABLE 1-continued

| ID | Structure | Name |
| --- | --- | --- |
| I-965 | 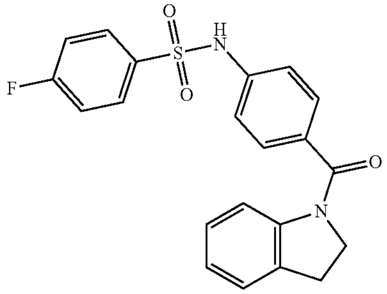 [SMILES: O=C(c1ccc(NS(=O)(=O)c2ccc(F)cc2)cc1)N1CCc2ccccc21] | 4-fluoro-N-(4-(indoline-1-carbonyl)phenyl)benzenesulfonamide |
| I-966 | 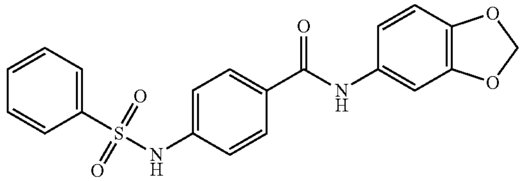 [SMILES: O=C(Nc1ccc2c(c1)OCO2)c1ccc(NS(=O)(=O)c2ccccc2)cc1] | N-(benzo[d][1,3]dioxol-5-yl)-4-(phenylsulfonamido)benzamide |
| I-967 | 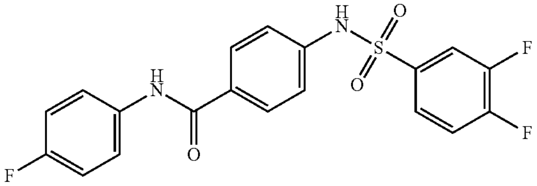 [SMILES: O=C(Nc1ccc(F)cc1)c1ccc(NS(=O)(=O)c2ccc(F)c(F)c2)cc1] | 4-((3,4-difluorophenyl)sulfonamido)-N-(4-fluorophenyl)benzamide |
| I-968 | 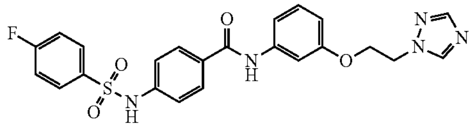 [SMILES: O=C(Nc1cccc(OCCn2cncn2)c1)c1ccc(NS(=O)(=O)c2ccc(F)cc2)cc1] | N-(3-(2-(1H-1,2,4-triazol-1-yl)ethoxy)phenyl)-4-((4-fluorophenyl)sulfonamido)benzamide |
| I-969 | 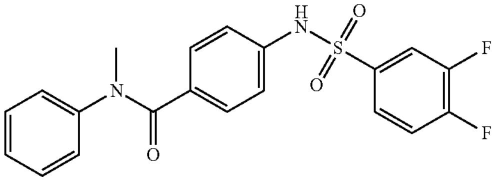 [SMILES: CN(C(=O)c1ccc(NS(=O)(=O)c2ccc(F)c(F)c2)cc1)c1ccccc1] | 4-((3,4-difluorophenyl)sulfonamido)-N-methyl-N-phenylbenzamide |
| I-970 | 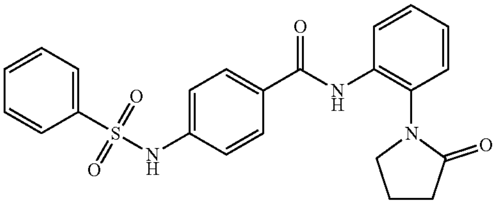 [SMILES: O=C(Nc1ccccc1N1CCCC1=O)c1ccc(NS(=O)(=O)c2ccccc2)cc1] | N-(2-(2-oxopyrrolidin-1-yl)phenyl)-4-(phenylsulfonamido)benzamide |
| I-971 | 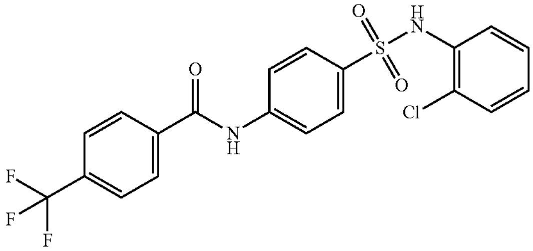 [SMILES: O=C(Nc1ccc(S(=O)(=O)Nc2ccccc2Cl)cc1)c1ccc(C(F)(F)F)cc1] | N-(4-(N-(2-chlorophenyl)sulfamoyl)phenyl)-4-(trifluoromethyl)benzamide |

TABLE 1-continued

| ID | Structure | Name |
|---|---|---|
| I-972 | 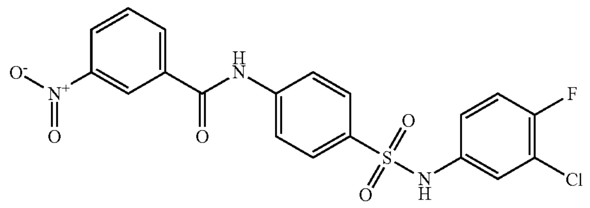 [SMILES: O=C(Nc1ccc(S(=O)(=O)Nc2ccc(F)c(Cl)c2)cc1)c1cccc([N+](=O)[O-])c1] | N-(4-(N-(3-chloro-4-fluorophenyl)sulfamoyl)phenyl)-3-nitrobenzamide |
| I-973 | 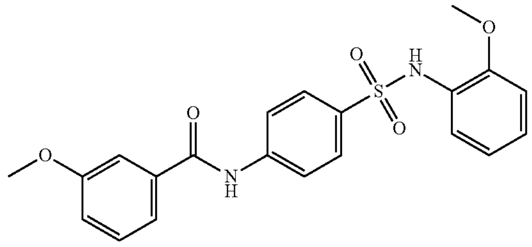 [SMILES: COc1cccc(C(=O)Nc2ccc(S(=O)(=O)Nc3ccccc3OC)cc2)c1] | 3-methoxy-N-(4-(N-(2-methoxyphenyl)sulfamoyl)phenyl)benzamide |
| I-974 | 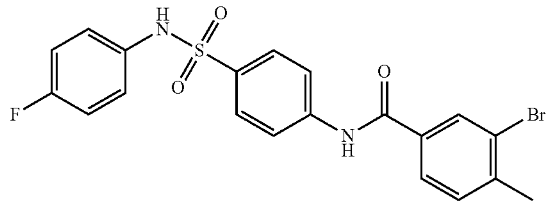 [SMILES: Cc1ccc(C(=O)Nc2ccc(S(=O)(=O)Nc3ccc(F)cc3)cc2)cc1Br] | 3-bromo-N-(4-(N-(4-fluorophenyl)sulfamoyl)phenyl)-4-methylbenzamide |
| I-975 | 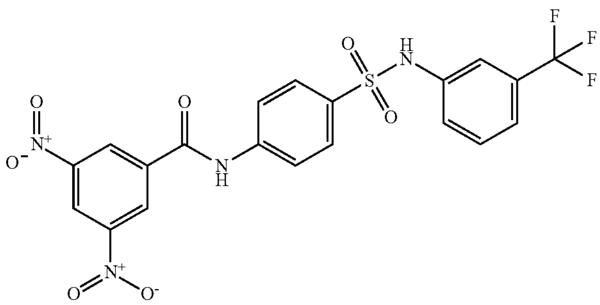 | 3,5-dinitro-N-(4-(N-(3-(trifluoromethyl)phenyl)sulfamoyl)phenyl) benzamide |
| I-976 | 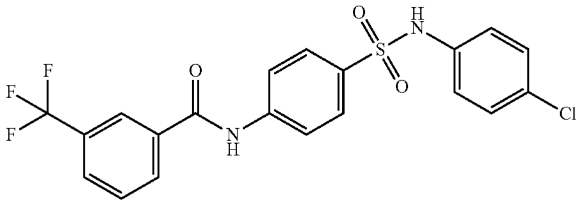 [SMILES: O=C(Nc1ccc(S(=O)(=O)Nc2ccc(Cl)cc2)cc1)c1cccc(C(F)(F)F)c1] | N-(4-(N-(4-chlorophenyl)sulfamoyl)phenyl)-3-(trifluoromethyl)benzamide |
| I-977 | 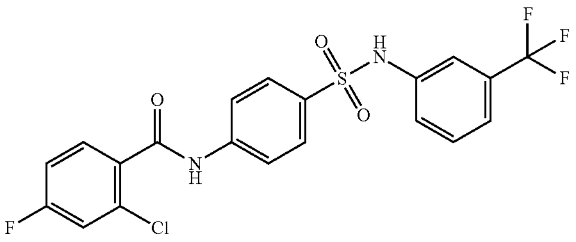 [SMILES: O=C(Nc1ccc(S(=O)(=O)Nc2cccc(C(F)(F)F)c2)cc1)c1ccc(F)cc1Cl] | 2-chloro-4-fluoro-N-(4-(N-(3-(trifluoromethyl)phenyl)sulfamoyl)phenyl) benzamide |

TABLE 1-continued

| ID | Structure | Name |
| --- | --- | --- |
| I-978 | 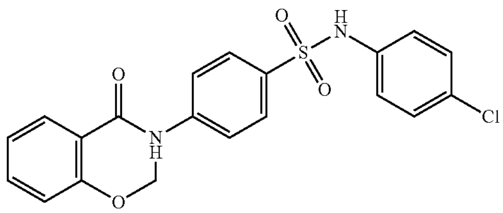 [SMILES: O=C1c2ccccc2OCN1c1ccc(S(=O)(=O)Nc2ccc(Cl)cc2)cc1] | N-(4-(N-(4-chlorophenyl)sulfamoyl)phenyl)-2-methoxybenzamide |
| I-979 | 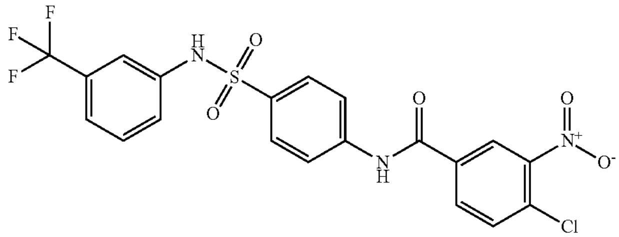 [SMILES: O=C(Nc1ccc(S(=O)(=O)Nc2cccc(C(F)(F)F)c2)cc1)c1ccc(Cl)c([N+](=O)[O-])c1] | 4-chloro-3-nitro-N-(4-(N-(3-(trifluoromethyl)phenyl)sulfamoyl)phenyl) benzamide |
| I-980 | 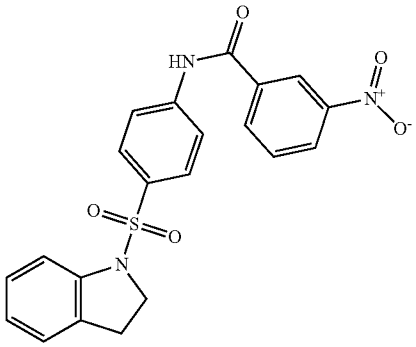 [SMILES: O=C(Nc1ccc(S(=O)(=O)N2CCc3ccccc32)cc1)c1cccc([N+](=O)[O-])c1] | N-(4-(indolin-1-ylsulfonyl)phenyl)-3-nitrobenzamide |
| I-981 | 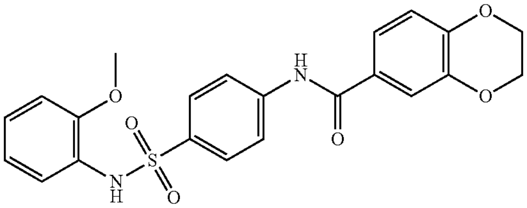 [SMILES: COc1ccccc1NS(=O)(=O)c1ccc(NC(=O)c2ccc3c(c2)OCCO3)cc1] | N-(4-(N-(2-methoxyphenyl)sulfamoyl)phenyl)-2,3-dihydrobenzo[b][1,4]dioxine-6-carboxamide |
| I-982 | 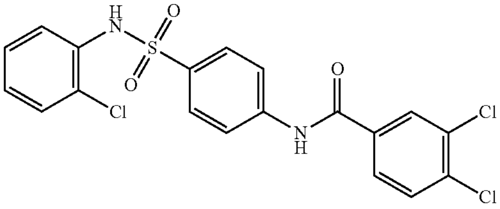 [SMILES: O=C(Nc1ccc(S(=O)(=O)Nc2ccccc2Cl)cc1)c1ccc(Cl)c(Cl)c1] | 3,4-dichloro-N-(4-(N-(2-chlorophenyl)sulfamoyl)phenyl)benzamide |
| I-985 | 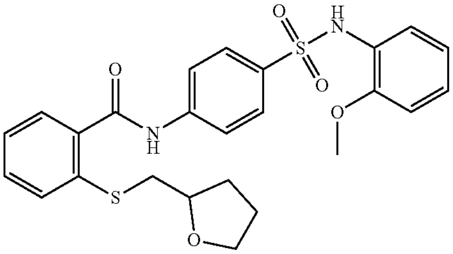 [SMILES: COc1ccccc1NS(=O)(=O)c1ccc(NC(=O)c2ccccc2SCC2CCCO2)cc1] | N-(4-(N-(2-methoxyphenyl)sulfamoyl)phenyl)-2-(((tetrahydrofuran-2-yl)methyl)thio)benzamide |

TABLE 1-continued

| ID | Structure | Name |
|---|---|---|
| I-986 | 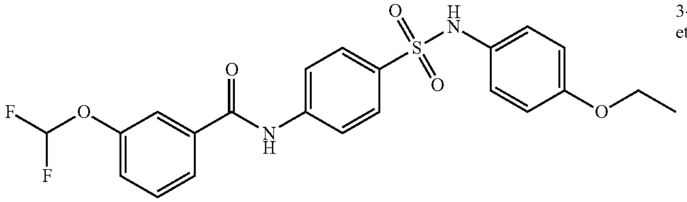 | 3-(difluoromethoxy)-N-(4-(N-(4-ethoxyphenyl)sulfamoyl)phenyl)benzamide |
| I-987 | 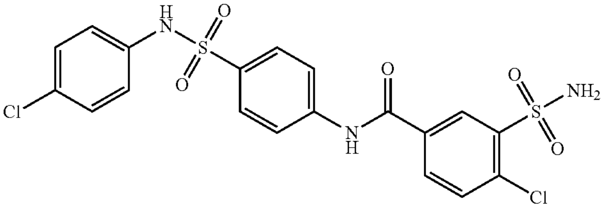 [SMILES: NS(=O)(=O)c1cc(C(=O)Nc2ccc(S(=O)(=O)Nc3ccc(Cl)cc3)cc2)ccc1Cl] | 4-chloro-N-(4-(N-(4-chlorophenyl)sulfamoyl)phenyl)-3-sulfamoylbenzamide |
| I-988 | 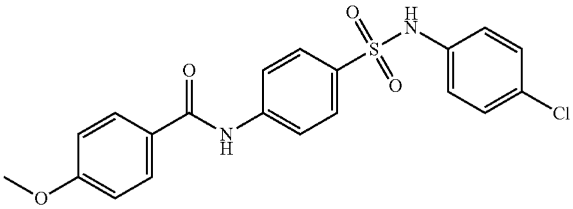 [SMILES: COc1ccc(C(=O)Nc2ccc(S(=O)(=O)Nc3ccc(Cl)cc3)cc2)cc1] | N-(4-(N-(4-chlorophenyl)sulfamoyl)phenyl)-4-methoxybenzamide |
| I-989 | 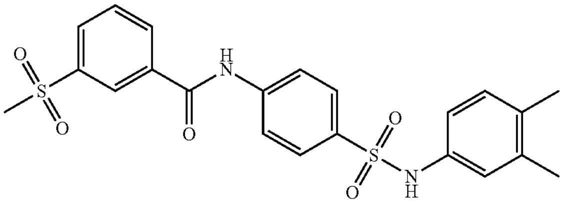 | N-(4-(N-(3,4-dimethylphenyl)sulfamoyl)phenyl)-3-(methylsulfonyl)benzamide |
| I-990 | 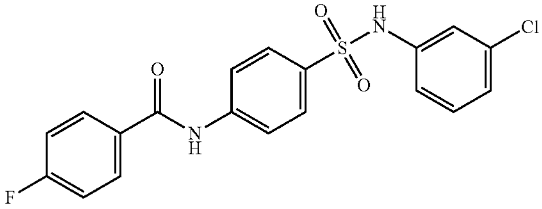 [SMILES: O=C(Nc1ccc(S(=O)(=O)Nc2cccc(Cl)c2)cc1)c1ccc(F)cc1] | N-(4-(N-(3-chlorophenyl)sulfamoyl)phenyl)-4-fluorobenzamide |
| I-991 | 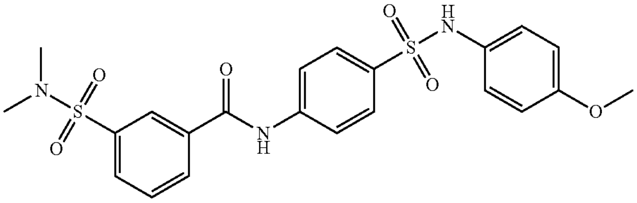 | 3-(N,N-dimethylsulfamoyl)-N-(4-(N-(4-methoxyphenyl)sulfamoyl)phenyl)benzamide |
| I-992 | 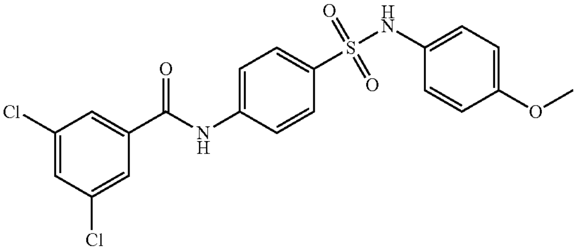 [SMILES: COc1ccc(NS(=O)(=O)c2ccc(NC(=O)c3cc(Cl)cc(Cl)c3)cc2)cc1] | 3,5-dichloro-N-(4-(N-(4-methoxyphenyl)sulfamoyl)phenyl)benzamide |

TABLE 1-continued

| ID | Structure | Name |
| --- | --- | --- |
| I-993 | 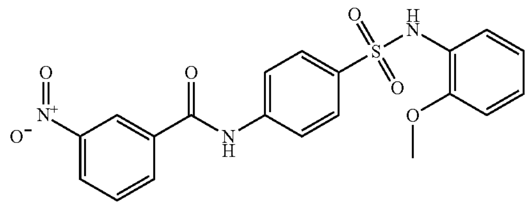 | N-(4-(N-(2-methoxyphenyl)sulfamoyl)phenyl)-3-nitrobenzamide |
| I-994 | 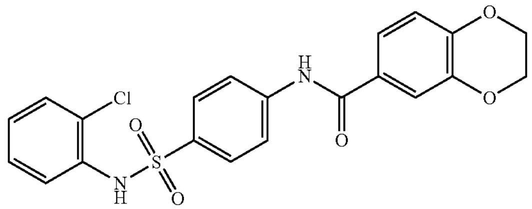 [SMILES: O=C(Nc1ccc(S(=O)(=O)Nc2ccccc2Cl)cc1)c1ccc2c(c1)OCCO2] | N-(4-(N-(2-chlorophenyl)sulfamoyl)phenyl)-2,3-dihydrobenzo[b][1,4]dioxine-6-carboxamide |
| I-995 | 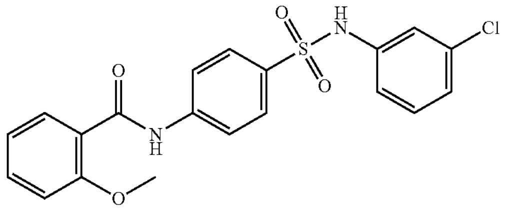 [SMILES: COc1ccccc1C(=O)Nc1ccc(S(=O)(=O)Nc2cccc(Cl)c2)cc1] | N-(4-(N-(3-chlorophenyl)sulfamoyl)phenyl)-2-methoxybenzamide |
| I-996 | 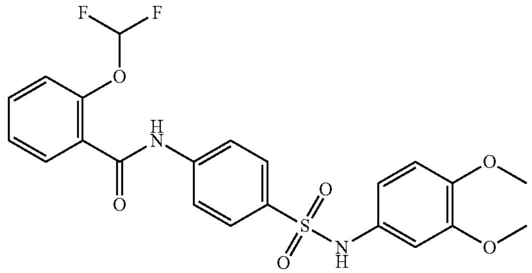 [SMILES: COc1ccc(NS(=O)(=O)c2ccc(NC(=O)c3ccccc3OC(F)F)cc2)cc1OC] | 2-(difluoromethoxy)-N-(4-(N-(3,4-dimethoxyphenyl)sulfamoyl)phenyl)benzamide |
| I-997 | 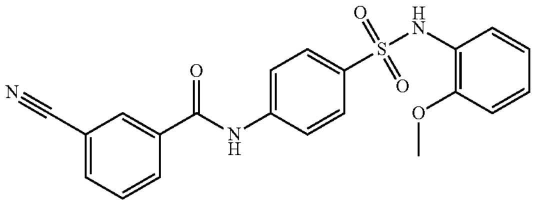 [SMILES: COc1ccccc1NS(=O)(=O)c1ccc(NC(=O)c2cccc(C#N)c2)cc1] | 3-cyano-N-(4-(N-(2-methoxyphenyl)sulfamoyl)phenyl)benzamide |
| I-998 | 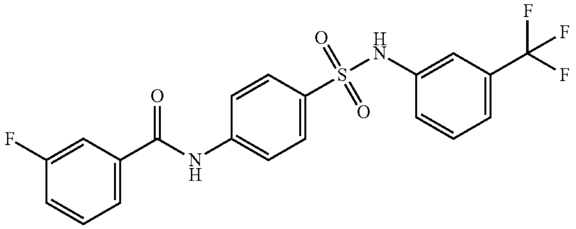 [SMILES: O=C(Nc1ccc(S(=O)(=O)Nc2cccc(C(F)(F)F)c2)cc1)c1cccc(F)c1] | 3-fluoro-N-(4-(N-(3-(trifluoromethyl)phenyl)sulfamoyl)phenyl)benzamide |
| I-999 | 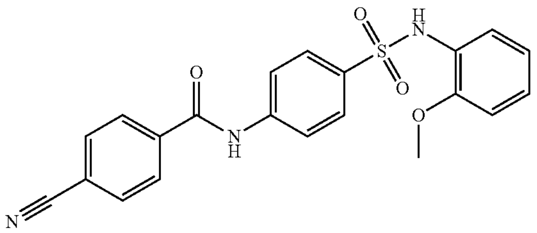 [SMILES: COc1ccccc1NS(=O)(=O)c1ccc(NC(=O)c2ccc(C#N)cc2)cc1] | 4-cyano-N-(4-(N-(2-methoxyphenyl)sulfamoyl)phenyl)benzamide |

TABLE 1-continued

| ID | Structure | Name |
| --- | --- | --- |
| I-1000 | 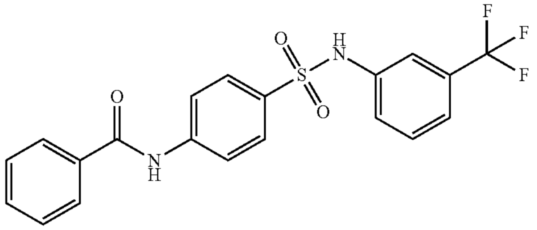 [SMILES: O=C(Nc1ccc(S(=O)(=O)Nc2cccc(C(F)(F)F)c2)cc1)c1ccccc1] | N-(4-(N-(3-(trifluoromethyl)phenyl)sulfamoyl)phenyl) benzamide |
| I-1001 | 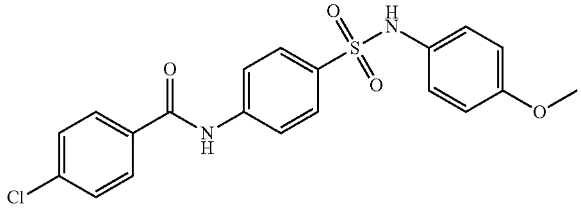 [SMILES: COc1ccc(NS(=O)(=O)c2ccc(NC(=O)c3ccc(Cl)cc3)cc2)cc1] | 4-chloro-N-(4-(N-(4-methoxyphenyl)sulfamoyl)phenyl)benzamide |
| I-1002 | 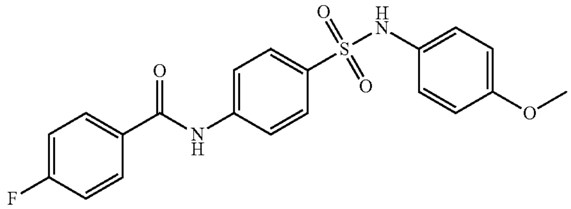 [SMILES: COc1ccc(NS(=O)(=O)c2ccc(NC(=O)c3ccc(F)cc3)cc2)cc1] | 4-fluoro-N-(4-(N-(4-methoxyphenyl)sulfamoyl)phenyl)benzamide |
| I-1003 | 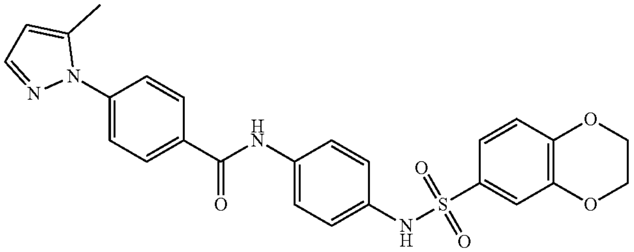 [SMILES: Cc1ccnn1-c1ccc(C(=O)Nc2ccc(NS(=O)(=O)c3ccc4c(c3)OCCO4)cc2)cc1] | N-(4-((2,3-dihydrobenzo[b][1,4]dioxine)-6-sulfonamido)phenyl)-4-(5-methyl-1H-pyrazol-1-yl)benzamide |
| I-1004 | 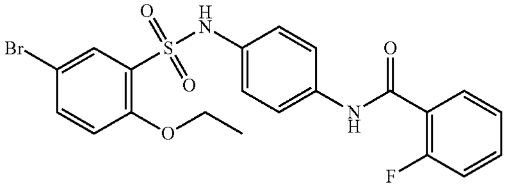 [SMILES: CCOc1ccc(Br)cc1S(=O)(=O)Nc1ccc(NC(=O)c2ccccc2F)cc1] | N-(4-((5-bromo-2-ethoxyphenyl)sulfonamido)phenyl)-2-fluorobenzamide |
| I-1005 | 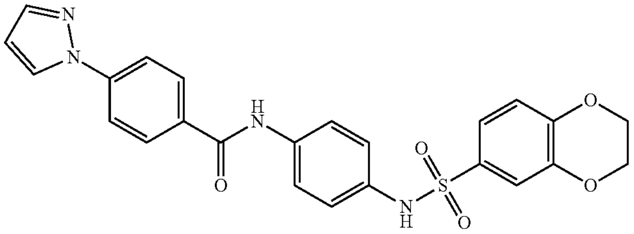 [SMILES: O=C(Nc1ccc(NS(=O)(=O)c2ccc3c(c2)OCCO3)cc1)c1ccc(-n2cccn2)cc1] | N-(4-((2,3-dihydrobenzo[b][1,4]dioxine)-6-sulfonamido)phenyl)-4-(1H-pyrazol-1-yl)benzamide |
| I-1006 | 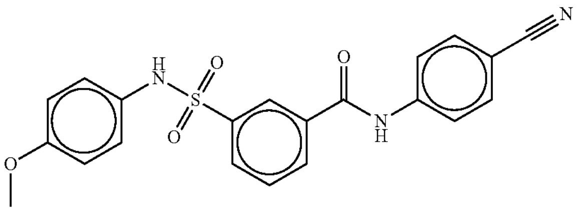 | N-(4-cyanophenyl)-3-(N-(4-methoxyphenyl)sulfamoyl)benzamide |

TABLE 1-continued

| ID | Structure | Name |
|---|---|---|
| I-1007 | 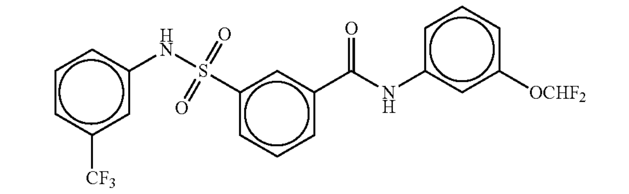 | N-(3-(difluoromethoxy)phenyl)-3-(N-(3-(trifluoromethyl)phenyl)sulfamoyl)benzamide |
| I-1008 | 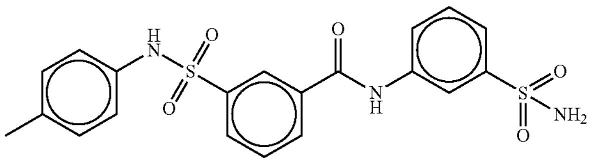 | N-(3-sulfamoylphenyl)-3-(N-(p-tolyl)sulfamoyl)benzamide |
| I-1009 | 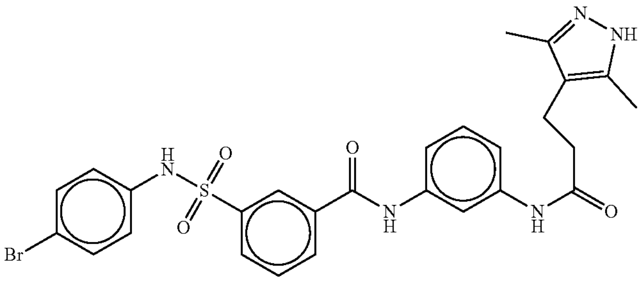 | 3-(N-(4-bromophenyl)sulfamoyl)-N-(3-(3-(3,5-dimethyl-1H-pyrazol-4-yl)propanamido)phenyl)benzamide |

III. Methods for Making Compounds

Compounds disclosed herein, including compounds of Formulas (I), (Ia), (Ib), (Ic), (II), (IIa), (IIb), (IIc), (III), (IIIa), (IIIb), (IIIc), (IV), (IVa) and (IVb), can be prepared as will be understood by those of skill upon consideration of the present disclosure. For example, compounds containing a carboxamide group and a sulfonamide group can be prepared by the reaction between an amine and a carboxylic acid or sulfonic acid which has been activated in some way, in a suitable solvent and at a suitable temperature. For example, a carboxylic acid or a sulfonic acid can be activated by converting it into the corresponding carboxylic acid halide, such as an acid bromide or chloride or sulfonic acid halide, such as sulfonic acid bromide or chloride; reaction with an amine then gives the required carboxamide or sulfonamide, respectively, together with an acid, such as hydrobromic or hydrochloric acid, which is usually neutralized by the addition of a base to the reaction mixture. Examples of methods that can be used to synthesize compounds of the invention are given by Y-L Yang et al., *Tetrahedron,* 2013, 69, 2640-2646 which describes the selective reaction of anilines with the carboxylic acid chloride group of 3-(chlorosulfonyl)benzoyl chloride in the presence of N,N-diisopropylethylamine in dichloromethane. Subsequent reaction with a second amine, for example, a different aniline, also in the presence of a base and in a suitable solvent, will then lead to certain specific compounds of the invention. Other compounds of the invention may be prepared by related methods.

IV. Target Crops and their Pathogens

The present disclosure provides formulations and methods for their use in treating crops for pathogens. In one embodiment, a disclosed compound, such as a compound of Formula (I), (Ia), (Ib), (Ic), (II), (IIa), (IIb), (IIc), (III), (IIIa), (IIIb), (IIIc), (IV), (IVa) and/or (IVb), is administered in combination with an agricultural or horticultural pesticide, such as an acaricide, antimicrobial, fungicide, herbicide, insecticide, molluscicide and/or nematocide. Crops that can be treated, include those plagued by various pathogens, including without limitation, bacteria, viruses, fungal pathogens, mites, nematodes, molluscs, weeds or other pests, as is known to those of ordinary skill in the agricultural arts. By way of example, such agricultural and horticultural crops that can be treated according to the present disclosure include plants, whether genetically modified or not, including their harvested products, such as: cereals; vegetables; root crops; potatoes; trees such as fruit trees, for example banana trees, tea, coffee trees, or cocoa trees; grasses; lawn grass; or cotton.

Roux and coworkers describe the compound:

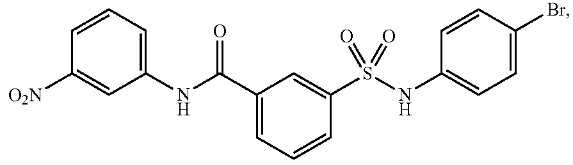 [SMILES: O=C(Nc1cccc([N+](=O)[O-])c1)c1cccc(S(=O)(=O)Nc2ccc(Br)cc2)c1], referred to herein as "Roux compound 13," as enhancing the ability of certain fungicides to inhibit the growth of different plant-pathogenic fungi (*Molecular Plant Pathology,* 2017, 18(7), 1012-1023; and WO 2016/123191). The present compounds surprisingly enhance the ability of a variety of pesticides against a broad variety of pathogens, including fungal pathogens. In addition, examples of the presently disclosed compound exhibit superior enhancer activity than Roux compound 13.

The agricultural or horticultural enhancer disclosed herein may be applied to each part of plants, such as leaves, stems, patterns, flowers, buds, fruits, seeds, sprouts, roots, tubers, tuberous roots, shoots, or cuttings. The agricultural or horticultural enhancer according to the present disclosure may also be applied to improved varieties/varieties, cultivars, as well as mutants, hybrids and genetically modified embodiments of these plants.

The agricultural or horticultural treatment described herein may be used to conduct seed treatment, foliage application, soil application, or water application, so as to control various diseases occurring in agricultural or horticultural crops, including flowers, lawns, and pastures.

The present compounds are useful for potentiating the effects of antimicrobial agents. For example, the present compounds can be used in combination with an antimicrobial agent to combat bacterial and viral infection.

The present compounds are useful for potentiating the effects of herbicides. For example, the present compounds can be used in combination with one or more herbicide to control weeds or other unwanted vegetation.

The present compounds are useful for potentiating the effects of insecticides. For example, the present compounds can be used in combination with one or more insecticide to control insect infestation. The present compounds are useful for potentiating the effects of acaricides or miticides. For example, the present compounds can be used in combination with one or more acaricidal agent to control mites. The present compounds are useful for potentiating the effects of molluscicides. For example, the present compounds can be used in combination with one or more molluscicide to prevent interference of slugs or snails with a crop.

The present compounds are useful for potentiating the effects of nematocides. For example, the present compounds can be used in combination with one or more nematocide to prevent interference of nematodes with a crop.

The present compounds are particularly useful for potentiating the effects of fungicides against plant fungal pathogens. Examples of pathogens treated according to the present disclosure include, without limitation, *Botrytis cinerea, Colletotrichum graminicola, Fusarium oxysporum, Sclerotiana sclerotiorum, Verticillium dahlia, Mycospharella gramincola* and *Sphacelotheca reliana.*

*Botrytis cinerea* is an airborne plant pathogen with a necrotrophic lifestyle attacking over 200 crop hosts worldwide. It mainly attacks dicotyledonous plant species, including important protein, oil, fiber and horticultural crops, grapes and strawberries and also *Botrytis* also causes secondary soft rot of fruits and vegetables during storage, transit and at the market. Many classes of fungicides have failed to control *Botrytis cinerea* due to its genetic plasticity.

The genus *Colletotrichum* comprises ~600 species attacking over 3,200 species of monocot and dicot plants. *Colletotrichum graminicola* primarily infects maize (*Zea mays*), causing annual losses of approximately 1 billion dollars in the United States alone (Connell et al., 2012).

*Fusarium* wilt of banana, caused by the soil-borne fungus *Fusarium oxysporum* f.sp. *cubense*, is a major threat to banana production worldwide. No fungicides are currently available to effectively control the disease once plants are infected (Peng J et al., 2014).

The white mold fungus *Sclerotinia sclerotiorum* is known to attack more than 400 host species and is considered one of the most prolific plant pathogens. The majority of the affected crop species are dicotyledonous, along with a number of agriculturally significant monocotyledonous plants. Some important crops affected by *S. sclerotiorum* include legumes (soybean), most vegetables, stone fruits and tobacco.

The ascomycete *Verticillium dahliae* is a soil-borne fungal plant pathogen that causes vascular wilt diseases in a broad range of dicotyledonous host species. *V. dahliae* can cause severe yield and quality losses in cotton and other important crops such as vegetables, fibers, fruit, nut trees, forest trees and ornamental plants.

The ascomycete fungus *Mycospharella gramincola* (anamorph: *Septoria tritici*) is one of the most important foliar diseases of wheat leaves, occurring wherever wheat is grown. Yield losses attributed to this disease range from 25%-50%, and are especially high in Europe, the Mediterranean region and East Africa. Infection by *M. gramincola* is initiated by air borne ascospores produced on residues of last season's crop. Primary infection usually occurs after seedlings emerge in spring or fall. The mature disease is characterized by necrotic lesions on the leaves and stems of infected plants.

The basidiomycete fungus *Sphacelotheca reliana* infects corn (*Zea mays*) systemically, causing Head Smut. Yield loss attributed to the disease is variable, and is directly dependent on the incidence of the disease. The fungus overwinters as diploid teliospores in crop debris or soil. Floral structures are converted to sori containing masses of powdery teliospores that resemble mature galls of common smut.

Examples of crops to be treated and plant diseases (pathogens) to be controlled using the presently disclosed compounds and compositions include, without limitation:

Sugar beet: brown spot disease (*Cercospora beticola*), black root disease (*Aphanomyces cochlioides*), root rot disease (*Thanatephorus cucumeris*), leaf rot disease (*Thanatephorus cucumeris*), and the like.

Peanut: brown spot disease (*Mycosphaerella arachidis*), leaf mold (*Ascochyta* sp.), rust disease (*Puccinia arachidis*), damping-off disease (*Pythium debaryanum*), rust spot disease (*Alternaria alternata*), stem rot disease (*Sclerotium rolfsii*), black rust disease (*Mycosphaerella berkeleyi*), and the like.

Cucumber: powdery mildew (*Sphaerotheca fuliginea*), downy mildew (*Pseudoperonospora cubensis*), gummy stem blight (*Mycosphaerella melonis*), wilt disease (*Fusarium oxysporum*), *sclerotinia* rot (*Sclerotinia sclerotiorum*), gray mold (*Botrytis cinerea*), anthracnose (*Colletotrichum orbiculare*), scab (*Cladosporium cucumerinum*), brown spot disease (*Corynespora cassiicola*), damping-off disease (*Pythium debaryanum, Rhizoctonia solani* Kuhn), *Phomopsis* root rot disease (*Phomopsis* sp.), Bacterial spot (*Pseudomonas syringae* pv. *Lechrymans*), and the like.

Tomato: gray mold disease (*Botrytis cinerea*), leaf mold disease (*Cladosporium fulvum*), late blight disease (*Phytophthora infestans*), *Verticillium* wilt disease (*Verticillium albo-atrum, Verticillium dahliae*), powdery mildew disease (*Oidium neolycopersici*), early blight disease (*Alternaria solani*), leaf mold disease (*Pseudocercospora fuligena*), and the like.

Eggplant: gray mold disease (*Botrytis cinerea*), black rot disease (*Corynespora melongenae*), powdery mildew disease (*Erysiphe cichoracearum*), leaf mold disease (*Mycovellosiella nattrassii*), *sclerotinia* rot disease (*Sclerotinia sclerotiorum*), *Verticillium* wilt disease (*Verticillium dahlia*), *Mycosphaerella* blight (*Phomopsis vexans*), and the like.

Strawberry: gray mold disease (*Botrytis cinerea*), powdery mildew disease (*Sphaerotheca humuli*), anthracnose disease (*Colletotrichum acutatum, Colletotrichum fragariae*), *phytophthora* rot disease (*Phytophthora cactorum*), soft rot disease (*Rhizopus stolonifer*), *fusarium* wilt disease (*Fusarium oxysporum*), *verticillium* wilt disease (*Verticillium dahlia*), and the like.

Onion: neck rot disease (*Botrytis allii*), gray mold disease (*Botrytis cinerea*), leaf blight disease (*Botrytis squamosa*), downy mildew disease (*Peronospora destructor*), *Phytophthora porn* disease (*Phytophthora porn*), and the like.

Cabbage: clubroot disease (*Plasmodiophora brassicae*), soft rot disease (*Erwinia carotovora*), black rot disease (*Xanthomonas campesrtis* pv. *campestris*), bacterial black spot disease (*Pseudomonas syringae* pv. *Maculicola*, P.s. pv. *alisalensis*), downy mildew disease (*Peronospora parasitica*), *sclerotinia* rot disease (*Sclerotinia sclerotiorum*), black spot disease (*Alternaria brassicicola*), gray mold disease (*Botrytis cinerea*), and the like.

Common bean: *sclerotinia* rot disease (*Sclerotinia sclerotiorum*), gray mold disease (*Botrytis cinerea*), anthracnose (*Colletotrichum lindemuthianum*), angular spot disease (*Phaeoisariopsis griseola*), and the like.

Apple: powdery mildew disease (*Podosphaera leucotricha*), scab disease (*Venturia inaequalis*), *Monilinia* disease (*Monilinia mali*), black spot disease (*Mycosphaerella pomi*), valla canker disease (*Valsa mali*), *alternaria* blotch disease (*Alternaria mali*), rust disease (*Gymnosporangium yamadae*), ring rot disease (*Botryosphaeria berengeriana*), anthracnose disease (*Glomerella cingulata, Colletotrichum acutatum*), leaf rot disease (*Diplocarpon mali*), fly speck disease (*Zygophiala jamaicensis*), Sooty blotch (*Gloeodes pomigena*), violet root rot disease (*Helicobasidium mompa*), gray mold disease (*Botrytis cinerea*), and the like.

Japanese apricot: scab disease (*Cladosporium carpophilum*), gray mold disease (*Botrytis cinerea*), brown rot disease (*Monilinia mumecola*), and the like.

Persimmon: powdery mildew disease (*Phyllactinia kakicola*), anthracnose disease (*Gloeosporium kaki*), angular leaf spot (*Cercospora kaki*), and the like.

Peach: brown rot disease (*Monilinia fructicola*), scab disease (*Cladosporium carpophilum*), *phomopsis* rot disease (*Phomopsis* sp.), bacterial shot hole disease (*Xanthomonas campestris* pv. *pruni*), and the like.

Almond: brown rot disease (*Monilinia* taxa), spot blotch disease (*Stigmina carpophila*), scab disease (*Cladosporium carpophilum*), red leaf spot disease (*Polystigma rubrum*), *alternaria* blotch disease (*Alternaria alternata*), anthracnose (*Colletotrichum gloeospoides*), and the like.

Yellow peach: brown rot disease (*Monilinia fructicola*), anthracnose disease (*Colletotrichum acutatum*), black spot disease (*Alternaria* sp.), *Monilinia kusanoi* disease (*Monilinia kusanoi*), and the like.

Grape: gray mold disease (*Botrytis cinerea*), powdery mildew disease (*Uncinula necator*), ripe rot disease (*Glomerella cingulata, Colletotrichum acutatum*), downy mildew disease (*Plasmopara viticola*), anthracnose disease (*Elsinoe ampelina*), brown spot disease (*Pseudocercospora vitis*), black rot disease (*Guignardia bidwellii*), white rot disease (*Coniella castaneicola*), rust disease (*Phakopsora ampelopsidis*), and the like.

Pear: scab disease (*Venturia nashicola*), rust disease (*Gymnosporangium asiaticum*), black spot disease (*Alternaria kikuchiana*), ring rot disease (*Botryosphaeria berengeriana*), powdery mildew disease (*Phyllactinia mali*), Cytospora canker disease (*Phomopsis fukushii*), brown spot blotch disease (*Stemphylium vesicarium*), anthracnose disease (*Glomerella cingulata*), and the like.

Tea: ring spot disease (*Pestalotiopsis longiseta, P. theae*), anthracnose disease (*Colletotrichum theae-sinensis*), Net blister blight (*Exobasidium reticulatum*), and the like.

Citrus fruits: scab disease (*Elsinoe fawcettii*), blue mold disease (*Penicillium italicum*), common green mold disease (*Penicillium digitatum*), gray mold disease (*Botrytis cinerea*), melanose disease (*Diaporthe citri*), canker disease (*Xanthomonas campestris* pv. *Citri*), powdery mildew disease (*Oidium* sp.), and the like.

Wheat: powdery mildew (*Blumeria graminis* f sp. *tritici*), red mold disease (*Gibberella zeae*), brown rust disease (*Puccinia recondita*), brown snow mold disease (*Pythium iwayamai*), pink snow mold disease (*Monographella nivalis*), eye spot disease (*Pseudocercosporella herpotrichoides*), leaf scorch disease (*Septoria tritici*), glume blotch disease (*Leptosphaeria nodorum*), *typhula* snow blight disease (*Typhula incarnata*), *sclerotinia* snow blight disease (*Myriosclerotinia borealis*), damping-off disease (*Gaeumannomyces graminis*), ergot disease (*Claviceps purpurea*), stinking smut disease (*Tilletia caries*), loose smut disease (*Ustilago nuda*), and the like.

Barley: leaf spot disease (*Pyrenophora graminea*), net blotch disease (*Pyrenophora teres*), leaf blotch disease (*Rhynchosporium secalis*), loose smut disease (*Ustilago tritici, U. nuda*), and the like.

Rice: blast disease (*Pyricularia oryzae*), sheath blight disease (*Rhizoctonia solani*), bakanae disease (*Gibberella fujikuroi*), brown spot disease (*Cochliobolus miyabeanus*), damping-off disease (*Pythium graminicola*), bacterial leaf blight (*Xanthomonas oryzae*), bacterial seedling blight disease (*Burkholderia plantarii*), brown stripe disease (*Acidovorax avenae*), bacterial grain rot disease (*Burkholderia glumae*), *Cercospora* leaf spot disease (*Cercospora oryzae*), false smut disease (*Ustilaginoidea virens*), rice brown spot disease (*Alternaria alternata, Curvularia intermedia*), kernel discoloration of rice (*Alternaria padwickii*), pink coloring of rice grains (*Epicoccum purpurascens*), and the like.

Tobacco: *sclerotinia* rot disease (*Sclerotinia sclerotiorum*), powdery mildew disease (*Erysiphe cichoracearum*), *phytophthora* rot disease (*Phytophthora nicotianae*), and the like.

Tulip: gray mold disease (*Botrytis cinerea*), and the like.

Sunflower: downy mildew disease (*Plasmopara halstedii*), *sclerotinia* rot disease (*Sclerotinia sclerotiorum*), and the like.

Bent grass: *Sclerotinia* snow blight (*Sclerotinia borealis*), Large patch (*Rhizoctonia solani*), Brown patch (*Rhizoctonia solani*), Dollar spot (*Sclerotinia homoeocarpa*), blast disease (*Pyricularia* sp.), *Pythium* red blight disease (*Pythium aphanidermatum*), anthracnose disease (*Colletotrichum graminicola*), and the like.

Orchard grass: powdery mildew disease (*Erysiphe graminis*), and the like.

Soybean: purple stain disease (*Cercospora kikuchii*), downy mildew disease (*Peronospora manshurica*), *phytophthora* rot disease (*Phytophthora sojae*), rust disease (*Phakopsora pachyrhizi*), *sclerotinia* rot disease (*Sclerotinia sclerotiorum*), anthracnose disease (*Colletotrichum truncatum*), gray mold disease (*Botrytis cinerea*), *Sphaceloma* scab (*Elsinoe glycines*), melanoses (*Diaporthe phaseolorum* var. *sojae*), and the like.

Potato: hytophthora rot disease (*Phytophthora infestans*), early blight disease (*Alternaria solani*), scurf disease (*Thanatephorus cucumeris*), *verticillium* wilt disease (*Verticillium albo-atrum, V. dahlia, V. nigrescens*, and the like.

Banana: Panama disease (*Fusarium oxysporum*), Sigatoka disease (*Mycosphaerella fijiensis, M. musicola*), and the like.

Rapeseed: *sclerotinia* rot disease (*Sclerotinia sclerotiorum*), root rot disease (*Phoma lingam*), black leaf spot disease (*Alternaria brassicae*), and the like.

Coffee: rust disease (*Hemileia vastatrix*), anthracnose (*Colletotrichum coffeanum*), leaf spot disease (*Cercospora coffeicola*), and the like.

Sugarcane: brown rust disease (*Puccinia melanocephala*), and the like.

Corn: zonate spot disease (*Gloeocercospora sorghi*), rust disease (*Puccinia sorghi*), southern rust disease (*Puccinia polysora*), smut disease (*Ustilago maydis*), brown spot disease (*Cochliobolus heterostrophus*), northern leaf blight (*Setosphaeria turcica*), and the like.

Cotton: seedling blight disease (*Pythium* sp.), rust disease (*Phakopsora gossypii*), sour rot disease (*Mycosphaerella* areola), anthracnose (*Glomerella gossypii*), and the like.

V. Pesticides

The presently disclosed compounds, including compounds according to Formulas (I), (Ia), (Ib), (Ic), (II), (IIa), (IIb), (IIc), (III), (IIIa), (IIIb), (IIIc), (IV), (IVa) and/or (IVb), are useful for enhancing the effect of a variety of agrochemicals, including fungicides, antiviral agents, bactericides, herbicides, insecticidal/acaricidal agents, molluscicides, nematicides, soil pesticides, plant control agents, synergistic agents, fertilizers and soil conditioners.

In one embodiment, the presently disclosed compounds are useful for enhancing the fungicidal effect of a variety of fungicides. Fungicides for use with the presently disclosed compounds, such as a compound of Formula (I), (Ia), (Ib), (Ic), (II), (IIa), (IIb), (IIc), (III), (IIIa), (IIIb), (IIIc), (IV), (IVa) and/or (IVb), are well known to those of skill in the art and include, without limitation those set forth by class in Table 2:

TABLE 2

| Family & Group # | Common Names | Trade Names (Combination Products) |
|---|---|---|
| Benzimidazole (Group 1) | benomyl | Benlate, Tersan 1991 |
| | thiabendazole | Arbotect 20-S, Decco Salt No. 19, LSP Flowable Fungicide, Mertect 340-F |
| | thiophanate-methyl | Cavalier, Cleary's 3336, OHP 6672, Regal SysTec, Tee-Off, T-Methyl 4.5F AG, TM 85, Topsin M |
| Dicarboximide (Group 2) | iprodione | Epic 30, Ipro, Meteor, Nevado, OHP Chipco 26019, Rovral, (Interface) |
| | vinclozolin | Curalan, Ronilan |
| Phenylpyrroles (Group 12) | fludioxonil | Cannonball, Emblem, Maxim, Medallion, Mozart, Scholar, Spirato, (Academy, Miravis Prime, Palladium, Switch) |
| Anilinopyrimidines (Group 9) | cyprodinil | Vangard (Palladium, Switch, Inspire Super) |
| | pyrimethanil | Penbotec, Scala, (Luna Tranquility) |
| Hydroxyanilide (Group 17) | fenhexamid | Decree, Elevate, Judge |
| | fenpyrazamine | Protexio |
| Carboxamide (Group 7) | boscalid | Emerald, Endura, (Encartis, Honor, Pageant, Pristine) |
| | carboxin | Vitavax |
| | fluopyram | Luna Privilege, Velum Prime (Broadform, Luna Experience, Luna Sensation, Luna Tranquility, Propulse) |
| | flutolanil | Contrast, Moncut, ProStar |
| | fluxapyroxad | (Lexicon, Merivon, Orkestra) |
| | inpyrfluxam | Excalia |
| | isofetamid | Kenja |
| | oxycarboxin | Carboject, Plantvax |
| | penthiopyrad | Fontelis, Velista, Vertisan |
| | pydiflumetofen | Miravis, Posterity, Miravis Ace A (Miravis Neo, Miravis Prime, Miravis Duo, Miravis Top) |
| | solatenol (benzovindiflupyr) | Aprovia (Contend A, Elatus, Mural) |
| Phenylamide (Group 4) | mefenoxam | Apron, Ridomil Gold, Subdue MAXX, (Quadris Ridomil Gold, Uniform) |
| | metalaxyl | Acquire, Allegiance, MetaStar, Ridomil, Sebring, Subdue |
| | oxadixyl | Anchor |
| Phosphonate (Group P7) | aluminum tris | Aliette, Flanker, Legion, Signature, Areca |
| | Phosphorous Acid | Agri-Fos, Alude, Appear, Fiata, Fosphite, Phospho Jet, Phostrol, Rampart, Reload |
| Cinnamic acid (Group 40) | dimethomorph | Forum, Stature, (Orvego, Zampro) |
| | mandipropamid | Micora, Revus, (Revus Top) |
| OSBPI (Group 49) | oxathiapiprolin | Segovis |
| Triazoles carboxamide (Group 22) | ethaboxam | V-10208 |
| Group 27 | cymoxanil | Curzate, (Tanos) |
| Carbamate (Group 28) | propamocarb | Banol, Previcur, Proplant, Tattoo |
| Benzamide (Group 43) | fluopicolide | Adorn, Presidio |

TABLE 2-continued

| Family & Group # | Common Names | Trade Names (Combination Products) |
|---|---|---|
| | Demethylation-inhibiting (Group 3) | |
| Piperazines | triforine | Funginex, Triforine |
| Pyrimidines | fenarimol | Focus, Rubigan, Vintage |
| Imidazole | imazalil | Fungaflor, (Raxil MD Extra) |
| | triflumizole | Procure, Terraguard, Trionic |
| Triazoles | cyproconizole | Sentinel |
| | difenoconazole | Dividend, Inspire, (Academy, Briskway, Contend A, Inspire Super, Quadris Top, Revus Top) Miravis Duo |
| | fenbuconazole | Enable, Indar |
| | flutriafol | Topguard, (Topguard EQ) |
| | mefentrifluconazole | Maxtima (Navicon) |
| | metconazole | Quash, Tourney |
| | ipconazole | Rancona |
| | myclobutanil | Eagle, Hoist, Immunox, Laredo, Nova, Rally, Sonoma, Systhane |
| | propiconazole | Alamo, Banner, Break, Bumper, Infuse, Kestrel Mex, Miravis Ace B, PropiMax, ProPensity, Strider, Tilt, Topaz, (Aframe Plus, Concert, Contend B, Headway, Quilt Xcel, Stratego) |
| | prothioconazole | Proline (Propulse) |
| | tebuconazole | Bayer Advanced, Elite, Folicur, Lynx, Mirage, Orius, Raxil, Sativa, Tebucon, Tebuject, Tebusha, Tebustar, Toledo, (Absolute, Luna Experience, Unicorn), etc. |
| | tetraconazole | Mettle |
| | triadimefon | Bayleton, Strike, (Armada, Tartan, Trígo) |
| | triadimenol | Baytan |
| | triticonazole | Charter, Trinity, (Pillar) |
| Morpholine (Group 5) | piperalin | Pipron |
| | spiroxamine | Accrue |
| Group U6 | cyflufenamid | Torino |
| Group 50 | metrafenone | Vivando |
| | pyriofenone | Prolivo |
| QoI Strobilurins (Group 11) | azoxystrobin | Abound, Aframe, Dynasty, Heritage, Protété, Quadris, Quilt, (Aframe Plus, Briskway, Contend B, Dexter Max, Elatus, Headway, Mural, Quadris Top, Quilt Xcel, Renown, Topguard EQ, Uniform) |
| | femoxadone | (Tanos) |
| | fenamidone | Fenstop, Reason |
| | fluoxastrobin | Aftershock, Disarm, Evito, Fame |
| | kresoxim-methyl | Cygnus, Sovran |
| | mandestrobin | Intuity, Pinpoint |
| | picoxystrobin | Aproach |
| | pyraclostrobin | Cabrio, Empress, Headline, Insignia, Stamina, (Honor, Lexicon, Merivon, Navicon, Orkestra, Pageant, Pillar, Pristine) |
| | trifloxystrobin | Compass, Flint, Gem, (Absolute, Armada, Broadform, Interface, Luna Sensation, Stratego, Tartan, Trigo) |
| Quinoline (Group 13) | quinoxyfen | Quintec |
| | Inorganic Compounds | |
| Coppers (Group M1) | bordeaux | None |
| | copper ammonium complex | Copper Count-N |
| | copper hydroxide | Champ, Champion, Kalmor, Kentan, Kocide, Nu-Cop |
| | copper oxide | Nordox |
| | copper oxychloride | C—O—C—S, Oxycop |
| | copper sulfate | Cuprofix Disperss, many others |
| Sulfur (Group M2) | sulfur | Cosavet, Kumulus, Microthiol Disperss, Thiosperse |
| Lime sulfur | Ca polysulfides | Lime Sulfur, Sulforix |
| Ethylenebisdithiocarbamates (EBDC) (Group M3) | mancozeb | Dithane, Fore, Penncozeb, Protect, Manex, Manzate, Roper, Wingman, (Dexter Max, Gavel) |
| | maneb | Maneb |
| | metiram | Polyram |
| EBDC-like (Group M3) | ferbam | Carbamate, Ferbam |
| | thiram | Difiant, Spotrete, Thiram |
| | ziram | Ziram |

TABLE 2-continued

| Family & Group # | Common Names | Trade Names (Combination Products) |
|---|---|---|
| Aromatic Hydrocarbon (Group 14) | dicloran (DCNA) | Allisan, Botran |
| | etridizole | Terrazole, Truban |
| | pentachloronitrobenzene | Autilus, Defend, Engage, PCNB, Terraclor, (Premion) |
| Chloronitrile (Group M5) | chlorothalonil | Bravo, Daconil, Docket, Echo, Ensign, Exotherm Termil, Funginil, Legend, Manicure, Pegasus, Terranil, (Concert, Spectro) |
| Phthalimides (Group M4) | captan | Captan |
| Guanidines (Group U12) | dodine | Syllit |
| QiI fungicides (Group 21) | cyazofamid | Ranman, Segway |
| Polyoxin (Group 19) | polyoxin | Affirm, Endorse, Oso, Ph-D, Tavano, Veranda |
| Group 29 | fluazinam | Omega, Secure |
| Thiazolidine (U13) | flutianil | Gatten |

Fungicides are cataloged more broadly by the Fungicide Resistance Action Committee (FRAC) in the FRAC Code List 2022 and reproduced in Appendix 1 and which is incorporated herein by reference in its entirety.

In one embodiment, a presently disclosed enhancer compound, such as a compound of Formula (I), (Ia), (Ib), (Ic), (II), (IIa), (IIb), (IIc), (III), (IIIa), (IIIb), (IIIc), (IV), (IVa) and/or (IVb), is used in combination with one or more compound from the Families or Groups set forth in Table 2, Appendix 1, or both. In certain embodiments, a presently disclosed enhancer is used in combination with one or more fungicides recited in column 1 of Table 2.

In particular embodiments, a disclosed enhancer is used in combination with one or more of a fungicide selected from the benzimidazoles, dicarboximides, phenylpyrroles, anilinopyrimidines, hydroxyanilides, carboxamides, phenyl amides, phosphonates, cinnamic acids, oxysterol binding protein inhibitors (OSBPI), triazole carboxamides, cymoxanil, carbamates, benzamides, demethylation inhibiting piperazines, demethylation inhibiting pyrimidines, demethylation inhibiting azoles, including imidazoles, and triazoles, such as cyproconazole, difenoconazole, fenbuconazole, flutriafol, mefentrifluconazole, metconazole, ipconazole, prothioconazole, tebuconazole, tetraconazole, triadimefon, triadimenol, triticonazole, morpholines, cyflufenamid, metrafenone, pyriofenone, strobilurins, copper ammonium complex, copper hydroxide, copper oxide, copper oxychloride, copper sulfate, sulfur, lime sulfur, ethylenebisdithiocarbamates, aromatic hydrocarbons, phthalimides, guanidines, polyoxins, fluazinam and thiazolidines.

Particular fungicides that are potentiated by use in combination with an enhancer according to the methods herein by administration of an apyrase inhibitor are coppers, such as copper octanoate, copper hydroxide and the like, myclobutanil, propiconazole, tebuconazole, epoxiconazole, difenoconazole, triticonazole, and prothioconazole.

In one embodiment, the combined treatment with a selected fungicide and an enhancer according to the present disclosure, such as a compound of Formulas (I), (Ia), (Ib), (Ic), (II), (IIa), (IIb), (IIc), (III), (IIIa), (IIIb), (IIIc), (IV), (IVa) and/or (IVb), provides synergistic fungicidal activity against plant pathogenic fungi.

In one embodiment, the disclosure provides compositions and methods of treating plants or plant seeds infected with or at risk of being infected with a fungal pathogen. In one embodiment compositions of the present disclosure comprise a formulation of a fungicide, an enhancer and a phytologically acceptable carrier. In another embodiment, the fungicide and enhancer are administered in separate compositions. In further embodiments, an agricultural or horticultural fungicide is used in combination with other compounds in addition to the presently disclosed apyrase inhibitors. As with the apyrase inhibitors, such other compounds can be administered in the same or separate compositions as the fungicide. Examples of the other components include known carriers to be used to conduct formulation. Additional examples thereof include conventionally-known herbicides, insecticidal/acaricidal agents, nematodes, soil pesticides, plant control agents, synergistic agents, fertilizers, soil conditioners, and animal feeds. In one embodiment, the inclusion of such other components yields synergistic effects on crop growth.

In one embodiment, the presently disclosed compounds, including compounds according to Formulas (I), (Ia), (Ib), (Ic), (II), (IIa), (IIb), (IIc), (III), (IIIa), (IIIb), (IIIc), (IV), (IVa) and/or (IVb), are used to potentiate the effect of a herbicide. Exemplary herbicides for use in combination with the present compounds are known to those of skill in the art and include, without limitation, those described in Appendix 2. By way of example, suitable herbicides for use in combination with the present compounds include inhibitors of acetyl CoA synthase, inhibitors of acetolactate synthesis, inhibitors of microtubule assembly, inhibitors of microtubule organization, auxin mimics, photosynthesis inhibitors, deoxy-D-xylulose phosphate synthase inhibitors, enolpyruvyl shikimate phosphate synthase inhibitors, phytoene desaturase inhibitors, glutamine synthetase inhibitors, dihydropteroate synthesis inhibitors, protoporphyrinogen oxidase inhibitors, cellulose synthesis inhibitors, uncouplers, hydroxyphenyl pyruvate dioxygenase inhibitors, fatty acid thioesterase inhibitors, serine-threonine protein phosphatase inhibitors, solanesyl diphosphate synthase inhibitors, inhibitors of very long-chain fatty acid synthesis, homogentisate solanesyltransferase inhibitors, lycopene cyclase inhibitors, In one embodiment, the presently disclosed compounds, including compounds according to Formulas (I), (Ia), (Ib), (Ic), (II), (IIa), (IIb), (IIc), (III), (IIIa), (IIIb), (IIIc), (IV), (IVa) and/or (IVb), are used to potentiate the effect of an insecticide. Exemplary insecticides for use in combination with the present compounds are known to those of skill in the art and include, without limitation, those described in Appendix 3.

VI. Formulations

The present disclosure provides specific apyrase inhibitors, such as compounds of Formulas (I), (Ia), (Ib), (Ic), (II), (IIa), (IIb), (IIc), (III), (IIIa), (IIIb), (IIIc), (IV), (IVa) and/or (IVb), to enhance the potency of pesticides to effectively restrict the growth of plant pathogenic species. In certain non-limiting embodiments, the apyrase inhibitors can be provided at: from about 0.01 to about 80% weight to weight in a final composition, or from about 25% to about 55%, such as from about 30% to about 50%, from about 35% to about 45%, such as about 0.01, 0.05, 0.1, 0.5, 1.0, 1.1, 1.2, 1.3, 1.4, 1.5, 1.6, 1.7, 1.8, 1.9, 2.0, 2.5, 3.0, 4.0, 5.0, 7.5, 10, 20, 30, 40, 50, 55, 60 or 80% weight to weight in a final composition. In one embodiment the apyrase inhibitors are provided in liquid form at from about 0.01 to about 50%, such as from about 15% to about 50%, from about 20% to about 45%, from about 25% to about 40%, such as about 0.01, 0.05, 0.1, 0.5, 1.0, 1.1, 1.2, 1.3, 1.4, 1.5, 1.6, 1.7, 1.8, 1.9, 2.0, 2.5, 3.0, 4.0, 5.0, 7.5, 10, 15, 20, 30, 40 or 50% volume to volume in a final diluted composition. The skilled artisan will recognize that the formulation of the pesticide, the apyrase inhibitor or a combination thereof can be provided in a concentrate that can be diluted prior to use, or can be provided in a diluted form ready for treatment.

The enhancer, pesticide and combinations thereof are not particularly limited by the dosage form. Examples of the dosage form include wettable powders, emulsions, emulsifiable concentrates, oil-dispersible liquids, powders, granules, water-soluble agents, suspensions, granular wettable powders, and tablets. The method for preparing formulation is not particularly limited, and conventionally-known methods may be adopted depending on the dosage form.

Several formulation examples are described below. The preparation formulations shown below are merely examples, and may be modified within a range not contrary to the essence of the present disclosure. For example, additional active and inert components may be added to the formulations below.

"Part" means "part by mass" unless otherwise specified.

Formulation Example 1: Wettable Powders 40 parts of an enhancer disclosed herein, 53 parts of diatomaceous earth, 4 parts of ethoxylated higher alcohol sulfate ester combined with a suitable solid carrier such as magnesium sulfate, and 3 parts of alkyl naphthalene sulfonate are mixed uniformly, and then finely pulverized to obtain wettable powders containing 40 parts by mass of the enhancer.

Formulation Example 2: Emulsifiable Concentrates 3 parts of an enhancer disclosed herein, 60 parts of mixed petroleum distillates, 27 parts of dimethyl lactamide, and 10 parts of tristyrylphenol ethoxylates are mixed and dissolved to obtain an emulsifiable concentrate containing 3% by mass of the enhancer.

Formulation Example 3: Granules 5 parts of an enhancer disclosed herein, 10 parts of talc, 38 parts of clay, 10 parts of bentonite, 30 parts of sodium lignosulfonate and 7 parts of sodium alkyl sulfate are mixed uniformly, and then finely pulverized, followed by conducting fluidized bed granulation to make the median particle diameter thereof be 0.2 to 2.0 mm, and thus granules containing 5% by mass of an enhancer on a dry weight basis disclosed herein are obtained.

Formulation Example 4: Granules 5 parts of an enhancer disclosed herein, 73 parts of clay, 20 parts of bentonite, 1 part of sodium dioctyl sulfosuccinate, and 1 part of potassium phosphate are mixed and then pulverized, followed by adding water thereto, and then kneading the mixture. Then, extrusion granulation is conducted, and the resultant is dried to obtain granules containing 5% by mass of the enhancer on a dry weight basis.

Formulation Example 5: Suspensions 10 parts of an enhancer disclosed herein, 4 parts of polyoxyethylene alkyl ether, 2 parts of 3 kDa sodium polycarboxylate as dispersant, 10 parts of glycerin, 0.2 parts of xanthan gum, 0.1 parts of biocides as stabilizer, 0.1 parts of organosilicone antifoam emulsion and 73.6 parts of water are mixed, and then wet pulverized until the particle size is 3 microns or less to obtain a suspension containing 10% by mass of the enhancer.

Formulation Example 6: Oil Dispersible Concentrates 40 parts of an enhancer disclosed herein, 5 parts of Atlox 4914, 5 parts of organo-modified bentonite and 50 parts of methylated rapeseed oil as carrier are mixed uniformly and then wet pulverized until the median particle size is 3 microns or less to obtain an oil dispersible concentrate containing 40% by mass of the enhancer.

The skilled artisan will recognize that the various compositions are used commercially at varying concentrations and formulations. For example, it is common for fungicides to be formulated as liquids commercially at 10-40% concentrations. In one embodiment, the presently disclosed enhancers allow the use of a lower amount of a given fungicide due to the enhanced efficacy of fungicide in combination with an enhancer disclosed herein.

VII. Methods for Assessing Enhancer Activity

Apyrase inhibitors useful as enhancers of pesticidal activity are assessed using an in vitro assay. The method of Windsor, *Bio Techniques* 33:1024-1030 (November 2002) was used as follows Screen for Apyrase Inhibitors—

96 well plates were used for the assay: (Greiner bio-one: REF-655901-96 well, PS, F-bottom, Clear, Non-binding)

Buffers:

- Reaction Buffer: 60 mM Hepes; 3 mM $MgCl_2$, 3 mM $CaCl_2$ and 3 mM ATP (pH 6.5)
- Development Buffer A: 2% aqueous ammonium molybdate
- Development Buffer B: 11% ascorbic acid in 37.5% TCA in water
- Stop buffer C: 2% trisodium citrate in 2% acetic acid solution in water
  - Add 100 µl of reaction buffer to each well.
  - Add 10 µl of DMSO (control) or inhibitor/compound or compounds such as N1915 or orthovanadate to each well. (use inhibitor conc at 1 mM; orthovanadate at 2 mM and N1915 at 1 mM)
  - Add 10 µl of apyrase (concentration based on optimization—Dilute 1 U/µl enzyme to different concentrations such as 0.1 U, 0.05 U, 0.0025, 0.001 U, 0.0005 U—to find a good range)

Incubate plate at room temperature for 1 hr

Mix development buffer A and B in the ratio of 1:1.5 (just before use).

Add 50 ul of A:B mix in each well (incubate for 2 mins)

Add 50 ul of C in each well

Measure/Read Absorbance of plate @630 nm

Inhibitory data for the apyrase assay described above are provided for selected compounds in Table 3:

TABLE 3

| ID | % Inhibition of Apyrase |
|---|---|
| I-1 | 84 |
| I-2 | 77 |
| I-3 | 73 |
| I-4 | 73 |
| I-5 | 71 |
| I-6 | 69 |
| I-7 | 67 |
| I-8 | 63 |
| I-9 | 61 |
| I-10 | 60 |
| I-11 | 60 |
| I-12 | 59 |
| I-13 | 59 |
| I-14 | 59 |
| I-15 | 55 |
| I-16 | 54 |
| I-17 | 52 |
| I-18 | 51 |
| I-19 | 50 |
| I-20 | 45 |
| I-21 | 45 |
| I-22 | 38 |
| I-23 | 30 |
| I-24 | 29 |
| I-25 | 28 |
| I-26 | 28 |
| I-27 | 24 |
| I-28 | 23 |
| I-29 | 22 |
| I-30 | 21 |
| I-31 | 21 |
| I-32 | 21 |
| I-33 | 19 |
| I-34 | 18 |
| I-35 | 17 |
| I-36 | 16 |
| I-38 | 14 |
| I-39 | 14 |
| I-40 | 14 |
| I-41 | 13 |
| I-42 | 13 |
| I-43 | 13 |
| I-44 | 13 |
| I-45 | 13 |
| I-46 | 12 |
| I-47 | 12 |
| I-48 | 11 |
| I-49 | 11 |
| I-50 | 10 |
| I-51 | 10 |
| I-52 | 10 |
| I-53 | |
| I-54 | |
| I-55 | |
| I-56 | |
| I-57 | |
| I-58 | |
| I-59 | |
| I-60 | |
| I-61 | |
| I-62 | |
| I-63 | |
| I-64 | |
| I-65 | |
| I-66 | |
| I-67 | |
| I-68 | |
| I-69 | |
| I-70 | |
| I-71 | |
| I-72 | |
| I-73 | |
| I-74 | |
| I-75 | |
| I-76 | |
| I-77 | |
| I-78 | |
| I-79 | |
| I-80 | |
| I-81 | |
| I-82 | |
| I-83 | |
| I-84 | |
| I-85 | |
| I-86 | |
| I-87 | |
| I-88 | |
| I-89 | |
| I-90 | |
| I-91 | |
| I-92 | |
| I-93 | |
| I-94 | |
| I-95 | |
| I-96 | |
| I-97 | |
| I-98 | |
| I-99 | |
| I-100 | |
| I-101 | |
| I-102 | |
| I-103 | |
| I-104 | |
| I-105 | |
| I-106 | |
| I-107 | |
| I-108 | |
| I-109 | |
| I-110 | |
| I-111 | |
| I-112 | |
| I-113 | |
| I-114 | |
| I-115 | |
| I-116 | |
| I-117 | |
| I-118 | |
| I-119 | |
| I-120 | |
| I-121 | |
| I-122 | |
| I-123 | |
| I-124 | |
| I-125 | |
| I-126 | |
| I-127 | |
| I-128 | |
| I-129 | |
| I-130 | |
| I-131 | |
| I-132 | |
| I-133 | |
| I-134 | |
| I-135 | |
| I-136 | |
| I-137 | |
| I-138 | |
| I-139 | |
| I-140 | |
| I-141 | |
| I-142 | |
| I-143 | |
| I-144 | |
| I-145 | |
| I-146 | |

TABLE 3-continued

| ID | % Inhibition of Apyrase |
|---|---|
| I-147 | |
| I-148 | |
| I-149 | |
| I-150 | |
| I-151 | |
| I-152 | |
| I-153 | |
| I-154 | |
| I-155 | |
| I-156 | |
| I-157 | |
| I-158 | |
| I-159 | |
| I-160 | |
| I-161 | |
| I-162 | |
| I-163 | |
| I-164 | |
| I-165 | |
| I-166 | |
| I-167 | |
| I-168 | |
| I-169 | |
| I-170 | |
| I-171 | |
| I-172 | |
| I-173 | |
| I-175 | |
| I-176 | |
| I-177 | 69 |
| I-178 | 76 |
| I-179 | 72 |
| I-180 | 75 |
| I-181 | 77 |
| I-182 | 68 |
| I-183 | 67 |
| I-184 | 81 |
| I-185 | 77 |
| I-186 | 72 |
| I-187 | 67 |
| I-188 | 73 |
| I-189 | 70 |
| I-190 | 73 |
| I-191 | 76 |
| I-192 | 72 |
| I-193 | 74 |
| I-194 | 74 |
| I-195 | 70 |
| I-196 | 74 |
| I-197 | 70 |
| I-198 | 79 |
| I-199 | 66 |
| I-200 | 78 |
| I-201 | 77 |
| I-202 | 78 |
| I-203 | 72 |
| I-204 | 69 |
| I-205 | 74 |
| I-206 | 74 |
| I-207 | 74 |
| I-208 | 66 |
| I-209 | 75 |
| I-210 | 73 |
| I-211 | 76 |
| I-212 | 69 |
| I-213 | 71 |
| I-214 | 71 |
| I-215 | 58 |
| I-216 | 71 |
| I-217 | 70 |
| I-218 | 62 |
| I-219 | 73 |
| I-220 | 68 |
| I-221 | 67 |
| I-222 | 71 |
| I-223 | 74 |
| I-224 | 67 |
| I-225 | 72 |

TABLE 3-continued

| ID | % Inhibition of Apyrase |
|---|---|
| I-226 | 73 |
| I-227 | 71 |
| I-228 | 55 |
| I-229 | 66 |
| I-230 | 66 |
| I-231 | 58 |
| I-232 | 65 |
| I-233 | 61 |
| I-234 | 66 |
| I-235 | 51 |
| I-236 | 30 |
| I-237 | 76 |
| I-238 | 74 |
| I-239 | 73 |
| I-240 | 71 |
| I-241 | 71 |
| I-242 | 69 |
| I-243 | 69 |
| I-244 | 68 |
| I-245 | 67 |
| I-246 | 66 |
| I-247 | 65 |
| I-248 | 64 |
| I-249 | 63 |
| I-250 | 63 |
| I-251 | 62 |
| I-252 | 62 |
| I-253 | 61 |
| I-254 | 61 |
| I-255 | 61 |
| I-256 | 61 |
| I-257 | 61 |
| I-258 | 61 |
| I-259 | 60 |
| I-260 | 60 |
| I-261 | 60 |
| I-262 | 59 |
| I-263 | 59 |
| I-264 | 59 |
| I-265 | 58 |
| I-266 | 58 |
| I-267 | 58 |
| I-268 | 58 |
| I-269 | 57 |
| I-270 | 57 |
| I-271 | 56 |
| I-272 | 52 |
| I-273 | 52 |
| I-274 | 48 |
| I-275 | 46 |
| I-276 | 44 |
| I-277 | 44 |
| I-278 | 43 |
| I-279 | 42 |
| I-280 | 40 |
| I-281 | 39 |
| I-282 | 34 |
| I-283 | 29 |
| I-284 | 27 |
| I-285 | 17 |
| I-286 | 13 |
| I-287 | 11 |
| I-288 | |
| I-289 | |
| I-290 | |
| I-291 | |
| I-292 | |
| I-293 | |
| I-294 | |
| I-295 | |
| I-297 | |
| I-298 | |
| I-299 | |
| I-300 | |
| I-301 | |
| I-302 | |
| I-303 | |
| I-304 | |

TABLE 3-continued

| ID | % Inhibition of Apyrase |
|---|---|
| I-305 | |
| I-306 | |
| I-307 | |
| I-308 | |
| I-309 | |
| I-310 | |
| I-311 | |
| I-312 | |
| I-313 | |
| I-314 | |
| I-315 | |
| I-316 | 69 |
| I-317 | 69 |
| I-318 | 68 |
| I-319 | 67 |
| I-320 | 62 |
| I-321 | 57 |
| I-322 | 47 |
| I-323 | 42 |
| I-324 | 41 |
| I-325 | 34 |
| I-326 | 13 |
| I-327 | |
| I-328 | |
| I-329 | 65 |
| I-330 | 65 |
| I-331 | 64 |
| I-332 | 60 |
| I-333 | 48 |
| I-334 | 40 |
| I-335 | 30 |
| I-336 | |
| I-337 | 73 |
| I-338 | 69 |
| I-339 | 69 |
| I-340 | 65 |
| I-341 | 64 |
| I-342 | 63 |
| I-343 | 59 |
| I-344 | 56 |
| I-345 | 53 |
| I-346 | 53 |
| I-347 | 52 |
| I-348 | 48 |
| I-349 | |
| I-350 | 66 |
| I-351 | 53 |
| I-352 | 48 |
| I-353 | 44 |
| I-354 | 43 |
| I-355 | 43 |
| I-356 | 10 |
| I-357 | |
| I-358 | |
| I-359 | |
| I-360 | |
| I-361 | |
| I-362 | |
| I-363 | |
| I-364 | |
| I-365 | |
| I-366 | |
| I-367 | |
| I-368 | |
| I-369 | |
| I-370 | |
| I-371 | |
| I-372 | |
| I-373 | 71 |
| I-374 | 48 |
| I-375 | 43 |
| I-376 | 35 |
| I-377 | 20 |
| I-378 | |
| I-379 | |
| I-380 | 73 |
| I-381 | 72 |
| I-382 | 69 |

TABLE 3-continued

| ID | % Inhibition of Apyrase |
|---|---|
| I-383 | 66 |
| I-384 | 66 |
| I-385 | 65 |
| I-386 | 65 |
| I-387 | 65 |
| I-388 | 63 |
| I-389 | 63 |
| I-390 | 62 |
| I-391 | 62 |
| I-392 | 59 |
| I-393 | 57 |
| I-394 | 54 |
| I-395 | 51 |
| I-396 | 50 |
| I-397 | 45 |
| I-398 | 44 |
| I-399 | 43 |
| I-400 | 41 |
| I-401 | 41 |
| I-402 | 40 |
| I-403 | 38 |
| I-404 | 38 |
| I-405 | 35 |
| I-406 | 30 |
| I-407 | 30 |
| I-408 | 30 |
| I-409 | 30 |
| I-410 | 29 |
| I-411 | 21 |
| I-412 | 18 |
| I-413 | 16 |
| I-414 | 15 |
| I-415 | 13 |
| I-416 | 13 |
| I-417 | |
| I-418 | |
| I-419 | |
| I-420 | |
| I-421 | |
| I-422 | |
| I-423 | |
| I-424 | |
| I-425 | |
| I-426 | |
| I-427 | |
| I-428 | |
| I-429 | 73 |
| I-430 | 72 |
| I-431 | 68 |
| I-432 | 66 |
| I-433 | 65 |
| I-434 | 65 |
| I-435 | 64 |
| I-436 | 64 |
| I-437 | 64 |
| I-438 | 63 |
| I-439 | 63 |
| I-440 | 62 |
| I-441 | 62 |
| I-442 | 61 |
| I-443 | 61 |
| I-444 | 61 |
| I-445 | 61 |
| I-446 | 61 |
| I-447 | 61 |
| I-448 | 61 |
| I-449 | 61 |
| I-450 | 61 |
| I-451 | 60 |
| I-452 | 60 |
| I-453 | 60 |
| I-454 | 60 |
| I-455 | 60 |
| I-456 | 60 |
| I-457 | 60 |
| I-458 | 60 |
| I-459 | 60 |
| I-460 | 60 |

TABLE 3-continued

| ID | % Inhibition of Apyrase |
|---|---|
| I-461 | 59 |
| I-462 | 59 |
| I-463 | 59 |
| I-464 | 59 |
| I-465 | 59 |
| I-466 | 59 |
| I-467 | 59 |
| I-468 | 59 |
| I-469 | 59 |
| I-470 | 59 |
| I-471 | 59 |
| I-472 | 59 |
| I-473 | 59 |
| I-474 | 59 |
| I-475 | 59 |
| I-476 | 58 |
| I-477 | 58 |
| I-478 | 58 |
| I-479 | 58 |
| I-480 | 58 |
| I-481 | 58 |
| I-482 | 58 |
| I-483 | 58 |
| I-484 | 58 |
| I-485 | 58 |
| I-486 | 58 |
| I-487 | 58 |
| I-488 | 58 |
| I-489 | 58 |
| I-490 | 58 |
| I-491 | 58 |
| I-492 | 58 |
| I-493 | 58 |
| I-494 | 57 |
| I-495 | 57 |
| I-496 | 57 |
| I-497 | 57 |
| I-498 | 57 |
| I-499 | 57 |
| I-500 | 57 |
| I-501 | 57 |
| I-502 | 57 |
| I-503 | 57 |
| I-504 | 57 |
| I-505 | 57 |
| I-506 | 57 |
| I-507 | 57 |
| I-508 | 57 |
| I-509 | 56 |
| I-510 | 56 |
| I-511 | 56 |
| I-512 | 56 |
| I-513 | 56 |
| I-514 | 56 |
| I-515 | 56 |
| I-516 | 56 |
| I-517 | 56 |
| I-518 | 56 |
| I-519 | 56 |
| I-520 | 56 |
| I-521 | 56 |
| I-522 | 55 |
| I-523 | 55 |
| I-524 | 55 |
| I-525 | 55 |
| I-526 | 55 |
| I-527 | 55 |
| I-528 | 55 |
| I-529 | 55 |
| I-530 | 55 |
| I-531 | 55 |
| I-532 | 55 |
| I-533 | 54 |
| I-534 | 54 |
| I-535 | 54 |
| I-536 | 54 |
| I-537 | 54 |
| I-538 | 54 |

TABLE 3-continued

| ID | % Inhibition of Apyrase |
|---|---|
| I-539 | 54 |
| I-540 | 54 |
| I-541 | 54 |
| I-542 | 54 |
| I-543 | 54 |
| I-544 | 54 |
| I-545 | 53 |
| I-546 | 53 |
| I-547 | 53 |
| I-548 | 53 |
| I-549 | 53 |
| I-550 | 53 |
| I-551 | 53 |
| I-552 | 53 |
| I-553 | 52 |
| I-554 | 52 |
| I-555 | 52 |
| I-556 | 52 |
| I-557 | 52 |
| I-558 | 52 |
| I-559 | 52 |
| I-560 | 52 |
| I-561 | 51 |
| I-562 | 51 |
| I-563 | 51 |
| I-564 | 51 |
| I-565 | 51 |
| I-566 | 51 |
| I-567 | 51 |
| I-568 | 51 |
| I-569 | 51 |
| I-570 | 51 |
| I-571 | 51 |
| I-572 | 50 |
| I-573 | 50 |
| I-574 | 49 |
| I-575 | 49 |
| I-576 | 49 |
| I-577 | 48 |
| I-578 | 48 |
| I-579 | 48 |
| I-580 | 47 |
| I-581 | 47 |
| I-582 | 47 |
| I-583 | 47 |
| I-584 | 46 |
| I-585 | 45 |
| I-586 | 44 |
| I-587 | 44 |
| I-588 | 43 |
| I-589 | 42 |
| I-590 | 42 |
| I-591 | 41 |
| I-592 | 41 |
| I-593 | 38 |
| I-594 | 36 |
| I-595 | 36 |
| I-596 | 35 |
| I-597 | 35 |
| I-598 | 31 |
| I-599 | 30 |
| I-600 | 29 |
| I-601 | 29 |
| I-602 | 28 |
| I-603 | 25 |
| I-604 | 23 |
| I-605 | 23 |
| I-606 | 16 |
| I-607 | 16 |
| I-608 | 14 |
| I-609 | 13 |
| I-610 | 4 |
| I-611 | 4 |
| I-612 | 4 |
| I-613 | 3 |
| I-614 | 1 |
| I-615 | 1 |
| I-616 | |

TABLE 3-continued

| ID | % Inhibition of Apyrase |
|---|---|
| I-617 | |
| I-618 | |
| I-619 | |
| I-620 | |
| I-621 | |
| I-622 | |
| I-623 | |
| I-624 | |
| I-625 | |
| I-626 | |
| I-627 | 71 |
| I-628 | 68 |
| I-629 | 67 |
| I-630 | 66 |
| I-631 | 62 |
| I-632 | 62 |
| I-633 | 60 |
| I-634 | 59 |
| I-635 | 58 |
| I-636 | 58 |
| I-637 | 57 |
| I-638 | 57 |
| I-639 | 56 |
| I-640 | 56 |
| I-641 | 55 |
| I-642 | 55 |
| I-643 | 55 |
| I-644 | 54 |
| I-645 | 54 |
| I-646 | 54 |
| I-647 | 53 |
| I-648 | 51 |
| I-649 | 50 |
| I-650 | 50 |
| I-651 | 50 |
| I-652 | 45 |
| I-653 | 44 |
| I-654 | 42 |
| I-655 | 35 |
| I-656 | 34 |
| I-657 | 34 |
| I-658 | 32 |
| I-659 | 31 |
| I-660 | 29 |
| I-661 | 26 |
| I-662 | 26 |
| I-663 | 25 |
| I-664 | 24 |
| I-665 | 22 |
| I-666 | 21 |
| I-667 | 12 |
| I-668 | 10 |
| I-669 | 7 |
| I-670 | 6 |
| I-671 | 2 |
| I-672 | 1 |
| I-673 | |
| I-674 | |
| I-675 | |
| I-676 | |
| I-677 | |
| I-678 | |
| I-679 | |
| I-680 | |
| I-681 | |
| I-682 | |
| I-683 | |
| I-684 | |
| I-685 | |
| I-686 | |
| I-687 | |
| I-688 | |
| I-689 | |
| I-690 | |
| I-691 | |
| I-692 | |
| I-693 | |
| I-694 | |

TABLE 3-continued

| ID | % Inhibition of Apyrase |
|---|---|
| I-695 | |
| I-696 | |
| I-697 | |
| I-698 | |
| I-699 | |
| I-700 | |
| I-701 | 79 |
| I-702 | 73 |
| I-703 | 71 |
| I-704 | 65 |
| I-705 | 64 |
| I-706 | 62 |
| I-707 | 62 |
| I-708 | 61 |
| I-709 | 61 |
| I-710 | 60 |
| I-711 | 60 |
| I-712 | 59 |
| I-713 | 58 |
| I-714 | 58 |
| I-715 | 58 |
| I-716 | 58 |
| I-717 | 58 |
| I-718 | 58 |
| I-720 | 58 |
| I-721 | 57 |
| I-722 | 57 |
| I-723 | 57 |
| I-724 | 57 |
| I-725 | 57 |
| I-726 | 56 |
| I-727 | 56 |
| I-728 | 56 |
| I-729 | 56 |
| I-730 | 55 |
| I-731 | 55 |
| I-732 | 55 |
| I-733 | 54 |
| I-734 | 54 |
| I-735 | 53 |
| I-736 | 53 |
| I-737 | 53 |
| I-738 | 52 |
| I-739 | 52 |
| I-740 | 51 |
| I-741 | 50 |
| I-742 | 50 |
| I-743 | 49 |
| I-744 | 49 |
| I-745 | 46 |
| I-746 | 45 |
| I-747 | 44 |
| I-748 | 42 |
| I-749 | 41 |
| I-750 | 41 |
| I-751 | 41 |
| I-752 | 40 |
| I-753 | 37 |
| I-754 | 36 |
| I-755 | 33 |
| I-756 | 30 |
| I-757 | 29 |
| I-758 | 28 |
| I-759 | 28 |
| I-760 | 26 |
| I-761 | 17 |
| I-762 | 16 |
| I-763 | 15 |
| I-764 | 15 |
| I-765 | 15 |
| I-766 | 14 |
| I-767 | 12 |
| I-768 | 7 |
| I-769 | 7 |
| I-770 | 6 |
| I-771 | 6 |
| I-772 | 6 |
| I-773 | 3 |

TABLE 3-continued

| ID | % Inhibition of Apyrase |
|---|---|
| I-774 | 3 |
| I-775 | 3 |
| I-776 | 1 |
| I-777 | |
| I-778 | |
| I-779 | |
| I-780 | |
| I-781 | |
| I-782 | |
| I-783 | |
| I-784 | |
| I-785 | |
| I-786 | |
| I-787 | |
| I-788 | |
| I-789 | |
| I-790 | |
| I-791 | |
| I-792 | |
| I-793 | |
| I-794 | |
| I-795 | |
| I-796 | |
| I-797 | |
| I-798 | |
| I-799 | |
| I-800 | |
| I-801 | |
| I-802 | |
| I-803 | |
| I-804 | |
| I-805 | |
| I-806 | |
| I-807 | 82 |
| I-808 | 80 |
| I-809 | 77 |
| I-810 | 75 |
| I-811 | 74 |
| I-812 | 54 |
| I-813 | 44 |
| I-814 | 39 |
| I-815 | 37 |
| I-816 | 29 |
| I-817 | 64 |
| I-818 | 60 |
| I-819 | 57 |
| I-820 | 57 |
| I-821 | 56 |
| I-822 | 54 |
| I-823 | 53 |
| I-824 | 52 |
| I-825 | 48 |
| I-826 | 40 |
| I-827 | 39 |
| I-828 | 65 |
| I-829 | 63 |
| I-830 | 60 |
| I-831 | 59 |
| I-832 | 58 |
| I-833 | 58 |
| I-834 | 54 |
| I-835 | 52 |
| I-836 | 49 |
| I-837 | 35 |
| I-838 | 29 |
| I-839 | 23 |
| I-840 | 18 |
| I-841 | 8 |
| I-842 | 5 |
| I-843 | 5 |
| I-844 | 5 |
| I-845 | 1 |
| I-846 | |
| I-847 | |
| I-848 | |
| I-849 | |
| I-850 | |
| I-851 | |

TABLE 3-continued

| ID | % Inhibition of Apyrase |
|---|---|
| I-852 | |
| I-853 | |
| I-854 | |
| I-855 | 82 |
| I-856 | 79 |
| I-857 | 76 |
| I-858 | 76 |
| I-859 | 72 |
| I-860 | 71 |
| I-861 | 68 |
| I-862 | 61 |
| I-863 | 59 |
| I-864 | 59 |
| I-865 | 59 |
| I-866 | 58 |
| I-867 | 58 |
| I-868 | 58 |
| I-869 | 57 |
| I-870 | 57 |
| I-871 | 56 |
| I-872 | 56 |
| I-873 | 56 |
| I-874 | 56 |
| I-875 | 55 |
| I-876 | 54 |
| I-877 | 54 |
| I-878 | 54 |
| I-879 | 53 |
| I-880 | 53 |
| I-881 | 53 |
| I-882 | 53 |
| I-883 | 51 |
| I-884 | 48 |
| I-885 | 47 |
| I-886 | 43 |
| I-887 | 43 |
| I-888 | 43 |
| I-889 | 39 |
| I-890 | 32 |
| I-891 | 30 |
| I-892 | 29 |
| I-893 | 20 |
| I-894 | 18 |
| I-895 | 10 |
| I-896 | |
| I-897 | |
| I-898 | 65 |
| I-899 | 65 |
| I-900 | 65 |
| I-901 | 64 |
| I-902 | 64 |
| I-903 | 62 |
| I-904 | 62 |
| I-905 | 61 |
| I-906 | 61 |
| I-907 | 61 |
| I-908 | 61 |
| I-909 | 60 |
| I-910 | 60 |
| I-911 | 59 |
| I-912 | 59 |
| I-913 | 59 |
| I-914 | 59 |
| I-915 | 59 |
| I-916 | 58 |
| I-917 | 58 |
| I-918 | 58 |
| I-919 | 58 |
| I-920 | 57 |
| I-921 | 57 |
| I-922 | 57 |
| I-923 | 57 |
| I-924 | 57 |
| I-925 | 56 |
| I-926 | 56 |
| I-927 | 56 |
| I-928 | 56 |
| I-929 | 55 |

TABLE 3-continued

| ID | % Inhibition of Apyrase |
|---|---|
| I-930 | 55 |
| I-931 | 55 |
| I-932 | 55 |
| I-933 | 53 |
| I-934 | 53 |
| I-935 | 52 |
| I-936 | 52 |
| I-937 | 52 |
| I-938 | 51 |
| I-939 | 50 |
| I-940 | 50 |
| I-941 | 50 |
| I-942 | 49 |
| I-943 | 48 |
| I-944 | 47 |
| I-945 | 44 |
| I-946 | 44 |
| I-947 | 43 |
| I-948 | 43 |
| I-949 | 42 |
| I-950 | 39 |
| I-951 | 38 |
| I-952 | 36 |
| I-953 | 26 |
| I-954 | 25 |
| I-955 | 23 |
| I-956 | 22 |
| I-957 | 20 |
| I-958 | 19 |
| I-959 | 17 |
| I-960 | 14 |
| I-961 | 14 |
| I-962 | 11 |
| I-963 | 10 |
| I-964 | 10 |
| I-965 | 3 |
| I-966 | |
| I-967 | |
| I-968 | |
| I-969 | |
| I-970 | |
| I-971 | 67 |
| I-972 | 66 |
| I-973 | 63 |
| I-974 | 63 |
| I-975 | 62 |
| I-976 | 60 |
| I-977 | 59 |
| I-978 | 59 |
| I-979 | 58 |
| I-980 | 58 |
| I-981 | 57 |
| I-982 | 57 |
| I-985 | 57 |
| I-986 | 56 |
| I-987 | 55 |
| I-988 | 55 |
| I-989 | 54 |
| I-990 | 53 |
| I-991 | 53 |
| I-992 | 49 |
| I-993 | 48 |
| I-994 | 47 |
| I-995 | 46 |
| I-996 | 46 |
| I-997 | 43 |
| I-998 | 34 |
| I-999 | 29 |
| I-1000 | 28 |
| I-1001 | 16 |
| I-1002 | 3 |
| I-1003 | 47 |
| I-1004 | 46 |
| I-1005 | |

TABLE 3-continued

| ID | % Inhibition of Apyrase |
|---|---|
| I-1006 | 42 |
| I-1007 | 33 |
| I-1008 | 29 |
| I-1009 | 26 |

With reference to Table 3, percent inhibition of apyrase is reported as the rounded average of two assay results. A blank cell indicates either <10% observed inhibition or a large difference between repetitions. In certain examples, the lack of observed inhibition is due to a lack of solubility of the compound under assay conditions, rather than a lack of apyrase inhibitory activity.

Method 2: In Vitro Assessment of Combination Activity

Selected compounds were assessed in combination with fungicides against a range of commercially important plant pathogenic fungi.

The test was conducted as follows. A fungicide was applied to a fungal plant pathogen at a rate slightly below that at which it gave any control, in combination with a suitable dose of the test compound. The test compound was recorded as active if control of the pathogen was observed.

In more detail, the test was conducted as follows. For each combination of fungicide, pathogen and test compound, the following wells were used. Well 1 contained a fungal pathogen growing on agar, and a fungicide at a rate just below that at which it gave any control of the pathogen. Well 2 was the same as Well 1, except that the test compound was also added at Rate 1. Well 3 was the same as Well 2, except that the test compound was added at Rate 2, where Rate 2 was higher than Rate 1. Finally, as a benchmark, Well 4 was the same as Well 1, except that it contained the fungicide at a higher rate, at which it gave partial control of the pathogen. Each of the Wells 1 to 4 were run in duplicate, giving a total of 8 wells for each combination of fungicide, pathogen and test compound. For each well, after a suitable period of incubation, a visual assessment of the % control of the pathogen by the fungicide was made. Test compounds were scored as inactive, active or highly active.

The following fungicides were used in this assay: azoxystrobin, fluxapyroxad, and desthio prothioconazole. The following fungal pathogens were used in this assay: First, a strain of *Zymoseptoria tritici* with a reduced susceptibility to strobilurin fungicides; second a strain of *Zymoseptoria tritici* with a reduced susceptibility to SDHI fungicides (i.e., those that inhibit succinate dehydrogenase); and third, *Microdochium nivale*. In this assay, Roux Compound 13 exhibited activity in only one combination, enhancing the activity of azoxystrobin against *Microdochium nivale*, but failing to enhance activity of any fungicide against either of the *Zymoseptoria tritici* strains. In contrast. present compound I-234, which inhibited 66% of apyrase activity in Method 1, was effective in the combination assay, enhancing fungicidal activity of desthio prothioconazole against all three strains and fluxapyroxad against *Zymoseptoria tritici* with a reduced susceptibility to SDHI fungicides and *Microdochium nivale.*

Surprisingly, exemplary compounds showed significant activity in the combination assay where Roux Compound 13 demonstrated little or no activity. Working examples disclosed herein exhibited superior enhancer activity than Roux Compound 13, including, compounds I-2, I-16, I-18, I-178, I-186, I-191, I-198, I-201, I-209, I-213, I-217, I-219, I-221, I-222, I-226, I-229, I-233, I-234, I-236, I-239, I-317, 1-318, 1-319, 1-342, 1-351, 1-385, 1-387, 1-388, 1-391, 1-392, 1-701 and I-807.

By way of additional example, Compound I-392, which inhibited 59% of apyrase activity in Method 1, enhanced the activity of azoxystrobin against *Zymoseptoria tritici* with a reduced susceptibility to strobilurin fungicides and against *Zymoseptoria tritici* with a reduced susceptibility to SDHI fungicides. Compound I-392 was highly active in enhancing the efficacy of desthio prothioconazole against *Zymoseptoria tritici* with a reduced susceptibility to strobilurin fungicides, *Zymoseptoria tritici* with a reduced susceptibility to SDHI fungicides, and against *Microdochium nivale*.

Method 3: Greenhouse Crop Tests

In this method, exemplary compounds were evaluated for their ability to control *Zymoseptoria tritici* on wheat, *Botrytis cinerea* on tomatoes, Asian Soya Rust (*Phakopsora pachyrhizi*) on soybean, and Brown Rust (*Puccinia recondita*) on wheat, in a controlled greenhouse environment in combination with one of four fungicides, Amistar, Imtrex, Proline or Balaya. In these studies, soybean cultivar Siverka, tomato (Money maker) and wheat plants (JB Diego) were used. Seeds were sown in 9 cm diameter pots to a depth of 1 to 2 cm using Petersfield potting compost (75% medium grade peat, 12% screened sterilized loam, 3% medium grade vermiculite, 10% grit (5 mm screened, lime free), 1.5 kg PG mix per m3, lime to pH5.5-6.0 and wetting agent (Vitax Ultrawet 200 ml per m3) and germinated/grown at 23 C under a 16 h day/8 h night light regime. Plants were treated two to three weeks after sowing when they were at the BBCH 11 growth stage (first pair of true leaves (unifoliate) unfolded. A track sprayer was used to treat the plants with the mixture of commercial fungicide and test compound using a water volume of 200 L/ha. Plants were inoculated with the appropriate fungi (pathogen) 24 hours after treatment. Fungal pathogens used were *Botrytis cinerea* (Grey mold on tomato plants), *Zymoseptoria tritici* (*Septoria* leaf blotch on wheat plants), *Puccinia* triticina (Brown rust on wheat plants) and *Phakopsora pachyrhizi* (Asian soy rust on soybean plants). Four replicates were used for each combination of fungicide, pathogen and test compound. Each plant was evaluated once the disease symptoms were fully expressed between seven to twenty days (depending on the pathogen) for % control of the disease. Appropriate controls were used for all experiments, including an ‘inoculation check’ wherein plants were inoculated with their specific pathogen to assess disease levels. Also, each commercial fungicide was tested on its own as a part of each treatment, this being benchmark against which the experimental compounds were evaluated. Exemplary compounds demonstrated enhanced disease control in combination with fungicides as compared to disease control observed with fungicide alone. That is, the present compounds, although not fungicidal by themselves, enhance the activity of fungicides, thus the enhancer compounds work synergistically in combination with fungicides to control disease.

In these studies the fungicide was applied at the following rates

| | Amistar | Imtrex | Proline | Balaya |
|---|---|---|---|---|
| *Zymoseptoria tritici* | 0.1 L/ha | 0.02 L/ha | 0.0075 L/ha | 0.0015 L/ha |
| *Botrytis* | 0.03 L/ha | 0.005 L/ha | 0.00075 L/ha | 0.0015 L/ha |
| Asian Soya Rust | 0.02 L/ha | 0.05 L/ha | 0.15 L/ha | 0.03 L/ha |
| Brown Rust | 0.04 L/ha | 0.45 L/ha | 0.15 L/ha | 0.25 L/ha |

In this method, working examples enhanced the activity of Amistar against Brown Rust on wheat by significant amounts relative to the activity of Amistar alone. Compounds 1-708, 1-741, I-871, I-932, I-939, I-460, I-552, I-553, I-573, I-629, I-712, I-731 and I-832 all provided greater than 70% additional disease control benefit in combination with Amistar over Amistar alone. Compounds I-424, I-595, I-627, I-628, I-652, I-826 and I-904 provided greater than 50% additional Brown Rust control relative to Amistar alone.

Working example I-826 provided greater than 50% additional Brown Rust control benefit on wheat in combination with Imtrex over Imtrex alone, and working example I-595 provided greater than 40% additional disease control over Imtrex alone. Working examples 1-708, 1-731, 1-741, 1-932, 1-832 and I-1003 all provided greater than 30% additional Brown Rust control benefit in combination with Imtrex over Imtrex alone.

Working examples I-207, I-595, I-708 and I-628 enhanced the activity of Balaya against Brown Rust on wheat by over 70% over Balaya alone. Working examples 1-221, 1-331, 1-639, 1-708, 1-741, I-932, 1-731, 1-331, 1-627, 1-652, 1-826 and I-1003 all provided greater than 40% additional Brown Rust control benefit in combination with Balaya over Balaya alone.

Examples of the presently described enhancer compounds were particularly effective in enhancing the activity of Amistar against Asian Soya Rust. Compounds 1-236, 1-186, 1-387, 1-222, 1-392, I-198 and I-234 provided greater than 80% additional disease control benefit in combination with Amistar over Amistar alone. Examples of the presently described enhancer compounds also enhanced the activity of Imtrex against Asian Soya Rust, with compounds 1-236, 1-186, 1-387, 1-234 and I-317 all providing moderate enhancement of at least 20% in combination with Imtrex over Imtrex alone. Compounds I-234 and I-236 enhanced the activity of Proline against Asian Soya Rust by at least 30%, compound I-222 by greater than 60% and compound I-198 by over 90%.

Examples of the presently described enhancer compounds also were effective in enhancing the activity of fungicides against *Zymoseptoria tritici* with compounds I-385 providing greater than 40% enhancement of Imtrex and compounds I-198 and I-239 providing about 30% enhancement over Imtrex alone. Compound I-388 provided greater than 45% enhancement of Balaya against *Zymoseptoria tritici*.

Examples of the presently described enhancer compounds also were effective in enhancing the activity of fungicides against *Botrytis cinerea* with compounds I-236, I-387 and I-213 providing about 30% enhancement in combination with Imtrex over Imtrex alone, and compounds I-186 and I-222 providing greater than 40% enhancement of Imtrex. Compound I-198 was effective at enhancing disease control with Proline, providing greater than 40% benefit over the fungicide alone. The present enhancers were particularly effective against *Botrytis* in combination with Balaya with compounds I-213, I-392, I-198 and I-388 each enhancing disease control with this fungicide by more than 40%.

VIII. Methods for Making Enhancer Compounds

Exemplary enhancer compounds were purchased from commercial suppliers, such as Enamine, located at Industriepark Hoechst, G837. 65926 Frankfurt am Main Germany. Other compounds were prepared consistent with the methods set forth below:

Synthesis of Enhancer Compounds ylcarbodiimide hydrochloride (EDC·HCl) and 91.6 mg (0.75 mmol) 4-dimethylaminopyridine (DMAP) in 2 ml dichloromethane are added 92.3 mg (0.75 mmol) of the requisite aniline and the mixture stirred at ambient temperature for 5 min. Then this solution is added to the acid (0.5 mmol) and the mixture stirred at ambient temperature for 18 hours. The mixture is purified by column chromatography on silica gel, or ion-exchange chromatography.

The above reaction can use other coupling reagents such as PyBOP and other bases, such as DIPEA (for example, see, WO2010101964).

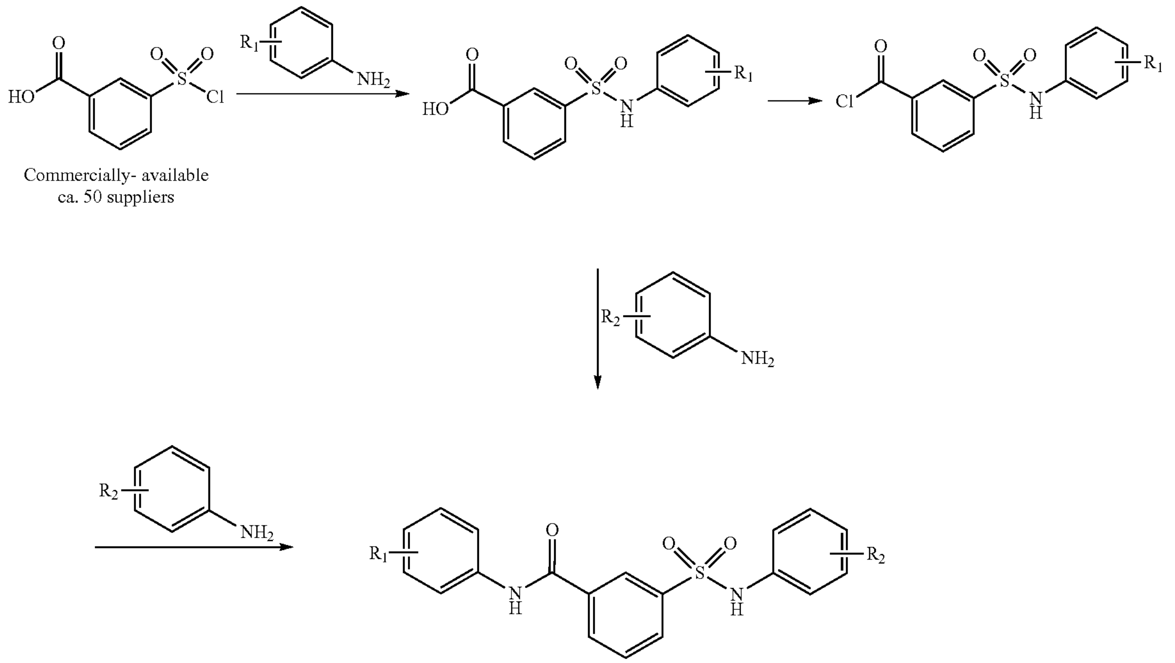

Step 1: (from Journal of Medicinal Chemistry 2012, 55, 7746-7758). A solution of 3-(chlorosulfonyl)benzoic acid (95) (1 eq.) in dry $CH_2Cl_2$ is treated with $Et_3N$ (1.5 eq.) and the requisite aniline (1.2 eq.) and stirred at rt until completion. Solvent is removed under reduced pressure and the crude is purified by flash-column chromatography.

(From US20130053369). A mixture of 3-(chlorosulfonyl) benzoic acid, and the requisite aniline, in pyridine is stirred at rt overnight, and then the reaction mixture is concentrated under reduced pressure. The obtained residue is purified by silica gel column chromatography to obtain the product.

Step 2: (From WO2001074786). Oxalyl chloride (1.1 mL) and DMF (10 drops) are added to a mixture of the acid (8.4 mmol) in DCM (40 ml) under an atmosphere of nitrogen and the reaction is stirred at rt for 2 h. The solvent is removed in vacuo to give the title compound. The above step can also use thionyl chloride, or sulfuryl chloride for the transformation.

Step 3: (From Current Drug Discovery Technologies 2020, 17, 338-347). A mixture of the benzoyl chloride (0.01 mol) and requisite aniline (0.015 mol) in chloroform is refluxed until completion of the reaction. The mixture is concentrated and purified by column chromatography, or recrystallization.

Alternative step: (From WO2009016088). To a mixture of 143.8 mg (0.75 mmol)N-(3-dimethylaminopropyl)-N'-eth- Alternative Synthesis of Enhancer Compounds Enhancer compounds also can be synthesized in the following manner, using a 'two-step, one-pot' transformation from a commercially available acid chloride/sulfonyl chloride and two commercially available anilines.

One-Pot Methodology

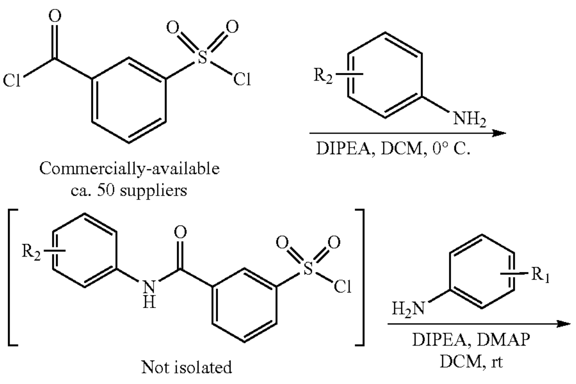

-continued

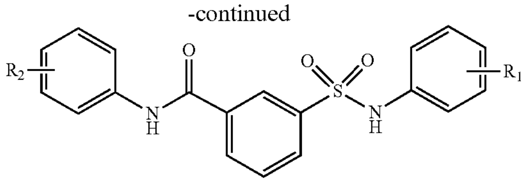

The synthesis utilizes methodology from *Tetrahedron* 2013, 69, 2640-2646 & *Izvestiya Vysshikh Uchebnykh Zavedenii, Khimiya i Khimicheskaya Tekhnologiya* 1996, 39, 82-84. The first step, reaction of a commercial acid chloride/sulfonyl chloride with a substituted aniline-$R_1$, is detailed in the *Tetrahedron* paper (Table 2, entry 6). The second step would use a substituted aniline-$R_2$, a different nucleophile to that used in the *Tetrahedron* paper. It should be noted that two distinct anilines are used in the *Izvestiya Vysshikh Uchebnykh Zavedenii, Khimiya i Khimicheskaya Tekhnologiya* paper. Importantly, selectivity is reported to be high because the acid chloride is substantially more reactive than the sulfonyl chloride.

A representative experimental procedure for this one-pot/two-step procedure (consistent with the *Tetrahedron* paper) is detailed below:

Substituted aniline-$R_1$ (0.675 mmol; 1 equiv.) is dissolved in $CH_2Cl_2$ (1 mL), followed by addition of DIPEA (1 equiv.) at 0° C. Then, m-(chlorosulfonyl)benzoyl chloride (1 equiv.) in a solution of $CH_2Cl_2$ (1 mL) is added to the reaction mixture by syringe, drop-wise. After reacting for 30 min, the ice bath is removed. DIPEA (1 equiv) DMAP (0.1 equiv.), substituted aniline-$R_2$ (1 equiv.) are added to the solution at 25° C. The reaction is checked by TLC until the starting material is completely converted to product (1 h). After removal of $CH_2Cl_2$ under reduced pressure, the crude mixture can be purified by recrystallization or by column chromatography.

APPENDIX 1

| MOA | TARGET SITE AND CODE | GROUP NAME | CHEMICAL OR BIOLOGICAL GROUP | COMMON NAME | COMMENTS | FRAC CODE |
|---|---|---|---|---|---|---|
| A: nucleic acids metabolism | A1 RNA polymerase I | PA - fungicides (PhenylAmides) | acylalanines | benalaxyl<br>benalaxyl-M (=kiralaxyl)<br>furalaxyl<br>metalaxyl<br>metalaxyl-M (=mefenoxam) | Resistance and cross resistance well known in various Oomycetes but mechanism unknown.<br>High risk.<br>See FRAC Phenylamide Guidelines for resistance management | 4 |
| | | | oxazolidinones | oxadixyl | | |
| | | | butyrolactones | ofurace | | |
| | A2 adenosin-deaminase | hydroxy-(2-amino-) pyrimidines | hydroxy-(2-amino-) pyrimidines | bupirimate<br>dimethirimol<br>ethirimol | Medium risk. Resistance and cross resistance known in powdery mildews.<br>Resistance management required. | 8 |
| | A3 DNA/RNA synthesis (proposed) | heteroaromatics | isoxazoles<br>isothiazolones | hymexazole<br>octhilinone | Resistance not known. | 32 |
| | A4 DNA topoisomerase type II (gyrase) | carboxylic acids | carboxylic acids | oxolinic acid | Bactericide. Resistance known.<br>Risk in fungi unknown.<br>Resistance management required. | 31 |
| | A5 inhibition of dihydroorotate dehydrogenase within de novo pyrimidine biosynthesis | DHODHI-fungicides | phenyl-propanol | ipflufenoquin | Medium to high risk. | 52 |
| B: Cytoskeleton and motor protein | B1 tubulin polymerization | MBC - fungicides (Methyl Benzimidazole Carbamates) | benzimidazoles | benomyl<br>carbendazim<br>fuberidazole<br>thiabendazole | Resistance common in many fungal species. Several target site mutations, mostly E198A/G/K, F200Y in β-tubulin gene.<br>Positive cross resistance between the group members.<br>Negative cross resistance to N-phenyl carbamates.<br>High risk.<br>See FRAC Benzimidazole Guidelines for resistance management. | 1 |
| | | | thiophanates | thiophanate<br>thiophanate-methy | | |
| | B2 tubulin polymerization | N-phenyl carbamates | N-phenyl carbamates | diethofencarb | Resistance known. Target site mutation E198K. Negative cross resistance to benzimidazoles.<br>High risk.<br>Resistance management required. | 10 |

APPENDIX 1-continued

| | | | | | | |
|---|---|---|---|---|---|---|
| | B3<br>tubulin<br>polymerization | benzamides<br>thiazole<br>carboxamide | toluamides<br>ethylamino-thiazole-<br>carboxamide | zoxamide<br>ethaboxam | Low to medium risk.<br>Resistance management<br>required. | 22 |
| | B4<br>cell division<br>(unknown site) | phenylureas | phenylureas | pencycuron | Resistance not known. | 20 |
| | B5<br>delocalisation of<br>spectrin-like<br>proteins | benzamides | pyridinylmethyl-<br>benzamides | fluopicolide<br>fluopimomide | Resistant isolates detected in<br>grapevine downy mildew.<br>Medium risk.<br>Resistance management<br>required | 43 |
| | B6<br>actin/myosin/fimbrin<br>function | cyanoacrylates | aminocyanoacrylates | phenamacril | Resistance known in *Fusarium*<br>*graminearum*. Target site<br>mutations in the gene coding for<br>myosin-5 found in lab studies.<br>Medium to high risk.<br>Resistance management<br>required. | 47 |
| | | aryl-phenyl-<br>ketones | benzophenone<br>benzoylpyridine | metrafenone<br>pyriofenone | Less sensitive isolates detected<br>in powdery mildews<br>(*Blumeria* and *Sphaerotheca*)<br>Medium risk.<br>Resistance management<br>required.<br>Reclassified from U8 in 2018 | 50 |
| | B7<br>tubulin dynamics<br>modulator | pyridazine | pyridazine | pyridachlometyl | High risk. | 53 |
| C.<br>respiration | C1<br>complex I NADH<br>oxido-reductase | pyrimidinamines<br>pyrazole-MET1<br><br>Quinazoline | pyrimidinamines<br>pyrazole-5-<br>carboxamides<br>quinazoline | diflumetorim<br>tolfenpyrad<br><br>fenazaquin | Resistance not known. | 39 |
| | C2<br>complex II:<br>succinate-dehydro-<br>genase | SDHI<br>(Succinate-<br>dehydrogenase<br>inhibitors) | phenyl-benzamides<br><br><br>phenyl-oxo-ethyl<br>thiophene amide<br>pyridinyl-ethyl-<br>benzamides<br>phenyl-cyclobutyl-<br>pyridineamide<br>furan- carboxamides<br>oxathiin-<br>carboxamides<br>thiazole-<br>carboxamides<br>pyrazole-4-<br>carboxamides | benodanil<br>flutolanil<br>mepronil<br>isofetamid<br><br>fluopyram<br><br>cyclobutrifluram<br><br>fenfuram<br>carboxin<br>oxycarboxin<br>thifluzamide<br><br>benzovindiflupyr<br>bixafen<br>fluindapyr<br>fluxapyroxad<br>furametpyr<br>inpyrfluxam<br>isopyrazam | Resistance known for several<br>fungal species in field<br>populations and lab mutants.<br>Target site mutations in sdh<br>gene, e.g. H/Y (or H/L) at 257,<br>267, 272 or P225L, dependent<br>on fungal species.<br>Resistance management<br>required.<br>Medium to high risk.<br>See FRAC SDHI Guidelines<br>for resistance management. | 7 |

APPENDIX 1-continued

| | | | | | | |
|---|---|---|---|---|---|---|
| | | | | penflufen<br>penthiopyrad<br>sedaxane | | |
| | | | N-cyclopropyl-N-benzyl-pyrazole-carboxamides | isoflucypram | | |
| | | | N-methoxy-(phenyl-ethyl)-pyrazole-carboxamides | pydiflumetofen | | |
| | | | pyridine-carboxamides | boscalid | | |
| | | | pyrazine-carboxamides | pyraziflumid | | |
| C. respiration | C3<br>complex III:<br>cytochrome bc1<br>(ubiquinol oxidase)<br>at Qo site (cyt b<br>gene) | QoI-fungicides<br>(Quinone outside<br>Inhibitors) | methoxy-acrylates | azoxystrobin<br>coumoxystrobin<br>enoxastrobin<br>flufenoxystrobin<br>picoxystrobin<br>pyraoxystrobin | Resistance known in various fungal species. Target site mutations in cyt b gene (G143A, F129L) and additional mechanisms.<br>Cross resistance shown between all members of the Code 11 fungicides.<br>High risk.<br>See FRAC QoI Guidelines for resistance management. | 11 |
| | | | methoxy-acetamide | mandestrobin | | |
| | | | methoxy-carbamates | pyraclostrobin<br>pyrametostrobin<br>triclopyricarb | | |
| | | | oximino-acetates | kresoxim-methyl<br>trifloxystrobin | | |
| | | | oximino-acetamides | dimoxystrobin<br>fenaminstrobin<br>metominostrobin<br>orysastrobin | | |
| | | | oxazolidine-diones | famoxadone | | |
| | | | dihydro-dioxazines | fluoxastrobin | | |
| | | | imidazolinones | fenamidone | | |
| | | | benzyl-carbamates | pyribencarb | | |
| | | QoI-fungicides<br>(Quinone outside<br>Inhibitors;<br>Subgroup A) | tetrazolinones | metyltetraprole | Resistance not known. Not cross resistant with Code 11 fungicides on G143A mutants.<br>High risk.<br>See FRAC QoI Guidelines for resistance management. | 11A |
| C: respiration<br>(continued) | C4<br>complex III:<br>cytochrome bc1<br>(ubiquinone<br>reductase) at Qi site | QiI - fungicides<br>(Quinone inside<br>Inhibitors) | cyano-imidazole<br>sulfamoyl-triazole<br>picolinamides | cyazofamid<br>amisulbrom<br>fenpicoxamid<br>florylpicoxamid | Resistance risk unknown but assumed to be medium to high (mutations at target site known in model organisms).<br>Resistance management required. | 21 |

APPENDIX 1-continued

| | | | | | | |
|---|---|---|---|---|---|---|
| | | | | | No spectrum overlap with the Oomycete-fungicides cyazofamid and amisulbrom | |
| | C5 uncouplers of oxidative phos-phorylation | | dinitrophenyl-crotonates | binapacryl meptyldinocap dinocap | Resistance not known. Also acaricidal activity. | 29 |
| | | | 2,6-dinitro-anilines (pyr.-hydrazones) | fluazinam (ferimzone) | Low risk. However, resistance claimed in *Botrytis* in Japan. Reclassified to U 14 in 2012. | |
| | C6 inhibitors of oxidative phos-phorylation, ATP synthase | organo tin compounds | tri-phenyl tin compounds | fentin acetate fentin chloride fentin hydroxide | Some resistance cases known. Low to medium risk. | 30 |
| | C7 ATP transport (proposed) | thiophene-carboxamides | thiophene-carboxamides | silthiofam | Resistance reported. Risk low. | 38 |
| | C8 complex III: cytochrome bc1 (ubiquinone reductase) at Qo site, stigmatellin binding sub-site | QoSI fungicides (Quinone outside Inhibitor, stigmatellin binding type) | triazolo-pyrimidylamine | ametoctradin | Not cross resistant to QoI fungicides. Resistance risk assumed to be medium to high (single site inhibitor). Resistance management required. | 45 |
| D: amino acids and protein synthesis | D1 methionine biosynthesis (proposed) (cgs gene) | AP - fungicides (Anilino-Pyrimidines) | anilino-pyrimidines | cyprodinil mepanipyrim pyrimethanil | Resistance known in *Botrytis* and *Venturia*, sporadically in *Oculimacula*. Medium risk. See FRAC Anilinopyrimidine Guidelines for resistance management. | 9 |
| | D2 protein synthesis (ribosome, termination step) | enopyranuronic acid antibiotic | enopyranuronic acid antibiotic | blasticidin-S | Low to medium risk. Resistance management required. | 23 |
| | D3 protein synthesis (ribosome, initiation step) | hexopyranosyl antibiotic | hexopyranosyl antibiotic | kasugamycin | Resistance known in fungal and bacterial (*P. glumae*) pathogens. Medium risk. Resistance management required. | 24 |
| | D4 protein synthesis (ribosome, initiation step) | glucopyranosyl antibiotic | glucopyranosyl antibiotic | streptomycin | Bactericide. Resistance known. High risk. Resistance management required. | 25 |
| | D5 protein synthesis (ribosome, elongation step) | tetracycline antibiotic | tetracycline antibiotic | oxytetracycline | Bactericide. Resistance known. High risk. Resistance management required. | 41 |
| E: signal transduction | E1 signal transduction (mechanism unknown) | aza-naphthalenes | aryloxyquinoline quinazolinone | quinoxyfen proquinazid | Resistance to quinoxyfen known. Medium risk. Resistance management required. Cross resistance | 13 |

APPENDIX 1-continued

| | | | | | | |
|---|---|---|---|---|---|---|
| | | | | | found in *Erysiphe* (*Uncinula*) *necator* but not in *Blumeria graminis*. | |
| | E2 MAP/Histidine-Kinase in osmotic signal transduction (os-2, HOG1) | PP-fungicides (PhenylPyrroles) | phenylpyrroles | fenpiclonil fludioxonil | Resistance found sporadically, mechanism speculative. Low to medium risk. Resistance management required. | 12 |
| | E3 MAP/Histidine-Kinase in osmotic signal transduction (os-1, Daf1) | dicarboximides | dicarboximides | chlozolinate dimethachlone iprodione procymidone vinclozolin | Resistance common in *Botrytis* and some other pathogens. Several mutations in OS-1, mostly I365S. Cross resistance common between the group members. Medium to high risk. See FRAC Dicarboximide Guidelines for resistance management | 2 |
| F: lipid synthesis or transport/membrane integrity or function | F1 | | | formerly dicarboximides | | |
| | F2 phospholipid biosynthesis, methyltransferase | phosphoro-thiolates | phosphoro-thiolates | edifenphos iprobenfos (IBP) pyrazophos | Resistance known in specific fungi. Low to medium risk. Resistance management required if used for risky pathogens. | 6 |
| | | Dithiolanes | dithiolanes | isoprothiolane | | |
| | F3 cell peroxidation (proposed) | AH-fungicides (Aromatic Hydrocarbons) (chlorophenyls, nitroanilines) | aromatic hydrocarbons | biphenyl chloroneb dicloran quintozene (PCNB) tecnazene (TCNB) tolclofos-methyl | Resistance known in some fungi. Low to medium risk. Cross resistance patterns complex due to different activity spectra. | 14 |
| | | heteroaromatics | 1,2,4-thiadiazoles | etridiazole | | |
| | F4 cell membrane permeability, fatty acids (proposed) | Carbamates | carbamates | iodocarb propamocarb prothiocarb | Low to medium risk. Resistance management required. | 28 |
| | F5 | | | formerly CAA-fungicides | | |
| | F6 microbial disrupters of pathogen cell membranes | | | formerly *Bacillus amyloliquefaciens* strains (FRAC Code 44); reclassified to BM02 in 2020 | | |
| | F7 cell membrane disruption | | | formerly extract from *Melaleuca alternifolia* (tea tree oil) and plant oils (eugenol, geraniol, thymol) FRAC Code 46, reclassified to BM01 in 2021 | | |
| | F8 ergosterol binding | Polyene | amphoteric macrolide antifungal antibiotic from *Streptomyces natalensis* or *S. chattanoogensis* | natamycin (pimaricin) | Resistance not known. Agricultural, food and topical medical uses. | 48 |

APPENDIX 1-continued

| | | | | | | |
|---|---|---|---|---|---|---|
| | F9<br>lipid homeostasis and transfer/storage | OSBPI<br>oxysterol binding protein homologue inhibition | piperidinyl-thiazole-isoxazolines | oxathiapiprolin<br>fluoxapiprolin | Resistance risk assumed to be medium to high (single site inhibitor). Resistance management required.<br>(Previously U15). | 49 |
| | F10<br>interaction with lipid fraction of the cell membrane, with multiple effects on cell membrane integrity | protein fragment | polypeptide | polypeptide<br>ASFBIOF01-02 | Resistance not known. | 51 |
| G: sterol biosynthesis in membranes | G1<br>C14- demethylase in sterol biosynthesis (erg11/cyp51) | DMI-fungicides (DeMethylation Inhibitors)<br>(SBI: Class I) | piperazines | triforine | There are big differences in the activity spectra of DMI fungicides.<br>Resistance is known in various fungal species. Several resistance mechanisms are known incl. target site mutations in cyp51 (erg 11) gene, e.g. V136A, Y137F, A379G, I381V; cyp51 promotor; ABC transporters and others.<br>Generally wise to accept that cross resistance is present between DMI fungicides active against the same fungus.<br>DMI fungicides are Sterol Biosynthesis Inhibitors (SBIs), but show no cross resistance to other SBI classes.<br>Medium risk.<br>See FRAC SBI Guidelines for resistance management. | 3 |
| | | | pyridines | pyrifenox<br>pyrisoxazole | | |
| | | | pyrimidines | fenarimol<br>nuarimol | | |
| | | | imidazoles | imazalil<br>oxpoconazole<br>pefurazoate<br>prochloraz<br>triflumizole | | |
| | | | triazoles | azaconazole<br>bitertanol<br>bromuconazole<br>cyproconazole<br>difenoconazole<br>diniconazole<br>epoxiconazole<br>etaconazole<br>fenbuconazole<br>fluquinconazole<br>flusilazole<br>flutriafol<br>hexaconazole<br>imibenconazole<br>ipconazole<br>mefentrifluconazole<br>metconazole<br>myclobutanil<br>penconazole<br>propiconazole<br>simeconazole<br>tebuconazole<br>tetraconazole<br>triadimefon<br>triadimenol<br>triticonazole | | |
| | | | triazolinthiones | prothioconazole | | |
| | G2<br>$\Delta^{14}$-reductase and $\Delta^{8} \rightarrow \Delta^{7-}$ | amines<br>("morpholines")<br>(SBI: Class II) | morpholines | aldimorph<br>dodemorph<br>fenpropimorph<br>tridemorph | Decreased sensitivity for powdery mildews.<br>Cross resistance within the group generally found but not | 5 |

APPENDIX 1-continued

| | | | | | | |
|---|---|---|---|---|---|---|
| | isomerase in sterol biosynthesis (erg24, erg2) | | piperidines<br>spiroketal-amines | fenpropidin<br>piperalin<br>spiroxamine | to other SBI classes<br>Low to medium risk.<br>See FRAC SBI Guidelines for resistance management | |
| | G3<br>3-keto reductase, C4- de-methylation (erg27) | KRI fungicides (KetoReductase Inhibitors)<br>(SBI: Class III) | hydroxyanilides<br>amino-pyrazolinone | fenhexamid<br>fenpyrazamine | Low to medium risk.<br>Resistance management required. | 17 |
| | G4<br>squalene-epoxidase in sterol biosynthesis (erg1) | (SBI class IV) | thiocarbamates<br>allylamines | pyributicarb<br>naftifine<br>terbinafine | Resistance not known, fungicidal and herbicidal activity.<br>Medical fungicides only. | 18 |
| H: cell wall biosynthesis | H3 | | Formerly glucopyranosyl antibiotic (validamycin) | | reclassified to U18 | 26 |
| | H4<br>chitin synthase | polyoxins | peptidyl pyrimidine nucleoside | polyoxin | Resistance known.<br>Medium risk.<br>Resistance management required. | 19 |
| | H5<br>cellulose synthase | CAA-fungicides (Carboxylic Acid Amides) | cinnamic acid amides<br><br><br>valinamide carbamates<br><br>mandelic acid amides | dimethomorph<br>flumorph<br>pyrimorph<br>benthiavalicarb<br>iprovalicarb<br>valifenalate<br>mandipropamid | Resistance known in *Plasmopara viticola* but not in *Phytophthora infestans*.<br>Cross resistance between all members of the CAA group.<br>Low to medium risk.<br>See FRAC CAA Guidelines for resistance management. | 40 |
| I: melanin synthesis in cell wall | I1<br>reductase in melanin biosynthesis | MBI-R (Melanin Biosynthesis Inhibitors - Reductase) | isobenzo-furanone<br>pyrrolo-quinolinone<br>triazolobenzo-thiazole | fthalide<br>pyroquilon<br>tricyclazole | Resistance not known. | 16.1 |
| | I2<br>dehydratase in melanin biosynthesis | MBI-D (Melanin Biosynthesis Inhibitors - Dehydratase) | cyclopropane-carboxamide<br>carboxamide<br>propionamide | carpropamid<br><br>diclocymet<br>fenoxanil | Resistance known.<br>Medium risk.<br>Resistance management required. | 16.2 |
| | I3<br>polyketide synthase in melanin biosynthesis | MBI-P (Melanin Biosynthesis Inhibitors - Polyketide synthase) | trifluoroethyl-carbamate | tolprocarb | Resistance not known.<br>Additional activity against bacteria and fungi through induction of host plant defence | 16.3 |
| P: host plant defence induction | P 01<br>salicylate-related | benzo-thiadiazole (BTH) | benzo-thiadiazole (BTH) | acibenzolar-S-methyl | Resistance not known. | P 01 |
| | P 02<br>salicylate-related | benzisothiazole | benzisothiazole | probenazole (also antibacterial and antifungal activity) | Resistance not known. | P 02 |
| | P 03<br>salicylate-related | thiadiazole-carboxamide | thiadiazole-carboxamide | tiadinil<br>isotianil | Resistance not known. | P 03 |

APPENDIX 1-continued

| | | | | | | |
|---|---|---|---|---|---|---|
| | P 04 polysaccharide elicitors | natural compound | polysaccharides | laminarin | Resistance not known. | P 04 |
| | P 05 anthraquinone elicitors | plant extract | complex mixture, ethanol extract (anthraquinones, resveratrol) | extract from *Reynoutria sachalinensis* (giant knotweed) | Resistance not known. | P 05 |
| | P 06 microbial elicitors | microbial | bacterial *Bacillus* spp.<br>fungal *Saccharomyces* spp. | *Bacillus mycoides* isolate J<br>cell walls of *Saccharomyces cerevisiae* strain LAS117 | Resistance not known. | P 06 |
| | P 07 phosphonates | phosphonates | ethyl phosphonates | fosetyl-Al<br>phosphorous acid and salts | Few resistance cases reported in few pathogens.<br>Low risk.<br>Reclassified from U33 in 2018 | P07 |
| | P 08 salicylate-related | isothiazole | isothiazolylmethyl ether | dichlobentiazox | activates SAR both up- and downstream of SA.<br>Resistance not known. | P 08 |
| U: Unknown mode of action (U numbers not appearing in the list derive from reclassified fungicides) | unknown | cyanoacetamide-oxime | cyanoacetamide-oxime | cymoxanil | Resistance claims described.<br>Low to medium risk.<br>Resistance management required. | 27 |
| | formerly phosphonates (FRAC code 33), reclassified to P 07 in 2018 | | | | | |
| | unknown | phthalamic acids | phthalamic acids | tecloftalam (Bactericide) | Resistance not known. | 34 |
| | unknown | benzotriazines | benzotriazines | triazoxide | Resistance not known. | 35 |
| | unknown | benzene-pyridazinones | benzene-pyridazinones | flusulfamide | Resistance not known. | 36 |
| | unknown | | | diclomezine | Resistance not known. | 37 |
| | formerly methasulfocarb (FRAC code 42), reclassified to M 12 in 2018 | | | | | |
| | unknown | phenyl-acetamide | phenyl-acetamide | cyflufenamid | Resistance in *Sphaerotheca*.<br>Resistance management required | U 06 |
| | cell membrane disruption (proposed) | guanidines | guanidines | dodine | Resistance known in *Venturia inaequalis*.<br>Low to medium risk.<br>Resistance management recommended. | U 12 |
| | unknown | thiazolidine | cyano-methylene-thiazolidines | flutianil | Resistance in *Sphaerotheca* and *Podosphaera xanthii*.<br>Resistance management required. | U 13 |
| | unknown | pyrimidinone-hydrazones | pyrimidinone-hydrazones | ferimzone | Resistance not known (previously C5). | U 14 |
| | complex III: cytochrome bc1, unknown binding site (proposed) | 4-quinolyl-acetate | 4-quinolyl-acetates | tebufloquin | Not cross resistant to QoI.<br>Resistance risk unknown but assumed to be medium.<br>Resistance management required. | U 16 |

APPENDIX 1-continued

| | | | | | | |
|---|---|---|---|---|---|---|
| | Unknown | tetrazolyloxime | tetrazolyloximes | picarbutrazox | Resistance not known. Not cross resistant to PA, QoI, CAA. | U 17 |
| | Unknown (Inhibition of trehalase) | glucopyranosyl antibiotic | glucopyranosyl antibiotics | validamycin | Resistance not known. Induction of host plant defense by trehalose proposed (previously H3). | U 18 |
| Not specified | Unknown | diverse | diverse | mineral oils, organic oils, inorganic salts, material of biological origin | Resistance not known. | NC |
| M: Chemicals with multi-site activity | multi-site contact activity | inorganic (electrophiles) | inorganic | copper (different salts) | Also applies to organic copper complexes | M 01 |
| | | inorganic (electrophiles) | inorganic | sulphur | generally considered as a low risk group without any signs of | M 02 |
| | | dithiocarbamates and relatives (electrophiles) | dithio-carbamates and relatives | amobam<br>ferbam<br>mancozeb<br>maneb<br>metiram<br>propineb<br>thiram<br>zinc thiazole<br>zineb<br>ziram | resistance developing to the fungicides. | M 03 |
| | | phthalimides (electrophiles) | phthalimides | captan<br>captafol<br>folpet | | M 04 |
| | | chloronitriles (phthalonitriles) (unspecified mechanism) | chloronitriles (phthalonitriles) | chlorothalonil | | M 05 |
| | | sulfamides (electrophiles) | sulfamides | dichlofluanid<br>tolylfluanid | | M 06 |
| | | bis-guanidines (membrane disruptors, detergents) | bis-guanidines | guazatine<br>iminoctadine | | M 07 |
| | | triazines (unspecified mechanism) | triazines | anilazine | | M 08 |
| | | quinones (anthraquinones) (electrophiles) | quinones (anthraquinones) | dithianon | | M 09 |
| | | quinoxalines (electrophiles) | quinoxalines | chinomethionat/ quinomethionate | | M 10 |
| | | maleimide (electrophiles) | maleimide | fluoroimide | | M 11 |
| | | thiocarbamate (electrophiles) | thiocarbamate | methasulfocarb | reclassified from U42 in 2018 | M 12 |

APPENDIX 1-continued

| MOA | TARGET SITE | GROUP NAME | CHEMICAL OR BIOLOGICAL GROUP | COMMON NAME | COMMENTS | FRAC CODE |
|---|---|---|---|---|---|---|
| BM: Biologicals with multiple modes of action: Plant extracts | multiple effects on ion membrane transporters; chelating effects | plant extract | polypeptide (lectin) | extract from the cotyledons of lupine plantlets ("BLAD") | Resistance not known. (previously M12). | BM 01 |
| | affects fungal spores and germ tubes, induced plant defense | plant extract | phenols, sesquiterpenes, triterpenoids, coumarins | extract from *Swinglea glutinosa* | Resistance not known. | |
| | cell membrane disruption, cell wall, induced plant defense mechanisms | plant extract | terpene hydrocarbons, terpene alcohols and terpene phenols | extract from *Melaleuca alternifolia* (tea tree oil) plant oils (mixtures): eugenol, geraniol, thymol | Resistance not known. (previously F7) | |
| BM: Biologicals with multiple modes of action: Microbial (living microbes, extracts or metabolites) | multiple effects described (examples, not all apply to all biological groups): competition, mycoparasitism, antibiosis, membrane disruption by fungicidal lipopeptides, lytic enzymes, induced plant defence | microbial (strains of living microbes or extract, metabolites) | fungal *Trichoderma* spp. | *T. atroviride* strain I-1237 strain LU132 strain SC1 strain SKT-1 strain 77B *T. asperellum* strain T34 strain kd *T. harzianum* strain T-22 *T. virens* strain G-41 | nomenclature change from *Gliocladium catenulatum* to *Clonostachys rosea* Resistance not known. *Bacillus amyloliquefaciens* reclassified from F6, Code 44 in 2020 synonyms for *Bacillus amyloliquefaciens* are *Bacillus subtilis* and *B. subtilis* var. *amyloliquefaciens* (previous taxonomic classification). | BM 02 |
| | | | fungal *Clonostachys* spp. | *C. rosea* strain J1446 strain CR-7 | | |
| | | | fungal *Coniothyrium* spp. | *C. minitans* strain CON/M/91-08 | | |
| | | | fungal *Hanseniaspora* spp. | *H. uvarum* strain BC18Y | | |
| | | | fungal *Talaromyces* spp. | *T. flavus* strain SAY-Y-94-01 | | |
| | | | fungal *Saccharomyces* spp. | *S. cerevisae* strain LAS02 | | |

APPENDIX 1-continued

| | |
|---|---|
| | strain DDSF623 |
| bacterial | *B. amyloliquefaciens* |
| *Bacillus* spp. | strain QST713 |
| | strain FZB24 |
| | strain MBI600 |
| | strain D747 |
| | strain F727 |
| | strain AT-332 |
| | *B. subtilis* |
| | strain AFS032321 |
| | strain Y1336 |
| | strain HAI-0404 |
| bacterial | PHC25279 |
| *Erwinia* spp. | |
| (peptide) | |
| bacterial | *G. cerinus* |
| *Gluconobacter* spp. | strain BC18B |
| bacterial | *P. chlororaphis* |
| *Pseudomonas* spp. | strain AFS009 |
| bacterial | *S. griseovirides* |
| *Streptomyces* spp. | strain K61 |
| | *S. lydicus* |
| | strain WYEC108 |

APPENDIX 2

| MODE OF ACTION | CHEMICAL CLASSIFICATION | ACTIVE |
|---|---|---|
| Inhibition of Acetyl CoA Carboxylase | Cyclohexanediones (DIMs) | Alloxydim |
| Inhibition of Acetyl CoA Carboxylase | Cyclohexanediones (DIMs) | Butroxydim |
| Inhibition of Acetyl CoA Carboxylase | Cyclohexanediones (DIMs) | Clethodim |
| Inhibition of Acetyl CoA Carboxylase | Cyclohexanediones (DIMs) | Cloproxydim |
| Inhibition of Acetyl CoA Carboxylase | Cyclohexanediones (DIMs) | Cycloxydim |
| Inhibition of Acetyl CoA Carboxylase | Cyclohexanediones (DIMs) | Profoxydim |
| Inhibition of Acetyl CoA Carboxylase | Cyclohexanediones (DIMs) | Sethoxydim |
| Inhibition of Acetyl CoA Carboxylase | Cyclohexanediones (DIMs) | Tepraloxydim |
| Inhibition of Acetyl CoA Carboxylase | Cyclohexanediones (DIMs) | Tralkoxydim |
| Inhibition of Acetyl CoA Carboxylase | Aryloxyphenoxy-propionates (FOPs) | Clodinafop-propargyl |
| Inhibition of Acetyl CoA Carboxylase | Aryloxyphenoxy-propionates (FOPs) | Clofop |
| Inhibition of Acetyl CoA Carboxylase | Aryloxyphenoxy-propionates (FOPs) | Cyhalofop-butyl |
| Inhibition of Acetyl CoA Carboxylase | Aryloxyphenoxy-propionates (FOPs) | Diclofop-methyl |
| Inhibition of Acetyl CoA Carboxylase | Aryloxyphenoxy-propionates (FOPs) | Fenoxaprop-ethyl |
| Inhibition of Acetyl CoA Carboxylase | Aryloxyphenoxy-propionates (FOPs) | Fenthiaprop |
| Inhibition of Acetyl CoA Carboxylase | Aryloxyphenoxy-propionates (FOPs) | Fluazifop-butyl |
| Inhibition of Acetyl CoA Carboxylase | Aryloxyphenoxy-propionates (FOPs) | Haloxyfop-methyl |
| Inhibition of Acetyl CoA Carboxylase | Aryloxyphenoxy-propionates (FOPs) | Isoxapyrifop |
| Inhibition of Acetyl CoA Carboxylase | Aryloxyphenoxy-propionates (FOPs) | Metamifop |
| Inhibition of Acetyl CoA Carboxylase | Aryloxyphenoxy-propionates (FOPs) | Quizalofop-ethyl |
| Inhibition of Acetyl CoA Carboxylase | Phenylpyrazoline | Pinoxaden |
| Inhibition of Acetolactate Synthase | Pyrimidinyl benzoates | Bispyribac-sodium |
| Inhibition of Acetolactate Synthase | Pyrimidinyl benzoates | Pyribenzoxim (prodrug of bispyribac) |
| Inhibition of Acetolactate Synthase | Pyrimidinyl benzoates | Pyriftalid |
| Inhibition of Acetolactate Synthase | Pyrimidinyl benzoates | Pyriminobac-methyl |
| Inhibition of Acetolactate Synthase | Pyrimidinyl benzoates | Pyrithiobac-sodium |
| Inhibition of Acetolactate Synthase | Sulfonanilides | Pyrimisulfan |
| Inhibition of Acetolactate Synthase | Sulfonanilides | Triafamone |
| Inhibition of Acetolactate Synthase | Triazolopyrimidine - Type 1 | Cloransulam-methyl |
| Inhibition of Acetolactate Synthase | Triazolopyrimidine - Type 1 | Diclosulam |
| Inhibition of Acetolactate Synthase | Triazolopyrimidine - Type 1 | Florasulam |
| Inhibition of Acetolactate Synthase | Triazolopyrimidine - Type 1 | Flumetsulam |
| Inhibition of Acetolactate Synthase | Triazolopyrimidine - Type 1 | Metosulam |
| Inhibition of Acetolactate Synthase | Triazolopyrimidine - Type 2 | Penoxsulam |
| Inhibition of Acetolactate Synthase | Triazolopyrimidine - Type 2 | Pyroxsulam |
| Inhibition of Acetolactate Synthase | Sulfonylureas | Amidosulfuron |
| Inhibition of Acetolactate Synthase | Sulfonylureas | Azimsulfuron |
| Inhibition of Acetolactate Synthase | Sulfonylureas | Bensulfuron-methyl |
| Inhibition of Acetolactate Synthase | Sulfonylureas | Chlorimuron-ethyl |

APPENDIX 2-continued

| MODE OF ACTION | CHEMICAL CLASSIFICATION | ACTIVE |
|---|---|---|
| Inhibition of Acetolactate Synthase | Sulfonylureas | Chlorsulfuron |
| Inhibition of Acetolactate Synthase | Sulfonylureas | Cinosulfuron |
| Inhibition of Acetolactate Synthase | Sulfonylureas | Cyclosulfamuron |
| Inhibition of Acetolactate Synthase | Sulfonylureas | Ethametsulfuron-methyl |
| Inhibition of Acetolactate Synthase | Sulfonylureas | Ethoxysulfuron |
| Inhibition of Acetolactate Synthase | Sulfonylureas | Flazasulfuron |
| Inhibition of Acetolactate Synthase | Sulfonylureas | Flucetosulfuron |
| Inhibition of Acetolactate Synthase | Sulfonylureas | Flupyrsulfuron-methyl-Na |
| Inhibition of Acetolactate Synthase | Sulfonylureas | Foramsulfuron |
| Inhibition of Acetolactate Synthase | Sulfonylureas | Halosulfuron-methyl |
| Inhibition of Acetolactate Synthase | Sulfonylureas | Imazosulfuron |
| Inhibition of Acetolactate Synthase | Sulfonylureas | Iodosulfuron-methyl-Na |
| Inhibition of Acetolactate Synthase | Sulfonylureas | Mesosulfuron-methyl |
| Inhibition of Acetolactate Synthase | Sulfonylureas | Metazosulfuron |
| Inhibition of Acetolactate Synthase | Sulfonylureas | Metsulfuron-methyl |
| Inhibition of Acetolactate Synthase | Sulfonylureas | Nicosulfuron |
| Inhibition of Acetolactate Synthase | Sulfonylureas | Orthosulfamuron |
| Inhibition of Acetolactate Synthase | Sulfonylureas | Oxasulfuron |
| Inhibition of Acetolactate Synthase | Sulfonylureas | Primisulfuron-methyl |
| Inhibition of Acetolactate Synthase | Sulfonylureas | Propyrisulfuron |
| Inhibition of Acetolactate Synthase | Sulfonylureas | Prosulfuron |
| Inhibition of Acetolactate Synthase | Sulfonylureas | Pyrazosulfuron-ethyl |
| Inhibition of Acetolactate Synthase | Sulfonylureas | Rimsulfuron |
| Inhibition of Acetolactate Synthase | Sulfonylureas | Sulfometuron-methyl |
| Inhibition of Acetolactate Synthase | Sulfonylureas | Sulfosulfuron |
| Inhibition of Acetolactate Synthase | Sulfonylureas | Triasulfuron |
| Inhibition of Acetolactate Synthase | Sulfonylureas | Tribenuron-methyl |
| Inhibition of Acetolactate Synthase | Sulfonylureas | Thifensulfuron-methyl |
| Inhibition of Acetolactate Synthase | Sulfonylureas | Trifloxysulfuron-Na |
| Inhibition of Acetolactate Synthase | Sulfonylureas | Triflusulfuron-methyl |
| Inhibition of Acetolactate Synthase | Sulfonylureas | Tritosulfuron |
| Inhibition of Acetolactate Synthase | Imidazolinones | Imazamethabenz-methyl |
| Inhibition of Acetolactate Synthase | Imidazolinones | Imazamox |
| Inhibition of Acetolactate Synthase | Imidazolinones | Imazapic |
| Inhibition of Acetolactate Synthase | Imidazolinones | Imazapyr |
| Inhibition of Acetolactate Synthase | Imidazolinones | Imazaquin |
| Inhibition of Acetolactate Synthase | Imidazolinones | Imazethapyr |
| Inhibition of Acetolactate Synthase | Triazolinones | Flucarbazone-Na |
| Inhibition of Acetolactate Synthase | Triazolinones | Propoxycarbazone-Na |

APPENDIX 2-continued

| MODE OF ACTION | CHEMICAL CLASSIFICATION | ACTIVE |
|---|---|---|
| Inhibition of Acetolactate Synthase | Triazolinones | Thiencarbazone-methyl |
| Inhbition of Photosynthesis at PSII - Serine 264 Binders | Triazines | Atraton |
| Inhbition of Photosynthesis at PSII - Serine 264 Binders | Triazines | Atrazine |
| Inhbition of Photosynthesis at PSII - Serine 264 Binders | Triazines | Ametryne |
| Inhbition of Photosynthesis at PSII - Serine 264 Binders | Triazines | Aziprotryne = aziprotryn |
| Inhbition of Photosynthesis at PSII - Serine 264 Binders | Triazines | Chlorazine |
| Inhbition of Photosynthesis at PSII - Serine 264 Binders | Triazines | CP 17029 |
| Inhbition of Photosynthesis at PSII - Serine 264 Binders | Triazines | Cyanazine |
| Inhbition of Photosynthesis at PSII - Serine 264 Binders | Triazines | Cyprazine |
| Inhbition of Photosynthesis at PSII - Serine 264 Binders | Triazines | Desmetryne |
| Inhbition of Photosynthesis at PSII - Serine 264 Binders | Triazines | Dimethametryn |
| Inhbition of Photosynthesis at PSII - Serine 264 Binders | Triazines | Dipropetryn |
| Inhbition of Photosynthesis at PSII - Serine 264 Binders | Triazines | Eglinazine-ethyl |
| Inhbition of Photosynthesis at PSII - Serine 264 Binders | Triazines | Ipazine |
| Inhbition of Photosynthesis at PSII - Serine 264 Binders | Triazines | Methoprotryne = methoprotryn |
| Inhbition of Photosynthesis at PSII - Serine 264 Binders | Triazines | procyazine |
| Inhbition of Photosynthesis at PSII - Serine 264 Binders | Triazines | Proglinazine-ethyl |
| Inhbition of Photosynthesis at PSII - Serine 264 Binders | Triazines | Prometon |
| Inhbition of Photosynthesis at PSII - Serine 264 Binders | Triazines | Prometryne |
| Inhbition of Photosynthesis at PSII - Serine 264 Binders | Triazines | Propazine |
| Inhbition of Photosynthesis at PSII - Serine 264 Binders | Triazines | Sebuthylazine |
| Inhbition of Photosynthesis at PSII - Serine 264 Binders | Triazines | Secbumeton |
| Inhbition of Photosynthesis at PSII - Serine 264 Binders | Triazines | Simetryne |
| Inhbition of Photosynthesis at PSII - Serine 264 Binders | Triazines | Simazine |
| Inhbition of Photosynthesis at PSII - Serine 264 Binders | Triazines | Terbumeton |
| Inhbition of Photosynthesis at PSII - Serine 264 Binders | Triazines | Terbuthylazine |
| Inhbition of Photosynthesis at PSII - Serine 264 Binders | Triazines | Terbutryne |
| Inhbition of Photosynthesis at PSII - Serine 264 Binders | Triazines | Trietazine |
| Inhbition of Photosynthesis at PSII - Serine 264 Binders | Triazolinone | Amicarbazone |
| Inhbition of Photosynthesis at PSII - Serine 264 Binders | Triazinones | Ethiozin |
| Inhbition of Photosynthesis at PSII - Serine 264 Binders | Triazinones | Hexazinone |
| Inhbition of Photosynthesis at PSII - Serine 264 Binders | Triazinones | Isomethiozin |
| Inhbition of Photosynthesis at PSII - Serine 264 Binders | Triazinones | Metamitron |
| Inhbition of Photosynthesis at PSII - Serine 264 Binders | Triazinones | Metribuzin |
| Inhbition of Photosynthesis at PSII - Serine 264 Binders | Uracils | Bromacil |
| Inhbition of Photosynthesis at PSII - Serine 264 Binders | Uracils | Isocil |
| Inhbition of Photosynthesis at PSII - Serine 264 Binders | Uracils | Lenacil |
| Inhbition of Photosynthesis at PSII - Serine 264 Binders | Uracils | Terbacil |
| Inhbition of Photosynthesis at PSII - Serine 264 Binders | Phenlcarbamates | Chlorprocarb |

APPENDIX 2-continued

| MODE OF ACTION | CHEMICAL CLASSIFICATION | ACTIVE |
|---|---|---|
| Inhbition of Photosynthesis at PSII - Serine 264 Binders | Phenlcarbamates | Desmedipham |
| Inhbition of Photosynthesis at PSII - Serine 264 Binders | Phenlcarbamates | Phenisopham |
| Inhbition of Photosynthesis at PSII - Serine 264 Binders | Phenlcarbamates | Phenmedipham |
| Inhbition of Photosynthesis at PSII - Serine 264 Binders | Pyridazinone | Chloridazon (=pyrazon) |
| Inhbition of Photosynthesis at PSII - Serine 264 Binders | Pyridazinone | Brompyrazon |
| Inhbition of Photosynthesis at PSII - Serine 264 Binders | Ureas | Benzthiazuron |
| Inhbition of Photosynthesis at PSII - Serine 264 Binders | Ureas | Bromuron |
| Inhbition of Photosynthesis at PSII - Serine 264 Binders | Ureas | Buturon |
| Inhbition of Photosynthesis at PSII - Serine 264 Binders | Ureas | Chlorbromuron |
| Inhbition of Photosynthesis at PSII - Serine 264 Binders | Ureas | Chlorotoluron |
| Inhbition of Photosynthesis at PSII - Serine 264 Binders | Ureas | Chloroxuron |
| Inhbition of Photosynthesis at PSII - Serine 264 Binders | Ureas | Difenoxuron |
| Inhbition of Photosynthesis at PSII - Serine 264 Binders | Ureas | Dimefuron |
| Inhbition of Photosynthesis at PSII - Serine 264 Binders | Ureas | Diuron |
| Inhbition of Photosynthesis at PSII - Serine 264 Binders | Ureas | Ethidimuron |
| Inhbition of Photosynthesis at PSII - Serine 264 Binders | Ureas | Fenuron |
| Inhbition of Photosynthesis at PSII - Serine 264 Binders | Ureas | Fluometuron |
| Inhbition of Photosynthesis at PSII - Serine 264 Binders | Ureas | Fluothiuron |
| Inhbition of Photosynthesis at PSII - Serine 264 Binders | Ureas | Isoproturon |
| Inhbition of Photosynthesis at PSII - Serine 264 Binders | Ureas | Isouron |
| Inhbition of Photosynthesis at PSII - Serine 264 Binders | Ureas | Linuron |
| Inhbition of Photosynthesis at PSII - Serine 264 Binders | Ureas | Metobenzuron |
| Inhbition of Photosynthesis at PSII - Serine 264 Binders | Ureas | Metobromuron |
| Inhbition of Photosynthesis at PSII - Serine 264 Binders | Ureas | Methabenzthiazuron |
| Inhbition of Photosynthesis at PSII - Serine 264 Binders | Ureas | Metoxuron |
| Inhbition of Photosynthesis at PSII - Serine 264 Binders | Ureas | Monolinuron |
| Inhbition of Photosynthesis at PSII - Serine 264 Binders | Ureas | Monuron |
| Inhbition of Photosynthesis at PSII - Serine 264 Binders | Ureas | Neburon |
| Inhbition of Photosynthesis at PSII - Serine 264 Binders | Ureas | Parafluron |
| Inhbition of Photosynthesis at PSII - Serine 264 Binders | Ureas | Siduron |
| Inhbition of Photosynthesis at PSII - Serine 264 Binders | Ureas | Tebuthiuron |
| Inhbition of Photosynthesis at PSII - Serine 264 Binders | Ureas | Thiazafluron |
| Inhbition of Photosynthesis at PSII - Serine 264 Binders | Amides | Chloranocryl = dicryl |
| Inhbition of Photosynthesis at PSII - Serine 264 Binders | Amides | Pentanochlor |
| Inhbition of Photosynthesis at PSII - Serine 264 Binders | Amides | Propanil |
| Inhbition of Photosynthesis at PSII - Histidine 215 Binders | Nitriles | Bromofenoxim |
| Inhbition of Photosynthesis at PSII - Histidine 215 Binders | Nitriles | Bromoxynil |
| Inhbition of Photosynthesis at PSII - Histidine 215 Binders | Nitriles | Ioxynil |
| Inhbition of Photosynthesis at PSII - Histidine 215 Binders | Phenyl-pyridazines | Pyridate |

APPENDIX 2-continued

| MODE OF ACTION | CHEMICAL CLASSIFICATION | ACTIVE |
|---|---|---|
| Inhbition of Photosynthesis at PSII - Histidine 215 Binders | Benzothiadiazinone | Bentazon |
| PS I Electron Diversion | Pyridiniums | Cyperquat |
| PS I Electron Diversion | Pyridiniums | Diquat |
| PS I Electron Diversion | Pyridiniums | Morfamquat |
| PS I Electron Diversion | Pyridiniums | Paraquat |
| Inhibition of Protoporphyrinogen Oxidase | Diphenyl ethers | Lactofen |
| Inhibition of Protoporphyrinogen Oxidase | Diphenyl ethers | Acifluorfen |
| Inhibition of Protoporphyrinogen Oxidase | Diphenyl ethers | Bifenox |
| Inhibition of Protoporphyrinogen Oxidase | Diphenyl ethers | Chlornitrofen |
| Inhibition of Protoporphyrinogen Oxidase | Diphenyl ethers | Fomesafen |
| Inhibition of Protoporphyrinogen Oxidase | Diphenyl ethers | Fluorodifen |
| Inhibition of Protoporphyrinogen Oxidase | Diphenyl ethers | Fluoroglycofen-ethyl |
| Inhibition of Protoporphyrinogen Oxidase | Diphenyl ethers | Fluoronitrofen |
| Inhibition of Protoporphyrinogen Oxidase | Diphenyl ethers | Nitrofen |
| Inhibition of Protoporphyrinogen Oxidase | Diphenyl ethers | Oxyfluorfen |
| Inhibition of Protoporphyrinogen Oxidase | Diphenyl ethers | Chlomethoxyfen |
| Inhibition of Protoporphyrinogen Oxidase | Phenylpyrazoles | Pyraflufen-ethyl |
| Inhibition of Protoporphyrinogen Oxidase | N-Phenyl-oxadiazolones | Oxadiargyl |
| Inhibition of Protoporphyrinogen Oxidase | N-Phenyl-oxadiazolones | Oxadiazon |
| Inhibition of Protoporphyrinogen Oxidase | N-Phenyl-triazolinones | Azafenidin |
| Inhibition of Protoporphyrinogen Oxidase | N-Phenyl-triazolinones | Carfentrazone-ethyl |
| Inhibition of Protoporphyrinogen Oxidase | N-Phenyl-triazolinones | Sulfentrazone |
| Inhibition of Protoporphyrinogen Oxidase | N-Phenyl-imides (procide acitive form) | Fluthiacet-methyl |
| Inhibition of Protoporphyrinogen Oxidase | N-Phenyl-imides | Butafenacil |
| Inhibition of Protoporphyrinogen Oxidase | N-Phenyl-imides | Saflufenacil |
| Inhibition of Protoporphyrinogen Oxidase | N-Phenyl-imides | Pentoxazone |
| Inhibition of Protoporphyrinogen Oxidase | N-Phenyl-imides | Chlorphthalim |
| Inhibition of Protoporphyrinogen Oxidase | N-Phenyl-imides | Cinidon-ethyl |
| Inhibition of Protoporphyrinogen Oxidase | N-Phenyl-imides | Flumiclorac-pentyl |
| Inhibition of Protoporphyrinogen Oxidase | N-Phenyl-imides | Flumioxazin |
| Inhibition of Protoporphyrinogen Oxidase | N-Phenyl-imides | Flumipropyn |
| Inhibition of Protoporphyrinogen Oxidase | N-Phenyl-imides | Trifludimoxazin |
| Inhibition of Protoporphyrinogen Oxidase | N-Phenyl-imides | Tiafenacil |
| Inhibition of Protoporphyrinogen Oxidase | Other | Pyraclonil |
| Inhibition of Phytoene Desaturase | Phenyl ethers | Beflubutamid |
| Inhibition of Phytoene Desaturase | Phenyl ethers | Diflufenican |
| Inhibition of Phytoene Desaturase | Phenyl ethers | Picolinafen |
| Inhibition of Phytoene Desaturase | N-Phenyl heterocycles | Flurochloridone |
| Inhibition of Phytoene Desaturase | N-Phenyl heterocycles | Norflurazon |
| Inhibition of Phytoene Desaturase | Diphenyl heterocycles | Fluridone |
| Inhibition of Phytoene Desaturase | Diphenyl heterocycles | Flurtamone |

APPENDIX 2-continued

| MODE OF ACTION | CHEMICAL CLASSIFICATION | ACTIVE |
|---|---|---|
| Inhibition of Hydroxyphenyl Pyruvate Dioxygenase | Triketones | Mesotrione |
| Inhibition of Hydroxyphenyl Pyruvate Dioxygenase | Triketones | Sulcotrione |
| Inhibition of Hydroxyphenyl Pyruvate Dioxygenase | Triketones | Tembotrione |
| Inhibition of Hydroxyphenyl Pyruvate Dioxygenase | Triketones | Tefuryltrione |
| Inhibition of Hydroxyphenyl Pyruvate Dioxygenase | Triketones | Bicyclopyrone |
| Inhibition of Hydroxyphenyl Pyruvate Dioxygenase | Triketones | Fenquinotrione |
| Inhibition of Hydroxyphenyl Pyruvate Dioxygenase | Triketones (procide) | Benzobicyclon |
| Inhibition of Hydroxyphenyl Pyruvate Dioxygenase | Pyrazoles (procide) | Benzofenap |
| Inhibition of Hydroxyphenyl Pyruvate Dioxygenase | Pyrazoles | Pyrasulfotole |
| Inhibition of Hydroxyphenyl Pyruvate Dioxygenase | Pyrazoles | Topramezone |
| Inhibition of Hydroxyphenyl Pyruvate Dioxygenase | Pyrazoles (procide) | Pyrazolynate |
| Inhibition of Hydroxyphenyl Pyruvate Dioxygenase | Pyrazoles (procide) | Pyrazoxyfen |
| Inhibition of Hydroxyphenyl Pyruvate Dioxygenase | Pyrazoles | Tolpyralate |
| Inhibition of Hydroxyphenyl Pyruvate Dioxygenase | Isoxazoles | Isoxaflutole |
| Inhibition of Homogentisate Solanesyltransferase | Phenoxypyridazine | Cyclopyrimorate |
| Inhibition of Deoxy-D-Xyulose Phosphate Synthase | Isoxazolidinone | Clomazone |
| Inhibition of Deoxy-D-Xyulose Phosphate Synthase | Isoxazolidinone | Bixlozone |
| Inhibition of Enolpyruvyl Shikimate Phosphate Synthase | Glycine | Glyphosate |
| Inhibition of Glutamine Synthetase | Phosphinic acids | Glufosinate-ammonium |
| Inhibition of Glutamine Synthetase | Phosphinic acids | Bialaphos/bilanafos |
| Inhibition of Dihydropteroate Synthase | Carbamate | Asulam |
| Inhibition of Microtubule Assembly | Dinitroanilines | Benefin = benfluralin |
| Inhibition of Microtubule Assembly | Dinitroanilines | Butralin |
| Inhibition of Microtubule Assembly | Dinitroanilines | Dinitramine |
| Inhibition of Microtubule Assembly | Dinitroanilines | Ethalfluralin |
| Inhibition of Microtubule Assembly | Dinitroanilines | Fluchloralin |
| Inhibition of Microtubule Assembly | Dinitroanilines | Isopropalin |
| Inhibition of Microtubule Assembly | Dinitroanilines | Nitralin |
| Inhibition of Microtubule Assembly | Dinitroanilines | Prodiamine |
| Inhibition of Microtubule Assembly | Dinitroanilines | Profluralin |
| Inhibition of Microtubule Assembly | Dinitroanilines | Oryzalin |
| Inhibition of Microtubule Assembly | Dinitroanilines | Pendimethalin |
| Inhibition of Microtubule Assembly | Dinitroanilines | Trifluralin |
| Inhibition of Microtubule Assembly | Pyridines | Dithiopyr |
| Inhibition of Microtubule Assembly | Pyridines | Thiazopyr |
| Inhibition of Microtubule Assembly | Phosphoroamidates | Butamifos |
| Inhibition of Microtubule Assembly | Phosphoroamidates | DMPA |
| Inhibition of Microtubule Assembly | Benzoic acid | Chlorthal-dimethyl = DCPA |

APPENDIX 2-continued

| MODE OF ACTION | CHEMICAL CLASSIFICATION | ACTIVE |
|---|---|---|
| Inhibition of Microtubule Assembly | Benzamides | Propyzamide = pronamide |
| Inhibition of Microtubule Organization | Carbamates | Barban |
| Inhibition of Microtubule Organization | Carbamates | Carbetamide |
| Inhibition of Microtubule Organization | Carbamates | Chlorbufam |
| Inhibition of Microtubule Organization | Carbamates | Chlorpropham |
| Inhibition of Microtubule Organization | Carbamates | Propham |
| Inhibition of Microtubule Organization | Carbamates | Swep |
| Inhibition of Cellulose Synthesis | Triazolocarboxamide | Flupoxam |
| Inhibition of Cellulose Synthesis | Benzamides | Isoxaben |
| Inhibition of Cellulose Synthesis | Alkylazines | Triaziflam |
| Inhibition of Cellulose Synthesis | Alkylazines | Indaziflam |
| Inhibition of Cellulose Synthesis | Nitriles | Dichlobenil |
| Inhibition of Cellulose Synthesis | Nitriles | Chlorthiamid |
| Uncouplers | Dinitrophenols | Dinosam |
| Uncouplers | Dinitrophenols | Dinoseb |
| Uncouplers | Dinitrophenols | DNOC |
| Uncouplers | Dinitrophenols | Dinoterb |
| Uncouplers | Dinitrophenols | Etinofen |
| Uncouplers | Dinitrophenols | Medinoterb |
| Inhibition of Very Long-Chain Fatty Acid Synthesis | Azolyl-carboxamides | Cafenstrole |
| Inhibition of Very Long-Chain Fatty Acid Synthesis | Azolyl-carboxamides | Fentrazamide |
| Inhibition of Very Long-Chain Fatty Acid Synthesis | Azolyl-carboxamides | Ipfencarbazone |
| Inhibition of Very Long-Chain Fatty Acid Synthesis | α-Thioacetamides | Anilofos |
| Inhibition of Very Long-Chain Fatty Acid Synthesis | α-Thioacetamides | Piperophos |
| Inhibition of Very Long-Chain Fatty Acid Synthesis | Isoxazolines | Pyroxasulfone |
| Inhibition of Very Long-Chain Fatty Acid Synthesis | Isoxazolines | Fenoxasulfone |
| Inhibition of Very Long-Chain Fatty Acid Synthesis | Oxiranes | Indanofan |
| Inhibition of Very Long-Chain Fatty Acid Synthesis | Oxiranes | Tridiphane |
| Inhibition of Very Long-Chain Fatty Acid Synthesis | α-Chloroacetamides | Acetochlor |
| Inhibition of Very Long-Chain Fatty Acid Synthesis | α-Chloroacetamides | Alachlor |
| Inhibition of Very Long-Chain Fatty Acid Synthesis | α-Chloroacetamides | Allidochlor = CDAA |
| Inhibition of Very Long-Chain Fatty Acid Synthesis | α-Chloroacetamides | Butachlor |
| Inhibition of Very Long-Chain Fatty Acid Synthesis | α-Chloroacetamides | Butenachlor |
| Inhibition of Very Long-Chain Fatty Acid Synthesis | α-Chloroacetamides | Delachlor |
| Inhibition of Very Long-Chain Fatty Acid Synthesis | α-Chloroacetamides | Diethatyl-ethyl |
| Inhibition of Very Long-Chain Fatty Acid Synthesis | α-Chloroacetamides | Dimethachlor |
| Inhibition of Very Long-Chain Fatty Acid Synthesis | α-Chloroacetamides | Dimethenamid |
| Inhibition of Very Long-Chain Fatty Acid Synthesis | α-Chloroacetamides | Metazachlor |
| Inhibition of Very Long-Chain Fatty Acid Synthesis | α-Chloroacetamides | Metolachlor |
| Inhibition of Very Long-Chain Fatty Acid Synthesis | α-Chloroacetamides | Pethoxamid |
| Inhibition of Very Long-Chain Fatty Acid Synthesis | α-Chloroacetamides | Pretilachlor |
| Inhibition of Very Long-Chain Fatty Acid Synthesis | α-Chloroacetamides | Propachlor |

APPENDIX 2-continued

| MODE OF ACTION | CHEMICAL CLASSIFICATION | ACTIVE |
|---|---|---|
| Inhibition of Very Long-Chain Fatty Acid Synthesis | α-Chloroacetamides | Propisochlor |
| Inhibition of Very Long-Chain Fatty Acid Synthesis | α-Chloroacetamides | Prynachlor |
| Inhibition of Very Long-Chain Fatty Acid Synthesis | α-Chloroacetamides | Thenylchlor |
| Inhibition of Very Long-Chain Fatty Acid Synthesis | α-Oxyacetamides | Mefenacet |
| Inhibition of Very Long-Chain Fatty Acid Synthesis | α-Oxyacetamides | Flufenacet |
| Inhibition of Very Long-Chain Fatty Acid Synthesis | Thiocarbamates | Butylate |
| Inhibition of Very Long-Chain Fatty Acid Synthesis | Thiocarbamates | Cycloate |
| Inhibition of Very Long-Chain Fatty Acid Synthesis | Thiocarbamates | Dimepiperate |
| Inhibition of Very Long-Chain Fatty Acid Synthesis | Thiocarbamates | EPTC |
| Inhibition of Very Long-Chain Fatty Acid Synthesis | Thiocarbamates | Esprocarb |
| Inhibition of Very Long-Chain Fatty Acid Synthesis | Thiocarbamates | Molinate |
| Inhibition of Very Long-Chain Fatty Acid Synthesis | Thiocarbamates | Orbencarb |
| Inhibition of Very Long-Chain Fatty Acid Synthesis | Thiocarbamates | Pebulate |
| Inhibition of Very Long-Chain Fatty Acid Synthesis | Thiocarbamates | Prosulfocarb |
| Inhibition of Very Long-Chain Fatty Acid Synthesis | Thiocarbamates | Thiobencarb (=Benthiocarb) |
| Inhibition of Very Long-Chain Fatty Acid Synthesis | Thiocarbamates | Tiocarbazil |
| Inhibition of Very Long-Chain Fatty Acid Synthesis | Thiocarbamates | Tri-allate |
| Inhibition of Very Long-Chain Fatty Acid Synthesis | Thiocarbamates | Vernolate |
| Inhibition of Very Long-Chain Fatty Acid Synthesis | Benzofurans | Benfuresate |
| Inhibition of Very Long-Chain Fatty Acid Synthesis | Benzofurans | Ethofumesate |
| Auxin Mimics | Pyridine-carboxylates | Picloram |
| Auxin Mimics | Pyridine-carboxylates | Clopyralid |
| Auxin Mimics | Pyridine-carboxylates | Aminopyralid |
| Auxin Mimics | Pyridine-carboxylates | Halauxifen |
| Auxin Mimics | Pyridine-carboxylates | Florpyrauxifen |
| Auxin Mimics | Pyridyloxy-carboxylates | Triclopyr |
| Auxin Mimics | Pyridyloxy-carboxylates | Fluroxypyr |
| Auxin Mimics | Phenoxy-carboxylates | 2,4,5-T |
| Auxin Mimics | Phenoxy-carboxylates | 2,4-D |
| Auxin Mimics | Phenoxy-carboxylates | 2,4-DB |
| Auxin Mimics | Phenoxy-carboxylates | Clomeprop |
| Auxin Mimics | Phenoxy-carboxylates | Dichlorprop |
| Auxin Mimics | Phenoxy-carboxylates | Fenoprop |
| Auxin Mimics | Phenoxy-carboxylates | Mecoprop |
| Auxin Mimics | Phenoxy-carboxylates | MCPA |
| Auxin Mimics | Phenoxy-carboxylates | MCPB |
| Auxin Mimics | Benzoates | Dicamba |
| Auxin Mimics | Benzoates | Chloramben |
| Auxin Mimics | Benzoates | TBA |
| Auxin Mimics | Quinoline-carboxylates | Quinclorac |
| Auxin Mimics | Quinoline-carboxylates | Quinmerac |
| Auxin Mimics | Pyrimidine-carboxylates | Aminocyclopyrachlor |
| Auxin Mimics | Other | Benazolin-ethyl |
| Auxin Mimics | Phenyl carboxylates | Chlorfenac = fenac |
| Auxin Mimics | Phenyl carboxylates | Chlorfenprop |
| Auxin Transport Inhibitor | Aryl-carboxylates | Naptalam |
| Auxin Transport Inhibitor | Aryl-carboxylates | Diflufenzopyr-sodium |
| Inhibition of Fatty Acid Thioesterase | Benzyl ether | Cinmethylin |
| Inhibition of Fatty Acid Thioesterase | Benzyl ether | Methiozolin |
| Inhibition of Serine-Threonine Protein Phosphatase | Other | Endothal |
| Inhibition of Solanesyl Diphosphate Synthase | Diphenyl ether | Aclonifen |
| Inhibition of Lycopene Cyclase | Triazole | Amitrole |

APPENDIX 2-continued

| MODE OF ACTION | CHEMICAL CLASSIFICATION | ACTIVE |
|---|---|---|
| Unknown | | Bromobutide |
| Unknown | | Cumyluron |
| Unknown | | Difenzoquat |
| Unknown | | DSMA |
| Unknown | | Dymron = Daimuron |
| Unknown | | Etobenzanid |
| Unknown | Arylaminopropionic acid | Flamprop-m |
| Unknown | | Fosamine |
| Unknown | | Methyldymron |
| Unknown | | Monalide |
| Unknown | | MSMA |
| Unknown | | Oleic acid |
| Unknown | | Oxaziclomefone |
| Unknown | | Pelargonic acid |
| Unknown | | Pyributicarb |
| Unknown | | Quinoclamine |
| Unknown | Acetamides | Diphenamid |
| Unknown | Acetamides | Naproanilide |
| Unknown | Acetamides | Napropamide |
| Unknown | Benzamide | Tebutam |
| Unknown | Phosphorodithioate | Bensulide |
| Unknown | Chlorocarbonic acids | Dalapon |
| Unknown | Chlorocarbonic acids | Flupropanate |
| Unknown | Chlorocarbonic acids | TCA |
| Unknown | Trifluoromethanesulfonanilides | Mefluidide |
| Unknown | Trifluoromethanesulfonanilides | Perfluidone |
| Unknown | | CAMA |
| Unknown | | Cacodylic acid |

APPENDIX 3

| Main Group and Primary Site of Action | Sub-group, class or exemplifying Active Ingredient | Active Ingredients |
|---|---|---|
| 1<br>Acetylcholinesterase (AChE) inhibitors<br>Nerve action<br>{Strong evidence that action at this protein is responsible for insecticidal effects) | 1A<br>Carbamates | Alanycarb, Aldicarb, Bendiocarb, Benfuracarb, Butocarboxim, Butoxycarboxim, Carbaryl, Carbofuran, Carbosulfan, Ethiofencarb, Fenobucarb, Formetanate, Furathiocarb, Isoprocarb, Methiocarb, Methomyl, Metolcarb, Oxamyl, Pirimicarb, Propoxur, Thiodicarb, Thiofanox, Triazamate, Trimethacarb, XMC, Xylylcarb |
| | 1B<br>Organophosphates | Acephate, Azamethiphos, Azinphos-ethyl, Azinphos-methyl, Cadusafos, Chlorethoxyfos, Chlorfenvinphos, Chlormephos, Chlorpyrifos, Chlorpyrifos-methyl, Coumaphos, Cyanophos, Demeton-S-methyl, Diazinon, Dichlorvos/DDVP, Dicrotophos, Dimethoate, Dimethylvinphos, Disulfoton, EPN, Ethion, Ethoprophos, Famphur, Fenamiphos, Fenitrothion, Fenthion, Fosthiazate, Heptenophos, Imicyafos, Isofenphos, Isopropyl O-(methoxyaminothio- phosphoryl) salicylate, Isoxathion, Malathion, Mecarbam, Methamidophos, Methidathion, Mevinphos, Monocrotophos, Naled, Omethoate, Oxydemeton-methyl, Parathion, Parathion-methyl, Phenthoate, Phorate, Phosalone, Phosmet, Phosphamidon, Phoxim, Pirimiphos- methyl, Profenofos, Propetamphos, Prothiofos, Pyraclofos, Pyridaphenthion, Quinalphos, Sulfotep, Tebupirimfos, Temephos, Terbufos, Tetrachlorvinphos, Thiometon, Triazophos, Trichlorfon, Vamidothion |
| 2<br>GABA-gated chloride channel blockers<br>Nerve action<br>{Strong evidence that action at this protein is responsible for insecticidal effects} | 2A<br>Cyclodiene Organochlorines | Chlordane, Endosulfan |
| | 2B<br>Phenylpyrazoles (Fiproles) | Ethiprole, Fipronil |
| 3<br>Sodium channel modulators<br>Nerve action<br>{Strong evidence that action at this protein is responsible for insecticidal effects} | 3A<br>Pyrethroids Pyrethrins | Acrinathrin, Allethrin, d-cis-trans Allethrin, d- trans Allethrin, Bifenthrin, Bioallethrin, Bioallethrin S-cyclopentenyl isomer, Bioresmethrin, Cycloprothrin, Cyfluthrin, beta- Cyfluthrin, Cyhalothrin, lambda-Cyhalothrin, gamma-Cyhalothrin, Cypermethrin, alpha- Cypermethrin, beta-Cypermethrin, theta- cypermethrin, zeta-Cypermethrin, Cyphenothrin, (1R)-trans- isomers], Deltamethrin, Empenthrin (EZ)- (1R)-isomers], Esfenvalerate, Etofenprox, Fenpropathrin, Fenvalerate, Flucythrinate, Flumethrin, tau-Fluvalinate, Halfenprox, Imiprothrin, Kadethrin, Permethrin, Phenothrin |

APPENDIX 3-continued

| Main Group and Primary Site of Action | Sub-group, class or exemplifying Active Ingredient | Active Ingredients |
|---|---|---|
| | | [(1R)-trans- isomer], Prallethrin, Pyrethrins (pyrethrum), Resmethrin, Silafluofen, Tefluthrin, Tetramethrin, Tetramethrin [(1R)-isomers], Tralomethrin, Transfluthrin, |
| | 3B DDT Methoxychlor | DDT Methoxychlor |
| 4 Nicotinic acetylcholine receptor (nAChR) competitive modulators Nerve action {Strong evidence that action at one or more of this class of protein is responsible for insecticidal effects} | 4A Neonicotinoids | Acetamiprid, Clothianidin, Dinotefuran, Imidacloprid, Nitenpyram, Thiacloprid, Thiamethoxam, |
| | 4B Nicotine | Nicotine |
| | 4C Sulfoximines | Sulfoxaflor |
| | 4D Butenolides | Flupyradifurone |
| | 4E Mesoionics | Triflumezopyrim |
| | 4F Pyridylidenes | Flupyrimin |
| 5 Nicotinic acetylcholine receptor (nAChR) allosteric modulators - Site I Nerve action {Strong evidence that action at one or more of this class of protein is responsible for insecticidal effects} | Spinosyns | Spinetoram, Spinosad |
| 6 Glutamate-gated chloride channel (GluCl) allosteric modulators Nerve and muscle action {Strong evidence that action at one or more of this class of protein is responsible for insecticidal effects} | Avermectins, Milbemycins | Abamectin, Emamectin benzoate, Lepimectin, Milbemectin |
| 7 Juvenile hormone mimics Growth regulation {Target protein responsible for biological activity is unknown, or uncharacterized} | 7A Juvenile hormone analogues | Hydroprene, Kinoprene, Methoprene |
| | 7B Fenoxycarb | Fenoxycarb |
| | 7C Pyriproxyfen | Pyriproxyfen |
| 8 * Miscellaneous non-specific (multi-site) inhibitors | 8A Alkyl halides | Methyl bromide and other alkyl halides |
| | 8B Chloropicrin | Chloropicrin |
| | 8C Fluorides | Cryolite (Sodium aluminum fluoride), Sulfuryl fluoride |
| | 8D Borates | Borax, Boric acid, Disodium octaborate, Sodium borate, Sodium metaborate |
| | 8E Tartar emetic | Tartar emetic |
| | 8F Methyl isothiocyanate generators | Dazomet, Metam |
| 9 Chordotonal organ TRPV channel modulators Nerve action {Strong evidence that action at one or more of this class of proteins is responsible for insecticidal effects} | 9B Pyridine azomethine derivatives | Pymetrozine, Pyrifluquinazon |
| | 9D Pyropenes | Afidopyropen |
| 10 Mite growth inhibitors affecting CHS1 Growth regulation {Strong evidence that action at one or more of this class of proteins is responsible for insecticidal effects} | 10A Clofentezine Diflovidazin Hexythiazox | Clofentezine, Diflovidazin, Hexythiazox |
| | 10B Etoxazole | Etoxazole |
| 11 Microbial disruptors of insect midgut membranes (Includes transgenic crops expressing *Bacillus thuringiensis* toxins, however specific guidance for resistance management of transgenic crops is not based on rotation of modes of action) | 11A *Bacillus thuringiensis* and the insecticidal proteins they produce | *Bacillus thuringiensis* subsp. *israelensis Bacillus thuringiensis* subsp. *aizawai Bacillus thuringiensis* subsp. *kurstaki Bacillus thuringiensis* subsp. *tenebrionis* *B. t.* crop proteins: (* Please see footnote) Cry1Ab, Cry1Ac, Cry1Fa, Cry1A. 105, Cry2Ab, Vip3A, mCry3A, Cry3Ab, Cry3Bb, Cry34Ab1/Cry35Ab1 |
| | 11B *Bacillus sphaericus* | *Bacillus sphaericus* |

APPENDIX 3-continued

| Main Group and Primary Site of Action | Sub-group, class or exemplifying Active Ingredient | Active Ingredients |
|---|---|---|
| 12<br>Inhibitors of mitochondrial ATP synthase<br>Energy metabolism<br>{Compounds affect the function of this protein, but it is not clear that this is what leads to biological activity} | 12A<br>Diafenthiuron | Diafenthiuron |
| | 12B<br>Organotin miticides | Azocyclotin, Cyhexatin, Fenbutatin oxide |
| | 12C<br>Propargite | Propargite |
| | 12D<br>Tetradifon | Tetradifon |
| 13 *<br>Uncouplers of oxidative phosphorylation via disruption of the proton gradient<br>Energy metabolism | Pyrroles Dinitrophenols<br>Sulfluramid | Chlorfenapyr DNOC<br>Sulfluramid |
| 14<br>Nicotinic acetylcholine receptor (nAChR) channel blockers<br>Nerve action<br>{Compounds affect the function of this protein, but it is not clear that this is what leads to biological activity} | Nereistoxin analogues | Bensultap, Cartap hydrochloride, Thiocyclam, Thiosultap-sodium |
| 15<br>Inhibitors of chitin biosynthesis affecting CHS1<br>Growth regulation<br>{Strong evidence that action at one or more of this class of proteins is responsible for insecticidal effects} | Benzoylureas | Bistrifluron, Chlorfluazuron, Diflubenzuron, Flucycloxuron, Flufenoxuron, Hexaflumuron, Lufenuron, Novaluron, Noviflumuron, Teflubenzuron, Triflumuron |
| 16<br>Inhibitors of chitin biosynthesis, type 1<br>Growth regulation<br>{Target protein responsible for biological activity is unknown, or uncharacterized} | Buprofezin | Buprofezin |
| 17<br>Moulting disruptors, Dipteran<br>Growth regulation<br>{Target protein responsible for biological activity is unknown, or uncharacterized} | Cyromazine | Cyromazine |
| 18<br>Ecdysone receptor agonists<br>Growth regulation<br>{Strong evidence that action at this protein is responsible for insecticidal effects} | Diacylhydrazines | Chromafenozide, Halofenozide, Methoxyfenozide, Tebufenozide |
| 19<br>Octopamine receptor agonists<br>Nerve action<br>{Good evidence that action at one or more of this class of protein is responsible for insecticidal effects} | Amitraz | Amitraz |
| 20<br>Mitochondrial complex III electron transport inhibitors - Qo site<br>Energy metabolism<br>{Good evidence that action at this protein complex is responsible for insecticidal effects} | 20A<br>Hydramethylnon | Hydramethylnon |
| | 20B<br>Acequinocyl | Acequinocyl |
| | 20C<br>Fluacrypyrim | Fluacrypyrim |
| | 20D<br>Bifenazate | Bifenazate |
| 21<br>Mitochondrial complex I electron transport inhibitors<br>Energy metabolism<br>{Good evidence that action at this protein complex is responsible for insecticidal effects} | 21A<br>METI acaricides and insecticides | Fenazaquin, Fenpyroximate, Pyridaben, Pyrimidifen, Tebufenpyrad, Tolfenpyrad |
| | 21B<br>Rotenone | Rotenone (Derris) |
| 22<br>Voltage-dependent sodium channel blockers<br>Nerve action<br>{Good evidence that action at this protein complex is responsible for insecticidal effects} | 22A<br>Oxadiazines | Indoxacarb |
| | 22B<br>Semicarbazones | Metaflumizone |

APPENDIX 3-continued

| Main Group and Primary Site of Action | Sub-group, class or exemplifying Active Ingredient | Active Ingredients |
|---|---|---|
| 23<br>Inhibitors of acetyl CoA carboxylase<br>Lipid synthesis, growth regulation<br>{Good evidence that action at this protein is responsible for insecticidal effects} | Tetronic and Tetramic acid derivatives | Spirodiclofen, Spiromesifen, Spiropidion, Spirotetramat |
| 24<br>Mitochondrial complex IV electron transport inhibitors<br>Energy metabolism<br>{Good evidence that action at this protein complex is responsible for insecticidal effects} | 24A<br>Phosphides<br>24B<br>Cyanides | Aluminium phosphide, Calcium phosphide, Phosphine, Zinc phosphide<br>Calcium cyanide, Potassium cyanide, Sodium cyanide |
| 25<br>Mitochondrial complex II electron transport inhibitors<br>Energy metabolism<br>{Good evidence that action at this protein complex is responsible for insecticidal effects} | 25A<br>Beta-ketonitrile derivatives<br>25B<br>Carboxanilides | Cyenopyrafen, Cyflumetofen<br>Pyflubumide |
| 28<br>Ryanodine receptor modulators<br>Nerve and muscle action<br>{Strong evidence that action at this protein complex is responsible for insecticidal effects} | Diamides | Chlorantraniliprole, Cyantraniliprole, Cyclaniliprole Flubendiamide, Tetraniliprole |
| 29<br>Chordotonal organ modulators - undefined target site<br>Nerve action<br>(Modulation of chordotonal organ function has been clearly demonstrated, but the specific target protein(s) responsible for biological activity are distinct from Group 9 and remain undefined) | Flonicamid | Flonicamid |
| 30<br>GABA-gated chloride channel allosteric modulators<br>Nerve action<br>{Strong evidence that action at this protein complex is responsible for insecticidal effects} | Meta-diamides Isoxazolines | Broflanilide<br>Fluxametamide, Isocycloseram |
| 31<br>Baculoviruses<br>Host-specific occluded pathogenic viruses<br>(Midgut epithelial columnar cell membrane target site - undefined) | Granuloviruses (GVs)<br>Nucleopolyhedroviruse s (NPVs) | *Cydia pomonella* GV<br>*Thaumatotibia leucotreta* GV<br>*Anticarsia gemmatalis* MNPV<br>*Helicoverpa armigera* NPV |
| 32<br>Nicotinic Acetylcholine Receptor (nAChR) Allosteric Modulators - Site II<br>Nerve action<br>{Strong evidence that action at one or more of this class of protein is responsible for insecticidal effects} | GS-omega/kappa HXTX-Hv1a peptide | GS-omega/kappa HXTX-Hv1a peptide |
| 33<br>Calcium-activated potassium channel (KCa2) modulators<br>Nerve action<br>{Strong evidence that action at this protein is responsible for insecticidal effects} | Acynonapyr | Acynonapyr |
| 34<br>Mitochondrial complex III electron transport inhibitors - Qi site<br>Energy metabolism<br>{Modulation of this protein complex has been clearly demonstrated and the specific target site responsible for biological activity is distinct from Group 20} | Flometoquin | Flometoquin |

APPENDIX 3-continued

| Main Group and Primary Site of Action | Sub-group, class or exemplifying Active Ingredient | Active Ingredients |
|---|---|---|
| UN*<br>Compounds of unknown or uncertain MoA<br>{Target protein responsible for biological activity is unknown, or uncharacterized} | Azadirachtin<br>Benzoximate<br>Benzpyrimoxan<br>Bromopropylate<br>Chinomethionat<br>Dicofol<br>Lime sulfur<br>Mancozeb<br>Pyridalyl<br>Sulfur | Azadirachtin<br>Benzoximate<br>Benzpyrimoxan<br>Bromopropylate<br>Chinomethionat<br>Dicofol<br>Lime sulfur<br>Mancozeb<br>Pyridalyl<br>Sulfur |
| UNB*<br>Bacterial agents (non-Bt) of unknown or uncertain MoA<br>{Target protein responsible for biological activity is unknown or uncharacterized} | | *Burkholderia* spp<br>*Wolbachia pipientis* (Zap) |
| UNE*<br>Botanical essence including synthetic, extracts and unrefined oils with unknown or uncertain MoA<br>{Target protein responsible for biological activity is unknown, or uncharacterized} | | *Chenopodium ambrosioides* near *ambrosioides* extract<br>Fatty acid monoesters with glycerol or propanediol Neem oil |
| UNF*<br>Fungal agents of unknown or uncertain MoA<br>{Target protein responsible for biological activity is unknown, or uncharacterized} | | *Beauveria bassiana* strains<br>*Metarhizium anisopliae* strain F52<br>*Paecilomyces fumosoroseus* Apopka strain 97 |
| UNM*<br>Non-specific mechanical and physical disruptors<br>{Target protein responsible for biological activity is unknown, or uncharacterized} | | Diatomaceous earth<br>Mineral oil |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for inhibiting apyrase, comprising contacting the apyrase with a compound of the formula

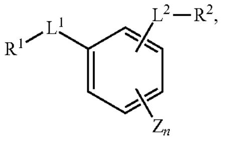

wherein $L^1$ is selected from —C(O)N($R^a$)— and —N($R^a$)C(O)—;

$L^2$ is selected from —$S(O)_2N(R^a)$— and —$N(R^a)S(O)_2$—;

wherein $R^1$ is selected from $C_{1-6}$ alkyl optionally substituted with one or more $R^a$ and $R^b$, aryl optionally substituted with one or more $R^3$, aralkyl optionally substituted with one or more $R^3$, heterocyclyl optionally substituted with one or more $R^d$ and heteroaryl optionally substituted with one or more $R^3$;

$R^2$ is selected from $C_{1-6}$ alkyl aryl and heteroaryl, each optionally substituted with one or more $R^a$ and $R^b$;

$R^3$ is independently selected from $R^a$, $R^b$, —$OR^a$ substituted with one or more of the same or different $R^a$ or $R^b$, or —$(CH_2)_m$—$R^b$, —$(CHR^a)_m$—$R^b$, —O—$(CH_2)_m$—$R^b$, —S—$(CH_2)_m$—$R^b$, —O—$CHR^aR^b$, —O—$CR^a(R^b)_2$, —O—$(CHR^a)_m$—$R^b$, —O—$(CH_2)_m$—CH$[(CH_2)_mR^b]R^b$, —S—$(CHR^a)_m$—$R^b$, —C(O)NH—$(CH_2)_m$—$R^b$, —C(O)NH—$(CHR^a)_m$—$R^b$, —O—$(CH_2)_m$—C(O)NH—$(CH_2)_m$—$R^b$;

each $R^a$ is independently selected from the group consisting of hydrogen, $C_{1-6}$ alkyl, $C_{1-6}$ haloalkyl, $C_{3-8}$ cycloalkyl, $C_{6-10}$ aryl, $C_{5-10}$ heteroaryl, $C_{6-16}$ arylalkyl, 2-6 membered heteroalkyl and 3-8 membered heterocyclylalkyl, or $R^a$ together with the nitrogen and the $R^1$ or $R^2$ attached thereto forms a heterocyclyl optionally substituted with one or more $R^d$, or forms a heteroaryl optionally substituted with one or more $R^3$ Z is selected from halogen, $C_{1-6}$ alkyl, —$OR^a$, and $C_{1-6}$ haloalkyl;

$R^b$ is independently selected from the group consisting of =O, —$OR^d$, halogen, $C_{1-3}$ haloalkyloxy, —$OCF_3$, =S, —$SR^d$, =$NR^d$, =$NOR^d$, —$NR^cR^c$, —SF5, halogen, —$CF_3$, —CN, —$NO_2$, —$S(O)R^d$, —$S(O)_2R^d$, —$S(O)_2OR^d$, —$S(O)NR^cR^c$, —$S(O)_2NR^cR^c$, —$OS(O)R^d$, —$OS(O)_2R^d$, —$OS(O)_2OR^d$, —$OS(O)_2NR^cR^c$, —$C(O)R^d$, —$C(O)OR^d$, —$C(O)NR^cR^c$, —$C(NH)NR^cR^c$, —$C(NR^a)NR^cR^c$, —$C(NOH)R^a$, —$C(NOH)NR^cR^c$, —$OC(O)R^d$, —$OC(O)OR^d$, —$OC(O)NR^cR^c$, —$OC(NH)NR^cR^c$, —$OC(NR^a)NR^cR^c$, —$[NHC(O)]_nR^d$, —$[NR^aC(O)]_nR^d$, —$[NHC(O)]_nOR^d$, —$[NR^aC(O)]_nOR^d$, —$[NHC(O)]_nNR^cR^c$, —$[NR^aC(O)]_nNR^cR^c$, —$[NHC(NH)]_nNR^cR^c$ and —$[NR^aC(NR^a)]_nNR^cR^c$;

each $R^c$ is independently $R^a$, or, alternatively, two $R^c$ are taken together with the nitrogen atom to which they are bonded to form a 5 to 10-membered heterocyclylalkyl or heteroaryl which may optionally include one or more of the same or different additional heteroatoms and which may optionally be substituted with one or more of the same or different $R^e$ groups;

each $R^d$ is independently hydrogen or $C_{1-6}$ alkyl;

each $R^e$ is independently halogen, $C_{1-6}$ alkyl or —C(O)$R^d$;

each m is independently an integer from 1 to 3; and each n is independently an integer from 0 to 3; provided that the compound does not have the formula

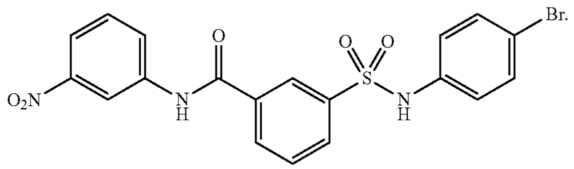 [SMILES: O=C(Nc1cccc([N+](=O)[O-])c1)c1cccc(S(=O)(=O)Nc2ccc(Br)cc2)c1]

2. The method of claim 1, wherein the compound has the formula

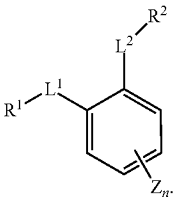

3. The method of claim 1, wherein the compound has the formula

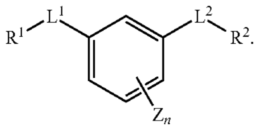

4. The method of claim 1, wherein the compound has the formula

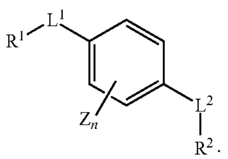

5. The method of claim 1, wherein the compound has at least one of $R^1$ and $R^2$ as aryl or heteroaryl, which are defined as $Ar^1$ and $Ar^2$ respectively, and wherein $Ar^1$ and $Ar^2$ are independently selected from aryl and heteroaryl, each optionally substituted with one or more $R^3$.

6. The method of claim 5, wherein the compound has the formula

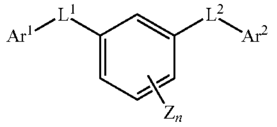

7. The method of claim 1, wherein the compound has the formula

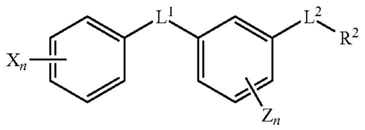

wherein X is selected from $C_{1-6}$ alkyl, —$OR^a$ substituted with one or more of the same or different $R^a$ or $R^b$, —$CF_2H$, —$CF_3$, —CN, —$NO_2$, and halogen, or two X substituents together with the atoms to which they are attached form a 5 to 8-membered aryl, cycloalkyl, heterocyclylalkyl or heteroaryl which may optionally include one or more of the same or different additional heteroatoms and which may optionally be substituted with one or more of the same or different $R^b$ groups.

8. The method of claim 4, wherein the compound has the formula

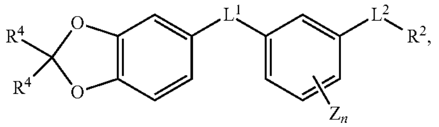

wherein $R^4$ is, for each occurrence, independently hydrogen, halogen, $C_{1-6}$ alkyl, or $C_{1-6}$ haloalkyl.

9. The method of claim 8, wherein the compound has the formula

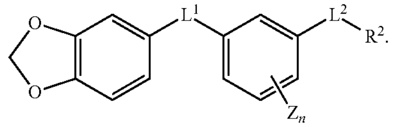

10. The method of claim 8, wherein the compound has the formula

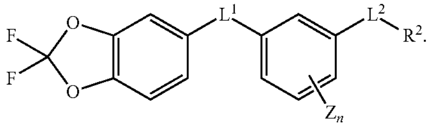

11. The method of claim 5, wherein the compound has the formula

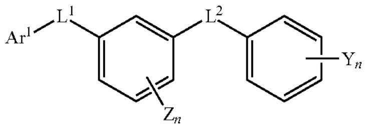

wherein Y is selected from $C_{1-6}$ alkyl, $—OR^a$, $—CF_2H$, $—CF_3$, —CN, $—NO_2$, and halogen, or two Y substituents together with the atoms to which they are attached form a 5 to 8-membered aryl, cycloalkyl, heterocyclylalkyl or heteroaryl which may optionally include one or more of the same or different additional heteroatoms and which may optionally be substituted with one or more of the same or different $R^b$ groups.

12. The method of claim 6, wherein the compound has the formula

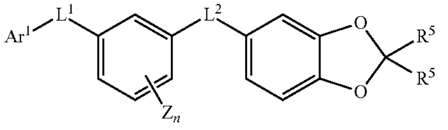

wherein $R^5$ is, for each occurrence, independently hydrogen, halogen, $C_{1-6}$ alkyl, or $C_{1-6}$ haloalkyl.

13. The method of claim 12, wherein the compound has the formula

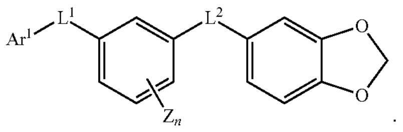

14. The method of claim 12, wherein the compound has the formula

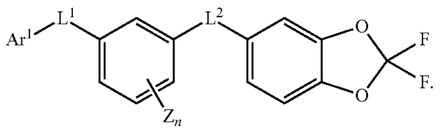

15. The method of claim 1, wherein $R^1$ is heteroaryl.

16. The method of claim 1, wherein $R^2$ is heteroaryl.

17. The method of claim 1, wherein $R^1$ is phenyl.

18. The method of claim 1, wherein $R^2$ is phenyl.

19. The method of claim 7, wherein the compound has the formula

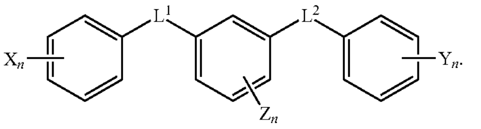

20. The method of claim 1, wherein the compound has the formula

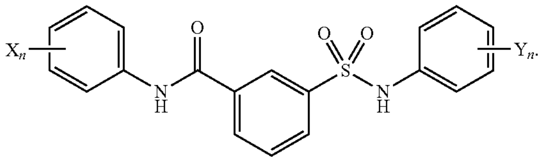

21. The method of claim 1, wherein the compound has the formula

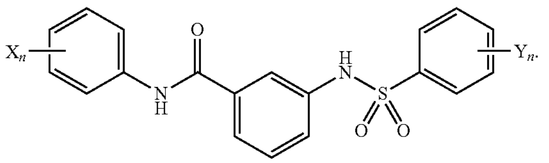

22. The method of claim 1, wherein the compound is selected from

N-(4-(difluoromethoxy)phenyl)-2-(N-(3-(trifluoromethyl)phenyl)sulfamoyl)benzamide;

4-chloro-N-(3-nitrophenyl)-3-(N-(o-tolyl)sulfamoyl)benzamide;

3-(N-(2-chloro-5-(trifluoromethyl)phenyl)sulfamoyl)-N-(3-nitrophenyl)benzamide;

4-(N-(4-chlorophenyl)sulfamoyl)-N-(4-fluoro-3-nitrophenyl)benzamide;

3-(N-(3,4-dimethylphenyl)sulfamoyl)-4-methyl-N-(3-nitrophenyl)benzamide;

3-(N-(4-bromophenyl)sulfamoyl)-4-methyl-N-(4-nitrophenyl)benzamide;

3-((4-chlorophenyl)sulfonamido)-N-(m-tolyl)benzamide;

2-chloro-5-(N-(4-chlorophenyl)sulfamoyl)-N-(3-nitrophenyl)benzamide;

3-(N-(4-bromophenyl)sulfamoyl)-N-(3-cyano-6-methyl-4,5,6,7-tetrahydrobenzo[b]thiophen-2-yl)benzamide;

3-(N-(benzo[d][1,3]dioxol-5-yl)sulfamoyl)-N-(2-methyl-3-nitrophenyl)benzamide;

2-chloro-5-(N-(3-fluorophenyl)sulfamoyl)-N-(3-nitrophenyl)benzamide;

3-(N-(4-bromophenyl)sulfamoyl)-N-(4-hydroxy-1-methyl-1H-imidazol-2-yl)benzamide;

N-(4-bromophenyl)-3-(indoline-1-carbonyl)benzenesulfonamide;

3-((4-methylphenyl)sulfonamido)-N-(m-tolyl)benzamide;

3-(N-(4-bromophenyl)sulfamoyl)-N-(3-chlorophenyl)-4-methoxybenzamide;

3-(N-(4-bromophenyl)sulfamoyl)-N-(3-cyanophenyl) benzamide;

2-(3-(N-(4-bromophenyl)sulfamoyl)benzamido)ethyl carbamate 3-(N-(4-bromophenyl)sulfamoyl)-N-(4-methoxyphenyl) benzamide;

4-bromo-3-(N-(4-fluorophenyl)sulfamoyl)-N-(3-nitrophenyl)benzamide;

N-(4-bromophenyl)-3-(N-(4-bromophenyl)sulfamoyl) benzamide;

3-(N-(4-chlorophenyl)sulfamoyl)-N-(3-nitrophenyl)benzamide;

4-bromo-3-(N-(4-bromophenyl)sulfamoyl)-N-(3-nitrophenyl)benzamide;
4-bromo-3-(N-(3-fluorophenyl)sulfamoyl)-N-(3-nitrophenyl)benzamide;
N-(4-bromophenyl)-3-(N-(3-nitrophenyl)sulfamoyl)benzamide;
4-chloro-3-(N-(2,3-dimethylphenyl)sulfamoyl)-N-(2-methyl-5-nitrophenyl)benzamide;
3-(N-(4-bromophenyl)sulfamoyl)-N-(3,4-difluorophenyl)-4-methoxybenzamide;
N-(3-(N-(4-methoxyphenyl)sulfamoyl)phenyl)-3-(1H-pyrrol-1-yl)benzamide;
N-(2-methoxy-5-nitrophenyl)-4-methyl-3-(N-phenylsulfamoyl)benzamide;
3-(N-(3-acetylphenyl)sulfamoyl)-4-methyl-N-(3-nitrophenyl)benzamide;
N-(pyridin-3-yl)-3-(N-(3-(trifluoromethyl)phenyl)sulfamoyl)benzamide;
3-(N-(4-fluorophenyl)sulfamoyl)-N-(3-nitrophenyl)benzamide;
N-(3-nitrophenyl)-3-(N-(3-nitrophenyl)sulfamoyl)benzamide;
3-(N-(4-bromophenyl)sulfamoyl)-N-(4-chlorophenyl)-4-methoxybenzamide;
4-bromo-N-(3-nitrophenyl)-3-(N-phenylsulfamoyl)benzamide;
3-(3-(N-(4-bromophenyl)sulfamoyl)-4-methylbenzamido)benzoic acid;
5-(N-(4-bromophenyl)sulfamoyl)-2-chloro-N-(o-tolyl)benzamide;
3-(indolin-1-ylsulfonyl)-N-(3-nitrophenyl)benzamide;
4-chloro-N-(2-methyl-3-nitrophenyl)-3-(N-phenylsulfamoyl)benzamide;
N-(3-nitrophenyl)-3-(N-(o-tolyl)sulfamoyl)benzamide;
3-(N-(4-chlorophenyl)sulfamoyl)-N-(2-methoxy-5-nitrophenyl)benzamide;
3-(N-(4-bromophenyl)sulfamoyl)-N-(2-(tetrahydrofuran-2-yl)ethyl)benzamide;
3-(N-(4-bromophenyl)sulfamoyl)-4-chloro-N-phenylbenzamide;
5-(N-(4-bromophenyl)sulfamoyl)-2-chloro-N-(2-nitrophenyl)benzamide;
4-((2-methyl-5-((3-nitrophenyl)carbamoyl)phenyl)sulfonamido)benzoic acid;
3-(N-(4-bromophenyl)sulfamoyl)-N-(3-(2-oxopyrrolidin-1-yl)propyl)benzamide;
N-(4-acetamidophenyl)-3-(N-(4-bromophenyl)sulfamoyl)benzamide;
3-(N-(4-bromophenyl)sulfamoyl)-N-(furan-2-ylmethyl)benzamide;
5-(N-(4-bromophenyl)sulfamoyl)-2,4-dichloro-N-(2-methyl-5-nitrophenyl)benzamide;
3-(N-benzylsulfamoyl)-N-(3-nitrophenyl)benzamide;
3-(N-(3-fluorophenyl)sulfamoyl)-N-(3-nitrophenyl)benzamide;
2-chloro-5-(N-(4-fluorophenyl)sulfamoyl)-N-(3-nitrophenyl)benzamide;
ethyl 5-(((3-((3-nitrophenyl)carbamoyl)phenyl)sulfonamido)methyl) furan-2-carboxylate
3-(N-(4-bromophenyl)sulfamoyl)-N-(2-nitrophenyl)benzamide;
3-(N-(adamantan-1-ylmethyl)sulfamoyl)-N-(3-nitrophenyl)benzamide;
4-chloro-N-(pyridin-3-yl)-3-(N-(p-tolyl)sulfamoyl)benzamide;
3-(N-(5-bromoquinolin-8-yl)sulfamoyl)-N-phenylbenzamide;
3-(N-(2-(2-methyl-1H-indol-3-yl)ethyl)sulfamoyl)-N-(3-nitrophenyl)benzamide;
3-(N-methyl-N-phenylsulfamoyl)-N-(pyridin-3-yl)benzamide;
3-(N-(2-(1H-indol-3-yl)ethyl)sulfamoyl)-N-(3-nitrophenyl)benzamide;
3-(N-(5-bromoquinolin-8-yl)sulfamoyl)-N-(3-nitrophenyl)benzamide;
4-methyl-N-(2-methyl-5-nitrophenyl)-3-(N-(o-tolyl)sulfamoyl)benzamide;
N1,N3-bis(4-bromophenyl)isophthalamide;
4-bromo-3-(N-(2,3-dihydrobenzo[b][1,4]dioxin-6-yl)sulfamoyl)-N-(3-nitrophenyl)benzamide;
3-(N-methyl-N-(p-tolyl)sulfamoyl)-N-(5-methylpyridin-2-yl)benzamide;
(3,4-dihydro-1,5-naphthyridin-1(2H)-yl)(3-(indolin-1-ylsulfonyl)phenyl)methanone;
N-(pyridin-4-yl)-3-(N-(p-tolyl)sulfamoyl)benzamide;
3-((4-bromophenyl)sulfonamido)-N-methyl-N-phenylbenzamide;
ethyl (3-((3-(N-(4-chlorophenyl)sulfamoyl)phenyl)carbamoyl) phenyl)carbamate;
5-(N-(2-fluorophenyl)sulfamoyl)-2,3-dimethoxy-N-(6-oxo-1,6-dihydropyridin-3-yl)benzamide;
2-chloro-5-(N-(4-fluorophenyl)sulfamoyl)-N-(pyridin-3-yl)benzamide;
3-(N-(2,5-dichlorophenyl)sulfamoyl)-N-(pyridin-3-yl) benzamide;
3-(N-(4-ethoxyphenyl)sulfamoyl)-N-(pyridin-2-yl)benzamide;
N-(3-(N-(4-chlorophenyl)sulfamoyl)phenyl)isophthalamide;
3-(N-(4-bromophenyl)sulfamoyl)-N-(4-fluorophenyl)-4-methoxybenzamide;
3-((4-ethoxyphenyl)sulfonamido)-N-(3-fluorophenyl) benzamide;
5-(N-(4-fluorophenyl)sulfamoyl)-2-methyl-N-(pyridin-3-yl)benzamide;
3-(cyclopropanecarboxamido)-N-(3-(N-methyl-N-phenylsulfamoyl)phenyl)benzamide;
4-(3-(N-(p-tolyl)sulfamoyl)benzamido) picolinamide;
2-methyl-N-(pyridin-3-yl)-5-(N-(p-tolyl)sulfamoyl)benzamide;
3-(N-(4-bromophenyl)sulfamoyl)-N-(2-oxo-2-((2,2,2-trifluoroethyl)amino)ethyl)benzamide;
N-ethyl-3-(N-methyl-N-phenylsulfamoyl)-N-(pyridin-3-yl)benzamide;
3-(N-(2-fluorophenyl)sulfamoyl)-N-(pyridin-3-yl)benzamide;
3-(N-(4-bromophenyl)sulfamoyl)-N-(2-methylbenzo[d] oxazol-5-yl)benzamide;
3-(N-(4-bromophenyl)sulfamoyl)-N-(2-oxo-2-(piperidin-1-yl)ethyl)benzamide;
3-(N-methyl-N-(p-tolyl)sulfamoyl)-N-(4-(trifluoromethyl) pyridin-2-yl)benzamide;
N-phenyl-3-(phenylsulfonamido)benzamide;
3-(N-methyl-N-(p-tolyl)sulfamoyl)-N-(pyridin-4-yl)benzamide;
3-(indolin-1-ylsulfonyl)-N-(6-methoxypyridin-3-yl)benzamide;
N-methyl-3-(N-methyl-N-phenylsulfamoyl)-N-phenylbenzamide;
N-cyclopropyl-3-(3-((4-methylphenyl)sulfonamido)benzamido)benzamide;
3-(N-(4-bromophenyl)sulfamoyl)-N-(2-methyl-2-morpholinopropyl)benzamide;

3-(N-(3-chlorophenyl)sulfamoyl)-N-(pyridin-3-yl)benzamide;
3-(N-(benzo[d][1,3]dioxol-5-yl)sulfamoyl)-N-(pyridin-3-yl)benzamide;
N-(4-(2-amino-2-oxoethyl)phenyl)-3-(N-(4-bromophenyl)sulfamoyl)benzamide;
N-(3-(N-(4-methoxyphenyl)sulfamoyl)phenyl)benzamide;
3-(N-ethyl-N-phenylsulfamoyl)-N-(quinolin-2-yl)benzamide;
3-(N-(4-chlorophenyl)sulfamoyl)-N-(6-methoxypyridin-3-yl)benzamide;
N-(2-methoxy-5-nitrophenyl)-3-(N-(4-methoxyphenyl)sulfamoyl)benzamide;
2-chloro-N-(3-nitrophenyl)-5-(N-phenylsulfamoyl)benzamide;
N-(pyridin-3-yl)-3-(N-(p-tolyl)sulfamoyl)benzamide; hydrochloride
3-(N-(4-bromophenyl)sulfamoyl)-N-(2,4-difluorophenyl)benzamide;
3-(N-(4-bromophenyl)sulfamoyl)-N-(1,2,3,4-tetrahydronaphthalen-1-yl)benzamide;
N-(3-(N,N-dimethylsulfamoyl)phenyl)-3-(phenylsulfonamido)benzamide;
N-(3-chlorophenyl)-3-((4-ethoxyphenyl)sulfonamido)benzamide;
3-(N-(4-bromophenyl)sulfamoyl)-N-(2-fluorobenzyl)benzamide;
N1,N3-diphenylbenzene-1,3-disulfonamide;
3-acetamido-N-(3-(N-(4-chlorophenyl)sulfamoyl)phenyl)benzamide;
N-(2-methoxy-5-nitrophenyl)-3-((2-methylindolin-1-yl)sulfonyl)benzamide;
N-cyclopropyl-3-(3-(phenylsulfonamido)benzamido)benzamide;
3-(N-ethyl-N-phenylsulfamoyl)-N-(5-fluoropyridin-2-yl)benzamide;
3-(phenylsulfonamido)-N-(3-(piperidin-1-ylsulfonyl)phenyl)benzamide;
3-(N-(4-bromophenyl)sulfamoyl)-N-(1-methoxypropan-2-yl)benzamide;
N-(4-fluoro-3-nitrophenyl)-3-((2-methylindolin-1-yl)sulfonyl)benzamide;
3-(N-(2,4-dimethylphenyl)sulfamoyl)-N-(pyridin-3-yl)benzamide;
N-cyclopropyl-3-(3-((4-ethoxyphenyl)sulfonamido)benzamido)benzamide;
3-(N-(4-bromophenyl)sulfamoyl)-N-(6-methoxypyridin-3-yl)benzamide;
N-(3-(N-(4-chlorophenyl)sulfamoyl)phenyl)-3-(1H-tetrazol-1-yl)benzamide;
3-(indolin-1-ylsulfonyl)-N-(1-isopropyl-1H-pyrazolo[3,4-b]pyridin-5-yl)benzamide;
N-(4-(N-(3-chlorophenyl)sulfamoyl)phenyl) picolinamide;
2-chloro-5-(N-(4-chlorophenyl)sulfamoyl)-N-(pyridin-3-yl)benzamide;
N-(3-(N-(4-chlorophenyl)sulfamoyl)phenyl)-3-methoxybenzamide;
2-chloro-N-(4-chloro-3-nitrophenyl)-5-(N-ethyl-N-phenylsulfamoyl)benzamide;
3-(N-(4-bromophenyl)sulfamoyl)-N-(4-morpholinophenyl)benzamide;
4-((3-((3-nitrophenyl)carbamoyl)phenyl)sulfonamido)benzoic acid
N-(3-acetylphenyl)-3-(N-(4-bromophenyl)sulfamoyl)benzamide;
3-(difluoromethoxy)-N-(3-(N-methyl-N-phenylsulfamoyl)phenyl)benzamide;
N-(6-methoxypyridin-3-yl)-3-(N-methyl-N-phenylsulfamoyl)benzamide;
3-cyano-N-(3-(N-methyl-N-phenylsulfamoyl)phenyl)benzamide;
3-(N-(4-bromophenyl)sulfamoyl)-N-(p-tolyl)benzamide;
3-(indolin-1-ylsulfonyl)-N-(pyridin-3-yl)benzamide;
N-(3-(1H-pyrazol-5-yl)phenyl)-3-(N-(4-bromophenyl)sulfamoyl)benzamide;
3-(N-methyl-N-phenylsulfamoyl)-N-(6-methylpyridin-2-yl)benzamide;
N-(3-(N-methyl-N-phenylsulfamoyl)phenyl)-3-(1H-tetrazol-1-yl)benzamide;
3-(N-(4-bromophenyl)sulfamoyl)-N-ethylbenzamide;
3-(N-(4-bromophenyl)sulfamoyl)-N-(m-tolyl)benzamide;
3-((2-methylindolin-1-yl)sulfonyl)-N-(pyridin-3-yl)benzamide;
3-(N-(4-bromophenyl)sulfamoyl)-N-(3-methylpyridin-2-yl)benzamide;
3-(N-methyl-N-phenylsulfamoyl)-N-phenylbenzamide;
3-methoxy-N-(3-(N-(4-methoxyphenyl)sulfamoyl)phenyl)benzamide;
N-(3-(N-methyl-N-phenylsulfamoyl)phenyl)-3-(trifluoromethyl)benzamide;
N-benzyl-3-(N-(4-bromophenyl)sulfamoyl)benzamide;
3-(N-(4-bromophenyl)sulfamoyl)-N-(4-chlorophenyl)benzamide;
4-methyl-N-(3-nitrophenyl)-3-(N-(p-tolyl)sulfamoyl)benzamide;
5-(N-(4-bromophenyl)sulfamoyl)-2,4-dichloro-N-phenylbenzamide;
2-chloro-N-(3-nitrophenyl)-5-(N-(o-tolyl)sulfamoyl)benzamide;
4-methyl-N-(3-nitrophenyl)-3-(N-(o-tolyl)sulfamoyl)benzamide;
3-(N-(4-bromophenyl)sulfamoyl)-N-(4-nitrophenyl)benzamide;
2-chloro-5-(N-(4-methoxyphenyl)sulfamoyl)-N-(3-nitrophenyl)benzamide;
4-methyl-N-(2-methyl-5-nitrophenyl)-3-(N-(p-tolyl)sulfamoyl)benzamide;
3-(N-(4-bromophenyl)sulfamoyl)-N-(o-tolyl)benzamide;
3-(N-(2-methoxyphenyl)sulfamoyl)-4-methyl-N-(3-nitrophenyl)benzamide;
4-methyl-N-(pyridin-3-yl)-3-(N-(p-tolyl)sulfamoyl)benzamide;
3-(N-(4-chlorophenyl)sulfamoyl)-4-methyl-N-(3-nitrophenyl)benzamide;
4-methyl-N-(3-nitrophenyl)-3-(N-phenylsulfamoyl)benzamide;
3-(N-(4-bromophenyl)sulfamoyl)-4-methoxy-N-phenylbenzamide;
N-(6-methylpyridin-2-yl)-3-(N-phenylsulfamoyl)benzamide;
3-(N-(4-bromophenyl)sulfamoyl)-4-methyl-N-(3-nitrophenyl)benzamide;
3-(N-(4-ethoxyphenyl)sulfamoyl)-4-methyl-N-(3-nitrophenyl)benzamide;
3-(N-phenylsulfamoyl)-N-(pyridin-4-yl)benzamide;
N-(3-nitrophenyl)-3-(N-(p-tolyl)sulfamoyl)benzamide;
3-(N-(3-fluorophenyl)sulfamoyl)-4-methyl-N-(3-nitrophenyl)benzamide;
2,4-dichloro-5-(N-(4-ethoxyphenyl)sulfamoyl)-N-(2-methyl-5-nitrophenyl)benzamide;
3-nitro-N-(3-(N-phenylsulfamoyl)phenyl)benzamide;
3-(N-phenylsulfamoyl)-N-(pyridin-3-yl)benzamide;

5-(N-(4-bromophenyl)sulfamoyl)-2-chloro-N-(4-chlorophenyl)benzamide;

4-bromo-N-(3-nitrophenyl)-3-(N-(p-tolyl)sulfamoyl)benzamide;

2,4-dichloro-N-(2-methyl-5-nitrophenyl)-5-(N-phenylsulfamoyl)benzamide;

3-(N-phenylsulfamoyl)-N-(pyridin-2-yl)benzamide;

3-(N-(4-methoxyphenyl)sulfamoyl)-4-methyl-N-(3-nitrophenyl)benzamide;

3-(N-(4-bromophenyl)sulfamoyl)-N-phenylbenzamide;

5-(N-(4-bromophenyl)sulfamoyl)-2-chloro-N-(3-nitrophenyl)benzamide;

4-bromo-3-(N-(4-chlorophenyl)sulfamoyl)-N-(3-nitrophenyl)benzamide;

2-chloro-5-(N-(2-methoxyphenyl)sulfamoyl)-N-(3-nitrophenyl)benzamide; and 3-((4-methoxyphenyl)sulfonamido)-N-(m-tolyl)benzamide;

N-(4-(difluoromethoxy)phenyl)-2-(N-(3-(trifluoromethyl)phenyl)sulfamoyl)benzamide 4-chloro-N-(3-nitrophenyl)-3-(N-(o-tolyl)sulfamoyl)benzamide 3-(N-(2-chloro-5-(trifluoromethyl)phenyl)sulfamoyl)-N-(3-nitrophenyl)benzamide 4-(N-(4-chlorophenyl)sulfamoyl)-N-(4-fluoro-3-nitrophenyl)benzamide 3-(N-(3,4-dimethylphenyl)sulfamoyl)-4-methyl-N-(3-nitrophenyl)benzamide 3-(N-(4-bromophenyl)sulfamoyl)-4-methyl-N-(4-nitrophenyl)benzamide 3-((4-chlorophenyl)sulfonamido)-N-(m-tolyl)benzamide 2-chloro-5-(N-(4-chlorophenyl)sulfamoyl)-N-(3-nitrophenyl)benzamide 3-(N-(4-bromophenyl)sulfamoyl)-N-(3-cyano-6-methyl-4,5,6,7-tetrahydrobenzo[b]thiophen-2-yl)benzamide 3-(N-(benzo[d][1,3]dioxol-5-yl)sulfamoyl)-N-(2-methyl-3-nitrophenyl)benzamide 2-chloro-5-(N-(3-fluorophenyl)sulfamoyl)-N-(3-nitrophenyl)benzamide 3-(N-(4-bromophenyl)sulfamoyl)-N-(4-hydroxy-1-methyl-1H-imidazol-2-yl)benzamide N-(4-bromophenyl)-3-(indoline-1-carbonyl)benzenesulfonamide 3-((4-methylphenyl)sulfonamido)-N-(m-tolyl)benzamide 3-(N-(4-bromophenyl)sulfamoyl)-N-(3-chlorophenyl)-4-methoxybenzamide 3-(N-(4-bromophenyl)sulfamoyl)-N-(3-cyanophenyl)benzamide 2-(3-(N-(4-bromophenyl)sulfamoyl)benzamido)ethyl carbamate 3-(N-(4-bromophenyl)sulfamoyl)-N-(4-methoxyphenyl)benzamide 4-bromo-3-(N-(4-fluorophenyl)sulfamoyl)-N-(3-nitrophenyl)benzamide N-(4-bromophenyl)-3-(N-(4-bromophenyl)sulfamoyl)benzamide 3-(N-(4-chlorophenyl)sulfamoyl)-N-(3-nitrophenyl)benzamide 4-bromo-3-(N-(4-bromophenyl)sulfamoyl)-N-(3-nitrophenyl)benzamide 4-bromo-3-(N-(3-fluorophenyl)sulfamoyl)-N-(3-nitrophenyl)benzamide N-(4-bromophenyl)-3-(N-(3-nitrophenyl)sulfamoyl)benzamide 4-chloro-3-(N-(2,3-dimethylphenyl)sulfamoyl)-N-(2-methyl-5-nitrophenyl)benzamide 3-(N-(4-bromophenyl)sulfamoyl)-N-(3,4-difluorophenyl)-4-methoxybenzamide N-(3-(N-(4-methoxyphenyl)sulfamoyl)phenyl)-3-(1H-pyrrol-1-yl)benzamide N-(2-methoxy-5-nitrophenyl)-4-methyl-3-(N-phenylsulfamoyl)benzamide 3-(N-(3-acetylphenyl)sulfamoyl)-4-methyl-N-(3-nitrophenyl)benzamide N-(pyridin-3-yl)-3-(N-(3-(trifluoromethyl)phenyl)sulfamoyl)benzamide 3-(N-(4-fluorophenyl)sulfamoyl)-N-(3-nitrophenyl)benzamide N-(3-nitrophenyl)-3-(N-(3-nitrophenyl)sulfamoyl)benzamide 3-(N-(4-bromophenyl)sulfamoyl)-N-(4-chlorophenyl)-4-methoxybenzamide 4-bromo-N-(3-nitrophenyl)-3-(N-phenylsulfamoyl)benzamide 3-(3-(N-(4-bromophenyl)sulfamoyl)-4-methylbenzamido)benzoic acid 5-(N-(4-bromophenyl)sulfamoyl)-2-chloro-N-(o-tolyl)benzamide 3-(indolin-1-ylsulfonyl)-N-(3-nitrophenyl)benzamide 4-chloro-N-(2-methyl-3-nitrophenyl)-3-(N-phenylsulfamoyl)benzamide N-(3-nitrophenyl)-3-(N-(o-tolyl)sulfamoyl)benzamide 3-(N-(4-chlorophenyl)sulfamoyl)-N-(2-methoxy-5-nitrophenyl)benzamide 3-(N-(4-bromophenyl)sulfamoyl)-N-(2-(tetrahydrofuran-2-yl)ethyl)benzamide 3-(N-(4-bromophenyl)sulfamoyl)-4-chloro-N-phenylbenzamide 5-(N-(4-bromophenyl)sulfamoyl)-2-chloro-N-(2-nitrophenyl)benzamide 4-((2-methyl-5-((3-nitrophenyl)carbamoyl)phenyl)sulfonamido)benzoic acid 3-(N-(4-bromophenyl)sulfamoyl)-N-(3-(2-oxopyrrolidin-1-yl)propyl)benzamide N-(4-acetamidophenyl)-3-(N-(4-bromophenyl)sulfamoyl)benzamide 3-(N-(4-bromophenyl)sulfamoyl)-N-(furan-2-ylmethyl)benzamide 5-(N-(4-bromophenyl)sulfamoyl)-2,4-dichloro-N-(2-methyl-5-nitrophenyl)benzamide 3-(N-benzylsulfamoyl)-N-(3-nitrophenyl)benzamide 3-(N-(3-fluorophenyl)sulfamoyl)-N-(3-nitrophenyl)benzamide 2-chloro-5-(N-(4-fluorophenyl)sulfamoyl)-N-(3-nitrophenyl)benzamide ethyl 5-(((3-((3-nitrophenyl)carbamoyl)phenyl)sulfonamido)methyl) furan-2-carboxylate 3-(N-(4-bromophenyl)sulfamoyl)-N-(2-nitrophenyl)benzamide 3-(N-(adamantan-1-ylmethyl)sulfamoyl)-N-(3-nitrophenyl)benzamide 4-chloro-N-(pyridin-3-yl)-3-(N-(p-tolyl)sulfamoyl)benzamide 3-(N-(5-bromoquinolin-8-yl)sulfamoyl)-N-phenylbenzamide 3-(N-(2-(2-methyl-1H-indol-3-yl)ethyl)sulfamoyl)-N-(3-nitrophenyl)benzamide 3-(N-methyl-N-phenylsulfamoyl)-N-(pyridin-3-yl)benzamide 3-(N-(2-(1H-indol-3-yl)ethyl)sulfamoyl)-N-(3-nitrophenyl)benzamide 3-(N-(5-bromoquinolin-8-yl)sulfamoyl)-N-(3-nitrophenyl)benzamide 4-methyl-N-(2-methyl-5-nitrophenyl)-3-(N-(o-tolyl)sulfamoyl)benzamide
N1,N3-bis(4-bromophenyl)isophthalamide
4-bromo-3-(N-(2,3-dihydrobenzo[b][1,4]dioxin-6-yl)sulfamoyl)-N-(3-nitrophenyl)benzamide
3-(N-methyl-N-(p-tolyl)sulfamoyl)-N-(5-methylpyridin-2-yl)benzamide
(3,4-dihydro-1,5-naphthyridin-1(2H)-yl)(3-(indolin-1-ylsulfonyl)phenyl)methanone,
N-(pyridin-4-yl)-3-(N-(p-tolyl)sulfamoyl)benzamide
3-((4-bromophenyl)sulfonamido)-N-methyl-N-phenylbenzamide
ethyl (3-((3-(N-(4-chlorophenyl)sulfamoyl)phenyl)carbamoyl) phenyl)carbamate
5-(N-(2-fluorophenyl)sulfamoyl)-2,3-dimethoxy-N-(6-oxo-1,6-dihydropyridin-3-yl)benzamide
2-chloro-5-(N-(4-fluorophenyl)sulfamoyl)-N-(pyridin-3-yl)benzamide
3-(N-(2,5-dichlorophenyl)sulfamoyl)-N-(pyridin-3-yl) benzamide
3-(N-(4-ethoxyphenyl)sulfamoyl)-N-(pyridin-2-yl)benzamide
N-(3-(N-(4-chlorophenyl)sulfamoyl)phenyl)isophthalamide
3-(N-(4-bromophenyl)sulfamoyl)-N-(4-fluorophenyl)-4-methoxybenzamide
3-((4-ethoxyphenyl)sulfonamido)-N-(3-fluorophenyl) benzamide
5-(N-(4-fluorophenyl)sulfamoyl)-2-methyl-N-(pyridin-3-yl)benzamide
3-(cyclopropanecarboxamido)-N-(3-(N-methyl-N-phenylsulfamoyl)phenyl)benzamide
4-(3-(N-(p-tolyl)sulfamoyl)benzamido) picolinamide
2-methyl-N-(pyridin-3-yl)-5-(N-(p-tolyl)sulfamoyl)benzamide
3-(N-(4-bromophenyl)sulfamoyl)-N-(2-oxo-2-((2,2,2-trifluoroethyl)amino)ethyl)benzamide
N-ethyl-3-(N-methyl-N-phenylsulfamoyl)-N-(pyridin-3-yl)benzamide
3-(N-(2-fluorophenyl)sulfamoyl)-N-(pyridin-3-yl)benzamide
3-(N-(4-bromophenyl)sulfamoyl)-N-(2-methylbenzo[d]oxazol-5-yl)benzamide
3-(N-(4-bromophenyl)sulfamoyl)-N-(2-oxo-2-(piperidin-1-yl)ethyl)benzamide
3-(N-methyl-N-(p-tolyl)sulfamoyl)-N-(4-(trifluoromethyl) pyridin-2-yl)benzamide
N-phenyl-3-(phenylsulfonamido)benzamide
3-(N-methyl-N-(p-tolyl)sulfamoyl)-N-(pyridin-4-yl)benzamide
3-(indolin-1-ylsulfonyl)-N-(6-methoxypyridin-3-yl)benzamide
N-methyl-3-(N-methyl-N-phenylsulfamoyl)-N-phenylbenzamide
N-cyclopropyl-3-(3-((4-methylphenyl)sulfonamido)benzamido)benzamide
3-(N-(4-bromophenyl)sulfamoyl)-N-(2-methyl-2-morpholinopropyl)benzamide
3-(N-(3-chlorophenyl)sulfamoyl)-N-(pyridin-3-yl)benzamide
3-(N-(benzo[d][1,3]dioxol-5-yl)sulfamoyl)-N-(pyridin-3-yl)benzamide
N-(4-(2-amino-2-oxoethyl)phenyl)-3-(N-(4-bromophenyl)sulfamoyl)benzamide
N-(3-(N-(4-methoxyphenyl)sulfamoyl)phenyl)benzamide
3-(N-ethyl-N-phenylsulfamoyl)-N-(quinolin-2-yl)benzamide
3-(N-(4-chlorophenyl)sulfamoyl)-N-(6-methoxypyridin-3-yl)benzamide
N-(2-methoxy-5-nitrophenyl)-3-(N-(4-methoxyphenyl) sulfamoyl)benzamide
2-chloro-N-(3-nitrophenyl)-5-(N-phenylsulfamoyl)benzamide
N-(pyridin-3-yl)-3-(N-(p-tolyl)sulfamoyl)benzamide hydrochloride
3-(N-(4-bromophenyl)sulfamoyl)-N-(2,4-difluorophenyl) benzamide
3-(N-(4-bromophenyl)sulfamoyl)-N-(1,2,3,4-tetrahydronaphthalen-1-yl)benzamide
N-(3-(N,N-dimethylsulfamoyl)phenyl)-3-(phenylsulfonamido)benzamide
N-(3-chlorophenyl)-3-((4-ethoxyphenyl)sulfonamido) benzamide
3-(N-(4-bromophenyl)sulfamoyl)-N-(2-fluorobenzyl) benzamide
$N^1,N^3$-diphenylbenzene-1,3-disulfonamide
3-acetamido-N-(3-(N-(4-chlorophenyl)sulfamoyl)phenyl)benzamide
N-(2-methoxy-5-nitrophenyl)-3-((2-methylindolin-1-yl) sulfonyl)benzamide
N-cyclopropyl-3-(3-(phenylsulfonamido)benzamido) benzamide
3-(N-ethyl-N-phenylsulfamoyl)-N-(5-fluoropyridin-2-yl) benzamide
3-(phenylsulfonamido)-N-(3-(piperidin-1-ylsulfonyl) phenyl)benzamide
3-(N-(4-bromophenyl)sulfamoyl)-N-(1-methoxypropan-2-yl)benzamide
N-(4-fluoro-3-nitrophenyl)-3-((2-methylindolin-1-yl) sulfonyl)benzamide
3-(N-(2,4-dimethylphenyl)sulfamoyl)-N-(pyridin-3-yl) benzamide
N-cyclopropyl-3-(3-((4-ethoxyphenyl)sulfonamido)benzamido)benzamide
3-(N-(4-bromophenyl)sulfamoyl)-N-(6-methoxypyridin-3-yl)benzamide
N-(3-(N-(4-chlorophenyl)sulfamoyl)phenyl)-3-(1H-tetrazol-1-yl)benzamide
3-(indolin-1-ylsulfonyl)-N-(1-isopropyl-1H-pyrazolo[3,4-b]pyridin-5-yl)benzamide
N-(4-(N-(3-chlorophenyl)sulfamoyl)phenyl) picolinamide
2-chloro-5-(N-(4-chlorophenyl)sulfamoyl)-N-(pyridin-3-yl)benzamide
N-(3-(N-(4-chlorophenyl)sulfamoyl)phenyl)-3-methoxybenzamide
2-chloro-N-(4-chloro-3-nitrophenyl)-5-(N-ethyl-N-phenylsulfamoyl)benzamide
3-(N-(4-bromophenyl)sulfamoyl)-N-(4-morpholinophenyl)benzamide
4-((3-((3-nitrophenyl)carbamoyl)phenyl)sulfonamido) benzoic acid
N-(3-acetylphenyl)-3-(N-(4-bromophenyl)sulfamoyl) benzamide
3-(difluoromethoxy)-N-(3-(N-methyl-N-phenylsulfamoyl)phenyl)benzamide
N-(6-methoxypyridin-3-yl)-3-(N-methyl-N-phenylsulfamoyl)benzamide
3-cyano-N-(3-(N-methyl-N-phenylsulfamoyl)phenyl) benzamide
3-(N-(4-bromophenyl)sulfamoyl)-N-(p-tolyl)benzamide
3-(indolin-1-ylsulfonyl)-N-(pyridin-3-yl)benzamide N-(3-(1H-pyrazol-5-yl)phenyl)-3-(N-(4-bromophenyl)sulfamoyl)benzamide
3-(N-methyl-N-phenylsulfamoyl)-N-(6-methylpyridin-2-yl)benzamide
N-(3-(N-methyl-N-phenylsulfamoyl)phenyl)-3-(1H-tetrazol-1-yl)benzamide
3-(N-(4-bromophenyl)sulfamoyl)-N-ethylbenzamide
3-(N-(4-bromophenyl)sulfamoyl)-N-(m-tolyl)benzamide
3-((2-methylindolin-1-yl)sulfonyl)-N-(pyridin-3-yl)benzamide
3-(N-(4-bromophenyl)sulfamoyl)-N-(3-methylpyridin-2-yl)benzamide
3-(N-methyl-N-phenylsulfamoyl)-N-phenylbenzamide
3-methoxy-N-(3-(N-(4-methoxyphenyl)sulfamoyl)phenyl)benzamide
N-(3-(N-methyl-N-phenylsulfamoyl)phenyl)-3-(trifluoromethyl)benzamide
N-benzyl-3-(N-(4-bromophenyl)sulfamoyl)benzamide
3-(N-(4-bromophenyl)sulfamoyl)-N-(4-chlorophenyl)benzamide
4-methyl-N-(3-nitrophenyl)-3-(N-(p-tolyl)sulfamoyl)benzamide
5-(N-(4-bromophenyl)sulfamoyl)-2,4-dichloro-N-phenylbenzamide
2-chloro-N-(3-nitrophenyl)-5-(N-(o-tolyl)sulfamoyl)benzamide
4-methyl-N-(3-nitrophenyl)-3-(N-(o-tolyl)sulfamoyl)benzamide
3-(N-(4-bromophenyl)sulfamoyl)-N-(4-nitrophenyl)benzamide
2-chloro-5-(N-(4-methoxyphenyl)sulfamoyl)-N-(3-nitrophenyl)benzamide
4-methyl-N-(2-methyl-5-nitrophenyl)-3-(N-(p-tolyl)sulfamoyl)benzamide
3-(N-(4-bromophenyl)sulfamoyl)-N-(o-tolyl)benzamide
3-(N-(2-methoxyphenyl)sulfamoyl)-4-methyl-N-(3-nitrophenyl)benzamide
4-methyl-N-(pyridin-3-yl)-3-(N-(p-tolyl)sulfamoyl)benzamide
3-(N-(4-chlorophenyl)sulfamoyl)-4-methyl-N-(3-nitrophenyl)benzamide
4-methyl-N-(3-nitrophenyl)-3-(N-phenylsulfamoyl)benzamide
3-(N-(4-bromophenyl)sulfamoyl)-4-methoxy-N-phenylbenzamide
N-(6-methylpyridin-2-yl)-3-(N-phenylsulfamoyl)benzamide
3-(N-(4-bromophenyl)sulfamoyl)-4-methyl-N-(3-nitrophenyl)benzamide
3-(N-(4-ethoxyphenyl)sulfamoyl)-4-methyl-N-(3-nitrophenyl)benzamide
3-(N-phenylsulfamoyl)-N-(pyridin-4-yl)benzamide
N-(3-nitrophenyl)-3-(N-(p-tolyl)sulfamoyl)benzamide
3-(N-(3-fluorophenyl)sulfamoyl)-4-methyl-N-(3-nitrophenyl)benzamide
2,4-dichloro-5-(N-(4-ethoxyphenyl)sulfamoyl)-N-(2-methyl-5-nitrophenyl)benzamide
3-nitro-N-(3-(N-phenylsulfamoyl)phenyl)benzamide
3-(N-phenylsulfamoyl)-N-(pyridin-3-yl)benzamide
5-(N-(4-bromophenyl)sulfamoyl)-2-chloro-N-(4-chlorophenyl)benzamide
4-bromo-N-(3-nitrophenyl)-3-(N-(p-tolyl)sulfamoyl)benzamide
2,4-dichloro-N-(2-methyl-5-nitrophenyl)-5-(N-phenylsulfamoyl)benzamide
3-(N-phenylsulfamoyl)-N-(pyridin-2-yl)benzamide
3-(N-(4-methoxyphenyl)sulfamoyl)-4-methyl-N-(3-nitrophenyl)benzamide
3-(N-(4-bromophenyl)sulfamoyl)-N-phenylbenzamide
5-(N-(4-bromophenyl)sulfamoyl)-2-chloro-N-(3-nitrophenyl)benzamide
4-bromo-3-(N-(4-chlorophenyl)sulfamoyl)-N-(3-nitrophenyl)benzamide
2-chloro-5-(N-(2-methoxyphenyl)sulfamoyl)-N-(3-nitrophenyl)benzamide;
3-((4-methoxyphenyl)sulfonamido)-N-(m-tolyl)benzamide;
N-(2-chlorophenyl)-3-(N-(4-chlorophenyl)sulfamoyl)benzamide;
N-(4-bromophenyl)-3-(N-(2-chloro-5-(trifluoromethyl)phenyl)sulfamoyl)benzamide;
3-(N-(benzo[d][1,3]dioxol-5-yl)sulfamoyl)-N-(3,5-dimethylphenyl)benzamide;
N-(3-(pyrrolidin-1-ylsulfonyl)phenyl)-2-((3-(trifluoromethyl)phenyl)sulfonamido)benzamide;
3-(N-(benzo[d][1,3]dioxol-5-yl)sulfamoyl)-N-(3-chloro-4-(difluoromethoxy)phenyl)benzamide;
N-(3-(N-(4-bromophenyl)sulfamoyl)phenyl)-3-methyl-4-nitrobenzamide
N-(4-fluoro-2-methylphenyl)-4-(N-(3-(trifluoromethyl)phenyl)sulfamoyl)benzamide;
3,4-dimethyl-N-(3-(phenylsulfonamido)phenyl)benzamide;
4-(N-(4-chlorophenyl)sulfamoyl)-N-(3-cyanophenyl)benzamide;
3-(N-(benzo[d][1,3]dioxol-5-yl)sulfamoyl)-N-(3-bromophenyl)benzamide;
3-(N-(benzo[d][1,3]dioxol-5-yl)sulfamoyl)-N-(4-cyanophenyl)benzamide
N-(benzo[d][1,3]dioxol-5-yl)-3-(indoline-1-carbonyl)benzenesulfonamide;
N-(4-bromophenyl)-3-(indolin-1-ylsulfonyl)benzamide;
3-(N-(benzo[d][1,3]dioxol-5-yl)sulfamoyl)-N-(3-chloro-4-fluorophenyl)benzamide;
N-(4-bromo-3-methylphenyl)-3-((3,4-difluorophenyl)sulfonamido)benzamide;
3-(N-(benzo[d][1,3]dioxol-5-yl)sulfamoyl)-N-(4-(trifluoromethyl)phenyl)benzamide;
N-(4-fluorophenyl)-4-(N-(3-(trifluoromethyl)phenyl)sulfamoyl)benzamide;
N-(3-(N-(4-bromophenyl)sulfamoyl)phenyl)-4-methylbenzamide;
4-bromo-N-(2-((3-(N-(4-bromophenyl)sulfamoyl)phenyl)amino)-2-oxoethyl)benzamide;
3-((3-cyanophenyl)sulfonamido)-N-(3-(trifluoromethyl)phenyl)benzamide;
3-(N-(benzo[d][1,3]dioxol-5-yl)sulfamoyl)-N-(3-chlorophenyl)benzamide
N-(3-(N-(4-bromophenyl)sulfamoyl)phenyl)-3-oxo-3,4-dihydro-2H-benzo[b][1,4]thiazine-6-carboxamide;
N-(3-(N-(4-bromophenyl)sulfamoyl)phenyl)benzo[d]thiazole-6-carboxamide;
3-(N-(benzo[d][1,3]dioxol-5-yl)sulfamoyl)-N-(4-(trifluoromethoxy)phenyl)benzamide;
3-(N-(benzo[d][1,3]dioxol-5-yl)sulfamoyl)-N-(4-bromophenyl)benzamide;
4-(N-(2-chlorophenyl)sulfamoyl)-N-(3-cyanophenyl)benzamide;
4-(N-(4-chlorophenyl)sulfamoyl)-N-(4-fluoro-3-nitrophenyl)benzamide;
N-(3-(pyrrolidin-1-ylsulfonyl)phenyl)-4-(N-(p-tolyl)sulfamoyl)benzamide;

N-(2-((3-(N-(4-bromophenyl)sulfamoyl)phenyl)amino)-2-oxoethyl)-2-fluorobenzamide;
N-(3-cyanophenyl)-4-(N-(2,3-dimethylphenyl)sulfamoyl)benzamide;
N-(3-(N-(4-bromophenyl)sulfamoyl)phenyl)thiophene-3-carboxamide;
N-(4-chlorophenyl)-4-(indoline-1-carbonyl)benzenesulfonamide;
3-fluoro-4-methyl-N-(3-(phenylsulfonamido)phenyl)benzamide;
4-chloro-3-cyano-N-(3-(phenylsulfonamido)phenyl)benzamide;
N-(3-cyanophenyl)-4-(N-(4-ethoxyphenyl)sulfamoyl)benzamide;
N-(3-((4-chlorophenyl)sulfonamido)phenyl)-2,5-difluorobenzamide;
N-(benzo[d][1,3]dioxol-5-yl)-2-((3-(trifluoromethyl)phenyl)sulfonamido)benzamide;
3-(indolin-1-ylsulfonyl)-N-(m-tolyl)benzamide;
2-(N-methyl-N-phenylsulfamoyl)-N-(4-(pyrrolidin-1-ylsulfonyl)phenyl)benzamide;
3-(N-(benzo[d][1,3]dioxol-5-yl)sulfamoyl)-N-(4-fluorophenyl)benzamide;
N-(3-(trifluoromethyl)phenyl)-3-((3-(trifluoromethyl)phenyl)sulfonamido)benzamide;
3-((2-oxo-1,2,3,4-tetrahydroquinoline)-6-sulfonamido)-N-(3-(trifluoromethyl)phenyl)benzamide;
N-(3-(N-(4-bromophenyl)sulfamoyl)phenyl)cyclohexanecarboxamide;
3-(N-(benzo[d][1,3]dioxol-5-yl)sulfamoyl)-N-(3,4-difluorophenyl)benzamide;
N-(3-(N-(4-bromophenyl)sulfamoyl)phenyl)-6-chloronicotinamide;
N-(4-bromophenyl)-3-(N-(4-fluorophenyl)sulfamoyl)benzamide;
4-(N-(4-chlorophenyl)sulfamoyl)-N-(3-fluorophenyl)benzamide;
N-(4-(difluoromethoxy)phenyl)-2-(N-(3-(trifluoromethyl)phenyl)sulfamoyl)benzamide;
N-(2,4-dimethylphenyl)-4-(N-(3-(trifluoromethyl)phenyl)sulfamoyl)benzamide;
(E)-N-(3-(N-(4-bromophenyl)sulfamoyl)phenyl)-3-(furan-2-yl)acrylamide;
N-(3-((3,4-dimethylphenyl)sulfonamido)phenyl)-2,3-dihydrobenzo[b][1,4]dioxine-6-carboxamide;
N-(3,4-dimethoxyphenyl)-2-((3-(trifluoromethyl)phenyl)sulfonamido)benzamide;
3-((2-cyanophenyl)sulfonamido)-N-(3-(trifluoromethyl)phenyl)benzamide;
3-(N-(benzo[d][1,3]dioxol-5-yl)sulfamoyl)-N-(3,4-dimethylphenyl)benzamide;
N-(p-tolyl)-2-((3-(trifluoromethyl)phenyl)sulfonamido)benzamide;
N-(3-(N-(4-bromophenyl)sulfamoyl)phenyl)benzo[d][1,3]dioxole-5-carboxamide;
methyl 4-(2-(N-methyl-N-phenylsulfamoyl)benzamido)benzoate;
N-(3-((4-bromo-2-chlorophenyl)sulfonamido)phenyl)furan-2-carboxamide;
N-(4-cyanophenyl)-2-(N-methyl-N-phenylsulfamoyl)benzamide;
3-fluoro-4-methyl-N-(2-(N-phenylsulfamoyl)phenyl)benzamide;
3-(N-(4-chlorophenyl)sulfamoyl)-N-(3-ethynylphenyl)benzamide;
3-(N-(benzo[d][1,3]dioxol-5-yl)sulfamoyl)-N-(o-tolyl)benzamide;
N-(3-(1H-pyrazol-5-yl)phenyl)-3-(N-(4-bromophenyl)sulfamoyl)benzamide;
N-(adamantan-1-yl)-3-(N-(4-bromophenyl)sulfamoyl)benzamide;
N-(4-chloro-3-nitrophenyl)-3-(N-(2-chloro-5-(trifluoromethyl)phenyl)sulfamoyl)benzamide;
N-(4-fluoro-3-nitrophenyl)-3-((2-methylindolin-1-yl)sulfonyl)benzamide;
3-(N-(benzo[d][1,3]dioxol-5-yl)sulfamoyl)-N-(4-(difluoromethoxy)phenyl)benzamide;
3-(N-(4-bromophenyl)sulfamoyl)-N-(1,2,3,4-tetrahydronaphthalen-1-yl)benzamide;
3-(N-(benzo[d][1,3]dioxol-5-yl)sulfamoyl)-N-(p-tolyl)benzamide;
3-(N-(4-chlorophenyl)sulfamoyl)-N-(4-methoxyphenyl)benzamide;
N-(4-bromophenyl)-3-(4-(3-chlorophenyl) piperazine-1-carbonyl)benzenesulfonamide;
3-(N-(benzo[d][1,3]dioxol-5-yl)sulfamoyl)-N-(3-(methylthio)phenyl)benzamide;
3-(N-(benzo[d][1,3]dioxol-5-yl)sulfamoyl)-N-(2-fluorophenyl)benzamide;
N-(4-bromophenyl)-3-(N-(3-(trifluoromethyl)phenyl)sulfamoyl)benzamide;
3-(N-(2-chloro-5-(trifluoromethyl)phenyl)sulfamoyl)-N-(2-methoxy-5-nitrophenyl)benzamide;
3-(N-(benzo[d][1,3]dioxol-5-yl)sulfamoyl)-N-(2-fluoro-5-methylphenyl)benzamide;
3-(N-(benzo[d][1,3]dioxol-5-yl)sulfamoyl)-N-(3-methoxyphenyl)benzamide;
3-(N-(4-chlorophenyl)sulfamoyl)-N-(2-methoxy-5-nitrophenyl)benzamide;
3-(N-(4-bromophenyl)sulfamoyl)-N-(4-morpholinophenyl)benzamide;
3-(N-(4-bromophenyl)sulfamoyl)-N-(2-methylbenzo[d]oxazol-5-yl)benzamide;
3-(N-(benzo[d][1,3]dioxol-5-yl)sulfamoyl)-N-(3,5-dimethoxyphenyl)benzamide;
3-(N-(benzo[d][1,3]dioxol-5-yl)sulfamoyl)-N-(3,4-dihydro-2H-benzo[b][1,4]dioxepin-7-yl)benzamide;
3-(N-(benzo[d][1,3]dioxol-5-yl)sulfamoyl)-N-(4-(2,2,2-trifluoroethoxy)phenyl)benzamide;
3-(N-(4-bromophenyl)sulfamoyl)-N-((4-(4-bromophenyl)tetrahydro-2H-pyran-4-yl)methyl)benzamide;
3-(N-(benzo[d][1,3]dioxol-5-yl)sulfamoyl)-N-(2-methylbenzo[d]thiazol-6-yl)benzamide;
N-(4-bromophenyl)-3-(4,5,6,7-tetrahydrothieno[3,2-c]pyridine-5-carbonyl)benzenesulfonamide;
3-(indolin-1-ylsulfonyl)-N-(2-methoxy-5-nitrophenyl)benzamide;
3-(N-(benzo[d][1,3]dioxol-5-yl)sulfamoyl)-N-phenylbenzamide;
3-(N-(benzo[d][1,3]dioxol-5-yl)sulfamoyl)-N-(3-fluorophenyl)benzamide;
3-(N-(2-methoxyphenyl)sulfamoyl)-N-(3-(trifluoromethyl)phenyl)benzamide;
N-(4-bromophenyl)-3-(N-(4-methoxyphenyl)-N-methylsulfamoyl)benzamide;
3-(N-(2-methoxyphenyl)sulfamoyl)-N-(3-nitrophenyl)benzamide;
methyl 3-(4-bromophenyl)-1-(3-(N-(4-bromophenyl)sulfamoyl)benzoyl) pyrrolidine-3-carboxylate;
3-(N-(benzo[d][1,3]dioxol-5-yl)sulfamoyl)-N-(m-tolyl)benzamide;
N-(2-methoxy-5-nitrophenyl)-3-((2-methylindolin-1-yl)sulfonyl)benzamide;

3-(N-(4-bromophenyl)sulfamoyl)-N-(4-hydroxy-1-methyl-1H-imidazol-2-yl)benzamide;
3-(N-(4-bromophenyl)sulfamoyl)-N-(4-methyl-3-(morpholinosulfonyl)phenyl)benzamide;
3-(N-(benzo[d][1,3]dioxol-5-yl)sulfamoyl)-N-(4-(cyanomethyl)phenyl)benzamide;
N-(4-fluoro-3-nitrophenyl)-3-(N-(2-methoxy-5-nitrophenyl)sulfamoyl)benzamide;
3-(N-(benzo[d][1,3]dioxol-5-yl)sulfamoyl)-N-(4-methoxyphenyl)benzamide;
3-(N-(benzo[d][1,3]dioxol-5-yl)sulfamoyl)-N-(3,4-dimethoxyphenyl)benzamide;
N-(4-bromophenyl)-3-(N-(4-methoxyphenyl)sulfamoyl)benzamide;
3-(N-(4-bromophenyl)sulfamoyl)-N-(2-(dimethylamino)-2-(4-methoxyphenyl)ethyl)benzamide;
3-(N-(4-bromophenyl)sulfamoyl)-N-(6-methoxypyridin-3-yl)benzamide;
3-(N-(4-bromophenyl)sulfamoyl)-N-(2-oxo-2-(piperidin-1-yl)ethyl)benzamide;
1-(3-(N-(4-bromophenyl)sulfamoyl)benzoyl) piperidine-3-carboxamide;
3-(N-(benzo[d][1,3]dioxol-5-yl)sulfamoyl)-N-(4-morpholinophenyl)benzamide;
3-(N-(4-bromophenyl)sulfamoyl)-N-(3-morpholinopropyl)benzamide;
3-(N-(2-fluorophenyl)sulfamoyl)-N-(3-(trifluoromethyl)phenyl)benzamide;
3-(N-(4-bromophenyl)sulfamoyl)-N-(4-hydroxybutyl)benzamide;
3-(N-(4-bromophenyl)sulfamoyl)-N-(2-oxo-2-(propylamino)ethyl)-N-propylbenzamide;
3-(N-(4-bromophenyl)sulfamoyl)-N-ethylbenzamide;
3-(N-(4-bromophenyl)sulfamoyl)-N,N-diethylbenzamide;
3-(N-(4-bromophenyl)sulfamoyl)-N,N-dimethylbenzamide;
3-(N-(4-bromophenyl)sulfamoyl)-N-(furan-2-ylmethyl)benzamide;
N-(4-(2-amino-2-oxoethyl)phenyl)-3-(N-(4-bromophenyl)sulfamoyl)benzamide;
3-(N-(4-bromophenyl)sulfamoyl)-N-(2-(tetrahydrofuran-2-yl)ethyl)benzamide;
N-(3-(1H-imidazol-1-yl)propyl)-3-(N-(4-bromophenyl)sulfamoyl)benzamide;
3-(N-(4-bromophenyl)sulfamoyl)-N-(3-(2-oxopyrrolidin-1-yl)propyl)benzamide;
3-(N-(4-bromophenyl)sulfamoyl)-N-(2-methyl-2-morpholinopropyl)benzamide;
3-(N-(4-bromophenyl)sulfamoyl)-N-(2-(furan-2-yl)-2-(pyrrolidin-1-yl)ethyl)benzamide;
3-(N-(4-bromophenyl)sulfamoyl)-N-(2-oxo-2-((2,2,2-trifluoroethyl)amino)ethyl)benzamide;
2-(3-(N-(4-bromophenyl)sulfamoyl)benzamido)ethyl carbamate;
3-(4-acetylpiperazine-1-carbonyl)-N-(4-bromophenyl)benzenesulfonamide;
3-(N-(4-bromophenyl)sulfamoyl)-N-(1-methoxypropan-2-yl)benzamide;
3-(N-(4-bromophenyl)sulfamoyl)-N-(2-morpholinoethyl)benzamide;
N-(4-bromophenyl)-3-(2-methyl-3-oxopiperazine-1-carbonyl)benzenesulfonamide;
N,N-diallyl-3-(N-(4-bromophenyl)sulfamoyl)-4-chlorobenzamide;
3-(N-(4-bromophenyl)sulfamoyl)-N-(2-(dimethylamino)-2-(furan-2-yl)ethyl)benzamide;
3-(N-(4-bromophenyl)sulfamoyl)-N-methoxy-N-methylbenzamide;
3-(N-(4-bromophenyl)sulfamoyl)-N-(2-(dimethylamino)-3-methylbutyl)benzamide;
3-(N-(4-bromophenyl)sulfamoyl)-N-(1-isopropylpiperidin-4-yl)benzamide;
ethyl 4-(3-(N-(4-bromophenyl)sulfamoyl)benzoyl) piperazine-1-carboxylate;
N-(1-benzylpiperidin-4-yl)-3-(N-(4-bromophenyl)sulfamoyl)benzamide;
N-(4-bromophenyl)-3-(pyrrolidine-1-carbonyl)benzenesulfonamide;
3-(N-(4-bromophenyl)sulfamoyl)-N-cyclopropyl-N-(pyridin-3-ylmethyl)benzamide;
3-(N-(4-bromophenyl)sulfamoyl)-N-(2-(2,6-dimethylmorpholino)ethyl)benzamide;
3-(N-(4-bromophenyl)sulfamoyl)-N-methyl-N-((5-methylfuran-2-yl)methyl)benzamide;
3-(N-(4-bromophenyl)sulfamoyl)-N-((1-(dimethylamino)cyclohexyl)methyl)benzamide;
N-(3-cyanophenyl)-3-((3,4-dichlorophenyl)sulfonamido)benzamide;
3-((3-chlorophenyl)sulfonamido)-N-(3-(trifluoromethyl)phenyl)benzamide;
N-(3-cyanophenyl)-3-((5-fluoro-2-methylphenyl)sulfonamido)benzamide;
3-((3-acetylphenyl)sulfonamido)-N-(3-(trifluoromethyl)phenyl)benzamide;
3-((2,3-dihydrobenzo[b][1,4]dioxine)-6-sulfonamido)-N-(2,3-dimethylphenyl)benzamide;
2-chloro-5-(N-(3-((3-(trifluoromethyl)phenyl)carbamoyl)phenyl)sulfamoyl)benzoic acid;
2-bromo-5-(N-(3-((3-(trifluoromethyl)phenyl)carbamoyl)phenyl)sulfamoyl)benzoic acid;
3-((2,5-dimethoxyphenyl)sulfonamido)-N-(3-(trifluoromethyl)phenyl)benzamide;
3-(4-(N-(3-((3-(trifluoromethyl)phenyl)carbamoyl)phenyl)sulfamoyl)phenyl)propanoic acid;
N-(3-carbamoyl-4-chlorophenyl)-3-((2,3-dihydrobenzo[b][1,4]dioxine)-6-sulfonamido)benzamide;
3-((2-fluorophenyl)sulfonamido)-N-(3-(trifluoromethyl)phenyl)benzamide;
N-(3-cyanophenyl)-3-((3,4-difluorophenyl)sulfonamido)benzamide;
3-((2-methoxy-5-methylphenyl)sulfonamido)-N-(3-(trifluoromethyl)phenyl)benzamide;
(E)-N-(3-(N-(4-bromophenyl)sulfamoyl)phenyl)-3-(3-chlorophenyl)acrylamide;
N-(3-(N-(4-bromophenyl)sulfamoyl)phenyl)-2-(3-fluoro-4-methoxyphenyl) acetamide;
N-(3-(N-(4-bromophenyl)sulfamoyl)phenyl)-2-methoxybenzamide;
N-(3-(N-(4-bromophenyl)sulfamoyl)phenyl)-4-cyanobenzamide;
N-(3-(N-(4-bromophenyl)sulfamoyl)phenyl)-3,4-dimethoxybenzamide;
N-(3-(N-(4-bromophenyl)sulfamoyl)phenyl)-4-(methylsulfinyl)benzamide;
N-(3-(N-(4-bromophenyl)sulfamoyl)phenyl)-1-methyl-1H-pyrazole-4-carboxamide;
N-(3-(N-(4-bromophenyl)sulfamoyl)phenyl)-1,5-dimethyl-1H-pyrazole-4-carboxamide;
4-bromo-N-(3-((5-bromo-7-chloro-2-oxo-2,3-dihydrobenzo[d]oxazole)-6-sulfonamido)phenyl)benzamide;
2-bromo-N-(3-((3,4-dimethylphenyl)sulfonamido)phenyl)-5-methoxybenzamide;

N-(3-((3,4-dimethylphenyl)sulfonamido)phenyl)-8-methoxy-2,3-dihydrobenzo[b][1,4]dioxine-6-carboxamide;
N-(3-((4-chlorophenyl)sulfonamido)phenyl)-1H-benzo[d][1,2,3]triazole-5-carboxamide;
N-(3-((3,4-dimethylphenyl)sulfonamido)phenyl)-2-methoxybenzamide;
N-(3-((4-chlorophenyl)sulfonamido)phenyl)-1H-benzo[d]imidazole-5-carboxamide;
N-(3-((4-chlorophenyl)sulfonamido)phenyl)-2,4-difluorobenzamide;
N-(3-((4-chlorophenyl)sulfonamido)phenyl)benzamide;
3-methyl-2-nitro-N-(3-(phenylsulfonamido)phenyl)benzamide;
N-(3-((4-chlorophenyl)sulfonamido)phenyl)-2-methyl-5-(methylsulfonyl)benzamide;
4-methyl-3-nitro-N-(3-(phenylsulfonamido)phenyl)benzamide;
N-(3-((3,4-dimethylphenyl)sulfonamido)phenyl)-3-methoxy-4-propoxybenzamide;
N-(3-((4-chlorophenyl)sulfonamido)phenyl)-2-(trifluoromethyl)benzamide;
N-(4-chloro-2-methoxy-5-methylphenyl)-2-(N-methyl-N-phenylsulfamoyl)benzamide;
N-(benzo[d][1,3]dioxol-5-yl)-2-(N-methyl-N-phenylsulfamoyl)benzamide;
N-(3-ethynylphenyl)-2-(N-methyl-N-phenylsulfamoyl)benzamide;
N-(4-((difluoromethyl)thio)phenyl)-2-(piperidin-1-ylsulfonyl)benzamide;
N-(3-chloro-4-(difluoromethoxy)phenyl)-2-(piperidin-1-ylsulfonyl)benzamide;
N-(4-chloro-2-fluorophenyl)-2-(N-methyl-N-phenylsulfamoyl)benzamide;
2-(piperidin-1-ylsulfonyl)-N-(3-(trifluoromethyl)phenyl)benzamide;
N-(2,2-difluorobenzo[d][1,3]dioxol-5-yl)-2-(piperidin-1-ylsulfonyl)benzamide;
N-(4-acetamidophenyl)-2-(N-methyl-N-phenylsulfamoyl)benzamide;
2-(N-methyl-N-phenylsulfamoyl)-N-(4-morpholinophenyl)benzamide;
N-methyl-N-phenyl-2-(1,2,3,4-tetrahydroquinoline-1-carbonyl)benzenesulfonamide;
N-(4-(1-methyl-1H-1,2,4-triazol-3-yl)phenyl)-2-(morpholine-4-carbonyl)benzenesulfonamide;
N-(4-methoxyphenyl)-2-(piperidin-1-ylsulfonyl)benzamide;
N-(4-(difluoromethoxy)phenyl)-2-(piperidin-1-ylsulfonyl)benzamide;
2-(piperidin-1-ylsulfonyl)-N-(4-(trifluoromethyl)phenyl)benzamide;
N-(2-methoxy-5-methylphenyl)-2-(N-methyl-N-phenylsulfamoyl)benzamide;
N-(3-bromophenyl)-2-(piperidin-1-ylsulfonyl)benzamide;
N-(4-carbamoylphenyl)-2-(N-methyl-N-phenylsulfamoyl)benzamide;
N-(4-(1H-tetrazol-1-yl)phenyl)-2-(N-methyl-N-phenylsulfamoyl)benzamide;
N-methyl-2-(N-methyl-N-phenylsulfamoyl)-N-phenylbenzamide;
N-(4-fluorophenyl)-2-(piperidin-1-ylsulfonyl)benzamide;
2-(piperidin-1-ylsulfonyl)-N-(4-(trifluoromethoxy)phenyl)benzamide;
2-(N-methyl-N-phenylsulfamoyl)-N-(2-morpholinophenyl)benzamide;
N-(4-(pyrrolidin-1-ylsulfonyl)phenyl)-2-((3-(trifluoromethyl)phenyl)sulfonamido)benzamide;
N-(4-fluorophenyl)-2-((3-(trifluoromethyl)phenyl)sulfonamido)benzamide;
N-(2-(indoline-1-carbonyl)phenyl)-3-(trifluoromethyl)benzenesulfonamide N-(4-(difluoromethoxy)phenyl)-2-((4-fluorophenyl)sulfonamido)benzamide N-phenyl-2-((3-(trifluoromethyl)phenyl)sulfonamido)benzamide;
N-(4-(difluoromethoxy)phenyl)-2-((4-methylphenyl)sulfonamido)benzamide;
N-(4-methoxyphenyl)-2-((N-methyl-3-(trifluoromethyl)phenyl)sulfonamido)benzamide;
N-(2-chloro-4-fluorophenyl)-4-(N-(4-((difluoromethyl)thio)phenyl)sulfamoyl)benzamide;
4-(2-methylindoline-1-carbonyl)-N-phenylbenzenesulfonamide;
N-(4-chlorophenyl)-4-(N-(2-methoxy-5-nitrophenyl)sulfamoyl)benzamide;
N-(2-(difluoromethoxy)phenyl)-4-(N-(2-fluorophenyl)sulfamoyl)benzamide;
N-(3-cyanophenyl)-4-(N-(3,4-dimethylphenyl)sulfamoyl)benzamide;
4-(indoline-1-carbonyl)-N-(p-tolyl)benzenesulfonamide;
N-(4-chloro-3-(morpholinosulfonyl)phenyl)-4-(N-(3-(trifluoromethyl)phenyl)sulfamoyl)benzamide;
4-(N-(4-chlorophenyl)sulfamoyl)-N-(3-sulfamoylphenyl)benzamide;
N-(benzo[d][1,3]dioxol-5-yl)-4-(N-(2-chlorophenyl)sulfamoyl)benzamide;
N-(1H-benzo[d][1,2,3]triazol-5-yl)-4-(N-(4-chlorophenyl)sulfamoyl)benzamide;
4-(N-(4-chlorophenyl)sulfamoyl)-N-(3-(N,N-dimethylsulfamoyl)-4-methylphenyl)benzamide;
4-(2-methylindoline-1-carbonyl)-N-(p-tolyl)benzenesulfonamide;
N-phenyl-4-(N-phenylsulfamoyl)benzamide;
4-(N-(4-chlorophenyl)sulfamoyl)-N-(3-(morpholinosulfonyl)phenyl)benzamide;
N-(o-tolyl)-4-(N-(p-tolyl)sulfamoyl)benzamide;
4-(N-(4-chlorophenyl)sulfamoyl)-N-(3-ethylphenyl)benzamide;
N-(4-chloro-2-methylphenyl)-4-(N-(p-tolyl)sulfamoyl)benzamide;
N-phenyl-4-(1,2,3,4-tetrahydroquinoline-1-carbonyl)benzenesulfonamide;
N-(3-acetylphenyl)-4-(N-(p-tolyl)sulfamoyl)benzamide;
N-(2,4-dimethoxyphenyl)-4-(N-(3-(trifluoromethyl)phenyl)sulfamoyl)benzamide;
4-(N-(2-chlorophenyl)sulfamoyl)-N-(4-fluorophenyl)benzamide;
N-(benzo[d][1,3]dioxol-5-yl)-4-(N-(2-fluorophenyl)sulfamoyl)benzamide;
N-(4-methoxyphenyl)-4-(N-phenylsulfamoyl)benzamide;
N-(3,4-dimethoxyphenyl)-4-(N-(3-(trifluoromethyl)phenyl)sulfamoyl)benzamide;
N-(2-methyl-3-nitrophenyl)-4-(N-(o-tolyl)sulfamoyl)benzamide;
N-(2-(difluoromethoxy)phenyl)-4-(N-phenylsulfamoyl)benzamide;
N-(3-cyanophenyl)-4-(N-(2-fluorophenyl)sulfamoyl)benzamide
4-(N-(2-fluorophenyl)sulfamoyl)-N-(3-(trifluoromethyl)phenyl)benzamide;
4-(N-(4-fluorophenyl)sulfamoyl)-N-(4-methoxyphenyl)benzamide;

N-(benzo[d][1,3]dioxol-5-yl)-4-(N-(2-methoxyphenyl)sulfamoyl)benzamide;
4-(N-(2-methoxyphenyl)sulfamoyl)-N-(3-(trifluoromethyl)phenyl)benzamide;
N-(4-chlorophenyl)-4-(N-(o-tolyl)sulfamoyl)benzamide;
N-(2,4-difluorophenyl)-4-(N-(2-methoxy-5-nitrophenyl)sulfamoyl)benzamide;
N-(3-acetylphenyl)-4-(N-(4-methoxyphenyl)sulfamoyl)benzamide;
N-(4-fluoro-3-nitrophenyl)-4-(N-(2-methoxyphenyl)sulfamoyl)benzamide;
N-(3,4-dihydro-2H-benzo[b][1,4]dioxepin-7-yl)-4-(N-(4-fluorophenyl)sulfamoyl)benzamide;
N-(4-fluoro-2-methylphenyl)-4-(N-(4-methoxyphenyl)sulfamoyl)benzamide;
N-(p-tolyl)-4-(N-(p-tolyl)sulfamoyl)benzamide;
N-(3-chloro-2-methylphenyl)-4-(N-(2-fluorophenyl)sulfamoyl)benzamide;
N-(4-(1H-tetrazol-5-yl)phenyl)-4-(N-(3-(trifluoromethyl)phenyl)sulfamoyl)benzamide;
N-(3-acetylphenyl)-4-(N-(2-fluorophenyl)sulfamoyl)benzamide;
N-(2,3-dihydrobenzo[b][1,4]dioxin-6-yl)-4-(N-(4-methoxyphenyl)sulfamoyl)benzamide;
4-(N-phenylsulfamoyl)-N-(2-(trifluoromethoxy)phenyl)benzamide;
4-(N-(2-fluorophenyl)sulfamoyl)-N-(m-tolyl)benzamide;
4-(indoline-1-carbonyl)-N-phenylbenzenesulfonamide;
4-(N-(2-fluorophenyl)sulfamoyl)-N-(4-(trifluoromethoxy)phenyl)benzamide;
N-(4-fluorophenyl)-4-(6-methoxy-1,2,3,4-tetrahydroquinoline-1-carbonyl)benzenesulfonamide;
1-(4-(N-(p-tolyl)sulfamoyl)benzoyl) indoline-5-sulfonamide;
5-bromo-2-(N-(3-(trifluoromethyl)phenyl)sulfamoyl)benzoic acid;
N-(2,5-dimethoxyphenyl)-3-((2-methylindolin-1-yl)sulfonyl)benzamide;
N-(4-fluoro-3-nitrophenyl)-3-(N-(2-methoxy-5-nitrophenyl)sulfamoyl)benzamide;
ethyl 5-(3-(N-(4-fluorophenyl)sulfamoyl)benzamido)-3-methylthiophene-2-carboxylate;
ethyl 5-(3-(N-(2-fluorophenyl)sulfamoyl)benzamido)-3-methylthiophene-2-carboxylate;
4-chloro-N-(4-chloro-2-methylphenyl)-3-(N-(4-chloro-2-methylphenyl)sulfamoyl)benzamide;
4-chloro-N-(2-ethoxyphenyl)-3-(indolin-1-ylsulfonyl)benzamide;
N-(4-methoxyphenyl)-3-(2-methylindoline-1-carbonyl)benzenesulfonamide;
5-(indolin-1-ylsulfonyl)-2-methoxy-N-(o-tolyl)benzamide;
3-(N-(2-chlorophenyl)sulfamoyl)-N-(3-cyano-6-methyl-4,5,6,7-tetrahydrobenzo[b]thiophen-2-yl)benzamide;
2-methyl-5-(1,2,3,4-tetrahydroquinoline-1-carbonyl)-N-(m-tolyl)benzenesulfonamide;
N-(4-amino-3,5-dichlorophenyl)-3-(indolin-1-ylsulfonyl)benzamide;
N-(3-chloro-4-(difluoromethoxy)phenyl)-5-(indolin-1-ylsulfonyl)-2-methoxybenzamide;
3-(1,2,3,4-tetrahydroquinoline-1-carbonyl)-N-(3-(trifluoromethyl)phenyl)benzenesulfonamide;
N-(3-cyanophenyl)-5-(indolin-1-ylsulfonyl)-2-methoxybenzamide;
N-(3-fluorophenyl)-3-(indolin-1-ylsulfonyl)benzamide;
3-(indolin-1-ylsulfonyl)-N-(quinolin-8-yl)benzamide;
N-(2-ethylphenyl)-3-((2-methylindolin-1-yl)sulfonyl)benzamide;
3-(indolin-1-ylsulfonyl)-N-(3-(piperidin-1-ylsulfonyl)phenyl)benzamide;
N-(3,5-bis(trifluoromethyl)phenyl)-5-(indolin-1-ylsulfonyl)-2-methoxybenzamide;
(4-chloro-3-(indolin-1-ylsulfonyl)phenyl) (indolin-1-yl)methanone;
N-(3,4-dimethoxyphenyl)-3-((2-methylindolin-1-yl)sulfonyl)benzamide;
N-(3-chloro-4-fluorophenyl)-3-(N-(4-fluorophenyl)sulfamoyl)benzamide;
N-(benzo[d][1,3]dioxol-5-yl)-3-(indolin-1-ylsulfonyl)benzamide;
N-(3,4-dimethylphenyl)-3-(indolin-1-ylsulfonyl)benzamide;
4-chloro-3-(indolin-1-ylsulfonyl)-N-(p-tolyl)benzamide;
3-(indolin-1-ylsulfonyl)-N-(4-methoxyphenyl)benzamide;
N-(3-chloro-2-methylphenyl)-3-(indolin-1-ylsulfonyl)benzamide;
N-(3-carbamoylphenyl)-3-(indolin-1-ylsulfonyl)benzamide;
N-benzyl-3-(indoline-1-carbonyl)-N-(3-(trifluoromethyl)phenyl)benzenesulfonamide;
3-((2-methylindolin-1-yl)sulfonyl)-N-(3-sulfamoylphenyl)benzamide;
4-chloro-N-(3,4-dimethylphenyl)-3-(indoline-1-carbonyl)benzenesulfonamide;
N-(4-(difluoromethoxy)phenyl)-3-(N-(4-methoxyphenyl)sulfamoyl)benzamide;
N-(2,4-dihydroxy-6-methylpyrimidin-5-yl)-3-(N-(2-methoxyphenyl)sulfamoyl)benzamide;
4-chloro-N-(3-cyanophenyl)-3-(indolin-1-ylsulfonyl)benzamide;
4-chloro-N-(2-(difluoromethoxy)phenyl)-3-(indolin-1-ylsulfonyl)benzamide;
N-(3-chlorophenyl)-N-methyl-3-(2-methylindoline-1-carbonyl)benzenesulfonamide;
(3,4-dihydroquinolin-1(2H)-yl)(3-((2-methylindolin-1-yl)sulfonyl)phenyl)methanone;
3-((2-methylindolin-1-yl)sulfonyl)-N-(o-tolyl)benzamide;
3-(indolin-1-ylsulfonyl)-N-(2-methoxyphenyl)benzamide;
3-((2-methylindolin-1-yl)sulfonyl)-N-(3-(methylthio)phenyl)benzamide;
N-(2,5-difluorophenyl)-3-((2-methylindolin-1-yl)sulfonyl)benzamide;
N-(4-bromo-2-fluorophenyl)-3-(indolin-1-ylsulfonyl)benzamide;
N-(4-bromo-3-methylphenyl)-5-(indolin-1-ylsulfonyl)-2-methoxybenzamide;
N-(3,4-difluorophenyl)-3-(indolin-1-ylsulfonyl)benzamide;
3-(indolin-1-ylsulfonyl)-N-(2-methoxy-5-methylphenyl)benzamide;
4-chloro-3-(1,2,3,4-tetrahydroquinoline-1-carbonyl)-N-(3-(trifluoromethyl)phenyl)benzenesulfonamide;
3-(indoline-1-carbonyl)-N-(3-(trifluoromethyl)phenyl)benzenesulfonamide;
3-((2-methylindolin-1-yl)sulfonyl)-N-(2-(trifluoromethoxy)phenyl)benzamide;
2-chloro-N-methyl-5-(5-nitroindoline-1-carbonyl)-N-phenylbenzenesulfonamide;
N-(4-(N-cyclopropylsulfamoyl)phenyl)-3-(indolin-1-ylsulfonyl)benzamide;

N-(benzo[d][1,3]dioxol-5-yl)-3-(N-(4-methoxyphenyl)-N-methylsulfamoyl)benzamide;
N-(4-acetamidophenyl)-3-(indolin-1-ylsulfonyl)benzamide;
N-methyl-3-(2-methylindoline-1-carbonyl)-N-(p-tolyl)benzenesulfonamide;
N-methyl-N-phenyl-3-(1,2,3,4-tetrahydroquinoline-1-carbonyl)benzenesulfonamide;
3-((2-methylindolin-1-yl)sulfonyl)-N-(4-phenoxyphenyl)benzamide;
3-((2-methylindolin-1-yl)sulfonyl)-N-(quinolin-8-yl)benzamide;
(3-((3,4-dihydroquinolin-1(2H)-yl)sulfonyl)phenyl) (indolin-1-yl)methanone;
N-allyl-4-chloro-N-(4-chlorophenyl)-3-(indoline-1-carbonyl)benzenesulfonamide;
3-((2-methylindolin-1-yl)sulfonyl)-N-(3-phenoxyphenyl)benzamide;
N-(2,5-difluorophenyl)-3-(indolin-1-ylsulfonyl)benzamide;
4-methyl-3-(1,2,3,4-tetrahydroquinoline-1-carbonyl)-N-(m-tolyl)benzenesulfonamide;
4-chloro-N-(4-chlorophenyl)-3-(indoline-1-carbonyl)benzenesulfonamide;
N-(4-bromo-3-methylphenyl)-3-(N-(m-tolyl)sulfamoyl)benzamide;
3-(indolin-1-ylsulfonyl)-N-(2-(pyrrolidin-1-yl)phenyl)benzamide;
(8-fluoro-6-methyl-3,4-dihydroquinolin-1(2H)-yl)(3-(indolin-1-ylsulfonyl)phenyl)methanone;
(7-fluoroindolin-1-yl)(3-((2-methylindolin-1-yl)sulfonyl)phenyl)methanone;
(4-chloro-3-(indolin-1-ylsulfonyl)phenyl)(5-nitroindolin-1-yl)methanone;
4-chloro-N-(6-chlorobenzo[d][1,3]dioxol-5-yl)-3-(indolin-1-ylsulfonyl)benzamide;
N-(2-fluoro-5-methylphenyl)-3-((2-methylindolin-1-yl)sulfonyl)benzamide;
(3,4-dihydroquinolin-1(2H)-yl)(3-(indolin-1-ylsulfonyl)phenyl)methanone;
5-(indolin-1-ylsulfonyl)-2-methoxy-N-(m-tolyl)benzamide;
4-chloro-3-(indolin-1-ylsulfonyl)-N-(3-methoxyphenyl)benzamide;
3-(indolin-1-ylsulfonyl)-N-(p-tolyl)benzamide;
3-(N-methyl-N-(p-tolyl)sulfamoyl)-N-(p-tolyl)benzamide;
N-(4-chlorophenyl)-3-(indolin-1-ylsulfonyl)benzamide;
N-(2,3-dihydro-1H-inden-5-yl)-3-(N-methyl-N-(p-tolyl)sulfamoyl)benzamide;
5-(indolin-1-ylsulfonyl)-2-methoxy-N-(4-(trifluoromethyl)phenyl)benzamide;
ethyl 2-(3-(N-(4-chlorophenyl)sulfamoyl)benzamido)-4,5,6,7-tetrahydrobenzo[b]thiophene-3-carboxylate;
ethyl 2-(3-(N-(3-chlorophenyl)sulfamoyl)benzamido)-4,5,6,7-tetrahydrobenzo[b]thiophene-3-carboxylate;
3-(N-(2,4-dimethylphenyl)sulfamoyl)-N-mesitylbenzamide;
(3-(indolin-1-ylsulfonyl)phenyl)(6-methoxy-3,4-dihydroquinolin-1(2H)-yl)methanone;
(3-(indolin-1-ylsulfonyl)phenyl)(8-methyl-3,4-dihydroquinolin-1(2H)-yl)methanone;
N-(benzo[d][1,3]dioxol-5-yl)-5-(indolin-1-ylsulfonyl)-2-methoxybenzamide;
N-(4-fluorophenyl)-3-(indolin-1-ylsulfonyl)benzamide;
4-chloro-N-(4-fluorophenyl)-3-(indolin-1-ylsulfonyl)benzamide;
N-(4-methoxyphenyl)-3-(N-(4-methoxyphenyl)-N-methylsulfamoyl)benzamide;
N-(3-chlorophenyl)-3-(indolin-1-ylsulfonyl)benzamide;
N-allyl-2-chloro-N-(2-chlorophenyl)-5-(indoline-1-carbonyl)benzenesulfonamide;
N-(5-fluoro-2-methylphenyl)-3-(indolin-1-ylsulfonyl)benzamide;
2-chloro-N-(m-tolyl)-5-(N-(m-tolyl)sulfamoyl)benzamide;
3-(N-(4-chlorophenyl)sulfamoyl)-N-(2,4-dichlorophenyl)benzamide;
N-(5-chloro-2-methoxyphenyl)-3-(indoline-1-carbonyl)benzenesulfonamide;
N-(4-(benzyloxy)phenyl)-3-(indoline-1-carbonyl)benzenesulfonamide;
N-(benzo[d][1,3]dioxol-5-yl)-3-((2-methylindolin-1-yl)sulfonyl)benzamide;
N-(2,3-dihydrobenzo[b][1,4]dioxin-6-yl)-3-(indolin-1-ylsulfonyl)benzamide;
4-chloro-N-(2,3-dihydrobenzo[b][1,4]dioxin-6-yl)-3-(indolin-1-ylsulfonyl)benzamide;
N-(3-bromophenyl)-5-(indolin-1-ylsulfonyl)-2-methoxybenzamide;
N-(4-(N,N-dimethylsulfamoyl)phenyl)-3-((2-methylindolin-1-yl)sulfonyl)benzamide;
3-(indolin-1-ylsulfonyl)-N-(3-(morpholinosulfonyl)phenyl)benzamide;
2-chloro-N-(3-chloro-4-fluorophenyl)-5-(N-(4-fluorophenyl)-N-methylsulfamoyl)benzamide;
3-(indolin-1-ylsulfonyl)-N-(3-sulfamoylphenyl)benzamide;
3-(N-(5-chloro-2,4-dimethoxyphenyl)sulfamoyl)-4-methyl-N-(4-(trifluoromethoxy)phenyl)benzamide;
3-(N-(benzo[d][1,3]dioxol-5-yl)sulfamoyl)-N-(spiro[benzo[d][1,3]dioxole-2,1'-cyclopentan]-5-yl)benzamide;
3-(N-(2-chloro-5-(trifluoromethyl)phenyl)sulfamoyl)-N-(3-cyanophenyl)benzamide;
N-(2-fluorophenyl)-3-(2-methylindoline-1-carbonyl)benzenesulfonamide
N-(2-(tert-butyl)phenyl)-3-((2-methylindolin-1-yl)sulfonyl)benzamide;
N-(4-(1H-tetrazol-1-yl)phenyl)-3-(indolin-1-ylsulfonyl)benzamide;
N-(2,3-dihydrobenzo[b][1,4]dioxin-6-yl)-3-((2-methylindolin-1-yl)sulfonyl)benzamide;
4-chloro-N-(3-fluorophenyl)-3-(indolin-1-ylsulfonyl)benzamide;
N-(2-fluorophenyl)-5-(indolin-1-ylsulfonyl)-2-methoxybenzamide;
N-(2,3-dihydro-1H-inden-5-yl)-3-(indolin-1-ylsulfonyl)benzamide;
3-(indoline-1-carbonyl)-N-(4-methoxyphenyl)-N-methylbenzenesulfonamide;
N-(4-ethoxyphenyl)-3-(N-(4-ethoxyphenyl)sulfamoyl)benzamide;
N-(3-chlorophenyl)-3-(indoline-1-carbonyl)benzenesulfonamide;
N-(4-fluorophenyl)-3-(indoline-1-carbonyl)-4-methylbenzenesulfonamide;
N-(4-fluorophenyl)-4-methyl-3-(2-methylindoline-1-carbonyl)benzenesulfonamide;
2-methoxy-5-(2-methylindoline-1-carbonyl)-N-(p-tolyl)benzenesulfonamide;
N-(3-chloro-4-methoxyphenyl)-3-(N-(4-methoxyphenyl)-N-methylsulfamoyl)benzamide;

N-(2,4-dimethylphenyl)-3-((2-methylindolin-1-yl)sulfonyl)benzamide;

N-(5-chloro-2-methoxyphenyl)-3-(indolin-1-ylsulfonyl)benzamide;

N-(5-chloro-2-morpholinophenyl)-3-(indolin-1-ylsulfonyl)benzamide;

N-(3-(N,N-dimethylsulfamoyl)phenyl)-3-(indolin-1-ylsulfonyl)benzamide;

2,4-dichloro-N-(3-chlorophenyl)-5-(1,2,3,4-tetrahydroquinoline-1-carbonyl)benzenesulfonamide;

3-(indolin-1-ylsulfonyl)-N-(4-methyl-2-((tetrahydrofuran-2-yl)methoxy)phenyl)benzamide;

3-(N-(benzo[d][1,3]dioxol-5-yl)sulfamoyl)-N-(1-isopropyl-1H-pyrazolo[3,4-b]pyridin-5-yl)benzamide;

3-(indolin-1-ylsulfonyl)-N-(4-(N-(pyrimidin-2-yl)sulfamoyl)phenyl)benzamide;

4-chloro-3-(indolin-1-ylsulfonyl)-N-(m-tolyl)benzamide;

N-(3-(N,N-dimethylsulfamoyl)phenyl)-3-((2-methylindolin-1-yl)sulfonyl)benzamide;

4-chloro-N-(4-cyanophenyl)-3-(indolin-1-ylsulfonyl)benzamide;

3-(indoline-1-carbonyl)-N-methyl-N-(p-tolyl)benzenesulfonamide;

4-chloro-N-(4-chlorophenyl)-3-(1,2,3,4-tetrahydroquinoline-1-carbonyl)benzenesulfonamide;

2,4-dichloro-N-(3-cyanophenyl)-5-(N-(m-tolyl)sulfamoyl)benzamide;

N-(2-fluorophenyl)-3-(6-methoxy-1,2,3,4-tetrahydroquinoline-1-carbonyl)benzenesulfonamide;

N-(benzo[d][1,3]dioxol-5-yl)-4-chloro-3-(indolin-1-ylsulfonyl)benzamide;

N-(2,3-dihydrobenzo[b][1,4]dioxin-6-yl)-3-(N-(4-methoxyphenyl)-N-methylsulfamoyl)benzamide;

N-(4-ethoxyphenyl)-N,4-dimethyl-3-(2-methylindoline-1-carbonyl)benzenesulfonamide;

4-chloro-N-(3,4-dihydro-2H-benzo[b][1,4]dioxepin-7-yl)-3-(indolin-1-ylsulfonyl)benzamide;

N-(2-ethylphenyl)-3-(indolin-1-ylsulfonyl)benzamide;

indolin-1-yl(3-(indolin-1-ylsulfonyl)phenyl)methanone;

N-(4-ethoxyphenyl)-3-(1,2,3,4-tetrahydroquinoline-1-carbonyl)benzenesulfonamide;

N-(4-fluorophenyl)-5-(indoline-1-carbonyl)-2-methylbenzenesulfonamide;

N-(5-chloro-2,4-dimethoxyphenyl)-3-(indoline-1-carbonyl)-4-methylbenzenesulfonamide;

(6,7-difluoro-3,4-dihydroquinolin-1(2H)-yl)(3-((2-methylindolin-1-yl)sulfonyl)phenyl)methanone;

3-(indolin-1-ylsulfonyl)-N-(2-(piperidine-1-carbonyl)phenyl)benzamide;

N-(3,4-dihydro-2H-benzo[b][1,4]dioxepin-7-yl)-3-(N-(2,3-dihydrobenzo[b][1,4]dioxin-6-yl)sulfamoyl)benzamide;

N-(2-fluorophenyl)-3-(6-methyl-1,2,3,4-tetrahydroquinoline-1-carbonyl)benzenesulfonamide;

N-(2,4-dimethoxyphenyl)-3-(indolin-1-ylsulfonyl)benzamide;

N-(4-fluorophenyl)-3-(indoline-1-carbonyl)benzenesulfonamide;

N-(2,3-dihydrobenzo[b][1,4]dioxin-6-yl)-5-(indolin-1-ylsulfonyl)-2-methoxybenzamide;

N-(2-methoxy-5-(piperidin-1-ylsulfonyl)phenyl)-3-(N-(2-methoxyphenyl)sulfamoyl)benzamide;

N-(2-chloro-5-(trifluoromethyl)phenyl)-3-(2-methylindoline-1-carbonyl)benzenesulfonamide;

methyl 1-(3-(N-methyl-N-phenylsulfamoyl)benzoyl)-1,2,3,4-tetrahydroquinoline-5-carboxylate;

N-(4-ethoxyphenyl)-5-(indolin-1-ylsulfonyl)-2-methoxybenzamide;

N-(3,4-dihydro-2H-benzo[b][1,4]dioxepin-7-yl)-3-((2-methylindolin-1-yl)sulfonyl)benzamide;

N-(2-methylbenzo[d]oxazol-5-yl)-3-((2-methylindolin-1-yl)sulfonyl)benzamide;

N-(6-acetylbenzo[d][1,3]dioxol-5-yl)-3-(indolin-1-ylsulfonyl)benzamide;

3-(indolin-1-ylsulfonyl)-N-(2-morpholinophenyl)benzamide;

3-(N-(benzo[d][1,3]dioxol-5-yl)sulfamoyl)-N-(4-ethoxy-3-methoxyphenyl)benzamide;

3-(indolin-1-ylsulfonyl)-N-(2-methylbenzo[d]oxazol-5-yl)benzamide;

4-chloro-N-(3,4-dimethoxyphenyl)-3-(indolin-1-ylsulfonyl)benzamide;

N-(3-acetamidophenyl)-3-((2-methylindolin-1-yl)sulfonyl)benzamide;

3-(N-(benzo[d][1,3]dioxol-5-yl)sulfamoyl)-N-(2,4-dimethoxyphenyl)benzamide;

N-(2,4-dimethylphenyl)-3-(N-methyl-N-(p-tolyl)sulfamoyl)benzamide;

3-(indolin-1-ylsulfonyl)-N-(2-methylbenzo[d]thiazol-6-yl)benzamide;

N-(3,4-dimethylphenyl)-5-(indolin-1-ylsulfonyl)-2-methoxybenzamide;

N-ethyl-3-(3-(N-(3-(trifluoromethyl)phenyl)sulfamoyl)benzamido)benzamide;

3-(N-(3-chlorophenyl)sulfamoyl)-N-(5-methylpyridin-2-yl)benzamide;

3-(indolin-1-ylsulfonyl)-N-(quinolin-5-yl)benzamide;

5-(indolin-1-ylsulfonyl)-2-methoxy-N-(4-(trifluoromethoxy)phenyl)benzamide;

3-(indolin-1-ylsulfonyl)-N-(2-oxo-2,3-dihydro-1H-benzo[d]imidazol-5-yl)benzamide;

3-(N-(5-chloro-2-methoxyphenyl)sulfamoyl)-N-(6-(dimethylamino)pyridin-3-yl)benzamide;

3-(indolin-1-ylsulfonyl)-N-(2-(2-oxopyrrolidin-1-yl)phenyl)benzamide;

3-(indolin-1-ylsulfonyl)-N-(4-morpholinophenyl)benzamide;

3-((2-methylindolin-1-yl)sulfonyl)-N-(quinolin-5-yl)benzamide;

(3-(indolin-1-ylsulfonyl)phenyl)(7-(methylsulfonyl)-3,4-dihydroquinolin-1(2H)-yl)methanone;

N-(2-chlorophenyl)-3-(indolin-1-ylsulfonyl)benzamide;

N-(4,5-dimethoxy-2-methylphenyl)-3-(indolin-1-ylsulfonyl)benzamide;

3-(N-(4-methoxyphenyl)sulfamoyl)-N-(3-methyl-1H-pyrazolo[3,4-b]pyridin-5-yl)benzamide;

N-(4-carbamoylphenyl)-3-(indolin-1-ylsulfonyl)benzamide;

N-(4-(N-acetylsulfamoyl)phenyl)-3-(indolin-1-ylsulfonyl)benzamide;

N-(3,4-dihydro-2H-benzo[b][1,4]dioxepin-7-yl)-3-(indolin-1-ylsulfonyl)benzamide;

N-(2-acetylphenyl)-3-((2-methylindolin-1-yl)sulfonyl)benzamide;

N-(2,4-difluorophenyl)-5-(N-(2-fluorophenyl)sulfamoyl)-2-methylbenzamide;

3-(N-(3-chlorophenyl)sulfamoyl)-N-(6-methoxypyridin-3-yl)benzamide;

N-(2-fluoro-4-methylphenyl)-3-(N-(2-fluorophenyl)sulfamoyl)benzamide;

3-(N-(4-ethoxyphenyl)sulfamoyl)-N-(4-methoxyphenyl)benzamide;

3-(N-(3-chlorophenyl)sulfamoyl)-N-(pyridin-2-yl)benzamide;
N-(5-acetamido-2-methoxyphenyl)-3-(indolin-1-ylsulfonyl)benzamide;
3-(N-(4-methoxyphenyl)sulfamoyl)-N-(6-methoxypyridin-3-yl)benzamide;
3-(N-(2-chloro-5-(trifluoromethyl)phenyl)sulfamoyl)-N-(6-methoxypyridin-3-yl)benzamide;
3-(N-(2-fluorophenyl)sulfamoyl)-N-(6-methylpyridin-2-yl)benzamide;
N-(4-(tert-butyl)phenyl)-3-(indolin-1-ylsulfonyl)benzamide;
N-(3,4-dihydro-2H-benzo[b][1,4]dioxepin-7-yl)-3-(N-(1,1-dioxidotetrahydrothiophen-3-yl)sulfamoyl)benzamide;
3-(N-(2-fluorophenyl)sulfamoyl)-N-(pyridin-2-yl)benzamide;
1-(3-((3,4-dihydroquinolin-1(2H)-yl)sulfonyl)benzoyl)-1,2,3,4-tetrahydroquinoline-5-carboxamide;
3-(N-(2-fluorophenyl)sulfamoyl)-N-(pyridin-4-yl)benzamide;
3-(N-(2-fluorophenyl)sulfamoyl)-N-(5-methylpyridin-2-yl)benzamide;
N-(1,1-dioxidotetrahydrothiophen-3-yl)-3-(N-(m-tolyl)sulfamoyl)benzamide;
3-((4-bromophenyl)sulfonamido)-N-(pyridin-2-yl)benzamide;
3-((2,3-dihydrobenzo[b][1,4]dioxine)-6-sulfonamido)-N-(5-methylisoxazol-3-yl)benzamide;
3-((3,4-dihydro-2H-benzo[b][1,4]dioxepine)-7-sulfonamido)-N-(pyridin-3-yl)benzamide;
N-(quinolin-8-yl)-3-(thiophene-2-sulfonamido)benzamide;
N-(3-chlorophenyl)-3-(thiophene-2-sulfonamido)benzamide;
N-(2,3-dihydro-1H-inden-5-yl)-3-(thiophene-2-sulfonamido)benzamide;
3-((3,4-dichlorophenyl)sulfonamido)-N-(5-methyl-1H-imidazol-2-yl)benzamide;
3-((5-chlorothiophene)-2-sulfonamido)-N-(3-(trifluoromethyl)phenyl)benzamide;
N-(1H-benzo[d]imidazol-2-yl)-3-((3,4-dihydro-2H-benzo[b][1,4]dioxepine)-7-sulfonamido)benzamide;
N-(3,4-dimethylphenyl)-3-(thiophene-2-sulfonamido)benzamide;
N-(5,6-dihydro-4H-cyclopenta[d]thiazol-2-yl)-3-((2,3-dihydrobenzo[b][1,4]dioxine)-6-sulfonamido)benzamide;
N-(quinolin-5-yl)-3-(thiophene-2-sulfonamido)benzamide;
3-((2,5-dichlorophenyl)sulfonamido)-N-(thiazol-2-yl)benzamide;
3-((4-ethoxyphenyl)sulfonamido)-N-(5-methylpyridin-2-yl)benzamide;
3-((2,5-dimethylphenyl)sulfonamido)-N-(5-fluoropyridin-2-yl)benzamide;
3-(thiophene-2-sulfonamido)-N-(3-(trifluoromethyl)phenyl)benzamide;
3-((6-chloropyridine)-3-sulfonamido)-N-(3-(trifluoromethyl)phenyl)benzamide;
3-((3,4-dihydro-2H-benzo[b][1,4]dioxepine)-7-sulfonamido)-N-(thiazol-2-yl)benzamide;
3-((4-bromophenyl)sulfonamido)-N-(6-methoxypyridin-3-yl)benzamide;
3-((4-bromophenyl)sulfonamido)-N-(5-methylpyridin-2-yl)benzamide;
N-(5-butyl-1,3,4-thiadiazol-2-yl)-3-((3-fluoro-4-methylphenyl)sulfonamido)benzamide;
3-((4-bromophenyl)sulfonamido)-N-(pyridin-3-yl)benzamide;
N-(1H-benzo[d]imidazol-2-yl)-3-((3-fluoro-4-methylphenyl)sulfonamido)benzamide;
3-((3,4-dihydro-2H-benzo[b][1,4]dioxepine)-7-sulfonamido)-N-(4-methylthiazol-2-yl)benzamide;
3-((3-fluoro-4-methylphenyl)sulfonamido)-N-(4-methylpyridin-2-yl)benzamide;
N-(5-cyclopropyl-1,3,4-thiadiazol-2-yl)-3-(phenylsulfonamido)benzamide;
3-((4-bromophenyl)sulfonamido)-N-(2-methyl-2,4,5,6-tetrahydrocyclopenta[c]pyrazol-3-yl)benzamide;
3-((2,5-dichlorophenyl)sulfonamido)-N-(6-methoxypyridin-3-yl)benzamide;
3-((3-fluoro-4-methylphenyl)sulfonamido)-N-(5-methylpyridin-2-yl)benzamide;
N-(1H-benzo[d]imidazol-2-yl)-3-((2,3-dihydrobenzo[b][1,4]dioxine)-6-sulfonamido)benzamide;
3-((3,4-difluorophenyl)sulfonamido)-N-(4-phenyl-1H-pyrazol-5-yl)benzamide;
N-phenyl-3-(thiophene-2-sulfonamido)benzamide;
3-((2,6-difluorophenyl)sulfonamido)-N-(pyrazin-2-yl)benzamide;
3-((2,3-dihydrobenzo[b][1,4]dioxine)-6-sulfonamido)-N-(thiazol-2-yl)benzamide;
3-((4-bromophenyl)sulfonamido)-N-(thiazol-2-yl)benzamide;
N-(2,4-dimethylphenyl)-3-(thiophene-2-sulfonamido)benzamide;
3-((3,4-dihydro-2H-benzo[b][1,4]dioxepine)-7-sulfonamido)-N-(4-methylpyridin-2-yl)benzamide;
N-(2-methylbenzo[d]oxazol-5-yl)-3-(thiophene-2-sulfonamido)benzamide;
N-(2-chlorophenyl)-3-(thiophene-2-sulfonamido)benzamide;
N-(5-bromopyridin-2-yl)-3-((3-chloro-4-fluorophenyl)sulfonamido)benzamide N-(4-methylthiazol-2-yl)-3-(phenylsulfonamido)benzamide;
3-((3,4-dichlorophenyl)sulfonamido)-N-(4-hydroxypyridin-3-yl)benzamide;
3-((2,5-dimethylphenyl)sulfonamido)-N-(pyrazin-2-yl)benzamide;
3-(phenylsulfonamido)-N-(pyrazin-2-yl)benzamide;
3-((4-ethoxyphenyl)sulfonamido)-N-(4H-1,2,4-triazol-3-yl)benzamide;
3-((4-bromophenyl)sulfonamido)-N-(4H-1,2,4-triazol-3-yl)benzamide;
N-(3-ethyl-1H-1,2,4-triazol-5-yl)-3-(phenylsulfonamido)benzamide;
N-(1-methyl-1H-pyrazol-3-yl)-3-(phenylsulfonamido)benzamide;
3-((4-bromophenyl)sulfonamido)-N-(pyridin-4-yl)benzamide;
3-((4-(N-cyclopropylsulfamoyl)phenyl)sulfonamido)-N-(pyrazin-2-yl)benzamide;
3-((3,4-dichlorophenyl)sulfonamido)-N-(1,1-dioxidotetrahydrothiophen-3-yl)-N-methylbenzamide;
3-((2,3-dihydrobenzo[b][1,4]dioxine)-6-sulfonamido)-N-(1,1-dioxidotetrahydrothiophen-3-yl)-N-methylbenzamide;
3-((3,4-dichlorophenyl)sulfonamido)-N-(1,3,5-trimethyl-1H-pyrazol-4-yl)benzamide
3-((3,4-dihydro-2H-benzo[b][1,4]dioxepine)-7-sulfonamido)-N-(1-methyl-1H-pyrazol-4-yl)benzamide;
3-(thiophene-2-sulfonamido)-N-(o-tolyl)benzamide;

3-((2,3-dihydrobenzo[b][1,4]dioxine)-6-sulfonamido)-N-(pyridin-2-yl)benzamide;
3-(phenylsulfonamido)-N-(pyridin-4-yl)benzamide;
3-((3-fluoro-4-methylphenyl)sulfonamido)-N-(5-methylthiazol-2-yl)benzamide;
3-((2,3-dihydrobenzo[b][1,4]dioxine)-6-sulfonamido)-N-(3-methyl-1,2,4-oxadiazol-5-yl)benzamide;
3-(phenylsulfonamido)-N-(pyridin-3-yl)benzamide;
3-((3,4-difluorophenyl)sulfonamido)-N-(3-ethyl-1H-1,2,4-triazol-5-yl)benzamide;
N-(2-methylpyridin-4-yl)-3-(phenylsulfonamido)benzamide;
N-(6-methoxypyridin-3-yl)-3-((4-methylphenyl)sulfonamido)benzamide;
3-(phenylsulfonamido)-N-(1H-pyrazol-4-yl)benzamide;
3-((4-ethoxyphenyl)sulfonamido)-N-(1-methyl-1H-pyrazol-3-yl)benzamide;
3-((2,3-dihydrobenzofuran)-5-sulfonamido)-N-(pyridin-4-yl)benzamide;
3-((3-fluoro-4-methylphenyl)sulfonamido)-N-(pyridin-3-yl)benzamide;
3-((4-ethoxyphenyl)sulfonamido)-N-(pyridin-4-yl)benzamide;
3-((3,4-dichlorophenyl)sulfonamido)-N-(1-methyl-1H-pyrazol-3-yl)benzamide;
3-((3-fluoro-4-methylphenyl)sulfonamido)-N-(1-isopropyl-1H-pyrazol-5-yl)benzamide;
3-((4-methylphenyl)sulfonamido)-N-(1,3,5-trimethyl-1H-pyrazol-4-yl)benzamide;
N-(3-methylpyridin-2-yl)-3-(phenylsulfonamido)benzamide;
3-((4-ethoxyphenyl)sulfonamido)-N-(1-methyl-1H-pyrazol-4-yl)benzamide;
3-((4-(2-methoxyethoxy)phenyl)sulfonamido)-N-(pyridin-2-yl)benzamide;
N-(3-(N-(4-bromophenyl)sulfamoyl)phenyl)thiophene-3-carboxamide;
N-(3-(N-(4-bromophenyl)sulfamoyl)phenyl)-5-nitrothiophene-2-carboxamide;
N-(3-(N-(4-bromophenyl)sulfamoyl)phenyl)-6-chloronicotinamide;
5-fluoro-N-(3-(N-methyl-N-phenylsulfamoyl)phenyl)-1H-indole-2-carboxamide;
1-cyclopropyl-N-(3-(N-(2-fluorophenyl)sulfamoyl)phenyl)-2,5-dimethyl-1H-pyrrole-3-carboxamide;
5-bromo-N-(3-(N-methyl-N-phenylsulfamoyl)phenyl) thiophene-2-carboxamide;
N-(3-(N-(2-methoxyphenyl)sulfamoyl)phenyl)-1H-indole-3-carboxamide;
6-methyl-N-(3-(N-(3-(trifluoromethyl)phenyl)sulfamoyl) phenyl) picolinamide;
N-(3-(N-(4-chlorophenyl)sulfamoyl)phenyl)-4,5,6,7-tetrahydrobenzo[b]thiophene-2-carboxamide;
N-(3-(N-methyl-N-phenylsulfamoyl)phenyl)thiophene-2-carboxamide;
2-ethoxy-N-(3-(N-methyl-N-phenylsulfamoyl)phenyl) nicotinamide;
N-(3-(N-(4-chlorophenyl)sulfamoyl)phenyl)furan-3-carboxamide;
N-(3-(N-(2-chlorophenyl)sulfamoyl)phenyl)-4,5-dimethylthiophene-2-carboxamide;
6-chloro-N-(3-(N-(4-methoxyphenyl)sulfamoyl)phenyl) nicotinamide;
N-(3-(N-(3-(trifluoromethyl)phenyl)sulfamoyl)phenyl) benzofuran-2-carboxamide;
N-(3-(N-methyl-N-phenylsulfamoyl)phenyl)thiophene-3-carboxamide;
N-(3-(N-(4-chlorophenyl)sulfamoyl)phenyl)thiophene-3-carboxamide;
N-(3-(N-(3-(trifluoromethyl)phenyl)sulfamoyl)phenyl) thiophene-3-carboxamide;
5-bromo-N-(3-(N-methyl-N-phenylsulfamoyl)phenyl) nicotinamide;
methyl 2,4-dimethyl-5-((3-(N-(3-(trifluoromethyl)phenyl)sulfamoyl)phenyl)carbamoyl)-1H-pyrrole-3-carboxylate;
5-bromo-N-(3-(N-methyl-N-phenylsulfamoyl)phenyl) furan-2-carboxamide;
N-(3-(N-(4-iodophenyl)sulfamoyl)phenyl) picolinamide;
N-(3-(N-(3-(trifluoromethyl)phenyl)sulfamoyl)phenyl)-4,5,6,7-tetrahydrobenzo[b]thiophene-2-carboxamide;
6-chloro-N-(3-(N-(3-(trifluoromethyl)phenyl)sulfamoyl) phenyl)nicotinamide;
5-bromo-N-(3-(N-(3-chlorophenyl)sulfamoyl)phenyl) thiophene-2-carboxamide;
4-acetyl-N-(3-(N-(4-methoxyphenyl)sulfamoyl)phenyl)-3,5-dimethyl-1H-pyrrole-2-carboxamide;
N-(3-(N-(4-((difluoromethyl)thio)phenyl)sulfamoyl)phenyl) thiophene-3-carboxamide;
6-chloro-N-(3-(N-phenylsulfamoyl)phenyl) picolinamide;
N-(3-(N-(2-chlorophenyl)sulfamoyl)phenyl)-5-nitrothiophene-2-carboxamide;
N-(3-(N-(2-fluorophenyl)sulfamoyl)phenyl)-5-methylisoxazole-3-carboxamide;
N-(3-(N-methyl-N-phenylsulfamoyl)phenyl)-5-oxo-2,3-dihydro-5H-thiazolo[3,2-a]pyrimidine-6-carboxamide;
N-(3-(N-(4-chlorophenyl)sulfamoyl)phenyl)-2-methoxynicotinamide;
N-(3-(N-(2-chlorophenyl)sulfamoyl)phenyl) quinoline-2-carboxamide;
1-benzyl-N-(3-(N-(2-methoxyphenyl)sulfamoyl)phenyl)-6-oxo-1,6-dihydropyridazine-3-carboxamide;
N-(3-(N-(4-methoxyphenyl)sulfamoyl)phenyl)-4-oxo-3,4-dihydrophthalazine-1-carboxamide;
1-benzyl-N-(3-(N-(4-chlorophenyl)sulfamoyl)phenyl)-6-oxo-1,6-dihydropyridazine-3-carboxamide;
N-(3-(N-(2-bromo-5-methylphenyl)sulfamoyl)phenyl)-6-methylnicotinamide;
2-chloro-N-(3-(N-methyl-N-phenylsulfamoyl)phenyl) quinoline-4-carboxamide;
6-methyl-N-(3-(N-(3-(trifluoromethyl)phenyl)sulfamoyl) phenyl)nicotinamide;
N-(3-(N-(3-chlorophenyl)sulfamoyl)phenyl) picolinamide;
N-(3-(N-(4-methoxyphenyl)sulfamoyl)phenyl)-5,6-dihydro-4H-cyclopenta[b]thiophene-2-carboxamide;
N-(3-(N-methyl-N-phenylsulfamoyl)phenyl)-2-(methylthio)nicotinamide;
N-(3-(N-(3-chlorophenyl)sulfamoyl)phenyl)-5-methylpyrazine-2-carboxamide;
N-(3-(N-(2-chlorophenyl)sulfamoyl)phenyl) picolinamide;
6-chloro-N-(3-(N-(2-chlorophenyl)sulfamoyl)phenyl) nicotinamide;
2-methyl-N-(3-(N-(3-(trifluoromethyl)phenyl)sulfamoyl) phenyl)furan-3-carboxamide;
3-methyl-N-(3-(N-methyl-N-phenylsulfamoyl)phenyl) isoxazole-5-carboxamide;
5-chloro-N-(3-(N-(4-methoxyphenyl)sulfamoyl)phenyl) thiophene-2-carboxamide;
3-methyl-4-oxo-N-(3-(N-(3-(trifluoromethyl)phenyl)sulfamoyl)phenyl)-3,4-dihydrophthalazine-1-carboxamide;

N-(3-(N-(3-bromo-4-ethoxyphenyl)sulfamoyl)phenyl) nicotinamide;

N-(3-(N-(2-chlorophenyl)sulfamoyl)phenyl) pyrazine-2-carboxamide;

6-methoxy-N-(3-(N-methyl-N-phenylsulfamoyl)phenyl) pyrimidine-4-carboxamide;

N-(3-(N-methyl-N-phenylsulfamoyl)phenyl) quinoline-2-carboxamide;

N-(3-(N-methyl-N-phenylsulfamoyl)phenyl)-6-oxo-1,6-dihydropyridazine-3-carboxamide;

5,6-dichloro-N-(3-(N-(2-chlorophenyl)sulfamoyl)phenyl)nicotinamide;

2-ethoxy-N-(3-(N-(2-methoxyphenyl)sulfamoyl)phenyl) nicotinamide;

N-(3-(N-(3-(trifluoromethyl)phenyl)sulfamoyl)phenyl) nicotinamide;

N-(3-(N-(3-(trifluoromethyl)phenyl)sulfamoyl)phenyl) furan-2-carboxamide;

4-methoxy-3-nitro-N-(3-(N-(thiazol-2-yl)sulfamoyl)phenyl)benzamide;

N-(3-(N-(2-methoxyphenyl)sulfamoyl)phenyl)-5-methylthiophene-2-carboxamide;

N-(3-(N-(3-(trifluoromethyl)phenyl)sulfamoyl)phenyl) furan-3-carboxamide;

3-methyl-N-(3-(N-methyl-N-phenylsulfamoyl)phenyl)-4-oxo-3,4-dihydrophthalazine-1-carboxamide;

6-chloro-N-(3-(N-(4-chlorophenyl)sulfamoyl)phenyl) nicotinamide;

N-(3-(N-(3-bromo-4-ethoxyphenyl)sulfamoyl)phenyl) isonicotinamide;

5-bromo-N-(3-(N-(2-methoxyphenyl)sulfamoyl)phenyl) nicotinamide;

5-methyl-N-(3-(N-methyl-N-phenylsulfamoyl)phenyl) pyrazine-2-carboxamide;

N-(3-(N-methyl-N-phenylsulfamoyl)phenyl) isonicotinamide;

5-methyl-N-(3-(N-(3-(trifluoromethyl)phenyl)sulfamoyl) phenyl) pyrazine-2-carboxamide;

2-methoxy-N-(3-(N-(2-methoxyphenyl)sulfamoyl)phenyl)nicotinamide;

N-(3-(N-(4-methoxyphenyl)sulfamoyl)phenyl)thiophene-2-carboxamide;

N-(3-(N-(4-((difluoromethyl)thio)phenyl)sulfamoyl)phenyl)furan-2-carboxamide;

5-cyclopropyl-N-(3-(N-methyl-N-phenylsulfamoyl)phenyl) isoxazole-3-carboxamide;

N-(3-(N-(2-methoxyphenyl)sulfamoyl)phenyl)-1-methyl-6-oxo-1,6-dihydropyridazine-3-carboxamide;

N-(3-(N-(4-chlorophenyl)sulfamoyl)phenyl) pyrazine-2-carboxamide;

N-(3-(N-(2-fluorophenyl)sulfamoyl)phenyl)thiophene-2-carboxamide;

N-(3-(N-(2-chlorophenyl)sulfamoyl)phenyl)-2-methoxynicotinamide;

5-chloro-N-(3-(N-methyl-N-phenylsulfamoyl)phenyl) thiophene-2-carboxamide;

3-ethyl-N-(3-(N-(4-methoxyphenyl)sulfamoyl)phenyl)-5-methylisoxazole-4-carboxamide;

N-(3-(N-(2-chlorophenyl)sulfamoyl)phenyl)-5-methylpyrazine-2-carboxamide;

N-(3-(N-(4-methoxyphenyl)sulfamoyl)phenyl)-5-methylisoxazole-3-carboxamide;

3-((3-(N-(4-chlorophenyl)sulfamoyl)phenyl)carbamoyl) pyridine 1-oxide;

3-ethyl-N-(3-(N-(2-fluorophenyl)sulfamoyl)phenyl)-5-methylisoxazole-4-carboxamide;

methyl 3-((3-(N-(thiazol-2-yl)sulfamoyl)phenyl)carbamoyl)benzoate;

N-(3-(N-(2-chlorophenyl)sulfamoyl)phenyl) isonicotinamide;

N-(3-(N-methyl-N-phenylsulfamoyl)phenyl)-6-oxo-1,6-dihydropyridine-3-carboxamide;

N-(3-(N-(4-methoxyphenyl)sulfamoyl)phenyl) picolinamide;

N-(3-(N-(2-chlorophenyl)sulfamoyl)phenyl)-5-nitrofuran-2-carboxamide;

3-((4-bromophenyl)sulfonamido)-N-(3-methyl-1,2,4-oxadiazol-5-yl)benzamide;

N-(3-(N-(2-fluorophenyl)sulfamoyl)phenyl)thiophene-3-carboxamide;

N-(3-(N-(2-methoxyphenyl)sulfamoyl)phenyl)-5-methylpyrazine-2-carboxamide;

N-(3-(N-(2-methoxyphenyl)sulfamoyl)phenyl)-2,6-dioxo-1,2,3,6-tetrahydropyrimidine-4-carboxamide;

N-(3-(N-(4-methoxyphenyl)sulfamoyl)phenyl)-5-methylpyrazine-2-carboxamide;

3-ethyl-5-methyl-N-(3-(N-methyl-N-phenylsulfamoyl) phenyl) isoxazole-4-carboxamide;

1-methyl-N-(3-(N-methyl-N-phenylsulfamoyl)phenyl)-6-oxo-1,6-dihydropyridazine-3-carboxamide;

4,5-dimethyl-N-(3-(N-methyl-N-phenylsulfamoyl)phenyl)thiophene-2-carboxamide;

N-(3-(N-(4-methoxyphenyl)sulfamoyl)phenyl) pyrazine-2-carboxamide;

N-(3-(N-methyl-N-phenylsulfamoyl)phenyl) pyrazine-2-carboxamide;

N-(3-(N-(2-fluorophenyl)sulfamoyl)phenyl)-6-oxo-1-propyl-1,6-dihydropyridazine-3-carboxamide;

3,5-dimethyl-N-(3-(N-methyl-N-phenylsulfamoyl)phenyl) isoxazole-4-carboxamide;

N-(3-(N-(2-fluorophenyl)sulfamoyl)phenyl)furan-2-carboxamide;

2,4-dimethyl-N-(3-(N-methyl-N-phenylsulfamoyl)phenyl) thiazole-5-carboxamide;

methyl 4-((3-(N-methyl-N-phenylsulfamoyl)phenyl)carbamoyl) picolinate;

3-((3-(N-(2-methoxyphenyl)sulfamoyl)phenyl)carbamoyl)pyridine 1-oxide;

N-(3-(N-(1H-pyrazol-4-yl)sulfamoyl)phenyl)-4-(allyloxy)-3-methoxybenzamide;

4-((3-(N-(4-chlorophenyl)sulfamoyl)phenyl)carbamoyl) picolinic acid;

N-(4-chloro-2-methoxy-5-methylphenyl)-2-(N-methyl-N-phenylsulfamoyl)benzamide;

N-(4-chloro-2-fluorophenyl)-2-(N-methyl-N-phenylsulfamoyl)benzamide;

N-(benzo[d][1,3]dioxol-5-yl)-2-(N-methyl-N-phenylsulfamoyl)benzamide;

N-methyl-N-phenyl-2-(1,2,3,4-tetrahydroquinoline-1-carbonyl)benzenesulfonamide;

N-(4-cyanophenyl)-2-(N-methyl-N-phenylsulfamoyl) benzamide;

4-bromo-N-(2-oxoindolin-7-yl)benzenesulfonamide;

N-(5-chloro-2-((2-fluorophenyl)sulfonamido)phenyl) benzo[d][1,3]dioxole-5-carboxamide;

N-(3-carbamoylphenyl)-2-(N-methyl-N-phenylsulfamoyl)benzamide;

N-methyl-2-(N-methyl-N-phenylsulfamoyl)-N-phenylbenzamide;

N-(4-carbamoylphenyl)-2-(N-methyl-N-phenylsulfamoyl)benzamide;

3-fluoro-4-methyl-N-(2-(N-phenylsulfamoyl)phenyl) benzamide;

N-(2-(N-(4-methoxyphenyl)sulfamoyl)-4-methylphenyl)-2,5-dimethylfuran-3-carboxamide;
N-(2-(N-(4-bromophenyl)sulfamoyl)-4-methylphenyl)-2-phenoxybenzamide
N-(2-(N-(4-ethoxyphenyl)sulfamoyl)-3-methylphenyl)-2-methoxybenzamide
4-chloro-N-(2-(N-(4-ethoxyphenyl)sulfamoyl)-3-methylphenyl)benzamide
N-(2-(N-(2-chlorophenyl)sulfamoyl)-4-methoxyphenyl)-3-((3,5-dimethylpiperidin-1-yl)sulfonyl)benzamide;
N-(2-(N-(4-iodophenyl)sulfamoyl)-4-methylphenyl)-3-methylthiophene-2-carboxamide;
N-(2-(N-cyclohexyl-N-methylsulfamoyl)phenyl)-2,6-difluorobenzamide;
N-(2-(N-(4-ethoxyphenyl)sulfamoyl)-3-methylphenyl)-4-phenoxybenzamide;
N-(2-(pyrrolidin-1-ylsulfonyl)phenyl)-3-(trifluoromethyl)benzamide;
2,6-dimethoxy-N-(4-methoxy-2-(N-(4-methoxyphenyl)sulfamoyl)phenyl)benzamide;
3-chloro-N-(2-(thiophene-2-sulfonamido)phenyl)benzamide;
4-((4-chlorophenyl)sulfonyl)-3,4-dihydroquinoxalin-2(1H)-one;
4-bromo-N-(2-(thiophene-2-sulfonamido)phenyl)benzamide;
4-(tert-butyl)-N-(2-((2-methoxy-5-nitrophenyl)sulfonamido)phenyl)benzamide;
4-chloro-N-(2-(thiophene-2-sulfonamido)phenyl)benzamide;
N-(2-((4-fluorophenyl)sulfonamido)phenyl)-3-((trifluoromethyl)sulfonyl)benzamide;
N-(5-chloro-2-((2-fluorophenyl)sulfonamido)phenyl)-4-(cyclopropanecarboxamido)benzamide;
5-bromo-2-fluoro-N-(2-(thiophene-2-sulfonamido)phenyl)benzamide;
N-(2-(thiophene-2-sulfonamido)phenyl)-4-(trifluoromethyl)benzamide;
4-chloro-2-fluoro-N-(2-(thiophene-2-sulfonamido)phenyl)benzamide;
4-(tert-butyl)-N-(2-((3-sulfamoylphenyl)sulfonamido)phenyl)benzamide;
4-chloro-N-(2-((4-fluorophenyl)sulfonamido)phenyl)benzamide;
5-chloro-2-fluoro-N-(2-(thiophene-2-sulfonamido)phenyl)benzamide;
4-chloro-N-(2-((2-oxo-2H-chromene)-6-sulfonamido)phenyl)benzamide;
4-bromo-N-(2-(2-oxopyrrolidin-1-yl)phenyl)benzenesulfonamide;
4-chloro-N-(2-((2-oxoindoline)-5-sulfonamido)phenyl)benzamide;
4-chloro-N-(2-oxoindolin-7-yl)benzenesulfonamide;
N-(5-chloro-2-((2-fluorophenyl)sulfonamido)phenyl)benzamide;
4-chloro-N-(2-(phenylsulfonamido)phenyl)benzamide;
2-chloro-4,5-difluoro-N-(2-((4-fluorophenyl)sulfonamido)phenyl)benzamide;
4-chloro-N-(2-((4-methoxyphenyl)sulfonamido)phenyl)benzamide;
4-((4-bromophenyl)sulfonyl)-3,4-dihydroquinoxalin-2(1H)-one;
2-fluoro-N-(2-((4-fluorophenyl)sulfonamido)phenyl)benzamide;
3-bromo-N-(2-(methylsulfonamido)phenyl)benzamide;
N-(2-((4-chloro-2-fluorophenyl)sulfonamido)-4-methoxyphenyl) acetamide;
4-bromo-2-fluoro-N-(2-(methylsulfonamido)phenyl)benzamide;
3,4-dichloro-N-(2-(2-oxopyrrolidin-1-yl)phenyl)benzenesulfonamide;
N-(3-cyanophenyl)-4-(N-(2,3-dimethylphenyl)sulfamoyl)benzamide;
N-(3-cyanophenyl)-4-(N-(3,4-dimethylphenyl)sulfamoyl)benzamide;
4-(2-methylindoline-1-carbonyl)-N-phenylbenzenesulfonamide;
N-(4-fluorophenyl)-4-(6-methoxy-1,2,3,4-tetrahydroquinoline-1-carbonyl)benzenesulfonamide;
N1,N4-di-p-tolylterephthalamide;
4-(indoline-1-carbonyl)-N-phenylbenzenesulfonamide;
N1,N4-bis(3-(methylthio)phenyl) terephthalamide;
N-(2-bromo-4-methylphenyl)-4-(N-(p-tolyl)sulfamoyl)benzamide;
N-(5-chloro-2-methylphenyl)-4-((3,4-dihydroquinolin-1(2H)-yl)sulfonyl)benzamide;
4-((3,4-dihydroquinolin-1(2H)-yl)sulfonyl)-N-(4-isopropylphenyl)benzamide;
4-(indoline-1-carbonyl)-N-methyl-N-phenylbenzenesulfonamide;
(4-((3,4-dihydroquinolin-1(2H)-yl)sulfonyl)phenyl)(6-methoxy-3,4-dihydroquinolin-1(2H)-yl)methanone;
4-(3,4-dihydro-2H-benzo[b][1,4]thiazine-4-carbonyl)-N-(2-methoxyphenyl)-N-methylbenzenesulfonamide;
N-(3-(N,N-diethylsulfamoyl)phenyl)-4-((3,4-dihydroquinolin-1(2H)-yl)sulfonyl)benzamide;
N-(2-methoxyphenyl)-N-methyl-4-(6-nitroindoline-1-carbonyl)benzenesulfonamide;
4-(indoline-1-carbonyl)-N-(2-methoxyphenyl)-N-methylbenzenesulfonamide;
4-(6-methoxy-1,2,3,4-tetrahydroquinoline-1-carbonyl)-N-phenylbenzenesulfonamide;
4-(6-methoxy-1,2,3,4-tetrahydroquinoline-1-carbonyl)-N-(o-tolyl)benzenesulfonamide;
N-(5-(tert-butyl)-2-methoxyphenyl)-4-(N-(2-methoxyphenyl)-N-methylsulfamoyl)benzamide;
N-methyl-4-(4-(N-(p-tolyl)sulfamoyl)benzamido)benzamide;
N1,N4-bis(2,3-dihydrobenzo[b][1,4]dioxin-6-yl) terephthalamide;
N1,N4-bis(benzo[d][1,3]dioxol-5-yl) terephthalamide;
N-(2-methoxyphenyl)-N-methyl-4-(1,2,3,4-tetrahydroquinoline-1-carbonyl)benzenesulfonamide;
N-(2-methoxyphenyl)-N-methyl-4-(2,3,4,5-tetrahydrobenzo[b][1,4]thiazepine-5-carbonyl)benzenesulfonamide;
4-(2-methylindoline-1-carbonyl)-N-(o-tolyl)benzenesulfonamide;
N-(2-methoxyphenyl)-4-(N-(2-methoxyphenyl)-N-methylsulfamoyl)benzamide;
N-(6-acetylbenzo[d][1,3]dioxol-5-yl)-4-((3,4-dihydroquinolin-1(2H)-yl)sulfonyl)benzamide;
3-(N-(benzo[d][1,3]dioxol-5-yl)sulfamoyl)-N-(3-chloro-4-methoxyphenyl)benzamide;
N-(2-fluorophenyl)-4-(6-methoxy-1,2,3,4-tetrahydroquinoline-1-carbonyl)benzenesulfonamide;
1-(4-(N-(p-tolyl)sulfamoyl)benzoyl) indoline-5-sulfonamide;
4-((3,4-dihydroquinolin-1(2H)-yl)sulfonyl)-N-ethyl-N-phenylbenzamide;
N-(4-((2,3-dihydrobenzo[b][1,4]dioxine)-6-sulfonamido)phenyl)-3-(2-oxopyrrolidin-1-yl)benzamide;
N-(2,3-dihydrobenzo[b][1,4]dioxin-6-yl)-4-(N-(4-methoxyphenyl)sulfamoyl)benzamide;

N-(3,4-dimethylphenyl)-4-(N-(p-tolyl)sulfamoyl)benzamide;
4-((3,4-dihydroquinolin-1(2H)-yl)sulfonyl)-N-(2-methylbenzo[d]thiazol-6-yl)benzamide;
N-methyl-4-(3-oxo-1,2,3,4-tetrahydroquinoxaline-1-carbonyl)-N-phenylbenzenesulfonamide;
4-(2,3,5,10,11,11a-hexahydro-1H-benzo[e]pyrrolo[1,2-a][1,4]diazepine-10-carbonyl)-N-(p-tolyl)benzenesulfonamide;
4-(indoline-1-carbonyl)-N-(2-methoxy-5-nitrophenyl)benzenesulfonamide N-cyclopropyl-2-(4-(N-(o-tolyl)sulfamoyl)benzamido)benzamide;
3-(4-(N-(2,3-dimethylphenyl)sulfamoyl)benzamido)-N,N-dimethylbenzamide;
4-((3,4-dihydroquinolin-1(2H)-yl)sulfonyl)-N-(4-morpholinophenyl)benzamide;
N-(4-fluoro-3-nitrophenyl)-4-(N-(2-methoxy-5-nitrophenyl)sulfamoyl)benzamide;
N-methyl-4-(N-methyl-N-phenylsulfamoyl)-N-phenylbenzamide;
4-((2,3-dihydrobenzo[b][1,4]dioxine)-6-sulfonamido)-N-(2-methoxyphenyl)benzamide;
4-((3,4-difluorophenyl)sulfonamido)-N-(p-tolyl)benzamide;
N-(4-ethoxyphenyl)-4-((3-(trifluoromethyl)phenyl)sulfonamido)benzamide;
N-(4-((difluoromethyl)thio)phenyl)-4-((3-nitrophenyl)sulfonamido)benzamide;
4-((4-chloro-3-nitrophenyl)sulfonamido)-N-(4-fluorophenyl)benzamide;
N-(2,3-dihydrobenzo[b][1,4]dioxin-6-yl)-4-((3-methoxyphenyl)sulfonamido)benzamide;
N-(3-fluorophenyl)-4-(phenylsulfonamido)benzamide;
4-((3-chloro-4-fluorophenyl)sulfonamido)-N-(m-tolyl)benzamide;
N-(3-chlorophenyl)-4-((3,4-difluorophenyl)sulfonamido)benzamide;
4-((2,5-dimethylphenyl)sulfonamido)-N-(2-fluorophenyl)benzamide;
4-(phenylsulfonamido)-N-(spiro[benzo[d][1,3]dioxole-2,1'-cyclopentan]-5-yl)benzamide;
4-fluoro-3-methyl-N-(4-(2-methylindoline-1-carbonyl)phenyl)benzenesulfonamide;
N-(2,3-dihydro-1H-inden-5-yl)-4-((2,3-dihydrobenzo[b][1,4]dioxine)-6-sulfonamido)benzamide;
N-(4-(2-methylindoline-1-carbonyl)phenyl)benzenesulfonamide;
N-(4-(1,2,3,4-tetrahydroquinoline-1-carbonyl)phenyl)-2,3-dihydrobenzo[b][1,4]dioxine-6-sulfonamide;
4-((4-bromophenyl)sulfonamido)-N-(2,3-dimethylphenyl)benzamide;
N-(4-ethoxyphenyl)-4-(phenylsulfonamido)benzamide;
4-((4-chloro-3-(trifluoromethyl)phenyl)sulfonamido)-N-(2-methoxyphenyl)benzamide;
4-((3-methoxyphenyl)sulfonamido)-N-(3-(trifluoromethyl)phenyl)benzamide;
N-(3,4-dimethylphenyl)-4-(phenylsulfonamido)benzamide;
N-(3,4-dimethylphenyl)-4-((4-fluorophenyl)sulfonamido)benzamide;
N-(2-methoxyphenyl)-4-((3-(trifluoromethyl)phenyl)sulfonamido)benzamide;
N-(benzo[d][1,3]dioxol-5-yl)-4-((4-fluoro-3-methylphenyl)sulfonamido)benzamide;
N-(benzo[d][1,3]dioxol-5-yl)-4-((2,3-dihydrobenzo[b][1,4]dioxine)-6-sulfonamido)benzamide;
4-((2,5-dimethylphenyl)sulfonamido)-N-(3-(trifluoromethyl)phenyl)benzamide;
N-(4-(indoline-1-carbonyl)phenyl)-3,4-dihydro-2H-benzo[b][1,4]dioxepine-7-sulfonamide;
4-((3,4-difluorophenyl)sulfonamido)-N-(3-fluoro-4-methylphenyl)benzamide;
4-((N,4-dimethylphenyl)sulfonamido)-N-(2-methyl-5-nitrophenyl)benzamide;
N-(3,4-dichlorophenyl)-4-((3,4-difluorophenyl)sulfonamido)benzamide;
4-((3,4-dimethylphenyl)sulfonamido)-N-(4-fluorophenyl)benzamide;
4-((4-bromophenyl)sulfonamido)-N-(3-cyanophenyl)benzamide;
N-(benzo[d][1,3]dioxol-5-yl)-4-((2,5-dimethylphenyl)sulfonamido)benzamide;
4-chloro-3-nitro-N-(4-(1,2,3,4-tetrahydroquinoline-1-carbonyl)phenyl)benzenesulfonamide;
4-((3-chloro-4-fluorophenyl)sulfonamido)-N-(3,5-dimethylphenyl)benzamide;
N-(3-cyanophenyl)-4-((3,4-difluorophenyl)sulfonamido)benzamide;
N-(4-bromo-2-methylphenyl)-4-((4-fluorophenyl)sulfonamido)benzamide;
N-(2-methoxyphenyl)-4-((4-(trifluoromethyl)phenyl)sulfonamido)benzamide;
N-(benzo[d][1,3]dioxol-5-yl)-4-((4-bromophenyl)sulfonamido)benzamide;
4-((4-bromophenyl)sulfonamido)-N-(m-tolyl)benzamide;
N-(2,3-dimethylphenyl)-4-((4-fluorophenyl)sulfonamido)benzamide;
N-(2,3-dihydrobenzo[b][1,4]dioxin-6-yl)-4-((N,4-dimethylphenyl)sulfonamido)benzamide;
N-(benzo[d][1,3]dioxol-5-yl)-4-((4-fluorophenyl)sulfonamido)benzamide;
N-(3-bromophenyl)-4-((3-nitrophenyl)sulfonamido)benzamide;
4-((2,3-dihydrobenzo[b][1,4]dioxine)-6-sulfonamido)-N-(4-methoxyphenyl)benzamide;
4-((4-cyanophenyl)sulfonamido)-N-(2-methoxyphenyl)benzamide;
4-((2,3-dichlorophenyl)sulfonamido)-N-(2-methoxyphenyl)benzamide;
4-((3-cyanophenyl)sulfonamido)-N-(2-methoxyphenyl)benzamide;
4-((4-bromophenyl)sulfonamido)-N-(3-(N,N-dimethylsulfamoyl)-4-methylphenyl)benzamide;
4-((N,4-dimethylphenyl)sulfonamido)-N-(3-(2-oxopyrrolidin-1-yl)phenyl)benzamide;
N-(2-(difluoromethoxy)phenyl)-4-((N,4-dimethylphenyl)sulfonamido)benzamide;
N-(4-bromophenyl)-4-((3,4-difluorophenyl)sulfonamido)benzamide;
4-((2,3-dihydrobenzo[b][1,4]dioxine)-6-sulfonamido)-N-(m-tolyl)benzamide;
N-(3-(2-oxopyrrolidin-1-yl)phenyl)-4-(phenylsulfonamido)benzamide;
N-(2,4-dimethylphenyl)-4-((4-fluorophenyl)sulfonamido)benzamide;
N-(4-(difluoromethoxy)phenyl)-4-(phenylsulfonamido)benzamide;
N-(benzo[d][1,3]dioxol-5-yl)-4-((3-fluorophenyl)sulfonamido)benzamide;
N-(3-cyanophenyl)-4-((2,5-dimethylphenyl)sulfonamido)benzamide;
N-(2-fluoro-5-methylphenyl)-4-(phenylsulfonamido)benzamide;

4-((4-chloro-2-fluorophenyl)sulfonamido)-N-(4-methoxyphenyl)benzamide;
N-(3-cyanophenyl)-4-((4-fluorophenyl)sulfonamido)benzamide;
N-(3,4-dimethoxyphenyl)-4-((4-fluorophenyl)sulfonamido)benzamide;
N-(3-cyanophenyl)-4-((4-fluoro-2-methylphenyl)sulfonamido)benzamide;
N-(2-(difluoromethoxy)phenyl)-4-(phenylsulfonamido)benzamide;
4-((3-chloro-4-fluorophenyl)sulfonamido)-N-(4-sulfamoylphenyl)benzamide;
N-(3-cyanophenyl)-4-((2,3-dihydrobenzo[b][1,4]dioxine)-6-sulfonamido)benzamide;
N-(4-acetamidophenyl)-4-((4-bromophenyl)sulfonamido)benzamide;
2,5-dichloro-N-(4-(indoline-1-carbonyl)phenyl)benzenesulfonamide;
4-fluoro-N-(4-(indoline-1-carbonyl)phenyl)benzenesulfonamide;
N-(benzo[d][1,3]dioxol-5-yl)-4-(phenylsulfonamido)benzamide;
4-((3,4-difluorophenyl)sulfonamido)-N-(4-fluorophenyl)benzamide;
N-(3-(2-(1H-1,2,4-triazol-1-yl) ethoxy)phenyl)-4-((4-fluorophenyl)sulfonamido)benzamide;
4-((3,4-difluorophenyl)sulfonamido)-N-methyl-N-phenylbenzamide;
N-(2-(2-oxopyrrolidin-1-yl)phenyl)-4-(phenylsulfonamido)benzamide;
N-(4-(N-(2-chlorophenyl)sulfamoyl)phenyl)-4-(trifluoromethyl)benzamide;
N-(4-(N-(3-chloro-4-fluorophenyl)sulfamoyl)phenyl)-3-nitrobenzamide;
3-methoxy-N-(4-(N-(2-methoxyphenyl)sulfamoyl)phenyl)benzamide;
3-bromo-N-(4-(N-(4-fluorophenyl)sulfamoyl)phenyl)-4-methylbenzamide;
3,5-dinitro-N-(4-(N-(3-(trifluoromethyl)phenyl)sulfamoyl)phenyl)benzamide;
N-(4-(N-(4-chlorophenyl)sulfamoyl)phenyl)-3-(trifluoromethyl)benzamide;
2-chloro-4-fluoro-N-(4-(N-(3-(trifluoromethyl)phenyl)sulfamoyl)phenyl)benzamide;
N-(4-(N-(4-chlorophenyl)sulfamoyl)phenyl)-2-methoxybenzamide;
4-chloro-3-nitro-N-(4-(N-(3-(trifluoromethyl)phenyl)sulfamoyl)phenyl)benzamide;
N-(4-(indolin-1-ylsulfonyl)phenyl)-3-nitrobenzamide;
N-(4-(N-(2-methoxyphenyl)sulfamoyl)phenyl)-2,3-dihydrobenzo[b][1,4]dioxine-6-carboxamide;
3,4-dichloro-N-(4-(N-(2-chlorophenyl)sulfamoyl)phenyl)benzamide;
N-(4-(N-(2-methoxyphenyl)sulfamoyl)phenyl)-2-(((tetrahydrofuran-2-yl)methyl)thio)benzamide;
3-(difluoromethoxy)-N-(4-(N-(4-ethoxyphenyl)sulfamoyl)phenyl)benzamide;
4-chloro-N-(4-(N-(4-chlorophenyl)sulfamoyl)phenyl)-3-sulfamoylbenzamide;
N-(4-(N-(4-chlorophenyl)sulfamoyl)phenyl)-4-methoxybenzamide;
N-(4-(N-(3,4-dimethylphenyl)sulfamoyl)phenyl)-3-(methylsulfonyl)benzamide;
N-(4-(N-(3-chlorophenyl)sulfamoyl)phenyl)-4-fluorobenzamide;
3-(N,N-dimethylsulfamoyl)-N-(4-(N-(4-methoxyphenyl)sulfamoyl)phenyl)benzamide;
3,5-dichloro-N-(4-(N-(4-methoxyphenyl)sulfamoyl)phenyl)benzamide;
N-(4-(N-(2-methoxyphenyl)sulfamoyl)phenyl)-3-nitrobenzamide N-(4-(N-(2-chlorophenyl)sulfamoyl)phenyl)-2,3-dihydrobenzo[b][1,4]dioxine-6-carboxamide;
N-(4-(N-(3-chlorophenyl)sulfamoyl)phenyl)-2-methoxybenzamide;
2-(difluoromethoxy)-N-(4-(N-(3,4-dimethoxyphenyl)sulfamoyl)phenyl)benzamide;
3-cyano-N-(4-(N-(2-methoxyphenyl)sulfamoyl)phenyl)benzamide;
3-fluoro-N-(4-(N-(3-(trifluoromethyl)phenyl)sulfamoyl)phenyl)benzamide;
4-cyano-N-(4-(N-(2-methoxyphenyl)sulfamoyl)phenyl)benzamide;
N-(4-(N-(3-(trifluoromethyl)phenyl)sulfamoyl)phenyl)benzamide;
4-chloro-N-(4-(N-(4-methoxyphenyl)sulfamoyl)phenyl)benzamide;
4-fluoro-N-(4-(N-(4-methoxyphenyl)sulfamoyl)phenyl)benzamide;
N-(4-((2,3-dihydrobenzo[b][1,4]dioxine)-6-sulfonamido)phenyl)-4-(5-methyl-1H-pyrazol-1-yl)benzamide;
N-(4-((5-bromo-2-ethoxyphenyl)sulfonamido)phenyl)-2-fluorobenzamide;
N-(4-((2,3-dihydrobenzo[b][1,4]dioxine)-6-sulfonamido)phenyl)-4-(1H-pyrazol-1-yl)benzamide;
N-(4-cyanophenyl)-3-(N-(4-methoxyphenyl)sulfamoyl)benzamide;
N-(3-(difluoromethoxy)phenyl)-3-(N-(3-(trifluoromethyl)phenyl)sulfamoyl)benzamide;
N-(3-sulfamoylphenyl)-3-(N-(p-tolyl)sulfamoyl)benzamide; and
3-(N-(4-bromophenyl)sulfamoyl)-N-(3-(3-(3,5-dimethyl-1H-pyrazol-4-yl)propanamido)phenyl)benzamide.

23. The method of claim 1, wherein contacting the apyrase comprises treating a crop with the compound.

24. The method of claim 23, further comprising treating the crop with a pesticide.

25. The method of claim 24, wherein the pesticide is selected from acaricides, fungicides, herbicides, insecticides, molluscicides, nematocides, or a combination thereof.

26. The method of claim 24, wherein the pesticide comprises a fungicide.

27. The method of claim 23, further comprising treating the crop with a fungicide selected from selected from benzimidazoles, dicarboximides, phenylpyrroles, anilinopyrimidines, hydroxyanilides, carboxamides, phenyl amides, phosphonates, cinnamic acids, oxysterol binding protein inhibitors (OSBPI), triazole carboxamides, cymoxanil, carbamates, benzamides, demethylation inhibiting piperazines, demethylation inhibiting pyrimidines, demethylation inhibiting azoles, including imidazoles and triazoles, such as cyproconazole, difenoconazole, fenbuconazole, flutriafol, mefentrifluconazole, metconazole, ipconazole, prothioconazole, tebuconazole, tetraconazole, triadimefon, triadimenol, triticonazole, morpholines, cyflufenamid, metrafenone, pyriofenone, strobilurins, copper ammonium complex, copper hydroxide, copper oxide, copper oxychloride, copper sulfate, sulfur, lime sulfur, ethylenebisdithiocarbamates, aromatic hydrocarbons, phthalimides, guanidines, polyoxins, fluazinam, thiazolidines or a combination thereof.

28. A composition, comprising a fungicide;

a compound of the formula

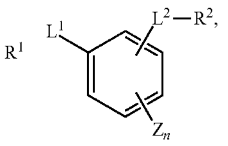

wherein $L^1$ is selected from —C(O)N($R^a$)— and —N($R^a$)C(O)—;

$L^2$ is selected from —$S(O)_2N(R^a)$— and —$N(R^a)S(O)_2$—;

wherein $R^1$ is selected from $C_{1-6}$ alkyl optionally substituted with one or more $R^a$ and $R^b$, aryl optionally substituted with one or more $R^3$, aralkyl optionally substituted with one or more $R^3$, heterocyclyl optionally substituted with one or more $R^d$ and heteroaryl optionally substituted with one or more $R^3$;

$R^2$ is selected from $C_{1-6}$ alkyl aryl and heteroaryl, each optionally substituted with one or more $R^a$ and $R^b$;

$R^3$ is independently selected from $R^a$, $R^b$, —$OR^a$ substituted with one or more of the same or different $R^a$ or $R^b$, or —$(CH_2)_m$—$R^b$, —$(CHR^a)_m$—$R^b$, —O—$(CH_2)_m$—$R^b$, —S—$(CH_2)_m$—$R^b$, —O—$CHR^aR^b$, —O—$CR^a(R^b)_2$, —O—$(CHR^a)_m$—$R^b$, —O—$(CH_2)_m$—CH$[(CH_2)_mR^b]R^b$, —S—$(CHR^a)_m$—$R^b$, —C(O)NH—$(CH_2)_m$—$R^b$, —C(O)NH—$(CHR^a)_m$—$R^b$, —O—$(CH_2)_m$—C(O)NH—$(CH_2)_m$—$R^b$;

each $R^a$ is independently selected from the group consisting of hydrogen, $C_{1-6}$ alkyl, $C_{1-6}$ haloalkyl, $C_{3-8}$ cycloalkyl, $C_{6-10}$ aryl, $C_{5-10}$ heteroaryl, $C_{6-16}$ arylalkyl, 2-6 membered heteroalkyl and 3-8 membered heterocyclylalkyl or $R^a$ together with the nitrogen and the $R^1$ or $R^2$ attached thereto forms a heterocyclyl optionally substituted with one or more $R^d$, or forms a heteroaryl optionally substituted with one or more $R^3$;

Z is selected from halogen, $C_{1-6}$ alkyl, —$OR^a$, and $C_{1-6}$ haloalkyl;

$R^b$ is independently selected from the group consisting of =O, —$OR^d$, halogen, $C_{1-3}$ haloalkyloxy, —$OCF_3$, =S, —$SR^d$, —$NR^d$, =$NOR^d$, —$NR^cR^c$, —SF5, halogen, —$CF_3$, —CN, —$NO_2$, —$S(O)R^d$, —$S(O)_2R^d$, —$S(O)_2OR^d$, —$S(O)NR^cR^c$, —$S(O)_2NR^cR^c$, —$OS(O)R^d$, —$OS(O)_2R^d$, —$OS(O)_2OR^d$, —$OS(O)_2NR^cR^c$, —$C(O)R^d$, —$C(O)OR^d$, —$C(O)NR^cR^c$, —C(NH)$NR^cR^c$, —$C(NR^a)NR^cR^c$, —$C(NOH)R^a$, —C(NOH)$NR^cR^c$, —$OC(O)R^d$, —$OC(O)OR^d$, —$OC(O)NR^cR^c$, —OC(NH)$NR^cR^c$, —$OC(NR^a)NR^cR^c$, —$[NHC(O)]_nR^d$, —$[NR^aC(O)]_nR^d$, —$[NHC(O)]_nOR^d$, —$[NR^aC(O)]_nOR^d$, —$[NHC(O)]_nNR^cR^c$, —$[NR^aC(O)]_nNR^cR^c$, —$[NHC(NH)]_nNR^cR^c$ and —$[NR^aC(NR^a)]_nNR^cR^c$;

each $R^c$ is independently $R^a$, or, alternatively, two $R^c$ are taken together with the nitrogen atom to which they are bonded to form a 5 to 10-membered heterocyclylalkyl or heteroaryl which may optionally include one or more of the same or different additional heteroatoms and which may optionally be substituted with one or more of the same or different $R^e$ groups;

each $R^d$ is independently hydrogen or $C_{1-6}$ alkyl;

each $R^e$ is independently halogen, $C_{1-6}$ alkyl or —C(O)$R^d$;

each m is independently an integer from 1 to 3; and each n is independently an integer from 0 to 3; provided that the compound does not have the formula

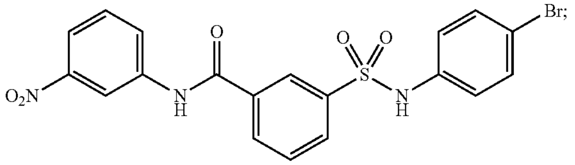 [SMILES: O=C(Nc1cccc([N+](=O)[O-])c1)c1cccc(S(=O)(=O)Nc2ccc(Br)cc2)c1]

and a phytologically acceptable carrier.

29. The composition of claim 28, wherein the composition comprises from about 1 to about 80 weight percent of the compound.

30. The composition of claim 28, wherein the composition is a suspension formulation.

31. The composition of claim 30, wherein the composition comprises from about 1 to about 50 weight percent of the compound.

32. The composition of claim 31, further comprising sodium polycarboxylate.

33. The composition of claim 32, further comprising biocides.

34. The composition of claim 32, further comprising organosilicone antifoam emulsion.

35. The composition of claim 28, wherein the composition is a wettable powder.

36. The composition of claim 28, wherein the composition is an emulsifiable concentrate.

37. The composition of claim 36, further comprising tristyrylphenol ethoxylates.

38. The composition of claim 28, wherein the composition is an oil dispersible concentrate.

39. A pesticidal composition, comprising a pesticide;

a compound of the formula

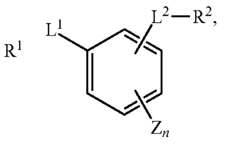

wherein $L^1$ is selected from —C(O)N($R^a$)— and —N($R^a$)C(O)—;

$L^2$ is selected from —$S(O)_2N(R^a)$— and —$N(R^a)S(O)_2$—;

wherein $R^1$ is selected from $C_{1-6}$ alkyl optionally substituted with one or more $R^a$ and $R^b$, aryl optionally substituted with one or more $R^3$, aralkyl optionally substituted with one or more $R^3$, heterocyclyl optionally substituted with one or more $R^d$ and heteroaryl optionally substituted with one or more $R^3$;

$R^2$ is selected from $C_{1-6}$ alkyl aryl and heteroaryl, each optionally substituted with one or more $R^a$ and $R^b$;

$R^3$ is independently selected from $R^a$, $R^b$, —$OR^a$ substituted with one or more of the same or different $R^a$ or $R^b$, or —$(CH_2)_m$—$R^b$, —$(CHR^a)_m$—$R^b$, —O—$(CH_2)_m$—$R^b$, —S—$(CH_2)_m$—$R^b$, —O—$CHR^aR^b$, —O—$CR^a(R^b)_2$, —O—$(CHR^a)_m$—$R^b$, —O—$(CH_2)_m$—CH$[(CH_2)_mR^b]R^b$, —S—$(CHR^a)_m$—$R^b$, —C(O)NH—

$(CH_2)_m$—$R^b$, —C(O)NH—$(CHR^a)_m$—$R^b$, —O—$(CH_2)_m$—C(O)NH—$(CH_2)_m$—$R^b$;

each $R^a$ is independently selected from the group consisting of hydrogen, $C_{1-6}$ alkyl, $C_{1-6}$ haloalkyl, $C_{3-8}$ cycloalkyl, $C_{6-10}$ aryl, $C_{5-10}$ heteroaryl, $C_{6-16}$ arylalkyl, 2-6 membered heteroalkyl and 3-8 membered heterocyclylalkyl or $R^a$ together with the nitrogen and the $R^1$ or $R^2$ attached thereto forms a heterocyclyl optionally substituted with one or more $R^d$, or forms a heteroaryl optionally substituted with one or more $R^3$;

Z is selected from halogen, $C_{1-6}$ alkyl, —$OR^a$, and $C_{1-6}$ haloalkyl;

$R^b$ is independently selected from the group consisting of =O, —$OR^d$, halogen, $C_{1-3}$ haloalkyloxy, —$OCF_3$, =S, —$SR^d$, =$NR^d$, =$NOR^d$, —$NR^cR^c$, —SF5, halogen, —$CF_3$, —CN, —$NO_2$, —S(O)$R^d$, —$S(O)_2R^d$, —$S(O)_2OR^d$, —S(O)$NR^cR^c$, —$S(O)_2NR^cR^c$, —OS(O)$R^d$, —$OS(O)_2R^d$, —$OS(O)_2OR^d$, —$OS(O)_2NR^cR^c$, —C(O)$R^d$, —C(O)$OR^d$, —C(O)$NR^cR^c$, —C(NH)$NR^cR^c$, —C($NR^a$)$NR^cR^c$, —C(NOH)$R^a$, —C(NOH)$NR^cR^c$, —OC(O)$R^d$, —OC(O)$OR^d$, —OC(O)$NR^cR^c$, —OC(NH)$NR^cR^c$, —OC($NR^a$)$NR^cR^c$, —$[NHC(O)]_nR^d$, —$[NR^aC(O)]_nR^d$, —$[NHC(O)]_nOR^d$, —$[NR^aC(O)]_nOR^d$, —$[NHC(O)]_nNR^cR^c$, —$[NR^aC(O)]_nNR^cR^c$, —$[NHC(NH)]_nNR^cR^c$ and —$[NR^aC(NR^a)]_nNR^cR^c$;

each $R^c$ is independently $R^a$, or, alternatively, two $R^c$ are taken together with the nitrogen atom to which they are bonded to form a 5 to 10-membered heterocyclylalkyl or heteroaryl which may optionally include one or more of the same or different additional heteroatoms and which may optionally be substituted with one or more of the same or different $R^e$ groups;

each $R^d$ is independently hydrogen or $C_{1-6}$ alkyl;

each $R^e$ is independently halogen, $C_{1-6}$ alkyl or —C(O)$R^d$, each m is independently an integer from 1 to 3; and each n is independently an integer from 0 to 3; provided that the compound does not have the formula

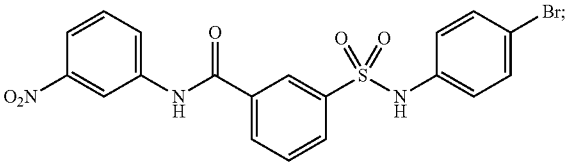 [SMILES: O=C(Nc1cccc([N+](=O)[O-])c1)c1cccc(S(=O)(=O)Nc2ccc(Br)cc2)c1]

and a phytologically acceptable carrier.

40. The pesticidal composition of claim 39, wherein the pesticide comprises an acaricide, fungicide, herbicide, insecticide, molluscicide, nematocide, or a combination thereof.

41. The composition of claim 29, wherein the fungicide is selected from the group consisting of benzimidazoles, dicarboximides, phenylpyrroles, anilinopyrimidines, hydroxyanilides, carboxamides, phenyl amides, phosphonates, cinnamic acids, oxysterol binding protein inhibitors, triazole carboxamides, cymoxanil, carbamates, benzamides, demethylation inhibiting piperazines, demethylation inhibiting pyrimidines, demethylation inhibiting azoles, including imidazoles and triazoles, cyproconazole, difenoconazole, fenbuconazole, flutriafol, mefentrifluconazole, metconazole, ipconazole, prothioconazole, tebuconazole, tetraconazole, triadimefon, triadimenol, triticonazole, morpholines, cyflufenamid, metrafenone, pyriofenone, strobilurins, copper ammonium complex, copper hydroxide, copper oxide, copper oxychloride, copper sulfate, sulfur, lime sulfur, ethylenebisdithiocarbamates, aromatic hydrocarbons, phthalimides, guanidines, polyoxins, fluazinam, thiazolidines or a combination thereof.

* * * * *